US009367516B2

(12) United States Patent
Boehl et al.

(10) Patent No.: US 9,367,516 B2
(45) **Date of Patent: *Jun. 14, 2016**

(54) CIRCUIT ARRANGEMENT FOR A DATA PROCESSING SYSTEM AND METHOD FOR DATA PROCESSING

(75) Inventors: Eberhard Boehl, Reutlingen (DE); Ruben Bartholomae, Reutlingen (DE); Matthias Knauss, Schorndorf (DE); Stephen Schmitt, Nuertingen (DE); Thomas Wagner, Reutlingen (DE); Andreas Hempel, Ludwigsburg (DE); Dieter Thoss, Schwieberdingen (DE); Bernhard Mader, Kernen (DE); Achim Schaefer, Grossbottwar (DE); Juergen Hanisch, Bempflingen (DE); Uwe Scheurer, Reutlingen (DE); Andreas Merker, Vaihingen/Enz (DE); Rolf Kurrer, Stuttgart (DE); Bernd Becker, Stuttgart (DE); Bernard Pawlok, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 335 days.

This patent is subject to a terminal disclaimer.

(21) Appl. No.: 13/638,125

(22) PCT Filed: Mar. 18, 2011

(86) PCT No.: PCT/EP2011/054109

§ 371 (c)(1),
(2), (4) Date: Dec. 11, 2012

(87) PCT Pub. No.: WO2011/120823

PCT Pub. Date: Oct. 6, 2011

(65) Prior Publication Data

US 2013/0111189 A1 May 2, 2013

(30) Foreign Application Priority Data

Mar. 31, 2010 (EP) .................................... 10158595

(51) Int. Cl.
*G06F 1/12* (2006.01)
*G06F 15/76* (2006.01)
*G06F 1/04* (2006.01)

(52) U.S. Cl.
CPC . *G06F 15/76* (2013.01); *G06F 1/04* (2013.01)

(58) Field of Classification Search
CPC ............ G06F 1/14; G06F 15/76; G05B 21/00
USPC .......................................... 713/375, 600, 400
See application file for complete search history.

(56) References Cited

U.S. PATENT DOCUMENTS 5,774,684 A * 6/1998 Haines et al. ................. 710/305
5,959,689 A * 9/1999 De Lange et al. ............. 348/571

(Continued)

FOREIGN PATENT DOCUMENTS

WO 2009040179 A2 4/2009

OTHER PUBLICATIONS

International Search Report corresponding to PCT Application No. PCT/EP2011/054109, mailed Aug. 23, 2011 (3 pages).

(Continued)

*Primary Examiner* — Vincent Tran

(74) *Attorney, Agent, or Firm* — Maginot, Moore & Beck LLP

(57) ABSTRACT

A circuit arrangement for a data processing system is configured to process data in multiple modules. The circuit arrangement is configured to provide a clock as well as a time base and/or a base of at least one further physical quantity for each of the multiple modules. The circuit arrangement also comprises a central routing unit, which is connected to several of the multiple modules. Via the central routing unit, the modules can periodically exchange data based on the time base and/or on the base of the at least one further physical quantity. The several modules are configured to process data independently of and in parallel to other modules of the several modules.

6 Claims, 51 Drawing Sheets

(56) References Cited

U.S. PATENT DOCUMENTS

Figure 1:
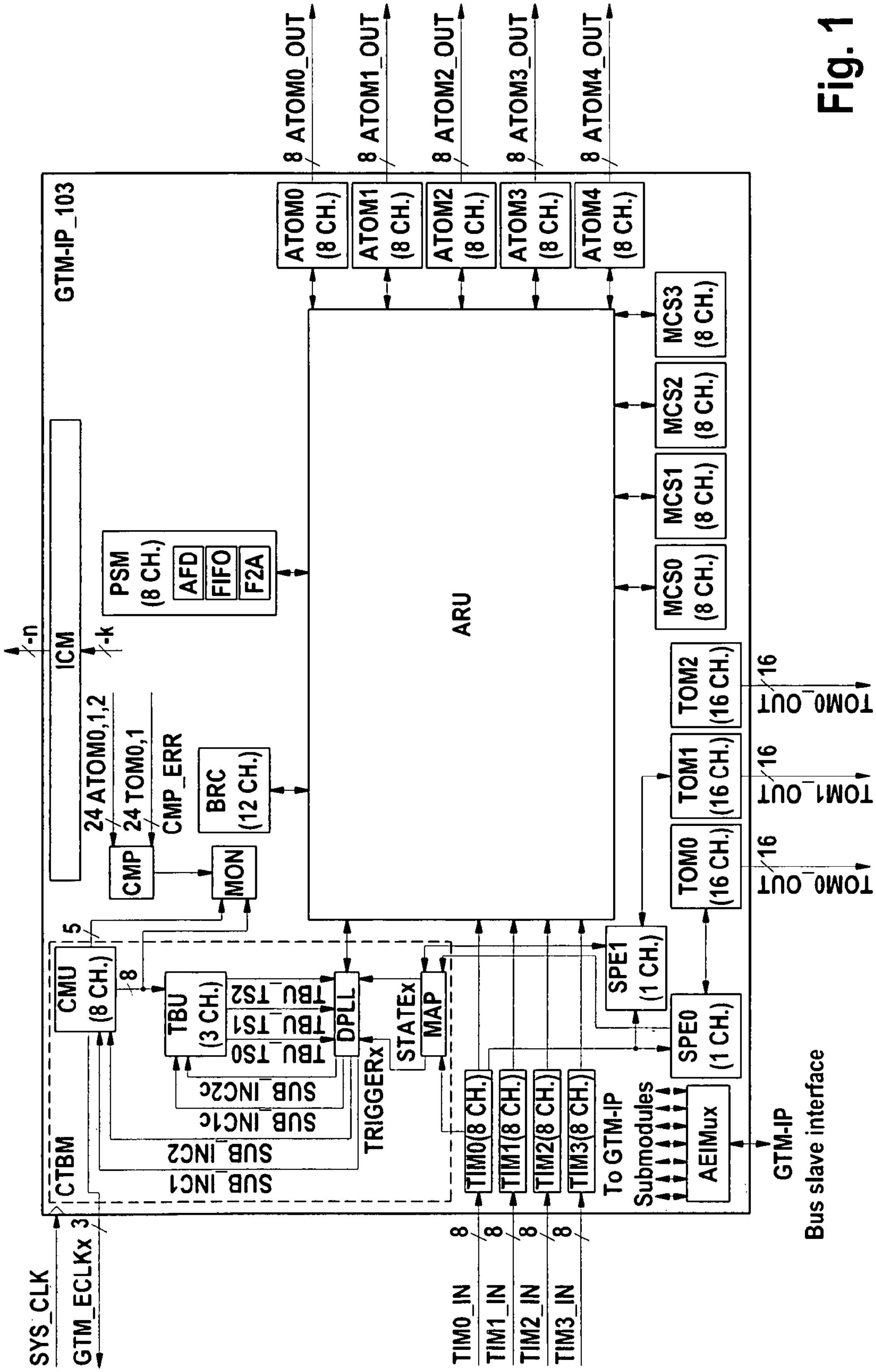

| | | | | |
|---|---|---|---|---|
| 6,662,256 | B1 * | 12/2003 | Foo | 710/305 |
| 7,219,280 | B2 * | 5/2007 | McNall | 714/726 |
| 2002/0118203 | A1 * | 8/2002 | Muramatsu et al. | 345/542 |
| 2008/0022140 | A1 * | 1/2008 | Yamada et al. | 713/322 |
| 2008/0204074 | A1 * | 8/2008 | Chan et al. | 326/41 |
| 2008/0300919 | A1 * | 12/2008 | Charlton et al. | 705/2 |
| 2009/0072812 | A1 * | 3/2009 | Henzler | G04F 10/005 324/76.82 |
| 2009/0282166 | A1 * | 11/2009 | Athani et al. | 709/237 |
| 2013/0082693 | A1 * | 4/2013 | Boehl | G01B 7/30 324/207.25 |
| 2013/0227331 | A1 * | 8/2013 | Boehl et al. | 713/600 |

OTHER PUBLICATIONS

TriCore Sinusodial 3-Phase Output Generation Using the TriCore General Purpose Timer Array, AP 32084, vol. 1.0, Edition 2005-01, Infineon Technologies AG, München, Germany.

* cited by examiner 9 clock cycles

| | | | | | | | | |
|---|---|---|---|---|---|---|---|---|
| Stage 0: | $C_0(t)$ | $C_1(t)$ | ... | $C_7(t)$ | CPU(t) | $C_0(t+1)$ | $C_1(t+1)$ | $C_2(t+1)$ |
| Stage 1 | | $C_0(t)$ | $C_1(t)$ | ... | $C_7(t)$ | CPU(t) | $C_1(t+1)$ | $C_1(t+1)$ |
| Stage 2: | | | $C_0(t)$ | $C_1(t)$ | ... | $C_7(t)$ | CPU(t) | $C_1(t+1)$ |
| Stage 3: | | | | $C_0(t)$ | $C_1(t)$ | ... | $C_7(t)$ | - |

| Memory Layout Option of current MCS instance MCS[i] | | | Memory Layout Option of preceding MCS instance MCS[i-1]: DEFAULT | SWAP | BORROW |
|---|---|---|---|---|---|
| | DEFAULT | MP0 | 0x1000 | 0x800 | 0x0 |
| | | MP1 | 0x1800 | 0x1000 | 0x800 |
| | SWAP | MP0 | 0x1000 | 0x800 | 0x0 |
| | | MP1 | 0x2000 | 0x1800 | 0x1000 |
| | BORROW | MP0 | 0x1000 | 0x800 | 0x0 |
| | | MP1 | 0x2800 | 0x2000 | 0x1800 |

CIRCUIT ARRANGEMENT FOR A DATA PROCESSING SYSTEM AND METHOD FOR DATA PROCESSING

This application is a 35 U.S.C. §371 National Stage Application of PCT/EP2011/054109, filed on Mar. 18, 2011, which claims the benefit of priority to Ser. No. EP 10158595.8, filed on Mar. 31, 2010 in Europe, the disclosures of which are incorporated herein by reference in their entirety.

BACKGROUND

For the support of a processing unit, for example of a CPU (Central Processing Unit), for time and position related processes, timers are well known. Such timer units can be arranged as single components or as peripheral devices of the processing unit. They can provide more or less important functions for signal receiving and generation in time dependence of one or several clocks.

Known timer modules are either hardware implementations which have to be operated and configured by a processing unit and are characterized by a high interrupt load of the processing unit, or they are partly programmable and have a small microcontroller implemented which, while reducing the interrupt load of the external processing unit, is limited by its own interrupt load.

Examples for known timers or timer units are the General Purpose Timer Array (GPTA) of Infineon, the Advanced Timer Unit (ATU) from Renesas, the Time Processing Unit (TPU) from Freescale, and the High-End Timer (HET) from Texas Instruments.

SUMMARY

Here, a circuit arrangement and a corresponding method are disclosed.

The circuit arrangement can for example be implemented in a data processing architecture, reducing an interrupt load of a data processing unit (CPU, ATU) of the data processing system.

In one embodiment, the circuit arrangement for a data processing system is arranged in several modules. Some of the modules are provided with a clock, a time base or a base of a further physical quantity. The circuit arrangement comprises a routing unit, connected to modules of the circuit arrangement. Via the circuit arrangement, modules periodically exchange data based on the time base or a base of a further physical quantity. Modules are configured to process data individually and in parallel to other modules. The periodical data exchange takes place after a given cycle time or a maximal cycle time.

The circuit arrangement is configured to process different tasks in parallel by the different modules individually and independently from each other. The modules are individually triggered by time or position related events. A high number of tasks are handled and processed in a short time. The modular structure is further configured to shut down a module individually if this module is not needed, e.g. to save energy or reduce temperature.

The central routing unit makes it possible to connect the multiple modules flexibly and configurably. In addition the routing unit uses a new interrupt concept for a timer module with its concept of request handling. Both the timer module and the routing unit lead to a very efficient timer module concept concerning its size, cost and energy consumption. FIG. 1 shows an exemplary circuit arrangement for the modular timer concept.

Further advantages of the disclosed timer (circuit arrangement) can be found in the following description.

DETAILED DESCRIPTION

In the following, an embodiment of a Timer Module will be described, the Generic Timer Module (GTM). It contains a module framework with sub modules of different functionality. These sub modules can be combined in a configurable manner to form a complex timer module that serves different application domains and different classes within one application domain. Because of this scalability and configurability the timer is called generic.

The scalability and configurability is reached with an architecture philosophy where dedicated hardware sub modules are located around a central routing unit (called Advanced Routing Unit (ARU)). The ARU can connect the sub modules in a flexible manner. The connectivity is software programmable and can be configured during runtime.

Nevertheless, the GTM-IP is designed to unload the CPU or a peripheral core from a high interrupt load. Most of the tasks inside the GTM-IP can run—once setup by an external CPU—independent and in parallel to the software. There may be special situations, where the CPU has to take action but the goal of the GTM design was to reduce these situations to a minimum.

The hardware sub modules have dedicated functionalities, e.g. there are timer input modules where incoming signals can be captured and characterized together with a notion of time. By combination of several sub modules through the ARU complex functions can be established. E.g. the signals characterized at an input module can be routed to a signal processing unit where an intermediate value about the incoming signal frequency can be calculated.

The modules that help to implement such complex functions are called infrastructural components further on. These components are present in all GTM variants. However, the number of these components may vary from device to device. Other sub modules have a more general architecture and can fulfil typical timer functions, e.g. there are PWM generation units. The third class of sub modules are those fulfilling a dedicated functionality for a certain application domain, e.g. the DPLL serves engine management applications. A fourth group of sub modules is responsible for supporting the implementation of safety functions to fulfil a defined safety level. Each GTM-IP is build up therefore with sub modules coming from those four groups. The application class is defined by the amount of components of those sub modules integrated into the implemented GTM-IP.

The structure of this document is motivated out of the aforementioned sub module classes. Chapter 0 describes the dedicated GTM-IP embodiment. It gives an overview about the implemented sub modules and their number within these dedicated devices.

The following chapters 0 up to 0 deal with the so called infrastructural components for routing, clock management and common time base functions. Chapters 0 to 0 describe the signal input and output modules while the following chapter 0 explains the signal processing and generation sub module. Chapter 0 outlines a memory configuration module for the described signal processing and generation sub module. The next sections provide a detailed description of application specific and safety related modules like the MAP, DPLL, SPE, CMP and MON sub modules. Chapter 0 describes a module that bundles several interrupts coming from the other sub modules and connect them to the outside world.

These sub module groups are shown in the following table:

| Chapter | Sub module | Group |
|---|---|---|
| 3 | Advanced Routing Unit (ARU) | Infrastructural components |
| 4 | Broadcast Module (BRC) | Infrastructural components |
| 5 | First In First Out Module (FIFO) | Infrastructural components |
| 6 | AEI-to-FIFO Data Interface (AFD) | Infrastructural components |
| 7 | FIFO-to-ARU Interface (F2A) | Infrastructural components |
| 8 | Clock Management Unit (CMU) | Infrastructural components |
| 9 | Time Base Unit (TBU) | Infrastructural components |
| 10 | Timer Input Module (TIM) | IO Modules |
| 11 | Timer Output Module (TOM) | IO Modules |
| 12 | ARU-connected Timer Output Module (ATOM) | IO Modules |
| 13 | Multi Channel Sequencer (MCS) | Signal generation and processing |
| 14 | Memory Configuration Module (MCFG) | Infrastructural component for MCS |
| 15 | TIM0 Input Mapping Module (MAP) | Dedicated |
| 16 | Digital PLL (DPLL) | Dedicated |
| 17 | Interrupt Concentrator Module (ICM) | Interrupt services |
| 18 | Sensor Pattern Evaluation Module (SPE) | BLDC support |
| 19 | Output Compare Unit (CMP) | Safety features |
| 20 | Monitoring Unit (MON) | Safety features |

Conventions

The following conventions are used within this document.

| | |
|---|---|
| ARIAL BOLD CAPITALS | Names of register and register bits |
| Arial italic | Names of signals |
| Courier | Extracts of files |

Terms and Abbreviations

This document uses the following terms and abbreviations.

| Term | Meaning |
|---|---|
| GTM | Generic Timer Module |
| IRC | Interrupt Controller |
| DPLL | Digital Phase Locked Loop |
| FULL_SCALE | Range in which all positions/values depend on the information of TRIGGER and STATE signals |
| HALF_SCALE | Range in which all positions/values depend on the information of TRIGGER signal only; two consecutive HALF_SCALE periods form a FULL_SCALE period |
| TS | Time stamp representation |
| PS | Position (or value) stamp representation; common description |
| [i] | Numbering of Instances of a module (e.g. ATOM[i] references to instance i of module ATOM) |

GTM Architecture

Overview

The GTM-IP forms a generic timer platform that serves different application domains and different classes within these application domains. In this section the GTM-IP_103 realization is outlined. The architecture of the GTM-IP_103 is depicted in FIG. 1. Please note, that the size of the sub modules in the figure does not reflect the die size of the modules in the final RTL implementation.

GTM Architecture Block Diagram

See FIG. 1.

The central component of the GTM-IP is the Advanced Routing Unit (ARU) where most of the sub modules are located around and connected to. This ARU forms together with the Broadcast (BRC) and the Parameter Storage Module (PSM) the infrastructural part of the GTM. The ARU is able to route data from a connected source sub module to a connected destination sub module. The routing is done in a deterministic manner with a round-robin scheduling scheme of connected channels which receive data from ARU and with a worst case round-trip time.

The routed data word size of the ARU is 53 bit. The data word can logically be split into three parts. These parts are shown in FIG. 1. Bits 0 to 23 and bits 24 to 47 typically hold data for the operation registers of the GTM-IP. This can be for example the duty cycle and period duration of a measured PWM input signal or the output characteristic of an output PWM to be generated. Another possible content of Data0 and Data1 can be two 24 bit values of the GTM-IP time bases TBU_TS0, TBU_TS1 and TBU_TS2. Bits 48 to 52 can contain control bits to send control information from one sub module to another. These ARU Control Bits (ACB) can have a different meaning for different sub modules.

It is also possible to route data from a source to a destination and the destination can act later on as source for another destination. These routes through the GTM-IP are further on called data streams. For a detailed description of the ARU sub module please refer to chapter 0.

ARU Data Word Description

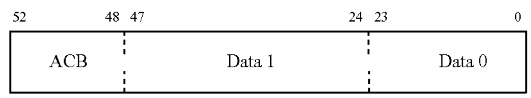

The BRC is able to distribute data from one source module to more than one destination modules connected to the ARU. The PSM sub module consists of three subunits, the AEI-to-FIFO Data Interface (AFD), FIFO-to-ARU Interface (F2A) and the FIFO itself. The PSM can serve as a data storage for incoming data characteristics or as parameter storage for outgoing data. This data is stored in a RAM that is logically located inside the FIFO subunit, but physically the RAM is implemented and integrated by the silicon vendor with his RAM implementation technology. Therefore, the GTM-IP provides the interface to the RAM at its module boundary. The AFD subunit is the interface between the FIFO and the GTM SoC system bus interface AEI (please see section 0 for detailed discussion). The F2A subunit is the interface between the FIFO subunit and the ARU.

Signals are transferred into the GTM-IP at the Timer Input Modules (TIM). These modules are able to filter the input signals and annotate additional information. Each channel is for example able to measure pulse high or low times and the period of a PWM signal in parallel and route the values to ARU for further processing. The internal operation registers of the TIM sub module are 24 bits wide.

The Clock Management Unit (CMU) serves up to 13 different clocks for the GTM and up to three external clock pins GTM_ECLK0 . . . 2. It acts as a clock divider for the system clock. The counters implemented inside other sub modules are typically driven from this sub module. Please note, that the CMU clocks are implemented as enable signals for the counters while the whole system runs with the GTM global clock SYS_CLK. This global clock typically corresponds to the microcontroller bus clock the GTM-IP is connected to and should not exceed 100 MHz because of the power dissipation of the used transistors where the GTM is implemented with.

The TBU provides three independent common time bases for the GTM-IP_103. In general, the number of time bases depends on the implemented device. If three time bases are implemented, two of these time bases can also be clocked with the digital PLL (DPLL) sub_inc1c and sub_inc2c outputs. The DPLL generates the higher frequent clock signals sub_inc1, sub_inc2, sub_inc1c and sub_inc2c on behalf of the frequencies of up to two input signals. These two input signals can be selected out of six incoming signals from the TIM0 sub module. In this sub module the incoming signals are filtered and transferred to the MAP sub module where two of these six signals are selected for further processing inside the DPLL.

Signal outputs are generated with the Timer Output Modules (TOM) and the ARU-connected TOMs (ATOM). Each TOM channel is able to generate a PWM signal at its output. Because of the integrated shadow register even the generation of complex PWM outputs is possible with the TOM channels by serving the parameters with the CPU. In addition each TOM sub module can integrate functions to drive one BLDC engine. This BLDC support is established together with the TIM and Sensor Pattern Evaluation (SPE) sub module.

The ATOMs offer the additional functionality to generate complex output signals without CPU interaction by serving these complex waveform characteristics by other sub modules that are connected to the ARU like the PSM or Multi Channel Sequencer (MCS). While the internal operation and shadow registers of the TOM channels are 16 bit wide, the operation and shadow registers of the ATOM channels are 24 bit wide to have a higher resolution and to have the opportunity to compare against time base values coming from the TBU.

Together with the MCS the ATOM is able to generate an arbitrary predefined output sequence at the GTM-IP output pins. The output sequence is defined by instructions located in RAM connected to the MCS sub module. The instructions define the points were an output signal should change or to react on other signal inputs. The output points can be one or two time stamps (or even angle stamp in case of an engine management system) provided by the TBU. Since the MCS is able to read data from the ARU it is also able to operate on incoming data routed from the TIM. Additionally, the MCS can process data that is located in its connected RAMs. Like in the PSM the MCS RAM is located logically inside the MCS while the silicon vendor has to implement its own RAM technology there.

The two modules Compare Module (CMP) and Monitor Module (MON) implement safety related features. The CMP compares two output channels of an ATOM or TOM and sends the result to the MON sub module were the error is signalled to the CPU. The MON module is also able to monitor the ARU and CMU activities.

In the described implementation the sub modules of the GTM-IP have about 1000 different interrupt sources. These 1000 interrupt sources are grouped and concentrated by the Interrupt Concentrator Module (ICM) to form approx. 100 interrupts that are visible outside of the GTM-IP.

GTM-IP Interfaces

In general the GTM-IP can be divided into four interface groups. Two interface groups represent the ports of the GTM-IP where incoming signals are assembled and outgoing signals are created. These interfaces are therefore connected to the GTM-IP input sub module TIM and to the GTM-IP output sub modules TOM and ATOM. Another interface is the bus interface where the GTM-IP can be connected to the SoC system bus. This generic bus interface is described in more detail in section 0. The last interface is the interrupt controller interface. The GTM-IP provides several interrupt lines coming from the various sub modules. These interrupt lines are concentrated inside the ICM and have to be adapted to the dedicated microcontroller environment where each interrupt handling can look different. The interrupt concept is described in more detail in section 0.

GTM-IP Generic Bus Interface (AEI)

The GTM-IP is equipped with a generic bus interface that can be widely adapted to different SoC bus systems. This generic bus interface is called AE-Interface (AEI). The adaptation of the AEI to SoC buses is typically done with a bridge module translating the AEI signals to the SoC bus signals of the silicon vendor. The AEI bus signals are depicted in the following table:

| Signal name | I/O | Description | Bit width |
|---|---|---|---|
| AEI_SEL | I | GTM-IP select line | 1 |
| AEI_ADDR | I | GTM-IP address | 32 |
| AEI_PIPE | I | AEI Address phase signal | 1 |
| AEI_W1R0 | I | Read/Write access | 1 |
| AEI_WDATA | I | Write data bus | 32 |
| AEI_RDATA | O | Read data bus | 32 |
| AEI_READY | O | Data ready signal | 1 |
| AEI_STATUS | O | AEI Access status | 2 |

GTM-IP Multi-Master and Multi-Tasking Support

To support multi-master and multi-task access to the registers of the GTM-IP a dedicated write-access scheme is used for critical control bits inside the IP that need such a mechanism. This can be for example a shared register where more than one channel can be controlled globally by one register write access. Such register bits are implemented inside the GTM-IP with a double bit mechanism, where the writing of ‘00’ and ‘11’ has no effect on the register bit and where ‘01’ sets the bit and ‘10’ resets the bit. If the CPU wants to read the status of the bit it always gets a ‘00’ if the bit is reset and it gets a ‘11’ if the bit is set.

ARU Routing Concept

One central concept of the GTM-IP is the routing mechanism of the ARU sub module for data streams. Each data word transferred between the ARU and its connected sub module is 53 bit wide. It is important to understand this concept in order to use the resources of the GTM-IP effectively. Each module that is connected to the ARU may provide an arbitrary number of ARU write channels and an arbitrary number of ARU read channels. In the following, the ARU write channels are named data sources and the ARU read channels are named data destinations.

Figure 2:
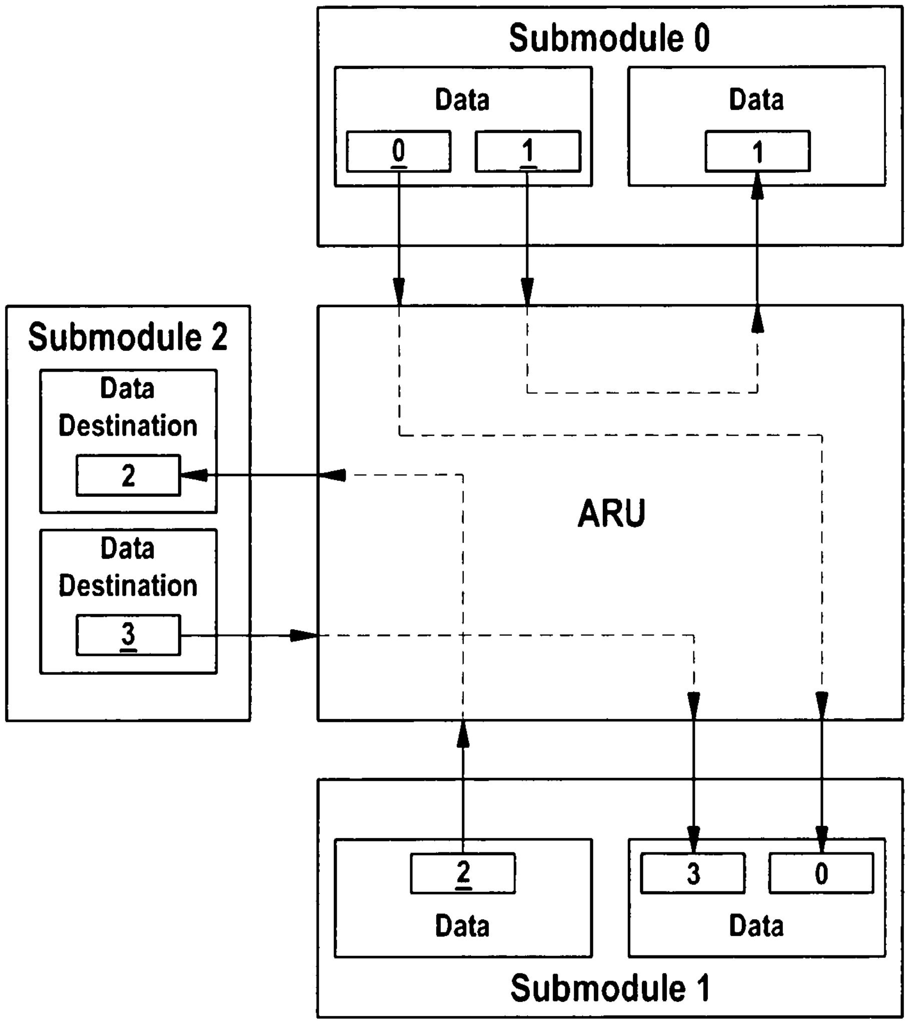

The concept of the ARU intends to provide a flexible and resource efficient way for connecting any data source to an arbitrary data destination. In order to save resource costs, the ARU does not implement a switch matrix, but it implements a data router with serialized connectivity providing the same interconnection flexibility. FIG. 2 shows the ARU data routing principle. Data sources are marked with underlined numbers in the rectangles and the data destinations are marked with not-underlined numbers in the rectangles. The dashed lines in the ARU depict the configurable connections between data sources and data destinations. A connection between a data source and a data destination is also called a data stream.

Principle of Data Routing Using ARU

See FIG. 2.

The configuration of the data streams is realized according to the following manner: Each data source has its fixed and unique source address: The fixed address of each data source is pointed out by the underlined numbers in the boxes of FIG. 2. The address definitions of all available data sources in the GTM-IP can be obtained from the table. The connection from a specific data source to a specific data destination is defined by configuring the corresponding address of a data source in the desired data destination. The configured address of each data destination is pointed out by the not-underlined numbers in the boxes of FIG. 2.

Normally, the destination is idle and waits for data from the source. If the source offers new data, the destination does a destructive read, processes the data and goes idle again. The same data is never read twice.

There is one sub module for which this destructive read access does not hold. This is the BRC sub module configured in Maximal Throughput Mode. For a detailed description of this module please refer to chapter 0.

The functionality of the ARU is as follows: The ARU sequentially polls the data destinations of the connected modules in a round-robin order. If a data destination requests new data from its configured data source and the data source has data available, the ARU delivers the data to the destination and it informs both, the data source and destination that the data is transferred. The data source marks the delivered ARU data as invalid which means that the destination consumed the data. It should be noted that each data source should only be connected to a single data destination. This is because the destinations consume the data. If two destinations would reference the same source one destination would consume the data before the other destination could consume it. Since the data transfers are blocking, the second destination would block until it receives new data from the source. If a data source should be connected to more than one data destination the sub module Broadcast (BRC) has to be used. On the other hand, the transfer from a data source to the ARU is also blocking, which means that the source channel can only provide new data to the ARU when an old data word is consumed by a destination. In order to speed up the process of data transfers, the ARU handles two different data destinations in parallel. Therefore, a transfer between source and destination takes two cycles, but since the transfers are pipelined these two cycles have only effect for one round trip of the ARU.

Following table gives an overview about the number of channels for the GTM-IP_103 variant described within this document.

| Sub module | Number of data sources | Number of data destinations |
|---|---|---|
| ARU | 1 | 0 |
| DPLL | 24 | 24 |
| TIM 0-3 | 32 | 0 |
| MCS 0-3 | 72 | 72 |
| BRC | 22 | 12 |
| TOM | 0 | 0 |
| ATOM 0-4 | 40 | 40 |
| PSM 0 | 8 | 8 |
| CMP | 0 | 0 |
| MON | 0 | 0 |
| Total | 199 | 156 |

ARU Round Trip Time

The ARU uses a round-robin arbitration scheme with a fixed round trip time for all connected data destinations. This means that the time between two adjacent read requests resulting from a data destination channel always takes the round trip time, independently if the read request succeeds or fails.

The worst case round-trip time is defined as 2 us at 40 MHz of the GTM-IP input system clock SYS_CLK. Since the round-trip time depends on the number of destinations the ARU has to ensure that the round-trip time never exceeds the 2 us at a clock speed equal or higher than 40 MHz.

ARU Blocking Mechanism

Figure 3:
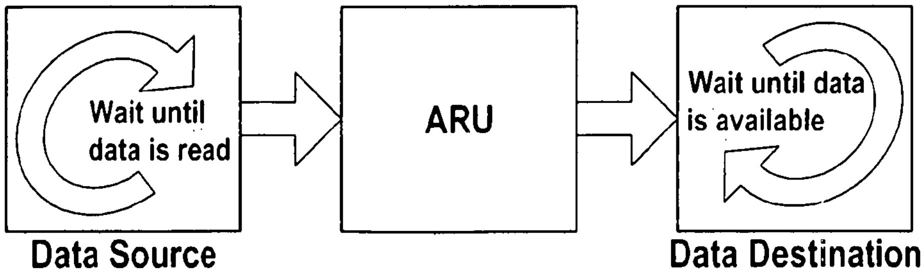

Another important concept of the ARU is its blocking mechanism that is implemented for transferring data from a data source to a data destination. This mechanism is used by ARU connected sub modules to synchronize the sub modules to the routed data streams. FIG. 3 explains the blocking mechanism.

Graphical Representation of ARU Blocking Mechanism

See FIG. 3.

If a data destination requests data from a data source over the ARU but the data source does not have any data yet, it has to wait until the data source provides new data. In this case the sub module that owns the data destination may perform other tasks. When a data source produces new data faster than a data destination can consume the data the source raises an error interrupt and signals that the data could not be delivered in time. The new data is marked as valid for further transfers and the old data is overwritten.

In any case, if sources and destinations block or not, the round trip time for the ARU is always fixed.

One exception is the BRC sub module when configured in Maximal Throughput Mode. Please refer to chapter 0 for a detailed description.

GTM-IP Clock and Time Base Management (CTBM)

Figure 4:
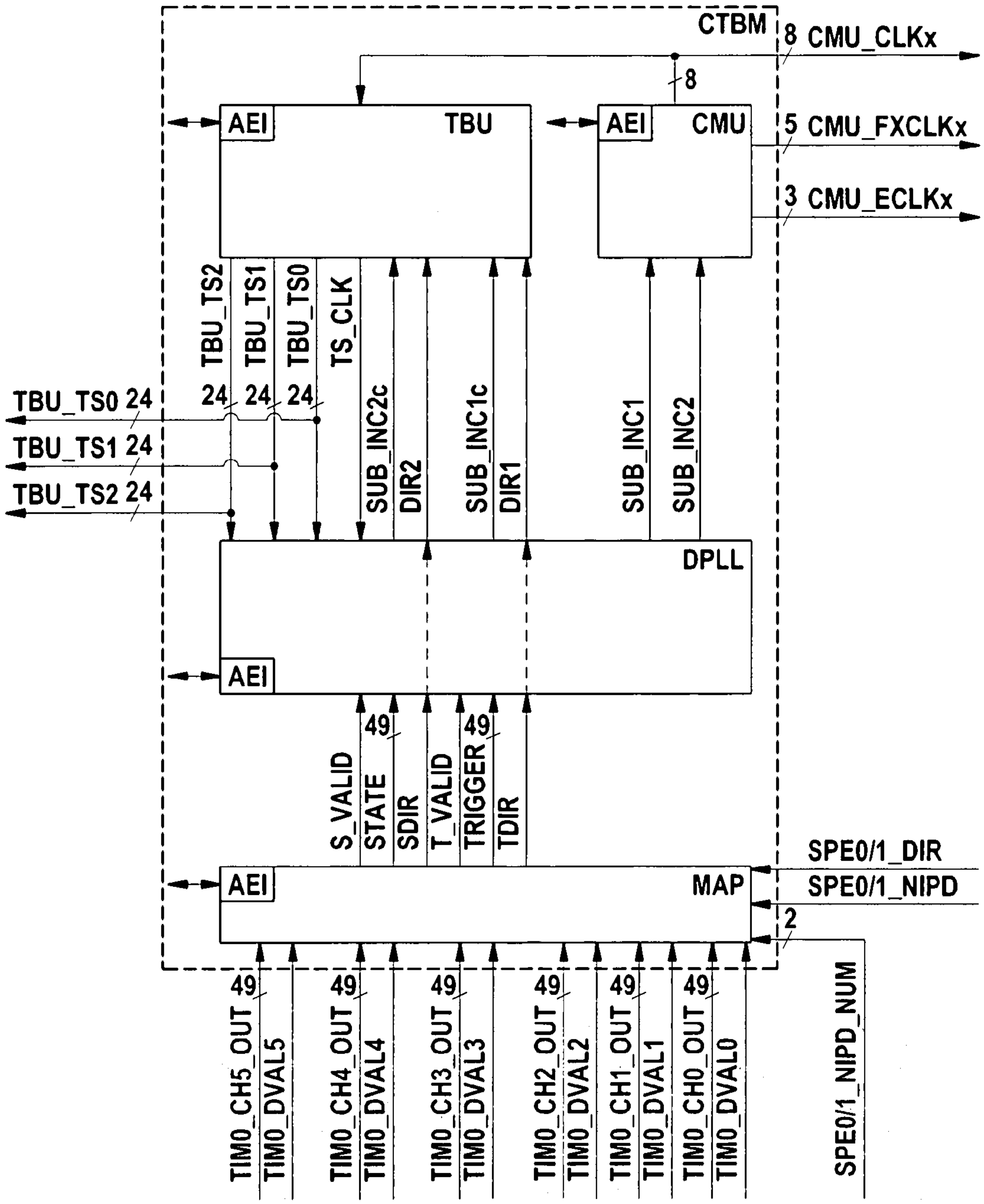

Inside the GTM-IP several subunits are involved in the clock and time base management of the whole GTM. FIG. 4 shows the connections and sub blocks involved in these tasks. The sub blocks involved are called Clock and Time Base Management (CTBM) modules further on.

GTM-IP Clock and Time Base Management Architecture

See FIG. 4.

One important module of the CTBM is the Clock Management Unit (CMU) which generates 13 clocks for the sub modules of the GTM and up to three GTM external clocks CMU_ECLK[z] (z: 0.2). For a detailed description of the CMU functionality and clocks please refer to Chapter 0.

The five (5) CMU_FXCLK[y] (y: 0 . . . 4) clocks are used by the TOM sub module for PWM generation. The eight (8) CMU_CLK[x] (x: 0 . . . 7) clocks are used by other sub modules of the GTM for signal generation.

Inside the Time Base Unit (TBU) one of these eight clocks is used per channel to generate a common time base for the GTM. Besides the CMU_CLK[x] signals, the TBU can use the compensated SUB_INC[i]c (i: 1,2) signals coming from the DPLL sub module for time base generation. This time base then typically represents an angle clock for an engine management system. For the meaning of compensated (SUB_INC[i]c) and uncompensated (SUB_INC[i]) DPLL signals please refer to the DPLL chapter 0. The SUB_INC[i]c signals in combination with the two direction signal lines DIR[i] the TBU time base can be controlled to run forwards or backwards. The TBU functionality is described in Chapter 0.

In this device the TBU sub module generates the three time base signals TBU_TS0, TBU_TS1 and TBU_TS2 which are widely used inside the GTM as common time bases for signal characterization and generation.

As stated before, the DPLL sub module provides the four clock signals SUB_INC[i] and SUB_INC[i]c which can be seen as a clock multiplier generated out of the two input signal vectors TRIGGER and STATE coming from the MAP sub module. For a detailed description of the DPLL functionality please refer to chapter 0.

The MAP sub module is used to select the TRIGGER and STATE signals for the DPLL out of six input signals coming from TIM0 sub module. Besides this, the MAP sub module is able to generate a TDIR (TRIGGER Direction) and SDIR (STATE Direction) signal for the DPLL and TBU coming from the SPE0 and SPE1 signal lines. The direction signals are generated out of a defined input pattern. For a detailed description of the MAP sub module please refer to section 0.

GTM-IP Interrupt Concept

The sub modules of the GTM-IP can generate thousands of interrupts on behalf of internal events. This high amount of interrupt lines is combined inside the Interrupt Concentrator Module (ICM) into interrupt groups. In this interrupt groups the GTM-IP sub module interrupt signals are bundled to a smaller set of interrupts. Out of these interrupt sets a smaller amount of interrupt lines is created and signalled outside of the GTM-IP.

Figure 5:
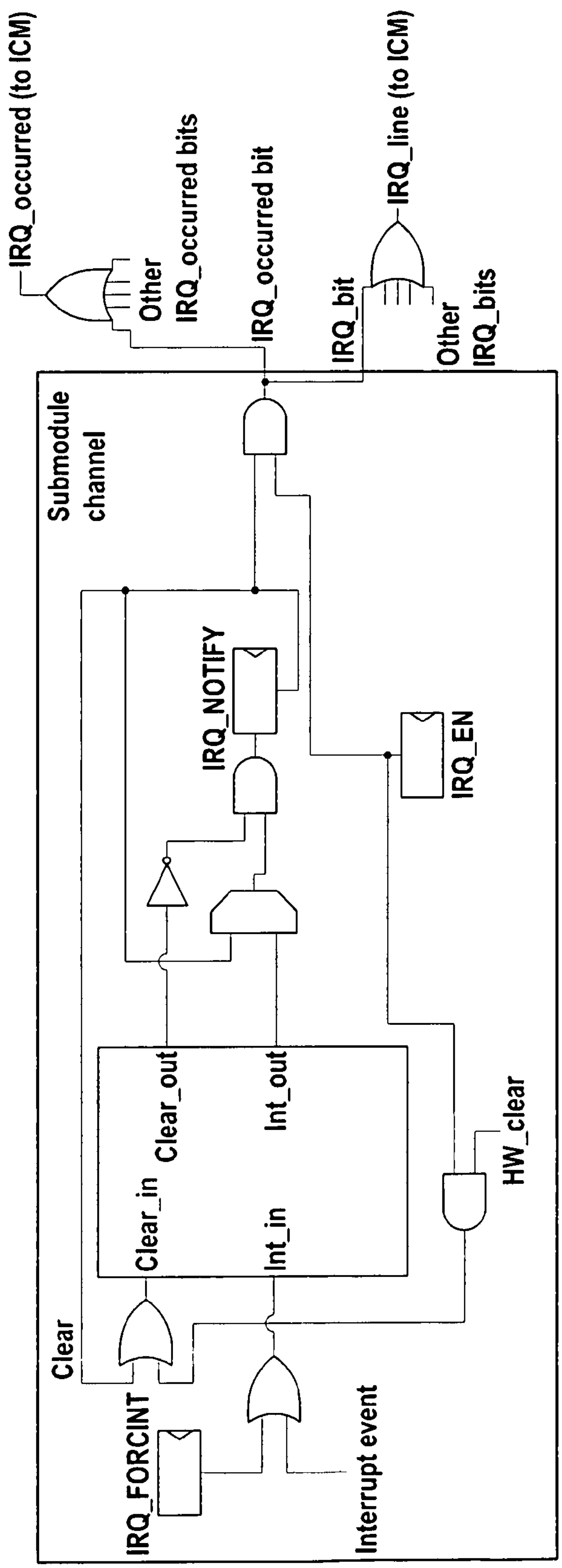

The enabling, disabling and detailed identification of the interrupt source is done inside the sub modules and their channels. If a sub module consists of several channels that are most likely to work independent from each other each channel has its own interrupt control register set. The GTM-IP interrupt concept is shown in FIG. 5.

The interrupt control register set consists of four registers. One register, IRQ_EN, is used for enabling and disabling each individual interrupt and a second register, IRQ_NOTIFY, is for interrupt source identification purposes. There, each interrupt line has a dedicated bit, which is set when the interrupt was raised. The third register FORCINT inside each sub module channel can be used to trigger an interrupt by software. This trigger is or-combined with the hardware interrupt event and is visible also inside the IRQ_NOTIFY register bit. The last register, IRQ_MODE, determines the interrupt signal output characteristic and GTM internal interrupt bit control.

In any case, the interrupt has to be enabled if the interrupt should be visible outside of the GTM. Thus, the IRQ_NOTIFY register bit can be used by the software to poll for the interrupt request. Interrupt request bits written to FORCINT always result in a setting of the corresponding IRQ_NOTIFY bit and are reset by the hardware immediately after IRQ_NOTIFY is set. Therefore, a read to register FORCINT always results in reading a ‘0’.

The interrupt bit inside the IRQ_NOTIFY register is set as long as the Clear line (see FIG. 5) is not raised. This can be done by writing explicitly a ‘1’ to the IRQ_NOTIFY register bit. Thus, the interrupt bit is not altered especially when a software debugger reads the register for debugging purposes. In the case of a simultaneous clear and interrupt event from the channel hardware the channel hardware interrupt will be dominant.

The behaviour of notify clear is shown in the following table:

| int_in | clear_in | int_out | clear_out |
|---|---|---|---|
| 0 | 0 | 0 | 0 |
| 0 | 1 | 0 | 1 |
| 1 | 0 | 1 | 0 |
| 1 | 1 | 1 | 0 |

To support a wide variety of microcontroller architectures and interrupt systems the GTM-IP offers a configurable interrupt signal output characteristic and internal interrupt bit handling specified by the IRQ_MODE register on a per channel basis. These four interrupt modes are:

Level mode

Pulse mode

Pulse-Notify mode

Single-Pulse mode

These interrupt modes are described in more details in the following sections:

Level Interrupt Mode

The default interrupt generation mode is the Level Interrupt Mode. In this mode a channel interrupt sets the output high if the interrupt is enabled and the hardware interrupt or a force event occurred. The interrupt generation mechanism is shown in FIG. 5.

Level Interrupt Mode Scheme

See FIG. 5.

As it can be seen from the figure the interrupt once raised by the hardware or the IRQ_FORCINT register is held until the IRQ_NOTIFY register is cleared by an explicit write access from the CPU or an internal hardware signal. The internal clearing mechanism is described later on. The IRQ_occurred line is used for the STATUS flag of the ICM.

Pulse Interrupt Mode

In Pulse Interrupt Mode each occurrence of an interrupt event will generate a pulse on the IRQ_bit signal line if IRQ_EN is enabled. The Pulse interrupt mode behaviour can be seen from FIG. 6.

Pulse Interrupt Mode Scheme

Figure 6:
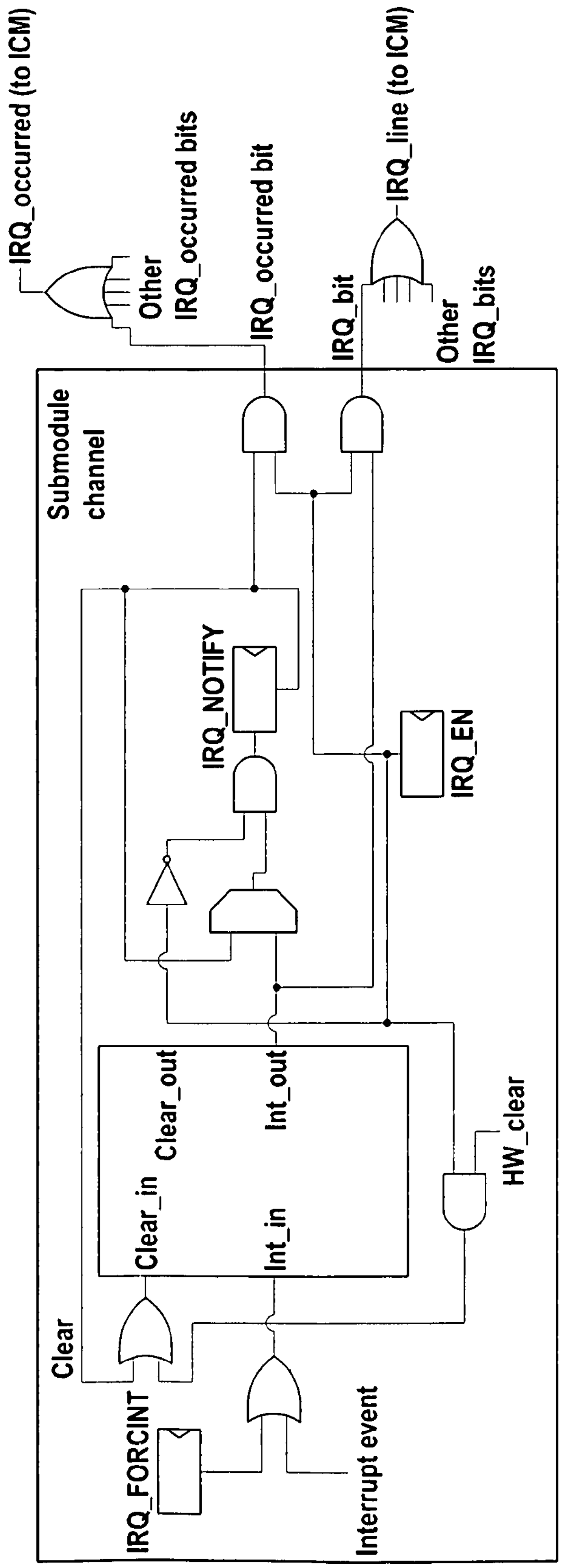

See FIG. 6.

As it can be seen from the figure, IRQ_NOTIFY register is always cleared if IRQ_EN is enabled. The IRQ_occurred signal line will be permanently low in this mode.

Pulse-Notify Interrupt Mode

In Pulse-notify Interrupt mode, the active interrupt sources are registered in the IRQ_NOTIFY register. Each occurrence of an interrupt event will generate a pulse on the IRQ_bit signal line, when the IRQ_EN register is enabled. The IRQ_occurred will be high if interrupt IRQ_EN is high a the IRQ_NOTIFY register bit is set. The Pulse-notify interrupt mode is shown in FIG. 7.

Pulse-notify Interrupt Mode Scheme

Figure 7:
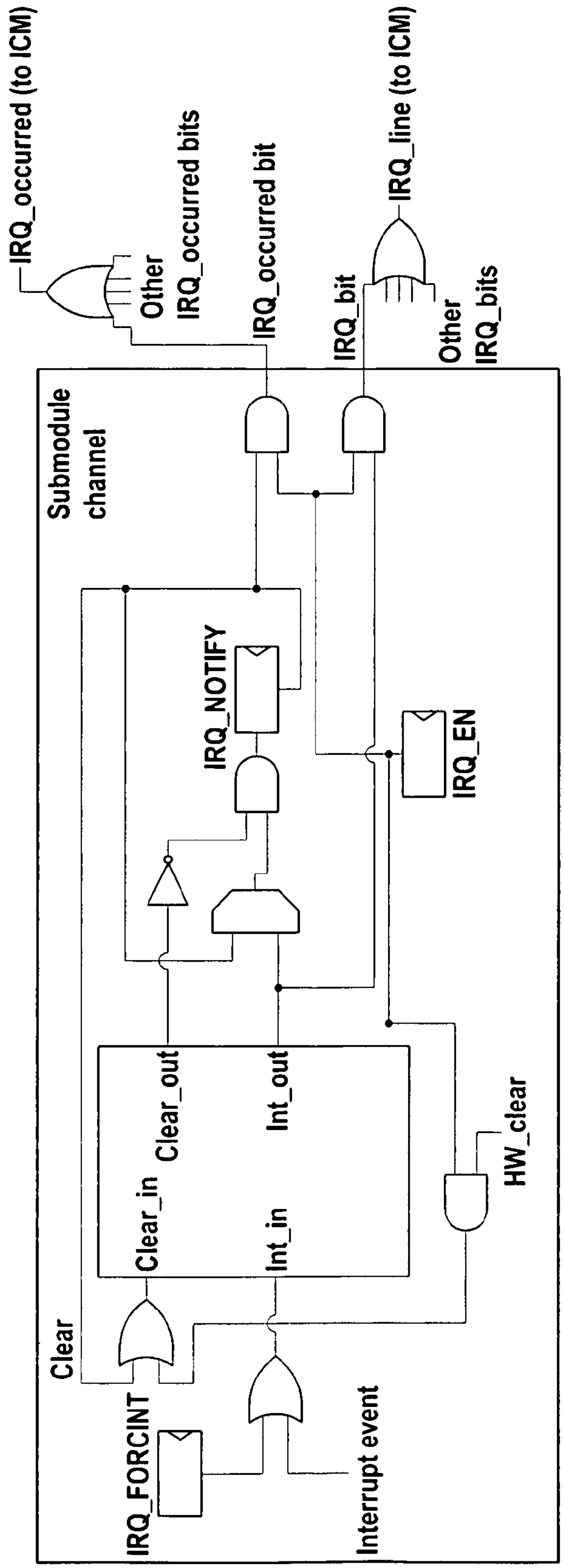

See FIG. 7.

Single-pulse Interrupt Mode

In Single-pulse Interrupt Mode, additional pulses triggered by interrupt events of any interrupt source are suppressed. The active interrupt sources are registered in the corresponding IRQ_NOTIFY register bit. The IRQ_occurred signal line will be high, if the IRQ_EN and the IRQ_NOTIFY register bits are set. The Single-pulse interrupt mode is shown in FIG. 8.

Single-pulse Interrupt Mode Scheme

Figure 8:
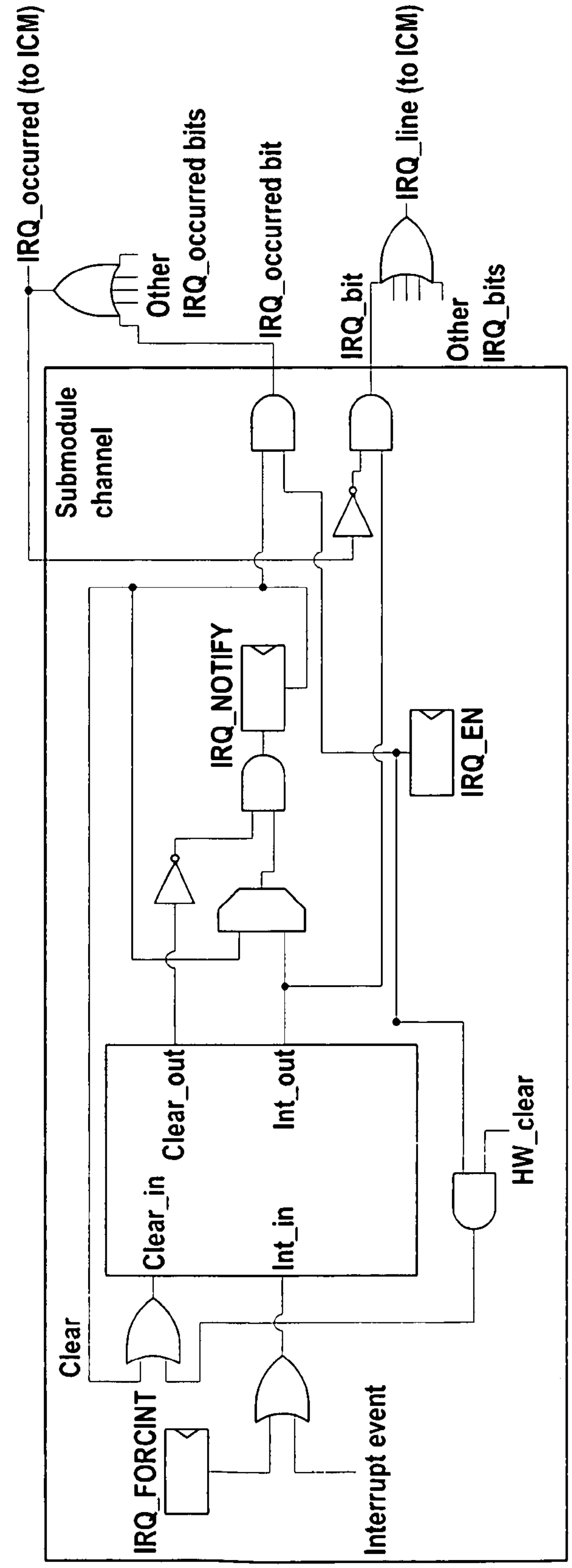

See FIG. 8.

GTM-IP Interrupt Concept with Hardware Clear

The GTM-IP supports HW_clear input lines (GTM_<MOD>_JRQ_CLR) to support a hardware internal clearing of the IRQ_NOTIFY bits. This input line can be used by the surrounding microcontroller system to:

from DMA controller as DMA_ACK from ADC as ADC_VALID from an GTM-external interrupt controller to do an atomic clear while entering an ISR routine GTM-IP Interrupt Concentration Method Because of the grouping of interrupts inside the ICM, it can be necessary for the software to access the ICM sub module first to determine the sub module channel that is responsible for an interrupt. A second access to the sub module channel interrupt registers is then necessary to identify the interrupt, serve it and to reset the interrupt flag afterwards. The interrupt flags are never reset by an access to the ICM.

GTM-IP Software Debugger Support

For software debugger support the GTM-IP comes with several features. E.g. status register bits must not be altered by a read access from a software debugger. To avoid this behaviour to reset a status register bit by software, the CPU has to write a '1' explicitly to the register bit to reset its content.

Further on, some important states inside the GTM-IP sub module have to be signalled to the outside world, when reached and should for example trigger the software debugger to stop program execution. For this internal state signalling please refer to the GTM-IP module integration guide.

GTM-IP TOP-Level Configuration Registers Overview

GTM-IP TOP-level contains following configuration registers:

| Register name | Description | Details in Section |
|---|---|---|
| GTM_REV | GTM-IP Version control register | 0 |
| GTM_RST | GTM-IP Global reset register | 0 |
| GTM_CTRL | GTM-IP Global control register | 0 |
| GTM_AEI_ADDR_XPT | GTM-IP AEI Timeout exception address register | 0 |
| GTM_IRQ_NOTIFY | GTM-IP Interrupt notification register | 0 |
| GTM_IRQ_EN | GTM-IP Interrupt enable register | 0 |
| GTM_IRQ_FORCINT | GTM-IP Software interrupt generation register | 0 |
| GTM_IRQ_MODE | GTM-IP top level interrupts mode selection. Please note that this mode selection is only valid for the three interrupts described in section 0 | 0 |

GTM-IP TOP-Level Configuration Registers Description

Register GTM_REV

| Address | 0 × 00 | Initial Value: 0 × 1031_0010 |
|---|---|---|
| Offset: | 31 30 29 28 27 26 25 24 23 22 21 20 19 18 17 16 | 15 14 13 12 11 10 9 8 7 6 5 4 3 2 1 0 |

| | 31:28 | 27:24 | 23:20 | 19:16 | 15:12 | 11:8 | 7:0 |
|---|---|---|---|---|---|---|---|
| Bit | DEV_CODE2 | DEV_CODE1 | DEV_CODE0 | MAJOR | MINOR | NO | YEAR |
| Mode | R | R | R | R | R | R | R |
| Initial Value | 0 × 1 | 0 × 0 | 0 × 3 | 0 × 1 | 0 × 0 | 0 × 0 | 0 × 10 |

Bit 7:0 YEAR: GTM-IP Year of development.

Bit 11:8 NO: Define delivery number.

Bit 15:12 MINOR: Define minor version number of implementation.

Bit 19:16 MAJOR: Define major version number of implementation.

Bit 23:20 DEV_CODE0: Device encoding digit 0.

Bit 27:24 DEV_CODE1: Device encoding digit 1.

Bit 31:28 DEV_CODE2: Device encoding digit 2.

Note:

The numbers are encoded in BCD.

Register GTM_RST

| Address | 0 × 04 | Initial Value: 0 × 0000_0000 |
|---|---|---|
| Offset: | 31 30 29 28 27 26 25 24 23 22 21 20 19 18 17 16 | 15 14 13 12 11 10 9 8 7 6 5 4 3 2 1 0 |

| | 31:1 | 0 |
|---|---|---|
| Bit | RESERVED | RST |
| Mode | R | RAw |
| Initial Value | 0 × 000000 | 0 |

Bit 0 RST: GTM-IP Reset.

0 = No reset action

1 = Initiate reset action for all sub modules

Note:

This bit is automatically cleared by hardware after it was written. Therefore, the register is always read as zero (0) by the software.

Bit 31:1 Reserved: Read as zero, should be written as zero.

| Register GTM_CTRL | | | |
|---|---|---|---|
| Address | 0 × 08 | | Initial Value: 0 × 0000_0000 |
| Offset: | 31 30 29 28 27 26 25 24 23 22 21 20 19 18 17 16 15 14 13 12 11 10 9 | | |
| Bit | RESERVED | | |
| Mode | R | | |
| Initial Value | 0 × 000000 | | |

| | Initial Value: 0 × 0000_0000 | | | | |
|---|---|---|---|---|---|
| Address | | | | | |
| Offset: | 8 7 6 5 4 | 3 2 | 1 | 0 |
| Bit | TO_VAL | RESERVED | TO_MODE | RF_PROT |
| Mode | RW | R | RW | RW |
| Initial Value | 00000 | 00 | 0 | 0 |

Bit 0 RF_ PROT: RST and FORCINT protection.
0 = RST (global) and SW interrupt FORCINT functionality is enabled
1 = RST (global) and SW interrupt FORCINT functionality is disabled
Bit 1 TO_MODE: AEI Timeout mode.
0 = Observe: If timeout_counter = 0 the address and rw signal in addition with timeout flag will be stored to the GTM_AEI_ADDR_XPT register. Following timeout_counter= 0 accesses will not overwrite the first entry in the aei_addr_timeout register. Clearing the timeout flag/aei_status error_code will reenable the storing of a next faulty access.
1 = Abort: In addition to observe mode the pending access will be aborted by signalling an illegal module access on aei_status and sending ready. In case of a read deliver as data 0 by serving of next AEI accesses.
Bit 3:2 Reserved: Read as zero, should be written as zero.
Bit 8:4 TO_VAL: AEI Timeout value.
Note:
These bits define the number of cycles after which a timeout event occurs. When TO_VAL equals zero (0) the AEI timeout functionality is disabled.
Bit 31:9 Reserved: Read as zero, should be written as zero.

| Register GTM_AEI_ADDR_XPT | | |
|---|---|---|
| Address | 0 × 0C | Initial Value: 0 × 0000_0000 |
| Offset: | 31 30 29 28 27 26 25 24 23 22 21 20 19 18 17 | 16 15 14 13 12 11 10 9 8 7 6 5 4 3 2 1 0 |
| Bit | RESERVED | TO_ADDR |
| Mode | R | R |
| Initial Value | 0 × 0000 | 0 × 00000 |

Bit 16:0 TO_ADDR: AEI Timeout address.
Note:
This bit field defines the AEI address for which the AEI timeout event occurred.
Bit 31:17 Reserved: Read as zero, should be written as zero.

| Register GTM_IRQ_NOTIFY | |
|---|---|
| Address | 0 × 10 |
| Offset: | 31 30 29 28 27 26 25 24 23 22 21 20 19 18 17 16 |
| Bit | RESERVED |
| Mode | R |
| Initial Value | 0 × 00000000 |

| | Initial Value: 0 × 0000_0000 | | | |
|---|---|---|---|---|
| Address | | | | |
| Offset: | 15 14 13 12 11 10 9 8 7 6 5 4 3 | 2 | 1 | 0 |
| Bit | RESERVED | AEI_ IM_ADDR | AEI_ USP_ADDR | AEI_ TO_XPT |

-continued

| Register GTM_IRQ_NOTIFY | | | | |
|---|---|---|---|---|
| Mode | R | RCw | RCw | RCw |
| Initial Value | 0 × 00000000 | 0 | 0 | 0 |

Bit 0 AEI_TO_XPT: AEI Timeout exception occurred.
0 = No interrupt occurred
1 = AEI_TO_XPT interrupt was raised by the AEI Timeout detection unit
Note:
This bit will be cleared on a CPU write access of value ‘1’. A read access leaves the bit unchanged.
Bit 1 AEI_USP_ADDR: AEI Unsupported address interrupt.
0 = No interrupt occurred
1 = AEI_USP_ADDR interrupt was raised by the AEI interface
Note:
This bit will be cleared on a CPU write access of value ‘1’. A read access leaves the bit unchanged.
Bit 2 AEI_IM_ADDR: AEI Illegal Module address interrupt.
0 = No interrupt occurred
1 = AEI_IM_ADDR interrupt was raised by the AEI interface
Note:
This bit will be cleared on a CPU write access of value ‘1’. A read access leaves the bit unchanged.
Bit 31:3 Reserved: Read as zero, should be written as zero.

Register GTM_IRQ_EN

| | Address Offset: 0 × 14 | Initial Value: 0 × 0000_0000 |
|---|---|---|
| | 31 30 29 28 27 26 25 24 23 22 21 20 19 18 17 16 | 15 14 13 12 11 10 9 8 7 6 5 4 3 |
| Bit | Reserved | |
| Mode | R | |
| Initial Value | 0 × 00000000 | |

| | Initial Value: 0 × 0000_0000 | | |
|---|---|---|---|
| | 2 | 1 | 0 |
| Bit | AEI_IM_ADDR_IRQ_EN | AEI_USP_ADDR_IRQ_EN | AEI_TO_XPT_IRQ_EN: |
| Mode | RW | RW | RW |
| Initial Value | 0 | 0 | 0 |

Bit 0 AEI_TO_XPT_IRQ_EN: AEI_TO_XPT _IRQ interrupt enable.
0 = Disable interrupt, interrupt is not visible outside GTM-IP
1 = Enable interrupt, interrupt is visible outside GTM-IP
Bit 1 AEI_USP_ADDR_IRQ_EN: AEI_USP_ADDR_IRQ interrupt enable.
0 = Disable interrupt, interrupt is not visible outside GTM-IP
1 = Enable interrupt, interrupt is visible outside GTM-IP
Bit 2 AEI_IM _ADDR_IRQ_EN: AEI_IM_ADDR_IRQ interrupt enable.
0 = Disable interrupt, interrupt is not visible outside GTM-IP
1 = Enable interrupt, interrupt is visible outside GTM-IP
Bit 31:3 Reserved: Read as zero, should be written as zero.

Register GTM_IRQ_FORCINT

| | Address Offset: 0 × 18 | Initial Value: 0 × 0000_0000 |
|---|---|---|
| | 31 30 29 28 27 26 25 24 23 22 21 20 19 18 17 16 | 15 14 13 12 11 10 9 8 7 6 5 4 3 |
| Bit | Reserved | |
| Mode | R | |
| Initial Value | 0 × 00000000 | |

| | Initial Value: 0 × 0000_0000 | | |
|---|---|---|---|
| | 2 | 1 | 0 |
| Bit | TRG_AEI_IM_ADDR | TRG_AEI_USP_ADDR | TRG_AEI_TO_XPT |
| Mode | RAw | RAw | RAw |

-continued

| Register GTM_IRQ_FORCINT | | | |
|---|---|---|---|
| Initial Value | 0 | 0 | 0 |

Bit 0 TRG_AEI_TO_XPT: Trigger AEI_TO_XPT_IRQ interrupt by software.
0 = No interrupt triggering
1 = Assert AEI_TO_XPT_IRQ interrupt for one clock cycle
Note: This bit is cleared automatically after write.
Bit 1 TRG_AEI_USP_ADDR: Trigger AEI_USP_ADDR_IRQ interrupt by software.
0 = No interrupt triggering
1 = Assert AEI_USP_ADDR_IRQ interrupt for one clock cycle
Note: This bit is cleared automatically after write.
Bit 2 TRG_AEI_IM_ADDR: Trigger AEI_IM_ADDR_IRQ interrupt by software.
0 = No interrupt triggering
1 = Assert AEI_IM_ADDR_IRQ interrupt for one clock cycle
Note: This bit is cleared automatically after write.
Bit 31:3 Reserved: Read as zero, should be written as zero.

| Register GTM_IRQ_MODE | | |
|---|---|---|
| | Address Offset: 0 × 1C | Initial Value: 0 × 0000_0000 |
| | 31 30 29 28 27 26 25 24 23 22 21 20 19 18 17 16 15 14 13 12 11 10 9 8 7 6 5 4 3 2 | 1 0 |
| Bit | Reserved | IRQ_MODE |
| Mode | R | RW |
| Initial Value | 0 × 00000000 | 00 |

Bit 1:0 IRQ_MODE: Interrupt strategy mode selection for the AEI timeout and address monitoring interrupts.
00 = Level mode
01 = Pulse mode
10 = Pulse-Notify mode
11 = Single-Pulse mode
Note: The interrupt modes are described in section 0.
Bit 31:2 Reserved: Read as zero, should be written as zero.

Advanced Routing Unit (ARU)

Overview

The Advanced Routing Unit (ARU) is a flexible infrastructure component for transferring 53 bit wide data (five control bits and two 24 bit values) between several sub modules of the GTM core in a configurable manner.

Since the concept of the ARU has already been described in section 0, this section only describes additional ARU features that can be used by the software for configuring and debugging ARU related data streams.

Also the definition of 'streams' and 'channels' in the ARU context is done in section 0.

Special Data Sources

Besides the addresses of the sub module related data sources as described in Table 0, the ARU provides two special data sources that can be used for the configuration of data streams. These data sources are defined as follows:

Address 0x1FF: Data source that provides always a 53 bit data word with zeros. A read access to this memory location will never block a requesting data destination.

Address 0x1FE: Data source that never provides a data word. A read access to this memory location will always block a requesting data destination. This is the reset value of the read registers inside the data destinations.

Address 0x000: This address is reserved and can be used to bring data through the ARU registers ARU_DATA_H and ARU_DATA_L into the system by writing the write address 0x000 into the ARU_ACCESS register. This means that software test data can be brought into the GTM-IP by the CPU.

Besides the data transfer between the connected sub modules, there are two possibilities to access ARU data via the AEI.

ARU Access Via AEI

Default ARU Access

The default ARU access incorporates the registers ARU_ACCESS, which is used for initiation of a read or write request and the registers ARU_DATA_H and ARU_DATA_L that provide the ARU data word to be transferred.

The status of a read or write transfer can be determined by polling specific bits in register ARU_ACCESS. Furthermore the acc_ack bit in the interrupt notify register is set after the read or write access is performed to avoid data loss e.g. on access cancelation.

A pending read or write request may also be cancelled by clearing the associated bit. In the case of a read request, the AEI access behaves as a read request initiated by a data destination of a module. The read request is served by the ARU immediately when no other destination has a pending read request. This means, that an AEI read access does not take part in the scheduling of the destination channels and that the time between two consecutive read accesses is not limited by the round trip time.

On the other hand, the AEI access has the lowest priority behind the ARU scheduler that serves the destination channels. Thus, in worst case, the read request is served after one round trip of the ARU, when all destination channels would request data at the same point in time.

In the case of the write request, the ARU provides the write data at the address defined by the ADDR bit field inside the ARU_ACCESS register.

To avoid data loss, the reserved ARU address 0x0 has to be used to bring data into the system. Otherwise, in case the address specified inside the ADDR bit field is defined for another sub module that acts as a source at the ARU data loss may occur and no deterministic behaviour is guaranteed.

This is because the regular source sub module is not aware that its address is used by the ARU itself to provide data to a destination.

It is guaranteed that the ARU write data is send to the destination in case of both modules want to provide data at the same time.

Configuring both read and write request bits results in a read request. Then the write request bit is cleared automatically.

Debug Access

The debug access mode enables to inspect routed data of configured data streams during runtime.

The ARU provides two independent debug channels, whereas each is configured by a dedicated ARU read address in register ARU_DBG_ACCESS0 and ARU_DBG_ACCESS1 respectively.

The registers ARU_DBG_DATA0_H and ARU_DBG_DATA0_L (ARU_DBG_DATA1_H and ARU_DBG_DAT1_L) provide read access to the latest data word that the corresponding data source sent through the ARU.

Any time when data is transferred through the ARU from a data source to the destination requesting the data the interrupt signal ARU_NEW_DATA0_IRQ (ARU_NEW_DATA1_IRQ) is raised.

For advanced debugging purposes, the interrupt signal can also be triggered by software using the register ARU_IRQ_FORCINT.

The debug mechanism should not be used by application, when the HW-Debugger is access the debug registers of the ARU.

ARU Interrupt Signals

The following table describes ARU interrupt signals:

| Signal | Description |
|---|---|
| ARU_NEW_DATA0_IRQ | Indicates that data is transferred through the ARU using debug channel ARU_DBG_ACCESS0. |

-continued

| Signal | Description |
|---|---|
| ARU_NEW_DATA1_IRQ | Indicates that data is transferred through the ARU using debug channel ARU_DBG_ACCESS1. |
| ACC_ACK_IRQ | ARU access acknowledge IRQ. |

ARU Configuration Registers Overview

The following table shows a conclusion of configuration registers address offsets and initial values.

| Register name | Description | Details in Section |
|---|---|---|
| ARU_ACCESS | ARU access register | 0 |
| ARU_DATA_H | ARU access register upper data word | 0 |
| ARU_DATA_L | ARU access register lower data word | 0 |
| ARU_DBG_ACCESS0 | Debug access channel 0 | 0 |
| ARU_DBG_DATA0_H | Debug access 0 transfer register upper data word | 0 |
| ARU_DBG_DATA0_L | Debug access 0 transfer register lower data word | 0 |
| ARU_DBG_ACCESS1 | Debug access channel 0 | 0 |
| ARU_DBG_DATA1_H | Debug access 1 transfer register upper data word | 0 |
| ARU_DBG_DATA1_L | Debug access 1 transfer register lower data word | 0 |
| ARU_IRQ_NOTIFY | ARU Interrupt notification register | 0 |
| ARU_IRQ_EN | ARU Interrupt enable register | 0 |
| ARU_IRQ_FORCINT | Register for forcing the ARU_NEW_DATA_IRQ interrupt | 0 |
| ARU_IRQ_MODE | IRQ mode configuration register | 0 |

ARU Configuration Registers Description

| Register ARU_ACCESS | | | | | |
|---|---|---|---|---|---|
| | Address Offset: 0 × 00 | | | Initial Value: 0 × 0000_01FE | |
| | 31 30 29 28 27 26 25 24 23 22 21 20 19 18 17 16 15 14 | 13 | 12 | 11 10 9 | 8 7 6 5 4 3 2 1 0 |
| Bit | Reserved | WREQ | RREQ | Reserved | ADDR |
| Mode | R | RAw | RAw | R | RW |
| Initial Value | 0 × 00000 | 0 | 0 | 000 | 0 × 1FE |

Bit 8:0 ADDR: ARU address

Define the ARU address used for transferring data

Note: For an ARU write request, the preferred address 0 × 0 have to be used.

Bit 11:9 Reserved

Note: Read as zero, should be written as zero

Bit 12 RREQ: Initiate read request

0 = No read request is pending

1 = Set read request to source channel addressed by ADDR

Note: This bit is cleared automatically after transaction. Moreover, it can be cleared by software to cancel a read request.

Note: The ARU read request on address ADDR is served immediately when no other destination has actually a read request when the RREQ bit is set by CPU. In a worst case scenario, the read request is served after one round trip of the ARU, but this is only the case when every destination channel issues a read request at consecutive points in time.

Bit 13 WREQ: Initiate write request

0 = No write request is pending

1 = Mark data in registers ARU_DATA_H and ARU_DATA_L as valid

Note: This bit is cleared automatically after transaction. Moreover, it can be cleared by software to cancel a write request.

Note: The data is provided at address ADDR. This address has to be programmed as the source address in the destination sub module channel. In worst case, the data is provided after one full ARU round trip.

Note: It is strongly recommended that an address ADDR is used that is not reserved for another source sub module inside the GTM-IP, for example the reserved address 0 × 000. Otherwise, data from another source sub module, that provides his data at the specified address ADDR may be lost. This can be avoided when the reserved ARU write address 0 × 0 is specified inside the ADDR bit field.

Bit 31:14 Reserved

Note: Read as zero, should be written as zero

Note: The register ARU_ACCESS can be used either for reading or for writing at the same point in time.

| Register ARU_DATA_H | | |
|---|---|---|
| | Address Offset: 0 × 04 | Initial Value: 0 × 0000_0000 |
| | 31 30 29 28 27 26 25 24 23 22 21 20 19 18 17 16 | 15 14 13 12 11 10 9 8 7 6 5 4 3 |

| Bit | Reserved | DATA |
|---|---|---|
| Mode | R | RW |
| Initial Value | 0000 | 0 × 0000000 |

Bit 28:0 DATA: Upper ARU data word
Note: Transfer upper ARU data word addressed by ADDR. The data bits 24 to 52 of an ARU word are mapped to the data bits 0 to 28 of this register
Bit 31:29 Reserved
Note: Read as zero, should be written as zero

| Register ARU_DATA_L | | |
|---|---|---|
| | Address Offset: 0 × 08 | Initial Value: 0 × 0000_0000 |
| | 31 30 29 28 27 26 25 24 23 22 21 20 19 18 17 16 | 15 14 13 12 11 10 9 8 7 6 5 4 3 |

| Bit | Reserved | DATA |
|---|---|---|
| Mode | R | RW |
| Initial Value | 0 × 00 | 0 × 0000000 |

Bit 28:0 DATA: Lower ARU data word
Note: Transfer lower ARU data word addressed by ADDR. The data bits 0 to 23 of an ARU word are mapped to the data bits 0 to 23 of this register and the data bits 48 to 52 of an ARU word are mapped to the data bits 24 to 28 of this register when data is read by the CPU.
Note: For writing data into the ARU by the CPU the bits 24 to 28 are not transferred to bit 48 to 52 of the ARU word. Only bits 0 to 23 are written to bits 0 to 23 of the ARU word
Bit 31:29 Reserved
Note: Read as zero, should be written as zero

| Register ARU_DBG_ACCESS0 | | |
|---|---|---|
| | Address Offset: 0 × 0C | Initial Value: 0 × 0000_01FE |
| | 31 30 29 28 27 26 25 24 23 22 21 20 19 18 17 16 | 15 14 13 12 11 10 9 8 7 6 5 4 3 2 1 0 |

| Bit | Reserved | ADDR |
|---|---|---|
| Mode | R | RW |
| Initial Value | 0 × 00000 | 0 × 1FE |

Bit 8:0 ADDR: ARU debugging address
Note: Define address of ARU debugging channel 0.
Bit 31:9 Reserved
Note: Read as zero, should be written as zero

| Register ARU_DBG_DATA0_H | | |
|---|---|---|
| | Address Offset: 0 × 10 | Initial Value: 0 × 0000_0000 |
| | 31 30 29 28 27 26 25 24 23 22 21 20 19 18 17 16 | 15 14 13 12 11 10 9 8 7 6 5 4 3 2 1 0 |

| Bit | Reserved | DATA |
|---|---|---|
| Mode | R | R |
| Initial Value | 0 × 0 | 0 × 0000000 |

Bit 28:0 DATA: Upper debug data word
Note: Transfer upper ARU data word addressed by register DBG_ACCESS0. The data bits 24 to 52 of an ARU word are mapped to the data bits 0 to 28 of this register
Note: The interrupt ARU_NEW_DATA0_IRQ is raised if a new data word is available.
Bit 31:29 Reserved
Note: Read as zero, should be written as zero

| Register ARU_DBG_DATA0_L | | |
|---|---|---|
| | Address Offset: 0 × 14 | Initial Value: 0 × 0000_0000 |
| | 31 30 29 | 28 27 26 25 24 23 22 21 20 19 18 17 16 15 14 13 12 11 10 9 8 7 6 5 4 3 2 1 0 |
| Bit | Reserved | DATA |
| Mode | R | R |
| Initial Value | 0 × 0 | 0 × 0000000 |

Bit 28:0 DATA: Lower debug data word

Note: Transfer lower ARU data word addressed by register DBG_ACCESS0.The data bits 0 to 23 of an ARU word are mapped to the data bits 0 to 23 of this register and the data bits 48 to 52 of an ARU word is mapped to the data bits 24 to 28 of this register.
Note: The interrupt ARU_NEW_DATA0_IRQ is raised if a new dataword is available.

Bit 31:29 Reserved

Note: Read as zero, should be written as zero

| Register ARU_DBG_ACCESS1 | | |
|---|---|---|
| | Address Offset: 0 × 18 | Initial Value: 0 × 0000_01FE |
| | 31 30 29 28 27 26 25 24 23 22 21 20 19 18 17 16 15 14 13 12 11 10 9 | 8 7 6 5 4 3 2 1 0 |
| Bit | Reserved | ADDR |
| Mode | R | RW |
| Initial Value | 0 × 00000 | 0 × 1FE |

Bit 8:0 ADDR: ARU debugging address

Note: Define address of ARU debugging channel 1.

Bit 31:9 Reserved

Note: Read as zero, should be written as zero

| Register ARU_DBG_DATA1_H | | |
|---|---|---|
| | Address Offset: 0 × 1C | Initial Value: 0 × 0000_0000 |
| | 31 30 29 | 28 27 26 25 24 23 22 21 20 19 18 17 16 15 14 13 12 11 10 9 8 7 6 5 4 3 2 1 0 |
| Bit | Reserved | DATA |
| Mode | R | R |
| Initial Value | 0 × 0 | 0 × 0000000 |

Bit 28:0 DATA: Upper debug data word

Note: Transfer upper ARU data word addressed by register DBG_ACCESS1. The data bits 24 to 52 of an ARU word are mapped to the data bits 0 to 28 of this register
Note: The interrupt ARU_NEW_DATA1_IRQ is raised if a new data word is available.

Bit 31:29 Reserved

Note: Read as zero, should be written as zero

| Register ARU_DBG_DATA1_L | | |
|---|---|---|
| | Address Offset: 0 × 20 | Initial Value: 0 × 0000_0000 |
| | 31 30 29 | 28 27 26 25 24 23 22 21 20 19 18 17 16 15 14 13 12 11 10 9 8 7 6 5 4 3 2 1 0 |
| Bit | Reserved | DATA |
| Mode | R | R |
| Initial Value | 0 × 0 | 0 × 0000000 |

Bit 28:0 Data: Lower debug word

Note: Transfer lower ARU data word addressed by register DBG_ACCESS1.The data bits 0 to 23 of an ARU word are mapped to the data bits 0 to 23 of this register and the data bits 48 to 52 of an ARU word is mapped to the data bits 24 to 28 of this register.
Note: The interrupt ARU_NEW_DATA1_IRQ is raised if a new data word is available.

Bit 31:29 Reserved

Note: Read as zero, should be written as zero

| Register ARU_IRQ_NOTIFY | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | Address Offset: 0 × 24 | | | | | | | | | | | | | | | | Initial Value: 0 × 0000_0000 | | | | | | | | | | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 |
| Bit | Reserved | | | | | | | | | | | | | | | | | | | | | | | | | | | | | |
| Mode | R | | | | | | | | | | | | | | | | | | | | | | | | | | | | | |
| Initial Value | 0 × 00000000 | | | | | | | | | | | | | | | | | | | | | | | | | | | | | |

| | Initial Value: 0 × 0000_0000 | | |
|---|---|---|---|
| | 2 | 1 | 0 |
| Bit | ACC_ACK | NEW_DATA1 | NEW_DATA0 |
| Mode | RCw | RCw | RCw |
| Initial Value | 0 | 0 | 0 |

Bit 0 NEW_DATA1: Data was transferred for addr ARU_DBG_ACCESS0
0 = No interrupt occurred
1 = ARU_NEW_DATA0_IRQ interrupt was raised by the ARU
Note: This bit will be cleared on a CPU write access of value '1'. A read access leaves the bit unchanged.
NEW_DATA1: Data was transferred for addr ARU_DBG_ACCESS1
0 = No interrupt occurred
1 = ARU_NEW_DATA1_IRQ interrupt was raised by the ARU
Note: This bit will be cleared on a CPU write access of value '1'. A read access leaves the bit unchanged.
Bit 2 ACC_ACK: AEI to ARU access finished, on read access data are valid
Note: This bit will be cleared on a CPU write access of value '1'. A read access leaves the bit unchanged.
Bit 31:3 Reserved
Note: Read as zero, should be written as zero

| Register ARU_IRQ_EN | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | Address Offset: 0 × 28 | | | | | | | | | | | | | | | | Initial Value: 0 × 0000_0000 | | | | | | | | | | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 |
| Bit | Reserved | | | | | | | | | | | | | | | | | | | | | | | | | | | | | |
| Mode | R | | | | | | | | | | | | | | | | | | | | | | | | | | | | | |
| Initial Value | 0 × 00000000 | | | | | | | | | | | | | | | | | | | | | | | | | | | | | |

| | Initial Value: 0 × 0000_0000 | | |
|---|---|---|---|
| | 2 | 1 | 0 |
| Bit | ACC_ACK_IRQ_EN | NEW_DATA1_IRQ_EN | NEW_DATA0_IRW_EN |
| Mode | RW | RW | RW |
| Initial Value | 0 | 0 | 0 |

Bit 0 NEW_DATA0_IRQ_EN: ARU_NEW_DATA0_IRQ interrupt enable
0 = Disable interrupt, interrupt is not visible outside GTM-IP
1 = Enable interrupt, interrupt is visible outside GTM-IP
Bit 1 NEW_DATA1_IRQ_EN: ARU_NEW_DATA1_IRQ interrupt enable
0 = Disable interrupt, interrupt is not visible outside GTM-IP
1 = Enable interrupt, interrupt is visible outside GTM-IP
Bit 2 ACC_ACK_IRQ_EN: ACC_ACK_IRQ interrupt enable
0 = Disable interrupt, interrupt is not visible outside GTM-IP
1 = Enable interrupt, interrupt is visible outside GTM-IP
Bit 31:3 Reserved
Note: Read as zero, should be written as zero Register ARU_IRQ_FORCINT

| | Address Offset: 0 × 2C | Initial Value: 0 × 0000_0000 |
|---|---|---|
| | 31 30 29 28 27 26 25 24 23 22 21 20 19 18 17 16 15 14 13 12 11 10 9 8 7 6 5 4 3 | |
| Bit | Reserved | |
| Mode | R | |
| Initial Value | 0 × 00000000 | |

| | Initial Value: 0 × 0000_0000 | | |
|---|---|---|---|
| | 2 | 1 | 0 |
| Bit | TRG_ACC_ACK | TRG_NEW_DATA1 | TRG_NEW_DATA0 |
| Mode | RAw | RAw | RAw |
| Initial Value | 0 | 0 | 0 |

Bit 0 TRG_NEW_DATA0: Trigger new data 0 interrupt
0 = corresponding bit in status register will not be forced
1 = Assert corresponding field in ARU_IRQ_NOTIFY register
Note: This bit is cleared automatically after write.
Bit 1 TRG_NEW_DATA1: Trigger new data 1 interrupt
0 = corresponding bit in status register will not be forced
1 = Assert corresponding field in ARU_IRQ_NOTIFY register
Note: This bit is cleared automatically after write.
Bit 2 TRG_ACC_ACK: Trigger ACC_ACK interrupt
0 = corresponding bit in status register will not be forced
1 = Assert corresponding field in ARU_IRQ_NOTIFY register
Note: This bit is cleared automatically after write.
Bit 31:3 Reserved
Note: Read as zero, should be written as zero Register ARU_IRQ_MODE

| | Address Offset: 0x30 | Initial Value: 0x0000_0000 | |
|---|---|---|---|
| | 31 30 29 28 27 26 25 24 23 22 21 20 19 18 17 16 15 14 13 12 11 10 9 8 7 6 5 4 3 2 | | 1 0 |
| Bit | Reserved | | IRQ_MODE |
| Mode | R | | RW |
| Initial Value | 0x00000000 | | 00 |

Bit 1:0 IRQ_MODE: IRQ mode selection
00 = Level mode
01 = Pulse mode
10 = Pulse-Notify mode
11 = Single-Pulse mode
Note: The interrupt modes are described in section 0.
Bit 31:2 Reserved
Note: Read as zero, should be written as zero Broadcast Module (BRC)

Overview

Since each write address for the sub module channels of the GTM-IP that are able to write to the ARU can only be read by a single module, it is impossible to provide a data stream to different modules in parallel (This statement holds not for sources, which do not invalidate their data after the data were read by any consumer, e.g. DPLL).

To overcome this issue for regular modules, the sub module Broadcast (BRC) enables to duplicate data streams multiple times.

The BRC sub module provides 12 input channels as well as 22 output channels. In order to clone an incoming data stream, the corresponding input channel can be mapped to zero or more output channels.

When mapped to zero no channel is read.

To destroy an incoming data stream, the EN_TRASHBIN bit inside the BRC_SRC_[x]_DEST register has to be set.

The total number of output channels that are assigned to a single input channel is variable. However, the total number of assigned output channels must be less than or equal to 22.

BRC Configuration

As it is the case with all other sub modules connected to the ARU, the input channels can read arbitrary ARU address locations and the output channels provide the broadcast data to fixed ARU write address locations.

The associated write addresses for the BRC sub module are fixed and can be obtained later on.

The read address for each input channel is defined by the corresponding register BRC_SRC_[x]_CTRL (x: 0 . . . 11).

The mapping of an input channel to several output channels is defined by setting the appropriate bits in the register BRC_SRC_[x]_DEST (x: 0 . . . 11). Each output channel is represented by a single bit in the register BRC_SRC_[x]_DEST. The address of the output channel is defined later on.

If no output channel bit is set within a register BRC_SRC_N_DEST, no data is provided to the corresponding ARU write address location from the defined read input specified by BRC_SRC_[x]_CTRL. This means that the channel does not broadcast any data and is disabled (reset state).

Besides the possibility of mapping an input channel to several output channels, the bit EN_TRASHBIN of register BRC_SRC_[x]_DEST may be set, which results in dropping an incoming data stream. In this case the data of an input channel defined by BRC_SRC_[x]_CTRL is consumed by the BRC module and not routed to any succeeding sub module. In consequence, the output channels defined in the register BRC_SRC_[x]_DEST are ignored.

In general, the BRC sub module can work in two independent operation modes. In the first operation mode the data consistency is guaranteed since a BRC channel requests only new data from a source when all destination channels for the BRC have consumed the old data value. This mode is called Data Consistency Mode (DCM).

In a second operation mode the BRC channel always requests data from a source and distributes this data to the destination regardless whether all destinations have already consumed the old data. This mode is called Maximum Throughput Mode (MTM).

MTM ensures, that always the newest available data is routed through the system, while it is not guaranteed data consistency since some of the destination channels can be provided with the old data while some other destination channels are provided with the new data. If this is the case, the Data Inconsistency Detected Interrupt BRC_DID_IRQ[x] is raised but the channel continues to work.

Furthermore in MTM mode it is guaranteed that it is not possible to read a data twice by a read channel. This is blocked.

The channel mode can be configured inside the BRC_SRC_[x]_CTRL register.

To avoid invalid configurations of the registers BRC_SRC_[x]_DEST, the BRC also implements a plausibility check for these configurations. If the software assigns an already used output channel to a second input channel, BRC performs an auto correction of the lastly configured register BRC_SRC_[x]_DEST and it triggers the interrupt BRC_DEST_ERR.

Consider the following example for clarification of the auto correction mechanism. Assume that the following configuration of the 22 lower significant bits for the registers BRC_SRC_[x]_DEST:

BRC_SRC_0_DEST: 00 0000 0000 1000 1000 0000 (binary)

BRC_SRC_1_DEST: 00 0000 0000 0100 0000 0100 (binary)

BRC_SRC_2_DEST: 00 0000 0000 0001 0100 0010 (binary)

BRC_SRC_3_DEST: 00 0000 0000 0010 0001 1001 (binary)

If the software overwrites the value for register BRC_SRC_2_DEST with

BRC_SRC_2_DEST: 00 0000 0000 1001 0010 0010 (binary)

(changed bits are underlined), then the BRC releases a BRC_DEST_ERR interrupt since bit 11 is already assigned in register BRC_SRC_0_DEST. The auto correction forces bit 11 to be cleared. The modifications of the bits 5 and 6 are accepted, since there is no violation with previous configurations. So the result of the write access mentioned above results in the following modified register configuration:

BRC_SRC_2_DEST: 00 0000 0000 0001 0010 0010 (binary)

For debug purposes, the interrupt BRC_DEST_ERR can also be released by writing to register BRC_IRQ_FORCINT. Nevertheless, the interrupt has to be enabled to be visible outside of the GTM-IP.

BRC Interrupt Signals

Interrupt signals are defined in following table:

| Signal | Description |
|---|---|
| BRC_DEST_ERR_IRQ | Indicating configuration errors for BRC module |
| BRC_DID_IRQ[x] | Data inconsistency occurred in MTM mode (x: 0 . . . 11) |

BRC Configuration Registers Overview

Following table shows a conclusion of configuration registers address offsets and initial values.

| Register Name | Description | Details in Section |
|---|---|---|
| BRC_SRC_[x]_CTRL | Read address for input channel x (x: 0 . . . 11) | 0 |
| BRC_SRC_[x]_DEST | Destination channels for input channel x (x: 0 . . . 11) | 0 |
| BRC_IRQ_NOTIFY | BRC Interrupt notification register | 0 |
| BRC_IRQ_EN | BRC Interrupt enable register | 0 |
| BRC_IRQ_FORCINT | Register for forcing the BRC_DEST_ERR interrupt | 0 |
| BRC_RST | Software reset | 0 |
| BRC_IRQ_MODE | IRQ mode configuration register | 0 |

BRC Configuration Registers Description

Register BCR_SRC_[x]_CTRL (x: 0 . . . 11)

Address Offset: 0x00+x*0x08 — Initial Value: 0x0000_00FE

| | 31 30 29 28 27 26 25 24 23 22 21 20 19 18 17 16 15 14 13 | 12 | 11 10 9 | 8 7 6 5 4 3 2 1 0 |
|---|---|---|---|---|
| Bit | Reserved | BRC_MODE | Reserved | ADDR |
| Mode | R | RW | R | RW |
| Initial Value | 0x00000 | 0 | 000 | 0xFE |

Bit 8:0 ADDR: Source ARU address. Define an ARU read address used as data source for input channel x (x: 0 . . . 11).

Bit 11:9 Reserved: Reserved

Note: Read as zero, should be written as zero

Bit 12 BRC_MODE: BRC Operation mode select.

0 = Consistency Mode (DCM) selected

1 = Maximum Throughput Mode (MTM) selected

Bit 31:13 Reserved: Reserved

Note: Read as zero, should be written as zero

| Register BCR_SRC_[x]_DEST (x: 0 . . . 11) | | | | | | | | |
|---|---|---|---|---|---|---|---|---|
| | Address Offset: 0x04+x*0x08 | | | | | | | |
| | 31 | 30 | 29 | 28 | 27 | 26 | 25 | 24 |
| Bit | Reserved | | | | | | | |
| Mode | R | | | | | | | |
| Initial Value | 0x00 | | | | | | | |
| | Address Offset: 0x04+x*0x08 | | | | | | | |
| | 23 | 22 | 21 | 20 | 19 | 18 | 17 | 16 |
| Bit | Reserved | EN_TRASHBIN | EN_DEST21 | EN_DEST20 | EN_DEST19 | EN_DEST18 | EN_DEST17 | EN_DEST16 |
| Mode | R | RW | RW | RW | RW | RW | RW | RW |
| Initial Value | 0x00 | 0 | 0 | 0 | 0 | 0 | 0 | 0 |
| | Initial Value: 0x0000_0000 | | | | | | | |
| | 15 | 14 | 13 | 12 | 11 | 10 | 9 | 8 |
| Bit | EN_DEST15 | EN_DEST14 | EN_DEST13 | EN_DEST12 | EN_DEST11 | EN_DEST10 | EN_DEST9 | EN_DEST8 |
| Mode | RW | RW | RW | RW | RW | RW | RW | RW |
| Initial Value | 0 | 0 | 0 | 0 | 0 | 0 | 0 | 0 |
| | Initial Value: 0x0000_0000 | | | | | | | |
| | 7 | 6 | 5 | 4 | 3 | 2 | 1 | 0 |
| Bit | EN_DEST7 | EN_DEST6 | EN_DEST5 | EN_DEST4 | EN_DEST3 | EN_DEST2 | EN_DEST1 | EN_DEST0 |
| Mode | RW | RW | RW | RW | RW | RW | RW | RW |
| Initial Value | 0 | 0 | 0 | 0 | 0 | 0 | 0 | 0 |

Bit 0 EN_DEST0: Enable BRC destination address 0
0 = Destination address 0 not mapped to source BRC_SRC_[x]_ADDR
1 = Destination address 0 mapped to source BRC_SRC_[x]_ADDR
Note: The destination address 0 for BRC channel is defined in section 0
Bit 1 EN_DEST1: Enable BRC destination address 1, see bit 0.
Bit 2 EN_DEST2: Enable BRC destination address 2, see bit 0.
Bit 3 EN_DEST3: Enable BRC destination address 3, see bit 0.
Bit 4 EN_DEST4: Enable BRC destination address 4, see bit 0.
Bit 5 EN_DEST5: Enable BRC destination address 5, see bit 0.
Bit 6 EN_DEST6: Enable BRC destination address 6, see bit 0.
Bit 7 EN_DEST7: Enable BRC destination address 7, see bit 0.
Bit 8 EN_DEST8: Enable BRC destination address 8, see bit 0.
Bit 9 EN_DEST9: Enable BRC destination address 9, see bit 0.
Bit 10 EN_DEST10: Enable BRC destination address 10, see bit 0.
Bit 11 EN_DEST11: Enable BRC destination address 11, see bit 0.
Bit 12 EN_DEST12: Enable BRC destination address 12, see bit 0.
Bit 13 EN_DEST13: Enable BRC destination address 13, see bit 0.
Bit 14 EN_DEST14: Enable BRC destination address 14, see bit 0.
Bit 15 EN_DEST15: Enable BRC destination address 15, see bit 0.
Bit 16 EN_DEST16: Enable BRC destination address 16, see bit 0.
Bit 17 EN_DEST17: Enable BRC destination address 17, see bit 0.
Bit 18 EN_DEST18: Enable BRC destination address 18, see bit 0.
Bit 19 EN_DEST19: Enable BRC destination address 19, see bit 0.
Bit 20 EN_DEST20: Enable BRC destination address 20, see bit 0.
Bit 21 EN_DEST21: Enable BRC destination address 21, see bit 0.
Bit 22 EN_TRASHBIN: Control trash bin functionality.
0 = Trash bin functionality disabled
1 = Trash bin functionality enabled
Note: When bit EN_TRASHBIN is enabled bits 0 to 21 are ignored for this input channel.
Bit 31:23 Reserved: Reserved
Note: Read as zero, should be written as zero
Note: The bits 0 to 21 are cleared by auto correction mechanism if a destination channel is assigned to multiple source channels.
Note: When a BRC input channel is disabled (all EN_DEST_x (x:0 . . . 21) bits are reset to zero) the internal states are reset to their reset value.

Register BRC_IRQ_NOTIFY

| | Address Offset: 0x60 | | Initial Value: 0x0000_0000 | |
|---|---|---|---|---|
| | 31 30 29 28 27 26 25 24 23 22 21 20 19 18 17 16 15 14 13 | | 12 11 10 9 8 7 6 5 4 3 2 1 | 0 |
| Bit | Reserved | | DID[x] | DEST_ERR |
| Mode | R | | RCw | RCw |
| Initial Value | 0x00000000 | | 0 | 0 |

Bit 0 DEST_ERR: Configuration error interrupt for BRC sub module
0 = No BRC configuration error occurred
1 = BRC configuration error occurred
Note: This bit will be cleared on a CPU write access of value '1'. A read access leaves the bit unchanged.
Bit 12:1 DID[x]: Data inconsistency occurred in MTM mode, see bit 0. (x:0 . . . 11)
Note: This bit will be cleared on a CPU write access of value '1'. A read access leaves the bit unchanged.
Bit 31:13 Reserved: Reserved
Note: Read as zero, should be written as zero Register BRC_IRQ_EN

| | Address Offset: 0x64 | | Initial Value: 0x0000_0000 | |
|---|---|---|---|---|
| | 31 30 29 28 27 26 25 24 23 22 21 20 19 18 17 16 15 14 13 | | 12 11 10 9 8 7 6 5 4 3 2 1 | 0 |
| Bit | Reserved | | DID_IRQ_EN[x] | DEST_ERR_ IRQ_EN |
| Mode | R | | RW | RW |
| Initial Value | 0x00000000 | | 0 | 0 |

Bit 0DEST_ERR_EN: BRC_DEST_ERR_IRQ interrupt enable
0 = Disable interrupt, interrupt is not visible outside GTM-IP
1 = Enable interrupt, interrupt is visible outside GTM-IP
Bit 12:1 DID_EN[x]: BRC_DID_IRQ interrupt enable, see bit 0. (x:0 . . . 11)
Bit 31:13 Reserved: Reserved
Note: Read as zero, should be written as zero Register BRC_IRQ_FORCINT

| | Address Offset: 0x68 | | Initial Value: 0x0000_0000 | |
|---|---|---|---|---|
| | 31 30 29 28 27 26 25 24 23 22 21 20 19 18 17 16 15 14 13 | | 12 11 10 9 8 7 6 5 4 3 2 1 | 0 |
| Bit | Reserved | | TRG_DID[x] | TRG_DEST_ ERR |
| Mode | R | | RAw | RAw |
| Initial Value | 0x00000000 | | 0 | 0 |

Bit 0 TRG _ DEST _ERR: Trigger destination error interrupt.
0 = corresponding bit in status register will not be forced
1 = Assert corresponding field in BRC_IRQ_NOTIFY register
Note: This bit is cleared automatically after write.
Bit 12:1 TRG_DID[x]: Trigger data inconsistency error interrupt, see bit 0. (x:0 . . . 11)
Bit 31:13 Reserved: Reserved
Note: Read as zero, should be written as zero Register BRC_IRQ_MODE

| | Address Offset: 0x6C | Initial Value: 0x0000_0000 | |
|---|---|---|---|
| | 31 30 29 28 27 26 25 24 23 22 21 20 19 18 17 16 15 14 13 12 11 10 9 8 7 6 5 4 3 2 | | 1 0 |
| Bit | Reserved | | IRQ_MODE |
| Mode | R | | RW |

-continued

| Register BRC_IRQ_MODE | | |
|---|---|---|
| Initial Value | 0x00000000 | 00 |

Bit 1:0 IRQ_MODE: IRQ mode selection
00 = Level mode
01 = Pulse mode
10 = Pulse-Notify mode
11 = Single-Pulse mode
Note: The interrupt modes are described in section 0.
Bit 31:2 Reserved
Note: Read as zero, should be written as zero

| Register BRC_RST | | | |
|---|---|---|---|
| | Address Offset: 0x70 | Initial Value: 0x0000_0000 | |
| | 31 30 29 28 27 26 25 24 23 22 21 20 19 18 17 16 | 15 14 13 12 11 10 9 8 7 6 5 4 3 2 1 | 0 |
| Bit | Reserved | | RST |
| Mode | R | | RAw |
| Initial Value | 0x00000000 | | 0 |

Bit 0 RST: Software reset
0 = No action
1 = Reset BRC
Note: This bit is cleared automatically after write by CPU. The channel registers are set to their reset values and channel operation is stopped immediately.
Bit 31:1 Reserved: Reserved
Note: Read as zero, should be written as zero First In First Out Module (FIFO)

Overview

The FIFO unit is the storage part of the FIFO sub module. The F2A described in chapter 0 and the AFD described in chapter 0 implement the interface part of the FIFO sub module to the ARU and the AEI bus. Each FIFO unit embeds eight logical FIFOs. These logical FIFOs are configurable in the following manner:

- FIFO size (defines start and end address)
- FIFO operation modes (normal mode or ring buffer operation mode)
- Fill level control/memory region read protection Each logical FIFO represents a data stream between the sub modules of the GTM and the microcontroller connected to AFD sub module (see section 0). The FIFO RAM counts 1K words, where the word size is 29 bit. This gives the freedom to program or receive 24 bit of data together with the five control bits inside an ARU data word.

The FIFO unit provides three ports for accessing its content. One port is connected to the F2A interface, one port is connected to the AFD interface and one port has its own AEI bus interface.

The AFD interface has always the highest priority. Accesses to the FIFO from AFD interface and direct AEI interface in parallel—which means at the same time—is not possible, because both interfaces are driven from the same AEI bus interface of the GTM.

The priority between F2A and direct AEI interface can be defined by software. This can be done by using the register FIFO[i]_CH[x]_CTRL for all FIFO channels of the sub module.

The FIFO is organized as a single RAM that is also accessible through the FIFO AEI interface connected to one of the FIFO ports. To provide the direct RAM access, the RAM is mapped into the address space of the microcontroller.

After reset, the FIFO RAM is filled with zeros (0).

The FIFO channels can be flushed individually. Each of the eight FIFO channels can be used whether in normal FIFO operation mode or in ring buffer operation mode.

Operation Modes

Normal Operation Mode

In normal FIFO operation mode the content of the FIFO is written and read in first-in first-out order, where the data is destroyed after it is delivered to the system bus or the F2A sub module (see section 0).

The upper and lower watermark registers (registers FIFO[i]_CH[x]_UPPER_VM and FIFO[i]_CH[x]_LOWER_WM) are used for controlling the FIFO's fill level. If the fill level declines the lower watermark or it exceeds the upper watermark, an interrupt signal is triggered by the FIFO sub module if enabled inside the FIFO[i]_IRQ_EN.

The interrupt signals are sending to the Interrupt Concentrator Module (ICM) (see chapter 0). The ICM can also initiate specific DMA transfers.

Ring Buffer Operation Mode

The ring buffer mode is a powerful tool to provide a continuous data or configuration stream to the other GTM sub modules without CPU interaction. In ring buffer mode the FIFO provides a continuous data stream to the F2A sub module. The first word of the FIFO is delivered first and after the last word is provided by the FIFO to the ARU, the first word can be obtained again.

There could be the requirement that the user must be able to change some data inside the continuous data stream to the GTM sub modules or system bus. This is possible through direct memory access provided by the FIFO AEI interface.

FIFO Interrupt Signals

Interrupt signals are defined in following table:

| Signal | Description |
| --- | --- |
| FIFO[i]_CH[x]_EMPTY | Indicating empty FIFO x (x: 0 . . . 7) was reached |
| FIFO[i]_CH[x]_FULL | Indicating full FIFO x (x: 0 . . . 7) was reached |
| FIFO[i]_CH[x]_LOWER_WM | Indicating FIFO x (x: 0 . . . 7) reached lower watermark. |
| FIFO[i]_CH[x]_UPPER_WM | Indicating FIFO x (x: 0 . . . 7) reached upper watermark. |

FIFO Configuration Registers Overview

The following table shows a conclusion of configuration registers address offsets and initial values:

| Register Name | Description | Details in Section |
| --- | --- | --- |
| FIFO[i]_CH[x]_CTRL | FIFO Channel x control register (x: 0 . . . 7) | 0 |
| FIFO[i]_CH[x]_END_ADDR | FIFO Channel x end address register (x: 0 . . . 7) | 0 |

-continued

| Register Name | Description | Details in Section |
| --- | --- | --- |
| FIFO[i]_CH[x]_START_ADDR | FIFO Channel x start address register (x: 0 . . . 7) | 0 |
| FIFO[i]_CH[x]_UPPER_WM | FIFO Channel x upper watermark register (x: 0 . . . 7) | 0 |
| FIFO[i]_CH[x]_LOWER_WM | FIFO Channel x lower watermark register (x: 0 . . . 7) | 0 |
| FIFO[i]_CH[x]_STATUS | FIFO Channel x status register (x: 0 . . . 7) | 0 |
| FIFO[i]_CH[x]_FILL_LEVEL | FIFO Channel x fill level register (x: 0 . . . 7) | 0 |
| FIFO[i]_CH[x]_WR_PTR | FIFO Channel x write pointer register (x: 0 . . . 7) | 0 |
| FIFO[i]_CH[x]_RD_PTR | FIFO Channel x read pointer register (x: 0 . . . 7) | 0 |
| FIFO[i]_CH[x]_IRQ_NOTIFY (x: 0 . . . 7) | FIFO x interrupt notification register | 0 |
| FIFO[i]_CH[x]_IRQ_EN (x: 0 . . . 7) | FIFO x interrupt enable register | 0 |
| FIFO[i]_CH[x]_IRQ_FORCINT (x: 0 . . . 7) | FIFO x register to force interrupt by software | 0 |
| FIFO[i]_CH[x]_IRQ_MODE (x: 0 . . . 7) | FIFO x IRQ mode control register | 0 |

FIFO Configuration Registers Description

Register FIFO[i]_CH[x]_CTRL (x: 0 . . . 7)

Address Offset: 0x400+x*0x20

| | 31 | 30 | 29 | 28 | 27 | 26 | 25 | 24 | 23 | 22 | 21 | 20 | 19 | 18 | 17 | 16 |
| --- | --- | --- | --- | --- | --- | --- | --- | --- | --- | --- | --- | --- | --- | --- | --- | --- |
| Bit | Reserved | | | | | | | | | | | | | | | |
| Mode | R | | | | | | | | | | | | | | | |
| Initial Value | 0x0000000 | | | | | | | | | | | | | | | |

Initial Value: 0x0000_0000

| | 15 | 14 | 13 | 12 | 11 | 10 | 9 | 8 | 7 | 6 | 5 | 4 | 3 | 2 | 1 | 0 |
| --- | --- | --- | --- | --- | --- | --- | --- | --- | --- | --- | --- | --- | --- | --- | --- | --- |
| Bit | Reserved | | | | | | | | | | | | WLOCK | FLUSH | RAP | RBM |
| Mode | R | | | | | | | | | | | | RW | RAw | RW | RW |
| Initial Value | 0x0000000 | | | | | | | | | | | | 0 | 0 | 0 | 0 |

Bit 0 RBM: Ring buffer mode enable

0 = Normal FIFO operation mode

1 = Ring buffer mode

Bit 1 RAP: RAM access priority

0 = FIFO ports have higher access priority than AEI-IF

1 = AEI-IF has higher access priority than FIFO ports

Note: RAP bit is only functional in register FIFO_0_CTRL. The priority is defined for all FIFO channels there Bit 2 FLUSH: FIFO Flush control 0 = Normal operation 1 = Execute FIFO flush (bit is automatically cleared after flush).

Note: A FIFO Flush operation resets the FIFO[i]_CH[x]_FILL_LEVEL, FIFO[i]_CH[x]_WR_PTR and FIFO[x]_CH[x] _RD _PTR registers to their initial values.

Bit 3 WLOCK: Enable direct RAM write Access to the memory mapped FIFO region.

0 = Direct RAM write access disabled

1 = Direct RAM write access enabled

Note: Only the WLOCK bit of register FIFO_O_CTRL is functional fully implemented. The other WLOCK bits are available but they have no functionality Bit 31:4 Reserved: reserved Note: read as zero, should be written as zero Register FIFO[i]_CH[x]_END_ADDR (x: 0 . . . 7)

| | Address Offset: 0x404+x*0x20 | Initial Value: 0x0000_0XXX |
| --- | --- | --- |
| | 31 30 29 28 27 26 25 24 23 22 21 20 19 18 17 16 | 15 14 13 12 11 10 9 8 7 6 5 4 3 2 1 0 |
| Bit | Reserved | ADDR |
| Mode | R | RW |
| Initial Value | 0x00000 | 0xXXX |

Bit 9:0 ADDR: End address for FIFO channel x, (x:0 . . . 7)
Note: value for ADDR is calculated as ADDR = 128*(x + 1) − 1
Bit 31:10 Reserved: reserved
Note: read as zero, should be written as zero Register FIFO[i]_CH[x]_START_ADDR (x: 0 . . . 7)

| | Address Offset: 0x408+x*0x20 | Initial Value: 0x0000_0XXX |
| --- | --- | --- |
| | 31 30 29 28 27 26 25 24 23 22 21 20 19 18 17 16 | 15 14 13 12 11 10 9 8 7 6 5 4 3 2 1 0 |
| Bit | Reserved | ADDR |
| Mode | R | RW |
| Initial Value | 0x00000 | 0xXXX |

Bit 9:0 ADDR: End address for FIFO channel x, (x:0 . . . 7)
Note: Initial value for ADDR is calculated as ADDR = 128*x
Bit 31:10 Reserved: reserved
Note: read as zero, should be written as zero Register FIFO[i]_CH[x]_UPPER_WM (x: 0 . . . 7)

| | Address Offset: 0x40C+x*0x20 | Initial Value: 0x0000_0060 |
| --- | --- | --- |
| | 31 30 29 28 27 26 25 24 23 22 21 20 19 18 17 16 | 15 14 13 12 11 10 9 8 7 6 5 4 3 2 1 0 |
| Bit | Reserved | ADDR |
| Mode | R | RW |
| Initial Value | 0x000000 | 0x60 |

Bit 9:0 ADDR: Normal Operation mode: Upper watermark. Ring buffer operation mode: Gate pointer from SLW to LWU
Note: The upper watermark is configured as a relative fill level of the FIFO. ADDR must be in range: 0 <= ADDR <= FIFO[i]_CH[x]_END_ADDR − FIFO[CH[x]_START_ADDR. Initial value for ADDR is defined as ADDR = 0x60.
Bit 31:10 Reserved: reserved
Note: read as zero, should be written as zero Register FIFO[i]_CH[x]_LOWER_WM (x: 0 . . . 7)

| | Address Offset: 0x410+x*0x20 | Initial Value: 0x0000_0020 |
| --- | --- | --- |
| | 31 30 29 28 27 26 25 24 23 22 21 20 19 18 17 16 | 15 14 13 12 11 10 9 8 7 6 5 4 3 2 1 0 |
| Bit | Reserved | ADDR |
| Mode | R | RW |
| Initial Value | 0x000000 | 0x20 |

Bit 9:0 ADDR: Normal Operation mode: Upper watermark. Ring buffer operation mode: Gate pointer from LWU to UWE
Note: The lower watermark is configured as a relative fill level of the FIFO. ADDR must be in range: 0 <= ADDR <= FIFO[i]_CH[x]_END_ADDR − FIFO[i]_CH[x_START_ADDR. Initial value for ADDR is defined as ADDR = 0x20.
Bit 31:10 Reserved: reserved
Note: read as zero, should be written as zero

| Register FIFO[i]_CH[x]_STATUS (x: 0 . . . 7) | | | | | | | | | | | | | | | | |
|---|---|---|---|---|---|---|---|---|---|---|---|---|---|---|---|---|
| | Address Offset: 0x414+x*0x20 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000000 | | | | | | | | | | | | | | | |

| | Initial Value: 0x0000_0005 | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Bit | Reserved | | | | | | | | | | | | UP_WM | LOW_WM | FULL | EMPTY |
| Mode | R | | | | | | | | | | | | R | R | R | R |
| Initial Value | 0x0000000 | | | | | | | | | | | | 0 | 1 | 0 | 1 |

Bit 0 EMPTY: FIFO × fill level status (x: 0 . . . 7)
0 = Fill level > 0
1 = Fill level = 0
Note: Bit only applicable in normal mode
Bit 1 FULL: FIFO × fill level status (x:0 . . . 7)
0 = Fill level < FIFO[i]_CH[x]_END_ADDR − FIFO[i]_CH[x]_START_ADDR + 1
1 = Fill level = FIFO[i]_CH[x]_END_ADDR − FIFO[i]_CH[x]_START_ADDR + 1
Note: Bit only applicable in normal mode
Bit 2 LOW_WM: Lower watermark reached
0 = Fill level > lower watermark
1 = Fill level <= lower watermark
Note: Bit only applicable in normal mode
Bit 3 UP_WM: Upper watermark reached
0 = Fill level < upper watermark
1 = Fill level >= upper watermark
Note: Bit only applicable in normal mode
Bit 31:4 Reserved: reserved
Note: read as zero, should be written as zero

| Register FIFO[i]_CH[x]_FILL_LEVEL (x: 0 . . . 7) | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | Address Offset: 0x418+x*0x20 | | | | | | | | | | | | | | | | Initial Value: 0x0000_0000 | | | | | | | | | | | | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| Bit | Reserved | | | | | | | | | | | | | | | | | | | | | LEVEL | | | | | | | | | | |
| Mode | R | | | | | | | | | | | | | | | | | | | | | R | | | | | | | | | | |
| Initial Value | 0x00000 | | | | | | | | | | | | | | | | | | | | | 0x000 | | | | | | | | | | |

Bit 10:0 LEVEL: Fill level of the current FIFO
Note: LEVEL is in range: 0 ≤ LEVEL ≤ FIFO[I]_CH[x]_ENDADDR − FIFO[i]_CH[x]_START_ADDR + 1. Register content is compared to the upper and lower watermark values for this channel to detect watermark over- and underflow.
Bit 31:11 Reserved: reserved
Note: read as zero, should be written as zero

| Register FIFO[i]_CH[x]_WR_PTR (x: 0 . . . 7) | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | Address Offset: 0x500+x*0x20 | | | | | | | | | | | | | | | | Initial Value: 0x0000_0XXX | | | | | | | | | | | | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| Bit | Reserved | | | | | | | | | | | | | | | | | | | | | | ADDR | | | | | | | | | |
| Mode | R | | | | | | | | | | | | | | | | | | | | | | R | | | | | | | | | |
| Initial Value | 0x00000 | | | | | | | | | | | | | | | | | | | | | | 0xXXXX | | | | | | | | | |

Bit 9:0 ADDR: Position of the pointer
Note: ADDR must be in range 0 ≤ ADDR ≤ 1023. Initial value for ADDR is defined as ADDR = FIFO[i]_CH[x]_START_ADDR
Bit 31:10 Reserved: reserved
Note: read as zero, should be written as zero Register FIFO[i]_CH[x]_RD_PTR (x: 0 . . . 7)

| | Address Offset: 0x504+x*0x20 | Initial Value: 0x0000_0XXX |
|---|---|---|
| | 31 30 29 28 27 26 25 24 23 22 21 20 19 18 17 16 15 14 13 12 11 10 | 9 8 7 6 5 4 3 2 1 0 |
| Bit | Reserved | ADDR |
| Mode | R | R |
| Initial Value | 00 | 0xXXX |

Bit 9:0 ADDR: Position of the read pointer
Note: ADDR must be in range 0 ≤ ADDR ≤ 1023. Initial value for ADDR is defined as ADDR = FIFO[i]_CH[x]_START_ADDR
Bit 31:10 Reserved: reserved
Note: read as zero, should be written as zero Register FIFO[i]_CH[x]_IRQ_NOTIFY (x: 0 . . . 7)

| | Address Offset: 0x600+x*0x20 |
|---|---|
| | 31 30 29 28 27 26 25 24 23 22 21 20 19 18 17 16 |
| Bit | Reserved |
| Mode | R |
| Initial Value | 0x0000000 |

| | Initial Value: 0x0000_0005 | | | | |
|---|---|---|---|---|---|
| | 15 14 13 12 11 10 9 8 7 6 5 4 | 3 | 2 | 1 | 0 |
| Bit | Reserved | FIFO_UWM | FIFO_LWM | FIFO_FULL | FIFO_EMPTY |
| Mode | R | RCw | RCw | RCw | RCw |
| Initial Value | 0x0000000 | 0 | 1 | 0 | 1 |

Bit 0 FIFO_EMPTY: FIFO is empty
0 = No interrupt occurred.
1 = FIFO is empty interrupt occurred.
Note: This bit will be cleared on a CPU write address of value '1'. A read access leaves the bit unchanged.
Bit 1 FIFO_FULL: FIFO is full. See bit 0.
Bit 2 FIFO_LWM: FIFO Lower watermark was under-run. See bit 0.
Bit 3 FIFO_UWM: FIFO Upper watermark was over-run. See bit 0.
Bit 31:4 Reserved: reserved
Note: read as zero, should be written as zero Register FIFO[i]_CH[x]_IRQ_EN (x: 0 . . . 7)

| | Address Offset: 0x604+x*0x20 |
|---|---|
| | 31 30 29 28 27 26 25 24 23 22 21 20 19 18 17 16 |
| Bit | Reserved |
| Mode | R |
| Initial Value | 0x0000000 |

| | Initial Value: 0x0000_0000 | | | | |
|---|---|---|---|---|---|
| | 15 14 13 12 11 10 9 8 7 6 5 4 | 3 | 2 | 1 | 0 |
| Bit | Reserved | FIFO_UWM_ IRQ_EN | FIFO_LWM_ IRQ_EN | FIFO_FULL_ IRQ_EN | FIFO_EMPTY_ IRQ_EN |
| Mode | R | RW | RW | RCw | RW |

-continued

| Register FIFO[i]_CH[x]_IRQ_EN (x: 0 . . . 7) | | | | | |
|---|---|---|---|---|---|
| Initial Value | 0x0000000 | 0 | 0 | 0 | 0 |

Bit 0 FIFO_EMPTY_IRQ_EN: interrupt enable
0 = Disable interrupt, interrupt is not visible outside GTM-IP.
1 = Enable interrupt, interrupt is visible outside GTM-IP.
Bit 1 FIFO_FULL_IRQ_EN: interrupt enable. See bit 0.
Bit 2 FIFO_LWM_IRQ_EN: interrupt enable. See bit 0.
Bit 3 FIFO_UWM_IRQ_EN: interrupt enable. See bit 0.
Bit 31:4 Reserved: reserved
Note: read as zero, should be written as zero Register FIFO[i]_IRQ_IRQ_FORCINT Address Offset: 0x608+x*0x20

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | | | | | | | | | | | |
| Mode | R | | | | | | | | | | | | | | | |
| Initial Value | 0x0000000 | | | | | | | | | | | | | | | |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | Reserved | | | | | | | | | | | | TRG_FIFO_ UWM | TRG_FIFO_ LWM | TRG_FIFO_ FULL | TRG_FIFO_ EMPTY |
| Mode | R | | | | | | | | | | | | RAw | RAw | RAw | RAw |
| Initial Value | 0x0000000 | | | | | | | | | | | | 0 | 0 | 0 | 0 |

Bit 0 TRG_FIFO_EMPTY: Force interrupt of FIFO empty status.
0 = corresponding bit in status register will not be forced
1 = Assert corresponding field in FIFO[i]_CH[i]_IRQ_NOTIFY register
Note: This bit is cleared automatically after write.
Bit 1 TRG_FIFO_FULL: Force interrupt of FIFO full status. See bit 0.
Bit 2 TRG_FIFO_LWM: Force interrupt of lower watermark. See bit 0.
Bit 3 TRG_FIFO_UWM: Force interrupt of upper watermark. See bit 0.
Bit 31:4 Reserved: reserved
Note: read as zero, should be written as zero Register FIFO[i]_IRQ_MODE Address Offset: 0x60C+x*0x20

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | | | | | | | | | | | |
| Mode | R | | | | | | | | | | | | | | | |
| Initial Value | 0x00000000 | | | | | | | | | | | | | | | |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | Reserved | | | | | | | | | | | | | DMA_HYSTERESIS | IRQ_MODE | |
| Mode | R | | | | | | | | | | | | | RW | RW | |

-continued

| Register FIFO[i]_IRQ_MODE | | | |
|---|---|---|---|
| Initial Value | 0x00000000 | 0 | 00 |

Bit 1:0 IRQ_MODE: IRQ mode selection
00 = Level mode
01 = Pulse mode
10 = Pulse-Notify mode
11 = Single-Pulse mode
Note: The interrupt modes are described in section 0.
Bit 2 DMA_HYSTERESIS: Enable DMA hysteresis mode.
0 = Disable FIFO hysteresis for DMA access.
1 = Enable FIFO hysteresis for DMA access.
Note: In the case of DMA writing data to a FIFO the DMA requests must be generated by the lower watermark. If the DMA hysteresisis enabled, the FIFO does not generate a new DMA request until the upper watermark is reached.
Note: In the case of DMA reading data from FIFO the DMA requests must be generated by the upper watermark. If the DMA hysteresis is enabled, the FIFO does not generate a new DMA request until the lower watermark is reached.
Bit 31:3 Reserved
Note: Read as zero, should be written as zero AEI to FIFO Data Interface (AFD)

Overview

The AFD sub module implements a data interface between the AEI bus and the FIFO sub module, which consists of eight logical FIFO channels.

The AFD sub module provides a set of registers that are dedicated to the logical channels of the FIFO. These registers enable configuration of a channel (i.e. data direction) and the corresponding data transfer by reading or writing the registers AFD[i]_CH[x]_BUFF_ACC.

The AFD sub module does never block AEI accesses longer then 1 clock cycle.

AFD Register Overview

Following table shows a conclusion of configuration registers address offsets and initial values.

| Register Name | Description | Details in Section |
|---|---|---|
| AFD[i]_CH[x]_BUFF_ACC | AFD FIFO x buffer access register (x: 0 . . . 7) | 0 |
| AFD[i]_CH[x]_CTRL_STATUS | AFD FIFO x control status register (x: 0 . . . 7) | 0 |

AFD Register Description

| Register AFD[i]_CH[x]_BUF_ACC (x:0 . . . 7) | | |
|---|---|---|
| | Address Offset: 0x80+x*0x10 | Initial Value: 0x0000_0000 |
| | 31 30 29 | 28 27 26 25 24 23 22 21 20 19 18 17 16 15 14 13 12 11 10 9 8 7 6 5 4 3 2 1 0 |
| Bit | Reserved | DATA |
| Mode | R | RW |
| Initial Value | 0x0 | 0x0000000 |

Bit 28:0 DATA: Read/write data from/to FIFO corresponding to the bit ACC_DIR of register AFD_[ x]_CTRL_STATUS.
Bit 31:29 Reserved: reserved
Note: Read as zero, should be written as zero

| Register AFD[i]_CH[x]_CTRL_STATUS (x:0 . . . 7) | | | |
|---|---|---|---|
| | Address Offset: 0x84+x*0x10 | | |
| | 31 30 29 28 27 26 25 24 23 22 21 20 19 18 17 16 | | |
| Bit | Reserved | | |
| Mode | R | | |
| Initial Value | 0x0000000 | | |
| | Initial Value: 0x0000_0000 | | |
| | 15 14 13 12 11 10 9 8 7 6 5 4 3 2 | 1 | 0 |
| Bit | Reserved | ACC_DIR | ACC_ENA |
| Mode | R | RW | RW |

-continued

| Register AFD[i]_CH[x]_CTRL_STATUS (x:0 . . . 7) | | | |
|---|---|---|---|
| Initial Value | 0x0000000 | 0 | 0 |

Bit 0 ACC_ENA: Buffer access control
0 = Buffer access disabled and internal states are reset
1 = Buffer access enabled
Bit 1 ACC_DIR: FIFO direction control specifies whether the FIFO is read-only or write-only.
0 = Read only
1 = Write only
Bit 31:2 Reserved: reserved
Note: read as zero should be written as zero FIFO to ARU Unit (F2A)

Overview

The F2A is the interface between the ARU and the FIFO sub module. Since the data width of the ARU (ARU word) is 53 bit (two 24 bit values and five control bits) and the data width of the FIFO is only 29 bit, the F2A has to distribute the data from and to the FIFO channels in a configurable manner.

The data transfer between FIFO and ARU is organized with eight different streams that are connected to the eight different channels of the corresponding FIFO module. A stream represents a data flow from/to ARU to/from the FIFO via the F2A.

The general definition of 'channels' and 'streams' in the ARU context is done in section 0.

Each FIFO channel can act as a write stream (data flow from FIFO to ARU) or as a read stream (data flow from ARU to FIFO).

Within these streams the F2A can transmit/receive the lower, the upper or both 24 bit values of the ARU together with the ARU control bits according to the configured transfer modes as described in section 0

Transfer Modes

The F2A unit provides several transfer modes to map 29 bit data of the FIFO from/to 53 bit data of the ARU. E.g. it is configurable that the 24 bit FIFO data is written to the lower ARU data entry (means bits 0 to 23) or to the higher 24 bit ARU data entry (means bits 24 to 47). Bits 24 to 28 of the FIFO data entry (the five control bits) are written/read in both cases to/from bits 48 to 52 of the ARU entry.

When both values of the ARU have to be stored in the FIFO the values are stored behind each other inside the FIFO if the FIFO is not full.

If there is only space for one 24 bit data word plus the five control bits, the F2A transfers one part of the 53 bits first and than waits for transferring the second part before new data is requested from the ARU.

When two values from the FIFO have to be written to one ARU location the words have to be located behind each other inside the FIFO.

The transfer to ARU is only established when both parts could be read out of the FIFO otherwise if only one 29 bit word was provided by the FIFO the F2A waits until the second part is available before the data is made available at the ARU.

Figure 9:
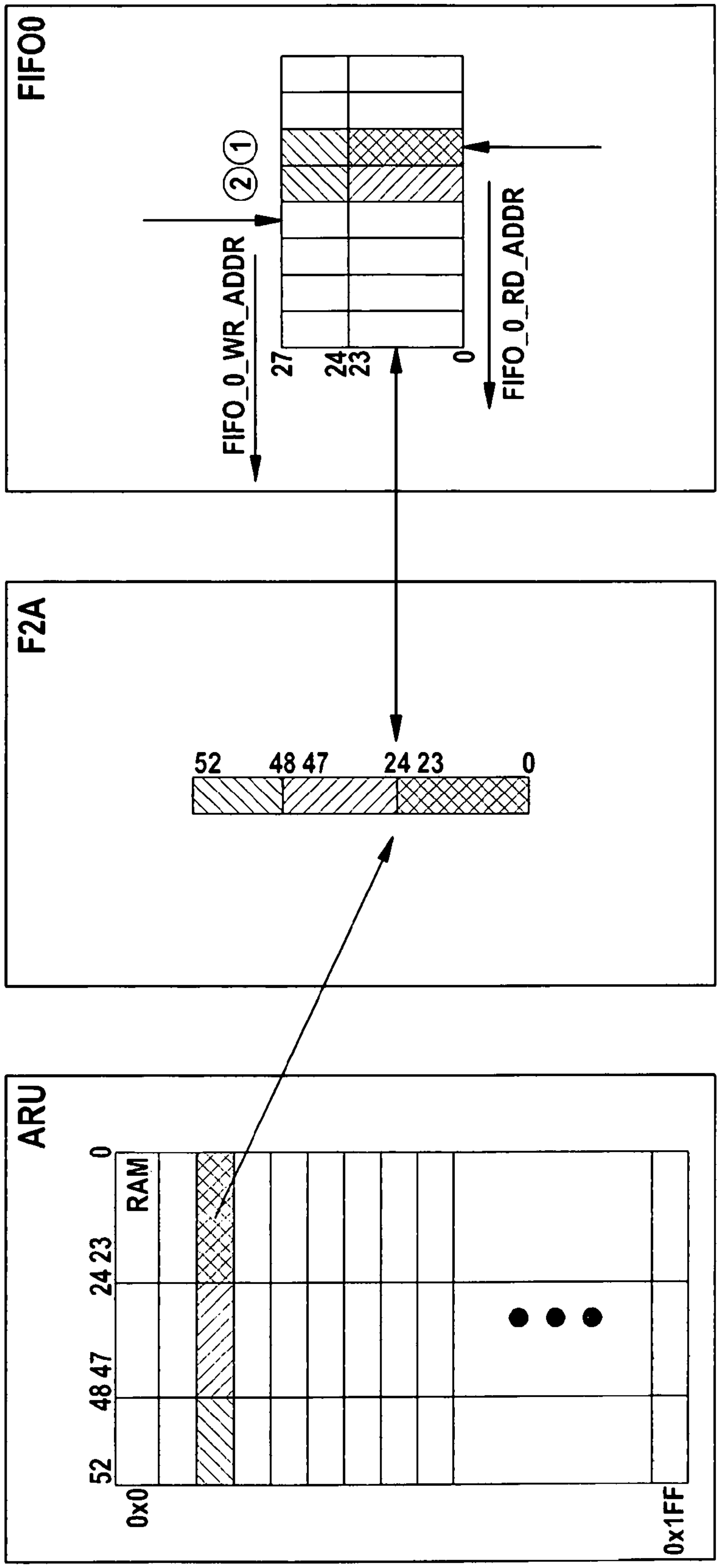

FIG. 9 shows the data ordering of the FIFO when both ARU values must be transferred between ARU and FIFO.

When reading from the ARU the F2A first writes the lower word to the FIFO.

In case of writing to the ARU the F2A reads the lower word first from the FIFO, thus the lower word must be written first to the FIFO through the AFD interface.

Please note, that the five control bits (bits 48 to 52 of the ARU data word) are duplicated as bit 24 to 28 of both FIFO words in case of reading from ARU.

In the case of writing to the ARU, bits 24 to 28 of the last written FIFO word (the higher ARU word) are copied to bits 48 to 52 of the corresponding ARU location.

The transfer modes can be configured with the TMODE bits of registers F2A[i]_CH[x]_STR_CFG (x: 0 . . . 7).

Data Transfer of Both ARU Words Between ARU and FIFO

See FIG. 9.

F2A Configuration Registers Overview

The following table shows a conclusion of configuration registers address offsets and initial values.

| Register name | Description | Details in Section |
|---|---|---|
| F2A[i]_ENABLE | F2A stream activation register | 0 |
| F2A[i]_CH[x]_ARU_RD_FIFO | F2A read channel address register (x: 0 . . . 7) | 0 |
| F2A[i]_CH[x]_STR_CFG | F2A stream x configuration register (x: 0 . . . 7) | 0 |

F2A Configuration Registers Description

| Register F2A[i]_ENABLE | | | | | | | | | | | | | | | | |
|---|---|---|---|---|---|---|---|---|---|---|---|---|---|---|---|---|
| | Address Offset: 0x40 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x00000000 | | | | | | | | | | | | | | | |

-continued

| Register F2A[i]_ENABLE | | | | | | | | |
|---|---|---|---|---|---|---|---|---|
| | Initial Value: 0x0000_0000 | | | | | | | |
| | 15 14 | 13 12 | 11 10 | 9 8 | 7 6 | 5 4 | 3 2 | 1 0 |
| Bit | STR7_EN | STR6_EN | STR5_EN | STR4_EN | STR3_EN | STR2_EN | STR1_EN | STR0_EN |
| Mode | RW | RW | RW | RW | RW | RW | RW | RW |
| Initial Value | 00 | 00 | 00 | 00 | 00 | 00 | 00 | 00 |

Bit 1:0 STR0_EN: Enable/disable stream 0 Write of following double bit values is possible:
00 = Don't care, bits 1:0 will not be changed
01 = Stream 0 is disabled and internal states are reset
10 = Stream 0 is enabled
11 = Don't care, bits 1:0 will not be changed
Read of following double values means:
00 = Stream disabled
11 = Stream enabled
Bit 3:2 STR1_EN: Enable/disable stream 1 See bits 1:0
Bit 5:4 STR2_EN: Enable/disable stream 2 See bits 1:0
Bit 7:6 STR3_EN: Enable/disable stream 3 See bits 1:0
Bit 9:8 STR4_EN: Enable/disable stream 4 See bits 1:0
Bit 11:10 STR5_EN: Enable/disable stream 5 See bits 1:0
Bit 13:12 STR6_EN: Enable/disable stream 6 See bits 1:0
Bit 15:14 STR7_EN: Enable/disable stream 7 See bits 1:0
Bit 31:16 Reserved
Note: Read as zero, should be written as zero

| Register F2A[i]_CH[x]_ARU_RD_FIFO (x:0 . . . 7) | | |
|---|---|---|
| | Address Offset: 0x00 + x*0x04 | Initial Value: 0x0000_01FE |
| | 31 30 29 28 27 26 25 24 23 22 21 20 19 18 17 16 15 14 13 12 11 10 9 | 8 7 6 5 4 3 2 1 0 |
| Bit | Reserved | ADDR |
| Mode | R | RW |
| Initial Value | 0x00000 | 0x1FE |

Bit 8:0 ADDR: ARU Read address
Bit 31:9 Reserved
Note: Read as zero, should be written as zero

| Register F2A[i]_CH[x]_STR_CFG (x:0 . . . 7) | | | | |
|---|---|---|---|---|
| | Address Offset: 0x20 * x*0x04 | | | Initial Value: 0x0000_0000 |
| | 31 30 29 28 27 26 25 24 23 22 21 20 19 | 18 | 17 16 | 15 14 13 12 11 10 9 8 7 6 5 4 3 2 1 0 |
| Bit | Reserved | DIR | TMODE | Reserved |
| Mode | R | RPw | RPw | R |
| Initial Value | 0x00000 | 0 | 00 | 0x0000 |

Bit 15:0 Reserved
Note: Read as zero, should be written as zero
Bit 17:16 TMODE: Transfer mode for 53 bit ARU data from/to FIFO
00 = Transfer low word (ARU bits 23:0) from/to FIFO
01 = Transfer high word (ARU bits 47:24) from/to FIFO
10 = Transfer both words from/to FIFO
11 = Reserved
Bit 18 DIR: Data transfer direction
0 = Transport from ARU to FIFO
1 = Transport from FIFO to ARU
Bit 31:19 Reserved
Note: Read as zero, should be written as zero
Note: The write protected bits of register F2A_STR_[x]_CFG are only writable if the corresponding enable bit STRx_EN of register F2A_ENABLE is cleared.

Clock Management Unit (CMU)

Overview

Figure 10:
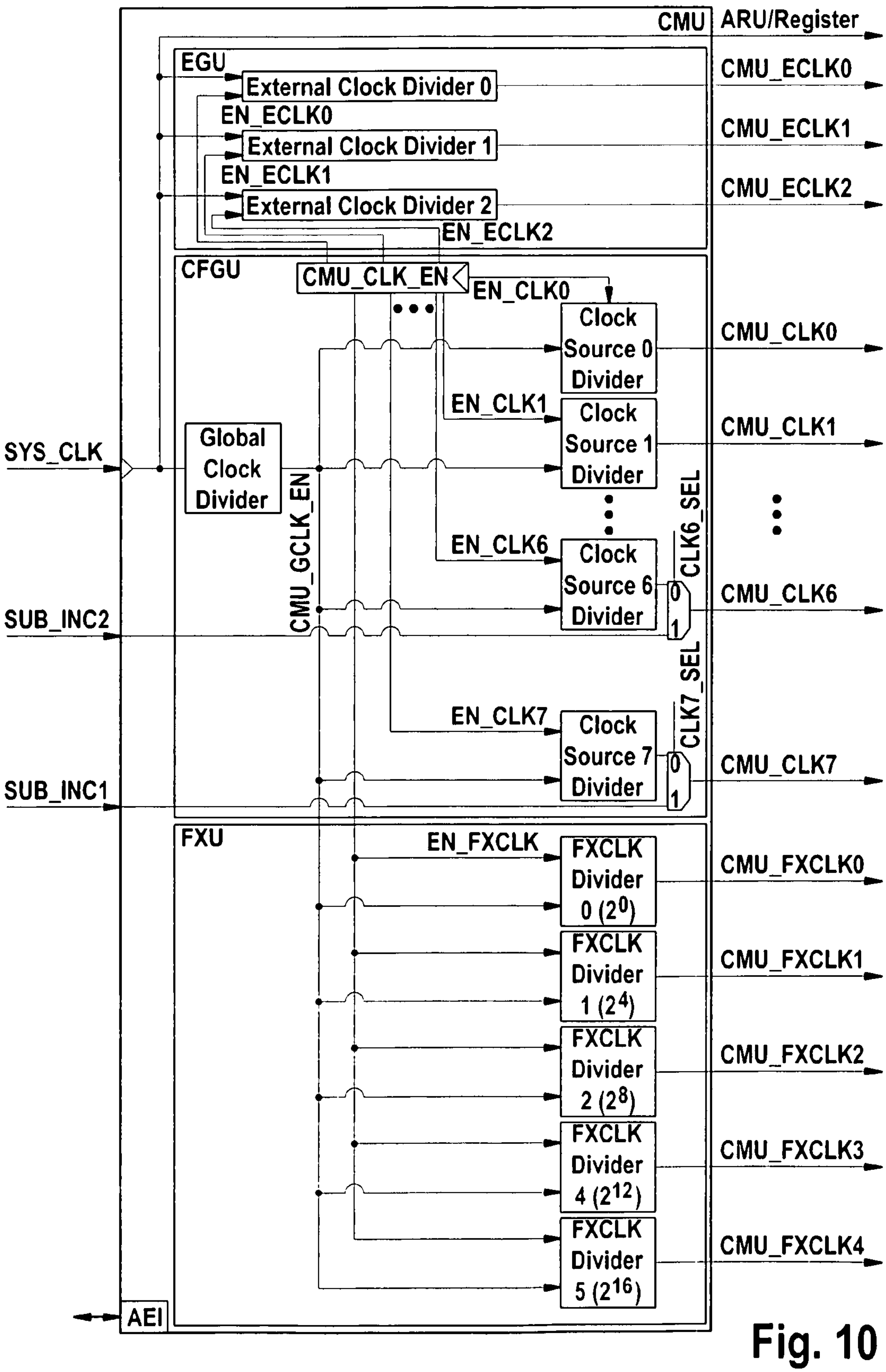

The Clock Management Unit (CMU) is responsible for clock generation of the counters and of the GTM-IP. The CMU consists of three subunits that generate different clock sources for the whole GTM-IP. FIG. 10 shows a block diagram of the CMU.

The Configurable Clock Generation (CFGU) subunit provides eight dedicated clock sources for the following GTM sub modules: TIM, ATOM, TBU, and MON. Each instance of such a sub module can choose an arbitrary clock source, in order to specify wide-ranging time bases.

The Fixed Clock Generation (FXU) subunit generates predefined non-configurable clocks CMU_FXCLK[y] (y: 0 . . . 4) for the TOM sub modules and the MON sub module. The CMU_FXCLK[y] signals are derived from the CMU_GCLK_EN signal generated by the Global Clock Divider. The dividing factors are defined as $2^0$, $2^4$, $2^8$, $2^{12}$, and $2^{16}$.

The External Clock Generation (EGU) subunit is able to generate up to three chip external clock signals visible at CMU_ECLK[z] (z: 0 . . . 2) with a duty cycle of about 50%.

The clock source signals CMU_CLK[x] (x: 0 . . . 7) and CMU_FXCLK[y] are implemented in form of enable signals for the corresponding registers, which means that the actual clock signal of all registers always use the CMU_GCLK_EN signal.

The four configurable clock signals CMU_CLK0, CMU_CLK1, CMU_CLK6 and CMU_CLK7 are connected to the TIM filter counters.

CMU Block Diagram

See FIG. 10.

Global Clock Divider

The sub block Global Clock Divider can be used to divide the GTM-IP global input clock signal SYS_CLK into a common subdivided clock signal.

The divided clock signal of the sub block Global Clock Divider is implemented as an enable signal that enables dedicated clocks from the SYS_CLK signal to generate the user specified divided clock frequency.

The resulting fractional divider (Z/N) specified through equation:

$$T_{CMU\_GCLK\_EN}=(Z/N)*T_{SYS\_CLK}$$

is implemented according the following algorithm (Z: CMU_GCLK_NUM(23:0); N: CMU_GCLK_DEN (23:0); Z,N>0):

(1) Set remainder (R), operand1 (OP1) and operand2 (OP2) register during init-phase (with implicit conversion to signed):

R=Z, OP1=N, OP2=N−Z;

(2) After leaving init-phase (at least one CMU_CLK[x] has been enabled) the sign of remainder R for each SYS_CLK cycle will be checked:

(3) If R>0 keep updating remainder and keep CMU_GCLK_EN='0':

R=R−OP1;

(4) If R<0 update remainder and set CMU_GCLK_EN='1':

R=R−OP2;

After at most (Z/N+1) subtractions (3) there will be a negative R and an active phase of the generated clock enable (for one cycle) will be triggered (4). The remainder R is a measure for the distance to a real Z/N clock and will be regarded for the next generated clock enable cycle phase. The new R value will be R=R+(Z−N). In the worst case the remainder R will sum up to an additional cycle in the generated clock enable period after Z-cycles. In the other cases equally distributed additional cycles will be inserted for the generated clock enable. If Z is an integer multiple of N no additional cycles will be included for the generated clock enable at all.

Note that for a better resource sharing all arithmetic has been reduced to subtractions and the initialization of the remainder R uses the complement of (Z−N).

Configurable Clock Generation Subunit (CFGU)

The CMU subunit CFGU provides eight configurable clock divider blocks that divide the common CMU_GCLK_EN signal into dedicated enable signals for the GTM-IP sub blocks.

The configuration of the eight different clock signals CMU_CLK[x] (x: 0 . . . 7) always depends on the configuration of the global clock enable signal CMU_GCLK_EN. Additionally, each clock source has its own configuration data, provided by the control register CMU_CLK_[x]_CTRL (x: 0 . . . 7).

According to the configuration of the Global Clock Divider, the configuration of the Clock Source x Divider is done by setting an appropriate value in the bit field CLK_CNT[x] of the register CMU_CLK_[x]_CTRL.

The frequency $f_x=1/T_x$ of the corresponding clock enable signal CMU_CLK[x] can be determined by the unsigned representation of CLK_CNT[x] of the register CMU_CLK_[x]_CTRL in the following way:

$$T_{CMU\_CLK[x]}=(CLK\_CNT[x]+1)*T_{CMU\_GCLK\_EN}$$

Figure 11:
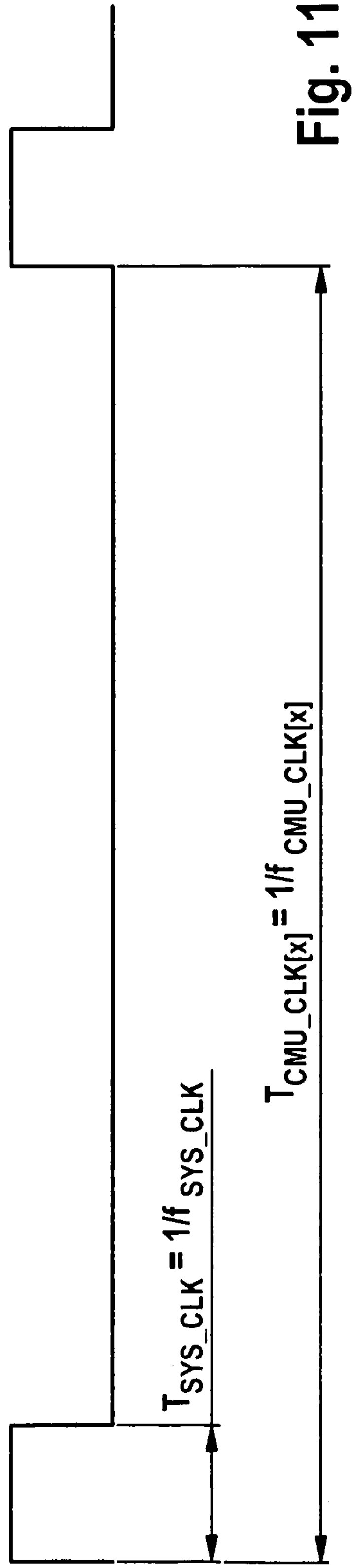

The corresponding wave form is shown in FIG. 11.

Each clock signal CMU_CLK[x] can be enabled individually by setting the appropriate bit field EN_CLK[x] in the register CMU_CLK_EN. Except for CMU_CLK6 and CMU_CLK7 individual enabling and disabling is active only if CLK6_SEL and CLK7_SEL is unset.

Alternatively, clock source six and seven (CMU_CLK6 and CMU_CLK7) may provide the signal SUB_INC1 and SUB_INC2 coming from sub module DPLL as clock enable signal depending on the bit field CLK6_SEL of the register CMU_CLK_6_CTRL and on the bit field CLK7_SEL of the register CMU_CLK_7_CTRL.

To avoid unexpected behaviour of the hardware, the configuration of a register CMU_CLK_[x]_CTRL can only be changed, when the corresponding clock signal CMU_CLK[x] is disabled.

Further, any changes to the registers CMU_GCLK_NUM and CMU_GCLK_DEN can only be performed, when all clock enable signals CMU_CLK[x] and the EN_FXCLK bit inside the CMU_CLK_EN register are disabled.

The hardware guarantees that all clock signals CMU_CLK[x], which were enabled simultaneous, are synchronized to each other. Simultaneous enabling does mean that the bits EN_CLK[x] in the register CMU_CLK_EN are set by the same write access.

Wave Form of Generated Clock Signal CMU_CLK[x]

See FIG. 11.

Fixed Clock Generation (FXU)

The FXU subunit generates fixed clock enables out of the CMU_GCLK_EN enable signal generated by the Global Clock Divider sub block. These clock enables are used for the PWM generation inside the TOM sub modules.

All clock enables CMU_FXCLK[y] can be enabled or disabled simultaneous by setting the appropriate bit field EN_FXCLK in the register CMU_CLK_EN.

The dividing factors are defined as $2^0$, 24, $2^8$, $2^{12}$, and $2^{16}$. The signals CMU_FXCLK[y] are implemented in form of enable signals for the corresponding registers (see also Chapter 0)

External Generation Unit (EGU)

The EGU subunit generate three separate clock output signals CMU_ECLK[z] (z: 0 . . . 2).

Each of these clock signals is derived from the corresponding External Clock Divider z sub block, which generates a clock signal derived from the GTM-IP input clock SYS_CLK.

In contrast to the signals CMU_CLK[x] and CMU_FXCLK[y], which are treated as simple enable signals for the registers, the signals CMU_ECLK[z] have a duty cycle of about 50% that is used as a true clock signal for external peripheral components. Each of the external clocks are enabled and disabled by setting the appropriate bit field EN_ECLK[z] in the register CMU_CLK_EN.

The clock frequencies $f_{CMU\_ECLK[z]}=1/T_{CMU\_ECLK[z]}$ of the external clocks are controlled with the registers CMU_ECLK_[z]_NUM and CMU_ECLK_[z]_DEN as follows:

$$T_{CMU\_ECLK[z]}=2*(ECLK[z]\_NUM/ECLK[z]\_DEN)*T_{SYS\_CLK}$$

and is implemented according the following algorithm (Z: CMU_ECLK_[z]_NUM(23:0); N: CMU_ECLK_[z]_DEN(23:0); Z,N>0; Z>=N; CMU_ECLK[z]=‘0’):

(1) Set remainder (R), operand1 (OP1) and operand2 (OP2) register during init-phase (with implicit conversion to signed):

R=Z, OP1=N, OP2=N−Z;

(2) After leaving init-phase (CMU_ECLK[z] has been enabled) the sign of remainder R for each SYS_CLK cycle will be checked:

(3) If R>0 keep updating remainder and keep CMU_ECLK [z]:

R=R−OP1;

(4) If R<0 update remainder and toggle CMU_ECLK[z]:

R=R−OP2;

After at most (Z/N+1) subtractions (3) there will be a negative R and an active phase of the generated clock enable (for one cycle) will be triggered (4). The remainder R is a measure for the distance to a real Z/N clock and will be regarded for the next generated clock toggle phase. The new R value will be R=R+(Z−N). In the worst case the remainder R will sum up to an additional cycle in the generated clock toggle period after Z-cycles. In the other cases equally distributed additional cycles will be inserted for the generated clock toggle. If Z is an integer multiple of N no additional cycles will be included for the generated clock toggle at all.

Note that for a better resource sharing all arithmetic has been reduced to subtractions and the initialization of the remainder R uses the complement of (Z−N). The default value of the CMU_ECLK[z] output is low.

CMU Configuration Registers Overview

Following configuration registers are considered in CMU sub module:

| Register Name | Description | Details in Section |
|---|---|---|
| CMU_CLK _EN | Clock enable | 0 |
| CMU_GCLK_NUM | Global clock control numerator | 0 |
| CMU_GCLK_DEN | Global clock control denominator | 0 |
| CMU_CLK_0_CTRL | Control for clock source 0 | 0 |
| CMU_CLK_1_CTRL | Control for clock source 1 | 0 |
| CMU_CLK_2_CTRL | Control for clock source 2 | 0 |
| CMU_CLK_3_CTRL | Control for clock source 3 | 0 |
| CMU_CLK_4_CTRL | Control for clock source 4 | 0 |
| CMU_CLK_5_CTRL | Control for clock source 5 | 0 |
| CMU_CLK_6_CTRL | Control for clock source 6 | 0 |
| CMU_CLK_7_CTRL | Control for clock source 7 | 0 |
| CMU_ECLK_0_NUM | External clock 0 control numerator | 0 |
| CMU_ECLK_0_DEN | External clock 0 control denominator | 0 |
| CMU_ECLK_1_NUM | External clock 1 control numerator | 0 |
| CMU_ECLK_1_DEN | External clock 1 control denominator | 0 |
| CMU_ECLK_2_NUM | External clock 2 control numerator | 0 |
| CMU_ECLK_2_DEN | External clock 2 control denominator | 0 |

CMU Configuration Register Description

Register CMU_CLK_EN

Address Offset: 0x00

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | | | | | Reserved | | | | EN_FXCLK | | EN_ECLK2 | | EN_ECLK1 | | | EN_ECLK0 |
| Mode | | | | | R | | | | RW | | RW | | RW | | | RW |
| Initial Value | | | | | 0x000 | | | | 00 | | 00 | | 00 | | | 00 |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | EN_CLK7 | | EN_CLK6 | | EN_CLK5 | | EN_CLK4 | | EN_CLK3 | | EN_CLK2 | | EN_CLK1 | | EN_CLK0 | |
| Mode | RW | | RW | | RW | | RW | | RW | | RW | | RW | | RW | |

-continued

| Register CMU_CLK_EN | | | | | | | | |
|---|---|---|---|---|---|---|---|---|
| Initial Value | 00 | 00 | 00 | 00 | 00 | 00 | 00 | 00 |

Bit 1:0 EN_CLK0: Enable clock source 0

00 = clock source is disabled (ignore write access)

01 = disable clock signal and reset internal states

10 = enable clock signal

11 = clock signal enabled (ignore write access)

Note: Any read access to an EN_CLK[x], EN_ECLK[z] or EN_FXCLK bit field will always result in a value 00 or 11 indicating current state. A modification of the state is only performed with the values 01 and 10. Writing the values 00 and 11 is always ignored.

Bit 3:2 EN_CLK1: Enable clock source 1, see bits 1:0

Bit 5:4 EN_CLK2: Enable clock source 2, see bits 1:0

Bit 7:6 EN_CLK3: Enable clock source 3, see bits 1:0

Bit 9:8 EN_CLK4: Enable clock source 4, see bits 1:0

Bit 11:10 EN_CLK5: Enable clock source 5, see bits 1:0

Bit 13:12 EN_CLK6: Enable clock source 6, see bits 1:0

Bit 15:14 EN_CLK7: Enable clock source 7, see bits 1:0

Bit 17:16 EN_ECLK0: Enable ECLK 0 generation subunit, see bits 1:0

Bit 19:18 EN_ECLK1: Enable ECLK 1 generation subunit, see bits 1:0

Bit 21:20 EN_ECLK2: Enable ECLK 2 generation subunit, see bits 1:0

Bit 23:22 EN_FXCLK: Enable all CMU_FXCLK, see bits 1:0

Bit 31:24 Reserved: Reserved bits

Note: Read as zero, should be written as zero

| Register CMU_GCLK_NUM | | |
|---|---|---|
| | Address Offset: 0x04 | Initial Value: 0x0000_0001 |
| | 31 30 29 28 27 26 25 24 23 22 21 20 19 18 17 16 | 15 14 13 12 11 10 9 8 7 6 5 4 3 2 1 0 |
| Bit | Reserved | GCLK_NUM |
| Mode | R | RPw |
| Initial Value | 0x00 | 0x00001 |

Bit 23:0 Numerator for global clock divider. Defines numerator of the fractional divider.

Note: Value can only be modified when all clock enables EN_CLK[x] and the EN_FXCLK are disabled.

Bit 31:24 Reserved

Note: Read as zero, should be written as zero

Note: Since the CMU_GCLK_NUM register content has to be always greater equal as CMU_GCLK_DEN, on a register rewrite the CMU_GCLK_NUM register has to be written twice before CMU_GCLK_DEN register is modified. Otherwise, the CMU hardware would alter the content of CMU_GCLK_NUM and CMU_GCLK_DEN automatically to 0x1, if CMU_GCLK_NUM is specified less than CMU_GCLK_DEN.

| Register CMU_GCLK_DEN | | |
|---|---|---|
| | Address Offset: 0x08 | Initial Value: 0x0000_0001 |
| | 31 30 29 28 27 26 25 24 23 22 21 20 19 18 17 16 | 15 14 13 12 11 10 9 8 7 6 5 4 3 2 1 0 |
| Bit | Reserved | GCLK_DEN |
| Mode | R | RPw |
| Initial Value | 0x00 | 0x000001 |

Bit 23:0 Denominator for global clock divider. Defines denominator of the fractional divider Note: Value can only be modified when all clock enables EN_CLK[x] and the EN_FXCLK are disabled.

Bit 31:24 Reserved

Note: Read as zero, should be written as zero

Note: Since the CMU_GCLK_NUM register content has to be always greater equal as CMU_GCLK_DEN, on a register rewrite the CMU_GCLK_NUM register has to be written twice before CMU_GCLK_DEN register is modified. Otherwise, the CMU hardware would alter the content of CMU_GCLK_NUM and CMU_GCLK_DEN automatically to 0xl, if CMU_GCLK_NUM is specified less than CMU_GCLK_DEN.

| Register CMU_CLK_[x]_CTRL (x: 0 . . . 5) | | |
|---|---|---|
| | 0x0C + x*0x04 | Initial Value: 0x0000_0000 |
| | 31 30 29 28 27 26 25 24 | 23 22 21 20 19 18 17 16 15 14 13 12 11 10 9 8 7 6 5 4 3 2 1 0 |
| Bit | Reserved | CLK_CNT |
| Mode | R | RPw |
| Initial Value | 0x00 | 0x000000 |

Bit 23:0 CLK_CNT: Clock count. Defines count value for the clock divider of clock source CMU_CLK[x] (x:0 . . . 5).
Note: Value can only be modified when clock enable EN_CLK[x] (x:0 . . . 5) is disabled.
Bit 31:24 Reserved: Reserved bits
Note: Read as zero, should be written as zero

| Register CMU_CLK_6_CTRL | | | |
|---|---|---|---|
| | Address Offset: 0x24 | | Initial Value: 0x0000_0000 |
| | 31 30 29 28 27 26 25 | 24 | 23 22 21 20 19 18 17 16 15 |
| Bit | Reserved | CLK6_SEL | CLK_CNT |
| Mode | R | RPw | RPw |
| Initial Value | 0x00 | 0 | 0x000000 |

| | Initial Value: 0x0000_0000 |
|---|---|
| | 14 13 12 11 10 9 8 7 6 5 4 3 2 1 0 |
| Bit | CLK_CNT |
| Mode | RPw |
| Initial Value | 0x000000 |

Bit 23:0 CLK_CNT: Clock count. Define count value for the clock divider of clock source CMU_CLK6.
Note: Value can only be modified when clock enable EN_CLK6 is disabled
Bit 24 CLK6_SEL: Clock source selection for CMU_CLK6.
0 = use Clock Source 6 Divider
1 = use signal SUB_INC2 of sub module DPLL
Note: Value can only be modified when clock enable EN_CLK6 is disabled.
Bit 31:25 Reserved: Reserved bits
Note: Read as zero, should be written as zero

| Register CMU_CLK_7_CTRL | | | |
|---|---|---|---|
| | Address Offset: 0x28 | | Initial Value: 0x0000_0000 |
| | 31 30 29 28 27 26 25 | 24 | 23 22 21 20 19 18 17 16 15 |
| Bit | Reserved | CLK7_SEL | CLK_CNT |
| Mode | R | RPw | RPw |
| Initial Value | 0x00 | 0 | 0x000000 |

| | Initial Value: 0x0000_0000 |
|---|---|
| | 14 13 12 11 10 9 8 7 6 5 4 3 2 1 0 |
| Bit | CLK_CNT |
| Mode | RPw |

-continued

| Register CMU_CLK_7_CTRL | |
|---|---|
| Initial Value | 0x000000 |

Bit 23:0 CLK_CNT: Clock count. Define count value for the clock divider of clock source CMU_CLK7.
Note: Value can only be modified when clock enable EN_CLK7 is disabled
Bit 24 CLK7_SEL: Clock source selection for CMU_CLK7.
0 = use Clock Source 7 Divider
1 = use signal SUB_INC1 of sub module DPLL
Note: Value can only be modified when clock enable EN_CLK7 is disabled.
Bit 31:25 Reserved: Reserved bits
Note: Read as zero, should be written as zero Register CMU_ECLK_[z]_NUM (z: 0 . . . 2)

| | Address Offset: 0x2C + z*0x08 | | | | | | | | | | | | | | | | Initial Value: 0x0000_0001 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | ECLK_NUM | | | | | | | | |
| Mode | R | | | | | | | | RPw | | | | | | | | |
| Initial Value | 0x00 | | | | | | | | 0x00001 | | | | | | | | |

| | Initial Value: 0x0000_0001 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | ECLK_NUM | | | | | | | | | | | | | | |
| Mode | RPw | | | | | | | | | | | | | | |
| Initial Value | 0x00001 | | | | | | | | | | | | | | |

Bit 23:0 Numerator for global clock divider. Defines numerator of the fractional divider.
Note: Value can only be modified when all clock enables EN_ECLK[z] are disabled.
Bit 31:24 Reserved
Note: Read as zero, should be written as zero
Note: Since the CMU_ECLK_[z]_NUM register content has to be always greater equal as CMU_ECLK_[z]_DEN, on a register rewrite the CMU_ECLK_[z]_NUM register has to be written twice before CMU_ECLK_[z]_DEN register is modified. Otherwise, the CMU hardware would alter the content of CMU_ECLK_[z]_NUM and CMU_ECLK_[z]_DEN automatically to 0x1, if CMU_ECLK_[z]_NUM is specified less than CMU_ECLK_[z]_DEN.

Register CMU_ECLK_[z]_DEN (z: 0 . . . 2)

| | Address Offset: 0x30 + z*0x08 | | | | | | | | | | | | | | | | Initial Value: 0x0000_0001 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | ECLK_DEN | | | | | | | | |
| Mode | R | | | | | | | | RPw | | | | | | | | |
| Initial Value | 0x00 | | | | | | | | 0x000001 | | | | | | | | |

| | Initial Value: 0x0000_0001 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | ECLK_DEN | | | | | | | | | | | | | | |
| Mode | RPw | | | | | | | | | | | | | | |
| Initial Value | 0x000001 | | | | | | | | | | | | | | |

Bit 23:0 Denominator for global clock divider. Defines denominator of the fractional divider
Note: Value can only be modified when all clock enables EN_ECLK[z] are disabled.
Bit 31:24 Reserved
Note: Read as zero, should be written as zero
Note: Since the CMU_ECLK_[z]_NUM register content has to be always greater equal as CMU_ECLK_[z]_DEN, on a register rewrite the CMU_ECLK_[z]_NUM register has to be written twice before CMU_ECLK_[z]_DEN register is modified. Otherwise, the CMU hardware would alter the content of CMU_ECLK_[z]_NUM and CMU_ECLK_[z]_DEN automatically to 0x1, if CMU_ECLK_[z]_NUM is specified less than CMU_ECLK_[z]_DEN.

Time Base Unit (TBU)

Overview

The Time Base Unit TBU provides common time bases for the GTM-IP. The TBU sub module is organized in channels, where the number of channels is device dependent. There are at most three channels implemented inside the TBU. Each of these time base channels has a time base register TBU_CH[z]_BASE (z: 0 . . . 2) of 24 bit length.

The time base register value TBU_TS[z] and the time base register update event TBU_UP[z] are provided to subsequent sub modules of the GTM. The time base channels can run independently of each other and can be enabled and disabled synchronously by control bits in a global TBU channel enable register TBU_CHEN. Chapter 0 shows a block diagram of the Time Base Unit.

TBU Block Diagram

Figure 12:
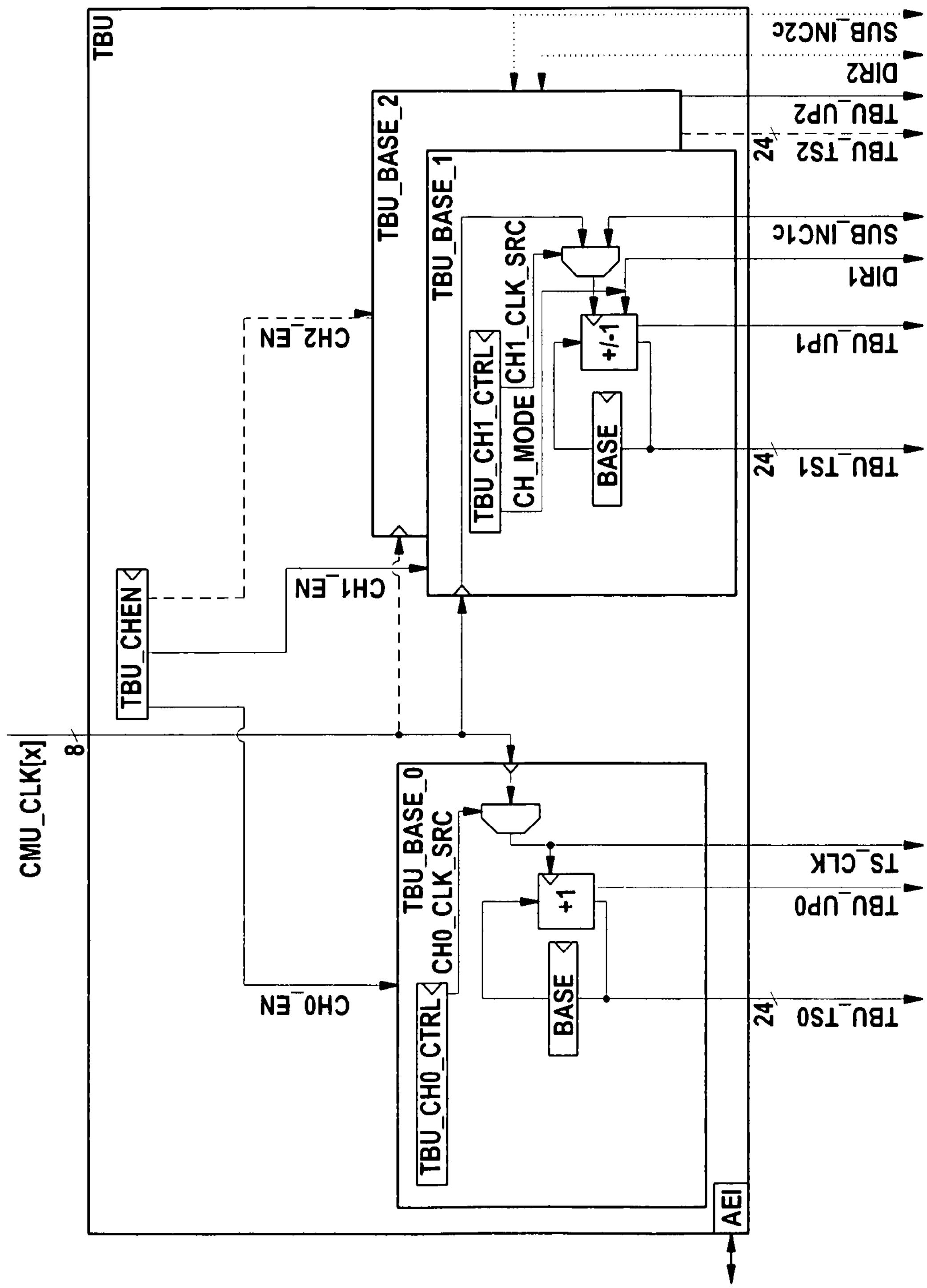

See FIG. 12.

Dependent on the device a third TBU channel exists which offers the same functionality as the time base channel 1.

The configuration of the independent time base channels TBU_BASE_[z] is done via the AEI interface. Each TBU channel may select one of the eight CMU_CLK[x] (x: 0 . . . 7) signals coming from the CMU sub module.

For TBU channels 1 and 2 an additional clock signal SUB_INC[y]c (y: 1, 2) coming from the DPLL can be selected as input clock for the TBU_BASE_[y]. This clock in combination with the DIR[y] signals determines the counter direction of the TBU_BASE_[y]. The downward counter can be disabled inside the TBU_CH[y]_CTRL register by selecting upward counter mode only.

The selected time stamp clock signal for the TBU_BASE_0 subunit is served via the TS_CLK signal line to the DPLL sub module. The TS_CLK signal equals the signal TBU_UP0.

TBU Time Base Channels

The time base values are generated within the TBU time base channels in two independent operation modes.

TBU Channel Modes

TBU channel 0 provides only a free running counter mode. TBU channel 1 and channel 2 can run in two modes; the free running counter mode also present in channel 0 and forward/backward counter mode, where the time base can run backwards dependent on the DIR[y] input signal values.

In both modes, the time base register TBU_CH[z]_BASE can be initialized with a start value just before enabling the corresponding TBU channel.

Moreover, the time base register TBU_CH[z]_BASE can always be read in order to determine the actual value of the counter.

Free Running Counter Mode

In TBU Free running counter mode, the time base register TBU_CH[z]_BASE is updated on every specified incoming clock event by the selected signal CMU_CLK[x] (dependent on TBU_CH[z]_CTRL register). In general the time base register TBU_CH[z]_BASE is incremented on every CMU_CLK[x] clock tick.

Forward/Backward Counter Mode

As mentioned above TBU channels 1 and 2 can also be configured to run in Forward/Backward Counter Mode. In this mode the DIR[y] signal provided by the DPLL is taken into account.

The value of the time base register TBU_CH[z]_BASE is incremented in case when the DIR[y] signal equals '0' and decremented in case when the DIR[y] signal is T.

TBU Configuration Registers Overview

Following table shows a conclusion of configuration registers address offsets and initial values.

| Register Name | Description | Details in Section |
|---|---|---|
| TBU_CHEN | TBU global channel enable | 0 |
| TBU_CH0_CTRL | TBU channel 0 control | 0 |
| TBU_CH0_BASE | TBU channel 0 base | 0 |
| TBU_CH1_CTRL | TBU channel 1 control | 0 |
| TBU_CH1_BASE | TBU channel 1 base | 0 |
| TBU_CH2_CTRL | TBU channel 2 control | 0 |
| TBU_CH2_BASE | TBU channel 2 base | 0 |

Note:
In a typical application the Time Base Unit (TBU) considers channels 0 and 1 only. In this case register addresses 0 × 20 . . . 0 × 2C are reserved and shall be read as zero. Channel 2 can be additionally implemented on special high-end application requirements.

TBU Registers Description

Register TBU_CHEN

Address Offset: 0x00 — Initial Value: 0x0000_0000

| | 31 | 30 | 29 | 28 | 27 | 26 | 25 | 24 | 23 | 22 | 21 | 20 | 19 | 18 | 17 | 16 | 15 | 14 | 13 | 12 | 11 |
|---|---|---|---|---|---|---|---|---|---|---|---|---|---|---|---|---|---|---|---|---|---|
| Bit | Reserved | | | | | | | | | | | | | | | | | | | | |
| Mode | R | | | | | | | | | | | | | | | | | | | | |
| Initial Value | 0x000000 | | | | | | | | | | | | | | | | | | | | |

Initial Value: 0x0000_0000

| | 10 | 9 | 8 | 7 | 6 | 5 | 4 | 3 | 2 | 1 | 0 |
|---|---|---|---|---|---|---|---|---|---|---|---|
| Bit | Reserved | | | | | ENDIS_CH2 | | ENDIS_CH1 | | ENDIS_CH0 | |
| Mode | R | | | | | RW | | RW | | RW | |
| Initial Value | 0x000000 | | | | | 00 | | 00 | | 00 | |

Bit 1:0 ENDIS_CH0: TBU channel 0 enable/disable control. Write of following double bit values is possible:
00 = don't care, bits 1:0 will not be changed
01 = channel disabled: is read as 00 (see below)
10 = channel enabled: is read as 11 (see below)
11 = don't care, bits 1:0 will not be changed
Note: Read of following double values means:
00 = channel disabled
11 = channel enabled
Bit 3:2 ENDIS_CH1: TBU channel 1 enable/disable control. See bits 1:0
Bit 5:4 ENDIS_CH2: TBU channel 2 enable/disable control. See bits 1:0
Note: These bits are only applicable if channel is implemented for this device, otherwise read and write as zero
Bit 31:6 Reserved: Reserved
Note: Read as zero should be written as zero

| Register TBU_CH0_CTRL | | | | | | | | | | | | | | | | | | | | |
|---|---|---|---|---|---|---|---|---|---|---|---|---|---|---|---|---|---|---|---|---|
| | Address Offset: 0x04 | | | | | | | | | | | | | | | | Initial Value: 0x0000_0000 | | | |
| | 31 | 30 | 29 | 28 | 27 | 26 | 25 | 24 | 23 | 22 | 21 | 20 | 19 | 18 | 17 | 16 | 15 | 14 | 13 | 12 |
| Bit | Reserved | | | | | | | | | | | | | | | | | | | |
| Mode | R | | | | | | | | | | | | | | | | | | | |
| Initial Value | 0x0000000 | | | | | | | | | | | | | | | | | | | |

| Initial Value: 0x0000_0000 | | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| Bit | Reserved | | | | | | | | CH_CLK_SRC | | | Reserved |
| Mode | R | | | | | | | | RPw | | | R |
| Initial Value | 0x0000000 | | | | | | | | 000 | | | 0 |

Bit 0 Reserved: Reserved

Note: Read as zero should be written as zero

Bit 3:1 CH_CLK_SRC: Clock source for channel x (x: 0 . . . 2) time base counter

000 = CMU_CLK0 selected
001 = CMU_CLK1 selected
010 = CMU_CLK2 selected
011 = CMU_CLK3 selected
100 = CMU_CLK4 selected
101 = CMU_CLK5 selected
110 = CMU_CLK6 selected
111 = CMU_CLK7 selected Note: This value can only be modified if channel 0 was disabled Bit 31:4 Reserved: Reserved Note: Read as zero should be written as zero

| Register TBU_CH[y]_CTRL (y: 1, 2) | | | | | | | | | | | | | | | | | | | | |
|---|---|---|---|---|---|---|---|---|---|---|---|---|---|---|---|---|---|---|---|---|
| | Address Offset: 0x04 + x*0x08 | | | | | | | | | | | | | | | | Initial Value: 0x0000_0000 | | | |
| | 31 | 30 | 29 | 28 | 27 | 26 | 25 | 24 | 23 | 22 | 21 | 20 | 19 | 18 | 17 | 16 | 15 | 14 | 13 | 12 |
| Bit | Reserved | | | | | | | | | | | | | | | | | | | |
| Mode | R | | | | | | | | | | | | | | | | | | | |
| Initial Value | 0x0000000 | | | | | | | | | | | | | | | | | | | |

| Initial Value: 0x0000_0000 | | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| Bit | Reserved | | | | | | | | CH_CLK_SRC | | | CH_MODE |
| Mode | R | | | | | | | | RPw | | | RPw |
| Initial Value | 0x0000000 | | | | | | | | 000 | | | 0 |

Bit 0 CH_MODE: Channel mode

0 = Free running counter mode
1 = Forward/backward counter mode

Note: This value can only be modified if channel y (y: 1, 2) was disabled. In Free running counter mode the CMU clock source specified by CH_CLK_SRC is used for the counter. In Forward/Backward counter mode the SUB_INC[y]c clock signal in combination with the DIR[y] input signal is used to determine the counter direction and clock frequency.

Bit 3:1 CH_CLK_SRC: Clock source for channel x (x: 0 . . . 2) time base counter

000 = CMU_CLK0 selected
001 = CMU_CLK1 selected
010 = CMU_CLK2 selected
011 = CMU_CLK3 selected
100 = CMU_CLK4 selected
101 = CMU_CLK5 selected
110 = CMU_CLK6 selected
111 = CMU_CLK7 selected Note: This value can only be modified if channel y was disabled Bit 31:4 Reserved: Reserved Note: Read as zero should be written as zero

| Register TBU_CH[y]_BASE (y: 1, 2) | | | | | | | | | | | | | | | | | |
|---|---|---|---|---|---|---|---|---|---|---|---|---|---|---|---|---|---|
| | Address Offset: 0x08 + x*0x08 | | | | | | | | | | | | | | | | Initial Value: 0x0000_0000 |
| | 31 | 30 | 29 | 28 | 27 | 26 | 25 | 24 | 23 | 22 | 21 | 20 | 19 | 18 | 17 | 16 | 15 |
| Bit | Reserved | | | | | | | | BASE | | | | | | | | |
| Mode | R | | | | | | | | RPw | | | | | | | | |
| Initial Value | 0x00 | | | | | | | | 0x000000 | | | | | | | | |

| Initial Value: 0x0000_0000 | | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | BASE | | | | | | | | | | | | | | |
| Mode | RPw | | | | | | | | | | | | | | |
| Initial Value | 0x000000 | | | | | | | | | | | | | | |

Bit 23:0 BASE: Time base value for channel x (x: 0 . . . 2)
Note: The value of BASE can only by written if the corresponding TBU channel y is disabled
Note: If the corresponding channel y is enabled, a read access to this register provides the current value of the underlying counter.
Bit 31:24 Reserved: Reserved
Note: Read as zero should be written as zero Timer Input Module (TIM)

Overview

The Timer Input Module (TIM) is responsible for filtering and capturing input signals of the GTM. Several characteristics of the input signals can be measured inside the TIM channels. For advanced data processing the detected input characteristics of the TIM module can be routed through the ARU to subsequent processing units of the GTM.

Input characteristics mean either time stamp values of detected input rising or falling edges together with the new signal level or the number of edges received since channel enable together with the actual time stamp or PWM signal durations for a whole PWM period.

Figure 13:
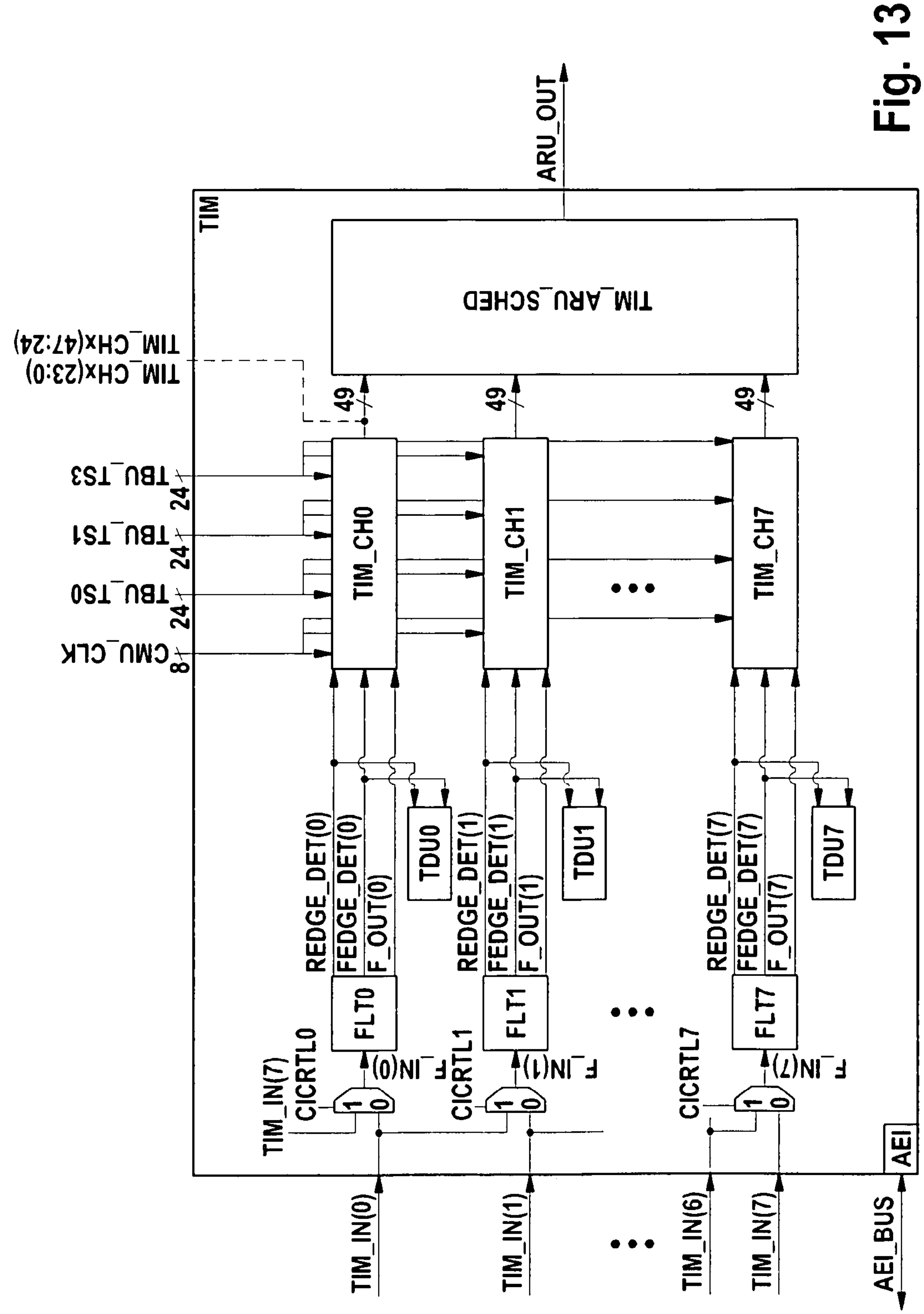

The architecture of TIM is shown in FIG. 13.

TIM Block Diagram

See FIG. 13.

Each of the eight (8) dedicated input signals is filtered inside the FLTx subunit of the TIM Module. It should be noted that the incoming input signals are synchronized to the clock SYS_CLK, resulting in a delay of two SYS_CLK periods for the incoming signals.

The sub module TIM provides different filter mechanisms described in more detail in Chapter 0. After filtering, the signal is routed to the corresponding TIM channel.

The measurement values can be read by the CPU directly via the AEI-Bus or they can be routed through the ARU to other sub modules of the GTM.

For timeout detection of an incoming signal (no subsequent edge detected during a specified duration) each individual channel has a Timeout Detection Unit (TDU).

Two adjacent channels can be combined by setting the CICTRL bit field in the corresponding TIM[i]_CH[x]_CTRL register. This allows for a combination of complex measurements on one input signal with two TIM channels.

For the GTM-IP TIM0 sub module only, the dashed signal outputs TIM[i]_CH[x] (23:0), TIM[i]_CH[x] (47:24) and TIM[i]_CH[x] (48) come from the TIM0 sub module channels zero (0) to five (5) and are connected to MAP sub module. There, they are used for further processing and for routing to the DPLL.

TIM Filter Functionality (FLT)

Overview

The TIM sub module provides a configurable filter mechanism for each input signal. These filter mechanism is provided inside the FLT subunit.

Figure 14:
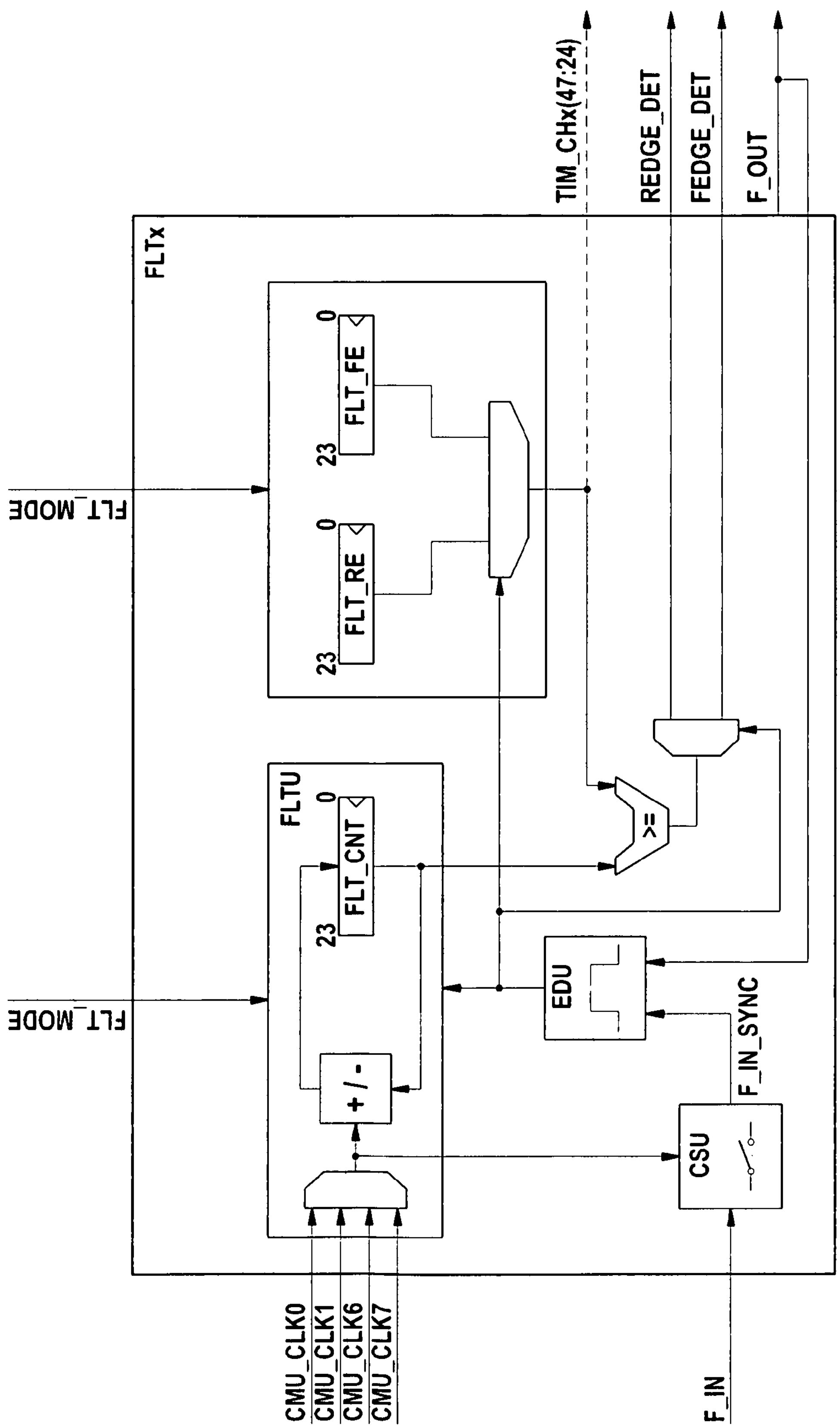

FLT architecture is shown in FIG. 14.

The filter includes a clock synchronisation unit (CSU), an edge detection unit (EDU), and a filter counter associated to the filter unit (FLTU).

The CSU is synchronizing the incoming signal F_IN to the selected filter clock frequency, which is controlled with the bit field FLT_CNT_FRQ of register TIM[i]_CH[x]_CTRL.

The synchronized input signal F_IN_SYNC is used for further processing within the filter.

It should be noted that glitches with a duration less than the selected CMU clock period are lost.

The filter modes can be applied individually to the falling and rising edges of an input signal. The following filter modes are available:

- immediate edge propagation mode,
- individual de-glitch time mode (up/down counter), and
- individual de-glitch time mode (hold counter).

FLT Architecture

See FIG. 14.

The filter parameters (De-Glitch and acceptance time) for the rising and falling edge can be configured inside the two filter parameter registers FLT_RE (rising edge) and FLT_FE (falling edge). The exact meaning of the parameter depends on the filter mode.

However the delay time T of both filter parameters FLT_xE can always be determined by:

$$T=(FLT\_xE+1)*T_{FLT\_CLK},$$

whereas $T_{FLT\_CLK}$ is the clock period of the selected CMU clock signal in bit field FLT_CNT_FRQ of register TIM[i]_CH[x]_CTRL.

When a glitch is detected on an input signal a status flag GLITCHDET is set inside the TIM[i]_CH[x]_IRQ_NOTIFY register.

Table 0 gives an overview about the meanings for the registers FLT_RE and FLT_FE. In the individual De-Glitch time modes, the actual filter threshold for a detected regular edge is provided on the TIM[i]_CH[x] (47:24) output line. In the case of immediate edge propagation mode, a value of zero is provided on the TIM[i]_CH[x] (47:24) output line.

The TIM[i]_CH[x] (47:24) output line is used by the MAP sub module for further processing (please see chapter 0).

Filter Parameter Summary for the Different Filter Modes

| Filter mode | Meaning of FLT_RE | Meaning of FLT_FE |
|---|---|---|
| Immediate edge propagation | Acceptance time for rising edge | Acceptance time for falling edge |
| Individual de-glitch time (up/down counter) | De-glitch time for rising edge | De-glitch time for falling edge |
| Individual de-glitch time (hold counter) | De-glitch time for rising edge | De-glitch time for falling edge |

A counter FLT_CNT is used to measure the glitch and acceptance times.

The frequency of the FLT_CNT counter is configurable in bit field FLT_CNT_FRQ of register TIM[i]_CH[x]_CTRL.

The counter FLT_CNT can either be clock with the CMU_CLK0, CMU_CLK1, CMU_CLK6 or the CMU_CLK7 signal. This signals are coming from the CMU sub module.

The FLT_CNT, FLT_FE and FLT_RE registers are 24-bit width. For example, when the resolution of the CMU_CLK0 signal is 50 ns this allows maximal de-glitch and acceptance times of about 838 ms for the filter.

TIM Filter Modes

Immediate Edge Propagation Mode

In immediate edge propagation mode after detection of an edge the new signal level on F_IN_SYNC is propagated to F_OUT with a delay of one $T_{FLT\_CLK}$ period and the new signal level remains unchanged until the configured acceptance time expires.

For each edge type the acceptance time can be specified separately in the FLT_RE and FLT_FE registers.

Each signal change on the input F_IN_SYNC during the duration of the acceptance time has no effect on the output signal level F_OUT of the filter but it sets the glitch GLITCHDET bit in the TIM[i]_CH[x]_IRQ_NOTIFY register.

After an acceptance time expires the input signal F_IN_SYNC is observed and on signal level change the filter raises a new detected edge and the new signal level is propagated to F_OUT.

Independent of a signal level change the value of F_OUT is always set to F_IN_SYNC when the acceptance time expires (see also 0).

Figure 15:
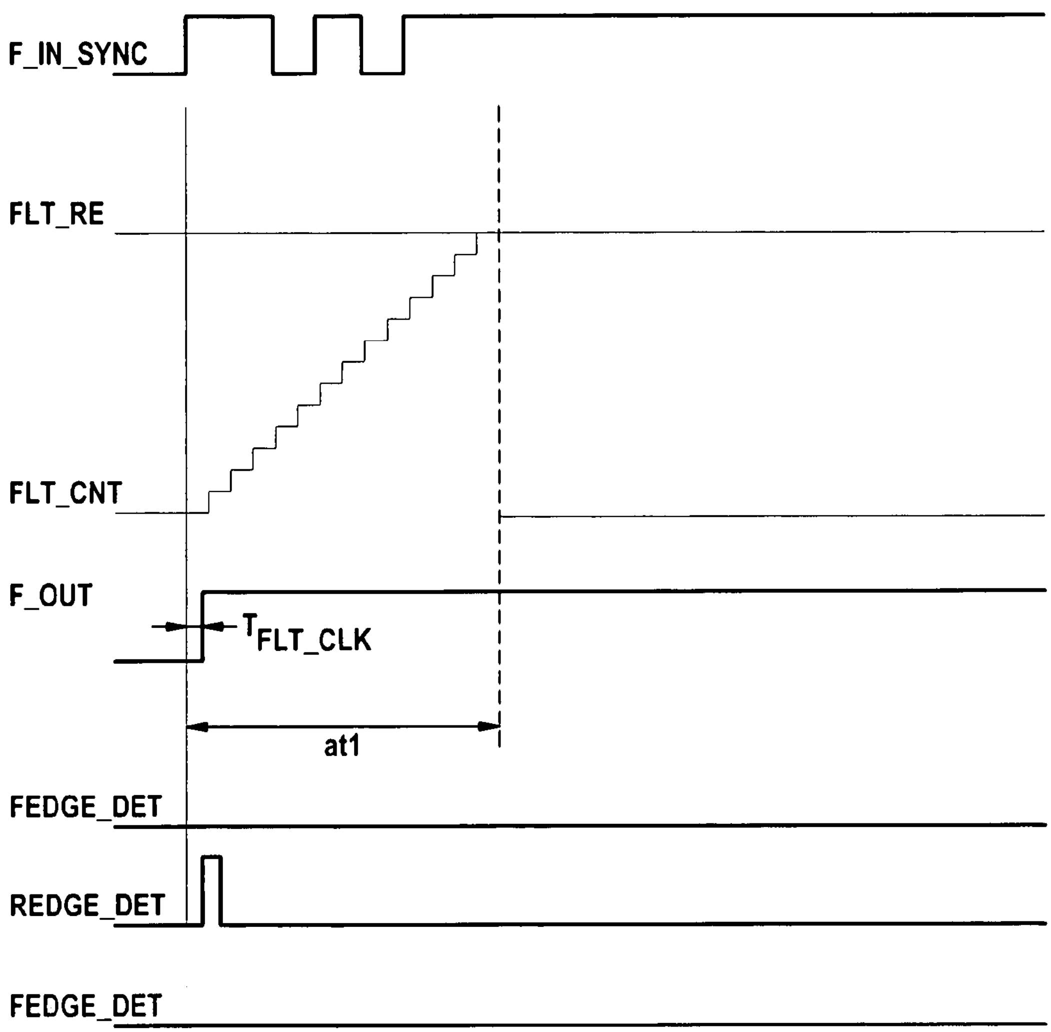

FIG. 15 shows an example for the immediate edge propagation mode, in the case of rising edge detection. Both, the signal before filtering (F_IN) and after filtering (F_OUT) are shown. The acceptance time at1 is specified in the register FLT_RE.

Immediate Edge Propagation Mode in the Case of a Rising Edge

See FIG. 15.

In immediate edge propagation mode the glitch measurement mechanism is not applied to the edge detection. Detected edges on F_IN_SYNC are transferred directly to F_OUT.

The counter FLT_CNT is incremented until acceptance time threshold is reached.

Figure 16:
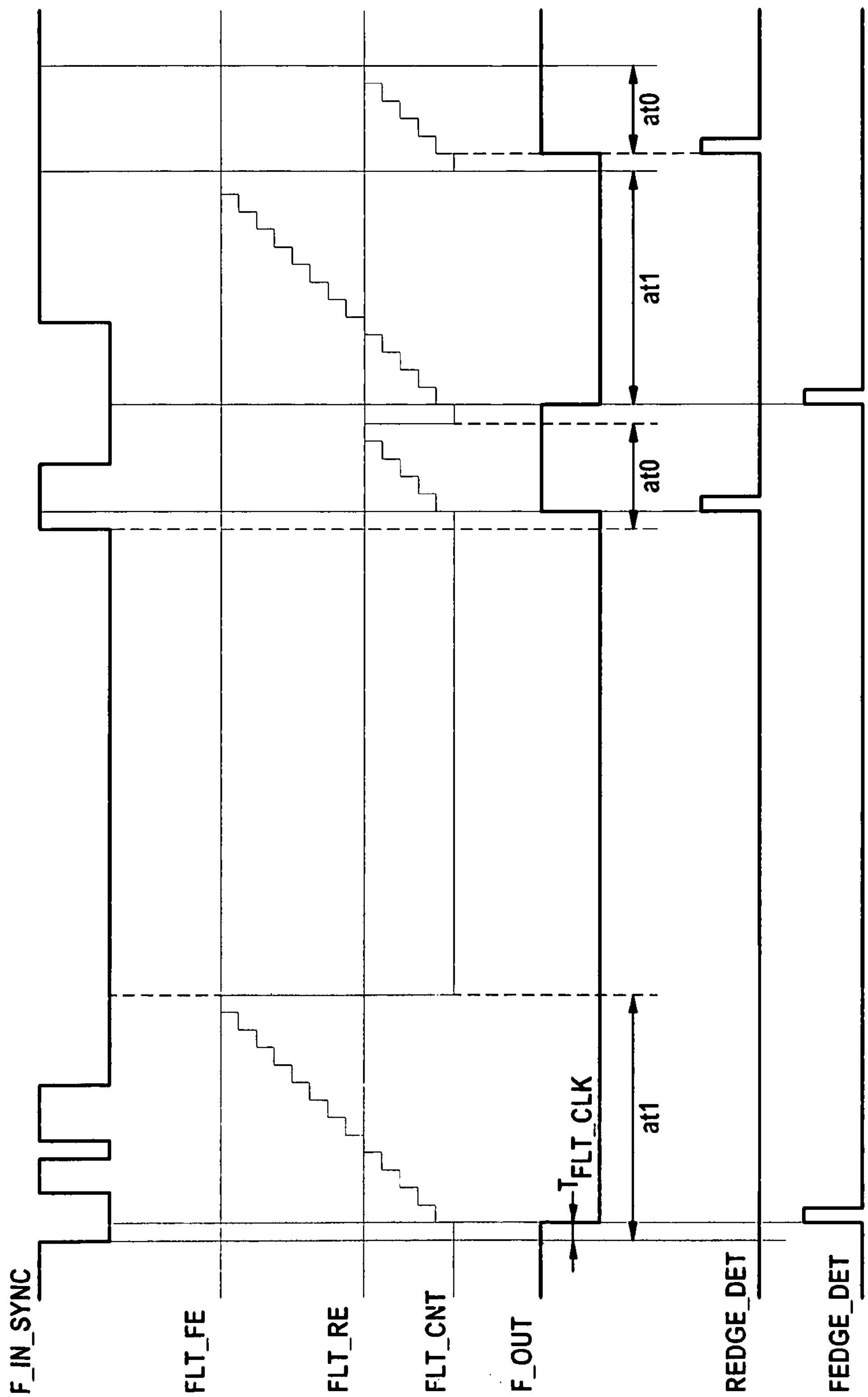

FIG. 16 shows a more complex example of the TIM filter, in which both, rising and falling edges are configured in immediate edge propagation mode.

Immediate Edge Propagation Mode in the Case of a Rising and Falling Edge

See FIG. 16.

If the FLT_CNT has reached the acceptance time for a specific signal edge and the signal F_IN_SYNC has already changed to the opposite level of F_OUT, the opposite signal level is set to F_OUT and the acceptance time measurement is started immediately. FIG. 16 shows this scenario at the detection of the first rising edge and the second falling edge.

Individual De-Glitch Time Mode (Up/Down Counter)

In individual de-glitch time mode (up/down counter) each edge of an input signal can be filtered with an individual de-glitch threshold filter value mentioned in the registers FLT_RE and FLT_FE, respectively.

The filter counter register FLT_CNT is incremented when the signal level on F_IN_SYNC is unequal to the signal level on F_OUT and decremented if F_IN_SYNC equals F_OUT.

If After FLT_CNT has reached a value of zero during decrementation the counter is stopped immediately.

If a glitch is detected a glitch detection bit GLITCHDET is set in the TIM[i]_CH[x]_IRQ_NOTIFY register.

Figure 17:
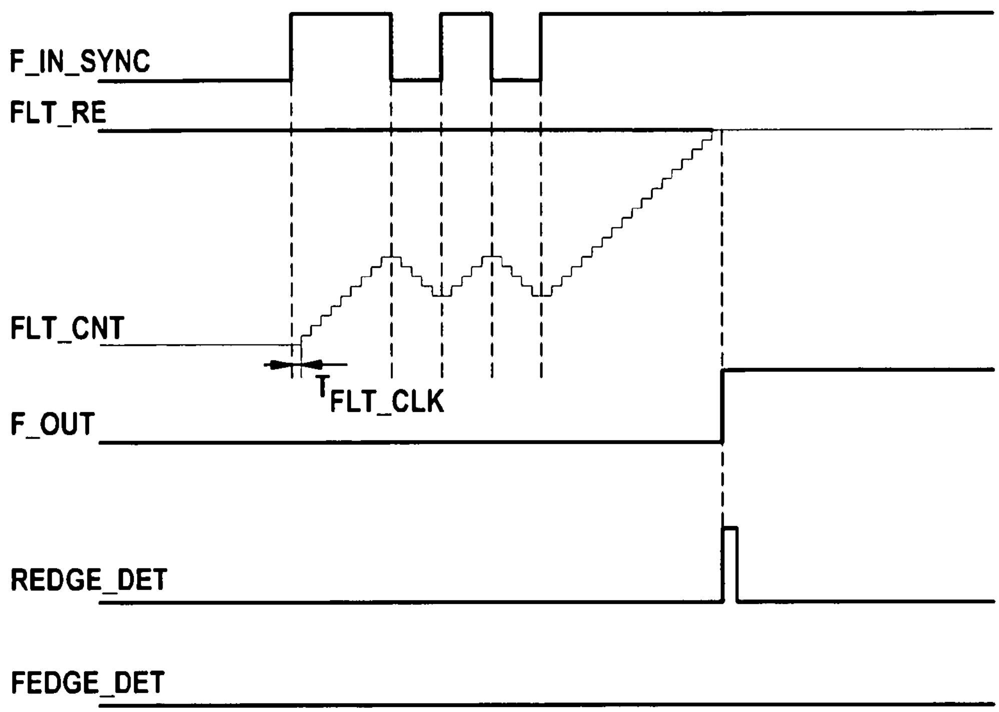

The detected edge signal together with the new signal level is propagated to F_OUT after the individual de-glitch threshold is reached. FIG. 17 shows the behaviour of the filter in individual de-glitch time (up/down counter) mode in the case of the rising edge detection.

Individual De-Glitch Time Mode (up/Down Counter) in the Case of a Rising Edge

See FIG. 17.

Individual De-Glitch Time Mode (hold Counter)

In individual de-glitch time mode (hold counter) each edge of an input signal can be filtered with an individual de-glitch threshold filter value mentioned in the registers FLT_RE and FLT_FE, respectively.

The filter counter register FLT_CNT is incremented when the signal level on F_IN_SYNC is unequal to the signal level on F_OUT and the counter value of FLT_CNT is hold if FIN equals F_OUT.

If a glitch is detected the glitch detection bit GLITCHDET is set in the TIM[i]_CH[x]_IRQ_NOTIFY register.

Figure 18:
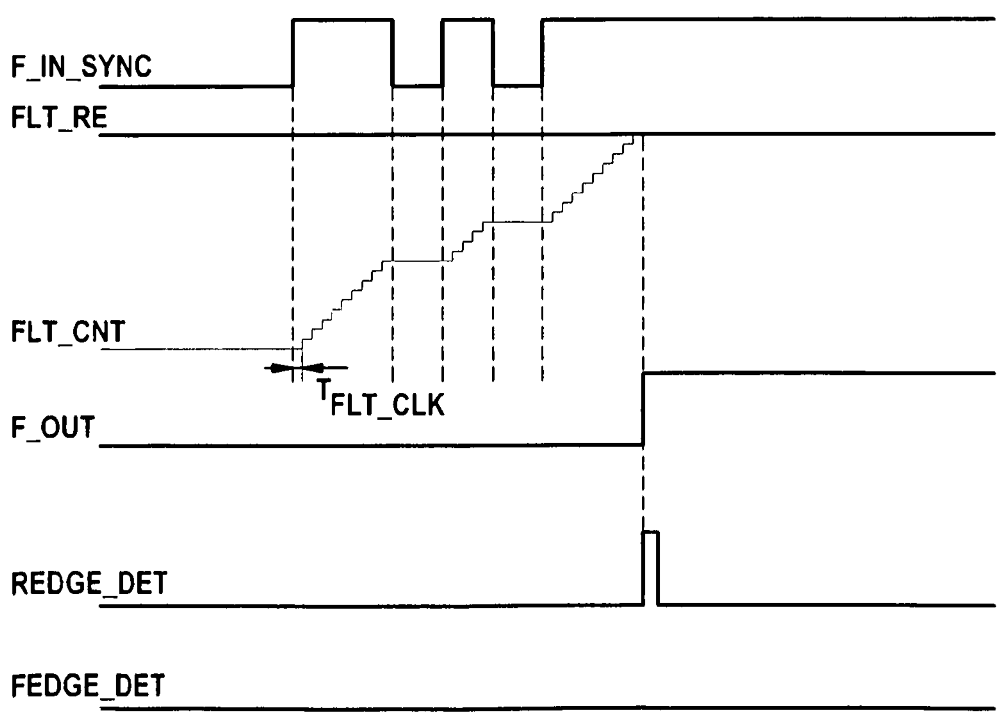

The detected edge signal together with the new signal level is propagated to F_OUT after the individual de-glitch threshold is reached. FIG. 18 shows the behaviour of the filter in individual de-glitch time (hold counter) mode in the case of the rising edge detection.

Individual De-Glitch Time Mode (Hold Counter) in the Case of a Rising Edge

See FIG. 18.

Immediate Edge Propagation and Individual De-Glitch Mode

As already mentioned, the three different filter modes can be applied individually to each edge of the measured signal.

However, if one edge is configured with immediate edge propagation and the other edge with an individual De-Glitch mode (whether up/down counter or hold counter) a special consideration has to be applied.

Figure 19:
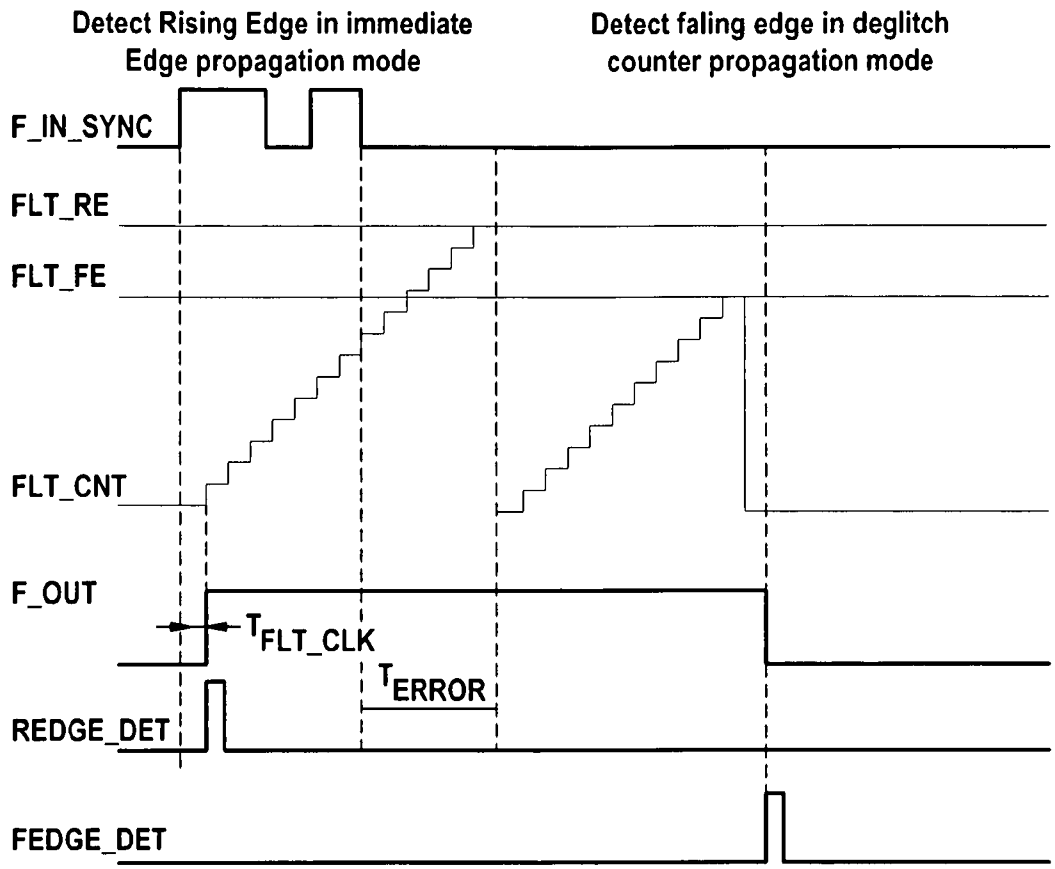

Assume that the rising edge is configured for immediate edge propagation and the falling edge with individual De-Glitch mode (up/down counter) as shown in FIG. 19. If the falling edge of the incoming signal already occurs during the measuring of the acceptance time of the rising edge, the measurement of the De-Glitch time on the falling edge is started delayed, but immediately after the acceptance time measurement phase of the rising edge has finished.

Consequently, the De-Glitch counter can not measure the time $T_{ERROR}$, as shown in FIG. 0.

Mixed Mode Measurement

See FIG. 19.

Timeout Detection Unit (TDU)

The Timeout Detection Unit (TDU) is responsible for timeout detection of the TIM input signals.

Each channel of the TIM sub module has its own Timeout Detection Unit (TDU) where a timeout event can be set up on the filtered input signal of the corresponding channel.

Figure 20:
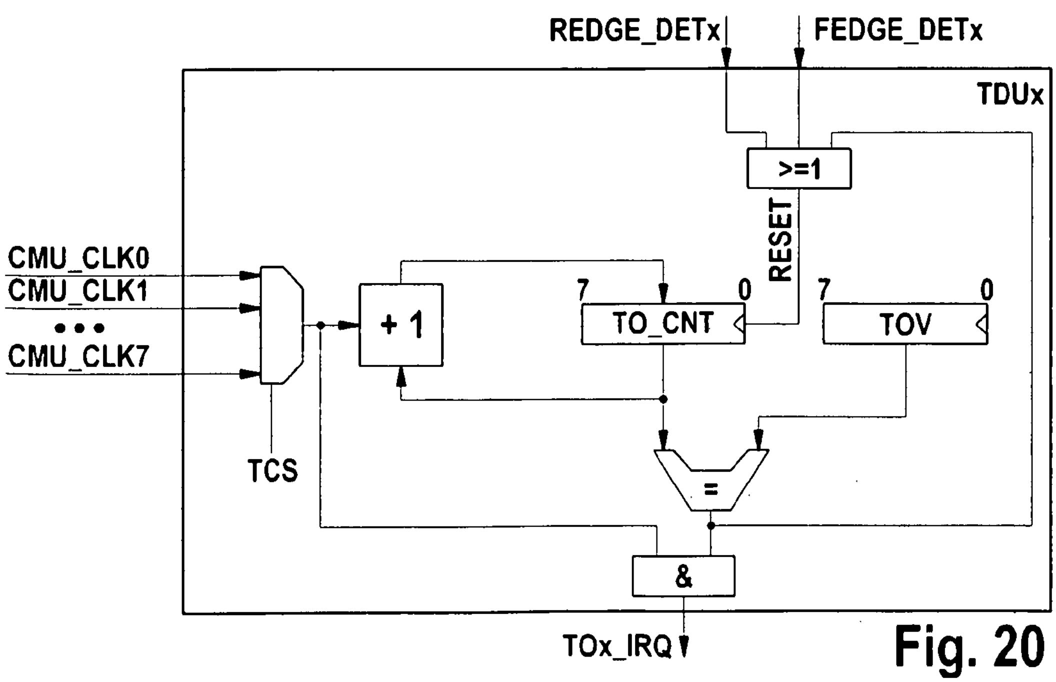

The TDU architecture is shown in FIG. 20.

Architecture of the TDU Subunit

See FIG. 20.

It is possible to detect timeouts with the resolution of the specified CMU_CLKx input signal selected with the bit field TCS of the register TIM[i]_CH[x]_TDU. The individual timeout values have to be specified in number of ticks of the selected input clock signal and have to be specified in the field TOV of timeout value register TIM[i]_CH[x]_TDU of the TIM channel x (x:0 . . . 7).

The exact time out value $T_{TDU}$ can be calculated with:

$$T_{TDU}=(\mathrm{TOV}+1)*T_{CMU\_GCLKx},$$

whereas $T_{CMU\_GCLKx}$ is the clock period of the selected CMU clock signal.

Timeout detection can be enabled or disabled individually inside the TIM[i]_CH[x]_TDU register by setting/resetting the TO_EN bit.

The counter TO_CNT is reset by each detected input edge coming either from the filtered input signal or when the timeout value TOV is reached by the counter TO_CNT.

After such a reset or by enabling the channel inside the TIM[i]_CH[x]_CTRL register the counter TO_CNT starts counting again with the specified clock input signal.

Otherwise, timeout measurements starts immediately after the TO_EN bit inside the TIM[i]_CH[x]_TDU register is written.

The TDU generates an interrupt signal TIM_TODETx_IRQ whenever a timeout is detected for an individual input signal, and the TODET bit is set inside the TIM[i]_CH[x]_IRQ_NOTIFY register.

TIM Channel Architecture

Overview

Each TIM channel consist of an input edge counter ECNT, a Signal Measurement Unit (SMU) with a counter CNT, a counter shadow register CNTS for SMU counter and two general purpose registers GPR0 and GPR1 for value storage.

The value TOV of the timeout register TIM[i]_CH[x]_TDU is provided to TDU subunit of each individual channel for timeout measurement. The architecture of the TIM channel is depicted in FIG. 21.

TIM Channel Architecture

Figure 21:
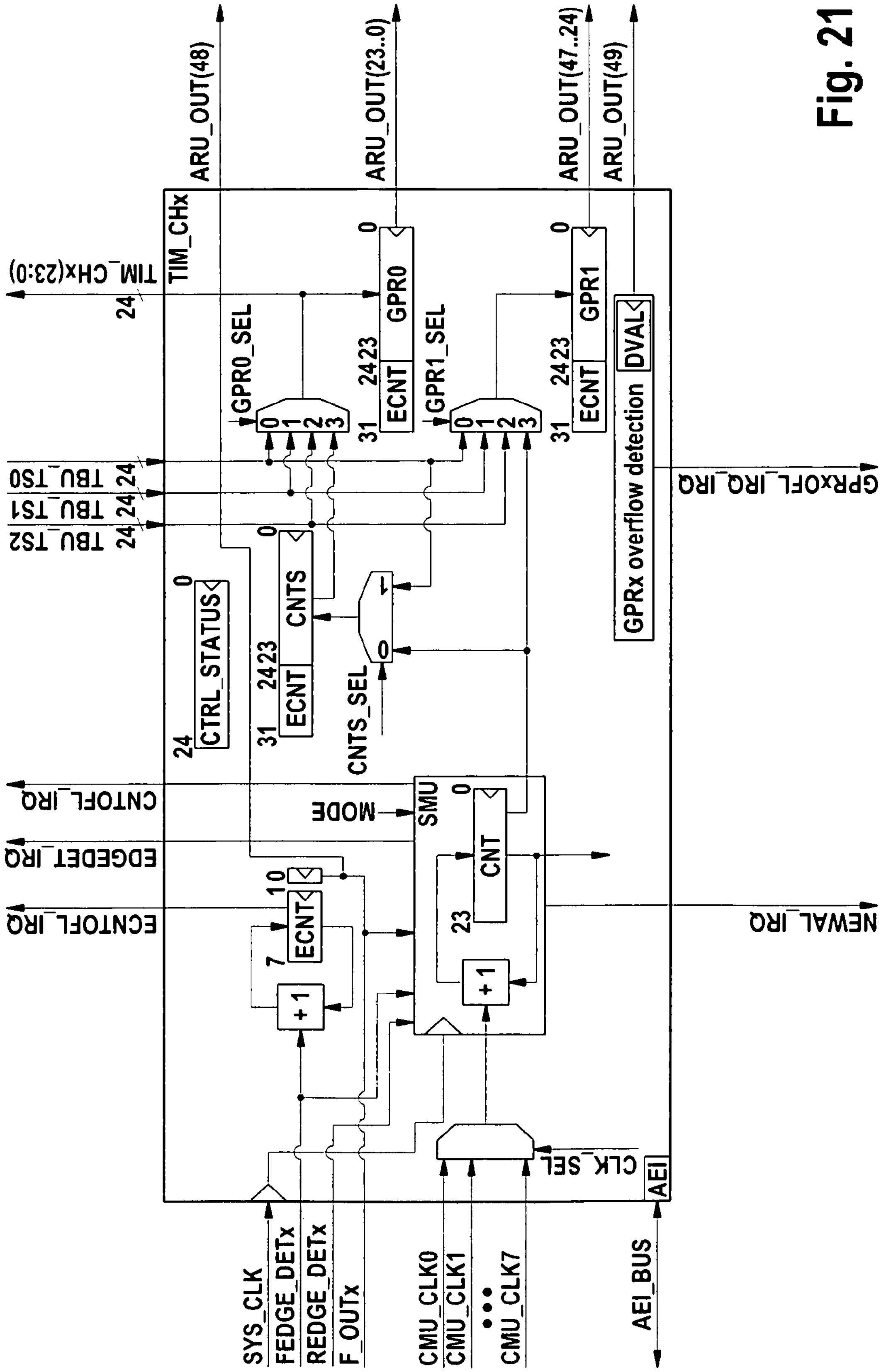

See FIG. 21.

Each TIM channel receives both input trigger signals REDGE_DETx and FEDGE_DETx, generated by the corresponding filter module in order to signalize a detected echo of the input signal F_INx. The signal F_OUTx shows the filtered signal of the channel's input signal F_INx.

The ECNT counts every incoming filtered edge (rising and falling). The counter value is uneven in case of detected rising, and even in case of detected falling edge. Thus, the input signal level is part of the counter and can be obtained by bit 0 of ECNT Thus, the whole 8 bit counter value is always odd, when a positive edge was received and always even, when a negative edge was received.

The current ECNT register content is made visible on the bits 31 down to 24 of the GPRx and CNTS registers. This allows the software to detect inconsistent read accesses to registers GPR0, GPR1, and CNTS.

When new data is written into GPR0 and GPR1 the NEWVAL bit is set in TIM[i]_CH[x]_IRQ_NOTIFY register and depending on corresponding enable bit value the NEWVALx_IRQ interrupt is raised.

If new data was produced by the TIM channel while the old data is not consumed by the CPU (bit NEWVAL is still set inside TIM[i]_CH[x]_IRQ_NOTIFY register), the TIM channel raises a TIM_GPRXOFLx_IRQ interrupt depending on GPRXOFL_IRQ_EN bit, sets the GPRXOFL bit inside the status register TIM[i]_CH[x]_IRQ_NOTIFY and overwrites the data inside the GPRx registers.

Each TIM input channel has an ARU connection for providing data via the ARU to the other GTM sub modules. The data provided to the ARU depends on the TIM channel mode and its corresponding adjustments (e.g. multiplexer configuration).

To guarantee a consistent delivery of data from the GPR0 and GPR1 registers to the ARU or the CPU each TIM channel has to ensure that the data valid signal is raised after both registers have been updated with new and valid data.

The data inside the GPRx registers is marked invalid (DVAL is reset) either the data is read out by the ARU (only if ARU_EN=1) or while the data of register GPR0 is read by CPU (only if ARU_EN=0).

When new values have been calculated inside the CNT and CNTS registers and the DVAL signal is still set, which means the ARU or CPU has not read out the data of GPR0 yet in, the TIM channel raises the data overflow interrupt TIM_GPRXOFLx_IRQ, and it overwrites GPR0 and GPR1 with the new data and sets the DVAL signal valid again.

TIM Channel Modes

The TIM provides five different measurement modes that can be configured with the bit field TIM_MODE of register TIM[i]_CH[x]_CTRL. The measurement modes are described in the following subsections. Besides these different basic measurement modes, there exist distinct configuration bits in the register TIM[i]_CH[x]_CTRL for a more detailed controlling of each mode. The meanings of these bits are as follows:

- DSL: control the signal level for the measurement modes (e.g. if a measurement is started with rising edge or falling edge, or if high level pulses or low level pulses are measured.
- GPR0_SEL and GPR1_SEL: control the actual content of the registers GPR0 and GPR1 after a measurement has finished.
- CNTS_SEL: control the content of the registers CNTS. The actual time for updating the CNTS register is mode dependent.
- OSM: activate measurement in one-shot mode or continuous mode. In one-shot mode only one measurement cycle is performed and after that the channel is disabled.
- NEWVAL: The NEWVAL IRQ interrupt is triggered at the end of a measurement cycle, signalling that the registers GPR0 and GPR1 are updated.
- ARU_EN: enables sending of the registers GPR0 and GPR1 together with the actual signal level (in bit 48) and the overflow signal GPRxOFL (in bit 49) to the ARU.

TIM PWM Measurement Mode (TPWM)

In TIM PWM Measurement Mode the TIM channel measures duty cycle and period of an incoming PWM signal. The DSL bit defines the polarity of the PWM signal to be measured.

When measurement of pulse high time and period is requested (PWM with a high level duty cycle, DSL=1), the channel starts measuring after the first rising edge is detected by the filter.

Measurement is done with the CNT register counting with the configured clock coming from CMU_CLKx until a falling edge is detected.

Then the counter value is stored inside the shadow register CNTS (if CNTS_SEL=0) and the counter CNT counts continuously until the next rising edge is reached.

On this following rising edge the content of the CNTS register is transferred to GPR0 and the content of CNT register is transferred to GPR1, assuming settings for the selectors GPR0_SEL=1 and GPR1_SEL=1. By this, GPR0 contains the duty cycle length and GPR1 contains the period.

In addition the CNT register is cleared NEWVAL status bit inside of TIM[i]_CH[x]_IRQ_NOTIFY status register and depending on corresponding interrupt enable condition TIM_NEWVALx_IRQ interrupt is raised.

If a PWM with a low level duty cycle should be measured (DSL=0), the channel waits for a falling edge until measurement is started. On this edge the low level duty cycle time is stored first in CNTS and then finally in GPR0 and the period is stored in GPR1.

When a PWM period was successfully measured, the data in GPRx registers is marked as valid for reading by the ARU when the ARU_EN bit is set inside TIM[i]_CH[x]_CTRL register, the NEWVAL bit is set inside the TIM[i]_CH[x]_IRQ_NOTIFY register, and a new measurement is started.

If the preceding PWM values were not consumed by a reader attached to the ARU (ARU_EN bit enabled) or by the CPU the TIM channel set GPRXOFL status bit in TIM[i]_CH[x]_IRQ_NOTIFY and depending on corresponding interrupt enable bit value raises a GPRXOFLx_IRQ and overwrites the old values in GPR0 and GPR1. A new measurement is started afterwards.

TIM Pulse Integration Mode (TPIM)

In TIM Pulse Integration Mode each TIM channel is able to measure a sum of pulse high or low times on an input signal, depending on the selected signal level bit DSL of register TIM[i]_CH[x]_CTRL register.

The pulse times are measured by incrementing the TIM channel counter CNT whenever the pulse has the specified signal level DSL. The counter is stopped whenever the input signal has the opposite signal level.

The counter CNT counts with the CMU_CLKx clock specified by the CLK_SEL bit field of the TIM[i]_CH[x]_CTRL register.

The CNT register is reset at the time the channel is activated (enabling via AEI write access) and it accumulates pulses while the channel is staying enabled.

Whenever the counter is stopped, the registers CNTS, GPR0 and GPR1 are updated according to settings of its corresponding input multiplexers, using the bits GPR0_SEL, GPR1_SEL, and CNTS_SEL.

When the ARU_EN bit is set inside the TIM[i]_CH[x]_CTRL register the measurement results of the registers GPR0 and GPR1 can be send to subsequent sub modules attached to the ARU.

TIM Input Event Mode (TIEM)

In TIM Input Event Mode the TIM channel is able to count edges.

It is configurable if rising, falling or both edges should be counted. This can be done with the bit fields DSL and ISL in TIM[i]_CH[x]_CTRL register.

In addition, a TIM[i]_NEWVAL[x]_IRQ interrupt is raised when the configured edge was received and this interrupt was enabled.

The counter register CNT is used to count the number of edges, and the bit fields GPR0_SEL, GPR1_SEL, and CNTS_ SEL can be used to configured the desired update values for the registers GPR0, GPR1 and CNTS. These register are updated whenever the edge counter CNT is incremented due to the arrival of a desired edge. If the preceding data was not consumed by a reader attached to the ARU or by the CPU the TIM channel sets GPRXOFL status bit and raises a GPRXOFL[x]_IRQ if it was enabled in TIM[i]_CH[x]_IRQ_EN register and overwrites the old values in GPR0 and GPR1 with the new ones.

On CNT counter overflow a TIM_CNTOFL[x]_IRQ interrupt is raised (if it was enabled) and a corresponding status bit is set inside the channel interrupt status register TIM[i]_CH[x]_IRQ_NOTIFY.

TIM Input Prescaler Mode (TIPM)

In the TIM Input Prescaler Mode the number of edges which should be detected before a TIM[i]_NEWVAL[x]_IRQ is raised is programmable. In this mode it must be specified in the CNTS register after how many edges the interrupt has to be raised. A value of 0 in CNTS means that after one edge an interrupt is raised, and a value of 1 means that after two edges an interrupt is raised, and so on.

The edges to be counted can be selected by the bit fields DSL and ISL of register TIM[i]_CH[x]_CTRL.

With each triggered interrupt, the registers GPR0 and GPR1 are updated according to bits GPR0_SEL and GPR1_SEL.

TIM Bit Compression Mode (TBCM)

Figure 22:
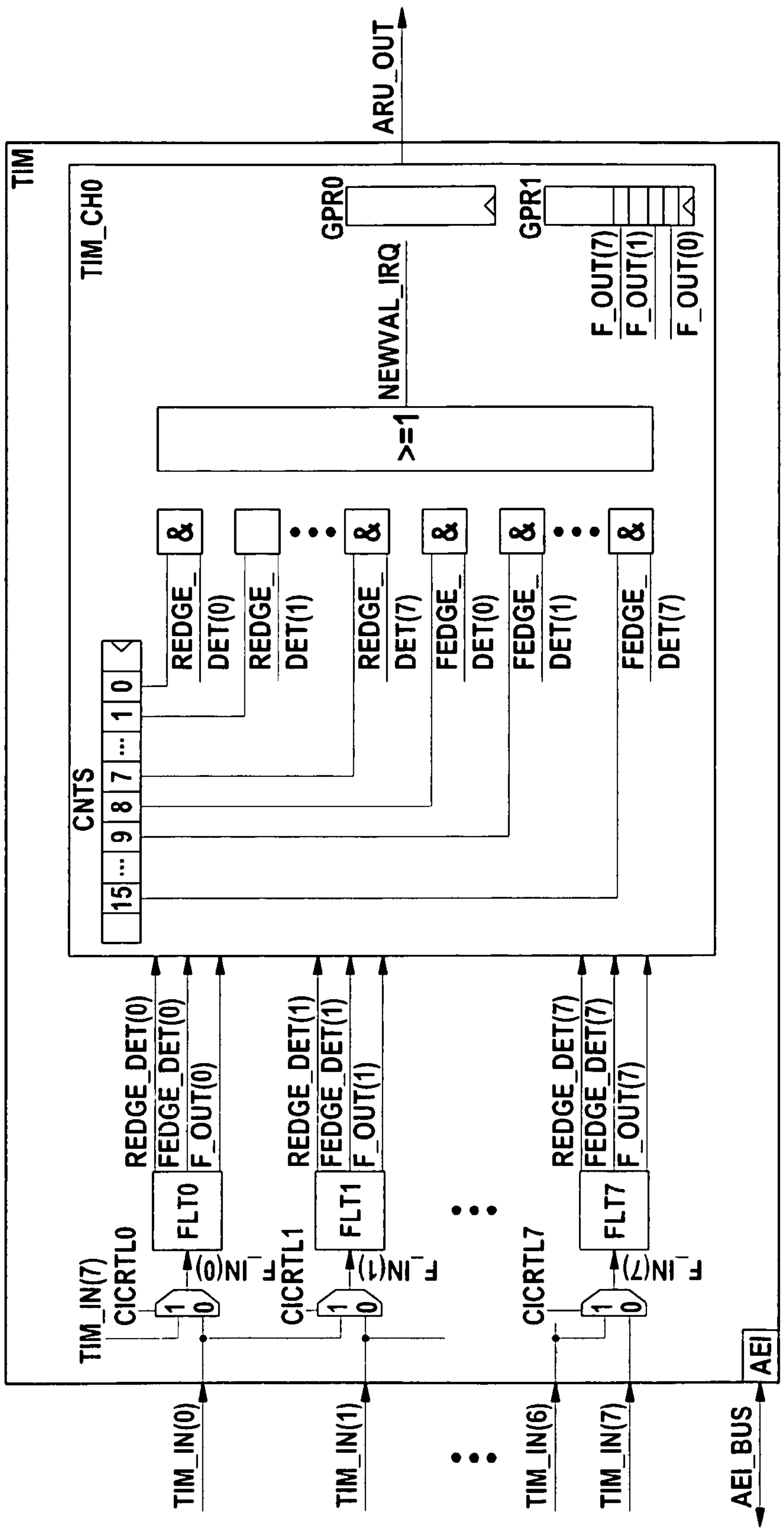

The TIM Bit Compression Mode can be used to combine all filtered input signals of a TIM sub module to a parallel 8 bit data word, which can be routed to the ARU. Since this mode uses all eight input signals with its input filters, it is only available within TIM channel 0 of each TIM sub module. FIG. 22 gives an overview of the TIM bit compression mode.

TIM Bit Compression Mode

See FIG. 22.

A meaningful usage of the TBCM configures all input filters properly, enables TIM channel 0 in bit compression mode and it disables the channels 1 to 7.

The register CNTS of TIM channel 0 is used to configure the event that releases the NEWVAL_IRQ and samples the input signals F_IN(0) to F_IN(7) in ascending order as a parallel data word in GPR1.

The bits 0 to 7 of the CNTS register are used to select the REDGE_DET signals of the TIM filters 0 to 7 as a sampling event, and the bits 8 to 15 are used to select the FEDGE_DET signals of the TIM filters 0 to 7, respectively. If multiple events are selected, the events are OR-combined (see also FIG. 22).

GRP0_SEL selects the timestamp value, which is routed through the ARU.

GRP1_SEL is not applicable in TBCM mode.

If the bit ARU_EN of register TIM[i]_CH0_CTRL is set, the sampled data of register GPR1 is routed together with a time stamp of register GPR0 to the ARU, whenever the NEWVAL_IRQ is released.

MAP Sub Module Interface

The GTM-IP provides one dedicated TIM sub module TIM0 where channels zero (0) to five (5) are connected to the MAP sub module described in Chapter 0. There, the TIM0 sub module channels provide the input signal level together with the actual filter value and the annotated time stamp for the edge together in a 49 bit wide signal to the MAP sub module. This 49 bit wide data signal is marked as valid with a separate valid signal tim0_map_dval[x] (x:0 . . . 5).

| | |
|---|---|
| tim0_map_data0 (48) | signal level bit from tim0_ch0 |
| tim0_map_data0 (47:24) | actual filter value TIM0_CH0_FLT_RE/TIM0_CH0_FLT_FE |
| tim0_map_data0 (23:0) | time stamp value of GRP0 register |
| tim0_map_dval0 | mark tim0_map_data0 valid for one clock cycle |

TIM Interrupt Signals

TIM provides 6 interrupt lines per channel. These interrupts are shown below:

| Signal | Description |
|---|---|
| TIM[i]_NEWVAL[x]_IRQ | New measurement value detected by SMU of channel x (x: 0. . . 7) |
| TIM[i]ECNTOFL[x]_IRQ | ECNT counter overflow of channel x (x: 0 . . . 7) |
| TIM[i]_CNTOFL[x]_IRQ | SMU CNT counter overflow of channel x (x: 0 . . . 7) |
| TIM[i]_GPRXOF[x]_IRQ | GPRx data overflow, old data was not read out before new data has arrived at input pin (x: 0 . . . 7) |
| TIM[i]_TODET[x]_IRQ | Time out reached for input signal of channel x (x: 0 . . . 7) |
| TIM[i]_GLITCHDET_IRQ | A glitch was detected by the TIM filter of channel (x: 0 . . . 7). |

TIM Configuration Registers Overview

TIM contains following configuration registers:

| Register Name | Description | Detail in Section |
|---|---|---|
| TIM[i]_CH[x]_CTRL | channel x (x: 0 . . . 7) control | 0 |
| TIM[i]_CH[x]_FLT_FE | channel x (x: 0 . . . 7) filter parameter 0 | 0 |
| TIM[i]_CH[x]_FLT_RE | channel x (x: 0 . . . 7) filter parameter 1 | 0 |
| TIM[i]_CH[x]_TDU | channel x (x: 0 . . . 7) TDU control. | 0 |
| TIM[i]_CH[x]_GPRO | channel x (x: 0 . . . 7) general purpose 0 | 0 |
| TIM[i]_CH[x]_GPR1 | channel x (x: 0 . . . 7) general purpose 1 | 0 |
| TIM[i]_CH[x]_CNT | channel x (x: 0 . . . 7) SMU counter | 0 |
| TIM[i]_CH[x]_CNTS | channel x (x: 0 . . . 7) SMU shadow counter | 0 |
| TIM[i]_CH[x]_IRQ_NOTIFY | channel x (x: 0 . . . 7) interrupt notification | 0 |
| TIM[i]_CH[x]_IRQ_EN | channel x (x: 0 . . . 7) interrupt enable | 0 |
| TIM[i]_CH[x]_IRQ_FORCINT | channel x (x: 0 . . . 7) software interrupt force | 0 |
| TIM[i]_RST | TIM global software reset | 0 |
| TIM[i]_CH[x]_IRQ_MODE | IRQmode configuration register (x = 0 . . . 7) | 0 |

TIM Configuration Registers Description

Register TIM[i]_CH[x]_CTRL (x: 0 . . . 7)

Address Offset: 0x00 + x*0x80

| | 31 30 29 28 27 | 26 25 24 | 23 | 22 | 21 | 20 |
|---|---|---|---|---|---|---|
| Bit | Reserved | CLK_SEL | FLT_CTR_FE | FLT_MODE_FE | FLT_CTR_RE | FLT_MODE_RE |
| Mode | R | RW | RW | RW | RW | RW |
| Initial Value | 00000 | 000 | 0 | 0 | 0 | 0 |

Address Offset: 0x00 + x*0x80 — Initial Value: 0x0000_0000

| | 19 | 18 17 | 16 | 15 | 14 | 13 | 12 | 11 10 |
|---|---|---|---|---|---|---|---|---|
| Bit | Reserved | FLT_CNT_FRQ | FLT_EN | Reserved | ISL | DSL | CNTS_SEL | GPR1_SEL |
| Mode | R | RW | RW | R | RW | RW | RW | RW |
| Initial Value | 0 | 00 | 0 | 0 | 0 | 0 | 0 | 00 |

Initial Value: 0x0000_0000

| | 9 8 | 7 | 6 | 5 | 4 | 3 2 1 | 0 |
|---|---|---|---|---|---|---|---|
| Bit | GPR0_SEL | Reserved | CICTRL | ARU_EN | OSM | TIM_MODE | TIM_EN |
| Mode | RW | R | RW | RW | RW | RW | RAc |

-continued

| Register TIM[i]_CH[x]_CTRL (x: 0 . . . 7) | | | | | | | | |
|---|---|---|---|---|---|---|---|---|
| | Initial Value | 00 | 0 | 0 | 0 | 0 | 000 | 0 |

Bit 0 TIM_EN: TIM channel x (x: 0 . . . 7) enable
0 = Channel disabled
1 = Channel enabled
Note: Enabling of the channel resets the registers ECNT, TIM[i]_CH[x]_CNT, TIM[i]_CH[x]_GPR0, and TIM[i]_CH[x]_GPR1 to their reset values.
Note: After finishing the action in one-shot mode the TIM_EN bit is cleared automatically. Otherwise, the bit must be cleared manually.
Bit 3:1 TIM_MODE: TIM channel x (x: 0 . . . 7) mode
000 = PWM Measurement Mode (TPWM)
001 = Pulse Integration Mode (TPIM)
010 = Input Event Mode (TIEM)
011 = Input Prescaler Mode (TIPM)
100 = Bit Compression Mode (TBCM)
Note: The Bit Compression Mode is only available in TIM channel 0.
Bit 4 OSM: One-shot mode
0 = Continuous operation mode
1 = One-shot mode
Note: After finishing the action in one-shot mode the TIM_EN bit is cleared automatically.
Bit 5 ARU_EN: GPR0 and GPR1 register values routed to ARU
0 = Registers content not routed
1 = Registers content routed
Bit 6 CICTRL: Channel Input Control.
0 = use signal TIM_IN(x) as input for channel x
1 = use signal TIM_IN(x − 1) as input for channel x (or TIM_IN(7) if x is 0)
Bit 7 Reserved: Reserved
Note: Read as zero, should be written as zero
Bit 9:8 GPR0_SEL: Selection for GPR0 register
00 = use TBU_TS0 as input
01 = use TBU_TS1 as input
10 = use TBU_TS2 as input
11 = use CNTS as input
Bit 11:10 GPR1_SEL: Selection for GPR1 register
00 = use TBU_TS0 as input
01 = use TBU_TS1 as input
10 = use TBU_TS2 as input
11 = use CNT as input
Bit 12 CNTS_SEL: Selection for CNTS register
0 = use CNT register as input
1 = use TBU_TS0 as input
Note: The functionality of the CNTS_SEL is disabled in the modes
TIPM and TBCM.
Bit 13 DSL: Signal level control
0 = Measurement starts with falling edge (low level measurement)
1 = Measurement starts with rising edge (high level measurement)
Bit 14 ISL: Ignore signal level
0 = use DSL bit for selecting active signal level
1 = ignore DSL and treat both edges as active edge
Note: This bit is only applicable in Input Event mode (TIEM)
Bit 15 Reserved: Reserved
Note: Read as zero, should be written as zero
Bit 16 FLT_EN: Filter enable for channel x (x: 0 . . . 7)
0 = Filter disabled and internal states are reset
1 = Filter enabled
Note: If the filter is disabled all filter related units (including CSU) are bypassed, which means that the signal F_IN is directly routed to signal F_OUT.
Bit 18:17 FLT_CNT_FRQ: Filter counter frequency select
00 = FLT_CNT counts with CMU_CLK0
01 = FLT_CNT counts with CMU_CLK1
10 = FLT_CNT counts with CMU_CLK6
11 = FLT_CNT counts with CMU_CLK7
Bit 19 Reserved: Reserved
Note: Read as zero, should be written as zero
Bit 20 FLT_MODE_RE: Filter mode for rising edge.
0 = Immediate edge propagation mode
1 = individual de-glitch mode
Bit 21 FLT_CTR_RE: Filter counter mode for rising edge.
0 = Up/Down Counter
1 = Hold Counter
Note: This bit is only applicable in Individual De-Glitch Time Mode
Bit 22 FLT_MODE_FE: Filter mode for falling edge.
0 = Immediate edge propagation mode
1 = individual de-glitch mode
Bit 23 FLT_CTR_FE: Filter counter mode for falling edge.
0 = Up/Down Counter
1 = Hold Counter
Note: This bit is only applicable in Individual De-Glitch Time Mode
Bit 26:24 CLK_SEL: CMU clock source select for channel.

-continued

| Register TIM[i]_CH[x]_CTRL (x: 0 . . . 7) |
| --- |
| 000 = CMU_CLK0 selected<br>001 = CMU_CLK1 selected<br>010 = CMU_CLK2 selected<br>011 = CMU_CLK3 selected<br>100 = CMU_CLK4 selected<br>101 = CMU_CLK5 selected<br>110 = CMU_CLK6 selected<br>111 = CMU_CLK7 selected<br>Bit 31:27 Reserved: Reserved<br>Note: Read as zero, should be written as zero |

| Register TIM[i]_CH[x]_FLT_RE (x: 0 . . . 7) | | |
| --- | --- | --- |
| | Address Offset: 0x04 + x*0x80 | Initial Value: 0x0000_0000 |
| | 31 30 29 28 27 26 25 24 23 22 21 20 19 18 17 16 | 15 |
| Bit | Reserved / FLT_RE | |
| Mode | R / RW | |
| Initial Value | 0x00 / 0x000000 | |

| | Initial Value: 0x0000_0000 |
| --- | --- |
| | 14 13 12 11 10 9 8 7 6 5 4 3 2 1 0 |
| Bit | FLT_RE |
| Mode | RW |
| Initial Value | 0x000000 |

Bit 23:0 FLT_RE: Filter parameter for rising edge.
Note: This register has different meanings in the various filter modes.
Immediate edge propagation mode = acceptance time for rising edge
Individual De-Glitch time mode = De-Glitch time for rising edge
Bit 31:24 Reserved: Reserved
Note: Read as zero, should be written as zero

| Register TIM[i]_CH[x]_FLT_FE (x: 0 . . . 7) | | |
| --- | --- | --- |
| | Address Offset: 0x08 + x*0x80 | Initial Value: 0x0000_0000 |
| | 31 30 29 28 27 26 25 24 23 22 21 20 19 18 17 16 | 15 |
| Bit | Reserved / FLT_FE | |
| Mode | R / RW | |
| Initial Value | 0x00 / 0x000000 | |

| | Initial Value: 0x0000_0000 |
| --- | --- |
| | 14 13 12 11 10 9 8 7 6 5 4 3 2 1 0 |
| Bit | FLT_FE |
| Mode | RW |
| Initial Value | 0x000000 |

Bit 23:0 FLT_FE: Filter parameter for falling edge.

Note: This register has different meanings in the various filter modes. Immediate edge propagation mode = acceptance time for falling edge Individual De-Glitch time mode = De-Glitch time for falling edge
Bit 31:24 Reserved: Reserved Note: Read as zero, should be written as zero

| Register TIM[i]_CH[x]_TDU (x: 0 . . . 7) | | | |
|---|---|---|---|
| | Address Offset: 0x0C + x*0x80 | | Initial Value: 0x0000_0000 |
| | 31 30 29 28 27 26 25 24 | 23 22 21 20 19 18 17 16 | 15 14 |
| Bit | Reserved | TO_CNT | TOV |
| Mode | R | R | RW |
| Initial Value | 0x00 | 0x00 | 0x00 |

| | Initial Value: 0x0000_0000 | | | |
|---|---|---|---|---|
| | 13 12 11 10 9 8 | 7 6 5 4 | 3 2 1 | 0 |
| Bit | TOV | Reserved | TCS | TO_EN |
| Mode | RW | | RW | RW |
| Initial Value | 0x00 | 0x0 | 000 | 0 |

Bit 0 TO_EN: Timeout detection unit enable
0 = TDU disabled
1 = TDU enabled
Bit 3:1 TCS: Timeout Clock selection
000 = CMU_CLK0 selected
001 = CMU_CLK1 selected
010 = CMU_CLK2 selected
011 = CMU_CLK3 selected
100 = CMU_CLK4 selected
101 = CMU_CLK5 selected
110 = CMU_CLK6 selected
111 = CMU_CLK7 selected
Bit 7:4 Reserved: Reserved
Note: Read as zero, should be written as zero
Bit 15:8 TOV: Time out duration for channel x (x: 0 . . . 7).
Bit 23:16 TO_CNT: Current Timeout value for channel x (x: 0 . . . 7).
Bit 31:24 Reserved: Reserved
Note: Read as zero, should be written as zero

| Register TIM[i]_CH[x]_GPR0 (x: 0 . . . 7) | | | |
|---|---|---|---|
| | Address Offset: 0x10 + x*0x80 | | Initial Value: 0x0X00_0000 |
| | 31 30 29 28 27 26 25 24 | 23 22 21 20 19 18 17 16 | 15 |
| Bit | ECNT | GPR0 | |
| Mode | R | R | |
| Initial Value | 0x00 | 0x000000 | |

| | Initial Value: 0x0X00_0000 |
|---|---|
| | 14 13 12 11 10 9 8 7 6 5 4 3 2 1 0 |
| Bit | GPR0 |
| Mode | R |
| Initial Value | 0x000000 |

Bit 23:0 GPR0: Input signal characteristic parameter 0.

Note: The content of this register has different meaning for the TIM channels modes. The content directly depends on the bit field GPR0_SEL of register TIM[i]_CH[x]_CTRL.

Bit 31:24 ECNT: Edge counter.

Note: The ECNT counts every incoming filtered edge (rising and falling). The counter value is uneven in case of detected rising, and even in case of detected falling edge. Thus, the input signal level is part of the counter and can be obtained by bit 0 of ECNT.

Note: The ECNT register is reset to its initial value when the channel is enabled. Please note, that bit 0 depends on the input level coming from the filter unit and defines the reset value immediately.

| Register TIM[i]_CH[x]_GPR1 (x: 0 . . . 7) | | | | | | | | | | | | | | | | | |
|---|---|---|---|---|---|---|---|---|---|---|---|---|---|---|---|---|---|
| | Address Offset: 0x14 + x*0x80 | | | | | | | | | | | | | | | | Initial Value: 0x0X00_0000 |
| | 31 | 30 | 29 | 28 | 27 | 26 | 25 | 24 | 23 | 22 | 21 | 20 | 19 | 18 | 17 | 16 | 15 |
| Bit | ECNT | | | | | | | | GPR1 | | | | | | | | |
| Mode | R | | | | | | | | R | | | | | | | | |
| Initial Value | 0x00 | | | | | | | | 0x000000 | | | | | | | | |

| | Initial Value: 0x0X00_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | GPR1 | | | | | | | | | | | | | | |
| Mode | R | | | | | | | | | | | | | | |
| Initial Value | 0x000000 | | | | | | | | | | | | | | |

Bit 23:0 GPR1: Input signal characteristic parameter 1.

Note: The content of this register has different meaning for the TIM channels modes. The content directly depends on the bit field GPR1_SEL of register TIM[i]_CH[x]_CTRL.

Bit 31:24 ECNT: Edge counter.

Note: The ECNT counts every incoming filtered edge (rising and falling). The counter value is uneven in case of detected rising, and even in case of detected falling edge. Thus, the input signal level is part of the counter and can be obtained by bit 0 of ECNT.

Note: The ECNT register is reset to its initial value when the channel is enabled. Please note, that bit 0 depends on the input level coming from the filter unit and defines the reset value immediately.

| Register TIM[i]_CH[x]_CNT (x: 0 . . . 7) | | | | | | | | | | | | | | | | | |
|---|---|---|---|---|---|---|---|---|---|---|---|---|---|---|---|---|---|
| | Address Offset: 0x18 + x*0x80 | | | | | | | | | | | | | | | | Initial Value: 0x0000_0000 |
| | 31 | 30 | 29 | 28 | 27 | 26 | 25 | 24 | 23 | 22 | 21 | 20 | 19 | 18 | 17 | 16 | 15 |
| Bit | Reserved | | | | | | | | CNT | | | | | | | | |
| Mode | R | | | | | | | | R | | | | | | | | |
| Initial Value | 0x00 | | | | | | | | 0x000000 | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | CNT | | | | | | | | | | | | | | |
| Mode | R | | | | | | | | | | | | | | |
| Initial Value | 0x000000 | | | | | | | | | | | | | | |

Bit 23:0 CNT: Actual SMU counter value

Note: The meaning of this value depends on the configured mode:

TPWM = actual duration of PWM signal.

TPIM = actual duration of all pulses (sum of pulses).

TIEM = actual number of received edges.

TIPM = actual number of received edges.

Bit 31:24 Reserved: Reserved

Note: Read as zero, should be written as zero

Register TIM[i]_CH[x]_CNTS (x: 0 . . . 7)

Address Offset: 0x1C + x * 0x80

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | ECNT | | | | | | | | CNTS | | | | | | | |
| Mode | R | | | | | | | | RPw | | | | | | | |
| Initial Value | 0x00 | | | | | | | | 0x000000 | | | | | | | |

Initial Value: 0x0X00_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | CNTS | | | | | | | | | | | | | | | |
| Mode | RPw | | | | | | | | | | | | | | | |
| Initial Value | 0x000000 | | | | | | | | | | | | | | | |

Bit 23:0 CNTS: Counter shadow register.

Note: The content of this register has different meaning for the TIM channels modes. The content depends directly on the bit field CNTS_SEL of register TIM[i]_CH[x]_CTRL.

Note: The register TIM[i]_CH[x]_CNTS is only writable in TIPM and TBCM mode.

Note: Closing edge means the edge that defines the end of the pulse signal level, e.g. when high pulse times are to be measured the 0x0X00_0000 alling edge is the closing edge.

Bit 31:24 ECNT: Edge counter.

Note: The ECNT counts every incoming filtered edge (rising and falling). The counter value is uneven in case of detected rising, and even in case of detected falling edge. Thus, the input signal level is part of the counter and can be obtained by bit 0 of ECNT.

Note: The ECNT register is reset to its initial value when the channel is enabled. Please note, that bit 0 depends on the input level coming from the filter unit and defines the reset value immediately.

Register TIM[i]_CH[x]_IRQ_NOTIFY (x: 0 . . . 7)

Address Offset: 0x20 + x * 0x80 Initial Value: 0x0000_0000

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 |
|---|---|---|---|---|---|---|---|---|---|---|---|---|---|---|---|---|---|---|---|---|---|---|
| Bit | Reserved | | | | | | | | | | | | | | | | | | | | | |
| Mode | R | | | | | | | | | | | | | | | | | | | | | |
| Initial Value | 0x0000000 | | | | | | | | | | | | | | | | | | | | | |

Initial Value: 0x0000_0000

| | 9 | 8 | 7 | 6 | 5 | 4 | 3 | 2 | 1 | 0 |
|---|---|---|---|---|---|---|---|---|---|---|
| Bit | Reserved | | | | GLITCHDET | TODET | GPRxOFL | CNTOFL | ECNTOFL | NEWVAL |
| Mode | R | | | | RCw | RCw | RCw | RCw | RCw | RCw |
| Initial Value | 0x0000000 | | | | 0 | 0 | 0 | 0 | 0 | 0 |

Bit 0 NEWVAL: New measurement value detected by in channel x (x: 0 . . . 7)

0 = No event was occurred

1 = NEWVAL was occurred on the TIM channel

Note: This bit will be cleared on a CPU write access of value '1'. A read access leaves the bit unchanged.

Bit 1 ECNTOFL: ECNT counter overflow of channel x, (x: 0 . . . 7). See bit 1.

Bit 2 CNTOFL: SMU CNT counter overflow of channel x, (x: 0 . . . 7). See bit 1.

Bit 3 GPRxOFL: GPRx data overflow, old data not read out before new data has arrived at input pin, (x: 0 . . . 7). See bit 1.

Bit 4 TODET: Timeout reached for input signal of channel x, (x: 0 . . . 7). See bit 1.

Bit 5 GLITCHDET: Glitch detected on channel x, (x: 0 . . . 7).

0 = no glitch detected for last edge

1 = glitch detected for last edge

Note: This bit will be cleared on a CPU write access of value '1'. A read access leaves the bit unchanged.

Bit 31:6 Reserved: Reserved

Note: Read as zero, should be written as zero

| Register TIM[i]_CH[x]_IRQ_EN(x: 0 . . . 7) | | | | | | | | | | | | | | | | | | | | | | | | | | |
|---|---|---|---|---|---|---|---|---|---|---|---|---|---|---|---|---|---|---|---|---|---|---|---|---|---|---|
| | Address Offset: 0x24 + x * 0x80 | | | | | | | | | | | | | | | | Initial Value: 0x0000_0000 | | | | | | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 |
| Bit | Reserved | | | | | | | | | | | | | | | | | | | | | | | | | |
| Mode | R | | | | | | | | | | | | | | | | | | | | | | | | | |
| Initial Value | 0x0000000 | | | | | | | | | | | | | | | | | | | | | | | | | |

| | Initial Value: 0x0000_0000 | | | | | |
|---|---|---|---|---|---|---|
| | 5 | 4 | 3 | 2 | 1 | 0 |
| Bit | GLITCHDET_IRQ_EN | TODET_IRQ_EN | GPRxOFL_IRQ_EN | CNTOFL_IRQ_EN | ECNTOFL_IRQ_EN | NEWVAL_IRQ_EN |
| Mode | RW | RW | RW | RW | RW | RW |
| Initial Value | 0 | 0 | 0 | 0 | 0 | 0 |

Bit 0 NEWVAL_IRQ_EN: TIM_NEWVALx_IRQ interrupt enable

0 = Disable interrupt, interrupt is not visible outside GTM-IP

1 = Enable interrupt, interrupt is visible outside GTM-IP

Bit 1 ECNTOFL_IRQ_EN: TIM_ECNTOFLx_IRQ interrupt enable, see bit 0.

Bit 2 CNTOFL_IRQ_EN: TIM_CNTOFLx_IRQ interrupt enable, see bit 0.

Bit 3 GPRxOFL_IRQ_EN: TIM_GPRxOFLx_IRQ interrupt enable, see bit 0.

Bit 4 TODET_IRQ_EN: TIM_TODETx_IRQ interrupt enable, see bit 0.

Bit 5 GLITCHDET_IRQ_EN: TIM_GLITCHDETx_IRQ interrupt enable, see bit 0.

Bit 31:6 Reserved: Reserved

Note: Read as zero, should be written as zero

| Register TIM[i]_CH[x]_IRQ_FORCINT (x: 0 . . . 7) | | | | | | | | | | | | | | | | | | | | | | | | | | |
|---|---|---|---|---|---|---|---|---|---|---|---|---|---|---|---|---|---|---|---|---|---|---|---|---|---|---|
| | Address Offset: 0x28 + x * 0x80 | | | | | | | | | | | | | | | | Initial Value: 0x0000_0000 | | | | | | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 |
| Bit | Reserved | | | | | | | | | | | | | | | | | | | | | | | | | |
| Mode | R | | | | | | | | | | | | | | | | | | | | | | | | | |
| Initial Value | 0x000000 | | | | | | | | | | | | | | | | | | | | | | | | | |

| | Initial Value: 0x0000_0000 | | | | | |
|---|---|---|---|---|---|---|
| | 5 | 4 | 3 | 2 | 1 | 0 |
| Bit | TRG_GLITCHDET | TRG_TODET | TRG_GPRxOFL | TRG_CNTOFL | TRG_ECNTOFL | TRG_NEWVAL |
| Mode | RAw | RAw | RAw | RAw | RAw | RAw |
| Initial Value | 0 | 0 | 0 | 0 | 0 | 0 |

Bit 0 TRG_NEWVAL: Trigger NEWVAL bit in TIM_CHx_IRQ_NOTIFY register by software

0 = No interrupt triggering

1 = Assert corresponding field in TIM[i]_CH[x]_IRQ_NOTIFY register

Note: This bit is cleared automatically after write.

Bit 1 TRG_ECNTOFL: Trigger ECNTOFL bit in TIM_CHx_IRQ_NOTIFY register by software, see bit 0.

Bit 2 TRG_CNTOFL: Trigger CNTOFL bit in TIM_CHx_IRQ_NOTIFY register by software, see bit 0.

Bit 3 TRG_GPRxOFL: Trigger GPRXOFL bit in TIM_CHx_IRQ_NOTIFY register by software, see bit 0.

Bit 4 TRG_TODET: Trigger TODET bit in TIM_CHx_IRQ_NOTIFY register by software, see bit 0.

Bit 5 TRG_GLITCHDET: Trigger GLITCHDET bit in TIM_CHx_IRQ_NOTIFY register by software, see bit 0.

Bit 31:6 Reserved: Reserved

Note: Read as zero, should be written as zero

Register TIM[i]_CH[x]_IRQ_MODE (x: 0 . . . 7)

| | Address Offset: 0x2C + x * 0x80 | Initial Value: 0x0000_0000 |
|---|---|---|
| | 31 30 29 28 27 26 25 24 23 22 21 20 19 18 17 16 | 15 14 13 12 |
| Bit | Reserved | |
| Mode | R | |
| Initial Value | 0x00000000 | |

| | Initial Value: 0x0000_0000 | |
|---|---|---|
| | 11 10 9 8 7 6 5 4 3 2 | 1 0 |
| Bit | Reserved | IRQ_MODE |
| Mode | R | RW |
| Initial Value | 0x00000000 | 00 |

Bit 1:0 IRQ_MODE: IRQ mode selection

00 = Level mode

01 = Pulse mode

10 = Pulse-Notify mode

11 = Single-Pulse mode

Note: The interrupt modes are described in section 0.

Bit 31:2 Reserved: Reserved

Note: Read as zero, should be written as zero

Register TIM[i]_RST

| | Address Offset: 0x400 | Initial Value: 0x0000_0000 |
|---|---|---|
| | 31 30 29 28 27 26 25 24 23 22 21 20 19 18 17 16 | 15 14 13 12 11 10 9 8 |
| Bit | Reserved | |
| Mode | R | |
| Initial Value | 0x000000 | |

| | 7 | 6 | 5 | 4 | 3 | 2 | 1 | 0 |
|---|---|---|---|---|---|---|---|---|
| | Initial Value: 0x0000_0000 | | | | | | | |
| Bit | RST_CH7 | RST_CH6 | RST_CH5 | RST_CH4 | RST_CH3 | RST_CH2 | RST_CH1 | RST_CH0 |
| Mode | RAw | RAw | RAw | RAw | RAw | RAw | RAw | RAw |
| Initial Value | 0 | 0 | 0 | 0 | 0 | 0 | 0 | 0 |

Bit 0 RST_CH0: Software reset of channel 0

0 = No action

1 = Reset channel 0

Note: This bit is cleared automatically after write by CPU. The channel registers are set to their reset values and channel operation is stopped immediately.

Bit 1 RST_CH1: Software reset of channel 1, see bit 0.

Bit 2 RST_CH2: Software reset of channel 2, see bit 0.

Bit 3 RST_CH3: Software reset of channel 3, see bit 0.

Bit 4 RST_CH4: Software reset of channel 4, see bit 0.

Bit 5 RST_CH5: Software reset of channel 5, see bit 0.

Bit 6 RST_CH6: Software reset of channel 6, see bit 0.

Bit 7 RST_CH7: Software reset of channel 7, see bit 0.

Bit 31:8 Reserved: Reserved

Note: Read as zero, should be written as zero

Timer Output Module (TOM)

Overview

The Timer Output Module (TOM) offers 16 independent channels to generate simple PWM signals at each output pin TOM[i]_CH[x]_OUT (x=0 . . . 15).

Additionally, at TOM output TOM[i]_CH15_OUT a pulse count modulated signal can be generated.

Figure 23:
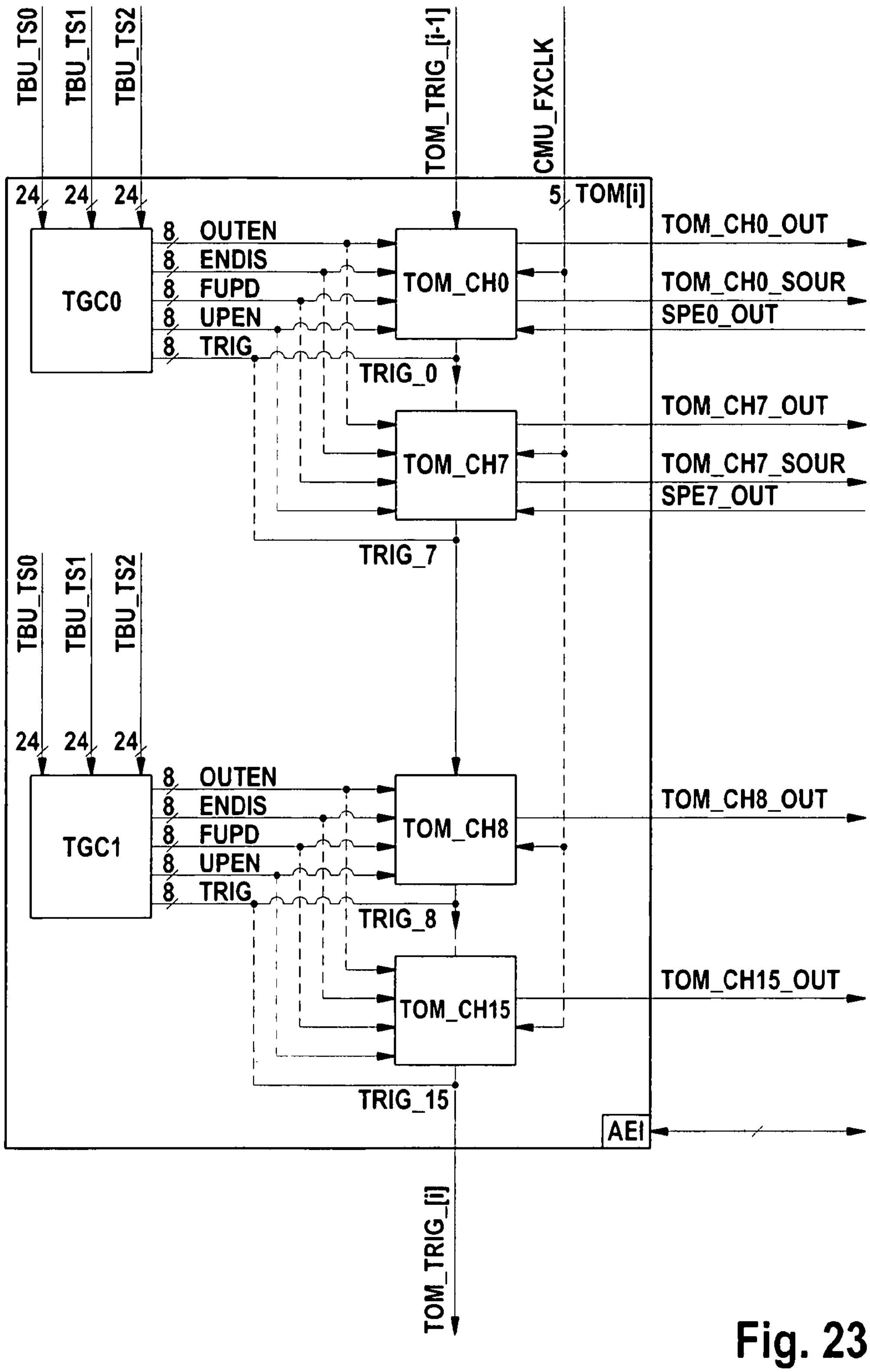

The architecture of the TOM sub module is depicted in FIG. 23.

TOM Block Diagram

See FIG. 23.

The two sub modules TGC0 and TGC1 are global channel control units that control the enabling/disabling of the channels and their outputs as well as the update of their period and duty cycle register.

The module TOM receives two (three) timestamp values TBU_TS0 , TBU_TS1 (and TBU_TS2) in order to realize synchronized output behaviour on behalf of a common time base.

The 5 dedicated clock line inputs CMU_FXCLK are providing divided clocks that can be selected to clock the output pins.

TOM Global Channel Control (TGCx)

Overview

There exist two global channel control units (TGC0 and TGC1) to drive a number of individual TOM channels synchronously by external or internal events.

One TGCx can drive up to eight TOM channels where TGC0 controls TOM channels 0 to 7 and TGC1 controls TOM channels 8 to 15.

The TOM sub module supports four different kinds of signalling mechanisms:

- Global enable/disable mechanism for each TOM channel with control register TOM[i]_TGC[x]_ENDIS_CTRL and status register TOM[i]_TGC[x]_ENDIS_STAT (with x=0,1)
- Global output enable mechanism for each TOM channel with control register TOM[i]_TGC[x]_OUTEN_CTRL and status register TOM[i]_TGC[x]_OUTEN_STAT (with x=0,1)
- Global force update mechanism for each TOM channel with control register TOM[i]_TGC[x]_FUPD_CTRL (with x=0,1)
- Update enable of the register CM0, CM1 and CLK_SRC_STAT for each TOM channel with the control bit field UPEN_CTRL[y] of TOM[i]_TGC[x]_GLB_CTRL (with y=0 . . . 7; x=0,1)

TGC Subunit

Each of the first three individual mechanisms (enable/disable of the channel, output enable and force update) can be driven by three different trigger sources. The three trigger sources are:

- the host CPU (bit HOST_TRIG of register TOM[i]_TGC[x]_GLB_CTRL)
- the TBU time stamp (signal TBU_TS[x] with x=0 . . . 2)
- the internal trigger signal TRIG (bunch of trigger signals TRIG_[y], y=0 . . . 7/8 . . . 15)

The first way is to trigger the control mechanism by a direct register write access via host CPU (bit HOST_TRIG of register TOM[i]_TGC[x]_GLB_CTRL).

The second way is provided by a compare match trigger on behalf of a specified time base coming from the module TBU (selected by bits TBU_SEL) and the time stamp compare value defined in the bit field ACT_TB of register TOM[i]_TGC[x]_ACT_TB (with x=0,1).

The third possibility is the input TRIG (bunch of trigger signals TRIG_[y], y=0 . . . 7/8 . . . 15) coming from the TOM channels 0 to 7/8 to 15.

The corresponding trigger signal TRIG_y coming from channel y can be masked by the register TOM[i]_TGC[x]_INT_TRIG (x=0,1).

To enable or disable each individual TOM channel, the registers TOM[i]_TGC[x]_ENDIS_CTRL and TOM[i]_TGC[x]_ENDIS_STAT have to be used.

The register TOM[i]_TGC[x]_ENDIS_STAT controls directly the signal ENDIS. A write access to this register is possible.

The register TOM[i]_TGC[x]_ENDIS_CTRL is a shadow register that overwrites the value of register TOM[i]_TGC[x]_ENDIS_STAT if one of the three trigger conditions matches.

TOM Global Channel Control Mechanism

Figure 24:
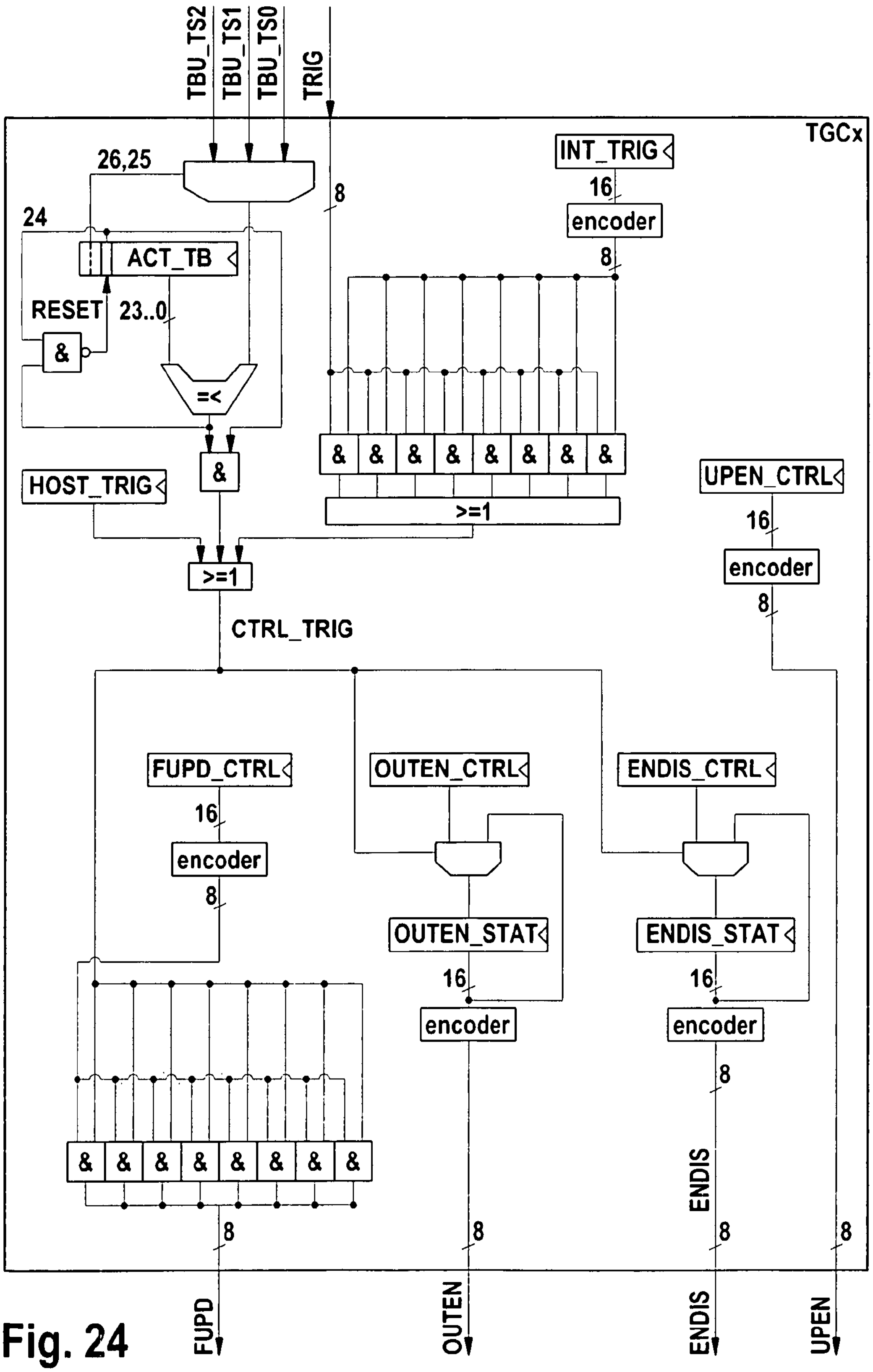

See FIG. 24.

The output of the individual TOM channels can be controlled using the register TOM[i]_TGC[x]_OUTEN_CTRL and TOM[i]_TGC[x]_OUTEN_CTRL.

The register TOM[i]_TGC[x]_OUTEN_STAT controls directly the signal OUTEN. A write access to this register is possible.

The register TOM[i]_TGC[x]_OUTEN_CTRL is a shadow register that overwrites the value of register TOM[i]_TGC[x]_OUTEN_STAT if one of the three trigger conditions matches.

TOM[i]_TGC[x]_If a TOM channel is disabled by the register TOM[i]_TGC[x]_OUTEN_STAT, the actual value of the channel is defined by the signal level bit (SL) defined in the channel control register TOM[i]_CH[x]_CTRL (x=0 . . . 7).

The register TOM[i]_TGC[x]_FUPD_CTRL defines which of the TOM channels receive a FORCE UPDATE event if the trigger signal CTRL_TRIG is raised.

The register bits UPEN_CTRL[x] (with x=0 . . . 7) defines for which TOM channel the update of the working register CM0, CM1 and CLK_SRC by the corresponding shadow register SR0, SR1 and CLK_SRC_SR is enabled. If update is enabled, the register CM0, CM1 and CLK_SRC will be updated on reset of counter register CN0 (see FIG. 25).

The whole control logic is doubled by means of the two TOM global control units TGC0 and TGC1.

TOM Channel (TOM_CHx)

Each individual TOM channel comprises a Counter Compare Unit 0 (CCU0), a Counter Compare Unit 1(CCU1) and the Signal Output Generation Unit (SOU). The architecture is depicted in FIG. 25.

TOM Channel Architecture

Figure 25:
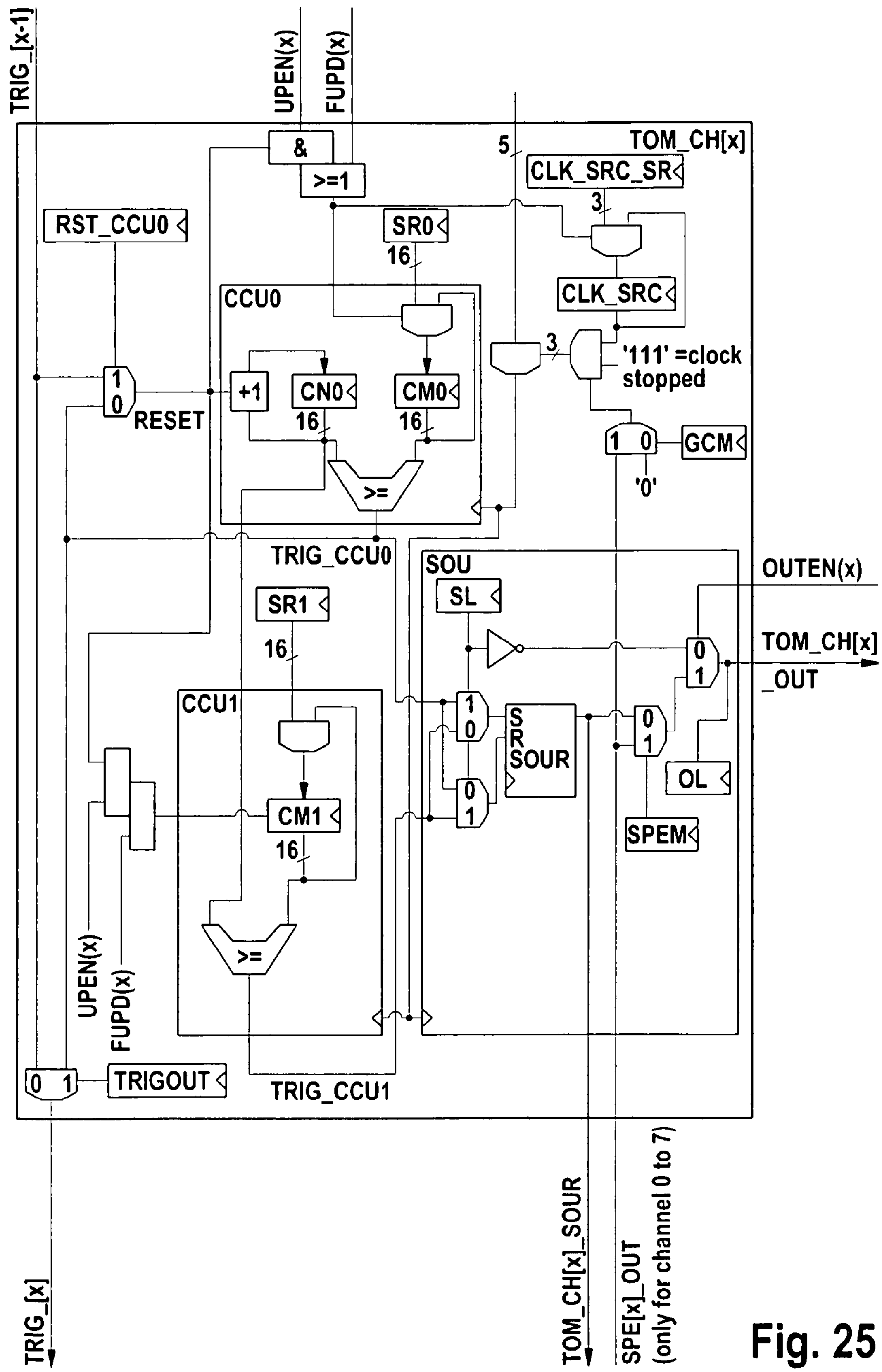

See FIG. 25.

The CCU0 contains a counter CN0 which is clocked with one of the selected input frequencies (CMU_FXCLK) provided from outside of the sub module.

The counter can be reset either when the counter value is equal to the compare value CM0 or when signalled by the Trigger signal TRIG_[y−1] of the preceding channel y−1 or sub module (depending on configuration bits RST_CCU0 of register TOM[i]_CH[c]_CTRL with c=0 . . . 15).

When the counter register CN0 is greater or equal than the register CM0, the subunit CCU0 triggers the SOU subunit and the succeeding TOM sub module channel (signal TRIG_CCU0).

In the subunit CCU1 the counter register CN0 is compared with the value of register CM1. If CN0 is greater or equal than CM1 the subunit CCU1 triggers the SOU subunit (signal TRIG_CCU1).

The configuration of CM1=0 represents 0% duty cycle at the output, the configuration of CM1>=CM0 represents 100% duty cycle. If both registers are configured to 0 (CM0=CM1=0), the output is 0% duty cycle.

The hardware ensures that for both 0% and 100% duty cycle no glitch occurs at the output of the TOM channel.

The SOU subunit is responsible for output signal generation. On a trigger TRIG_CCU0 from subunit CCU0 or TRIG_CCU1 from subunit CCU1 a SR-Flip-Flop of subunit SOU is either set or reset. If it is set or reset depends on the configuration bit SL of the control register TOM[i]_CH[c]_CTRL (with c=0 . . . 15).The initial signal output level for the channel is the reverse value of the bit SL.

Figure 28:
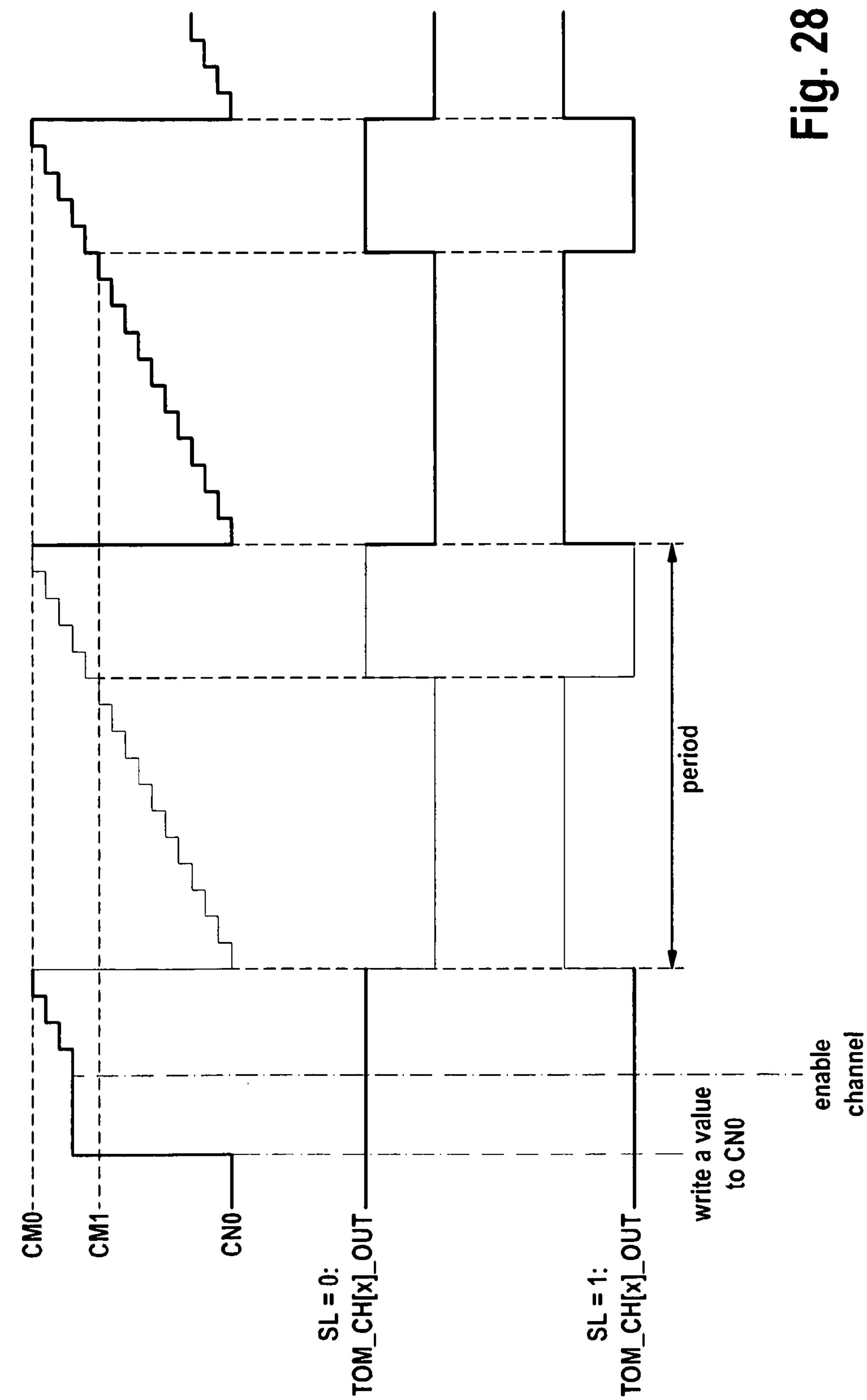

FIG. 28 clarifies the PWM output behaviour with respect to the SL bit definition. The output level on the TOM channel output pin TOM[i]_CH[x]_OUT is captured in bit OL of register TOM[i]_CH[c]_STAT (c=0 . . . 15).

Duty Cycle, Period and Selected Counter Clock Frequency Update Mechanisms

The two action registers CM0 and CM1 can be reloaded with the content of the shadow registers SR0 and SR1. The register CLK_SRC that determines the clock frequency of the counter register CN0 can be reloaded with its shadow register CLK_SRC_SR (bit field in register TOM[i]_CH[c]_CTRL, c=0 . . . 15)

The update of the register CM0, CM1 and CLK_SRC with the content of its shadow register is done when the reset of the counter register CN0 is requested (via signal RESET). This reset of CN0 is done if the comparison of CN0 greater or equal than CM0 is true or when the reset is triggered by another TOM channel c−1 via the signal TRIG_[c−1].

With the update of the register CLK_SRC at the end of a period a new counter CN0 clock frequency can easily be adjusted.

An update of duty cycle, period and counter CN0 clock frequency becoming effective synchronously with start of a new period can easily be reached by performing following steps:

1. disable the update of the action register with the content of the corresponding shadow register by setting the channel specific configuration bit UPEN_CTRL[c] (c=0 . . . 7) of register TOM[i]_TGC[x]_GLB_CTRL to '0' (x=0,1).
2. write new desired values to SR0, SR1, CLK_SRC_SR
3. enable update of the action register by setting the channel specific configuration bit UPEN_CTRL[c] of register TOM[i]_TGC[x]_GLB_CTRL to '1'.

Synchronous Update of Duty Cycle Only

A synchronous update of only the duty cycle can be done by simply writing the desired new value to register SR1 without preceding disable of the update mechanism (as described in the chapter above). The new duty cycle is then applied in the period following the period where the update of register SR1 was done.

Synchronous Update of Duty Cycle

Figure 26:
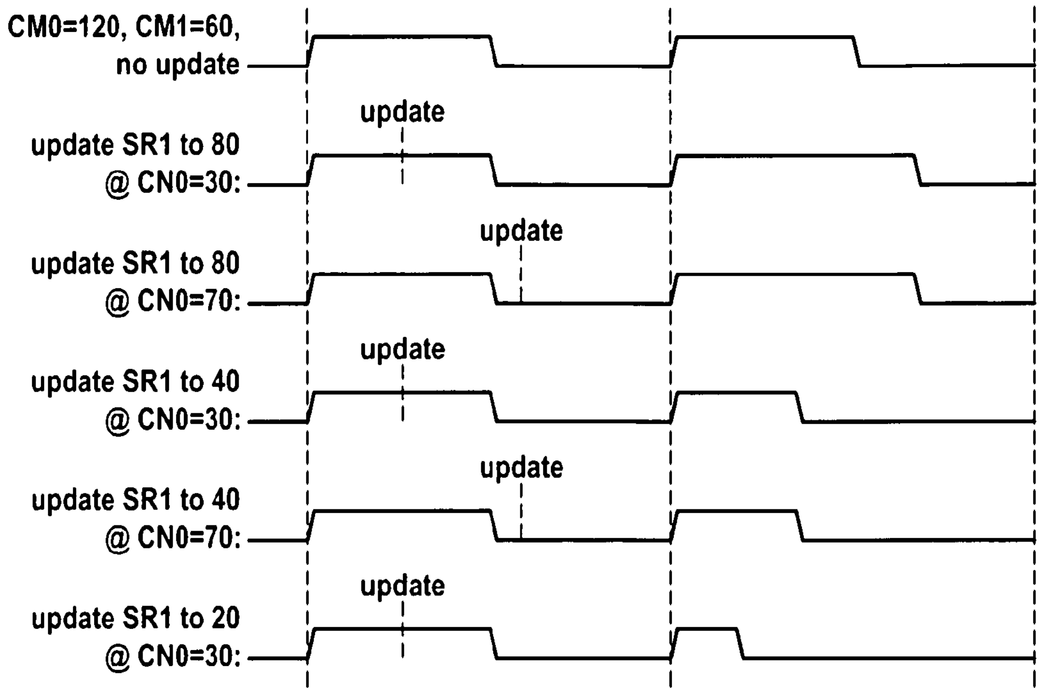

See FIG. 26.

Asynchronous Update of Duty Cycle Only

If the update of the duty cycle should be performed independent of the start of a new period (asynchronous), the desired new value can be written directly to register CM1. In this case it is recommended to additionally either disable the synchronous update mechanism as a whole (i.e. clearing bits UPEN[x] of corresponding channel x in register TOM[i]_TGX[x]_GLB_CTRL) or updating SR1 with the same value as CM1 before writing to CM1.

Depending on the point of time of the update of CM1 in relation to the actual value of CN0 and CM1, the new duty cycle is applied in the current period or the following period (see Figure In any case the creation of glitches are avoided. The new duty cycle may jitter from update to update by a maximum of one period (given by CM0). However, the period remains unchanged.

Asynchronous Update of Duty Cycle

Figure 27:
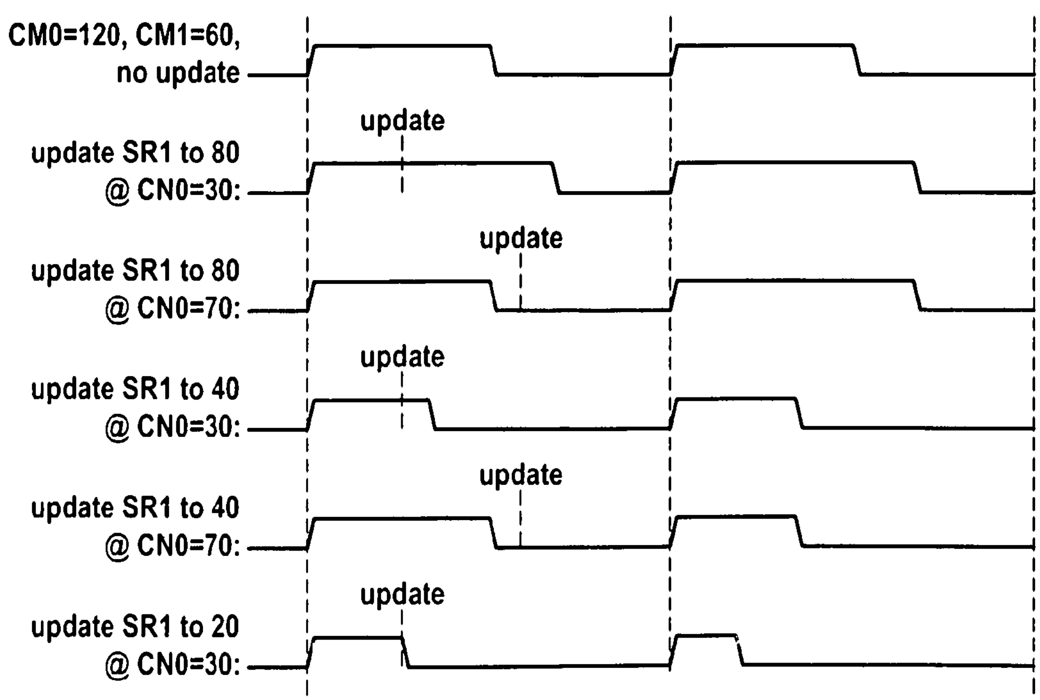

See FIG. 27.

TOM Continuous Mode

In continuous mode the TOM channel starts incrementing the counter register CN0 once it is enabled by setting the corresponding bits in register TOM[i]_TGC[x]_ENDIS_STAT (refer to chapter 0 for details of enabling a TOM channel).

The signal level of the generated output signal can be configured with the configuration bit SL of the channel configuration register TOM[i]_CH[c]_CTRL (c=0 . . . 15).

If the counter CN0 is reset from CM0 back to zero, the first edge of a period is generated at TOM[i]_CH[x]_OUT.

The second edge of the period is generated if CN0 has reached CM1.

Every time the counter CN0 has reached the value of CM0 it is reset back to zero and proceeds with incrementing.

PWM Output with Respect to Configuration Bit SL in Continuous Mode

See FIG. 28.

TOM One Shot Mode

In One-shot mode, the TOM channel generates one pulse with a signal level specified by the configuration bit SL in the channel c configuration register TOM[i]_CH[c]_CTRL.

First the channel has to be enabled by setting the corresponding TOM[i]_TGC[x]_ENDIS_STAT value and the one-shot mode has to be enabled by setting bit OSM in register TOM[i]_CH[x]_CTRL.

In one-shot mode the counter CN0 will not be incremented once the channel is enabled.

A write access to the register CN0 triggers the start of pulse generation (i.e. the increment of the counter register CN0).

If SPE mode of TOM[i] channel 2 is enabled (set bit SPEM of register TOM[i]_CH2_CTRL), also the trigger signal SPE[i]_NIPD can trigger the reset of register CN0 to zero and a start the pulse generation.

The new value of CN0 determines the start delay of the first edge. The delay time of the first edge is given by (CM0-CN0) multiplied with period defined by current value of CLK_SRC.

If the counter CN0 is reset from CM0 back to zero, the first edge at TOM[i]_CH[x]_OUT is generated.

The second edge is generated if CN0 is greater or equal than CM1 (i.e. CN0 was incremented until it has reached CM1 or CN0 is greater than CM1 after an update of CM1).

If the counter CN0 has reached the value of CM0 a second time, the counter stops.

PWM Output with Respect to Configuration Bit SL in One-Shot Mode

Figure 29:
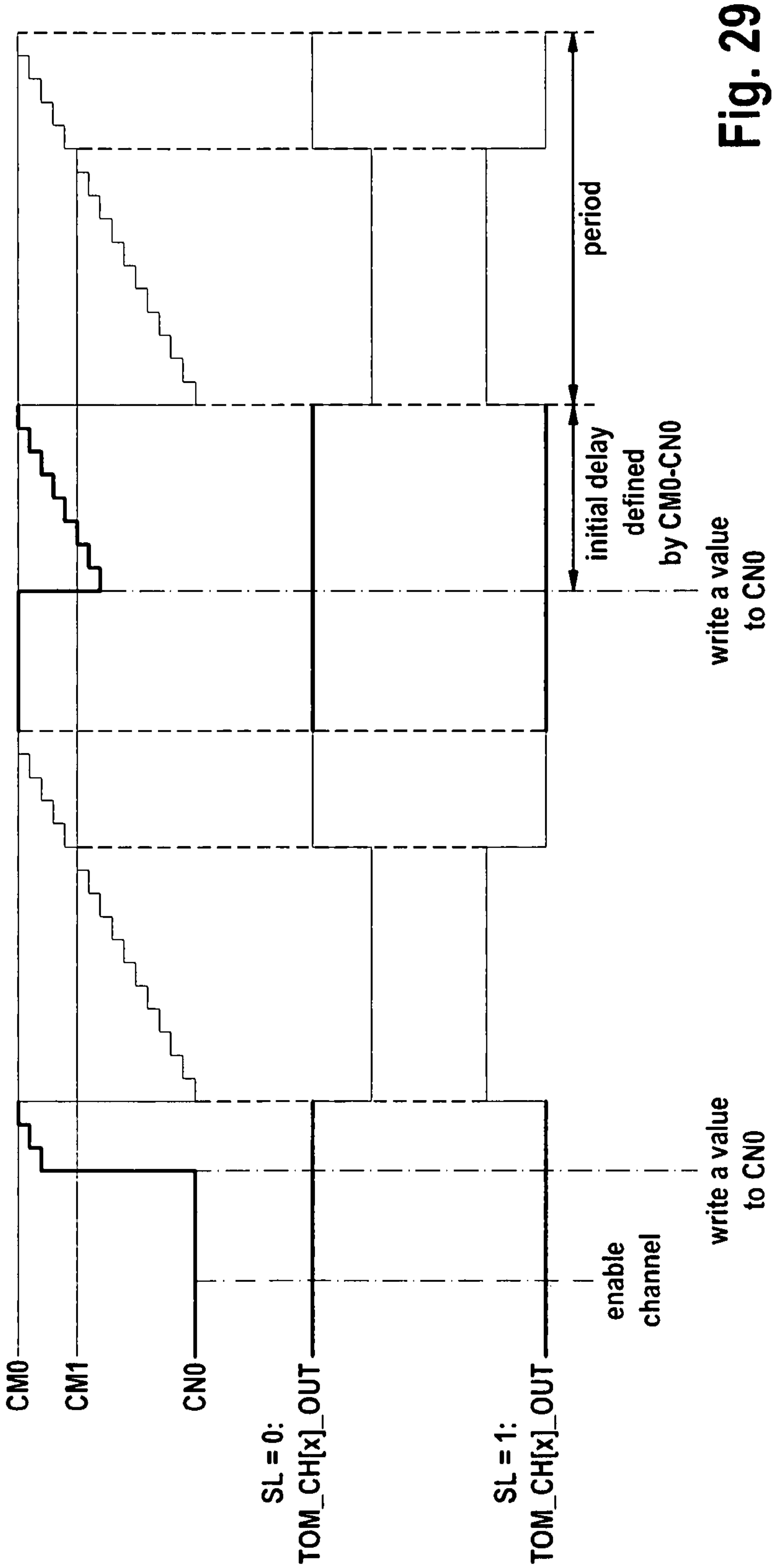

See FIG. 29.

Further output of single periods can be started by a write access to register CN0.

Pulse Count Modulation

At the output TOM_CH15_OUT a pulse count modulated signal can be generated instead of the simple PWM output signal.

Figure 31:
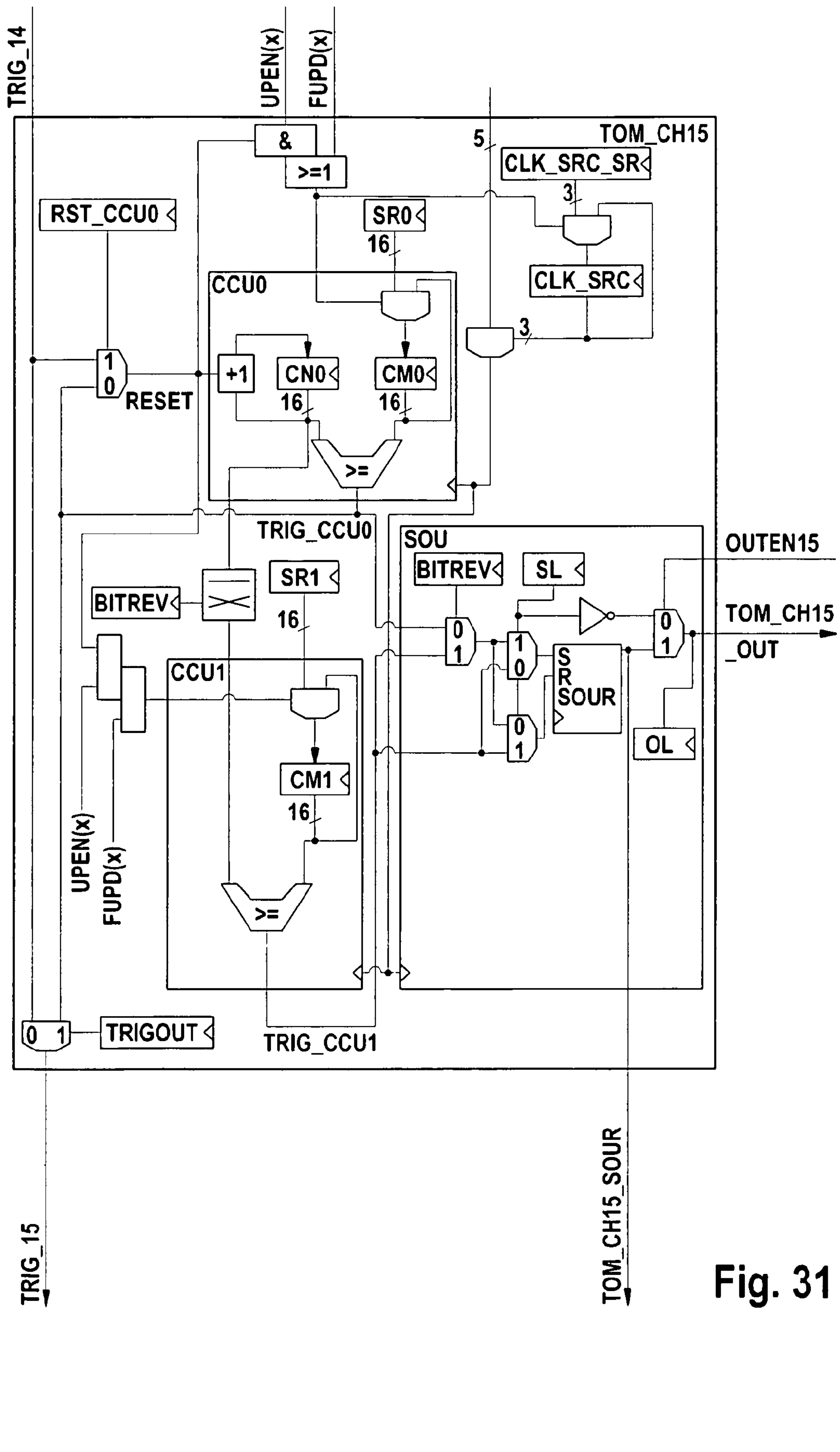

FIG. 31 outlines the circuit for Pulse Count Modulation.

The PCM mode is enabled by setting bit BITREV to 1.

With the configuration bit BITREV=1a bit-reversing of the counter output CN0 is configured. In this case the bits LSB and MSB are swapped, the bits LSB+1 and MSB−1 are swapped, the bits LSB+2 and MSB−2 are swapped and so on.

The effect of bit-reversing of the CN0 register value is shown in the following FIG. 30.

Bit Reversing of Counter CN0 Output

Figure 30:
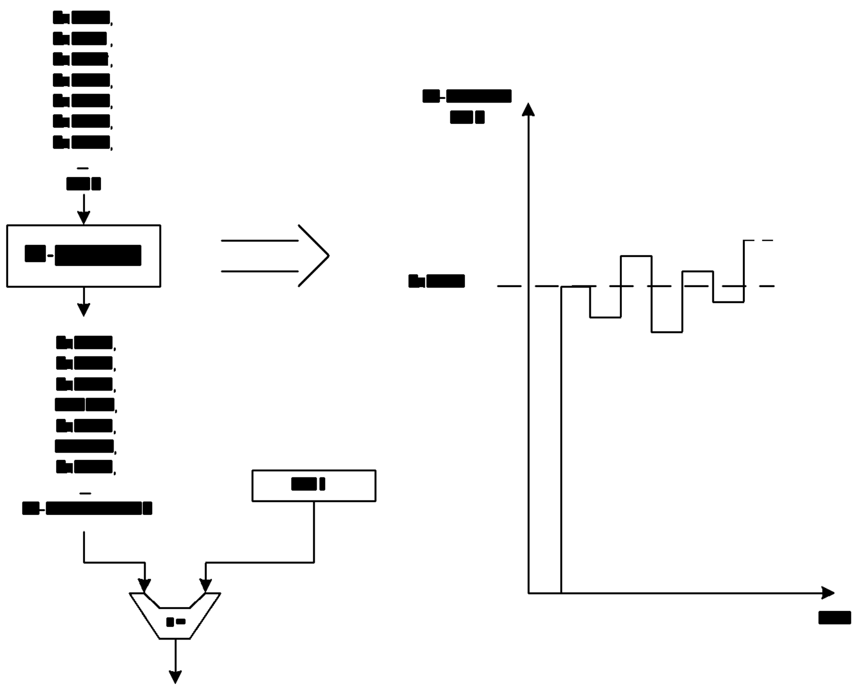

See FIG. 30.

In the PCM mode the counter register CN0 is incremented by every clock tick depending on configured CMU clock (CMU_FXCLK).

The output of counter register CN0 is first bit-reversed and than compared with the configured register value CM1.

If the bit-reversed value of register CN0 is greater than CM1, the SR-FlipFlop of sub module SOU is set (depending on configuration register SL) otherwise the SR-FlipFlop is reset. This generates at the output TOM_CH15_OUT a pulse count modulated signal.

In PCM mode the CM0 register always has to be set to its maximum value 0xFFFF.

PCM Generation on TOM Channel 15

See FIG. 31.

TOM BLDC Support

The TOM sub module offers in combination with the SPE sub module a BLDC support. To drive a BLDC engine TOM channels 0 to 7 can be used.

The BLDC support can be configured by setting the SPEM bit inside the TOM[i]_CH[c]_CTRL register (c: 0 . . . 7). When this bit is set the TOM channel output is controlled through the SPE_OUT(x) signal coming from the SPE sub module (see FIG. 56). Please refer to chapter 0 for a detailed description of the SPE sub module. The TOM[i]_CH2 with i=0 . . . 3 can be used together with the SPE module to trigger a delayed update of the SPE_OUT_CTRL register after new input pattern detected by SPE (signalled by SPE[i]_NIPD). For details please refer to chapter of SPE sub module description.

TOM Gated Counter Mode

Each TOM-SPE module combination provides also the feature of a gated counter mode. This is reached by using the FSOI input of a TIM module to gate the clock of a CCU0 sub module.

To configure this mode, registers of module SPE should be set as following:

the SPE should be enabled (bit SPE_EN=1), all three TIM inputs should be disabled (SIE0=SIE1=SIE2=0), SPE[i]_OUT_CTRL should be set to 00005555h (set SPE_OUT( ) to '0'), mode FSOM should be enabled (FSOM=1), set in bit field FSOL bit c if channel c of module TOM is chosen for gated counter mode Additionally in module TOM the SPE mode should be disabled (SPEM=0) and the gated counter mode should be enabled (GCM=1)

As a result of this configuration, the counter CN0 in sub module CCU0 of TOM channel c counts as long as input FSOI is '0'.

TOM Interrupt Signals

The following table describes TOM interrupt signals:

| Signal | Description |
|---|---|
| TOM_CCU0TCx_IRQ | CCU0 Trigger condition interrupt for channel x |
| TOM_CCU1TCx_IRQ | CCU1 Trigger condition interrupt for channel x |

TOM Configuration Register Overview

The following table shows a conclusion of configuration registers address offsets and initial values.

| Register name | Description | Details in Section |
|---|---|---|
| TOM[i]_TGC0_GLB_CTRL | TGC0 global control reg | 0 |
| TOM[i]_TGC0_ENDIS_CTRL | TGC0 enable/disable control reg | 0 |
| TOM[i]_TGC0_ENDIS_STAT | TGC0 enable/disable status reg | 0 |
| TOM[i]_TGC0_ACT_TB | TGC0 action time base register | 0 |
| TOM[i]_TGC0_OUTEN_CTRL | TGC0 output enable control reg | 0 |
| TOM[i]_TGC0_OUTEN_STAT | TGC0 output enable status regi | 0 |
| TOM[i]_TGC0_FUPD_CTRL | TGC0 force update control reg | 0 |
| TOM[i]_TGC0_INT_TRIG | TGC0 internal trigger control | 0 |
| TOM[i]_TGC1_GLB_CTRL | TGC1 global control register | 0 |
| TOM[i]_TGC1_ENDIS_CTRL | TGC1 enable/disable control reg | 0 |
| TOM[i]_TGC1_ENDIS_STAT | TGC1 enable/disable status reg | 0 |
| TOM[i]_TGC1_ACT_TB | TGC0 action time base register | 0 |
| TOM[i]_TGC1_OUTEN_CTRL | TGC1 output enable control reg | 0 |
| TOM[i]_TGC1_OUTEN_STAT | TGC1 output enable status reg | 0 |
| TOM[i]_TGC1_FUPD_CTRL | TGC1 force update control reg | 0 |
| TOM[i]_TGC1_INT_TRIG | TGC1 internal trigger control | 0 |
| TOM[i]_CH[x]_CTRL | TOM Channel x control register (x = 0 . . . 14) | 0 |
| TOM[i]_CH15_CTRL | TOM Channel 15 control reg | 0 |
| TOM[i]_CH[x]_CN0 | TOM Channel x CCU0 counter register (x = 0 . . . 15) | 0 |
| TOM[i]_CH[x]_CM0 | TOM Channel x CCU0 compare register (x = 0 . . . 15) | 0 |
| TOM[i]_CH[x]_SR0 | TOM Channel x CCU0 compare shadow register (x = 0 . . . 15) | 0 |
| TOM[i]_CH[x]_CM1 | TOM Channel x CCU1 compare register (x = 0 . . . 15) | 0 |
| TOM[i]_CH[x]_SR1 | TOM Channel x CCU1 compare shadow register (x = 0 . . . 15) | 0 |
| TOM[i]_CH[x]_STAT | TOM channel status (x = 0 . . . 15) | 0 |
| TOM[i]_CH[x]_IRQ_NOTIFY | TOM channel x interrupt notification register (x = 0 . . . 15) | 0 |
| TOM[i]_CH[x]_IRQ_EN | TOM channel x interrupt enable register (x = 0 . . . 15) | 0 |
| TOM[i]_CH[x]_IRQ_FORCINT | TOM channel x software interrupt generation (x = 0 . . . 15) | 0<br>0 |

-continued

| Register name | Description | Details in Section |
|---|---|---|
| TOM[i]_CH[x]_IRQ_MODE | IRQ mode configuration register (x = 0 . . . 15) | 0 |

TOM Configuration Registers Description

Register TOM[i]_TGC0_GLB_CTRL

| | Address Offset: 0x0000 | | | | | |
|---|---|---|---|---|---|---|
| | 31 30 | 29 28 | 27 26 | 25 24 | 23 22 | 21 20 |
| Bit | UPEN_CTRL7 | UPEN_CTRL6 | UPEN_CTRL5 | UPEN_CTRL4 | UPEN_CTRL3 | UPEN_CTRL2 |
| Mode | RW | RW | RW | RW | RW | RW |
| Initial Value | 00 | 00 | 00 | 00 | 00 | 00 |

| | Address Offset: 0x0000 | | Initial Value: 0x0000_0000 | | | | |
|---|---|---|---|---|---|---|---|
| | 19 18 | 17 16 | 15 | 14 | 13 | 12 | 11 |
| Bit | UPEN_CTRL1 | UPEN_CTRL0 | RST_CH7 | RST_CH6 | RST_CH5 | RST_CH4 | RST_CH3 |
| Mode | RW | RW | Aw | Aw | Aw | Aw | Aw |
| Initial Value | 00 | 00 | 0 | 0 | 0 | 0 | 0 |

| | Initial Value: 0x0000_0000 | | | | |
|---|---|---|---|---|---|
| | 10 | 9 | 8 | 7 6 5 4 3 2 1 | 0 |
| Bit | RST_CH2 | RST_CH1 | RST_CH0 | Reserved | HOST_TRIG |
| Mode | Aw | Aw | Aw | R | Aw |
| Initial Value | 0 | 0 | 0 | 0 | 0 |

Bit 0 HOST_TRIG: trigger request signal (see TGCx) to update the register ENDIS_STAT and OUTEN_STAT 0 = no trigger request 1 = set trigger request Note: this flag is reset automatically after triggering the update Bit 7:1 Reserved Note: Read as zero, should be written as zero Bit 8 RST_CH0: Software reset of channel 0

0 = No action

1 = Reset channel

Note: This bit is cleared automatically after write by CPU. The channel registers are set to their reset values and channel operation is stopped immediately.

Bit 9 RST_CH1: Software reset of channel 1 See bit 8

Bit 10 RST_CH2: Software reset of channel 2 See bit 8

Bit 11 RST_CH3: Software reset of channel 3 See bit 8

Bit 12 RST_CH4: Software reset of channel 4 See bit 8

Bit 13 RST_CH5: Software reset of channel 5 See bit 8

Bit 14 RST_CH6: Software reset of channel 6 See bit 8

Bit 15 RST_CH7: Software reset of channel 7 See bit 8

Bit 17:16 UPEN_CTRL0: TOM channel 0 enable update of register CM0, CM1 and CLK_SRC_STAT from SR0, SR1 and CLK_SRC.

Note: If update is disabled, also a forced update is not possible. Write of following double bit values is possible:

00 = don't care, bits 1:0 will not be change

01 = update disabled: is read as 00 (see below)

10 = update enabled: is read as 11 (see below)

11 = don't care, bits 1:0 will not be changed

Read of following double values means:

00 = channel disabled

11 = channel enabled

Bit 19:18 UPEN_CTRL1: TOM channel 1 enable update of register CM0, CM1 and CLK_SRC_STAT See bits 17:16

Bit 21:20 UPEN_CTRL2: TOM channel 2 enable update of register CM0, CM1 and CLK_SRC_STAT See bits 17:16

Bit 23:22 UPEN_CTRL3: TOM channel 3 enable update of register CM0, CM1 and CLK_SRC_STAT See bits 17:16

Bit 25:24 UPEN_CTRL4: TOM channel 4 enable update of register CM0, CM1 and CLK_SRC_STAT See bits 17:16

Bit 27:26 UPEN_CTRL5: TOM channel 5 enable update of register CM0, CM1 and CLK_SRC_STAT See bits 17:16

Bit 29:28 UPEN_CTRL6: TOM channel 6 enable update of register CM0, CM1 and CLK_SRC_STAT See bits 17:16

Bit 31:30 UPEN_CTRL7: TOM channel 7 enable update of register CM0, CM1 and CLK_SRC_STAT See bits 17:16

Register TOM[i]_TGC0_ENDIS_CTRL

| | Address Offset: 0x0004 | | | | | | | | | | | | | | | | Initial Value: 0x0000_0000 | | | |
|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 |
| Bit | Reserved | | | | | | | | | | | | | | | | ENDIS_CTRL7 | | ENDIS_CTRL6 | |
| Mode | R | | | | | | | | | | | | | | | | RW | | RW | |
| Initial Value | 0x0000 | | | | | | | | | | | | | | | | 00 | | 00 | |

| | Initial Value: 0x0000_0000 | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| Bit | ENDIS_CTRL5 | | ENDIS_CTRL4 | | ENDIS_CTRL3 | | ENDIS_CTRL2 | | ENDIS_CTRL1 | | ENDIS_CTRL0 | |
| Mode | RW | | RW | | RW | | RW | | RW | | RW | |
| Initial Value | 00 | | 00 | | 00 | | 00 | | 00 | | 00 | |

Bit 1:0
ENDIS_CTRL0: TOM channel 0 enable/disable update value.
If a TOM channel is disabled, the counter CN0 and ECNT are stopped. On an enable event, the counter ECNT is reset to 0 while the counter CN0 keeps its value.
Write of following double bit values is possible:
00 = don't care, bits 1:0 will not be changed
01 = channel disabled: is read as 00 (see below)
10 = channel enabled: is read as 11 (see below)
11 = don't care, bits 1:0 will not be changed
Read of following double values means:
00 = channel disable
11 = channel enable
Bit 3:2
ENDIS_CTRL1: TOM channel 1 enable/disable update value.
See bits 1:0
Bit 5:4
ENDIS_CTRL2: TOM channel 2 enable/disable update value.
See bits 1:0
Bit 7:6
ENDIS_CTRL3: TOM channel 3 enable/disable update value.
See bits 1:0
Bit 9:8
ENDIS_CTRL4: TOM channel 4 enable/disable update value.
See bits 1:0
Bit 11:10
ENDIS_CTRL5: TOM channel 5 enable/disable update value.
See bits 1:0
Bit 13:12
ENDIS_CTRL6: TOM channel 6 enable/disable update value.
See bits 1:0
Bit 15:14
ENDIS_CTRL7: TOM channel 7 enable/disable update value.
See bits 1:0
Bit 31:16
Reserved
Note: Read as zero, should be written as zero Register TOM[i]_TGC0_ENDIS_STAT

| | Address Offset: 0x0008 | | | | | | | | | | | | | | | | Initial Value: 0x0000_0000 | | | |
|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 |
| Bit | Reserved | | | | | | | | | | | | | | | | ENDIS_STAT7 | | ENDIS_STAT6 | |
| Mode | R | | | | | | | | | | | | | | | | RW | | RW | |
| Initial Value | 0x0000 | | | | | | | | | | | | | | | | 00 | | 00 | |

-continued

Register TOM[i]_TGC0_ENDIS_STAT

Initial Value: 0x0000_0000

| | 11 | 10 | 9 | 8 | 7 | 6 | 5 | 4 | 3 | 2 | 1 | 0 |
|---|---|---|---|---|---|---|---|---|---|---|---|---|
| Bit | ENDIS_STAT5 | | ENDIS_STAT4 | | ENDIS_STAT3 | | ENDIS_STAT2 | | ENDIS_STAT1 | | ENDIS_STAT0 | |
| Mode | RW | | RW | | RW | | RW | | RW | | RW | |
| Initial Value | 00 | | 00 | | 00 | | 00 | | 00 | | 00 | |

Bit 1:0

ENDIS_STAT0: TOM channel 0 enable/disable

If a TOM channel is disabled, the counter CN0 and ECNT are stopped. On an enable event, the counter ECNT is reset to 0 while the counter CN0 keeps its value.

Write of following double bit values is possible:

00 = don't care, bits 1:0 will not be changed

01 = channel disabled: is read as 00 (see below)

10 = channel enabled: is read as 11 (see below)

11 = don't care, bits 1:0 will not be changed

Read of following double values means:

00 = channel disable

11 = channel enable

Bit 3:2

ENDIS_STAT1: TOM channel 1 enable/disable

See bits 1:0

Bit 5:4

ENDIS_STAT2: TOM channel 2 enable/disable

See bits 1:0

Bit 7:6

ENDIS_STAT3: TOM channel 3 enable/disable

See bits 1:0

Bit 9:8

ENDIS_STAT4: TOM channel 4 enable/disable

See bits 1:0

Bit 11:10

ENDIS_STAT5: TOM channel 5 enable/disable

See bits 1:0

Bit 13:12

ENDIS_STAT6: TOM channel 6 enable/disable

See bits 1:0

Bit 15:14

ENDIS_STAT7: TOM channel 7 enable/disable

See bits 1:0

Bit 31:16

Reserved

Note: Read as zero, should be written as zero

Register TOM[i]_TGC0_ACT_TB

Address Offset: 0x000C

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | TBU_SEL | | TB_TRIG | TB_VAL | | | | | | | |
| Mode | R | | | | | RW | | RAw | RW | | | | | | | |
| Initial Value | 00000 | | | | | 00 | | 0 | 0x00_0000 | | | | | | | |

-continued

| Register TOM[i]_TGC0_ACT_TB | | | | | | | | | | | | | | | | |
|---|---|---|---|---|---|---|---|---|---|---|---|---|---|---|---|---|
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | TB_VAL | | | | | | | | | | | | | | | |
| Mode | RW | | | | | | | | | | | | | | | |
| Initial Value | 0x00_0000 | | | | | | | | | | | | | | | |

Bit 23:0

TB_VAL: Time base value at which the update of the register ENDIS_STAT and OUTEN_STAT should occur.

Bit 24

TB_TRIG: Set trigger request

0 = no trigger request

1 = set trigger request

Note: This flag is reset automatically if the selected time base unit (TBU_TS0 or TBU_TS1 or TBU_TS2 if present) has reached the value TB_VAL and the update of the register were triggered.

Bit 26:25

TBU_SEL: Selection of time base used for comparison

00 = TBU_TS0 selected

01 = TBU_TS1 selected

10 = TBU_TS2 selected

11 = Reserved

Note: The bit combination "10" is only applicable if a three time base channels TBU implementation is present for this device. Please refer to GTM Architecture block diagram on page 3 to determine the number of channels for TBU of this device.

Bit 31:27

Reserved

Note: Read as zero, should be written as zero

| Register TOM[i]_TGC0_OUTEN_CTRL | | | | | | | | | | | | | | | | | | | | |
|---|---|---|---|---|---|---|---|---|---|---|---|---|---|---|---|---|---|---|---|---|
| | Address Offset: 0x0010 | | | | | | | | | | | | | | | | Initial Value: 0x0000_0000 | | | |
| | 31 | 30 | 29 | 28 | 27 | 26 | 25 | 24 | 23 | 22 | 21 | 20 | 19 | 18 | 17 | 16 | 15 | 14 | 13 | 12 |
| Bit | Reserved | | | | | | | | | | | | | | | | OUTEN_CTRL7 | | OUTEN_CTRL6 | |
| Mode | R | | | | | | | | | | | | | | | | RW | | RW | |
| Initial Value | 0x0000 | | | | | | | | | | | | | | | | 00 | | 00 | |

| | | | | | | | | | | | | |
|---|---|---|---|---|---|---|---|---|---|---|---|---|
| | Initial Value: 0x0000_0000 | | | | | | | | | | | |
| | 11 | 10 | 9 | 8 | 7 | 6 | 5 | 4 | 3 | 2 | 1 | 0 |
| Bit | OUTEN_CTRL5 | | OUTEN_CTRL4 | | OUTEN_CTRL3 | | OUTEN_CTRL2 | | OUTEN_CTRL1 | | OUTEN_CTRL0 | |
| Mode | RW | | RW | | RW | | RW | | RW | | RW | |

-continued

| Register TOM[i]_TGC0_OUTEN_CTRL | | | | | | |
|---|---|---|---|---|---|---|
| Initial Value | 00 | 00 | 00 | 00 | 00 | 00 |

Bit 1:0
OUTEN_CTRL0: Output TOM_OUT(0) enable/disable update value
Write of following double bit values is possible:
00 = don't care, bits 1:0 will not be changed
01 = channel disabled: is read as 00 (see below)
10 = channel enabled: is read as 11 (see below)
11 = don't care, bits 1:0 will not be changed
Read of following double values means:
00 = channel disable
11 = channel enable
Note: if the channel is disabled (ENDIS[0] = 0) or the output is disabled (OUTEN[0] = 0), the TOM channel 0 output TOM_OUT[0] is the inverted value of bit SL.
Bit 3:2
OUTEN_CTRL1: Output TOM_OUT(1)enable/disable update value
See bits 1:0
Bit 5:4
OUTEN_CTRL2: Output TOM_OUT(2) enable/disable update value
See bits 1:0
Bit 7:6
OUTEN_CTRL3: Output TOM_OUT(3) enable/disable update value
See bits 1:0
Bit 9:8
OUTEN_CTRL4: Output TOM_OUT(4) enable/disable update value
See bits 1:0
Bit 11:10
OUTEN_CTRL5: Output TOM_OUT(5) enable/disable update value
See bits 1:0
Bit 13:12
OUTEN_CTRL6: Output TOM_OUT(6) enable/disable update value
See bits 1:0
Bit 15:14
OUTEN_CTRL7: Output TOM_OUT(7) enable/disable update value
See bits 1:0
Bit 31:16
Reserved
Note: Read as zero, should be written as zero

| Register TOM[i]_TGC0_OUTEN_STAT | | | |
|---|---|---|---|
| | Address Offset: 0x0014 | Initial Value: 0x0000_0000 | |
| | 31 30 29 28 27 26 25 24 23 22 21 20 19 18 17 16 | 15 14 | 13 12 |
| Bit | Reserved | OUTEN_STAT7 | OUTEN_STAT6 |
| Mode | R | RW | RW |
| Initial Value | 0x0000 | 00 | 00 |

| | Initial Value: 0x0000_0000 | | | | | |
|---|---|---|---|---|---|---|
| | 11 10 | 9 8 | 7 6 | 5 4 | 3 2 | 1 0 |
| Bit | OUTEN_STAT5 | OUTEN_STAT4 | OUTEN_STAT3 | OUTEN_STAT2 | OUTEN_STAT1 | OUTEN_STAT0 |
| Mode | RW | RW | RW | RW | RW | RW |

-continued

| Register TOM[i]_TGC0_OUTEN_STAT | | | | | | |
|---|---|---|---|---|---|---|
| Initial Value | 00 | 00 | 00 | 00 | 00 | 00 |

Bit 1:0
OUTEN_STAT0: Control/status of output TOM_OUT(0)
Write of following double bit values is possible:
00 = don't care, bits 1:0 will not be changed
01 = channel disabled: is read as 00 (see below)
10 = channel enabled: is read as 11 (see below)
11 = don't care, bits 1:0 will not be changed
Read of following double values means:
00 = channel disable
11 = channel enable
Bit 3:2
OUTEN_STAT1: Control/status of output TOM_OUT(1)
See bits 1:0
Bit 5:4
OUTEN_STAT2: Control/status of output TOM_OUT(2)
See bits 1:0
Bit 7:6
OUTEN_STAT3: Control/status of output TOM_OUT(3)
See bits 1:0
Bit 9:8
OUTEN_STAT4: Control/status of output TOM_OUT(4)
See bits 1:0
Bit 11:10
OUTEN_STAT5: Control/status of output TOM_OUT(5)
See bits 1:0
Bit 13:12
OUTEN_STAT6: Control/status of output TOM_OUT(6)
See bits 1:0
Bit 15:14
OUTEN_STAT7: Control/status of output TOM_OUT(7)
See bits 1:0
Bit 31:16
Reserved
Note: Read as zero, should be written as zero

| Register TOM[i]_TGC0_FUPD_CTRL | | | | | | |
|---|---|---|---|---|---|---|
| | Address Offset: 0x0018 | | | | | |
| | 31 30 | 29 28 | 27 26 | 25 24 | 23 22 | 21 20 |
| Bit | RSTCN0_CH7 | RSTCN0_CH6 | RSTCN0_CH5 | RSTCN0_CH4 | RSTCN0_CH3 | RSTCN0_CH2 |
| Mode | RW | RW | RW | RW | RW | RW |
| Initial Value | 00 | 00 | 00 | 00 | 00 | 00 |
| | Address Offset: 0x0018 | | Initial Value: 0x0000_0000 | | | |
| | 19 18 | 17 16 | 15 14 | 13 12 | 11 10 | 9 8 |
| Bit | RSTCN0_CH1 | RSTCN0_CH0 | FUPD_CTRL7 | FUPD_CTRL6 | FUPD_CTRL5 | FUPD_CTRL4 |
| Mode | RW | RW | RW | RW | RW | RW |
| Initial Value | 00 | 00 | 00 | 00 | 00 | 00 |
| | | | Initial Value: 0x0000_0000 | | | |
| | | | 7 6 | 5 4 | 3 2 | 1 0 |
| | | Bit | FUPD_CTRL3 | FUPD_CTRL2 | FUPD_CTRL1 | FUPD_CTRL0 |
| | | Mode | RW | RW | RW | RW |

-continued

| Register TOM[i]_TGC0_FUPD_CTRL | | | | | |
|---|---|---|---|---|---|
| | Initial Value | 00 | 00 | 00 | 00 |

Bit 1:0
FUPD_CTRL0: Force update of TOM channel 0 operation registers
Write of following double bit values is possible:
00 = don't care, bits 1:0 will not be changed
01 = channel disabled: is read as 00 (see below)
10 = channel enabled: is read as 11 (see below)
11 = don't care, bits 1:0 will not be changed
Read of following double values means:
00 = channel disable
11 = channel enable
Bit 3:2
FUPD_CTRL1: Force update of TOM channel 1 operation registers See bits 1:0
Bit 5:4
FUPD_CTRL2: Force update of TOM channel 2 operation registers See bits 1:0
Bit 7:6
FUPD_CTRL3: Force update of TOM channel 3 operation registers See bits 1:0
Bit 9:8
FUPD_CTRL4: Force update of TOM channel 4 operation registers See bits 1:0
Bit 11:10
FUPD_CTRL5: Force update of TOM channel 5 operation registers See bits 1:0
Bit 13:12
FUPD_CTRL6: Force update of TOM channel 6 operation registers See bits 1:0
Bit 15:14
FUPD_CTRL7: Force update of TOM channel 7 operation registers See bits 1:0
Bit 17:16
RSTCN0_CH0: Reset CN0 of channel 0 on force update event
Write of following double bit values is possible:
00 = don't care, bits 1:0 will not be changed
01 = CN0 is not reset on forced update: is read as 00 (see below)
10 = CN0 is reset on forced update: is read as 11 (see below)
11 = don't care, bits 1:0 will not be changed
Read of following double values means:
00 = CN0 is not reset on forced update
11 = CN0 is reset on forced update
Bit 19:18
RSTCN0_CH1: Reset CN0 of channel 1 on force update event See bits 17:16
Bit 21:20
RSTCN0_CH2: Reset CN0 of channel 2 on force update event See bits 17:16
Bit 23:22
RSTCN0_CH3: Reset CN0 of channel 3 on force update event See bits 17:16
Bit 25:24
RSTCN0_CH4: Reset CN0 of channel 4 on force update event See bits 17:16
Bit 27:26
RSTCN0_CH5: Reset CN0 of channel 5 on force update event See bits 17:16
Bit 29:28
RSTCN0_CH6: Reset CN0 of channel 6 on force update event See bits 17:16
Bit 31:30
RSTCN0_CH7: Reset CN0 of channel 7 on force update event See bits 17:16

| Register TOM[i]_TGC0_INT_TRIG | | | | | | | | | | | | | | | | | | | |
|---|---|---|---|---|---|---|---|---|---|---|---|---|---|---|---|---|---|---|---|
| | Address Offset: 0x001C | | | | | | | | | | | | | | | | Initial Value: 0x0000_0000 | | |
| | 31 | 30 | 29 | 28 | 27 | 26 | 25 | 24 | 23 | 22 | 21 | 20 | 19 | 18 | 17 | 16 | 15 14 | | 13 12 |
| Bit | Reserved | | | | | | | | | | | | | | | | INT_TRIG7 | | INT_TRIG6 |
| Mode | R | | | | | | | | | | | | | | | | RW | | RW |
| Initial Value | 0x0000 | | | | | | | | | | | | | | | | 00 | | 00 |

| | Initial Value: 0x0000_0000 | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| Bit | INT_TRIG5 | | INT_TRIG4 | | INT_TRIG3 | | INT_TRIG2 | | INT_TRIG1 | | INT_TRIG0 | |
| Mode | RW | | RW | | RW | | RW | | RW | | RW | |

-continued

| Register TOM[i]_TGC0_INT_TRIG | | | | | | |
|---|---|---|---|---|---|---|
| Initial Value | 00 | 00 | 00 | 00 | 00 | 00 |

Bit 1:0
INT_TRIG0: Select input signal TRIG_0 as a trigger source
Write of following double bit values is possible:
00 = don't care, bits 1:0 will not be changed
01 = internal trigger from channel 0 (TRIG_0) not used: is read as 00 (see below)
10 = internal trigger from channel 0 (TRIG_1) used: is read as 11 (see below)
11 = don't care, bits 1:0 will not be changed
Read of following double values means:
00 = internal trigger from channel 0 (TRIG_0) not used
11 = internal trigger from channel 0 (TRIG_1) used
Bit 3:2
INT_TRIG1: Select input signal TRIG_1 as a trigger source See bits 1:0
Bit 5:4
INT_TRIG2: Select input signal TRIG_2 as a trigger source See bits 1:0
Bit 7:6
INT_TRIG3: Select input signal TRIG_3 as a trigger source See bits 1:0
Bit 9:8
INT_TRIG4: Select input signal TRIG_4 as a trigger source See bits 1:0
Bit 11:10
INT_TRIG5: Select input signal TRIG_5 as a trigger source See bits 1:0
Bit 13:12
INT_TRIG6: Select input signal TRIG_6 as a trigger source See bits 1:0
Bit 15:14
INT_TRIG7: Select input signal TRIG_7 as a trigger source See bits 1:0
Bit 31:16
Reserved
Note:
Read as zero, should be written as zero Register TOM[i]_TGC1_GLB_CTRL
Controls channel 8 to 15: Address offset 0x0040
For description see 0
Register TOM[i]_TGC1_ENDIS_CTRL
Controls channel 8 to 15: Address offset 0x0044
For description see 0
Register TOM[i]_TGC1_ENDIS_STAT
Controls channel 8 to 15: Address offset 0x0048
For description see 0
Register TOM[i]_TGC1_ACT_TB
Controls channel 8 to 15: Address offset 0x004C
For description see 0
Register TOM[i]_TGC1_OUTEN_CTRL
Controls channel 8 to 15: Address offset 0x0050
For description see 0
Register TOM[i]_TGC1_OUTEN_STAT
Controls channel 8 to 15: Address offset 0x0054
For description see 0
Register TOM[i]_TGC1_FUPD_CTRL
Controls channel 8 to 15: Address offset 0x0058
For description see 0
Register TOM[i]_TGC1_INT_TRIG
Controls channel 8 to 15: Address offset 0x005C
For description see 0

Register TOM[i]_CH[x]_CTRL (x: 0 . . . 14)

| | Address Offset: 0x0080 + x * 0x0040 | | | | | | | | |
|---|---|---|---|---|---|---|---|---|---|
| | 31 30 | 29 | 28 | 27 | 26 | 25 | 24 | 23 22 21 | 20 |
| Bit | Reserved | GCM | SPEM | Reserved | OSM | Reserved | TRIGOUT | Reserved | RST_CCU0 |
| Mode | R | RW | RW | R | RW | R | RW | R | RW |
| Initial Value | 0x0 | 0 | 0 | 0 | 0 | 0 | 0 | 000 | 0 |

| | Address Offset: 0x0080 + x * 0x0040 | Initial Value: 0x0000_0000 | | |
|---|---|---|---|---|
| | 19 18 17 16 | 15 14 13 12 | 11 | 10 9 8 7 6 5 4 3 2 1 0 |
| Bit | Reserved | CLK_SRC_SR | SL | Reserved |
| Mode | R | RW | RW | R |

-continued

| Register TOM[i]_CH[x]_CTRL (x: 0 . . . 14) | | | | |
|---|---|---|---|---|
| Initial Value | 00000 | 000 | 0 | 0x000 |

Bit 10:0
Reserved
Note:
Read as zero, should be written as zero
Bit 11
SL: Signal level for duty cycle
0 = Low signal level
1 = High signal level
Note:
After reset and channel is disabled, the S-R register in sub module SOU of TOM_CHx (SOUR) is set immediately to the inverted value of SL.
Bit 14:12
CLK_SRC_SR: Clock source select for channel
The register CLK_SRC is updated with the value of CLK_SRC_SR together with the update of register CM0 and CM1.
The input of the clock divider is the undivided GTM system clock, independent of clocks provided by the module CMU.
000 = CMU_FXCLK(0) selected: GTM system clock
001 = CMU_FXCLK(1) selected: GTM system clock/2^4
010 = CMU_FXCLK(2) selected: GTM system clock/2^8
011 = CMU_FXCLK(3) selected: GTM system clock/2^12
100 = CMU_FXCLK(4) selected: GTM system clock/2^16
101 = no CMU_FXCLK(x) selected, clock of channel stopped
110 = no CMU_FXCLK(x) selected, clock of channel stopped
111 = no CMU_FXCLK(x) selected, clock of channel stopped
Bit 19:15
Reserved
Note:
Read as zero, should be written as zero
Bit 20
RST_CCU0: Reset source of CCU0
0 = Reset counter register CN0 to 0 on matching comparison CM0
1 = Reset counter register CN0 to 0 on trigger TRIG_[x − 1]
Bit 23:21
Reserved
Note:
Read as zero, should be written as zero
Bit 24
TRIGOUT: Trigger output selection (output signal TRIG_[x]) of module TOM_CH[x]
0 = TRIG_[x] is TRIG_[x − 1]
1 = TRIG_[x] is TRIG_CCU0
Bit 25
Reserved
Note:
Read as zero, should be written as zero
Bit 26
OSM: One-shot mode. In this mode the counter CN0 counts for only one period. The length of period is defined by CM0. A write access to the register CN0 triggers the start of counting.
0 = One-shot mode disabled
1 = One-shot mode enabled
Bit 27
Reserved
Bit 28
SPEM: SPE mode enable for channel.
0 = SPE mode disabled
1 = SPE mode enabled
Note:
The SPE mode is only implemented for TOM instances connected to a SPE module and only for channels 0 to 7.
Bit 29
GCM: Gated Counter Mode enable
0 = Gated Counter mode disabled
1 = Gated Counter mode enabled
Note:
The Gated Counter mode is only available for TOM instances connected to a SPE module and only for channels 0 to 7.
Bit 31:30
Reserved
Note:
Read as zero, should be written as zero

| Register TOM[i]_CH15_CTRL | | | | | | | | |
|---|---|---|---|---|---|---|---|---|
| | Address Offset: 0x0310 | | | | | | | |
| | 31 30 29 28 | 27 | 26 | 25 | 24 | 23 22 21 | 20 | 19 18 |
| Bit | Reserved | BITREV | OSM | Reserved | TRIGOUT | Reserved | RST_CCU0 | Reserved |
| Mode | R | RW | RW | R | RW | R | RW | R |
| Initial Value | 0x0 | 0 | 0 | 0 | 0 | 000 | 0 | 00000 |
| | Address Offset: 0x0310 | Initial Value: 0x0000_0000 | | | | | | |
| | 17 16 15 | 14 13 12 | 11 | 10 9 8 7 6 5 4 3 2 1 0 | | | | |
| Bit | Reserved | CLK_SRC_SR | SL | Reserved | | | | |
| Mode | R | RW | RW | R | | | | |
| Initial Value | 00000 | 000 | 0 | 0x000 | | | | |

Bit 10:0 Reserved

Note: Read as zero, should be written as zero

Bit 11 SL: Signal level for duty cycle

0 = Low signal level

1 = High signal level

Note: After reset and channel is disabled, the S-R register in sub module SOU of TOM_CH15 (SOUR) is set immediately to the inverted value of SL.

Bit 14:12 CLK_SRC_SR: Clock source select for channel The register CLK_SRC is updated with the value of CLK_SRC_SR together with the update of register CM0 and CM1. The input of the clock divider is the undivided GTM system clock, independent of clocks provided by the module CMU.

000 = CMU_FXCLK(0) selected: GTM system clock

001 = CMU_FXCLK(1) selected: GTM system clock/$2^4$

010 = CMU_FXCLK(2) selected: GTM system clock/$2^8$

011 = CMU_FXCLK(3) selected: GTM system clock/$2^{12}$

100 = CMU_FXCLK(4) selected: GTM system clock/$2^{16}$

101 = Reserved, CMU_FXCLK(0) selected

110 = Reserved, CMU_FXCLK(0) selected

111 = Reserved, CMU_FXCLK(0) selected

Bit 19:15 Reserved

Note: Read as zero, should be written as zero

Bit 20 RST_CCU0: Reset source of CCU0

0 = Reset counter register CN0 to 0 on matching comparison CM0

1 = Reset counter register CN0 to 0 on trigger TRIG_14

Bit 23:21 Reserved

Note: Read as zero, should be written as zero

Bit 24 TRIGOUT: Trigger output selection (output signal TRIG_15) of module TOM_CH15

0 = TRIG_15 is TRIG_14

1 = TRIG_15 is TRIG_CCU0

Bit 25 Reserved

Note: Read as zero, should be written as zero

Bit 26 OSM: One-shot mode. In this mode the counter CN0 counts for only one period. The length of period is defined by CM0. A write access to the register CN0 triggers the start of counting.

0 = One-shot mode disabled

1 = One-shot mode enabled

Bit 27 BITREV: Bit-reversing of output of counter register CN0. This bit enables the PCM mode of channel 15

Bit 31:28 Reserved

Note: Read as zero, should be written as zero

| Register TOM[i]_CH[x]_CN0 (x: 0 . . . 15) | |
|---|---|
| | Address Offset: 0x0084 + x * 0x0040 |
| | 31 30 29 28 27 26 25 24 23 22 21 20 19 18 17 16 |
| Bit | Reserved |
| Mode | R |
| Initial Value | 0x0000 |
| | Initial Value: 0x0000_0000 |
| | 15 14 13 12 11 10 9 8 7 6 5 4 3 2 1 0 |
| Bit | CN0 |
| Mode | RW |
| Initial Value | 0x0000 |

Bit 15:0 CN0: TOM CCU0 counter register

This counter is stopped if the TOM channel is disabled and not reset on an enable event of TOM channel.

Bit 31:16 Reserved

Note: Read as zero, should be written as zero

| Register TOM[i]_CH[x]_CM0 (x: 0 . . . 15) | | | | | | | | | | | | | | | | |
|---|---|---|---|---|---|---|---|---|---|---|---|---|---|---|---|---|
| | Address Offset: 0x0088 + x * 0x0040 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | CM0 | | | | | | | | | | | | | | | |
| Mode | RW | | | | | | | | | | | | | | | |
| Initial Value | 0x0000 | | | | | | | | | | | | | | | |

Bit 15:0 CM0: TOM CCU0 compare register

Setting CM0 < CM1 configures a duty cycle of 100%.

Bit 31:16 Reserved

Note: Read as zero, should be written as zero

| Register TOM[i]_CH[x]_SR0 (x: 0 . . . 15) | | | | | | | | | | | | | | | | |
|---|---|---|---|---|---|---|---|---|---|---|---|---|---|---|---|---|
| | Address Offset: 0x008C + x * 0x0040 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | SR0 | | | | | | | | | | | | | | | |
| Mode | RW | | | | | | | | | | | | | | | |
| Initial Value | 0x0000 | | | | | | | | | | | | | | | |

Bit 15:0 SR0: TOM channel x shadow register SR0 for update of compare register CM0

Bit 31:16 Reserved

Note: Read as zero, should be written as zero

| Register TOM[i]_CH[x]_CM1 (x: 0 . . . 15) | | | | | | | | | | | | | | | | |
|---|---|---|---|---|---|---|---|---|---|---|---|---|---|---|---|---|
| | Address Offset: 0x0090 + x * 0x0040 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | CM1 | | | | | | | | | | | | | | | |
| Mode | RW | | | | | | | | | | | | | | | |
| Initial Value | 0x0000 | | | | | | | | | | | | | | | |

Bit 15:0 CM1: TOM CCU1 compare register

Setting CM1 = 0 configures a duty cycle of 0% independent of the configured value of CM0.

Bit 31:16 Reserved

Note: Read as zero, should be written as zero

| Register TOM[i]_CH[x]_SR1 (x: 0 . . . 15) | | | | | | | | | | | | | | | | |
|---|---|---|---|---|---|---|---|---|---|---|---|---|---|---|---|---|
| | Address Offset: 0x0094 + x * 0x0040 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | SR1 | | | | | | | | | | | | | | | |
| Mode | RW | | | | | | | | | | | | | | | |
| Initial Value | 0x0000 | | | | | | | | | | | | | | | |

Bit 15:0 SR1: TOM channel x shadow register SR1 for update of compare register CM1
Bit 31:16 Reserved
Note: Read as zero, should be written as zero

| Register TOM[i]_CH[x]_STAT (x: 0 . . . 15) | | | | | | | | | | | | | | | | |
|---|---|---|---|---|---|---|---|---|---|---|---|---|---|---|---|---|
| | Address Offset: 0x0098 + x * 0x0040 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000000 | | | | | | | | | | | | | | | |
| | Initial Value: 0x0000_0001 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | Reserved | | | | | | | | | | | | | | | OL |
| Mode | R | | | | | | | | | | | | | | | R |
| Initial Value | 0x0000000 | | | | | | | | | | | | | | | 1 |

Bit 0 OL: Output level of output TOM_OUT(x)
Bit 31:1 Reserved
Note: Read as zero, should be written as zero

| Register TOM[i]_CH[x]_IRQ_NOTIFY (x: 0 . . . 15) | | | | | | | | | | | | | | | | |
|---|---|---|---|---|---|---|---|---|---|---|---|---|---|---|---|---|
| | Address Offset: 0x009C + x * 0x0040 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | Reserved | | | | | | | | | | | | | | CCU1TC | CCU0TC |
| Mode | R | | | | | | | | | | | | | | RCW | RCW |

-continued

| Register TOM[i]_CH[x]_IRQ_NOTIFY (x: 0 . . . 15) | | | |
|---|---|---|---|
| Initial Value | 0x0000000 | 0 | 0 |

Bit 0 CCU0TC: CCU0 Trigger condition interrupt for channel x

0 = No interrupt occurred

1 = The condition CN0 >= CM0 was detected.

The notification of the interrupt is only triggered one time after reaching the condition CN0 >= CM0. To re-trigger the notification first the condition CN0 < CM0 has to be occurred.

Bit 1 CCU1TC: CCU1 Trigger condition interrupt for channel x

0 = No interrupt occurred

1 = The condition CN0 >= CM1 was detected.

The notification of the interrupt is only triggered one time after reaching the condition CN0 >= CM1. To re-trigger the notification first the condition CN0 < CM1 has to be occurred.

Bit 31:2 Reserved

Note: Read as zero, should be written as zero

| Register TOM[i]_CH[x]_IRQ_EN (x: 0 . . . 15) | | |
|---|---|---|
| | Address Offset: 0x00A0 + x * 0x0040 | Initial Value: 0x0000_0000 |
| | 31 30 29 28 27 26 25 24 23 22 21 20 19 18 17 16 15 14 13 12 | |
| Bit | Reserved | |
| Mode | R | |
| Initial Value | 0x0000000 | |

| | Initial Value: 0x0000_0000 | | |
|---|---|---|---|
| | 11 10 9 8 7 6 5 4 3 2 | 1 | 0 |
| Bit | Reserved | CCU1TC_IRQ_EN | CCU0TC_IRQ_EN |
| Mode | R | RW | RW |
| Initial Value | 0x0000000 | 0 | 0 |

Bit 0 CCU0TC_IRQ_EN: TOM_CCU0TC_IRQ interrupt enable

0 = Disable interrupt, interrupt is not visible outside GTM-IP

1 = Enable interrupt, interrupt is visible outside GTM-IP

Bit 1 CCU1TC_IRQ_EN: TOM_CCU1TC_IRQ interrupt enable See bit 0

Bit 31:2 Reserved

Note: Read as zero, should be written as zero

| Register TOM[i]_CH[x]_IRQ_FORCINT (x: 0 . . . 15) | | |
|---|---|---|
| | Address Offset: 0x00A4 + x * 0x0040 | Initial Value: 0x0000_0000 |
| | 31 30 29 28 27 26 25 24 23 22 21 20 19 18 17 16 15 14 13 12 11 10 9 8 | |
| Bit | Reserved | |
| Mode | R | |
| Initial Value | 0x0000000 | |

| | Initial Value: 0x0000_0000 | | |
|---|---|---|---|
| | 7 6 5 4 3 2 | 1 | 0 |
| Bit | Reserved | TRG_CCU1TC0 | TRG_CCU0TC0 |
| Mode | R | Aw | Aw |

-continued

| Register TOM[i]_CH[x]_IRQ_FORCINT (x: 0 . . . 15) | | | |
|---|---|---|---|
| Initial Value | 0x0000000 | 0 | 0 |

Bit 0 TRG_CCU0TC0: Trigger TOM_CCU0TC0_IRQ interrupt by software
0 = No interrupt triggering
1 = Assert CCU0TC0_IRQ interrupt for one clock cycle
Note: This bit is cleared automatically after interrupt is released
Bit 1 TRG_CCU1TC0: Trigger TOM_CCU1TC0_IRQ interrupt by software
0 = No interrupt triggering
1 = Assert CCU1TC0_IRQ interrupt for one clock cycle
Note: This bit is cleared automatically after write.
Bit 31:2 Reserved
Note: Read as zero, should be written as zero

| Register TOM[i]_CH[x]_IRQ_MODE (x: 0 . . . 15) | | | | | | | | | | | | | | | | | | | | | | | |
|---|---|---|---|---|---|---|---|---|---|---|---|---|---|---|---|---|---|---|---|---|---|---|---|
| | Address Offset: 0x00A8 + x * 0x0040 | | | | | | | | | | | | | | | Initial Value: 0x0000_0000 | | | | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 |
| Bit | Reserved | | | | | | | | | | | | | | | | | | | | | | |
| Mode | R | | | | | | | | | | | | | | | | | | | | | | |
| Initial Value | 0x00000000 | | | | | | | | | | | | | | | | | | | | | | |

| | Initial Value: 0x0000_0000 | | | | | | | | |
|---|---|---|---|---|---|---|---|---|---|
| | 8 | 7 | 6 | 5 | 4 | 3 | 2 | 1 | 0 |
| Bit | Reserved | | | | | | | IRQ_MODE | |
| Mode | R | | | | | | | RW | |
| Initial Value | 0x00000000 | | | | | | | 00 | |

Bit 1:0 IRQ_MODE: IRQ mode selection
00 = Level mode
01 = Pulse mode
10 = Pulse-Notify mode
11 = Single-Pulse mode
Note: The interrupt modes are described in section 0.
Bit 31:2 Reserved
Note: Read as zero, should be written as zero ARU-connected Timer Output Module (ATOM)

Overview

The ARU-connected Timer Output Module (ATOM) is able to generate complex output signals without CPU interaction due to its connectivity to the ARU. Typically, output signal characteristics are provided over the ARU connection through sub modules connected to ARU like e.g. the MCS, DPLL or PSM. Each ATOM sub module contains eight output channels which can operate independently from each other in several configurable operation modes. A block diagram of the ATOM sub module is depicted in FIG. 32.

ATOM Block Diagram

Figure 32:
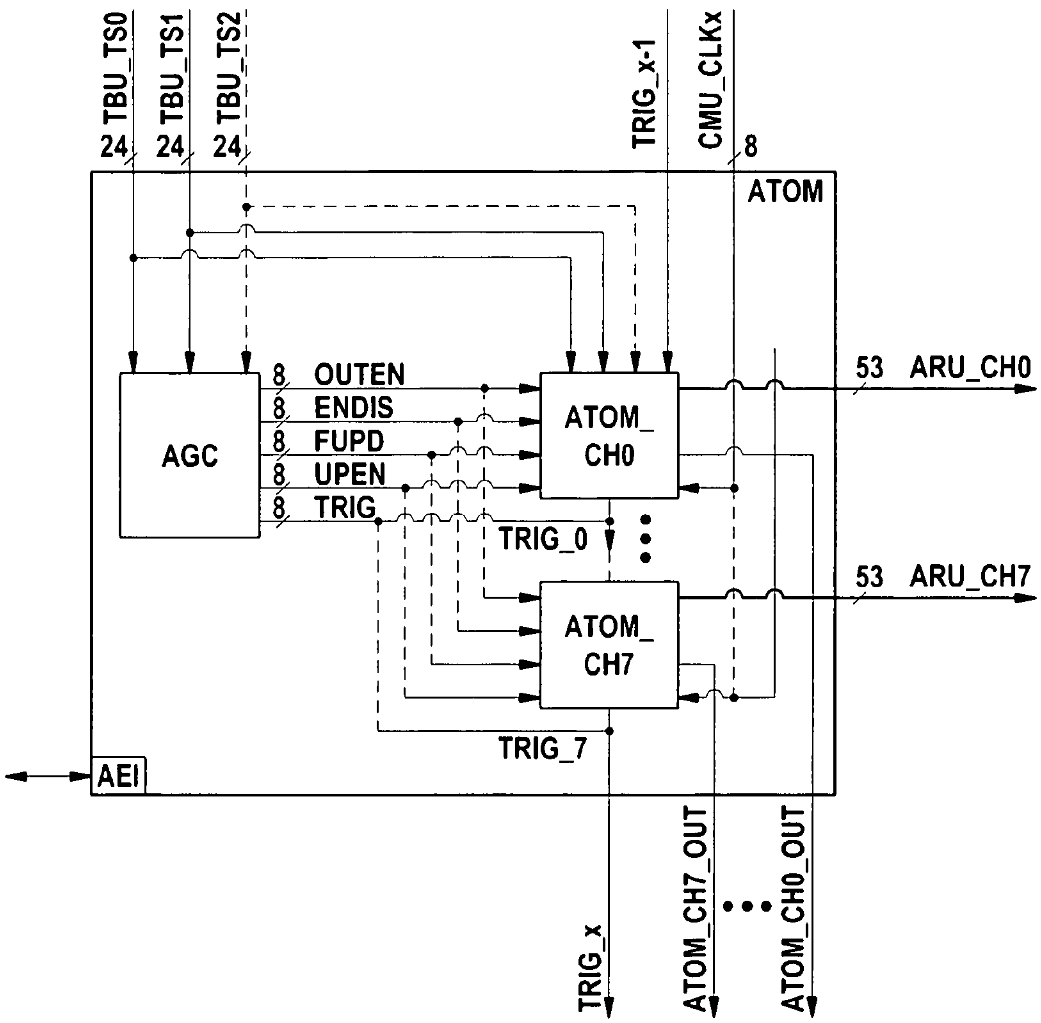

See FIG. 32.

The architecture of the ATOM sub module is similar to the TOM sub module, but there are some differences. First, the ATOM integrates only eight output channels. Hence, there exists one ATOM Global Control subunit (AGC) for the ATOM channels. The ATOM is connected to the ARU and can set up individual read requests from the ARU and write requests to the ARU. Furthermore, the ATOM channels are able to generate signals on behalf of time stamps and the ATOM channels are able to generate a serial output signal on behalf of an internal shift register.

Each ATOM channel provides four modes of operation:
ATOM Signal Output Mode Immediate (SOMI)
ATOM Signal Output Mode Compare (SOMC)
ATOM Signal Output Mode PWM (SOMP)
ATOM Signal Output Mode Serial (SOMS)

These modes are described in more detail in section 0.

In contrast to the TOM channels the ATOM channels' operation registers (e.g. counter, compare registers) are 24 bit wide. Moreover, the input clocks for the ATOM channels come from the configurable CMU_CLKx signals of the CMU sub module. This gives the freedom to select a programmable input clock for the ATOM channel counters. The ATOM channel is able to generate a serial bit stream, which is shifted out at the ATOM[i]_CH[x]_OUT output. When configured in this serial shift mode (SOMS) the selected CMU clock defines the shift frequency.

Each ATOM channel provides a so called operation and shadow register set. With this architecture it is possible to work with the operation register set, while the shadow register set can be reloaded with new parameters over CPU and/or ARU. When update via ARU is selected, it is possible to configure if both shadow registers are updated via ARU or only one of the shadow registers is updated.

On the other hand, the shadow registers can be used to provide data to the ARU when one or both of the compare units inside an ATOM channel match.

In TOM channels it is possible to reload the content of the operation registers with the content of the corresponding shadow registers and change the clock input signal for the counter register simultaneously. This simultaneous change of the input clock frequency together with reloading the operation registers is also implemented in the ATOM channels. In addition to the feature that the CPU can select another CMU_CLKx during operation (i.e. updating the shadow register bit field ACB of the ATOM[i]_CH[x]_CTRL register), the selection can also be changed via the ARU. Then, for the clock source update, the ACBI register bits of the ATOM[i]_CH[x]_STAT register are used as a shadow register for the CLK_SRC bit field inside the ATOM[i]_CH[x]_CTRL register.

In general, the behaviour of the compare units CCU0 and CCU1 and the output signal behaviour is controlled with the ACB bit field inside the ATOM[i]_CH[x]_CTRL register when the ARU connection is disabled and the behaviour is controlled via ARU through the ACBI bit field of the ATOM[i]_CH[x]_STAT register, when the ARU is enabled.

Since the ATOM is connected to the ARU, the shadow registers of an ATOM channel can be reloaded via the ARU connection or via CPU over its AEI interface. When loaded via the ARU interface, the shadow registers act as a buffer between the ARU and the channel operation registers. Thus, a new parameter set for a PWM can be reloaded via ARU into the shadow registers, while the operation registers work on the actual parameter set.

ATOM Global Control (AGC)

Synchronous start and stop of more then one output channel is possible with the AGC subunit. This subunit has the same functionality as the TGC subunit of the TOM sub module. For a description of the AGC subunit functionality, please refer therefore to chapter 0.

ATOM Channel Mode Overview

As mentioned above, each ATOM channel offers four different operation modes.

In ATOM Signal Output Mode Immediate (SOMI), the ATOM channels generate an output signal immediately after receiving an ARU word according to the two signal level output bits of the ARU word received through the ACBI bit field. Due to the fact, that the ARU destination channels are served in a round robin order, the output signal can jitter in this mode with a jitter of the ARU round trip time.

In ATOM Signal Output Mode Compare (SOMC), the ATOM channel generates an output signal on behalf of time stamps that are located in the ATOM operation registers. These time stamps are compared with the time stamps, the TBU generates. The ATOM is able to receive new time stamps either by CPU or via the ARU. The new time stamps are directly loaded into the channels operation register. The shadow registers are used as capture registers for the two time base values, when a compare match of the channels operation registers occurs.

In ATOM Signal Output Mode PWM (SOMP), the ATOM channel is able to generate simple and complex PWM output signals like the TOM sub module by comparing its operation registers with a sub module internal counter. In difference to the TOM, the ATOM shadow registers can be reloaded by the CPU and by the ARU in the background, while the channel operates on the operation registers.

In ATOM Signal Output Mode Serial (SOMS), the ATOM channel generates a serial output bit stream on behalf of a shift register. The number of bits shifted and the shift direction is configurable. The shift frequency is determined by one of the CMU_CLKx clock signals. Please refer to section 0 for further details.

ATOM Channel Architecture

Each ATOM channel is able to generate output signals according to four operation modes. The architecture of the ATOM channels is similar to the architecture of the TOM channels. The general architecture of an ATOM channel is depicted in FIG. 33.

ATOM Channel Architecture

Figure 33:
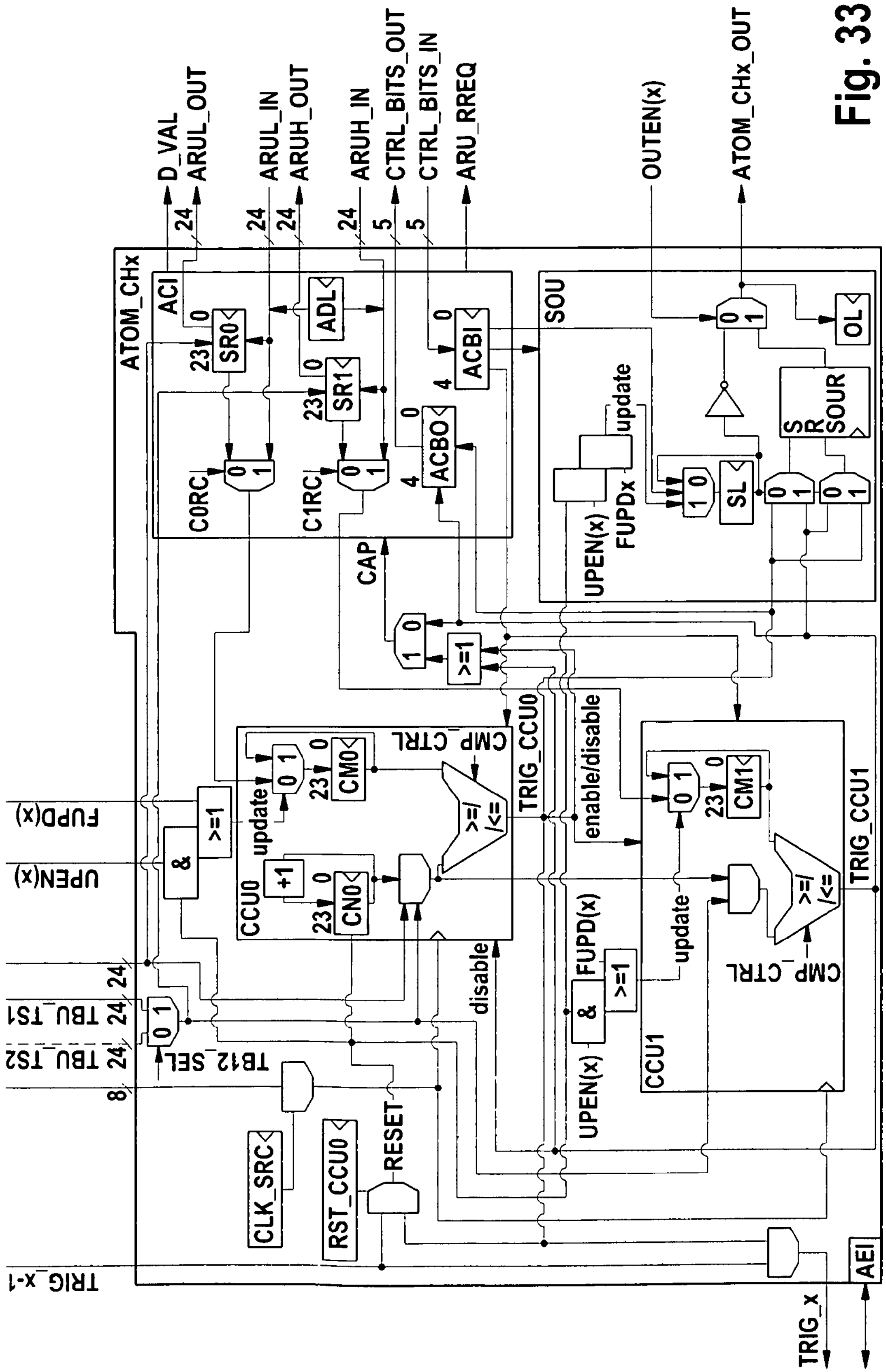

See FIG. 33.

Differences between the TOM and ATOM channels are the 24 bit width of the operation registers CN0, CM0 and CM1 and the shadow registers SR0 and SR1 . The comparators inside CCU0 and CCU1 provide a selectable signed greater/equal or less/equal comparison to compare against the GTM time bases TBU_TS0 and TBU_TS1. If there is a third time base TBU_TS2 implemented inside the GTM, this time base can also be selected inside the ATOM channel with the TB12_SEL bit inside the ATOM[i]_CH[x]_CTRL register for comparison. Please refer to TBU chapter 0 for further details. For an overview of the implemented TBU sub module version please refer to chapter 0. The CCU0 and CCU1 units have different tasks for the different ATOM channel modes.

The signed compare is used to detect time base overflows and to guarantee, that a compare match event can be set up for the future even when the time base will first overflow and then reach the compare value. Please note, that for a correct behaviour of this signed compare, the new compare value must not be specified larger/smaller than half of the range of the total time base value (0x7FFFFF).

In SOMC mode, the two compare units CCUx can be used in combination to each other. When used in combination, the trigger lines TRIG_CCU0 and TRIG_CCU1 can be used to enable/disable the other compare unit on a match event. Please refer to section 0 for further details.

The Signal Output Unit (SOU) generates the output signal for each ATOM channel. This output signal level depends on the ATOM channel mode and on the SL bit of the ATOM[i]_CH[x]_CTRL register in combination with the two control bits. This two control bits ACB(1) and ACB(0) can either be received via CPU in the ACB register field of the ATOM[i]_CH[x]_CTRL register or via ARU in the ACBI bit field of the ATOM[i]_CH[x]_STAT register.

The SL bit in the ATOM[i]_CH[x]_CTRL register defines in all modes the initial signal level after the channel is enabled by the software. The default signal level when the channel is disabled is '0'.

In SOMI and SOMC mode the output signal level depends on the SL, ACB0 and ACB1 bits. In SOMP mode the output signal level depends on the two trigger signals TRIG_CCU0 and TRIG_CCU1 since theses two triggers define the PWM timing characteristics and the SL bit defines the level of the duty cycle. In SOMS mode the output signal level is defined by the bit pattern that has to be shifted out by the ATOM channel. The bit pattern is located inside the CM1 register.

The ARU Communication Interface (ACI) subunit is responsible for requesting data routed through ARU to the ATOM channel in SOMI, SOMP and SOMS modes, and additionally for providing data to the ARU in SOMC mode. In SOMC mode the ACI shadow registers have a different behaviour and are used as output buffer registers for data send to ARU.

ARU Communication Interface

The ATOM channels have an ARU Communication Interface (ACI) subunit. This subunit is responsible for data exchange from and to the ARU. This is done with the two implemented registers SR0, SR1, and the ACBI and ACBO bit fields that are part of the ATOM[i]_CH[x]_STAT register. The ACI architecture is shown in FIG. 34.

ACI Architecture Overview

Figure 34:
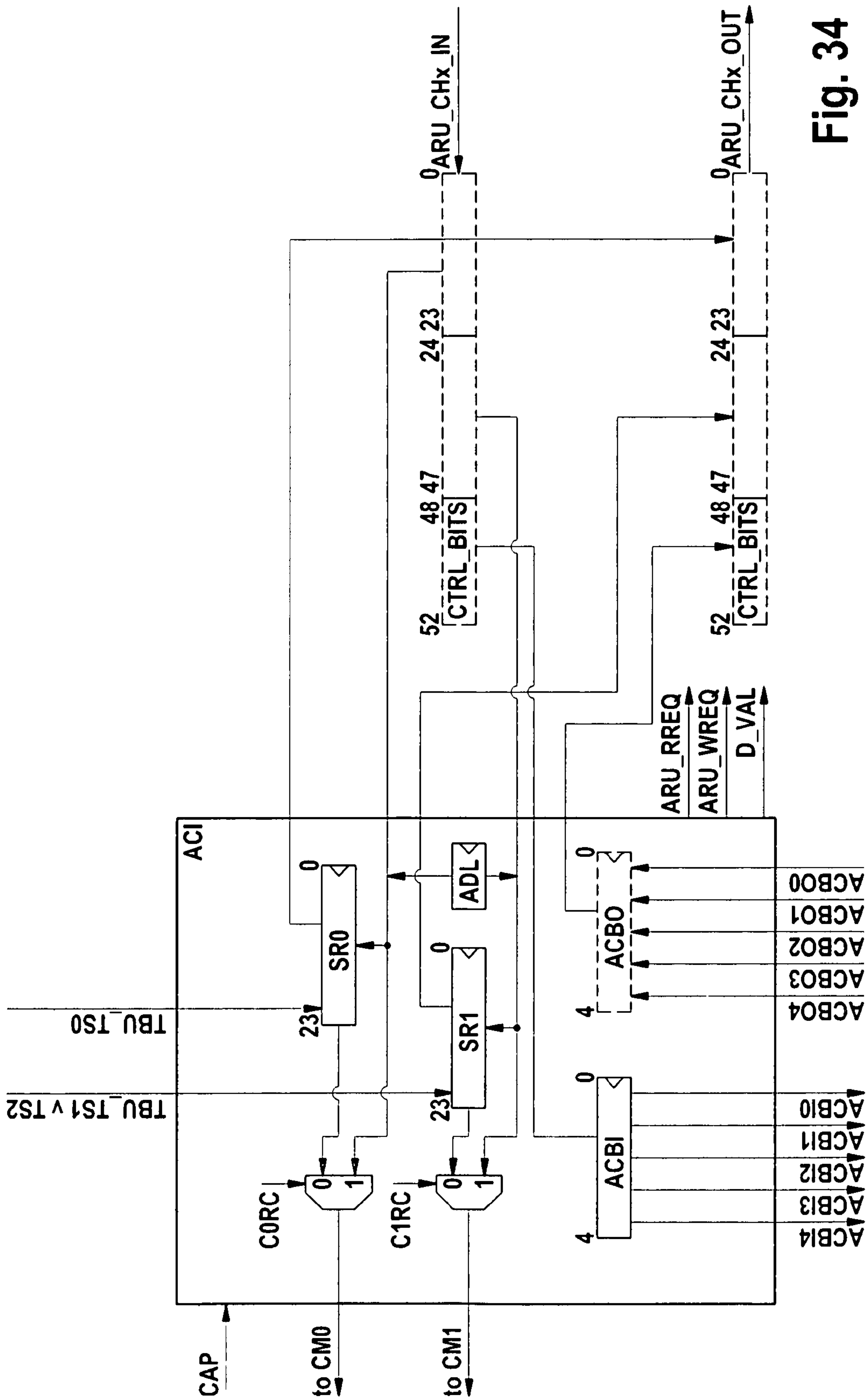

See FIG. 34.

Incoming ARU data (53 bit width signal ARU_CHx_IN) is split into three parts by the ACI and communicated to the ATOM channel registers.

In SOMI, SOMP and SOMS modes incoming ARU data ARU_CHx_IN is split in a way that the lower 24 bits of the ARU data (23 down to 0) are stored in the SR0 register, the bits 47 down to 24 are stored in the SR1 register and the bits 52 down to 48 (CTRL_BIT) are stored in the ACBI bit field the register ATOM[i]_CH[x]_STAT. The ATOM channel has to ensure, that in a case when the channel operation registers CM0 and CM1 are updated with the SR0 and SR1 register content and an ARU transfer to these shadow registers happens in parallel that either the old data in both shadow registers is transferred into the operation registers or both new values from the ARU are transferred.

In SOMC mode incoming ARU data ARU_CHx_IN is written directly to the ATOM channel operation register in the way that the lower 24 bits (23 down to 0) are written to CM0, and the bits 47 down to 24 are written to register CM1. The bits 52 down to 48 are stored in the ACBI bit field of the ATOM[i]_CH[x]_STAT register and control the behaviour of the compare units and the output signal of the ATOM channel.

In SOMC mode the SR0 and SR1 registers serve as capture registers for the time stamps coming from TBU whenever a compare match event is signalled by the CCU0 and/or CCU1 subunits via the CAP signal line. These two time stamps are then provided together with actual ATOM channel status information located in the ACBO bit field to the ARU at the dedicated ARU write address of the ATOM channel. The encoding of the ARU control bits in the different ATOM operation modes is described in more detail in the following chapters.

ATOM Channel Modes

As described above, each ATOM channel can operate independently from each other in one of four dedicated output modes:

ATOM Signal Output Mode Immediate (SOMI)

ATOM Signal Output Mode Compare (SOMC)

ATOM Signal Output Mode PWM (SOMP)

ATOM Signal Output Mode Serial (SOMS)

The Signal Output Mode PWM (SOMP) is principally the same like the output mode for the TOM sub module except the bit reverse mode which is not included in the ATOM. In addition, it is possible to reload the shadow registers over the ARU without the need of a CPU interaction. The three other modes provide additional functionality for signal output control. All operation modes are described in more detail in the following sections.

ATOM Signal Output Mode Immediate (SOMI)

In ATOM Signal Output Mode Immediate (SOMI), the ATOM channel generates output signals on the ATOM[i]_CH[x]_OUT output port immediate after update of the bit ACBI(0) of register ATOM[i]_CH[x]_STAT via the associated ARU data input stream (bits 52 down to 48 of ARU_CHx_IN) received at the ACI subunit. The remaining 48 ARU bits (47 down to 0) have no meaning in this mode.

The initial ATOM channel port pin ATOM[i]_CH[x]_OUT signal level has to be specified by the SL bit field (OPD=0 defined in this mode, see FIG. 33) of the ATOM[i]_CH[x]_CTRL register when OUTEN_CTRL register bit field OUTEN_CTRLx is disabled (see section 0) for details.

In SOMI mode only bit 48 of signal ARU_CHx_IN ARU is meaningful for the output behaviour of the channel. The output behaviour depends on the SL bit of register ATOM[i]_CH[x]_CTRL and the ACBI(0) bit of the ATOM[i]_CH[x]_STAT register:

| SL | ACBI(0) | Output behaviour<br>Set output to inverse of SL (1) |
|---|---|---|
| 0 | 0 | Set output to inverse of SL (1) |
| 0 | 1 | Set output to inverse of SL (1) to SL (0) |
| 1 | 0 | Set output to inverse of SL (1)nverse of SL (0) |
| 1 | 1 | Set output to inverse of SL (1)L (1) |

The signal level bit ACBI(0) is transferred to the SOU subunit of the ATOM and made visible at the output port according to the table above immediately after the data was received by the ACI. This can introduce a jitter on the output signal since the ARU channels are served in a time multiplexed fashion.

Register ATOM[i]_CH[x]_CTRL in SOMI mode (x: 0 . . . 7)

Address Offset: 0x0080 + x * 0x0080

| | 31 30 29 28 27 | 26 | 25 | 24 | 23 22 21 | 20 | 19 18 17 | 16 |
|---|---|---|---|---|---|---|---|---|
| Bit | Reserved | Not used | Reserved | Not used | Reserved | Not used | Reserved | Not used |
| Mode | R | R | R | R | R | R | R | R |
| Initial Value | 0 | 0 | 0 | 0 | 0 | 0 | 0 | 0 |

Initial Value: 0x0000_0000

| | 15 | 14 13 12 | 11 | 10 | 9 8 7 6 5 4 | 3 | 2 | 1 0 |
|---|---|---|---|---|---|---|---|---|
| Bit | Reserved | Not used | SL | Reserved | Not used | ARU_EN | Not used | MODE |
| Mode | R | R | RW | R | R | RW | R | RW |

-continued

| Register ATOM[i]_CH[x]_CTRL in SOMI mode (x: 0 . . . 7) | | | | | | | | |
|---|---|---|---|---|---|---|---|---|
| Initial Value | 0 | 0 | 0 | 0 | 0 | 0 | 0 | 0 |

Bit 1:0 MODE: ATOM channel mode select.
00: ATOM Signal Output Mode Immediate (SOMI)
Bit 2 Not used: Not used in this mode
Note: Read as zero, should be written as zero
Bit 3 ARU_EN: ARU Input stream enable
0 = ARU Input stream disabled
1 = ARU Input stream enabled
Bit 8:4 Not used: Not used in this mode
Note: Read as zero, should be written as zero
Bit 10:9 Reserved: Read as zero, should be written as zero (OPD = 0)
Bit 11 SL: Initial signal level after channel is enabled
0 = Low signal level
1 = High signal level
Note: After reset and if channel is disabled, the register SOUR is set to the inverse reset value of bit SL (i.e. '1'). If the channel is disabled or the output is disabled, the output ATOM_OUT[x] is set to inverse value of SL.
Bit 14:12 Not used: Not used in this mode
Note: Read as zero, should be written as zero
Bit 15 Reserved: Read as zero, should be written as zero.
Bit 16 Not used: Not used in this mode
Note: Read as zero, should be written as zero
Bit 19:17 Reserved: Read as zero, should be written as zero
Bit 20 Not used: Not used in this mode
Note: Read as zero, should be written as zero
Bit 23:21 Reserved: Read as zero, should be written as zero
Bit 24 Not used: Not used in this mode
Note: Read as zero, should be written as zero
Bit 25 Reserved: Read as zero, should be written as zero
Bit 26 Not used: Not used in this mode
Note: Read as zero, should be written as zero
Bit 31:27 Reserved: Read as zero, should be written as zero ATOM Signal Output Mode Compare (SOMC)

In ATOM Signal Output Mode Compare (SOMC) the output action is performed in dependence of the comparison between input values located in CM0 and/or CM1 registers and the two (three) time base values TBU_TS0 or TBU_TS1 (or TBU_TS2) provided by the TBU. For a description of the time base generation please refer to the TBU specification in chapter 1. It is configurable, which of the two (three) time bases is to be compared with one or both values in CM0 and CM1.

The behaviour of the two compare units CCU0 and CCU1 can be controlled either with the bits 4 down to 2 of bit field ACB inside the ATOM[i]_CH[x]_CTRL register, when the ARU connection is disabled or with the ACBI bit field of the ATOM[i]_CH[x]_STAT register, when the ARU is enabled.

If three time bases exist for the GTM-IP there must be a preselection between TBU_TS1 and TBU_TS2 for the ATOM channel. This can be done with TB12_SEL bit in the ATOM[i]_CH[x]_CTRL register.

The time base comparison can be done on a greater/equal or less/equal compare according to the CMP_CTRL flag. This flag is part of the ATOM[i]_CH[x]_CTRL register.

In principal, there are two input possibilities to provide the compare values to the ATOM channel. The first possible solution is to write the compare values over the AEI bus interface. The second possibility is to reload the parameters via ARU. For this the ACI subunit has to be enabled with the ARU_EN bit in the ATOM[i]_CH[x]_CTRL register.

Figure 35:
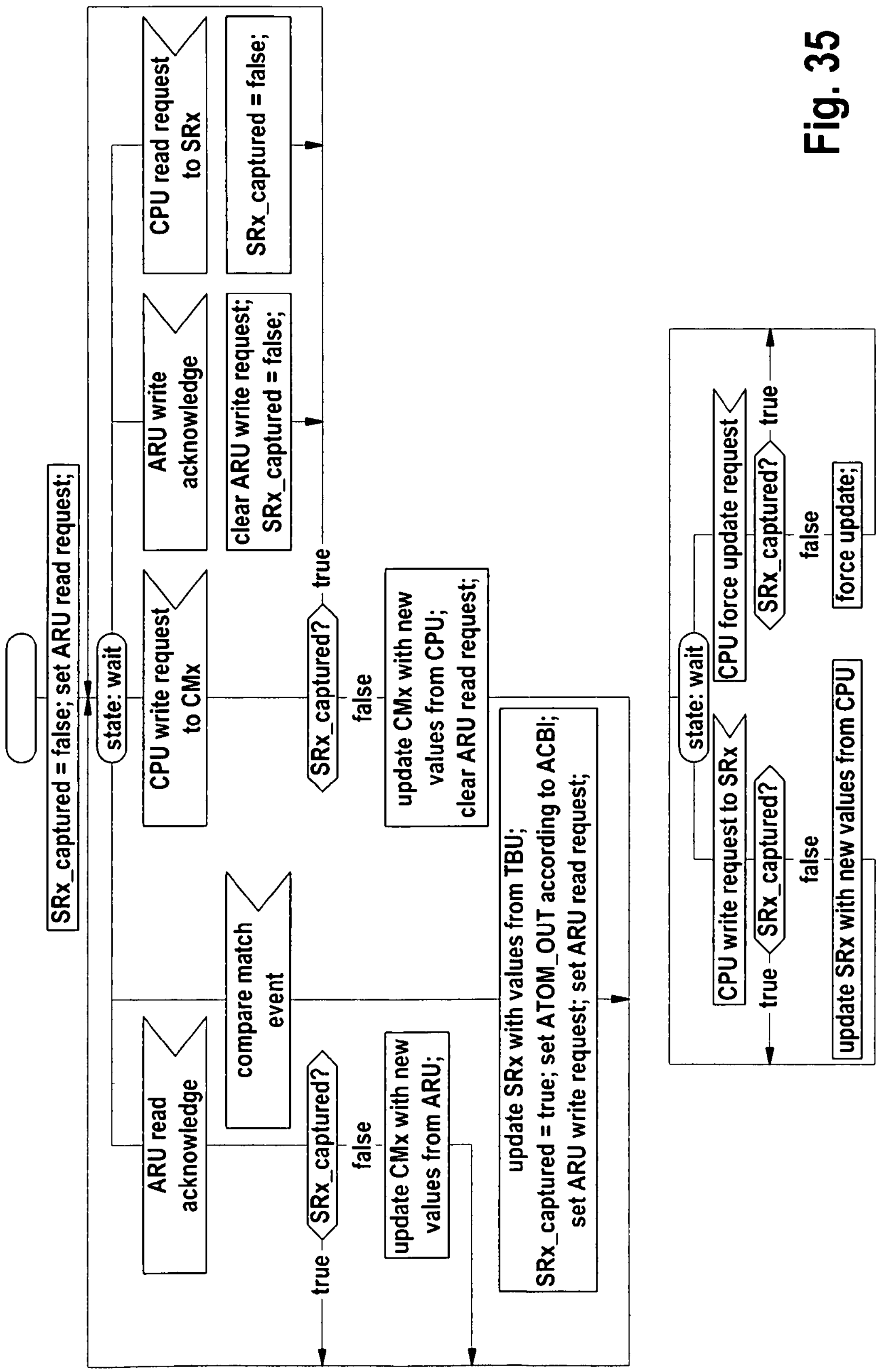

The behaviour of an ATOM channel in SOMC mode is visualized in FIG. 35.

SOMC State Diagram

See FIG. 35.

If ARU access is enabled, data received via the ARU is continuously transferred to the register CM0 and CM1 and the bit field ACBI of register ATOM[i]_CH[x]_STAT as long as no specified compare match event occurs. The ATOM channel continuously receives data via the ARU and updates the register CM0 and CM1 until the specified compare match event happens.

On a compare match event the shadow register SR0 and SR1 are used to capture the TBU time stamp values. SR0 always holds TBU_TS0 and SR1 either holds TBU_TS1 or TBU_TS2 dependent on the TB12_SEL bit in the ATOM[i]_CH[x]_CTRL register.

The output of the ATOM channel is set on a compare match event depending on the bit field ACBI in register ATOM[i]_CH[x]_STAT if ARU is enabled or depending on the ABC bit field in register ATOM[i]_CH[x]_CTRL if ARU is disabled.

After a compare match event the update of the register CM0 , CM1 and the ACBI bit field in register ATOM[i]_CH[x]_STAT as well as the bit field ACB in register ATOM[i]_CH[x]_CTRL is blocked until the data captured in the shadow registers SR0 SR1 is transmitted successfully via the ARU to another module or the CPU reads out at least one of the register SR0 or SR1.

If the register SR0 and SR1 holding the captured TBU time stamp values are read by either the ARU or the CPU, the next write access to or update of the register CM0 or CM1 via ARU or the CPU enables the new compare match check.

The captured content in SR0 and SR1 is made available together with the compare result in the ACBO bit field of the ATOM[i]_CH[x]_STAT register. Bit three (3) of the ACBO bit field is set on a compare match event in CCU0 , bit four (4) of the ACBO bit field is set on a compare match event in CCU1 . The signal D_VAL indicates valid data for the ARU. Additionally, an ATOM capture interrupt ACAP_IRQ is raised.

The CPU can check at any time if the ATOM channel has received valid data from the ARU and waits for a compare event to happen. This is signalled by the DV bit inside the ATOM[i]_CH[x]_STAT register.

Although the ATOM channel may be controlled by data received via the ARU, the CPU is able to request at any time a late update of the compare register. This can be initiated by setting the WR_REQ bit inside the ATOM[i]_CH[x]_CTRL register. By doing this, the ATOM will request no further data from ARU (if ARU access was enabled). The channel will in any case continue to compare against the values stored inside the compare registers (if bit DV was set). The CPU can now update the new compare values until the compare event happens by writing to the shadow registers, and force the ATOM channel to update the compare registers by writing to the force update register bits in the AGC register.

If the WR_REQ bit is set and a compare match event happens, any further access to the shadow registers SR0 , SR1 or the compare register CM0, CM1 is blocked and the force update of this channel is blocked. In addition, the WRF bit is set in the ATOM[i]_CH[x]_STAT register. Thus, the CPU can determine that the late update failed by reading the WRF bit.

The WR_REQ bit and the DV bit will be reset on a compare match event.

A blocked force update mechanism will be enabled again after a read access to the register SR0 or SR1 by either the ARU or the CPU.

When the ARU_EN bit is reset, the (one) two compare values for CM0 and/or CM1 have to be provided by the CPU. The ATOM channel waits for the compare match event and then disables the channel. The channel has to be enabled again by the CPU when new compare values were provided.

When CCU0 and CCU1 is used for comparison it is possible to generate very small spikes on the output pin by loading CM0 and CM1 with two time stamp values for TBU_TS0, TBU_TS1 or TBU_TS2 close together. The output pin will then be set or reset dependent on the SL bit and the specified ACB(0) and ACB(1) bits in the ACB bit field of the ATOM[i]_CH[x]_CTRL register or the ACBI bit field of the ATOM[i]_CH[x]_STAT register on the first match event and the output will toggle on the second compare event.

It is important to note, that the bigger (smaller) time stamp has to be loaded into the CM1 register, since the CCU0 will enable the CCU1 once it has reached its comparison time stamp. The order of the comparison time stamps depends on the defined greater/equal or less/equal comparison of the CCUx units.

The CCUx trigger signals TRIG_CCU0 and TRIG_CCU1 always create edges, dependent on the predefined signal level in SL bit when both CCUx units are used. When only CCU0 is used then the output is set to the specified signal level defined with the SL bit in combination with the ACBI(0) and ACBI(1) bits of the ARU control bits on a compare match between the selected time base and CM0.

When configured in SOMC mode, the channel port pin has to be initialized to an initial signal level. This initial level after enabling the ATOM channel is determined by the SL bit field in the ATOM[i]_CH[x]_CTRL register.

If the channel receives its compare values via ARU the signal output level on compare match events is configurable with the ACBI(0) and ACBI(1) bits in combination with the SL bit setting:

| SL | ACBI(1) | ACBI(0) | Output behaviour |
|---|---|---|---|
| 0 | 0 | 0 | No signal level change at output |
| 0 | 0 | 1 | Set output signal level to 1 |
| 0 | 1 | 0 | Set output signal level to 0 |
| 0 | 1 | 1 | Toggle output signal level |
| 1 | 0 | 0 | No signal level change at output |
| 1 | 0 | 1 | Set output signal level to 0 |
| 1 | 1 | 0 | Set output signal level to 1 |
| 1 | 1 | 1 | Toggle output signal level |

The capture/compare units can be controlled with the three ACBI bits ACBI(2), ACBI(3) and ACBI(4). The meaning these bits is shown in the following table:

| ACBI(4) | ACBI(3) | ACBI(2) | CCUx control |
|---|---|---|---|
| 0 | 0 | 0 | Serve First: Compare in CCU0 using TBU_TS0 and in parallel in CCU1 using TBU_TS1 or TBU_TS2. Disable other CCUx on compare match. Output signal level on the compare match of the matching CCUx unit is defined by combination of SL, ACBI(1) and ACBI(0). Details see table 0 |
| 0 | 0 | 1 | Serve First: Compare in CCU0 using TBU_TS0 and in parallel in CCU1 using TBU_TS1 or TBU_TS2. Disable other CCUx on compare match. Output signal level on the compare match of the matching CCUx unit is defined by combination of SL, ACBI(1) and ACBI(0). Details see table 0 |
| 0 | 1 | 0 | Compare in CCU0 only, use time base TBU_TS0. Output signal level is defined by combination of SL, ACBI(1) and ACBI(0) bits. |
| 0 | 1 | 1 | Compare in CCU1 only, use time base TBU_TS1 or TBU_TS2. Output signal level is defined by combination of SL, ACBI(1) and ACBI(0) bits. |
| 1 | 0 | 0 | Serve Last: Compare in CCU0 and then in CCU1 using TBU_TS0. Output signal level when CCU0 matches is defined by combination of SL, ACBI(1) and ACBI(0). On the CCU1 match the output level is toggled. |
| 1 | 0 | 1 | Serve Last: Compare in CCU0 and then in CCU1 using TBU_TS1 or TBU_TS2. Output signal level when CCU0 matches is defined by |

-continued

| ACBI(4) | ACBI(3) | ACBI(2) | CCUx control |
|---|---|---|---|
| | | | combination of SL, ACBI(1) and ACBI(0). On the CCU1 match the output level is toggled. |
| 1 | 1 | 0 | Serve Last: Compare in CCU0 using TBU_TS0 and then in CCU1 using TBU_TS1 or TBU_TS2. Output signal level when CCU1 matches is defined by combination of SL, ACBI(1) and ACBI(0). |
| 1 | 1 | 1 | Change ARU read address to ATOM_RDADDR1 DV flag is not set. Neither ACBI(1) nor ACBI(0) is evaluated. |

The behaviour of the ACB42 bit combinations '000' and '001' is described in more detail in table 0.

ATOM CCUx Serve First Definition

| ACB4 | ACB3 | ACB2 | ACB1 | ACB0 | SL | CCU0 match | CCU1 match | Pin level new |
|---|---|---|---|---|---|---|---|---|
| 0 | 0 | 0 | 0 | 0 | 0 | 0 | 1 | hold |
| | | | | | | 1 | 0 | hold |
| | | | | | | 1 | 1 | hold |
| 0 | 0 | 0 | 0 | 1 | 0 | 0 | 1 | 1 |
| | | | | | | 1 | 0 | 1 |
| | | | | | | 1 | 1 | 1 |
| 0 | 0 | 0 | 1 | 0 | 0 | 0 | 1 | 0 |
| | | | | | | 1 | 0 | 0 |
| | | | | | | 1 | 1 | 0 |
| 0 | 0 | 0 | 1 | 1 | 0 | 0 | 1 | toggle |
| | | | | | | 1 | 0 | toggle |
| | | | | | | 1 | 1 | toggle |
| 0 | 0 | 0 | 0 | 0 | 1 | 0 | 1 | hold |
| | | | | | | 1 | 0 | hold |
| | | | | | | 1 | 1 | hold |
| 0 | 0 | 0 | 0 | 1 | 1 | 0 | 1 | 0 |
| | | | | | | 1 | 0 | 0 |
| | | | | | | 1 | 1 | 0 |
| 0 | 0 | 0 | 1 | 0 | 1 | 0 | 1 | 1 |
| | | | | | | 1 | 0 | 1 |
| | | | | | | 1 | 1 | 1 |
| 0 | 0 | 0 | 1 | 1 | 1 | 0 | 1 | toggle |
| | | | | | | 1 | 0 | toggle |
| | | | | | | 1 | 1 | toggle |
| 0 | 0 | 1 | 0 | 0 | 0 | 0 | 1 | hold |
| | | | | | | 1 | 0 | toggle |
| | | | | | | 1 | 1 | hold |
| 0 | 0 | 1 | 0 | 1 | 0 | 0 | 1 | 0 |
| | | | | | | 1 | 0 | 1 |
| | | | | | | 1 | 1 | 0 |
| 0 | 0 | 1 | 1 | 0 | 0 | 0 | 1 | 1 |
| | | | | | | 1 | 0 | 0 |
| | | | | | | 1 | 1 | 1 |
| 0 | 0 | 1 | 1 | 1 | 0 | 0 | 1 | toggle |
| | | | | | | 1 | 0 | hold |
| | | | | | | 1 | 1 | toggle |
| 0 | 0 | 1 | 0 | 0 | 1 | 0 | 1 | hold |
| | | | | | | 1 | 0 | toggle |
| | | | | | | 1 | 1 | hold |
| 0 | 0 | 1 | 0 | 1 | 1 | 0 | 1 | 1 |
| | | | | | | 1 | 0 | 0 |
| | | | | | | 1 | 1 | 1 |
| 0 | 0 | 1 | 1 | 0 | 1 | 0 | 1 | 0 |
| | | | | | | 1 | 0 | 1 |
| | | | | | | 1 | 1 | 0 |
| 0 | 0 | 1 | 1 | 1 | 1 | 0 | 1 | toggle |
| | | | | | | 1 | 0 | hold |

It is important to note that the bit combination "111" for the ACBI(4), ACBI(3) and ACBI(2) bits forces the channel to request new compare values from another destination read address defined in the ATOM_RDADDR1 bit field of the ATOM[i]_CH[x]_RDADDR register. After data was successfully received and the compare event occurred the ATOM channel switches back to ATOM_RDADDR0 to receive the next data from there.

In SOMC mode the channel is always disabled after the compare match event occurred when the ARU_EN bit is disabled (compare values are reloaded via CPU) in the ATOM [i]_CH[x]_CTRL register. When the ARU_EN bit is set, the ATOM channel first waits for the compare event to happen, then disables the CCUx units, provides the captured time stamps to the ARU and request new compare values via ARU in parallel. Thus, a compare event happens only once and when no new data is provided via ARU or CPU the ATOM channel will not create any further signal at the output port.

In addition to the two time stamps, the ATOM channel provides the result of the compare match event in the ACBO (4) and ACBO(3) bits of the ATOM[i]_CH[x]_STAT register.

These bits are also transferred via ARU. The meaning of the bits is shown in the following table:

| ACBO(4) | ACBO(3) | Return value to ARU |
|---|---|---|
| 0 | 1 | CCU0 compare match occurred |
| 1 | 0 | CCU1 compare match occurred |

Register ATOM[i]_CH[x]_CTRL in SOMC mode (x: 0 . . . 7)

Address Offset: 0x0080 + x * 0x0080 — Initial Value: 0x0000_0000

| | 31 30 29 28 | 27 | 26 | 25 | 24 | 23 22 21 | 20 | 19 18 17 | 16 | 15 | 14 13 12 |
|---|---|---|---|---|---|---|---|---|---|---|---|
| Bit | Reserved | ABM | Not used | Reserved | Not used | Reserved | Not used | Reserved | WR_REQ | Reserved | Not used |
| Mode | R | RW | R | R | R | R | R | R | RW | R | R |
| Initial Value | 0 | 0 | 0 | 0 | 0 | 0 | 0 | 0 | 0 | 0 | 0 |

Initial Value: 0x0000_0000

| | 11 | 10 | 9 | 8 7 6 | 5 4 | 3 | 2 | 1 0 |
|---|---|---|---|---|---|---|---|---|
| Bit | SL | Reserved | CMP_CTRL | ACB42 | ACB10 | ARU_EN | TB12_SEL | MODE |
| Mode | RW | R | RW | RW | RW | RW | RW | RW |
| Initial Value | 0 | 0 | 0 | 0 | 00 | 0 | 0 | 00 |

Bit 1:0 MODE: ATOM channel mode select.
01: ATOM Signal Output Mode Compare (SOMC)
Bit 2 TB12_SEL: Select time base value TBU_TS1 or TBU_TS2.
0 = TBU_TS1 selected for comparison
1 = TBU_TS2 selected for comparison
Note: This bit is only applicable if three time bases are present in the GTM-IP
Bit 3 ARU_EN: ARU Input stream enable.
0 = ARU Input stream disabled
1 = ARU Input stream enabled
Bit 5:4 ACB10: Signal level control bits.
00: No signal level change at output.
01: Set output signal level to 1 when SL bit = 0 else output signal level to 0.
10: Set output signal level to 0 when SL bit = 0 else output signal level to 1.
11: No signal level change at output.
Note: These bits are only applicable if ARU_EN = ‘0’.
Bit 8:6 ACB42: ATOM control bits ACB(4), ACB(3), ACB(2)
000: Compare in CCU0 and CCU1 in parallel, disable the CCUx on a compare match on either of compare units. Use TBU_TS0 in CCU0 and TBU_TS1 or TBU_TS2 in CCU1.
001: Compare in CCU0 and CCU1 in parallel, disable the CCUx on a compare match on either compare units. Use TBU_TS0 in CCU0 and TBU_TS1 or TBU_TS2 in CCU1.
010: Compare in CCU0 only against TBU_TS0.
011: Compare in CCU1 only against TBU_TS1 or TBU_TS2.
100: Compare first in CCU0 and then in CCU1. Use TBU_TS0.
101: Compare first in CCU0 and then in CCU1. Use TBU_TS1 or TBU_TS2.
110: Compare first in CCU0 and then in CCU1. Use TBU_TS0 in CCU0 and TBU_TS1 or TBU_TS2 in CCU1.
111: Change to RD_ADDR1.
Note: These bits are only applicable if ARU_EN = ‘0’.
Bit 9 CMP_CTRL: CCUx compare strategy select.
0 = Greater/equal compare against TBU time base values
1 = Less/equal compare against TBU time base values
Bit 10 Reserved: Read as zero, should be written as zero.
Bit 11 SL: Initial signal level after channel enable.
0 = Low signal level
1 = High signal level
Note: After reset and if channel is disabled, the register SOUR is set to the inverse reset value of bit SL (i.e. ‘1’). If the channel is disabled or the output is disabled, the output ATOM_OUT[x] is set to inverse value of SL.
Bit 14:12 Not used: Not used in this mode
Note: Read as zero, should be written as zero
Bit 15 Reserved: Read as zero, should be written as zero.
Bit 16 WR_REQ: CPU write request bit
Note: The CPU can disable subsequent ARU read requests by the channel and can update the shadow registers with new compare values, while the compare units operate on old compare values received by former ARU accesses, if occurred.
Bit 19:17 Reserved: Read as zero, should be written as zero
Bit 20 Not used: not used in this mode
Note: Read as zero, should be written as zero
Bit 23:21 Reserved: Read as zero, should be written as zero
Bit 24 Not used: not used in this mode
Note: Read as zero, should be written as zero
Bit 25 Reserved: Read as zero, should be written as zero
Bit 26 Not used: not used in this mode -continued

| Register ATOM[i]_CH[x]_CTRL in SOMC mode (x: 0 . . . 7) |
|---|
| Note: Read as zero, should be written as zero |
| Bit 27 ABM: ARU blocking mode |
| 0 = ARU blocking mode disabled: ATOM reads continuously from ARU and updates CM0, CM1 independent of pending compare match event |
| 1 = ARU blocking mode enabled: after updating CM0, CM1 via ARU, no new data is read from ARU until compare match event is occurred. |
| Bit 31:28 Reserved: Read as zero, should be written as zero |

ATOM Signal Output Mode PWM (SOMP)

In ATOM Signal Output Mode PWM (SOMP) the ATOM sub module channel is able to generate complex PWM signals with different duty cycles and periods. Duty cycles and periods can be changed synchronously and asynchronously. Synchronous change of the duty cycle and/or period means that the duty cycle or period duration changes after the end of the preceding period or duty cycle. An asynchronous change of period and/or duty cycle means that the duration changes during the actual running PWM period.

Figure 36:
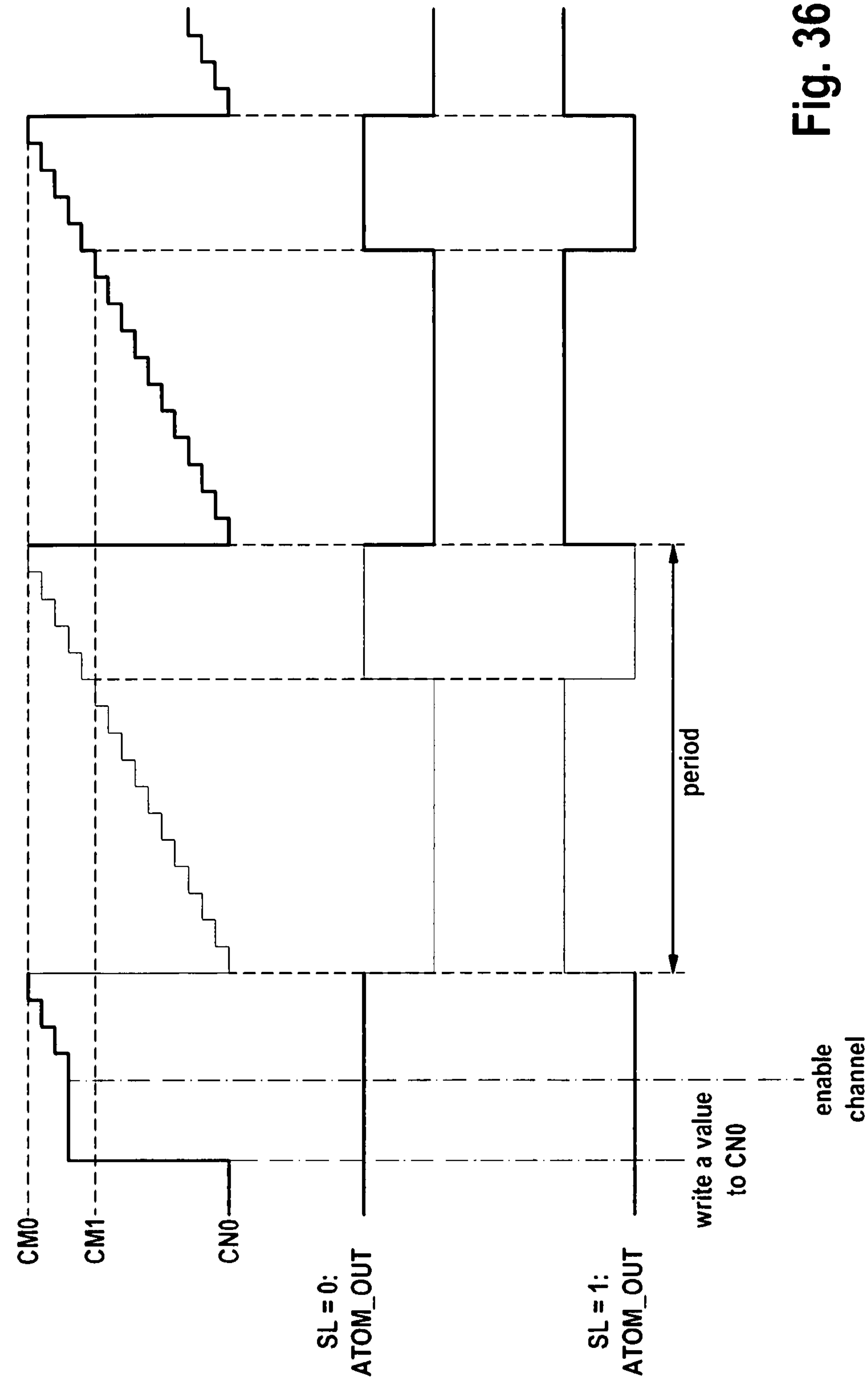

The signal level of the pulse generated inside the period can be configured inside the channel control register (SL bit of ATOM[i]_CH[x]_CTRL register). The initial signal output level for the channel is the reverse pulse level defined by the SL bit (OPD=1 defined in this mode, see FIG. 33). FIG. 36 clarifies this behaviour.

PWM Output Behaviour with Respect to the SL Bit in the ATOM[i]_CH[x]_CTRL Register See FIG. 36.

On an asynchronous update, it is guaranteed, that no spike occurs at the output port of the channel to a too late update of the operation registers. The behaviour of the output signal due to the different possibilities of an asynchronous update during a PWM period is shown in FIG. 37.

PWM Output Behaviour in Case of an Asynchronous Update of the Duty Cycle

Figure 37:
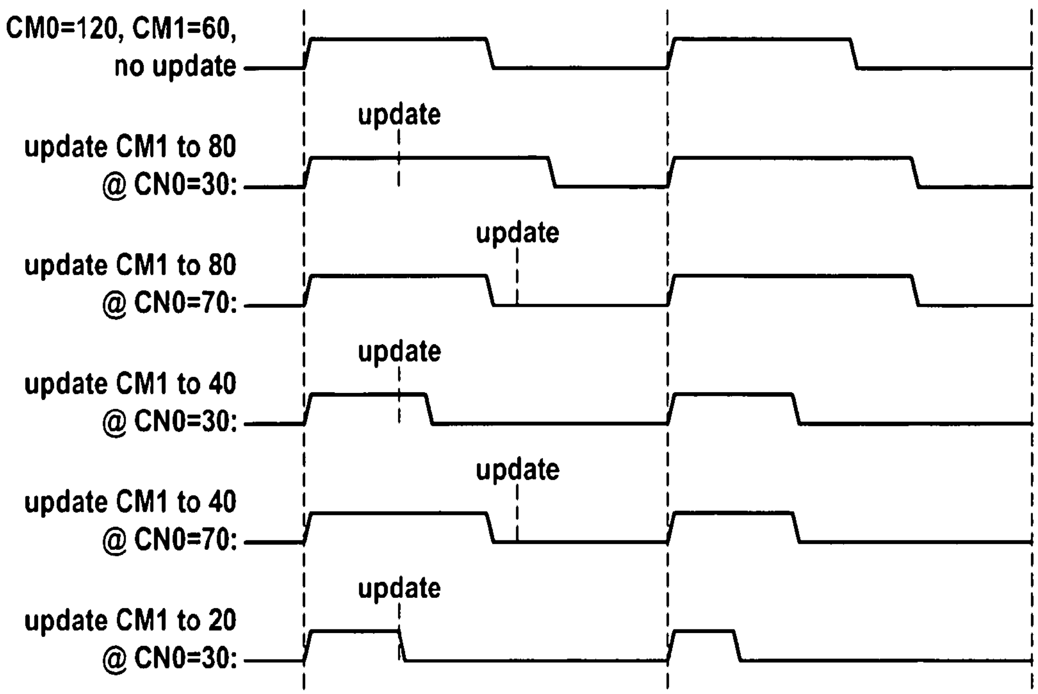

See FIG. 37.

The duration of the pulse high or low time and period is measured with the counter in subunit CCU0. The trigger of the counter is one of the eight CMU clock signals configurable in the channel control register ATOM[i]_CH[x]_CTRL. The register CM0 holds the duration of the period and the register CM1 holds the duration of the duty cycle in clock ticks of the selected CMU clock.

In case of a synchronous update mechanism, the values of the registers CM0 and CM1 are updated with the content of the shadow registers SR0 and SR1 after the counter value CN0 reaches the compare value in register CM0 or the channel receives an external update trigger via the FUPD(x) signal.

In addition, the clock source for the counter can be changed synchronously at the end of a period. This is done by using the AC2 to AC0 bits in the ATOM[i]_CH[x]_CTRL as shadow registers for the next CMU clock source. Please note, that due to this feature the PWM clock source has to be defined twice inside the ATOM[i]_CH[x]_CTRL register before the channel is enabled in SOMP mode.

For the synchronous update mechanism the generation of a complex PWM output waveform is possible without CPU interaction by reloading the shadow registers SR0, SR1 and the ACBI bit field over the ACI subunit from the ARU, while the ATOM channel operates on the CM0 and CM1 registers.

This internal update mechanism is established, when the old PWM period ends. The shadow registers are loaded into the operation registers, the counter register is reset, the new clock source according to the AC42 or ACBI(4), ACBI(3) and ACBI(2) bits is selected and the new PWM generation starts.

In parallel, the ATOM channel issues a read request to the ARU to reload the shadow registers with new values while the ATOM channel operates on the operation registers. To guarantee the reloading, the PWM period must not be smaller than the worst case ARU round trip time and source for the PWM characteristic must provide the new data within this time. Otherwise, the old PWM values are used from the shadow registers.

When updated over the ARU the user has to ensure that the new period duration is located in the lower (bits 23 to 0) and the duty cycle duration is located in the upper (bits 47 to 24) ARU data word and the new clock source is specified in the ARU control bits 52 to 50.

Figure 38:
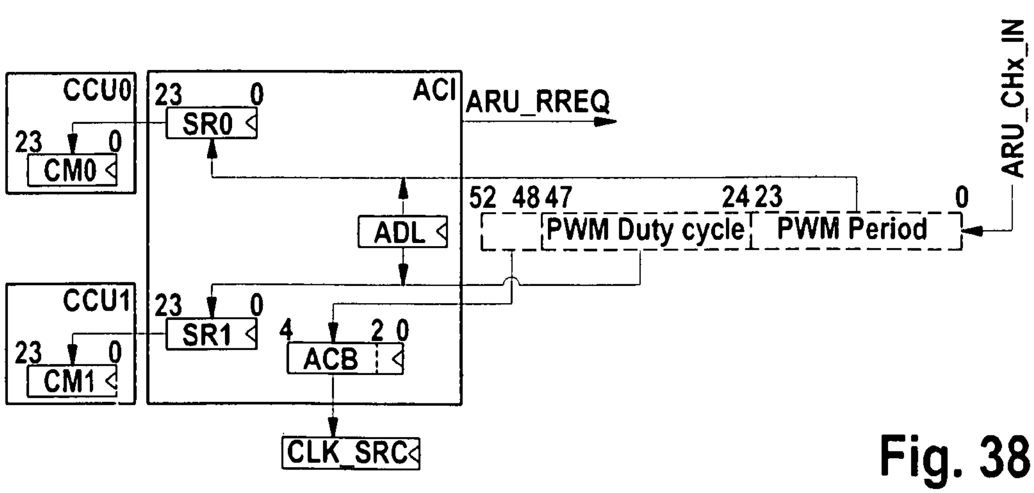

This pipelined data stream character is shown in FIG. 38.

ARU Data Input Stream Pipeline Structure for SOMP Mode

See FIG. 38.

When an ARU transfer is in progress which means the ARU_RREQ is served by the ARU, the ACI locks the update mechanism of CM0, CM1 and CLK_SRC until the read request has finished. The CCU0 and CCU1 operate on the old values when the update mechanism is locked.

The shadow registers SR0 and SR1 can also be updated over the AEI bus interface. When updated via the AEI bus the CM0 and CM1 update mechanism has to be locked via the AGC_GLB_CTRL register with the UPENx signal in the AGC subunit. To select the new clock source in this case, the CPU has to write ACB42 bit field of the ATOM[i]_CH[x]_CTRL register.

For an asynchronous update of the duty cycle and/or period the new values must be written directly into the compare registers CM0 and/or CM1 while the counter CN0 continues counting. This update can be done only via the AEI bus interface immediately by the CPU or by the FUPD(x) trigger signal triggered from the AGC global trigger logic. Values received through the ARU interface are never loaded asynchronously into the operation registers CM0 and CM1. Therefore, the ATOM channel can generate a PWM signal on the output port pin ATOM[i]_CH[x]_OUT on behalf of the content of the CM0 and CM1 registers, while it receives new PWM values via the ARU interface ACI in its shadow registers.

On a compare match of CN0 and CM0 or CM1 the output signal level of ATOM[i]_CH[x]_OUT is toggled according to the signal level output bit SL in the ATOM[i]_CH[x]_CTRL register.

Thus, the duty cycle output level can be changed during runtime by writing the new duty cycle level into the SL bit of the channel configuration register. The new signal level becomes active for the next trigger CCU_TRIGx (since bit SL is written).

Since the ATOM[i]_CH[x]_OUT signal level is defined as the reverse duty cycle output level when the ATOM channel is enabled, a PWM period can be shifted earlier by writing an initial offset value to CN0 register. By doing this, the ATOM channel first counts until CN0 reaches CM0 and then it toggles the output signal at ATOM[i]_CH[x]_OUT.

SOMP One-Shot Mode

The ATOM channel can operate in One-shot mode when the OSM bit is set in the channel control register. One-shot mode means that a single pulse with the pulse level defined in bit SL is generated on the output line (OPD=1 defined in this mode, see FIG. 33).

First the channel has to be enabled by setting the corresponding ENDIS_STAT value.

In One-shot mode the counter CN0 will not be incremented once the channel is enabled.

A write access to the register CN0 triggers the start of pulse generation (i.e. the increment of the counter register CN0).

If the counter CN0 is reset from CM0 back to zero, the first edge at ATOM[i]_CH[x]_OUT is generated.

The second edge is generated if CN0 is greater or equal than CM1 (i.e. CN0 was incremented until it has reached CM1 or CN0 is greater than CM1 after an update of CM1).

Figure 39:
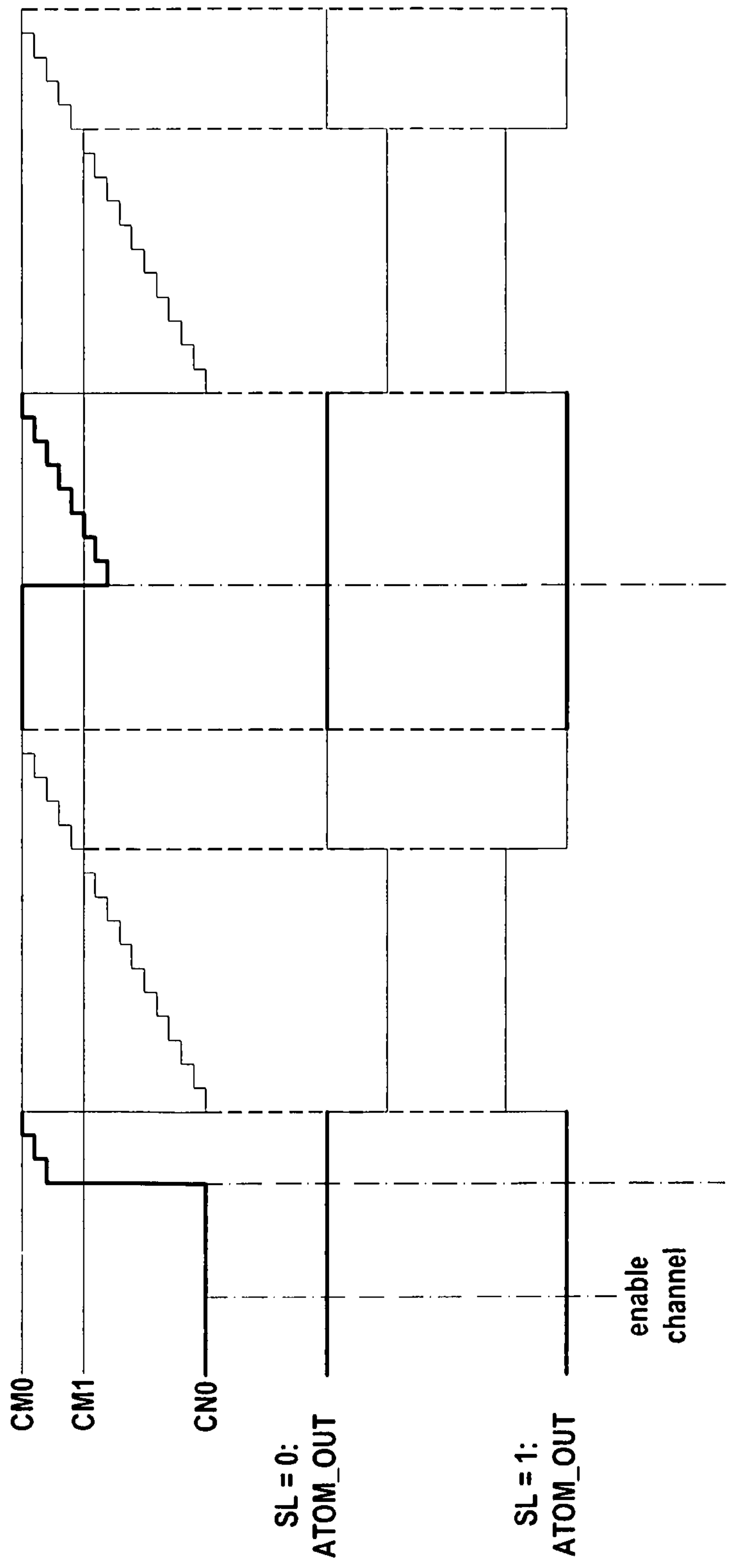

If the counter CN0 has reached the value of CM0 a second time, the counter stops. FIG. 39 clarifies the pulse generation in SOMP One-shot mode.

PWM Output with Respect to Configuration Bit SL in One-Shot Mode

See FIG. 39.

Further output of single pulses can be started by a write access to register CN0.

Register ATOM[i]_CH[x]_CTRL in SOMP mode (x: 0 . . . 7)

Address Offset: 0x0080 + x * 0x0080

| | 31 30 29 28 27 | 26 | 25 | 24 | 23 22 21 | 20 | 19 18 17 | 16 |
|---|---|---|---|---|---|---|---|---|
| Bit | Reserved | OSM | Reserved | TRIGOUT | Reserved | RST_CCU0 | Reserved | Not used |
| Mode | R | RW | R | R | R | RW | R | R |
| Initial Value | 0 | 0 | 0 | 0 | 0 | 0 | 0 | 0 |

Initial Value: 0x0000_0000

| | 15 | 14 13 12 | 11 | 10 9 | 8 7 6 | 5 4 | 3 | 2 | 1 0 |
|---|---|---|---|---|---|---|---|---|---|
| Bit | Reserved | CLK_SRC | SL | Reserved | ACB42 | ADL | ARU_EN | Not used | MODE |
| Mode | R | RW | RW | R | RW | R | RW | R | RW |
| Initial Value | 0 | 0 | 0 | 0 | 0 | 0 | 0 | 0 | 0 |

Bit 1:0 MODE: ATOM channel mode select.
10: ATOM Signal Output Mode PWM (SOMP)
Bit 2 Not used: Not used in this mode
Note: Read as zero, should be written as zero
Bit 3 ARU_EN: ARU Input stream enable
0 = ARU Input stream disabled
1 = ARU Input stream enabled
Bit 5:4 ADL: ARU data select for SOMP.
00: Load both ARU words into shadow registers
01: Load both ARU low word (Bits 23..0) into shadow register SR0
10: Load both ARU high word (Bits 47..24) into shadow register SR1
11: Reserved
Note: This bit field is only used in SOMP mode to select the ARU data source.
Bit 8:6 ACB42: Shadow clock to be used in conjunction with the PWM characteristics in the shadow registers
000: CMU_CLK0 selected
001: CMU_CLK1 selected
010: CMU_CLK2 selected
011: CMU_CLK3 selected
100: CMU_CLK4 selected
101: CMU_CLK5 selected
110: CMU_CLK6 selected
111: CMU_CLK7 selected
Note: This bit field has to be set in addition to the CLK_SRC bit field before the channel is enabled, to guarantee, that in the case of an update of the PWM characteristic from the shadow registers SR0 and SR1 the correct clock source is used.
Note: This bit field is only applicable when ARU_EN = '0'.
Bit 10:9 Reserved: Read as zero, should be written as zero
Bit 11 SL: Signal level for pulse of PWM (OPD = 1).
0 = Low signal level
1 = High signal level
Note: After reset and if channel is disabled, the register SOUR is set to the inverse reset value of bit SL (i.e. '1'). If the channel is disabled or the output is disabled, the output ATOM_OUT[x] is set to inverse value of SL.
Bit 14:12 CLK_SRC: Actual CMU_CLK source select for channel
000: CMU_CLK0 selected
001: CMU_CLK1 selected
010: CMU_CLK2 selected
011: CMU_CLK3 selected
100: CMU_CLK4 selected
101: CMU_CLK5 selected
110: CMU_CLK6 selected
111: CMU_CLK7 selected
Bit 15 Reserved: Read as zero, should be written as zero.
Bit 16 Not used: Not used in this mode
Note: Read as zero, should be written as zero
Bit 19:17 Reserved: Read as zero, should be written as zero
Bit 20 RST_CCU0: Reset source of CCU0

-continued

| Register ATOM[i]_CH[x]_CTRL in SOMP mode (x: 0 . . . 7) |
| --- |
| 0 = Reset counter register CN0 to 0 on matching comparison with CM0 |
| 1 = Reset counter register CN0 to 0 on trigger TRIG_[x − 1] |
| Bit 23:21 Reserved: Read as zero, should be written as zero |
| Bit 24 TRIGOUT: Trigger output selection (output signal TRIG_CHx) of module ATOM_CHx. |
| 0 = TRIG_[x[ is TRIG_[x − 1] |
| 1 = TRIG_[x] is TRIG_CCU0 |
| Bit 25 Reserved: Read as zero, should be written as zero |
| Bit 26 OSM: One-shot mode |
| 0 = Continuous PWM generation after channel enable |
| 1 = A single pulse is generated |
| Bit 31:27 Reserved: Read as zero, should be written as zero |

ATOM Signal Output Mode Serial (SOMS)

In ATOM Signal Output Mode Serial (SOMS) the ATOM channel acts as a serial output shift register where the content of the CM1 register in the CCU1 unit is shifted out whenever the unit is triggered by the selected CMU_CLK input clock signal. The shift direction is configurable with the ACB(0) bit inside the ATOM[i]_CH[x]_CTRL register when ARU is disabled and the ACBI(0) bit inside the ATOM[i]_CH[x]_STAT register when ARU is enabled.

The data inside the CM1 register has to be aligned according to the selected shift direction in the ACB(0)(ACBI(0) bit. This means that when a right shift is selected, that the data word has to be aligned to bit 0 of the CM1 register and when a left shift is selected, that the data has to be aligned to bit 23 of the CM1 register.

In SOMS mode CCU0 runs in counter/compare mode and counts the number of bits shifted out so far. The total number of bits that should be shifted is defined as CM0+1.

If the ARU_EN bit is set and the contents of the CM0 register equals the counter CN0, the CM0 and CM1 registers are reloaded with the SR0 and SR1 content and new values are requested from the ARU. If the update of the shadow registers does not happen before CN0 reaches CM0 the old values of SR0 and SR1 is used to reload the operation registers.

It is recommended to configure the ATOM channel in One-shot mode when the ARU_EN bit is not set, since the ATOM channel would reload new values from the shadow registers when CN0 reaches CM0.

Otherwise, the ATOM channel reloads the operation registers from the shadow registers when the UPEN bit is set for the channel. Shifting can be stopped by disabling the UPEN bit.

If the ATOM channel is configured in One-shot mode and the ARU_EN bit is not set the ATOM channel stops shifting when CN0 reaches CM0. No update of CM0 and CM1 is performed in this configuration.

In the case of the One-shot mode and ARU disabled, the shifting of the channel can be restarted again by writing a zero (0) to the CN0 register again. Please note, that the CN0 register should be written with a zero since the CN0 register counts the number of bits shifted out be the ATOM channel.

When the serial data to be shifted is provided via ARU the number of bits that should be shifted has to be defined in the lower 24 bits of the ARU word (23 to 0) and the data that is to be shifted has to be defined in the ARU bits 47 to 24 aligned according to the shift direction. This shift direction has to be defined in the ARU word bit 48 (SL0 bit).

Register ATOM[i]__ CH[x]__ CTRL in SOMS mode (x: 0 . . . 7)

Address Offset: 0x0080 + x * 0x0080

| | 31 30 29 28 27 | 26 | 25 | 24 | 23 22 21 | 20 | 19 18 17 | 16 |
| --- | --- | --- | --- | --- | --- | --- | --- | --- |
| Bit | Reserved | OSM | Reserved | Not used | Reserved | Not used | Reserved | Not used |
| Mode | R | RW | R | R | R | R | R | R |
| Initial Value | 0 | 0 | 0 | 0 | 0 | 0 | 0 | 0 |

Initial Value: 0x0000__0000

| | 15 | 14 13 12 | 11 | 10 9 | 8 7 6 5 | 4 | 3 | 2 | 1 0 |
| --- | --- | --- | --- | --- | --- | --- | --- | --- | --- |
| Bit | Reserved | CLK__SRC | SL | Reserved | Not used | ACB0 | ARU__EN | Not used | MODE |
| Mode | R | RW | RW | R | R | RW | RW | R | RW |
| Initial Value | 0 | 0 | 0 | 0 | 0 | 0 | 0 | 0 | 0 |

Bit 1:0
MODE: ATOM channel mode select.
11: ATOM Signal Output Mode Serial (SOMS)
Bit 2
Not used: Not used in this mode
Note:
Read as zero, should be written as zero
Bit 3
ARU__EN: ARU Input stream enable
0 = ARU Input stream disabled
1 = ARU Input stream enabled
Bit 4

-continued

| Register ATOM[i]_ CH[x]_ CTRL in SOMS mode (x: 0 . . . 7) |
|---|
| ACB0: Shift direction for CM1 register<br>0 = Right shift of data is started from bit 0 of CM1<br>1 = Left shift of data is started from bit 23 of CM1<br>Note:<br>the data that has to be shifted out has to be aligned inside the CM1 register according to the defined shift direction.<br>Note:<br>this bit is only applicable if ARU_EN = '0'.<br>Bit 8:5<br>Not used: Not used in this mode<br>Note:<br>Read as zero, should be written as zero<br>Bit 10:9<br>Reserved: Read as zero, should be written as zero<br>Bit 11<br>SL: Initial signal level after channel enable<br>0 = Low signal level<br>1 = High signal level<br>Note:<br>After reset and if channel is disabled, the register SOUR is set to the inverse reset value of bit SL (i.e. '1').<br>If the channel is disabled or the output is disabled, the output ATOM_OUT[x] is set to inverse value of SL.<br>Bit 14:12<br>CLK_SRC: Shift frequency select for channel<br>000: CMU_CLK0 selected<br>001: CMU_CLK1 selected<br>010: CMU_CLK2 selected<br>011: CMU_CLK3 selected<br>100: CMU_CLK4 selected<br>101: CMU_CLK5 selected<br>110: CMU_CLK6 selected<br>111: CMU_CLK7 selected<br>Bit 15<br>Reserved: Read as zero, should be written as zero.<br>Bit 16<br>Not used: Not used in this mode<br>Note:<br>Read as zero, should be written as zero<br>Bit 19:17<br>Reserved: Read as zero, should be written as zero<br>Bit 20<br>Not used: Not used in this mode<br>Note:<br>Read as zero, should be written as zero<br>Bit 23:21<br>Reserved: Read as zero, should be written as zero<br>Bit 24<br>Not used: Not used in this mode<br>Note:<br>Read as zero, should be written as zero<br>Bit 25<br>Reserved: Read as zero, should be written as zero<br>Bit 26<br>OSM: One-shot mode<br>0 = Continuous shifting is enabled<br>1 = Channel stops, after number of bits defined in CM0 is shifted out<br>Bit 31:27<br>Reserved: Read as zero, should be written as zero |

ATOM Interrupt Signals

The following table describes ATOM interrupt signals:

| Signal | Description |
|---|---|
| CCU0TCx_IRQ | CCU0 Trigger condition interrupt for channel x |
| CCU1TCx_IRQ | CCU1 Trigger condition interrupt for channel x |
| ACAPx_IRQ | ATOM Capture event occurred in SOMS mode |

ATOM Register Overview

The following table shows a conclusion of ATOM register address offset and initial values.

| Register name | Description | Details in Section |
|---|---|---|
| ATOM[i]_AGC_GLB_CTRL | AGC Global control register | 0 |
| ATOM[i]_AGC_ENDIS_CTRL | AGC0 Enable/disable control register | 0 |
| ATOM[i]_AGC_ENDIS_STAT | AGC Enable/disable status register (represents status of ATOM channels) | 0 |
| ATOM[i]_AGC_ACT_TB | AGC Action time base register | 0 |
| ATOM[i]_AGC_OUTEN_CTRL | AGC Output enable control register | 0 |
| ATOM[i]_AGC_OUTEN_STAT | AGC Output enable status register | 0 |
| ATOM[i]_AGC_FUPD_CTRL | AGC Force update control register | 0 |
| ATOM[i]_AGC_INT_TRIG | AGC Internal trigger control register | 0 |
| ATOM[i]_CH[x]_CTRL | ATOM Channel x control register (x = 0 . . . 7) | 0 |
| ATOM[i]_CH[x]_STAT | ATOM Channel x status register (x = 0 . . . 7) | 0 |
| ATOM[i]_CH[x]_RDADDR | ATOM Channel x ARU read address register (x = 0 . . . 7) | 0 |
| ATOM[i]_CH[x]_CN0 | ATOM Channel x CCU0 counter register (x = 0 . . . 7) | 0 |
| ATOM[i]_CH[x]_CM0 | ATOM Channel x CCU0 compare register (x = 0 . . . 7) | 0 |
| ATOM[i]_CH[x]_SR0 | ATOM Channel x CCU0 compare shadow register (x = 0 . . . 7) | 0 |
| ATOM[i]_CH[x]_CM1 | ATOM Channel x CCU1 compare register (x = 0 . . . 7) | 0 |
| ATOM[i]_CH[x]_SR1 | ATOM Channel x CCU1 compare shadow register (x = 0 . . . 7) | 0 |
| ATOM[i]_CH[x]_IRQ_NOTIFY | ATOM channel x interrupt notification register (x = 0 . . . 7) | 0 |
| ATOM[i]_CH[x]_IRQ_EN | ATOM channel x interrupt enable register (x = 0 . . . 7) | 0 |
| ATOM[i]_CH[x]_IRQ_FORCINT | ATOM channel x software interrupt generation (x = 0 . . . 7) | 0 |
| ATOM[i]_CH[x]_IRQ_MODE | IRQ mode configuration register (x = 0 . . . 7) | 0 |

ATOM Register Description

Register ATOM[i]__AGC__GLB__CTRL

Address Offset: 0x0000

| | 31 | 30 | 29 | 28 | 27 | 26 | 25 | 24 | 23 | 22 |
|---|---|---|---|---|---|---|---|---|---|---|
| Bit | UPEN__CTRL7 | | UPEN__CTRL6 | | UPEN__CTRL5 | | UPEN__CTRL4 | | UPEN__CTRL3 | |
| Mode | RW | | RW | | RW | | RW | | RW | |
| Initial Value | 00 | | 00 | | 00 | | 00 | | 00 | |

Address Offset: 0x0000 — Initial Value: 0x0000__0000

| | 21 | 20 | 19 | 18 | 17 | 16 | 15 | 14 |
|---|---|---|---|---|---|---|---|---|
| Bit | UPEN__CTRL2 | | UPEN__CTRL1 | | UPEN__CTRL0 | | RST__CH7 | RST__CH6 |
| Mode | RW | | RW | | RW | | Aw | Aw |
| Initial Value | 00 | | 00 | | 00 | | 0 | 0 |

Initial Value: 0x0000__0000

| | 13 | 12 | 11 | 10 | 9 |
|---|---|---|---|---|---|
| Bit | RST__CH5 | RST__CH4 | RST__CH3 | RST__CH2 | RST__CH1 |
| Mode | Aw | Aw | Aw | Aw | Aw |
| Initial Value | 0 | 0 | 0 | 0 | 0 |

-continued

| Register ATOM[i]_AGC_GLB_CTRL | | | | | | | | | | |
|---|---|---|---|---|---|---|---|---|---|---|
| | Initial Value: 0x0000_0000 | | | | | | | | | |
| | 8 | 7 | 6 | 5 | 4 | 3 | 2 | 1 | 0 | |
| Bit | RST_CH0 | Reserved | | | | | | | HOST_TRIG | |
| Mode | Aw | R | | | | | | | Aw | |
| Initial Value | 0 | 0 | | | | | | | 0 | |

Bit 0
HOST_TRIG: trigger request signal (see AGCx) to update the register ENDIS_STAT and OUTEN_STAT
0 = no trigger request
1 = set trigger request
Note:
this flag is reset automatically after triggering the update
Bit 7:1
Reserved
Note:
Read as zero, should be written as zero
Bit 8
RST_CH0: Software reset of channel 0
0 = No action
1 = Reset channel
Note:
This bit is cleared automatically after write by CPU. The channel registers are set to their reset values and channel operation is stopped immediately.
Bit 9
RST_CH1: Software reset of channel 1
See bit 8
Bit 10
RST_CH2: Software reset of channel 2
See bit 8
Bit 11
RST_CH3: Software reset of channel 3
See bit 8
Bit 12
RST_CH4: Software reset of channel 4
See bit 8
Bit 13
RST_CH5: Software reset of channel 5
See bit 8
Bit 14
RST_CH6: Software reset of channel 6
See bit 8
Bit 15
RST_CH7: Software reset of channel 7
See bit 8
Bit 17:16
UPEN_CTRL0: ATOM channel0 enable update of register CM0, CM1 and CLK_SRC_STAT from SR0, SR1 and CLK_SRC.
Note:
If update is disabled, also a forced update is not possible.
Write of following double bit values is possible:
00 = don't care, bits 1:0 will not be change
01 = update disabled: is read as 00 (see below)
10 = update enabled: is read as 11 (see below)
11 = don't care, bits 1:0 will not be changed
Read of following double values means:
00 = channel disabled
11 = channel enabled
Bit 19:18
UPEN_CTRL1: ATOM channel 1 enable update of register CM0, CM1 and CLK_SRC_STAT
See bits 17:16
Bit 21:20
UPEN_CTRL2: ATOM channel 2 enable update of register CM0, CM1 and CLK_SRC_STAT
See bits 17:16
Bit 23:22
UPEN_CTRL3: ATOM channel 3 enable update of register CM0, CM1 and CLK_SRC_STAT
See bits 17:16
Bit 25:24
UPEN_CTRL4: ATOM channel 4 enable update of register CM0, CM1 and CLK_SRC_STAT
See bits 17:16
Bit 27:26
UPEN_CTRL5: ATOM channel 5 enable update of register CM0, CM1 and CLK_SRC_STAT
See bits 17:16
Bit 29:28
UPEN_CTRL6: ATOM channel 6 enable update of register CM0, CM1 and CLK_SRC_STAT
See bits 17:16

-continued

| Register ATOM[i]_AGC_GLB_CTRL |
|---|
| Bit 31:30<br>UPEN_CTRL7: ATOM channel 7 enable update of register CM0, CM1 and CLK_SRC_STAT<br>See bits 17:16 |

Register ATOM[i]_CH[x]_CTRL (x: 0 . . . 7)

Address Offset: 0x0080 + x * 0x0080 — Initial Value: 0x0000_0000

| | 31 30 29 28 | 27 | 26 | 25 | 24 | 23 22 21 | 20 | 19 18 17 | 16 | 15 |
|---|---|---|---|---|---|---|---|---|---|---|
| Bit | Reserved | ABM | OSM | Reserved | TRIGOUT | Reserved | RST_CCU0 | Reserved | WR_REQ | Reserved |
| Mode | R | RW | R | R | R | R | RW | R | RW | R |
| Initial Value | 0 | 0 | 0 | 0 | 0 | 0 | 0 | 0 | 0 | 0 |

Initial Value: 0x0000_0000

| | 14 13 12 | 11 | 10 | 9 | 8 7 6 5 4 | 3 | 2 | 1 0 |
|---|---|---|---|---|---|---|---|---|
| Bit | CLK_SRC | SL | Reserved | CMP_CTRL | ACB | ARU_EN | TB12_SEL | MODE |
| Mode | R | RW | R | RW | RW | RW | RW | RW |
| Initial Value | 0 | 0 | 0 | 0 | 0 | 0 | 0 | 00 |

Bit 1:0
MODE: ATOM channel mode select.
00: ATOM Signal Output Mode Immediate (SOMI)
01: ATOM Signal Output Mode Compare (SOMC)
10: ATOM Signal Output Mode PWM (SOMP)
11: ATOM Signal Output Mode Serial (SOMS)
Bit 2
TB12_SEL: Select time base value TBU_TS1 or TBU_TS2.
0 = TBU_TS1 selected for comparison
1 = TBU_TS2 selected for comparison
Note:
this bit is only applicable in SOMC mode.
Bit 3
ARU_EN: ARU Input stream enable.
0 = ARU Input stream disabled
1 = ARU Input stream enabled
Bit 8:4
ACB: ATOM Mode control bits.
Note:
These bits have different meaning in the different ATOM channel modes. Please refer to the mode description sections.
Note:
These bits are only applicable when ARU_EN = ‘0’.
Bit 9
CMP_CTRL: CCUx compare strategy select.
0 = Greater/equal compare against TBU time base values
1 = Less/equal compare against TBU time base values
Note:
this bit is only applicable in SOMC mode.
Bit 10
Reserved: Read as zero, should be written as zero.
Bit 11
SL: Initial signal level.
0 = Low signal level
1 = High signal level
Note:
After reset and if channel is disabled, the register SOUR is set to the inverse reset value of bit SL (i.e. ‘1’).
If the channel is disabled or the output is disabled, the output ATOM_OUT[x] is set to inverse value of SL.
Bit 14:12
CLK_SRC: Actual CMU_CLK source select for channel.
000: CMU_CLK0 selected
001: CMU_CLK1 selected
010: CMU_CLK2 selected
011: CMU_CLK3 selected
100: CMU_CLK4 selected
101: CMU_CLK5 selected
110: CMU_CLK6 selected
111: CMU_CLK7 selected -continued

| Register ATOM[i]_CH[x]_CTRL (x: 0 . . . 7) |
|---|
| Note:<br>these bits are only applicable in SOMP mode.<br>Bit 15<br>Reserved: Read as zero, should be written as zero.<br>Bit 16<br>WR_REQ: CPU Write request bit for late compare register update.<br>Note:<br>This bit is only applicable in SOMC mode.<br>Bit 19:17<br>Reserved: Read as zero, should be written as zero.<br>Bit 20<br>RST_CCU0: Reset source of CCU0<br>0 = Reset counter register CN0 to 0 on matching comparison with CM0<br>1 = Reset counter register CN0 to 0 on trigger TRIG_[x − 1]<br>Note:<br>this bit is only applicable in SOMP mode.<br>Bit 23:21<br>Reserved: Read as zero, should be written as zero<br>Bit 24<br>TRIGOUT: Trigger output selection (output signal TRIG_CHx) of module ATOM_CHx.<br>0 = TRIG_[x[ is TRIG_[x − 1]<br>1 = TRIG_[x] is TRIG_CCU0<br>Note:<br>this bit is only applicable in SOMC mode.<br>Bit 25<br>Reserved: Read as zero, should be written as zero<br>Note:<br>Read as zero, should be written as zero<br>Bit 26<br>OSM: One-shot mode<br>0 = Continuous PWM generation after channel enable<br>1 = A single pulse is generated<br>Note:<br>this bit is only applicable in SOMP and SOMS modes.<br>Bit 27<br>ABM: ARU blocking mode<br>0 = ARU blocking mode disabled: ATOM reads continuously from ARU and updates CM0, CM1 independent of pending compare match event<br>1 = ARU blocking mode enabled: after updating CM0, CM1 via ARU, no new data is read from ARU until compare match event is occurred.<br>Note:<br>this bit is only applicable in SOMC mode.<br>Bit 31:28<br>Reserved: Read as zero, should be written as zero |

Register ATOM[i]_CH[x]_STAT (x: 0 . . . 7)

Address Offset: 0x0084 + x * 0x0080

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | | Reserved | | | | ACBO | | | Reserved | WRF | DV | | | ACBI | | |
| Mode | | R | | | | R | | | R | RW | R | | | R | | |
| Initial Value | | 0 | | | | 0 | | | 0 | 0 | 0 | | | 0 | | |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | | | | | | | Reserved | | | | | | | | | OL |
| Mode | | | | | | | R | | | | | | | | | R |
| Initial Value | | | | | | | 0 | | | | | | | | | 1 |

Bit 0
OL: Actual output signal level of ATOM_CHx_OUT.
0 = Actual output signal level is low
1 = Actual output signal level is high
Bit 15:1
Reserved: Read as zero, should be written as zero
Bit 20:16
ACBI: ATOM Mode control bits received through ARU.

-continued

| Register ATOM[i]_CH[x]_STAT (x: 0 . . . 7) |
|---|
| Note: |
| This register serves as a mirror for the five ARU control bits received through the ARU interface. The bits are valid, when the DV bit is set. |
| Bit 21 |
| DV: Valid ARU Data stored in compare registers. |
| 0 = No valid data was received by ARU |
| 1 = Valid data received by ARU and stored in CM0 and/or CM1 |
| Note: |
| This bit is only applicable in SOMC mode. The CPU can determine the status of the ARU transfers with this bit. After the compare event occurred, the bit is reset by hardware. |
| Bit 22 |
| WRF: Write request of CPU failed for late update. |
| 0 = Late update was successful, CCUx units wait for comparison. |
| 1 = Late update failed. |
| The bit WRF can be reset by writing a 0 to it. |
| Note: |
| This bit is only applicable in SOMC mode. |
| Bit 23 |
| Reserved: Read as zero, should be written as zero. |
| Bit 28:24 |
| ACBO: ATOM Internal status bits. |
| ACBO[3] = 1: CCU0 Compare match occurred |
| ACBO[4] = 1: CCU1 Compare match occurred |
| ACBO is reset to 0b00000 on an update of register CM0 or CM1 (via ARU or CPU) |
| Note: |
| This register determines the internal status of the ATOM channel. |
| These bits are sending via the ARU control bits in SOMC mode. |
| Bit 31:29 |
| Reserved: Read as zero, should be written as zero |

Register ATOM[i]_CH[x]_RDADDR (x: 0 . . . 7)

| | Address Offset: 0x0088 + x * 0x0080 | | | | | | | | | | | | | | | | Initial Value: 0x01FE_01FE |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | RDADDR1 | | | | | | | | Reserved |
| Mode | R | | | | | | | | RW | | | | | | | | R |
| Initial Value | 0x00 | | | | | | | | 0x1FE | | | | | | | | 0x00 |

| | Initial Value: 0x01FE_01FE | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | Reserved | | | | | | RDADDR0 | | | | | | | | |
| Mode | R | | | | | | RW | | | | | | | | |
| Initial Value | 0x00 | | | | | | 0x1FE | | | | | | | | |

Bit 8:0

RDADDR0: ARU Read address 0.

Note:

This read address is used by the ATOM channel to receive data from ARU immediately after the channel and ARU access is enabled (see ATOM[i]_CH[x]_CTRL register for details).

Bit 15:9

Reserved: Read as zero, should be written as zero.

Bit 24:16

RDADDR1: ARU Read address 1.

Note:

The ATOM channel switches to this read address, when requested in the ARU control bits 52 to 48 with the pattern "00000". The channel switches back to the RDADDR0 after one ARU data package was received on RDADDR1.

Bit 31:25

Reserved: Read as zero, should be written as zero.

| Register ATOM[i]_CH[x]_CN0 (x: 0 . . . 7) | | |
|---|---|---|
| | Address Offset: 0x008C + x * 0x0080 | Initial Value: 0x0000_0000 |
| | 31 30 29 28 27 26 25 24 | 23 22 21 20 19 18 17 16 15 |
| Bit | Reserved | CN0 |
| Mode | R | RW |
| Initial Value | 0x00 | 0x000000 |

| | Initial Value: 0x0000_0000 |
|---|---|
| | 14 13 12 11 10 9 8 7 6 5 4 3 2 1 0 |
| Bit | CN0 |
| Mode | RW |
| Initial Value | 0x000000 |

Bit 23:0
CN0: ATOM CCU0 counter register.
Bit 31:24
Reserved: Read as zero, should be written as zero.

| Register ATOM[i]_CH[x]_CM0 (x: 0 . . . 7) | | |
|---|---|---|
| | Address Offset: 0x0090 + x * 0x0080 | Initial Value: 0x0000_0000 |
| | 31 30 29 28 27 26 25 24 | 23 22 21 20 19 18 17 16 15 |
| Bit | Reserved | CM0 |
| Mode | R | RW |
| Initial Value | 0x00 | 0x000000 |

| | Initial Value: 0x0000_0000 |
|---|---|
| | 14 13 12 11 10 9 8 7 6 5 4 3 2 1 0 |
| Bit | CM0 |
| Mode | RW |
| Initial Value | 0x000000 |

Bit 23:0
CM0: ATOM CCU0 compare register.
Bit 31:24
Reserved: Read as zero, should be written as zero.

| Register ATOM[i]_CH[x]_SR0 (x: 0 . . . 7) | | |
|---|---|---|
| | Address Offset: 0x0094 + x * 0x0080 | Initial Value: 0x0000_0000 |
| | 31 30 29 28 27 26 25 24 | 23 22 21 20 19 18 17 16 15 |
| Bit | Reserved | SR0 |
| Mode | R | RW |
| Initial Value | 0x00 | 0x000000 |

-continued

| Register ATOM[i]_CH[x]_SR0 (x: 0 . . . 7) | | | | | | | | | | | | | | | |
|---|---|---|---|---|---|---|---|---|---|---|---|---|---|---|---|
| | Initial Value: 0x0000_0000 | | | | | | | | | | | | | | |
| | 14 | 13 | 12 | 11 | 10 | 9 | 8 | 7 | 6 | 5 | 4 | 3 | 2 | 1 | 0 |
| Bit | SR0 | | | | | | | | | | | | | | |
| Mode | RW | | | | | | | | | | | | | | |
| Initial Value | 0x000000 | | | | | | | | | | | | | | |

Bit 23:0

SR0: ATOM channel x shadow register SR0.

Note:

The SR0 register is used as shadow register for CM0 in SOMP and SOMS modes and is used as capture register for time base TBU_TS0 in SOMC mode.

Bit 31:24

Reserved: Read as zero, should be written as zero.

| Register ATOM[i]_CH[x]_CM1 (x: 0 . . . 7) | | | | | | | | | | | | | | | | | |
|---|---|---|---|---|---|---|---|---|---|---|---|---|---|---|---|---|---|
| | Address Offset: 0x0098 + x * 0x0080 | | | | | | | | | | | | | | | | Initial Value: 0x0000_0000 |
| | 31 | 30 | 29 | 28 | 27 | 26 | 25 | 24 | 23 | 22 | 21 | 20 | 19 | 18 | 17 | 16 | 15 |
| Bit | Reserved | | | | | | | | CM1 | | | | | | | | |
| Mode | R | | | | | | | | RW | | | | | | | | |
| Initial Value | 0x00 | | | | | | | | 0x000000 | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | CM1 | | | | | | | | | | | | | | |
| Mode | RW | | | | | | | | | | | | | | |
| Initial Value | 0x000000 | | | | | | | | | | | | | | |

Bit 23:0

CM1: ATOM CCU1 compare register.

Bit 31:24

Reserved: Read as zero, should be written as zero.

| Register ATOM[i]_CH[x]_SR1 (x: 0 . . . 7) | | | | | | | | | | | | | | | | | |
|---|---|---|---|---|---|---|---|---|---|---|---|---|---|---|---|---|---|
| | Address Offset: 0x009C + x * 0x0080 | | | | | | | | | | | | | | | | Initial Value: 0x0000_0000 |
| | 31 | 30 | 29 | 28 | 27 | 26 | 25 | 24 | 23 | 22 | 21 | 20 | 19 | 18 | 17 | 16 | 15 |
| Bit | Reserved | | | | | | | | SR1 | | | | | | | | |
| Mode | R | | | | | | | | RW | | | | | | | | |
| Initial Value | 0x00 | | | | | | | | 0x000000 | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | SR1 | | | | | | | | | | | | | | |
| Mode | RW | | | | | | | | | | | | | | |

-continued

| Register ATOM[i]_CH[x]_SR1 (x: 0 . . . 7) | |
|---|---|
| Initial Value | 0x000000 |

Bit 23:0
SR1: ATOM channel x shadow register SR0.
Note:
The SR1 register is used as shadow register for CM1 in SOMP and SOMS modes and is used as capture register for time base TBU_TS1 or TBU_TS2 (when selected in ATOM[i]_CH[x]_CTRL register) in SOMC mode.
Bit 31:24
Reserved: Read as zero, should be written as zero.

Register ATOM[i]_CH[x]_IRQ_NOTIFY (x: 0 . . . 7)

| | Address Offset: 0x00A0 + x * 0x0080 | Initial Value: 0x0000_0000 |
|---|---|---|
| | 31 30 29 28 27 26 25 24 23 22 21 20 19 18 17 16 15 14 | |
| Bit | Reserved | |
| Mode | R | |
| Initial Value | 0x0000000 | |

| | Initial Value: 0x0000_0000 | | | |
|---|---|---|---|---|
| | 13 12 11 10 9 8 7 6 5 4 3 | 2 | 1 | 0 |
| Bit | Reserved | ACAP | CCU1TC | CCU0TC |
| Mode | R | RCw | RCw | RCw |
| Initial Value | 0x0000000 | 0 | 0 | 0 |

Bit 0
CCU0TC: CCU0 Trigger condition interrupt for channel x.
0 = No interrupt occurred.
1 = CCU0 Trigger condition interrupt was raised by ATOM channel x.
Note:
This bit will be cleared on a CPU write access of value ‘1’. A read access leaves the bit unchanged.
Bit 1
CCU1TC: CCU1 Trigger condition interrupt for channel x.
See bit 0.
Bit 2
ACAP: ATOM Capture event occurred in SOMC mode for channel x.
0 = No interrupt occurred.
1 = The configured capture event occurred for channel x.
Note:
This interrupt is only raised when the ATOM channel is configured in SOMC mode.
Note:
This bit will be cleared on a CPU write access of value ‘1’. A read access leaves the bit unchanged.
Bit 31:3
Reserved: Read as zero, should be written as zero.

Register ATOM[i]_CH[x]_IRQ_EN (x: 0 . . . 7)

| | Address Offset: 0x00A4 + x * 0x0080 | Initial Value: 0x0000_0000 |
|---|---|---|
| | 31 30 29 28 27 26 25 24 23 22 21 20 19 18 17 16 15 14 13 12 11 10 | |
| Bit | Reserved | |
| Mode | R | |
| Initial Value | 0x0000000 | |

-continued

| Register ATOM[i]_CH[x]_IRQ_EN (x: 0 . . . 7) | | | | | | | | | | |
|---|---|---|---|---|---|---|---|---|---|---|
| | Initial Value: 0x0000_0000 | | | | | | | | | |
| | 9 | 8 | 7 | 6 | 5 | 4 | 3 | 2 | 1 | 0 |
| Bit | Reserved | | | | | | | ACAP_IRQ_EN | CCU1TC_IRQ_EN | CCU0TC_IRQ_EN |
| Mode | R | | | | | | | RW | RW | RW |
| Initial Value | 0x0000000 | | | | | | | 0 | 0 | 0 |

Bit 0
CCU0TC_IRQ_EN: ATOM_CCU0TC_IRQ interrupt enable.
0 = Disable interrupt, interrupt is not visible outside GTM-IP.
1 = Enable interrupt, interrupt is visible outside GTM-IP.
Bit 1
CCU1TC_IRQ_EN: ATOM_CCU1TC_IRQ interrupt enable.
See bit 0.
Bit 2
ACAP_IRQ_EN: ATOM_ACAP_IRQ interrupt enable.
See bit 0.
Bit 31:3
Reserved: Read as zero, should be written as zero.

| Register ATOM[i]_CH[x]_IRQ_FORCINT (x: 0 . . . 7) | | | | | | | | | | | | | | | | | | | | | |
|---|---|---|---|---|---|---|---|---|---|---|---|---|---|---|---|---|---|---|---|---|---|
| | Address Offset: 0x00A8 + x * 0x0080 | | | | | | | | | | | | | | | | Initial Value: 0x0000_0000 | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 |
| Bit | Reserved | | | | | | | | | | | | | | | | | | | | |
| Mode | R | | | | | | | | | | | | | | | | | | | | |
| Initial Value | 0x0000000 | | | | | | | | | | | | | | | | | | | | |

| | Initial Value: 0x0000_0000 | | | | | | | | | | |
|---|---|---|---|---|---|---|---|---|---|---|---|
| | 10 | 9 | 8 | 7 | 6 | 5 | 4 | 3 | 2 | 1 | 0 |
| Bit | Reserved | | | | | | | | TRG_ACAP | TRG_CCU1TC | TRG_CCU0TC |
| Mode | R | | | | | | | | RAw | RAw | RAw |
| Initial Value | 0x0000000 | | | | | | | | 0 | 0 | 0 |

Bit 0
TRG_CCU0TC: Trigger ATOM_CCU0TC_IRQ interrupt by software.
0 = No interrupt triggering.
1 = Assert CCU0TC_IRQ interrupt for one clock cycle.
Note:
This bit is cleared automatically after write.
Bit 1
TRG_CCU0TC: Trigger ATOM_CCU0TC_IRQ interrupt by software
0 = No interrupt triggering.
1 = Assert CCU0TC_IRQ interrupt for one clock cycle.
Note:
This bit is cleared automatically after interrupt is released.
Bit 2
TRG_ACAP: Trigger ATOM_ACAP_IRQ interrupt by software
0 = No interrupt triggering.
1 = Assert ACAP_IRQ interrupt for one clock cycle.
Note:
This bit is cleared automatically after interrupt is released.
Bit 31:3
Reserved: Read as zero, should be written as zero.

| Register ATOM[i]_CH[x]_IRQ_MODE (x: 0 . . . 7) | | | | | | | | | | | | | | | | | | | | |
|---|---|---|---|---|---|---|---|---|---|---|---|---|---|---|---|---|---|---|---|---|
| | Address Offset: 0x00AC + x * 0x0080 | | | | | | | | | | | | | | | | Initial Value: 0x0000_0000 | | | |
| | 31 | 30 | 29 | 28 | 27 | 26 | 25 | 24 | 23 | 22 | 21 | 20 | 19 | 18 | 17 | 16 | 15 | 14 | 13 | 12 |
| Bit | Reserved | | | | | | | | | | | | | | | | | | | |
| Mode | R | | | | | | | | | | | | | | | | | | | |
| Initial Value | 0x00000000 | | | | | | | | | | | | | | | | | | | |

| Initial Value: 0x0000_0000 | | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| Bit | Reserved | | | | | | | | | | IRQ_MODE | |
| Mode | R | | | | | | | | | | RW | |
| Initial Value | 0x00000000 | | | | | | | | | | 00 | |

Bit 1:0
IRQ_MODE: IRQ mode selection
00 = Level mode
01 = Pulse mode
10 = Pulse-Notify mode
11 = Single-Pulse mode
Note:
The interrupt modes are described in section 0.
Bit 31:2
Reserved
Note:
Read as zero, should be written as zero

Multi Channel Sequencer (MCS)

Overview

The Multi Channel Sequencer (MCS) sub module is a generic data processing module that is connected to the ARU.

One of its major applications is to calculate complex output sequences that may depend on the time base values of the TBU and are processed in combination with the ATOM sub module.

Other applications can use the MCS sub module to perform extended data processing of input data resulting from the TIM sub module that are provided to the CPU (e.g. using the PSM sub module).

Moreover, some applications may process data provided by the CPU within the MCS sub module, and the calculated results are sent to the outputs using the ATOM sub modules.

Architecture

Figures 40, 41:
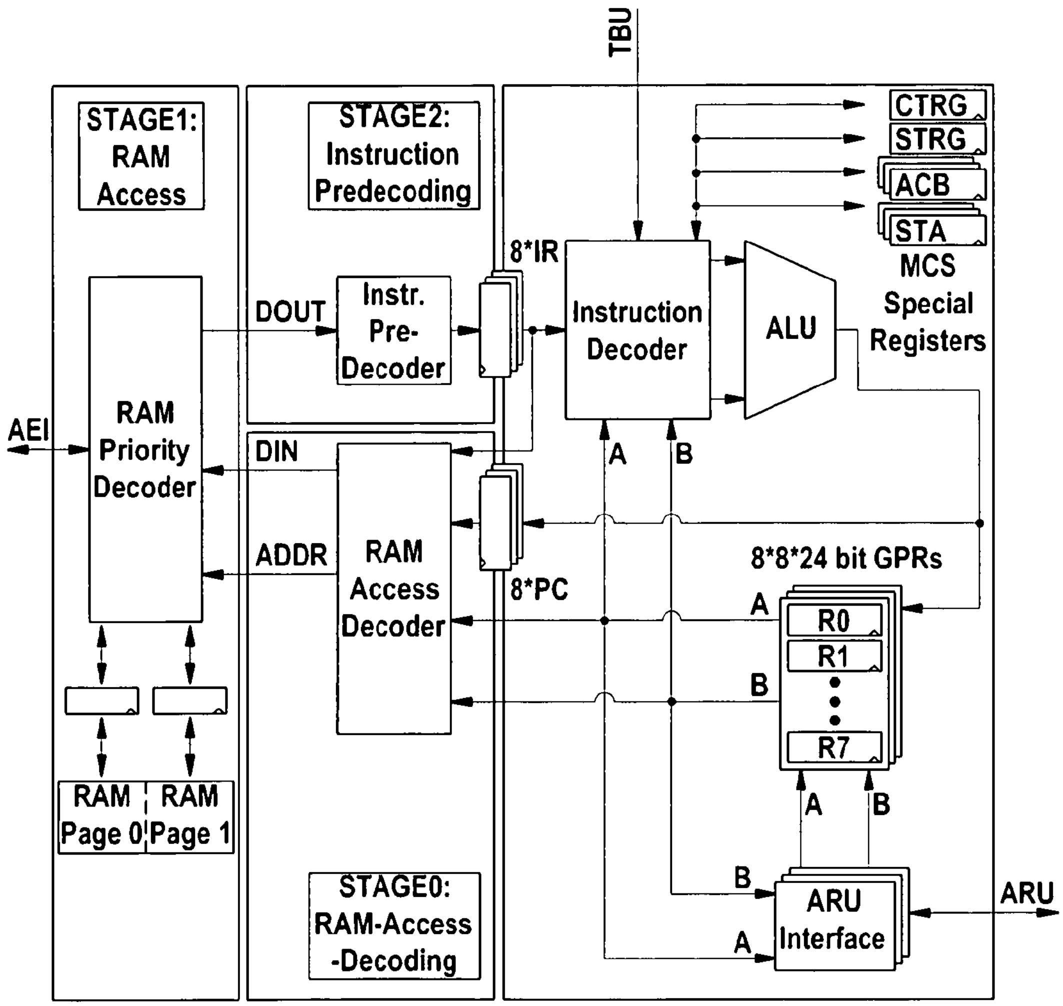

FIG. 40 gives an overview of the MCS architecture.

MCS Architecture

See FIG. 40.

The MCS sub module mainly embeds a single data path with four pipeline stages, consisting of a simple Arithmetic Logic Unit (ALU), several decoders, and a connection to two RAM pages located outside of the MCS sub module.

The data path of the MCS is shared by eight so called MCS-channels, whereas each MCS-channel executes a dedicated micro-program that is stored inside the RAM pages connected to the MCS sub module.

Both RAM pages may contain arbitrary sized code and data sections that are accessible by all MCS-channels and the CPU via AEI.

The MCS sub module supports a memory layout of up to $2^{14}$ memory locations each 32 bit wide leading to a maximum address range from 0 to $2^{16}-4$.

This address space of the MCS is divided into two seamless memory pages. Memory page 0 begins from address 0 ranges to address MP0-4 and memory page 1 ranges from MP0 to MP1-4.

The parameters MP0 and MP1 are defined externally by the memory configuration sub module MCFG of section 0.

An MCS-channel can also be considered as an individual task of a processor that is scheduled at a specific point in time.

A more detailed description of the scheduling can be found in section 0.

Moreover, each MCS-channel has a dedicated ARU interface for communication with other ARU connected modules, an Instruction Register (IR), a Program Counter Register (PC), a Status Register (STA), an ARU Control Bit Register (ACB), and a Register Bank with eight 24 bit general purpose registers (R0, R1, . . . R7).

All the registers, mentioned above, are only visible within its dedicated MCS-channel and thus the MCS-channels cannot exchange data using registers.

The only exception are the trigger registers (STRG and CTRG) that can be accessed by each MCS sub module and the CPU in order to trigger several MCS-channels located in the same sub module.

Whenever data has to be exchanged between different MCS-channels or the CPU, the connected RAM pages, which are accessible by all MCS-channels and the CPU, can be used.

However, since the data registers are writable by the CPU, an MCS channel may also exchange data with the CPU using its data registers.

The main actions of the different pipeline stages are as follows:

Pipeline stage 0 performs a setup of address, input data, and control signals for the next RAM access of a specific MCS-channel.

The actual RAM access of a specific MCS-channel is executed in pipeline stage 1.

The RAM priority decoder arbitrates RAM accesses that are requested by the CPU via AEI and by the active MCS-channel of pipeline stage 1.

If both, CPU and an MCS-channel request a memory access to the same memory page the MCS-channel is prioritized.

Pipeline stage 2 performs pre-decoding of instruction and data resulting from the RAM.

Finally, in pipeline stage 3 the current instruction is executed.

Scheduling

The MCS sub module provides two different scheduling schemes: round-robin schedule and accelerated schedule.

The scheduling scheme can be selected by the SCHED bit in the global MCS[i]_CTRL register.

The round-robin order scheduling assigns all MCS-channels an equal amount of time slices.

In addition, the scheduler also assigns one time slice to the CPU, in order to guarantee at least one memory access by the CPU within each round-trip cycle.

FIG. 41 shows the round-robin scheduling with 8 MCS-channels ($C_0$ to $C_7$) that are scheduled together with a single CPU access.

Scheduling

See FIG. 41.

The figure also shows which MCS-channel is activated in specific pipeline stage at a specific point in time.

The execution time of an MCS-channel in a specific pipeline stage is always one clock cycle.

The index t marks all instruction parts of the corresponding MCS-channels belonging to the same round-trip cycle.

Consequently, a single cycle instruction of an MCS-channel requires an effective execution time of 9 clock cycles, ignoring the four clock cycles of pipeline latency.

In order to improve memory bandwidth between CPU and MCS memory, the time slices of any suspended MCS-channel is also granted to the CPU.

An MCS-channel can be suspended due to the following reasons:

- An MCS-channel is executing a blocking read or write request to an ARU connected sub module.
- An MCS-channel waits on a trigger event generated by another MCS-channel (initiated by MCS instruction WTRG).
- An MCS-channel is disabled.

The round-robin scheduling leads to a deterministic round trip time for the whole sub module, however it may waste clock cycles by scheduling MCS-channels that are not able to run at a specific point in time assuming that there is no high CPU bandwidth required.

In order to improve computational performance of the MCS, the round-robin scheduling can be improved in the accelerated scheduling mode, whenever one or more MCS-channels are suspended.

If the accelerated scheduling scheme is selected, the scheduler acts as follows:

Whenever the scheduler cannot schedule a specific MCS-channel due to its suspended state (or it is already scheduled in stage 0, 1, or 2), the scheduler is selecting the next non-suspended MCS-channel that would follow if round-robin scheduling is continued.

Considering the example of FIG. 41 in conjunction with the accelerated scheduling scheme, a single cycle instruction of an MCS-channel requires an effective execution time between four and 9 clock cycles, depending on the number of suspended MCS-channels.

In summary, the round-robin scheduling mode grants time slices of suspended MCS-channels to the CPU and the accelerated scheduling mode grants time slices of suspended MCS-channels to non-suspended MCS-channels.

Instruction Set

This section describes the entire instruction set of the MCS sub module.

After the introduction of the different instruction formats in section 0, the individual instructions are described in sections 0 to 0.

In general, each instruction is 32 bit wide but the duration of each instruction varies between several instruction cycles. An instruction cycle is defined as the time in SYS_CLK clock cycles that rest between two consecutive instructions of a channel. As already described in section 0, the number of required clock cycles for a single instruction cycle can vary in the range of four to 9 clock cycles, depending on the number suspended MCS-channels, when the accelerated scheduling scheme is selected inside the MCS[i]_CTRL register.

In the round robin scheduling scheme, each instruction takes exactly 9 clock cycles. Before the instruction formats and the actual instructions are described, some commonly used terms, abbreviations and expressions are introduced:

REG: The general purpose register set REG={R0, R1, R, . . . , R7} identifies the number of allocated general purpose registers of an MCS-channel.

XREG: The extended register set XREG=REG∪{STA, STRG, CTRG, ACB} extends the set REG by the Status Register (STA), the Set Trigger Bit Register (STRG), the Clear Trigger Bit Register (CTRG) and the ARU control register ACB.

OPER: The operation set OPER=XREG∪{TBU_TS0, TBU_TS1, TBU_TS2 } extends the extended register set XREG by the time bases TBU_TS0, TBU_TS1, and TBU_TS2.

LIT4: The set LIT4={0,1, . . . , 15} is an unsigned 4 bit literal.

LIT16: The set LIT16={0,1, . . . , $2^{16}-1$} is an unsigned 16 bit literal.

LIT24: The set LIT24={0,1, . . . $2^{24}-1$} is an unsigned 24 bit literal.

BIT SELECTION: The expression VAR[i] represents the i-th bit of a variable VAR.

BIT RANGE SELECTION: The expression VAR[m:n] represents the bit slice of variable VAR that is ranging from bit n to bit m.

MEMORY ADRESSING: The expression MEM(X) represents the 32 bit value at address X of the memory.

Address X ranges between 0 and $2^{16}-4$, whereas X must be an integral multiple of 4.

The expression MEM(X)[m:n] represents the bit slice ranging from bit n to m of the 32 bit word at memory location X.

ARU ADRESSING: In the case of ARU reading, the expression ARU(X) represents the 53 bit ARU word of ARU channel at address X.

The read address X ranges between 0 and $2^9-1$.

In the case of ARU writing, the expression ARU(X) represents a 53 bit ARU word that is written to an ARU channel indexed by the index X.

The index X selects a single ARU write channel from the pool of the MCS sub module's allocated ARU write channels.

An MCS sub module has 24 ARU write channels, indexed by values 0 to 23.

The expression ARU(X)[m:n] represents the bit slice ranging from bit n to m of the 53 bit ARU word.

Instruction Format

The first instruction format, called literal instruction format, embeds a primary 4 bit opcode OPC0, a 24 bit literal value C∈LIT24, and a 4 bit value A, which may be an element of set REG, XREG or OPER, depending on the actual instruction.

The following table shows the bit alignment of the literal instruction format.

Literal Instruction Format

| 31 28 | 27 24 | 23 0 |
|---|---|---|
| OPC0 (4bit) | A (4bit) | C (24bit) |

The literal instruction format is primarily used for instructions that are accessing a 24 bit literal and a single 24 bit register as operands.

In the following subsections the binary codes of a 24 bit literal instruction is defined as "xxxxaaaac-cccccccccccccccccccccc", whereas the digits 'x' encode the field OPC0, the digits 'a' encode the operand field A, and the digits 'c' encode the 24 bit literal field C.

If an instruction ignores several bits of field, the bits are defined as '–' in its code. The second instruction format, called double operand instruction format, embeds a 4 bit primary opcode OPC0, a 4 bit secondary opcode OPC1, an 16 bit literal C∈LIT16 and two 4 bit values A and B, which may be an element of set REG, XREG, OPER, or LIT4 depending on the actual instruction.

The following table shows the bit alignment of the double operand instruction format.

Double Operand Instruction Format

| 31 28 | 27 24 | 23 20 | 19 16 | 15 0 |
|---|---|---|---|---|
| OPC0 (4bit) | A (4bit) | B (4bit) | OPC1 (4bit) | C (16bit) |

The double operand instruction format is primarily used for instructions that are accessing two operands stored in the 24 bit registers.

In the following subsections the binary codes of a 16 bit literal instruction is defined as "xxxxaaaabbbbyyyyc-ccccccccccccccc", whereas the digits 'x' encode the bit field OPC0, 'y' the digits of field OPC2, the digits 'a' encode the operand field A, the digits 'b' the operand field B, and the digits 'c' encode the 16 bit literal field C.

If an instruction ignores several bits of field, the bits are defined as '–' in its code.

Data Transfer Instructions

MOVL Instruction

Syntax: MOVL A, C

Operation: A←C

Status: Z

Duration: 1 instruction cycle

Code: 0001aaaacccccccccccccccccccccccc

Description: Transfer literal value C (C∈LIT24) to register A (A∈XREG).

The zero bit Z of status register STA is set, if the transferred value is zero, otherwise the zero bit is cleared.

The program counter PC is incremented by the value 4.

MOV Instruction

Syntax: MOV A, B

Operation: A←B

Status: Z

Duration: 1 instruction cycle

Code: 1010aaaabbbb0000 - - -

Description: Transfer value B (B∈OPER) to register A (A∈XREG).

The zero bit Z of status register STA is set, if the transferred value is zero, otherwise the zero bit is cleared.

The program counter PC is incremented by the value 4.

MRD Instruction

Syntax: MRD A, C

Operation: A←MEM(C)[23:0]

Status: Z

Duration: 2 instruction cycles

Code: 1010aaaa - - - 0001cccccccccccccccc

Description: Transfer 24 bit value of memory at address C (C∈LIT16) to register A (A∈XREG).

The 24 bit value is received from the lower significant bits (bit 0 to 23) of the memory location.

The zero bit Z of status register STA is set, if the transferred value is zero, otherwise the zero bit is cleared.

The program counter PC is incremented by the value 4.

MWR Instruction

Syntax: MWR A, C

Operation: MEM(C)[23:0]←A; MEM(C)[28:24]←ACB; MEM(C)[31:29]←0

Status: —

Duration: 2 instruction cycles

Code: 1010aaaa - - - 0010cccccccccccccccc

Description: Transfer 24 bit value of register A (A∈OPER) together with the five ACB bits from register ACB to memory at address C (C∈LIT16).

The 24 bit value of register A is stored in the lower significant bits (bit 0 to 23) of the memory location and the five ACB bits are stored in bits 24 to 28.

The bits 29 to 31 of the memory location are cleared.

The program counter PC is incremented by the value 4.

MWR24 Instruction

Syntax: MWR24 A, C

Operation: MEM(C)[23:0]←A

Status: —

Duration: 2 instruction cycles

Code: 1010aaaa - - - 0111cccccccccccccccc

Description: Transfer 24 bit value of register A (A∈OPER) to memory at address C (C∈LIT16).

The 24 bit value of register A is stored in the lower significant bits (bit 0 to 23) of the memory location and the bits 24 to 31 are left unchanged. The program counter PC is incremented by the value 4.

MWR16 Instruction

Syntax: MWR16 A, C

Operation: MEM(C)[15:0]→A[15:0]

Status: —

Duration: 2 instruction cycles

Code: 1010aaaa - - - 1001cccccccccccccccc

Description: Transfer 16 bit value of register A (A∈OPER) to memory at address C (C∈LIT16).

The lower significant 16 bits of register A is stored in the lower significant bits (bit 0 to 15) of the memory location and the bits 16 to 31 are left unchanged.

The program counter PC is incremented by the value 4.

MRDI Instruction

Syntax: MRDI A, B

Operation: A←MEM(B[15:0])[23:0]

Status: Z

Duration: 2 instruction cycles

Code: 1010aaaabbbb0011 - -

Description: Transfer 24 bit value of memory to register A (A∈XREG) using indirect addressing.

The memory location where to read from is defined by the bits 0 to 15 of register B (B∈REG).

The 24 bit value is received from the lower significant bits (bit 0 to 23) of the memory location.

The zero bit Z of status register STA is set, if the transferred value is zero, otherwise the zero bit is cleared.

The program counter PC is incremented by the value 4.

MWRI Instruction

Syntax: MWRI A, B

Operation: MEM(B[15:0])[23:0]←A; MEM(B[15:0])[28:24]←ACB; MEM(B[15:0])[31:29]←0

Status: —

Duration: 2 instruction cycles

Code: 1010aaaabbbb0100 - -

Description: Transfer 24 bit value of A (A∈OPER) together with the five ACB bits from register ACB to memory using indirect addressing.

The memory location where to write to is defined by the bits 0 to 15 of register B (B∈REG).

The 24 bit value is stored in the lower significant bits (bit 0 to 23) of the memory location and the five ACB bits are stored in bits 24 to 28.

The bits 29 to 31 of the memory location are cleared.

The program counter PC is incremented by the value 4.

MWRI24 Instruction

Syntax: MWRI24 A, B

Operation: MEM(B[15:0])[23:0]←A;

Status: —

Duration: 2 instruction cycles

Code: 1010aaaabbbb1000 - -

Description: Transfer 24 bit value of A (A∈OPER) to memory using indirect addressing.

The memory location where to write to is defined by the bits 0 to 15 of register B (B∈REG).

The 24 bit value is stored in the lower significant bits (bit 0 to 23) of the memory location and the bits 24 to 31 are left unchanged.

The program counter PC is incremented by the value 4.

MWRI16 Instruction

Syntax: MWRI16 A, B

Operation: MEM(B[15:0])[15:0]←A[15:0];

Status: —

Duration: 2 instruction cycles

Code: 1010aaaabbbb1010 - -

Description: Transfer 16 bit value of A (A∈OPER) to memory using indirect addressing.

The memory location where to write to is defined by the bits 0 to 15 of register B (B∈REG).

The lower significant 16 bits of A are stored in the lower significant bits (bit 0 to 15) of the memory location and the bits 16 to 31 are left unchanged.

The program counter PC is incremented by the value 4.

POP Instruction

Syntax: POP A

Operation: A←MEM(R7[15:0])[23:0]; R7←R7−4; SP_CNT←SP_CNT−1

Status: EN

Duration: 2 instruction cycles

Code: 1010aaaa - - - 0101 - -

Description: Transfer 24 bit value from the top of stack to register A (A∈XREG), followed by decrementing the stack pointer register R7 with the value 4.

The memory location for the top of the stack is identified by the bits 0 to 15 of the stack pointer register.

The 24 bit value of the stack is received from the lower significant bits (bit 0 to 23) of the memory.

The program counter PC is incremented by the value 4.

The SP_CNT bit field inside the MCS[i]_CH[x]_CTRL register is decremented.

If an underflow on the SP_CNT bit field occurs, the STK_ERR[i]_IRQ is raised.

If an underflow on the SP_CNT bit field occurs and the bit HLT_SP_OFL of register MCS[i]_CTRL is set, the current MCS-channel is disabled by clearing the EN bit of STA.

PUSH Instruction

Syntax: PUSH A

Operation: R7←R7+4; SP_CNT←SP_CNT+1; MEM(R7[15:0])[23:0]←A; MEM(R7[15:0])[28:24]←ACB Status: EN Duration: 2 instruction cycles Code: 1010aaaa - - - 0110 - -

Description: Increment the stack pointer register R7 with the value 4, followed by transferring a 24 bit value of operand A (A∈OPER) to the new top of the stack.

The memory location for the top of the stack is identified by the bits 0 to 15 of the stack pointer register.

The 24 bit values of the stack are stored in the lower significant bits (bit 0 to 23) of the memory and the five ACB register bits are stored in bits 24 to 28 of the RAM.

The program counter PC is incremented by the value 4.

The SP_CNT bit field inside the MCS[i]_CH[x]_CTRL register is incremented.

If an overflow on the SP_CNT bit field occurs, the STK_ERR[i]_IRQ is raised.

If an overflow on the SP_CNT bit field occurs and the bit HLT_SP_OFL of register MCS[i]_CTRL is set, the current MCS-channel is disabled by clearing the EN bit of STA.

If an overflow on the SP_CNT bit field occurs and the bit HLT_SP_OFL of register MCS[i]_CTRL is set, the memory write operation for the A and ACB is discarded.

ARU Instructions

ARD Instruction

Syntax: ARD A, B, C

Operation: A←ARU(C)[23:0]; B←ARU(C)[47:24]; ACB[4:0]←ARU(C)[52:48]

Status: —

Duration: suspends current MCS-channel

Code: 1011aaaabbbb0000cccccccccccccccc

Description: Perform a blocking read access to the ARU and transfer both 24 bit values received at the ARU port to the registers A and B (A∈REG, B∈REG), whereas A holds the lower 24 bit ARU word and B holds the upper 24 bit ARU word.

The received ARU control bits are stored in the register ACB.

The lower significant bits of the literal C (C∈LIT16) define the ARU address where to read from.

The program counter PC is incremented by the value 4.

ARDI Instruction

Syntax: ARDI A, B

Operation: A←ARU(ACB[16:8])[23:0]; B←ARU(ACB[16:8])[47:24]; ACB[4:0]←ARU (ACB[16:8])[52:48]

Status: —

Duration: suspends current MCS-channel

Code: 1011aaaabbbb0100

Description: Perform a blocking read access to the ARU and transfer both 24 bit values received at the ARU port to the registers A and B (A∈REG, B E REG), whereas A holds the lower 24 bit ARU word and B holds the upper 24 bit ARU word.

The received ARU control bits are stored in the register ACB.

The read address is obtained from the bits 16 down to 8 of the channels ACB register.

The program counter PC is incremented by the value 4.

ARDH Instruction

Syntax: ARDH B, C

Operation: B←ARU(C)[47:24]; ACB[4:0]←ARU(C)[52:48]

Status: —

Duration: suspends current MCS-channel

Code: 1011 - - - abbbb0010cccccccccccccccc

Description: Perform a blocking read access to the ARU and transfer upper 24 bit value received at the ARU port to the register B (B∈REG).

The received ARU control bits are stored in the register ACB.

The lower significant bits of the literal C (C∈LIT16) define the ARU address where to read from.

The program counter PC is incremented by the value 4.

ARDHI Instruction

Syntax: ARDHI B

Operation: B←ARU(ACB[16:8])[47:24]; ACB[4:0]←ARU(ACB[16:8])[52:48]

Status: —

Duration: suspends current MCS-channel

Code: 1011 - - - bbbb0110 - -

Description: Perform a blocking read access to the ARU and transfer upper 24 bit value received at the ARU port to the register B (B∈REG).

The received ARU control bits are stored in the register ACB.

The read address is obtained from the bits 16 down to 8 of the channels ACB register.

The program counter PC is incremented by the value 4.

ARDL Instruction

Syntax: ARDL A, C

Operation: A←ARU(C)[23:0]; ACB[4:0]←ARU(ACB[16:8])[52:48]

Status: —

Duration: suspends current MCS-channel

Code: 1011aaaa - - - 0011cccccccccccccccc

Description: Perform a blocking read access to the ARU and transfer lower 24 bit value received at the ARU port to the register A (A∈REG).

The received ARU control bits are stored in the register ACB.

The lower significant bits of the literal C (C∈LIT16) define the ARU address where to read from.

The program counter PC is incremented by the value 4.

ARDLI Instruction

Syntax: ARDLI A

Operation: A←ARU(ACB[16:8])[23:0]; ACB[4:0]←ARU(ACB[16:8])[52:48]

Status: —

Duration: suspends current MCS-channel

Code: 1011aaaa - - - 0111 - -

Description: Perform a blocking read access to the ARU and transfer lower 24 bit value received at the ARU port to the register A (A∈REG).

The received ARU control bits are stored in the register ACB.

The read address is obtained from the bits 16 down to 8 of the channels ACB register.

The program counter PC is incremented by the value 4.

AWR Instruction

Syntax: AWR A, B, C

Operation: ARU(C)[23:0]←A; ARU(C)[47:24]←B; ARU(C)[52:48]←ACB[4:0];

Status: —

Duration: suspends current MCS-channel

Code: 1011aaaabbbb0001cccccccccccccccc

Description: Perform a blocking write access to the ARU and transfer two 24 bit values to the ARU port using the registers A and B (A∈REG, B∈REG), whereas A holds the lower 24 bit ARU word and B holds the upper 24 bit ARU word.

The ARU control bits to be sent are taken from the register ACB.

The lower significant bits (bit 0 to bit 3) of the literal C (C∈LIT16) define an index into the pool of ARU write address that is used for writing data.

Each MCS sub module has a pool of several write addresses that can be shared between all MCS-channels arbitrarily.

The program counter PC is incremented by the value 4.

AWRI Instruction

Syntax: AWRI A, B

Operation: ARU(ACB[11:8])[23:0]←A; ARU(ACB[11:8])[47:24]←B; ARU(ACB[11:8])[52:48]←ACB[4:0];

Status: —

Duration: suspends current MCS-channel

Code: 1011aaaabbbb0101 - -

Description: Perform a blocking write access to the ARU and transfer two 24 bit values to the ARU port using the registers A and B (A∈REG, B∈REG), whereas A holds the lower 24 bit ARU word and B holds the upper 24 bit ARU word.

The ARU control bits to be sent are taken from the register ACB.

The bits 11 down to 8 of the ACB register define an index into the pool of ARU write address that is used for writing data.

Each MCS sub module has a pool of several write addresses that can be shared between all MCS-channels arbitrarily.

The program counter PC is incremented by the value 4.

Arithmetic Logic Instructions

ADDL Instruction

Syntax: ADDL A, C

Operation: A←A+C

Status: Z, CY, N, V

Duration: 1 instruction cycle

Code: 0010aaaacccccccccccccccccccccccc

Description: Perform addition operation of a register A (A∈REG) with a 24 bit literal value C (C∈LIT24) and store the result in register A.

The zero bit Z of status register STA is set, if the calculated value is zero, otherwise the zero bit is cleared.

The carry bit CY of status register STA is set, if an unsigned overflow occurred during addition, otherwise the bit is cleared.

The overflow bit V of status register STA is set, if a signed overflow occurred during subtraction, otherwise the bit is cleared.

The negative bit N of status register STA is set, if a calculated result is negative, otherwise the bit is cleared.

The program counter PC is incremented by the value 4.

ADD Instruction

Syntax: ADD A, B

Operation: A←A+B

Status: Z, CY, N, V

Duration: 1 instruction cycle

Code: 1100aaaabbbb0000 - -

Description: Perform addition operation of a register A (A∈REG) with an operand B (B∈OPER) and store the result in register A.

The zero bit Z of status register STA is set, if the calculated value is zero, otherwise the zero bit is cleared.

The carry bit CY of status register STA is set, if an unsigned overflow occurred during addition, otherwise the bit is cleared.

The overflow bit V of status register STA is set, if a signed overflow occurred during subtraction, otherwise the bit is cleared.

The negative bit N of status register STA is set, if a calculated result is negative, otherwise the bit is cleared.

The program counter PC is incremented by the value 4.

SUBL Instruction

Syntax: SUBL A, C

Operation: A←A−C

Status: Z, CY, N, V

Duration: 1 instruction cycle

Code: 0011aaaacccccccccccccccccccccccc

Description: Perform subtraction operation of a register A (A∈REG) with a 24 bit literal value C (C∈LIT24) and store the result in register A.

The zero bit Z of status register STA is set, if the calculated value is zero, otherwise the zero bit is cleared.

The carry bit CY of status register STA is set, if an unsigned overflow occurred during subtraction, otherwise the bit is cleared.

The overflow bit V of status register STA is set, if a signed overflow occurred during subtraction, otherwise the bit is cleared.

The negative bit N of status register STA is set, if a calculated result is negative, otherwise the bit is cleared.

The program counter PC is incremented by the value 4.

SUB Instruction

Syntax: SUB A, B

Operation: A←A−B

Status: Z, CY, N, V

Duration: 1 instruction cycle Code: 1100aaaabbbb0001 - -

Description: Perform subtraction operation of a register A (A∈REG) with an operand B (B∈OPER) and store the result in register A.

The zero bit Z of status register STA is set, if the calculated value is zero, otherwise the zero bit is cleared.

The carry bit CY of status register STA is set, if an unsigned overflow occurred during subtraction, otherwise the bit is cleared.

The overflow bit V of status register STA is set, if a signed overflow occurred during subtraction, otherwise the bit is cleared.

The negative bit N of status register STA is set, if a calculated result is negative, otherwise the bit is cleared.

The program counter PC is incremented by the value 4.

NEG Instruction

Syntax: NEG A, B

Operation: A←−B

Status: Z, CY, N, V

Duration: 1 instruction cycle

Code: 1100aaaabbbb0010 - -

Description: Perform negation operation (2's Complement) with an operand B (B∈OPER) and store the result in a register A (A∈REG).

The zero bit Z of status register STA is set, if the calculated value is zero, otherwise the zero bit is cleared.

The carry bit CY of status register STA is set, if an unsigned overflow occurred during subtraction, otherwise the bit is cleared.

The overflow bit V of status register STA is set, if a signed overflow occurred during subtraction, otherwise the bit is cleared.

The negative bit N of status register STA is set, if a calculated result is negative, otherwise the bit is cleared.

The program counter PC is incremented by the value 4.

ANDL Instruction

Syntax: ANDL A, C

Operation: A←A AND C

Status: Z

Duration: 1 instruction cycle

Code: 0100aaaacccccccccccccccccccccccc

Description: Perform bitwise AND conjunction of a register A (A∈XREG) with a 24 bit literal value C (C∈LIT24) and store the result in register A.

The zero bit Z of status register STA is set, if the calculated value is zero, otherwise the zero bit is cleared.

The program counter PC is incremented by the value 4.

AND Instruction

Syntax: AND A, B

Operation: A←A AND B

Status: Z

Duration: 1 instruction cycle

Code: 1100aaaabbbb0011 - -

Description: Perform bitwise AND conjunction of a register A (A∈XREG) with an operand B (B∈OPER) and store the result in register A.

The zero bit Z of status register STA is set, if the calculated value is zero, otherwise the zero bit is cleared.

The program counter PC is incremented by the value 4.

ORL Instruction

Syntax: ORL A, C

Operation: A←A OR C

Status: Z

Duration: 1 instruction cycle

Code: 0101aaaacccccccccccccccccccccccc

Description: Perform bitwise OR conjunction of a register A (A∈XREG) with a 24 bit literal value C (C∈LIT24) and store the result in register A.

The zero bit Z of status register STA is set, if the calculated value is zero, otherwise the zero bit is cleared.

The program counter PC is incremented by the value 4.

OR Instruction

Syntax: OR A, B

Operation: A←A OR B

Status: Z

Duration: 1 instruction cycle

Code: 1100aaaabbbb0100 - -

Description: Perform bitwise OR conjunction of a register A (A∈XREG) with an operand B (B∈OPER) and store the result in register A.

The zero bit Z of status register STA is set, if the calculated value is zero, otherwise the zero bit is cleared.

The program counter PC is incremented by the value 4.

XORL Instruction

Syntax: XORL A, C

Operation: A←A XOR C

Status: Z

Duration: 1 instruction cycle

Code: 0110aaaacccccccccccccccccccccccc

Description: Perform bitwise XOR conjunction of a register A (A∈XREG) with a 24 bit literal value C (C∈LIT24) and store the result in register A.

The zero bit Z of status register STA is set, if the calculated value is zero, otherwise the zero bit is cleared.

The program counter PC is incremented by the value 4.

XOR Instruction

Syntax: XOR A, B

Operation: A←A XOR B

Status: Z

Duration: 1 instruction cycle

Code: 1100aaaabbbb0101 - -

Description: Perform bitwise XOR conjunction of a register A (A∈XREG) with an operand B (B∈OPER) and store the result in register A.

The zero bit Z of status register STA is set, if the calculated value is zero, otherwise the zero bit is cleared.

The program counter PC is incremented by the value 4.

SHR Instruction

Syntax: SHR A, C

Operation: A←A>>C

Status: Z

Duration: 1 instruction cycle

Code: 1100aaaa - - - 0110cccccccccccccccc

Description: Perform right shift operation C (C∈LIT16) times of register A (A∈REG).

The zero bit Z of status register STA is set, if the calculated value is zero, otherwise the zero bit is cleared.

The program counter PC is incremented by the value 4.

SHL Instruction

Syntax: SHL A, C

Operation: A←A<<C

Status: Z

Duration: 1 instruction cycle

Code: 1100aaaa - - - 0111cccccccccccccccc

Description: Perform left shift operation C (C∈LIT16) times of register A (A∈REG).

The zero bit Z of status register STA is set, if the calculated value is zero, otherwise the zero bit is cleared.

The program counter PC is incremented by the value 4.

ROR Instruction

Syntax: ROR A

Operation: A←A>>1

Status: Z, CY

Duration: 1 instruction cycle

Code: 1100aaaa - - - 1000

Description: Perform rotate right operation of register A (A∈REG).

In registers A, the bit $a_i$ is moved to the bit $a_{i-1}$ (with i=0 to 23).

The carry bit CY of the status register STA is moved to bit $a_{23}$ and bit $a_0$ is moved to bit CY.

The zero bit Z of status register STA is set, if the calculated value is zero, otherwise the zero bit is cleared.

The program counter PC is incremented by the value 4.

ROL Instruction

Syntax: ROL A

Operation: A←A<<1

Status: Z, CY

Duration: 1 instruction cycle

Code: 1100aaaa - - - 1001 - -

Description: Perform rotate left operation of register A (A∈REG).

In registers A, the bit $a_{i-1}$ is moved to the bit $a_i$ (with i=0 to 23).

The carry bit CY of the status register STA is moved to bit $a_0$ and bit $a_{23}$ is moved to bit CY.

The zero bit Z of status register STA is set, if the calculated value is zero, otherwise the zero bit is cleared.

The program counter PC is incremented by the value 4.

Test Instructions

LTL Instruction

Syntax: LTL A, C

Operation: A<C

Status: Z, CY

Duration: 1 instruction cycle

Code: 0111aaaacccccccccccccccccccccccc

Description: Less-than-comparison of an operand A (A∈OPER) with a 24 bit literal value C (C∈LIT24).

The carry bit CY of status register STA is set if operand A is less than literal C.

Otherwise, the carry bit CY of status register STA is cleared if operand A is greater than or equal to literal C.

The zero bit Z of status register STA is set, if A equals to C.

Otherwise, the zero bit Z of status register STA is cleared, if A is unequal to C.

The program counter PC is incremented by the value 4.

LT Instruction

Syntax: LT A, B

Operation: A<B

Status: Z, CY

Duration: 1 instruction cycle

Code: 1101aaaabbbb0000 - -

Description: Less-than-comparison of an operand A (A∈OPER) with an operand B (B∈OPER).

The carry bit CY of status register STA is set if operand A is less than operand B. Otherwise, the carry bit CY of status register STA is cleared if operand A is greater than or equal to operand B.

The zero bit Z of status register STA is set, if A equals to B.

Otherwise, the zero bit Z of status register STA is cleared, if A is unequal to B.

The program counter PC is incremented by the value 4.

GTL Instruction

Syntax: GTL A, C

Operation: A>C

Status: Z, CY

Duration: 1 instruction cycle

Code: 1000aaaacccccccccccccccccccccccc

Description: Greater-than-comparison of an operand A (A∈OPER) with a 24 bit literal value C (C∈LIT24).

The carry bit CY of status register STA is set if operand A is greater than literal C.

Otherwise, the carry bit CY of status register STA is cleared if operand A is less than or equal to literal C.

The zero bit Z of status register STA is set, if A equals to C.

Otherwise, the zero bit Z of status register STA is cleared, if A is unequal to C.

The program counter PC is incremented by the value 4.

GT Instruction

Syntax: GT A, B

Operation: A>B

Status: Z, CY

Duration: 1 instruction cycle

Code: 1101aaaabbbb0001 - -

Description: Greater-than-comparison of an operand A (A∈OPER) with an operand B (B∈OPER).

The carry bit CY of status register STA is set if operand A is greater than operand B.

Otherwise, the carry bit CY of status register STA is cleared if operand A is less than or equal to operand B.

The zero bit Z of status register STA is set, if A equals to B.

Otherwise, the zero bit Z of status register STA is cleared, if A is unequal to B.

The program counter PC is incremented by the value 4.

BTL Instruction

Syntax: BTL A, C

Operation: A AND C

Status: Z

Duration: 1 instruction cycle

Code: 1001aaaacccccccccccccccccccccccc

Description: Bit test of an operand A (A∈OPER) with a 24 bit literal bit mask C (C∈LIT24).

The bit test is performed by applying a bitwise logical AND operation with operand A and the bit mask C without storing the result.

The zero bit Z of status register STA is set, if the calculated value is zero, otherwise the zero bit is cleared.

The program counter PC is incremented by the value 4.

BT Instruction

Syntax: BT A, B

Operation: A AND B

Status: Z

Duration: 1 instruction cycle

Code: 1101aaaabbbb0010 - -

Description: Bit test of an operand A (A∈OPER) with an operand B (B∈OPER), whereas usually one of the operands is a register holding a bit mask.

The bit test is performed by applying a bitwise logical AND operation with register A and register B without storing the result.

The zero bit Z of status register STA is set, if the calculated value is zero, otherwise the zero bit is cleared.

The program counter PC is incremented by the value 4.

Control Flow Instructions

JMP Instruction

Syntax: JMP C

Operation: PC←C

Status: —

Duration: 1 instruction cycle

Code: 1110 - - -0000cccccccccccccccc

Description: Execute unconditional jump to the memory location C (C∈LIT16).

The program counter PC is loaded with literal C.

JBS Instruction

Syntax: JBS A, B, C

Operation: PC←C if A[B] is set

Status: —

Duration: 1 instruction cycle

Code: 1110aaaabbbb0001cccccccccccccccc

Description: Execute conditional jump to the memory location C (C∈LIT16).

The program counter PC is loaded with literal C, if the bit at position B (B∈LIT4) of operand A (A∈OPER) is set.

Otherwise, if the bit is cleared, the program counter PC is incremented by the value 4.

JBC Instruction

Syntax: JBC A, B, C

Operation: PC←C if A[B] is cleared

Status: —

Duration: 1 instruction cycle

Code: 1110aaaabbbb0010cccccccccccccccc

Description: Execute conditional jump to the memory location C (C∈LIT16).

The program counter PC is loaded with literal C, if the bit at position B (B∈LIT4) of operand A (A∈OPER) is cleared.

Otherwise, if the bit is set, the program counter PC is incremented by the value 4.

CALL Instruction

Syntax: CALL C

Operation: R7←R7+4; MEM(SP[15:0])[15:0]←PC+4; PC←C; SP_CNT←SP_CNT+1

Status: EN

Duration: 2 instruction cycles

Code: 1110 - - -0011cccccccccccccccc

Description: Call subprogram at memory location C (C∈LIT16).

The stack pointer register R7 is incremented by the value 4.

The memory location for the top of the stack is identified by the bits 0 to 15 of the stack pointer register.

After the stack pointer is incremented, the incremented value of the PC is transferred to the top of the stack.

The program counter PC is loaded with literal C.

The SP_CNT bit field inside the MCS[i]_CH[x]_CTRL register is incremented.

If an overflow on the SP_CNT bit field occurs, the STK_ERR[i]_IRQ is raised.

If an overflow on the SP_CNT bit field occurs and the bit HLT_SP_OFL of register MCS[i]_CTRL is set, the channel current MCS-channel is disabled by clearing the EN bit of STA.

If an overflow on the SP_CNT bit field occurs and the bit HLT_SP_OFL of register MCS[i]_CTRL is set, the memory write operation of the incremented PC is discarding.

RET Instruction

Syntax: RET

Operation: PC←MEM(SP[15:0])[15:0]; R7←R7–4; SP_CNT←SP_CNT−1

Status: EN

Duration: 2 instruction cycles

Code: 1110 - - -0100 - -

Description: Return from subprogram.

The program counter PC is loaded with current value on the top of the stack.

Finally, the stack pointer register 7 is decremented by the value 4.

The memory location for the top of the stack is identified by the bits 0 to 15 of the stack pointer register.

The SP_CNT bit field inside the MCS[i]_CH[x]_CTRL register is decremented.

If an underflow on the SP_CNT bit field occurs, the STK_ERR[i]_IRQ is raised.

If an underflow on the SP_CNT bit field occurs and the bit HLT_SP_OFL of register MCS[i]_CTRL is set, the channel current MCS-channel is disabled by clearing the EN bit of STA.

Other Instructions

WTRG Instruction

Syntax: WTRG A

Operation: Wait on trigger indexed by A

Status: —

Duration: suspends current MCS-channel

Code: 1111aaaa - - - 0000 - -

Description: Suspend current MCS-channel until a trigger bit is activated by another MCS-channel or the CPU, where A is the bit position of the trigger bit.

The trigger bits can be set by other MCS channels performing with a write access (e.g. using a MOVL instruction) to the STRG register.

Moreover, the trigger bits can be set by CPU performing with a write access to the MCS[i]_STRG register.

The trigger bit is not cleared automatically by hardware after resuming an MCS-channel, but it has to be cleared explicitly with a write access to the register CTRG by the MCS-channel or with a write access to the register CMCS[i]_CTRG by the CPU.

If a WTRG instruction is executed and the trigger bit is already set, the WTRG instruction does not suspend the channel.

The program counter PC is incremented by the value 4, when the trigger bit is set and the channel continues its operation.

Please note that more then one channel can wait for the same trigger bit to continue.

NOP Instruction

Syntax: NOP

Operation: —

Status: —

Duration: 1 instruction cycle

Code: 0000 - -

Description: No operation is performed.

The program counter PC is incremented by the value 4.

WTC Instruction

Syntax: WTC A

Operation: Wait for several instruction cycles.

Status: —

Duration: A+1 instruction cycles.

Code: 1111aaaa - - - 0001 - -

Description: The current MCS-channel is waiting for a dedicated number of instruction cycles, whereas register A (A∈REG) holds the number of desired wait cycles.

If the register A holds a value greater than zero, the register is decremented, but the program counter PC is not incremented.

If the register A contains the value zero, the program counter PC is incremented by the value 4.

While the WTC instruction is decrementing the register A, the CPU can access MCS memory, independent of the selected scheduling mode.

Thus, the WTC instruction can be used to improve memory bandwidth between CPU and MCS memory.

MCS Internal Registers

This section describes MCS internal registers that are only accessible by the corresponding MCS-channel itself.

These registers can be directly accessed with the entire MCS instruction set, e.g. using the ORL instruction to set a specific bit.

MCS Internal Registers Overview

The table describes the MCS internal registers. Only parts of this register set can be accessed by the CPU:

| Register Name | Description | Details in Section |
|---|---|---|
| R[x] | General purpose register x (x: 0 . . . 7) | 0 |
| STA | Status register | 0 |
| ACB | ARU Control Bit register | 0 |
| CTRG | Clear Trigger Bits register | 0 |
| STRG | Set Trigger Bits register | 0 |
| TBU_TS0 | TBU Timestamp TS0 register | 0 |
| TBU_TS1 | TBU Timestamp TS1 register | 0 |
| TBU_TS2 | TBU Timestamp TS2 register | 0 |

General purpose register R[x] (x: 0 . . . 7)

| | Address Offset: 0x0 + x | | Initial Value: 0x000000 |
|---|---|---|---|
| | 31 30 29 28 27 26 25 24 | 23 22 21 20 19 18 17 16 | 15 |
| Bit | N.A. | DATA | |
| Mode | | RW | |
| Initial Value | | 0x0000_00 | |

| | Initial Value: 0x000000 |
|---|---|
| | 14 13 12 11 10 9 8 7 6 5 4 3 2 1 0 |
| Bit | DATA |
| Mode | RW |
| Initial Value | 0x0000_00 |

Bit 23:0

DATA: data field of general purpose register.

Note:

The last register R[7] is used as stack pointer register, if stack operations are used in the MCS micro program.

Note:

If both, the CPU and the MCS-channel are writing to the same register at the clock cycle, the value of the CPU is written to the register and the value of the MCS-channel is discarding.

Bit 31:24

N.A.

Register STA

| | Address Offset: 0x8 | | Initial Value: 0x000000 |
|---|---|---|---|
| | 31 30 29 28 27 26 25 24 | 23 22 21 20 19 18 17 16 | 15 14 13 12 11 |
| Bit | N.A. | Reserved | |
| Mode | | R | |
| Initial Value | | 0x0000 | |

| | 10 9 8 | 7 | 6 | 5 | 4 | 3 | 2 | 1 | 0 |
|---|---|---|---|---|---|---|---|---|---|
| Bit | SP_CNT | N | V | Z | CY | CAT | ERR | IRQ | EN |
| Mode | R | R | R | R | RW | R | RAc | RAc | RW |

Initial Value: 0x000000

-continued

| Register STA | | | | | | | | | |
|---|---|---|---|---|---|---|---|---|---|
| Initial Value | 000 | 0 | 0 | 0 | 0 | 0 | 0 | 0 | 0 |

Bit 0 EN: Enable current MCS-channel.

0: Disable current MCS-channel.

1: Enable current MCS-channel.

Bit 1 IRQ: Release IRQ.

0: No triggered IRQ signal.

1: Trigger IRQ signal.

Note: An MCS-channel releases an IRQ by writing value 1 to bit IRQ. Writing a value 0 to this bit does not cancel the IRQ, and thus has no effect.

Note: An MCS-channel can read the IRQ bit in order to determine the current state of the IRQ handling. The MCS-channel reads a value 1 if an IRQ was released but not cleared by CPU. If an MCS-channel reads a value 0 no IRQ was released or it has been cleared by CPU.

Note: The IRQ bit can only be released by CPU, by writing a 1 to the corresponding MCS[i]_CH[x]_NOTIFY register (see section 0).

Bit 2 ERR: Release Error Signal.

0: ERR signal not released.

1: Release IRQ signal.

Note: An MCS-channel releases an error signal captured by module MON by writing value 1 to bit ERR. Writing a value 0 to this bit does not cancel the error signal, and thus has no effect.

Note: An MCS-channel can read the ERR bit in order to determine the current state of the error signal evaluated by the module MON. The MCS-channel reads a value 1 if an ERR was released previously, but not cleared by CPU. If an MCS-channel reads a value 0 no error was released or it has been cleared by CPU.

Bit 3 CAT: Cancel ARU transfer bit.

0: Last ARU transfer was not cancelled.

1: CPU cancelled last ARU transfer of channel.

Note: This bit is updated after each ARU transfer.

Bit 4 CY: Carry bit. The carry bit is updated by several arithmetic and logic instructions. In arithmetic operations, the carry bit indicates an unsigned under/overflow.

Bit 5 Z: Zero bit. The zero bit is updated by several arithmetic, logic and data transfer instructions to indicate a result of zero.

Bit 6 V: Overflow bit. The overflow bit is updated by arithmetic instructions in order to indicate a signed under/overflow.

Bit 7 N: Negative bit. The negative bit is updated by arithmetic instructions in order to indicate a negative result.

Bit 10:8 SP_CNT: Stack pointer counter value. Actual stack depth of instruction execution for channel. The bit field is incremented on behalf of a CALL or PUSH instruction and decremented on behalf of a RET or POP instruction. The MCS channel STK_ERR_IRQ is raised, when an overflow or underflow is detected on this bit field.

Bit 23:11 Reserved: Read as zero, should be written as zero.

Bit 31:24 N.A.

| Register ACB | | | | | | | | | | | | | | | | | | | | | |
|---|---|---|---|---|---|---|---|---|---|---|---|---|---|---|---|---|---|---|---|---|---|
| | Address Offset: 0x9 | | | | | | | | | | | | | | | | Initial Value: 0x01FE00 | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 |
| Bit | N.A. | | | | | | | | Reserved | | | | | | | | ARU_ADDR | | | | |
| Mode | | | | | | | | | R | | | | | | | | RW | | | | |
| Initial Value | | | | | | | | | 0x00 | | | | | | | | 0x1FE | | | | |

| | Initial Value: 0x01FE00 | | | | | | | | | | |
|---|---|---|---|---|---|---|---|---|---|---|---|
| | 10 | 9 | 8 | 7 | 6 | 5 | 4 | 3 | 2 | 1 | 0 |
| Bit | ARU_ADDR | | | Reserved | | | ACB4 | ACB3 | ACB2 | ACB1 | ACB0 |
| Mode | RW | | | R | | | RW | RW | RW | RW | RW |
| Initial Value | 0x1FE | | | 0x0000 | | | 0 | 0 | 0 | 0 | 0 |

Bit 0 ACB0: ARU Control bit 0.

Note: This bit is updated by each ARU read access and its value is sent to ARU by each ARU write access on bit 48 of the ARU word.

Bit 1 ACB1: ARU Control bit 1.

Note: This bit is updated by each ARU read access and its value is sent to ARU by each ARU write access on bit 49 of the ARU word.

Bit 2 ACB2: ARU Control bit 2.

Note: This bit is updated by each ARU read access and its value is sent to ARU by each ARU write access on bit 50 of the ARU word.

Bit 3 ACB3: ARU Control bit 3.

Note: This bit is updated by each ARU read access and its value is sent to ARU by each ARU write access on bit 51 of the ARU word.

Bit 4 ACB4: ARU Control bit 4.

Note: This bit is updated by each ARU read access and its value is sent to ARU by each ARU write access on bit 52 of the ARU word.

Bit 7:5 Reserved: Read as zero, should be written as zero.

Bit 16:8 ARU_ADDR: ARU Read/Write address. Bit field defines the ARU read or write address for the MCS indirect ARU read/write instructions ARDI, ARDLI, ARDHI and AWRI Bit 23:17 Reserved: Read as zero, should be written as zero.

Bit 31:24 N.A.

Register CTRG

| | Address Offset: 0xA | | | | | | | | | | | | | | | | Initial Value: 0x0000_0000 | | | | |
|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 |
| Bit | N.A. | | | | | | | | Reserved | | | | | | | | TRG15 | TRG14 | TRG13 | TRG12 | TRG11 |
| Mode | | | | | | | | | R | | | | | | | | RW | RW | RW | RW | RW |
| Initial Value | | | | | | | | | 0x000000 | | | | | | | | 0 | 0 | 0 | 0 | 0 |

| | Initial Value: 0x0000_0000 | | | | | | | | | | |
|---|---|---|---|---|---|---|---|---|---|---|---|
| | 10 | 9 | 8 | 7 | 6 | 5 | 4 | 3 | 2 | 1 | 0 |
| Bit | TRG10 | TRG9 | TRG8 | TRG7 | TRG6 | TRG5 | TRG4 | TRG3 | TRG2 | TRG1 | TRG0 |
| Mode | RW | RW | RW | RW | RW | RW | RW | RW | RW | RW | RW |
| Initial Value | 0 | 0 | 0 | 0 | 0 | 0 | 0 | 0 | 0 | 0 | 0 |

Bit 0 TRG0: trigger bit 0.
0: READ: trigger bit is cleared/WRITE: do nothing
1: READ: trigger bit is set/WRITE: clear trigger bit
Bit 1 TRG1: trigger bit 1.
0: READ: trigger bit is cleared/WRITE: do nothing
1: READ: trigger bit is set/WRITE: clear trigger bit
Bit 2 TRG2: trigger bit 2.
0: READ: trigger bit is cleared/WRITE: do nothing
1: READ: trigger bit is set/WRITE: clear trigger bit
Bit 3 TRG3: trigger bit 3.
0: READ: trigger bit is cleared/WRITE: do nothing
1: READ: trigger bit is set/WRITE: clear trigger bit
Bit 4 TRG4: trigger bit 4.
0: READ: trigger bit is cleared/WRITE: do nothing
1: READ: trigger bit is set/WRITE: clear trigger bit
Bit 5 TRG5: trigger bit 5.
0: READ: trigger bit is cleared/WRITE: do nothing
1: READ: trigger bit is set/WRITE: clear trigger bit
Bit 6 TRG6: trigger bit 6.
0: READ: trigger bit is cleared/WRITE: do nothing
1: READ: trigger bit is set/WRITE: clear trigger bit
Bit 7 TRG7: trigger bit 7.
0: READ: trigger bit is cleared/WRITE: do nothing
1: READ: trigger bit is set/WRITE: clear trigger bit
Bit 8 TRG8: trigger bit 8.
0: READ: trigger bit is cleared/WRITE: do nothing
1: READ: trigger bit is set/WRITE: clear trigger bit
Bit 9 TRG: trigger bit 9.
0: READ: trigger bit is cleared/WRITE: do nothing
1: READ: trigger bit is set/WRITE: clear trigger bit
Bit 10 TRG10: trigger bit 10.
0: READ: trigger bit is cleared/WRITE: do nothing
1: READ: trigger bit is set/WRITE: clear trigger bit
Bit 11 TRG11: trigger bit 11.
0: READ: trigger bit is cleared/WRITE: do nothing
1: READ: trigger bit is set/WRITE: clear trigger bit
Bit 12 TRG12: trigger bit 12.
0: READ: trigger bit is cleared/WRITE: do nothing
1: READ: trigger bit is set/WRITE: clear trigger bit
Bit 13 TRG13: trigger bit 13.
0: READ: trigger bit is cleared/WRITE: do nothing
1: READ: trigger bit is set/WRITE: clear trigger bit
Bit 14 TRG14: trigger bit 14.
0: READ: trigger bit is cleared/WRITE: do nothing
1: READ: trigger bit is set/WRITE: clear trigger bit
Bit 15 TRG15: trigger bit 15.
0: READ: trigger bit is cleared/WRITE: do nothing
1: READ: trigger bit is set/WRITE: clear trigger bit Note: The trigger bits TRGx (x = 0 . . . 15) are accessible by all MCS channels as well as the CPU. Setting a trigger bit can be performed with the STRG register, in the case of an MCS-channel or the MCS[i]_STRG register in the case of the CPU. Clearing a trigger bit can be performed with the CTRG register, in the case of an MCS-channel or the MCS[i]_CTRG register in the case of the CPU. Trigger bits can be used for signalizing specific events to MCS-channels or the CPU. An MCS-channel suspended with a WTRG instruction can be resumed by setting the appropriate trigger bit.

Bit 23:16 Reserved: Read as zero, should be written as zero.

Bit 31:24 N.A.

| Register STRG | | | | | | | | | | | | | | | | | | | | |
|---|---|---|---|---|---|---|---|---|---|---|---|---|---|---|---|---|---|---|---|---|
| | Address Offset: 0xB | | | | | | | | | | | | | | | | Initial Value: 0x0000_0000 | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 |
| Bit | N.A. | | | | | | | | Reserved | | | | | | | | TRG15 | TRG14 | TRG13 | TRG12 | TRG11 |
| Mode | | | | | | | | | R | | | | | | | | RW | RW | RW | RW | RW |
| Initial Value | | | | | | | | | 0x000000 | | | | | | | | 0 | 0 | 0 | 0 | 0 |

| | Initial Value: 0x0000_0000 | | | | | | | | | | |
|---|---|---|---|---|---|---|---|---|---|---|---|
| | 10 | 9 | 8 | 7 | 6 | 5 | 4 | 3 | 2 | 1 | 0 |
| Bit | TRG10 | TRG9 | TRG8 | TRG7 | TRG6 | TRG5 | TRG4 | TRG3 | TRG2 | TRG1 | TRG0 |
| Mode | RW | RW | RW | RW | RW | RW | RW | RW | RW | RW | RW |
| Initial Value | 0 | 0 | 0 | 0 | 0 | 0 | 0 | 0 | 0 | 0 | 0 |

Bit 0 TRG0: trigger bit 0.
0: READ: trigger bit is cleared/WRITE: do nothing
1: READ: trigger bit is set/WRITE: set trigger bit
Bit 1 TRG1: trigger bit 1.
0: READ: trigger bit is cleared/WRITE: do nothing
1: READ: trigger bit is set/WRITE: set trigger bit
Bit 2 TRG2: trigger bit 1.
0: READ: trigger bit is cleared/WRITE: do nothing
1: READ: trigger bit is set/WRITE: set trigger bit
Bit 3 TRG3: trigger bit 3.
0: READ: trigger bit is cleared/WRITE: do nothing
1: READ: trigger bit is set/WRITE: set trigger bit
Bit 4 TRG4: trigger bit 4.
0: READ: trigger bit is cleared/WRITE: do nothing
1: READ: trigger bit is set/WRITE: set trigger bit
Bit 5 TRG5: trigger bit 5.
0: READ: trigger bit is cleared/WRITE: do nothing
1: READ: trigger bit is set/WRITE: set trigger bit
Bit 6 TRG6: trigger bit 6.
0: READ: trigger bit is cleared/WRITE: do nothing
1: READ: trigger bit is set/WRITE: set trigger bit
Bit 7 TRG7: trigger bit 7.
0: READ: trigger bit is cleared/WRITE: do nothing
1: READ: trigger bit is set/WRITE: set trigger bit
Bit 8 TRG8: trigger bit 8.
0: READ: trigger bit is cleared/WRITE: do nothing
1: READ: trigger bit is set/WRITE: set trigger bit
Bit 9 TRG: trigger bit 9.
0: READ: trigger bit is cleared/WRITE: do nothing
1: READ: trigger bit is set/WRITE: set trigger bit
Bit 10 TRG10: trigger bit 10.
0: READ: trigger bit is cleared/WRITE: do nothing
1: READ: trigger bit is set/WRITE: set trigger bit
Bit 11 TRG11: trigger bit 11.
0: READ: trigger bit is cleared/WRITE: do nothing
1: READ: trigger bit is set/WRITE: set trigger bit
Bit 12 TRG12: trigger bit 12.
0: READ: trigger bit is cleared/WRITE: do nothing
1: READ: trigger bit is set/WRITE: set trigger bit
Bit 13 TRG13: trigger bit 13.
0: READ: trigger bit is cleared/WRITE: do nothing
1: READ: trigger bit is set/WRITE: set trigger bit
Bit 14 TRG14: trigger bit 14.
0: READ: trigger bit is cleared/WRITE: do nothing
1: READ: trigger bit is set/WRITE: set trigger bit
Bit 15 TRG15: trigger bit 15.
0: READ: trigger bit is cleared/WRITE: do nothing
1: READ: trigger bit is set/WRITE: set trigger bit Note: The trigger bits TRGx (x = 0 . . . 15) are accessible by all MCS channels as well as the CPU. Setting a trigger bit can be performed with the STRG register, in the case of an MCS-channel or the MCS[i]_STRG register in the case of the CPU. Clearing a trigger bit can be performed with the CTRG register, in the case of an MCS-channel or the MCS[i]_CTRG register in the case of the CPU. Trigger bits can be used for signalizing specific events to MCS-channels or the CPU. An MCS-channel suspended with a WTRG instruction can be resumed by setting the appropriate trigger bit.

Bit 23:16 Reserved: Read as zero, should be written as zero.

Bit 31:24 N.A.

Register TBU_TS0

Address Offset: 0xC

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | N.A. | | | | | | | | TS | | | | | | | |
| Mode | | | | | | | | | R | | | | | | | |
| Initial Value | | | | | | | | | 0xXXXXXX | | | | | | | |

Initial Value: 0xXXXXXX

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | TS | | | | | | | | | | | | | | | |
| Mode | R | | | | | | | | | | | | | | | |
| Initial Value | 0xXXXXXX | | | | | | | | | | | | | | | |

Bit 23:0 TS: Current TBU time stamp 0.
Bit 31:24 N.A.

Register TBU_TS1

Address Offset: 0xD

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | N.A. | | | | | | | | TS | | | | | | | |
| Mode | | | | | | | | | R | | | | | | | |
| Initial Value | | | | | | | | | 0xXXXXXX | | | | | | | |

Initial Value: 0xXXXXXX

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | TS | | | | | | | | | | | | | | | |
| Mode | R | | | | | | | | | | | | | | | |
| Initial Value | 0xXXXXXX | | | | | | | | | | | | | | | |

Bit 23:0 TS: Current TBU time stamp 1.
Bit 31:24 N.A.

Register TBU_TS2

Address Offset: 0xE

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | N.A. | | | | | | | | TS | | | | | | | |
| Mode | | | | | | | | | R | | | | | | | |
| Initial Value | | | | | | | | | 0xXXXXXX | | | | | | | |

Initial Value: 0xXXXXXX

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | TS | | | | | | | | | | | | | | | |
| Mode | R | | | | | | | | | | | | | | | |
| Initial Value | 0xXXXXXX | | | | | | | | | | | | | | | |

Bit 23:0 TS: Current TBU time stamp 2.
Bit 31:24 N.A.

MCS Configuration Registers

This section describes the configuration registers of the MCS sub module.

These registers can only be accessed by the CPU using AEI, but not within the MCS-channel using MCS instructions.

MCS Configuration Registers Overview

The table describes the MCS registers that are visible and accessible by the CPU:

| Register Name | Description | Details in Section |
|---|---|---|
| MCS[i]_CH[x]_CTRL | MCS Channel control register (x: 0 . . . 7) | 0 |
| MCS[i]_CH[x]_ACB | MCS Channel ACB register (x: 0 . . . 7) | 0 |
| MCS[i]_CH[x]_PC | MCS Channel Program counter register (x: 0 . . . 7) | 0 |
| MCS[i]_CH[x]_R[y] | MCS Channel GPRx registers (x: 0 . . . 7; y: 0 . . . 7) | 0 |
| MCS[i]_CH[x]_IRQ_NOTIFY | MCS Channel x interrupt notification register (x: 0 . . . 7) | 0 |
| MCS[i]_CH[x]_IRQ_EN | MCS Channel x interrupt enable register (x: 0 . . . 7) | 0 |
| MCS[i]_CH[x]_IRQ_FORCINT | MCS Channel x software interrupt generation register (x: 0 . . . 7) | 0 |
| MCS[i]_CH[x]_IRQ_MODE | IRQ mode configuration register (x = 0 . . . .7) | 0 |
| MCS[i]_CTRL | MCS Control register | 0 |
| MCS[i]_CTRG | MCS Clear trigger control register | 0 |
| MCS[i]_STRG | MCS Set trigger control register | 0 |
| MCS[i]_RST | MCS Channel reset register | 0 |
| MCS[i]_ERR | MCS Error register | 0 |

Register MCS[i]_CH[x]_CTRL (x: 0 . . . 7)

| | Address Offset: 0x00 + x*0x80 | Initial Value: 0x00000000 |
|---|---|---|
| | 31 30 29 28 27 26 25 24 23 22 21 20 19 18 17 16 15 14 13 12 11 | |
| Bit | Reserved | |
| Mode | R | |
| Initial Value | 0x0000 | |

Initial Value: 0x00000000

| | 10 | 9 | 8 | 7 | 6 | 5 | 4 | 3 | 2 | 1 | 0 |
|---|---|---|---|---|---|---|---|---|---|---|---|
| Bit | | SP_CNT | | N | V | Z | CY | Reserved | ERR | IRQ | EN |
| Mode | | R | | R | R | R | R | R | R | R | RW |
| Initial Value | | 000 | | 0 | 0 | 0 | 0 | 0 | 0 | 0 | 0 |

Bit 0 EN: Enable MCS-channel

0: Disable current MCS-channel.

1: Enable current MCS-channel.

Note: Enabling or disabling of an MCS-channel may take several clock cycles, e.g. active memory transfers have to be finished before disabling the MCS-channel. The internal state of a channel can be obtained by reading the bit EN.

Bit 1 IRQ: Interrupt state.

0: No interrupt pending in MCS-channel x.

1: Interrupt is pending in MCS-channel x.

Note: This bit is read only and it mirrors the internal IRQ state.

Bit 2 ERR: Error state.

0: No error signal pending in MCS-channel x.

1: Error signal is pending in MCS-channel x.

Note: This bit is read only and it mirrors the internal error state.

Bit 3 Reserved: Read as zero, should be written as zero.

Bit 4 CY: Carry bit state.

Note: This bit is read only and it mirrors the internal carry flag CY.

Bit 5 Z: Zero bit state.

Note: This bit is read only and it mirrors the internal zero flag Z.

Bit 6 V: Overflow bit state.

Note: This bit is read only and it mirrors the internal carry flag V.

Bit 7 N: Negative bit state.

Note: This bit is read only and it mirrors the internal zero flag N.

Bit 10:8 SP_CNT: Stack pointer counter value. Actual stack depth of instruction execution for channel. The bit field is incremented on behalf of a CALL or PUSH instruction and decremented on behalf of a RET or POP instruction. The MCS channel STK_ERR_IRQ is raised, when an overflow or underflow is detected on this bit field.

Bit 31:11 Reserved: Read as zero, should be written as zero.

Register MCS[i]_CH[x]_PC (x: 0 . . . 7)

| | Address Offset: 0x04 + x*0x80 | | | | | | | | | | | | | | | | Initial Value: 0x00000000 + 4*x | | | |
|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 |
| Bit | Reserved | | | | | | | | | | | | | | | | | | | |
| Mode | R | | | | | | | | | | | | | | | | | | | |
| Initial Value | 0x000 | | | | | | | | | | | | | | | | | | | |

| | Initial Value: 0x00000000 + 4*x | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| Bit | PC | | | | | | | | | | | |
| Mode | RPw | | | | | | | | | | | |
| Initial Value | 0x000000 + 4*x | | | | | | | | | | | |

Bit 11:0 PC: Current Program Counter.
Note: The program counter is only writable if the corresponding MCS-channel is disabled. The bits 0 and 1 are always written as zeros.
Bit 31:12 Reserved: Read as zero, should be written as zero.

Register MCS[i]_CH[x]_R[y] (x: 0 . . . 7, y: 0 . . . 7)

| | Address Offset: 0x08 + x*0x80 + y*0x04 | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Bit | Reserved | | | | | | | | DATA | | | | | | | |
| Mode | R | | | | | | | | RW | | | | | | | |
| Initial Value | 0x00 | | | | | | | | 0x000000 | | | | | | | |

| | Initial Value: 4*x | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Bit | DATA | | | | | | | | | | | | | | | |
| Mode | RW | | | | | | | | | | | | | | | |
| Initial Value | 0x000000 | | | | | | | | | | | | | | | |

Bit 23:0
DATA: Data of MCS general purpose register R[y].
Bit 31:24
Reserved: Read as zero, should be written as zero.
Note:
This register is the same as described in 0.

Register MCS[i]_CH[x]_ACB (x: 0 . . . 7)

| | Address Offset: 0x28 + x*0x80 | | | | | | | | | | | | | | | | Initial Value: 0x0001FE00 | | | | |
|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 | 11 |
| Bit | Reserved | | | | | | | | | | | | | | | | ARU_ADDR | | | | |
| Mode | R | | | | | | | | | | | | | | | | R | | | | |
| Initial Value | 0x0000 | | | | | | | | | | | | | | | | 0x1FE | | | | |

| | Initial Value: 0x0001FE00 | | | | | | | | | | |
|---|---|---|---|---|---|---|---|---|---|---|---|
| | 10 | 9 | 8 | 7 | 6 | 5 | 4 | 3 | 2 | 1 | 0 |
| Bit | ARU_ADDR | | | Reserved | | | ACB4 | ACB3 | ACB2 | ACB1 | ACB0 |
| Mode | R | | | R | | | R | R | R | R | R |

-continued

| Register MCS[i]_CH[x]_ACB (x: 0 . . . 7) | | | | | | | |
|---|---|---|---|---|---|---|---|
| Initial Value | 0x1FE | 000 | 0 | 0 | 0 | 0 | 0 |

Bit 0 ACB0: ARU Control bit 0.
Note: This bit is read only and it mirrors the internal state.
Bit 1 ACB1: ARU Control bit 1.
Note: This bit is read only and it mirrors the internal state.
Bit 2 ACB2: ARU Control bit 2.
Note: This bit is read only and it mirrors the internal state.
Bit 3 ACB3: ARU Control bit 3.
Note: This bit is read only and it mirrors the internal state.
Bit 4 ACB4: ARU Control bit 4.
Note: This bit is read only and it mirrors the internal state.
Bit 7:5 Reserved: Read as zero, should be written as zero.
Bit 16:8 ARU_ADDR: ARU Read/Write address. Bit field defines the ARU read address or the write address index for the MCS indirect ARU read/write instructions ARDI, ARDLI, ARDHI and AWRI
Bit 31:17 Reserved: Read as zero, should be written as zero.

| Register MCS[i]_CH[x]_IRQ_NOTIFY (x: 0 . . . 7) | |
|---|---|
| | Address Offset: 0x2C + x*0x80 — Initial Value: 0x0000_0000 |
| | 31 30 29 28 27 26 25 24 23 22 21 20 19 18 17 16 15 14 13 12 11 |
| Bit | Reserved |
| Mode | R |
| Initial Value | 0x00000000 |

| | Initial Value: 0x0000_0000 | | | |
|---|---|---|---|---|
| | 10 9 8 7 6 5 4 3 | 2 | 1 | 0 |
| Bit | Reserved | MEM_ERR_IRQ | STK_ERR_IRQ | MCS_IRQ |
| Mode | R | RCw | RCw | RCw |
| Initial Value | 0x00000000 | 0 | 0 | 0 |

Bit 0 MCS_IRQ: Interrupt request by MCS-channel x.
0 = No IRQ released
1 = IRQ released by MCS-channel
Note: This bit will be cleared on a CPU write access with a value '1'. A read access leaves the bit unchanged.
Note: By writing a '1' to this register, the IRQ flag in the MCS channel status register STA is cleared.
Bit 1 STK_ERR_IRQ: Stack counter overflow/underflow of channel x.
0 = No IRQ released
1 = A stack counter overflow or underflow occurred
Note: This bit will be cleared on a CPU write access with a value '1'. A read access leaves the bit unchanged.
Bit 2 MEM_ERR_IRQ: Memory access out of range in channel x.
0 = No IRQ released
1 = MCS-channel request a memory location out of range 0 to MP1-4.
Note: This bit will be cleared on a CPU write access with a value '1'. A read access leaves the bit unchanged.
Note: The actual RAM access is performed with modulo addressing (calculating address mod MP1).
Bit 31:3 Reserved: Read as zero, should be written as zero.

| Register MCS[i]_CH[x]_IRQ_EN (x: 0 . . . 7) | |
|---|---|
| | Address Offset: 0x30 + x*0x80 — Initial Value: 0x00000000 |
| | 31 30 29 28 27 26 25 24 23 22 21 20 19 18 17 16 15 14 13 12 11 10 9 |
| Bit | Reserved |
| Mode | R |
| Initial Value | 0x0000000 |

-continued

| Register MCS[i]_CH[x]_IRQ_EN (x: 0 . . . 7) | | | | |
|---|---|---|---|---|
| | Initial Value: 0x00000000 | | | |
| | 8 7 6 5 4 3 | 2 | 1 | 0 |
| Bit | Reserved | MEM_ERR_IRQ_EN | STK_ERR_IRQ_EN | MCS_IRQ_EN |
| Mode | R | RW | RW | RW |
| Initial Value | 0x0000000 | 0 | 0 | 0 |

Bit 0 MCS_IRQ_EN: MCS channel x MCS_IRQ interrupt enable
0 = Disable interrupt, interrupt is not visible outside GTM-IP
1 = Enable interrupt, interrupt is visible outside GTM-IP
Bit 1 STK_ERR_IRQ_EN: MCS channel x STK_ERR_IRQ interrupt enable
0 = Disable interrupt, interrupt is not visible outside GTM-IP
1 = Enable interrupt, interrupt is visible outside GTM-IP
Bit 2 MEM_ERR_IRQ_EN: MCS channel x MEM_ERR_IRQ interrupt enable
0 = Disable interrupt, interrupt is not visible outside GTM-IP
1 = Enable interrupt, interrupt is visible outside GTM-IP
Bit 31:3 Reserved: Read as zero, should be written as zero.

| Register MCS[i]_CH[x]_IRQ_FORCINT (x: 0 . . . 7) | | |
|---|---|---|
| | Address Offset: 0x34 + x*0x80 | Initial Value: 0x00000000 |
| | 31 30 29 28 27 26 25 24 23 22 21 20 19 18 17 16 | 15 14 13 12 11 10 9 8 7 |
| Bit | Reserved | |
| Mode | R | |
| Initial Value | 0x000000 | |

| Initial Value: 0x00000000 | | | | |
|---|---|---|---|---|
| | 6 5 4 3 | 2 | 1 | 0 |
| Bit | Reserved | TRG_MEM_ERR_IRQ | TRG_STK_ERR_IRQ | TRG_MCS_IRQ |
| Mode | R | RAw | RAw | RAw |
| Initial Value | 0x000000 | 0 | 0 | 0 |

Bit 0 TRG_MCS_IRQ: Trigger IRQ bit in MCS_CH_[x]_IRQ_NOTIFY register by software
0 = No interrupt triggering
1 = Assert corresponding field in MCS[i]_CH[x]_IRQ_NOTIFY register
Note: This bit is cleared automatically after write.
Bit 1 TRG_STK_ERR_IRQ: Trigger IRQ bit in MCS_CH_[x]_IRQ_NOTIFY register by software
0 = No interrupt triggering
1 = Assert corresponding field in MCS[i]_CH[x]_IRQ_NOTIFY register
Bit 2 TRG_MEM_ERR_IRQ: Trigger IRQ bit in MCS_CH_[x]_IRQ_NOTIFY register by software
0 = No interrupt triggering
1 = Assert corresponding field in MCS[i]_CH[x]_IRQ_NOTIFY register
Note: This bit is cleared automatically after write.
Bit 31:3 Reserved: Read as zero, should be written as zero.

| Register MCS[i]_CH[x]_IRQ_MODE (x: 0 . . . 7) | |
|---|---|
| | Address Offset: 0x38 + x*0x80 |
| | 31 30 29 28 27 26 25 24 23 22 21 20 19 18 17 16 |
| Bit | Reserved |
| Mode | R |
| Initial Value | 0x00000000 |

-continued

Register MCS[i]_CH[x]_IRQ_MODE (x: 0 . . . 7)

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | | | | | | | Reserved | | | | | | | | IRQ_MODE | |
| Mode | | | | | | | R | | | | | | | | RW | |
| Initial Value | | | | | | | 0x00000000 | | | | | | | | 00 | |

Bit 1:0 IRQ_MODE: IRQ mode selection
00 = Level mode
01 = Pulse mode
10 = Pulse-Notify mode
11 = Single-Pulse mode
Note: The interrupt modes are described in section 0.
Bit 31:2 Reserved
Note: Read as zero, should be written as zero Register MCS[i]_CTRL Address Offset: 0x400 Initial Value: 0x0000_0000

| | 31 | 30 | 29 | 28 | 27 | 26 | 25 | 24 | 23 | 22 | 21 | 20 | 19 | 18 | 17 | 16 | 15 | 14 | 13 | 12 | 11 |
|---|---|---|---|---|---|---|---|---|---|---|---|---|---|---|---|---|---|---|---|---|---|
| Bit | | | | | | | | | | | Reserved | | | | | | | | | | |
| Mode | | | | | | | | | | | R | | | | | | | | | | |
| Initial Value | | | | | | | | | | | 0x000000 | | | | | | | | | | |

Initial Value: 0x0000_0000

| | 10 | 9 | 8 | 7 | 6 | 5 | 4 | 3 | 2 | 1 | 0 |
|---|---|---|---|---|---|---|---|---|---|---|---|
| Bit | | | | | Reserved | | | | | HLT_SP_OFL | SCHED |
| Mode | | | | | R | | | | | RW | RW |
| Initial Value | | | | | 0x000000 | | | | | 0 | 0 |

Bit 0 SCHED: MCS sub module scheduling scheme
0 = Accelerated scheduling scheme.
1 = Round-Robin scheduling scheme.
Bit 1 HLT_SP_OFL: Halt on stack pointer overflow.
0 = No halt on MCS-channel halt on stack pointer counter over/underflow.
1 = MCS-channel is disabled if a stack pointer counter over/underflow occurs.
Note: Bit 31:2
Reserved: Read as zero, should be written as zero.

Register MCS[i]_CTRG

Address Offset: 0x404 Initial Value: 0x0000_0000

| | 31 | 30 | 29 | 28 | 27 | 26 | 25 | 24 | 23 | 22 | 21 | 20 | 19 | 18 | 17 | 16 | 15 | 14 | 13 | 12 | 11 |
|---|---|---|---|---|---|---|---|---|---|---|---|---|---|---|---|---|---|---|---|---|---|
| Bit | | | | | | | | Reserved | | | | | | | | | TRG15 | TRG14 | TRG13 | TRG12 | TRG11 |
| Mode | | | | | | | | R | | | | | | | | | RW | RW | RW | RW | RW |
| Initial Value | | | | | | | | 0x000000 | | | | | | | | | 0 | 0 | 0 | 0 | 0 |

Initial Value: 0x0000_0000

| | 10 | 9 | 8 | 7 | 6 | 5 | 4 | 3 | 2 | 1 | 0 |
|---|---|---|---|---|---|---|---|---|---|---|---|
| Bit | TRG10 | TRG9 | TRG8 | TRG7 | TRG6 | TRG5 | TRG4 | TRG3 | TRG2 | TRG1 | TRG0 |
| Mode | RW | RW | RW | RW | RW | RW | RW | RW | RW | RW | RW |

-continued

| Register MCS[i]_CTRG | | | | | | | | | | | |
|---|---|---|---|---|---|---|---|---|---|---|---|
| Initial Value | 0 | 0 | 0 | 0 | 0 | 0 | 0 | 0 | 0 | 0 | 0 |

Bit 0 TRG0: trigger bit 0.
0: READ: trigger bit is cleared/WRITE: do nothing
1: READ: trigger bit is set/WRITE: clear trigger bit
Bit 1 TRG1: trigger bit 1.
0: READ: trigger bit is cleared/WRITE: do nothing
1: READ: trigger bit is set/WRITE: clear trigger bit
Bit 2 TRG2: trigger bit 2.
0: READ: trigger bit is cleared/WRITE: do nothing
1: READ: trigger bit is set/WRITE: clear trigger bit
Bit 3 TRG3: trigger bit 3.
0: READ: trigger bit is cleared/WRITE: do nothing
1: READ: trigger bit is set/WRITE: clear trigger bit
Bit 4 TRG4: trigger bit 4.
0: READ: trigger bit is cleared/WRITE: do nothing
1: READ: trigger bit is set/WRITE: clear trigger bit
Bit 5 TRG5: trigger bit 5.
0: READ: trigger bit is cleared/WRITE: do nothing
1: READ: trigger bit is set/WRITE: clear trigger bit
Bit 6 TRG6: trigger bit 6.
0: READ: trigger bit is cleared/WRITE: do nothing
1: READ: trigger bit is set/WRITE: clear trigger bit
Bit 7 TRG7: trigger bit 7.
0: READ: trigger bit is cleared/WRITE: do nothing
1: READ: trigger bit is set/WRITE: clear trigger bit
Bit 8 TRG8: trigger bit 8.
0: READ: trigger bit is cleared/WRITE: do nothing
1: READ: trigger bit is set/WRITE: clear trigger bit
Bit 9 TRG: trigger bit 9.
0: READ: trigger bit is cleared/WRITE: do nothing
1: READ: trigger bit is set/WRITE: clear trigger bit
Bit 10 TRG10: trigger bit 10.
0: READ: trigger bit is cleared/WRITE: do nothing
1: READ: trigger bit is set/WRITE: clear trigger bit
Bit 11 TRG11: trigger bit 11.
0: READ: trigger bit is cleared/WRITE: do nothing
1: READ: trigger bit is set/WRITE: clear trigger bit
Bit 12 TRG12: trigger bit 12.
0: READ: trigger bit is cleared/WRITE: do nothing
1: READ: trigger bit is set/WRITE: clear trigger bit
Bit 13 TRG13: trigger bit 13.
0: READ: trigger bit is cleared/WRITE: do nothing
1: READ: trigger bit is set/WRITE: clear trigger bit
Bit 14 TRG14: trigger bit 14.
0: READ: trigger bit is cleared/WRITE: do nothing
1: READ: trigger bit is set/WRITE: clear trigger bit
Bit 15 TRG15: trigger bit 15.
0: READ: trigger bit is cleared/WRITE: do nothing
1: READ: trigger bit is set/WRITE: clear trigger bit
Note: The trigger bits TRGx (x = 0 . . . 15) are accessible by all MCS channels as well as the CPU. Setting a trigger bit can be performed with the STRG register, in the case of an MCS-channel or the MCS[i]_STRG register in the case of the CPU. Clearing a trigger bit can be performed with the CTRG register, in the case of an MCS-channel or the MCS[i]_CTRG register in the case of the CPU. Trigger bits can be used for signalizing specific events to MCS-channels or the CPU. An MCS-channel suspended with a WTRG instruction can be resumed by setting the appropriate trigger bit.
Bit 31:16 Reserved: Read as zero, should be written as zero.

| Register MCS[i]_STRG | | | | | |
|---|---|---|---|---|---|
| | Address Offset: 0x408 | Initial Value: 0x0000_0000 | | | |
| | 31 30 29 28 27 26 25 24 23 22 21 20 19 18 17 16 | 15 | 14 | 13 | 12 |
| Bit | Reserved | TRG15 | TRG14 | TRG13 | TRG12 |
| Mode | R | RW | RW | RW | RW |
| Initial Value | 0x000000 | 0 | 0 | 0 | 0 |

| | Initial Value: 0x0000_0000 | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| Bit | TRG11 | TRG10 | TRG9 | TRG8 | TRG7 | TRG6 | TRG5 | TRG4 | TRG3 | TRG2 | TRG1 | TRG0 |
| Mode | RW | RW | RW | RW | RW | RW | RW | RW | RW | RW | RW | RW |

-continued

| Register MCS[i]_STRG | | | | | | | | | | | | |
|---|---|---|---|---|---|---|---|---|---|---|---|---|
| Initial Value | 0 | 0 | 0 | 0 | 0 | 0 | 0 | 0 | 0 | 0 | 0 | 0 |

Bit 0 TRG0: trigger bit 0.
0: READ: trigger bit is cleared/WRITE: do nothing
1: READ: trigger bit is set/WRITE: set trigger bit
Bit 1 TRG1: trigger bit 1.
0: READ: trigger bit is cleared/WRITE: do nothing
1: READ: trigger bit is set/WRITE: set trigger bit
Bit 2 TRG2: trigger bit 2.
0: READ: trigger bit is cleared/WRITE: do nothing
1: READ: trigger bit is set/WRITE: set trigger bit
Bit 3 TRG3: trigger bit 3.
0: READ: trigger bit is cleared/WRITE: do nothing
1: READ: trigger bit is set/WRITE: set trigger bit
Bit 4 TRG4: trigger bit 4.
0: READ: trigger bit is cleared/WRITE: do nothing
1: READ: trigger bit is set/WRITE: set trigger bit
Bit 5 TRG5: trigger bit 5.
0: READ: trigger bit is cleared/WRITE: do nothing
1: READ: trigger bit is set/WRITE: set trigger bit
Bit 6 TRG6: trigger bit 6.
0: READ: trigger bit is cleared/WRITE: do nothing
1: READ: trigger bit is set/WRITE: set trigger bit
Bit 7 TRG7: trigger bit 7.
0: READ: trigger bit is cleared/WRITE: do nothing
1: READ: trigger bit is set/WRITE: set trigger bit
Bit 8 TRG8: trigger bit 8.
0: READ: trigger bit is cleared/WRITE: do nothing
1: READ: trigger bit is set/WRITE: set trigger bit
Bit 9 TRG: trigger bit 9.
0: READ: trigger bit is cleared/WRITE: do nothing
1: READ: trigger bit is set/WRITE: set trigger bit
Bit 10 TRG10: trigger bit 10.
0: READ: trigger bit is cleared/WRITE: do nothing
1: READ: trigger bit is set/WRITE: set trigger bit
Bit 11 TRG11: trigger bit 11.
0: READ: trigger bit is cleared/WRITE: do nothing
1: READ: trigger bit is set/WRITE: set trigger bit
Bit 12 TRG12: trigger bit 12.
0: READ: trigger bit is cleared/WRITE: do nothing
1: READ: trigger bit is set/WRITE: set trigger bit
Bit 13 TRG13: trigger bit 13.
0: READ: trigger bit is cleared/WRITE: do nothing
1: READ: trigger bit is set/WRITE: set trigger bit
Bit 14 TRG14: trigger bit 14.
0: READ: trigger bit is cleared/WRITE: do nothing
1: READ: trigger bit is set/WRITE: set trigger bit
Bit 15 TRG15: trigger bit 15.
0: READ: trigger bit is cleared/WRITE: do nothing
1: READ: trigger bit is set/WRITE: set trigger bit
Note: The trigger bits TRGx (x = 0 . . . 15) are accessible by all MCS channels as well as the CPU. Setting a trigger bit can be performed with the STRG register, in the case of an MCS-channel or the MCS[i]_STRG register in the case of the CPU. Clearing a trigger bit can be performed with the CTRG register, in the case of an MCS-channel or the MCS[i]_CTRG register in the case of the CPU.Trigger bits can be used for signalizing specific events to MCS-channels or the CPU. An MCS-channel suspended with a WTRG instruction can be resumed by setting the appropriate trigger bit.
Bit 31:16 Reserved: Read as zero, should be written as zero.

| Register MCS[i]_RST | | | | | | | | | | | | | | | | | | |
|---|---|---|---|---|---|---|---|---|---|---|---|---|---|---|---|---|---|---|
| | Address Offset: 0x40C | | | | | | | | | | | | | | | | Initial Value: 0x0000_0000 | |
| | 31 | 30 | 29 | 28 | 27 | 26 | 25 | 24 | 23 | 22 | 21 | 20 | 19 | 18 | 17 | 16 | 15 | 14 |
| Bit | Reserved | | | | | | | | CWT7 | CWT6 | CWT5 | CWT4 | CWT3 | CWT2 | CWT1 | CWT0 | CAT7 | CAT6 |
| Mode | R | | | | | | | | RAc | RAc | RAc | RAc | RAc | RAc | RAc | RAc | RAc | RAc |
| Initial Value | 0x000000 | | | | | | | | 0 | 0 | 0 | 0 | 0 | 0 | 0 | 0 | 0 | 0 |

-continued

| Register MCS[i]_RST | | | | | | | | | | | | | | |
|---|---|---|---|---|---|---|---|---|---|---|---|---|---|---|
| | Initial Value: 0x0000_0000 | | | | | | | | | | | | | |
| | 13 | 12 | 11 | 10 | 9 | 8 | 7 | 6 | 5 | 4 | 3 | 2 | 1 | 0 |
| Bit | CAT5 | CAT4 | CAT3 | CAT2 | CAT1 | CAT0 | RST7 | RST6 | RST5 | RST4 | RST3 | RST2 | RST1 | RST0 |
| Mode | RAc | RAc | RAc | RAc | RAc | RAc | RAw | RAw | RAw | RAw | RAw | RAw | RAw | RAw |
| Initial Value | 0 | 0 | 0 | 0 | 0 | 0 | 0 | 0 | 0 | 0 | 0 | 0 | 0 | 0 |

Bit 0 RST0: Software reset of channel 0
0 = No action
1 = Reset channel
Bit 1 RST1: Software reset of channel 1
0 = No action
1 = Reset channel
Bit 2 RST2: Software reset of channel 2
0 = No action
1 = Reset channel
Bit 3 RST3: Software reset of channel 3
0 = No action
1 = Reset channel
Bit 4 RST4: Software reset of channel 4
0 = No action
1 = Reset channel
Bit 5 RST5: Software reset of channel 5
0 = No action
1 = Reset channel
Bit 6 RST6: Software reset of channel 6
0 = No action
1 = Reset channel
Bit 7 RST7: Software reset of channel 7
0 = No action
1 = Reset channel
Note: The RSTx (x = 0 . . . 7) bits is cleared automatically after write access of CPU. All channel related registers are set to their reset values and channel operation is stopped immediately.
Bit 8 CAT0: Cancel ARU transfer for channel 0.
0 = Do nothing.
1 = Cancel any pending ARU read or write transfer.
Bit 9 CAT1: Cancel ARU transfer for channel 1.
0 = Do nothing.
1 = Cancel any pending ARU read or write transfer.
Bit 10 CAT2: Cancel ARU transfer for channel 2.
0 = Do nothing.
1 = Cancel any pending ARU read or write transfer.
Bit 11 CAT3: Cancel ARU transfer for channel 3.
0 = Do nothing.
1 = Cancel any pending ARU read or write transfer.
Bit 12 CAT4: Cancel ARU transfer for channel 4.
0 = Do nothing.
1 = Cancel any pending ARU read or write transfer.
Bit 13 CAT5: Cancel ARU transfer for channel 5.
0 = Do nothing.
1 = Cancel any pending ARU read or write transfer.
Bit 14 CAT6: Cancel ARU transfer for channel 6.
0 = Do nothing.
1 = Cancel any pending ARU read or write transfer.
Bit 15 CAT7: Cancel ARU transfer for channel 7.
0 = Do nothing.
1 = Cancel any pending ARU read or write transfer.
Note: The CAT bit inside the STA register of the corresponding MCS-channel is set and any pending ARU read or write request is immediately stopped. The MCS-channel resumes with the instruction after the ARU transfer instruction. In case of any other instruction nothing is done by the channel and the CAT bit inside the STA register remains unchanged.
Bit 16 CWT0: Cancel WTRG instruction for channel 0.
0 = Do nothing.
1 = Cancel any pending WTRG instruction.
Bit 17 CWT1: Cancel WTRG instruction for channel 1.
0 = Do nothing.
1 = Cancel any pending WTRG instruction.
Bit 18 CWT2: Cancel WTRG instruction for channel 2.
0 = Do nothing.
1 = Cancel any pending WTRG instruction.
Bit 19 CWT3: Cancel WTRG instruction for channel 3.
0 = Do nothing.
1 = Cancel any pending WTRG instruction.
Bit 20 CWT4: Cancel WTRG instruction for channel 4.
0 = Do nothing.
1 = Cancel any pending WTRG instruction.
Bit 21 CWT5: Cancel WTRG instruction for channel 5.
0 = Do nothing.
1 = Cancel any pending WTRG instruction.

-continued

| Register MCS[i]_RST |
|---|
| Bit 22 CWT6: Cancel WTRG instruction for channel 6.<br>0 = Do nothing.<br>1 = Cancel any pending WTRG instruction.<br>Bit 23 CWT7: Cancel WTRG instruction for channel 7.<br>0 = Do nothing.<br>1 = Cancel any pending WTRG instruction.<br>Note: Any pending WTRG instruction of the corresponding channel is immediately cancelled and the MCS-channel resumes with the instruction after the WTRG instruction. In case of any other instruction nothing is done by the channel.<br>Bit 31:24 Reserved: Read as zero, should be written as zero. |

Register MCS[i]_ERR

| | Address Offset: 0x410 | | | | | | | | | | | | | | | | Initial Value: 0x00000000 | | | |
|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 | 14 | 13 | 12 |
| Bit | Reserved | | | | | | | | | | | | | | | | | | | |
| Mode | R | | | | | | | | | | | | | | | | | | | |
| Initial Value | 0x0000 | | | | | | | | | | | | | | | | | | | |

| | Initial Value: 0x00000000 | | | | | | | | | | | |
|---|---|---|---|---|---|---|---|---|---|---|---|---|
| | 11 | 10 | 9 | 8 | 7 | 6 | 5 | 4 | 3 | 2 | 1 | 0 |
| Bit | Reserved | | | | ERR7 | ERR6 | ERR5 | ERR4 | ERR3 | ERR2 | ERR1 | ERR0 |
| Mode | R | | | | RCw | RCw | RCw | RCw | RCw | RCw | RCw | RCw |
| Initial Value | 0x0000 | | | | 0 | 0 | 0 | 0 | 0 | 0 | 0 | 0 |

Bit 0 ERR0: Error State of MCS-channel 0.
0: No error signal.
1: Error signal is pending.
Bit 1 ERR1: Error State of MCS-channel 1.
0: No error signal.
1: Error signal is pending.
Bit 2 ERR2: Error State of MCS-channel 2.
0: No error signal.
1: Error signal is pending.
Bit 3
ERR : Error State of MCS-channel3.
0: No error signal.
1: Error signal is pending.
Bit 4
ERR : Error State of MCS-channel 4.
0: No error signal.
1: Error signal is pending.
Bit 5
ERR : Error State of MCS-channel 5.
0: No error signal.
1: Error signal is pending.
Bit 6 ERR6: Error State of MCS-channel 6.
0: No error signal.
1: Error signal is pending.
Bit 7 ERR7: Error State of MCS-channel 7.
0: No error signal.
1: Error signal is pending.
Note: The CPU can read the ERRx (x = 0 . . . 7) bits in order to determine the current error state of the corresponding MCS-channel x. The error state is also evaluated by the module MON.
Note: Writing a value 1 to this bit resets the corresponding error state and resets the channel internal ERR bit in the STA and channel CTRL registers.
Bit 31:8 Reserved: Reserved
Note: Read as zero, should be written as zero Memory Configuration (MCFG)

Overview

The Memory Configuration sub module (MCFG) is an infrastructure module that organizes physical memory blocks and maps them to the instances of Multi Channel Sequencer (MCS) sub modules.

The default configuration maps a memory of size 1K*32 bit=4 KB to MCS memory page 0 and a memory of size 0.5K*32 bit=2 KB to MCS memory page 1.

Figures 42, 43:
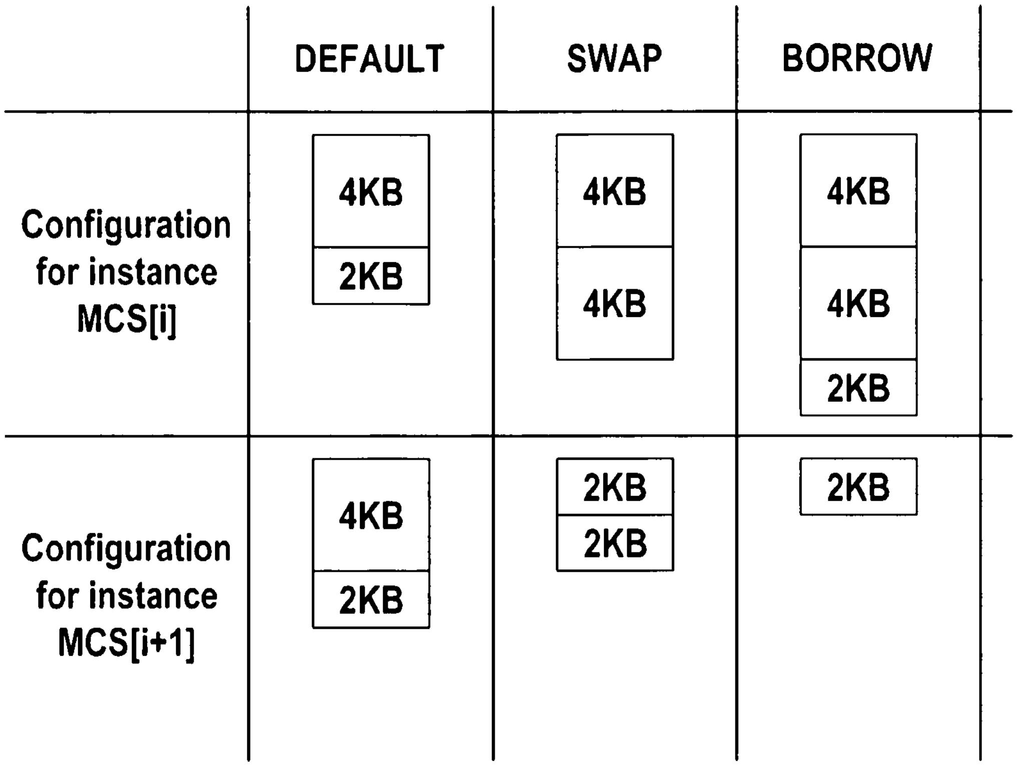

In order to support different memory size for different MCS instances, the MCFG module provides two additional layout options for reorganization of memory pages between neighbouring MCS modules. FIG. 42 shows all layout options.

The layout option SWAP is swapping the 2 KB memory page of the current MCS instance with the 4 KB memory page of the successive MCS instance. Thus the memory of the current MCS module is increased by 2 KB but the memory of the successor is decreased by 2 KB.

The layout option BORROW is borrowing the 4 KB memory page of the successive MCS instance for the current instance. Thus the memory of the current MCS module is increased by 4 KB but the memory of the successor is decreased by 4 KB.

It should be noted that the successor of the last MCS instance MCS3 is the first MCS instance MCS0.

Memory Layout Options

See FIG. 42.

Consequently, the actual size of the memory pages for an MCS instance depends on the layout configuration for the current instance MCS[i] and the layout configuration of the preceding memory instance MCS[i−1].

Table 0 summarizes the layout parameters MP0 and MP1 for MCS instance MCS[i].

The addressing of memory page 0 ranges from 0 to MP0-4 and the addressing of memory page 1 ranges from MP0 to MP1-4.

Memory Layout Parameters

See FIG. 43.

MCFG Configuration Registers

This section describes the configuration registers of the MCFG sub module.

| Register Name | Description | Details in Section |
|---|---|---|
| MCFG_CTRL | Memory layout configuration. | 0 |

Register MCFG_CTRL

Address Offset: 0x00

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | | | | | | | | | | | |
| Mode | R | | | | | | | | | | | | | | | |
| Initial Value | 0x000000 | | | | | | | | | | | | | | | |

Initial Value: 0x00000000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | Reserved | | | | | | | | MEM3 | | MEM2 | | MEM1 | | MEM0 | |
| Mode | R | | | | | | | | RW | | RW | | RW | | RW | |
| Initial Value | 0x000000 | | | | | | | | 00 | | 00 | | 00 | | 00 | |

Bit 1:0 MEM0: MCS-Memory 0
00: DEFAULT configuration
01: SWAP configuration
10: BORROW configuration
11: reserved
NOTE: Configure Memory pages for MCS-instance MCS0.
Bit 3:2 MEM1: MCS-Memory 1
00: DEFAULT configuration
01: SWAP configuration
10: BORROW configuration
11: reserved
NOTE: Configure Memory pages for MCS-instance MCS1.
Bit 5:4 MEM2: MCS-Memory 2
00: DEFAULT configuration
01: SWAP configuration
10: BORROW configuration
11: reserved
NOTE: Configure Memory pages for MCS-instance MCS2.
Bit 7:6 MEM3: MCS-Memory 3
00: DEFAULT configuration
01: SWAP configuration
10: BORROW configuration
11: reserved
NOTE: Configure Memory pages for MCS-instance MCS3.
Bit 31:8 Reserved: Read as zero, should be written as zero.

Interrupt Concentrator Module (ICM)

Overview

The Interrupt Concentrator Module (ICM) is used to bundle the GTM-IP interrupt lines of the individual sub modules in a reasonable manner into interrupt groups. By this bundling a smaller amount of interrupt lines is visible at the outside of the GTM-IP.

The individual interrupts of the GTM-IP sub modules and channels have to be enabled or disabled inside the sub modules and channels.

Chapter 0 shows the bundling for the three interrupt groups INFRA_IRQ_GPOUP and DPLL_IRQ_GROUP. However, there are more as these three interrupt groups present in the ICM.

ICM Interrupt Enable/Disable and Identification Principle

Figure 44:
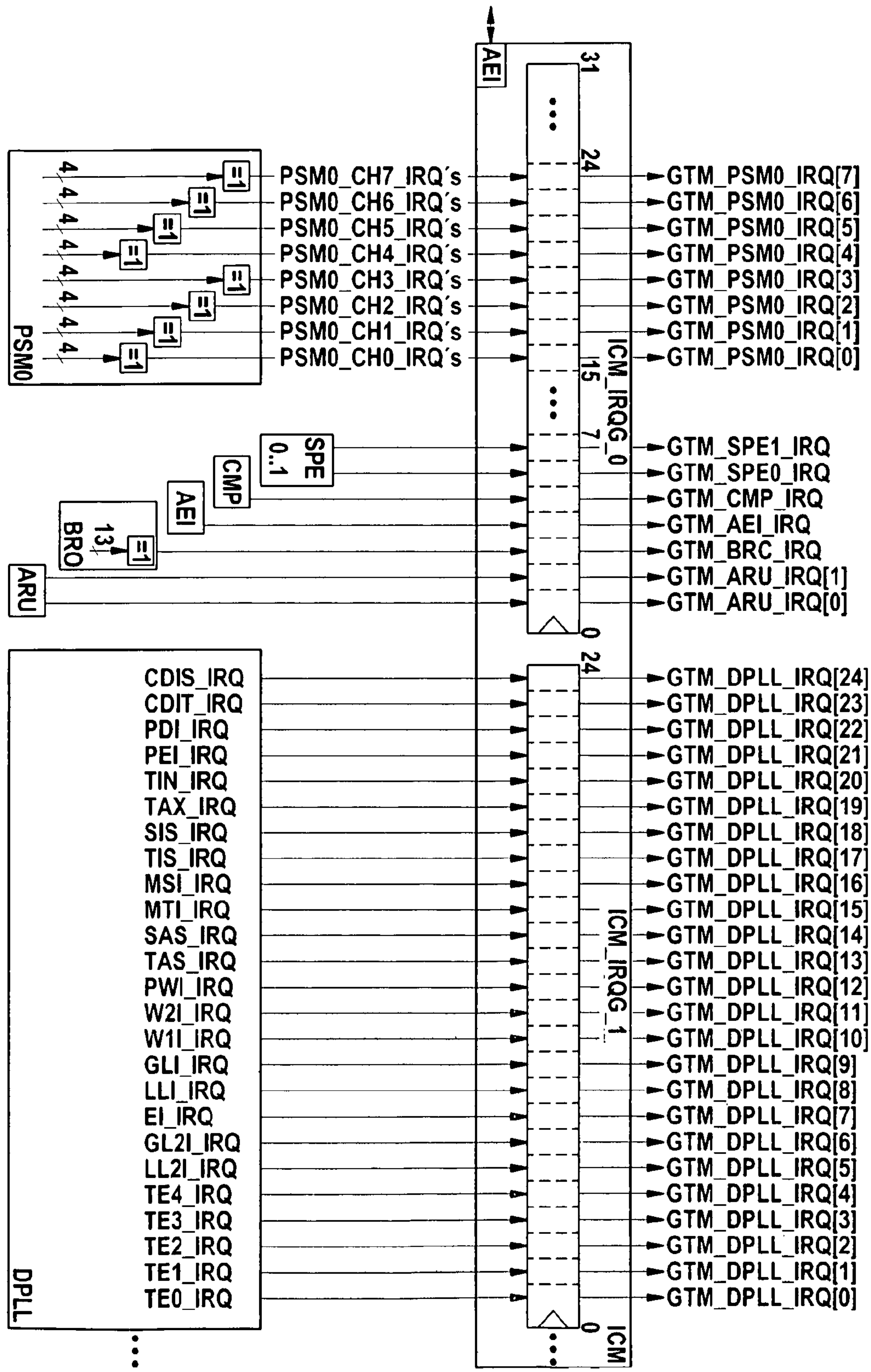

See FIG. 44.

As can be seen from the figure, some parts of the bundling are already done inside the sub modules themselves. While some of the bundled interrupt lines coming from the sub modules are directly feed through the ICM to the outside world, the ICM bundles other interrupt lines internally and forms one combined interrupt line for the external world.

The feed through architecture of bundled interrupt lines is used for the sub modules ARU, BRC, CMP, PSM, TIM, DPLL and MCS.

The interrupts coming from the TOM and ATOM sub modules are internally combined in the ICM.

In the first case, the microcontroller can determine the interrupt source channel directly via the active interrupt line. As shown in the chapter 0, the four interrupt lines of the individual PSM/FIFO channels are bundled into one external GTM-IP interrupt line PSMx_CHy_IRQ. The detailed interrupt of the PSM/FIFO channel has to be determined by accessing the corresponding FIFO_[x]_IRQ_NOTIFY register indicated by the ICM_IRQG_2 register bit or the interrupt PSMy_IRQ[x] respectively.

In the later case, the microcontroller is able to determine the interrupt source by reading out an ICM internal address first, to identify the sub module channel responsible for the interrupt and has then to read out the sub modules internal registers.

To determine the detailed interrupt source the microcontroller has to read the sub module/channel interrupt notification register NOTIFY and serve the channel individual interrupt.

Please note, that the interrupts are only visible inside the ICM and in consequence outside of the GTM-IP, when the interrupt is enabled inside the sub modules themselves.

ICM Interrupt Generation

The GTM-IP sub module individual interrupt sources are connected to the ICM. There, the individual interrupt lines are either feed through and signalled to the outside world or bundled a second time into groups and are then signalled to the outside world.

The ICM interrupt bundling is described in the following sections.

GTM Infrastructure Interrupt Bundling

The first interrupt group contains interrupts of the infrastructure and safety components of the GTM. This interrupt group includes therefore interrupt lines coming from the AEI, ARU, BRC, PSM, SPE and CMP sub modules. In this interrupt group each individual channel of the sub modules has its own interrupt line to the outside world.

Thus, the active interrupt line can be used by the CPU to determine the GTM-IP sub module channel that raised the interrupt. The interrupts are also represented in the ICM_IRQG_0 register, but this register is typically not read by the CPU.

DPLL Interrupt Bundling

The DPLL Interrupt group handles the interrupts coming from the DPLL sub module of the GTM-IP. Each of the individual DPLL interrupt lines has its own dedicated interrupt line to the outside world. The interrupts are additionally identified in the ICM_IRQG_1 interrupt group register, but this register is typically not read out by the CPU.

TIM Interrupt Bundling

Inside this group sub modules which handle GTM-IP input signals are treated. This is the case for the TIM sub modules. Each TIM sub module channel is able to generate six (6) individual interrupts if enabled inside the TIM channel. This six interrupts are bundled into one interrupt per TIM channel connected to the ICM.

The ICM does no further bundling. Thus, for the GTM-IP 40 interrupt lines TIMx_IRQ[y] are provided for the external microcontroller. The channel responsible for the interrupt can be determined by the raised interrupt line.

In addition, the ICM_IRQG_2 and ICM_IRQG_3 registers are a mirror for the TIM sub module channel interrupts.

MCS Interrupt Bundling

For complex signal output generation, the MCS sub modules are used inside the GTM-IP. Each of these MCS sub modules has eight channels with one interrupt line. This interrupt line is connected to the ICM sub module and is feed through directly to the outside world.

In addition the interrupt line status is shown in the ICM_IRQG_4 and ICM_IRQG_5 registers. Typically, the interrupt source is determined by the corresponding interrupt line and the ICM_IRQ4 and ICM_IRQ5 registers are never read out by the CPU.

TOM and ATOM Interrupt Bundling

For the TOM and ATOM sub modules, the interrupts are bundled within the ICM sub module a second time to reduce external interrupt lines. The interrupts are bundled in a manner that one GTM-IP external interrupt line represents two adjacent TOM or ATOM channel interrupts. For TOM0 and TOM1 the bundling is shown in chapter 0.

TOM0 and TOM1 Interrupt Bundling within ICM

Figure 45:
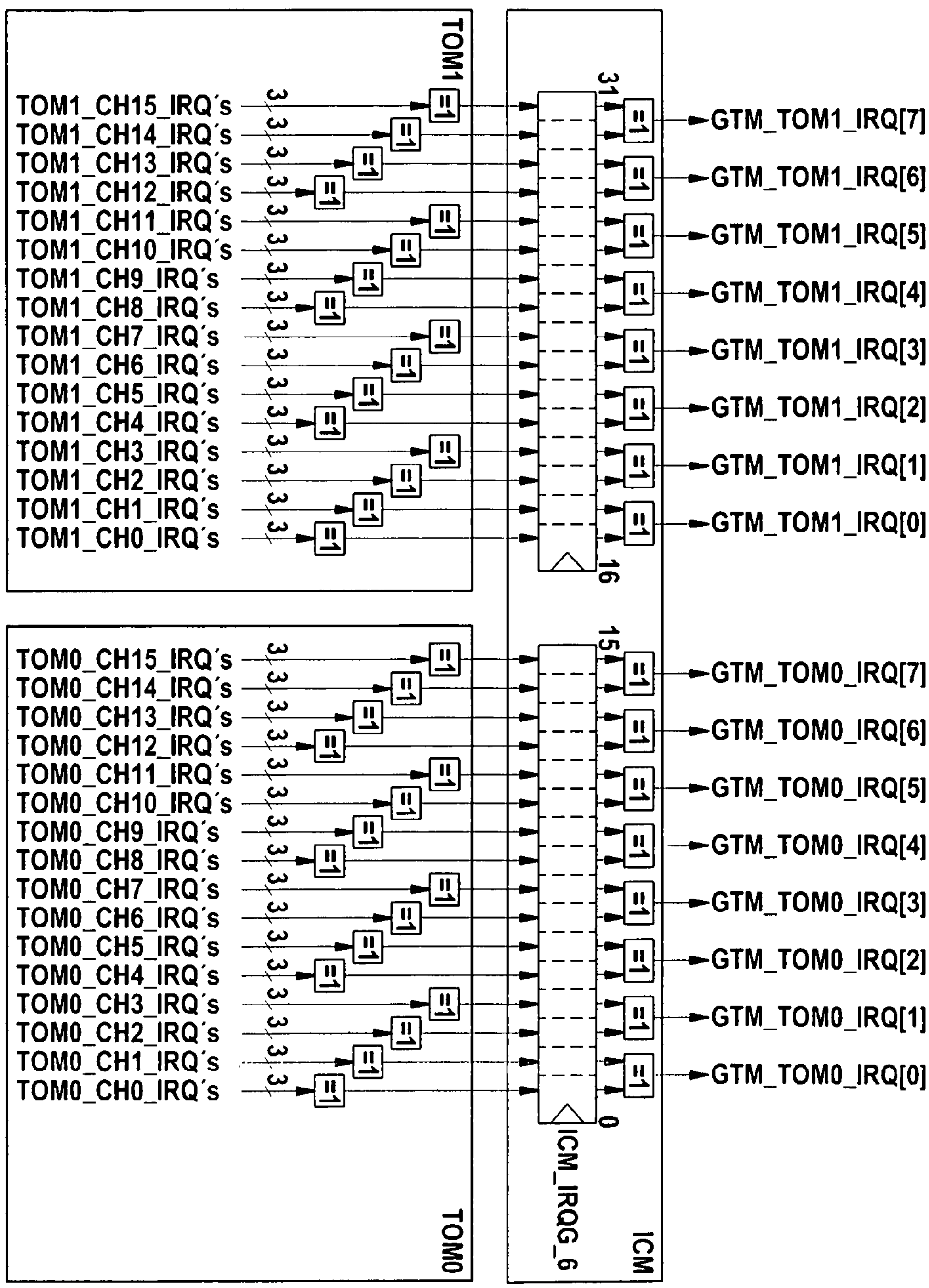

See FIG. 45.

The interrupts coming from the TOM0 and TOM1 sub modules are registered in the ICM_IRQG_6 register. To identify the TOM sub module channel where the interrupt occurred, the CPU has to read out the ICM_IRQG_6 register first before it goes to the TOM sub module channel itself.

The ICM_IRQG_6 register bits are cleared automatically, when their corresponding interrupt in the sub module channels is served.

ICM Interrupt Signals

Following table shows the GTM-IP interrupt lines that are visible at the outside of the IP.

| Signal | Description |
|---|---|
| GTM_AEI_IRQ | AEI Shared interrupt |
| GTM_ARU_IRQ[1:0] | [0]: ARU_NEW_DATA Interrupt<br>[1]: ARU_ACC_ACK Interrupt |
| GTM_BRC_IRQ | BRC Shared interrupt |
| GTM_CMP_IRQ | CMP Shared interrupt |
| GTM_SPE0_IRQ | SPE0 Shared interrupt |
| GTM_SPE1_IRQ | SPE1 Shared interrupt |

-continued

| Signal | Description |
|---|---|
| GTM_PSM0_IRQ[x] | PSM0 Shared interrupts (x: 0 . . . 7) |
| GTM_DPLL_IRQ[0] | DPLL_TE4: DPLL TRIGGER event interrupt 4 |
| GTM_DPLL_IRQ[1] | DPLL_TE3: DPLL TRIGGER event interrupt 3 |
| GTM_DPLL_IRQ[2] | DPLL_TE2: DPLL TRIGGER event interrupt 2 |
| GTM_DPLL_IRQ[3] | DPLL_TE1: DPLL TRIGGER event interrupt 1 |
| GTM_DPLL_IRQ[4] | DPLL_TE0: DPLL TRIGGER event interrupt 0 |
| GTM_DPLL_IRQ[5] | DPLL_LL2I: DPLL Lost of lock interrupt for SUB_INC2 |
| GTM_DPLL_IRQ[6] | DPLL_GL2I: DPLL Get of lock interrupt for SUB_INC1 |
| GTM_DPLL_IRQ[7] | DPLL_EI: DPLL Error interrupt |
| GTM_DPLL_IRQ[8] | DPLL_LLI: DPLL Lost of lock interrupt for SUB_INC1 |
| GTM_DPLL_IRQ[9] | DPLL_GLI: DPLL Get of lock interrupt for SUB_INC1 |
| GTM_DPLL_IRQ[10] | DPLL_W1I: DPLL Write access to RAM region 1b or 1c int. |
| GTM_DPLL_IRQ[11] | DPLL_W2I: DPLL Write access to RAM region 2 interrupt |
| GTM_DPLL_IRQ[12] | DPLL_PWI: DPLL Plausibility window (PVT) viol. int. of TRIG. |
| GTM_DPLL_IRQ[13] | DPLL_TAS: DPLL TRIG. active slope det. while NTI_CNT is 0 |
| GTM_DPLL_IRQ[14] | DPLL_SAS: DPLL STATE active slope detected |
| GTM_DPLL_IRQ[15] | DPLL_MTI: DPLL Missing TRIGGER interrupt |
| GTM_DPLL_IRQ[16] | DPLL_MSI: DPLL Missing STATE interrupt |
| GTM_DPLL_IRQ[17] | DPLL_TIS: DPLL TRIGGER inactive slope detected |
| GTM_DPLL_IRQ[18] | DPLL_SIS: DPLL STATE inactive slope detected |
| GTM_DPLL_IRQ[19] | DPLL_TAX: DPLL TRIG. max. hold time (THMA) viol. detected |
| GTM_DPLL_IRQ[20] | DPLL_TIN: DPLL TRIG. min. hold time (THMI) viol. detected |
| GTM_DPLL_IRQ[21] | DPLL_PEI: DPLL enable interrupt |
| GTM_DPLL_IRQ[22] | DPLL_PDI: DPLL disable interrupt |
| GTM_DPLL_IRQ[23] | DPLL_CDIT: DPLL calculated duration interrupt for trigger |
| GTM_DPLL_IRQ[24] | DPLL_CDIS: DPLL calculated duration interrupt for state |
| GTM_TIM0_IRQ[x] | TIM0 Shared interrupts (x: 0..7) |
| GTM_TIM1_IRQ[x] | TIM1 Shared interrupts (x: 0..7) |
| GTM_TIM2_IRQ[x] | TIM2 Shared interrupts (x: 0..7) |
| GTM_TIM3_IRQ[x] | TIM3 Shared interrupts (x: 0..7) |
| GTM_MCS0_IRQ[x] | MCS0 Interrupt for channel x (x: 0 . . . 7) |
| GTM_MCS1_IRQ[x] | MCS1 Interrupt for channel x (x: 0 . . . 7) |
| GTM_MCS2_IRQ[x] | MCS2 Interrupt for channel x (x: 0 . . . 7) |
| GTM_MCS3_IRQ[x] | MCS3 Interrupt for channel x (x: 0 . . . 7) |
| GTM_TOM0_IRQ[x] | TOM0 Shared interrupts for x: 0..7 = {ch0\|\|ch1, . . . , ch14\|\|ch15} |
| GTM_TOM1_IRQ[x] | TOM1 Shared interrupts for x: 0..7 = {ch0\|\|ch1, . . . , ch14\|\|ch15} |
| GTM_TOM2_IRQ[x] | TOM2 Shared interrupts for x: 0..7 = {ch0\|\|ch1, . . . , ch14\|\|ch15} |
| GTM_ATOM0_IRQ[x] | ATOM0 Shared interrupts for x: 0..3 = {ch0\|\|ch1, . . . , ch6\|\|ch7} |
| GTM_ATOM1_IRQ[x] | ATOM1 Shared interrupts for x: 0..3 = {ch0\|\|ch1, . . . , ch6\|\|ch7} |
| GTM_ATOM2_IRQ[x] | ATOM2 Shared interrupts for x: 0..3 = {ch0\|\|ch1, . . . , ch6\|\|ch7} |
| GTM_ATOM3_IRQ[x] | ATOM3 Shared interrupts for x: 0..3 = {ch0\|\|ch1, . . . , ch6\|\|ch7} |
| GTM_ATOM4_IRQ[x] | ATOM4 Shared interrupts for x: 0..3 = {ch0\|\|ch1, . . . , ch6\|\|ch7} |

ICM Configuration Registers Overview

ICM contains following configuration registers:

| Register Name | Description | Details in Section |
|---|---|---|
| ICM_IRQG_0 | ICM Interrupt group register covering infrastructural and safety components (ARU, BRC, AEI, PSM, MAP, CMP, SPE) | 0 |
| ICM_IRQG_1 | ICM Interrupt group register covering DPLL | 0 |
| ICM_IRQG_2 | ICM Interrupt group register covering TIM0, TIM1, TIM2, TIM3 | 0 |
| ICM_IRQG_4 | ICM Interrupt group register covering MCS0 to MCS3 sub modules | 0 |
| ICM_IRQG_6 | ICM Interrupt group register covering GTM-IP output sub modules TOM0 to TOM1 | 0 |
| ICM_IRQG_7 | ICM Interrupt group register covering GTM-IP output sub module TOM2 | 0 |
| ICM_IRQG_9 | ICM Interrupt group register covering GTM-IP output sub modules ATOM0, ATOM1, ATOM2 and ATOM3 | 0 |
| ICM_IRQG_10 | ICM Interrupt group register covering GTM-IP output sub module ATOM4 | 0 |

ICM Configuration Registers Description

Register ICM_IRQG_0 (GTM Infrastructure Interrupt Group)

Address Offset: 0x00

| | 31 30 29 28 27 26 25 24 | 23 | 22 | 21 |
|---|---|---|---|---|
| Bit | Reserved | PSM0_CH7_IRQ | PSM0_CH6_IRQ | PSM0_CH5_IRQ |
| Mode | R | R | R | R |
| Initial Value | 0x00 | 0 | 0 | 0 |

-continued

Register ICM_IRQG_0 (GTM Infrastructure Interrupt Group)

Address Offset: 0x00

| | 20 | 19 | 18 | 17 |
|---|---|---|---|---|
| Bit | PSM0_CH4_IRQ | PSM0_CH3_IRQ | PSM0_CH2_IRQ | PSM0_CH1_IRQ |
| Mode | R | R | R | R |
| Initial Value | 0 | 0 | 0 | 0 |

Address Offset: 0x00 Initial Value: 0x0000_0000

| | 16 | 15 | 14 | 13 | 12 | 11 | 10 | 9 | 8 | 7 | 6 | 5 |
|---|---|---|---|---|---|---|---|---|---|---|---|---|
| Bit | PSM0_CH0_IRQ | Reserved | | | | | | | | | SPE1_IRQ | SPE0_IRQ |
| Mode | R | R | | | | | | | | | R | R |
| Initial Value | 0 | 0x000 | | | | | | | | | 0 | 0 |

Initial Value: 0x0000_0000

| | 4 | 3 | 2 | 1 | 0 |
|---|---|---|---|---|---|
| Bit | CMP_IRQ | AEI_IRQ | BRC_IRQ | ARU_ACC_ACK_IRQ | ARU_NEW_DATA_IRQ |
| Mode | R | R | R | R | R |
| Initial Value | 0 | 0 | 0 | 0 | 0 |

Bit 0 ARU_NEW_DATA_IRQ: ARU_NEW_DATA interrupt
0 = no interrupt occurred
1 = interrupt was raised by the corresponding sub module
Note: This bit is only set, when the interrupt is enabled in the interrupt enable register of the corresponding sub module.
Bit 1 ARU_ACC_ACK_IRQ: ARU_ACC_ACK interrupt. See bit 0.
Bit 2 BRC_IRQ: BRC shared sub module interrupt. See bit 0.
Bit 3 AEI_IRQ: AEI_IRQ interrupt. See bit 0.
Bit 4 CMP_IRQ: CMP shared sub module interrupt. See bit 0.
Bit 5 SPE0_IRQ: SPE0 shared sub module interrupt. See bit 0.
Bit 6 SPE1_IRQ: SPE0 shared sub module interrupt. See bit 0.
Bit 15:7 Reserved
Note: Read as zero, should be written as zero
Bit 16 PSM0_CH0_IRQ: PSM0 shared sub module channel 0 interrupt
0 = no interrupt occurred
1 = interrupt was raised by the corresponding sub module
Note: This bit is only set, when the interrupt is enabled in the interrupt enable register of the corresponding sub module.
Note: When set this bit represents one of the four interrupt sources FIFO_[x]_EMPTY, FIFO_[x]_FULL, FIFO_[x]_LOWER_WM or FIFO_[x]_UPPER_WM
Bit 17 PSM0_CH1_IRQ: PSM0 shared sub module channel 1 interrupt. See bit 16.
Bit 18 PSM0_CH2_IRQ: PSM0 shared sub module channel 2 interrupt. See bit 16.
Bit 19 PSM0_CH3_IRQ: PSM0 shared sub module channel 3 interrupt. See bit 16.
Bit 20 PSM0_CH4_IRQ: PSM0 shared sub module channel 4 interrupt. See bit 16.
Bit 21 PSM0_CH5_IRQ: PSM0 shared sub module channel 5 interrupt. See bit 16.
Bit 22 PSM0_CH6_IRQ: PSM0 shared sub module channel 6 interrupt. See bit 16.
Bit 23 PSM0_CH7_IRQ: PSM0 shared sub module channel 7 interrupt. See bit 16.
Bit 31:24 Reserved
Note: Read as zero, should be written as zero Register ICM_IRQG_1 (DPLL Interrupt Group)

Address Offset: 0x04

| | 31 | 30 | 29 | 28 | 27 | 26 | 25 | 24 | 23 | 22 | 21 | 20 |
|---|---|---|---|---|---|---|---|---|---|---|---|---|
| Bit | Reserved | | | | | | | DPLL_CDIS_IRQ | DPLL_CDIT_IRQ | DPLL_PDI_IRQ | DPLL_PEI_IRQ | DPLL_TIN_IRQ |
| Mode | R | | | | | | | R | R | R | R | R |
| Initial Value | 0x000 | | | | | | | 0 | 0 | 0 | 0 | 0 |

Address Offset: 0x04 Initial Value: 0x0000_0000

| | 19 | 18 | 17 | 16 | 15 |
|---|---|---|---|---|---|
| Bit | DPLL_TAX_IRQ | DPLL_SIS_IRQ | DPLL_TIS_IRQ | DPLL_MSI_IRQ | DPLL_MTI_IRQ |
| Mode | R | R | R | R | R |
| Initial Value | 0 | 0 | 0 | 0 | 0 |

-continued

| Register ICM_IRQG_1 (DPLL Interrupt Group) | | | | | |
|---|---|---|---|---|---|
| | Initial Value: 0x0000_0000 | | | | |
| | 14 | 13 | 12 | 11 | 10 |
| Bit | DPLL_SAS_IRQ | DPLL_TAS_IRQ | DPLL_PWI_IRQ | DPLL_W2I_IRQ | DPLL_W1I_IRQ |
| Mode | R | R | R | R | R |
| Initial Value | 0 | 0 | 0 | 0 | 0 |
| | Initial Value: 0x0000_0000 | | | | |
| | 9 | 8 | 7 | 6 | 5 |
| Bit | DPLL_GLI_IRQ | DPLL_LLI_IRQ | DPLL_EI_IRQ | DPLL_GL2I_IRQ | DPLL_LL2I_IRQ |
| Mode | R | R | R | R | R |
| Initial Value | 0 | 0 | 0 | 0 | 0 |
| | Initial Value: 0x0000_0000 | | | | |
| | 4 | 3 | 2 | 1 | 0 |
| Bit | DPLL_TE4_IRQ | DPLL_TE3_IRQ | DPLL_TE2_IRQ | DPLL_TE1_IRQ | DPLL_TE0_IRQ |
| Mode | R | R | R | R | R |
| Initial Value | 0 | 0 | 0 | 0 | 0 |

Bit 0 DPLL_TE0_IRQ: TRIGGER event interrupt 0
0 = no interrupt occurred
1 = interrupt was raised by the corresponding sub module
Note: This bit is only set, when the interrupt is enabled in the interrupt enable register of the corresponding sub module.
Bit 1 DPLL_TE1_IRQ: TRIGGER event interrupt 1. See bit 0.
Bit 2 DPLL_TE2_IRQ: TRIGGER event interrupt 2. See bit 0.
Bit 3 DPLL_TE3_IRQ: TRIGGER event interrupt 3. See bit 0.
Bit 4 DPLL_TE4_IRQ: TRIGGER event interrupt 4. See bit 0.
Bit 5 DPLL_LL2I_IRQ: Lost of lock interrupt for SUB_INC2. See bit 0.
Bit 6 DPLL_GL2I_IRQ: Get of lock interrupt for SUB_INC2. See bit 0.
Bit 7 DPLL_EI_IRQ: Error interrupt. See bit 0.
Bit 8 DPLL_LLI_IRQ: Lost of lock interrupt for SUB_INC1. See bit 0.
Bit 9 DPLL_GLI_IRQ: Get of lock interrupt for SUB_INC1. See bit 0.
Bit 10 DPLL_W1I_IRQ: Write access to RAM region 1b or 1c interrupt. See bit 0.
Bit 11 DPLL_W2I_IRQ: Write access to RAM region 2 interrupt. See bit 0.
Bit 12 DPLL_PWI_IRQ: Plausibility window (PVT) violation interrupt of TRIGGER. See bit 0.
Bit 13 DPLL_TAS_IRQ: TRIGGER active slope detected while NTI_CNT is zero. See bit 0.
Bit 14 DPLL_SAS_IRQ: STATE active slope detected. See bit 0.
Bit 15 DPLL_MTI_IRQ: Missing TRIGGER interrupt. See bit 0.
Bit 16 DPLL_MSI_IRQ: Missing STATE interrupt. See bit 0.
Bit 17 DPLL_TIS_IRQ: TRIGGER inactive slope detected interrupt. See bit 0.
Bit 18 DPLL_SIS_IRQ: STATE inactive slope detected interrupt. See bit 0.
Bit 19 DPLL_TAX_IRQ: TRIGGER maximum hold time (THMA) violation detected interrupt. See bit 0.
Bit 20 DPLL_TIN_IRQ: TRIGGER minimum hold time (THMI) violation detected interrupt. See bit 0.
Bit 21 DPLL_PEI_IRQ: DPLL enable interrupt. See bit 0.
Bit 22 DPLL_PDI_IRQ: DPLL disable interrupt. See bit 0.
Bit 23 DPLL_CDIT_IRQ: DPLL calculated duration interrupt for trigger. See bit 0.
Bit 24 DPLL_CDIS_IRQ: DPLL calculated duration interrupt for state. See bit 0.
Bit 31:25 Reserved: Reserved
Note: Read as zero, should be written as zero

| Register ICM_IRQG_2 (TIM Interrupt Group 0) | | | | | | |
|---|---|---|---|---|---|---|
| | Address Offset: 0x08 | | | | | |
| | 31 | 30 | 29 | 28 | 27 | 26 |
| Bit | TIM3_CH7_IRQ | TIM3_CH6_IRQ | TIM3_CH5_IRQ | TIM3_CH4_IRQ | TIM3_CH3_IRQ | TIM3_CH2_IRQ |
| Mode | R | R | R | R | R | R |
| Initial Value | 0 | 0 | 0 | 0 | 0 | 0 |

-continued

| Register ICM_IRQG_2 (TIM Interrupt Group 0) | | | | | | |
|---|---|---|---|---|---|---|
| | Address Offset: 0x08 | | | | | |
| | 25 | 24 | 23 | 22 | 21 | 20 |
| Bit | TIM3_CH1_IRQ | TIM3_CH0_IRQ | TIM2_CH7_IRQ | TIM2_CH6_IRQ | TIM2_CH5_IRQ | TIM2_CH4_IRQ |
| Mode | R | R | R | R | R | R |
| Initial Value | 0 | 0 | 0 | 0 | 0 | 0 |

| | Address Offset: 0x08 | | | | Initial Value: 0x0000_0000 |
|---|---|---|---|---|---|
| | 19 | 18 | 17 | 16 | 15 |
| Bit | TIM2_CH3_IRQ | TIM2_CH2_IRQ | TIM2_CH1_IRQ | TIM2_CH0_IRQ | TIM1_CH7_IRQ |
| Mode | R | R | R | R | R |
| Initial Value | 0 | 0 | 0 | 0 | 0 |

| | Initial Value: 0x0000_0000 | | | | |
|---|---|---|---|---|---|
| | 14 | 13 | 12 | 11 | 10 |
| Bit | TIM1_CH6_IRQ | TIM1_CH5_IRQ | TIM1_CH4_IRQ | TIM1_CH3_IRQ | TIM1_CH2_IRQ |
| Mode | R | R | R | R | R |
| Initial Value | 0 | 0 | 0 | 0 | 0 |

| | Initial Value: 0x0000_0000 | | | | |
|---|---|---|---|---|---|
| | 9 | 8 | 7 | 6 | 5 |
| Bit | TIM1_CH1_IRQ | TIM1_CH0_IRQ | TIM0_CH7_IRQ | TIM0_CH6_IRQ | TIM0_CH5_IRQ |
| Mode | R | R | R | R | R |
| Initial Value | 0 | 0 | 0 | 0 | 0 |

| | Initial Value: 0x0000_0000 | | | | |
|---|---|---|---|---|---|
| | 4 | 3 | 2 | 1 | 0 |
| Bit | TIM0_CH4_IRQ | TIM0_CH3_IRQ | TIM0_CH2_IRQ | TIM0_CH1_IRQ | TIM0_CH0_IRQ |
| Mode | R | R | R | R | R |
| Initial Value | 0 | 0 | 0 | 0 | 0 |

Bit 0 TIM0_CH0_IRQ: TIM0 shared interrupt ch. 0.
0 = no interrupt occurred
1 = interrupt was raised by the corresponding sub module
Note: This bit is only set, when the interrupt is enabled in the interrupt enable register of the corresponding sub module.
Note: When set this bit represents one of the six interrupt sources NEWVALx_IRQ, ECNTOFLx_IRQ, CNTOFLx_IRQ, GPRXOFLx_IRQ, GLITCHDETx_IRQ or TOx_IRQ.
Bit 1 TIM0_CH1_IRQ: TIM0 shared interrupt ch. 1. See bit 0.
Bit 2 TIM0_CH2_IRQ: TIM0 shared interrupt ch. 2. See bit 0.
Bit 3 TIM0_CH3_IRQ: TIM0 shared interrupt ch. 3. See bit 0.
Bit 4 TIM0_CH4_IRQ: TIM0 shared interrupt ch. 4. See bit 0.
Bit 5 TIM0_CH5_IRQ: TIM0 shared interrupt ch. 5. See bit 0.
Bit 6 TIM0_CH6_IRQ: TIM0 shared interrupt ch. 6. See bit 0.
Bit 7 TIM0_CH7_IRQ: TIM0 shared interrupt ch. 7. See bit 0.
Bit 8 TIM1_CH0_IRQ: TIM1 shared interrupt ch. 0. See bit 0.
Bit 9 TIM1_CH1_IRQ: TIM1 shared interrupt ch. 1. See bit 0.
Bit 10 TIM1_CH2_IRQ: TIM1 shared interrupt ch. 2. See bit 0.
Bit 11 TIM1_CH3_IRQ: TIM1 shared interrupt ch. 3. See bit 0.
Bit 12 TIM1_CH4_IRQ: TIM1 shared interrupt ch. 4. See bit 0.
Bit 13 TIM1_CH5_IRQ: TIM1 shared interrupt ch. 5. See bit 0.
Bit 14 TIM1_CH6_IRQ: TIM1 shared interrupt ch. 6. See bit 0.
Bit 15 TIM1_CH7_IRQ: TIM1 shared interrupt ch. 7. See bit 0.
Bit 16 TIM2_CH0_IRQ: TIM2 shared interrupt ch. 0. See bit 0.
Bit 17 TIM2_CH1_IRQ: TIM2 shared interrupt ch. 1. See bit 0.
Bit 18 TIM2_CH2_IRQ: TIM2 shared interrupt ch. 2. See bit 0.
Bit 19 TIM2_CH3_IRQ: TIM2 shared interrupt ch. 3. See bit 0.
Bit 20 TIM2_CH4_IRQ: TIM2 shared interrupt ch. 4. See bit 0.
Bit 21 TIM2_CH5_IRQ: TIM2 shared interrupt ch. 5. See bit 0.
Bit 22 TIM2_CH6_IRQ: TIM2 shared interrupt ch. 6. See bit 0.
Bit 23 TIM2_CH7_IRQ: TIM2 shared interrupt ch. 7. See bit 0.
Bit 24 TIM3_CH0_IRQ: TIM3 shared interrupt ch. 0. See bit 0.
Bit 25 TIM3_CH1_IRQ: TIM3 shared interrupt ch. 1. See bit 0.
Bit 26 TIM3_CH2_IRQ: TIM3 shared interrupt ch. 2. See bit 0.
Bit 27 TIM3_CH3_IRQ: TIM3 shared interrupt ch. 3. See bit 0.

-continued

| Register ICM_IRQG_2 (TIM Interrupt Group 0) |
|---|
| Bit 28 TIM3_CH4_IRQ: TIM3 shared interrupt ch. 4. See bit 0. |
| Bit 29 TIM3_CH5_IRQ: TIM3 shared interrupt ch. 5. See bit 0. |
| Bit 30 TIM3_CH6_IRQ: TIM3 shared interrupt ch. 6. See bit 0. |
| Bit 31 TIM3_CH7_IRQ: TIM3 shared interrupt ch. 7. See bit 0. |

Register ICM_IRQG_4 (MCS Interrupt Group 0)

| | Address Offset: 0x10 | | | | | |
|---|---|---|---|---|---|---|
| | 31 | 30 | 29 | 28 | 27 | 26 |
| Bit | MCS3_CH7_IRQ | MCS3_CH6_IRQ | MCS3_CH5_IRQ | MCS3_CH4_IRQ | MCS3_CH3_IRQ | MCS3_CH2_IRQ |
| Mode | R | R | R | R | R | R |
| Initial Value | 0 | 0 | 0 | 0 | 0 | 0 |

| | Address Offset: 0x10 | | | | | |
|---|---|---|---|---|---|---|
| | 25 | 24 | 23 | 22 | 21 | 20 |
| Bit | MCS3_CH1_IRQ | MCS3_CH0_IRQ | MCS2_CH7_IRQ | MCS2_CH6_IRQ | MCS2_CH5_IRQ | MCS2_CH4_IRQ |
| Mode | R | R | R | R | R | R |
| Initial Value | 0 | 0 | 0 | 0 | 0 | 0 |

| | Address Offset: 0x10 | | | | Initial Value: 0x0000_0000 |
|---|---|---|---|---|---|
| | 19 | 18 | 17 | 16 | 15 |
| Bit | MCS2_CH3_IRQ | MCS2_CH2_IRQ | MCS2_CH1_IRQ | MCS2_CH0_IRQ | MCS1_CH7_IRQ |
| Mode | R | R | R | R | R |
| Initial Value | 0 | 0 | 0 | 0 | 0 |

| | Initial Value: 0x0000_0000 | | | | |
|---|---|---|---|---|---|
| | 14 | 13 | 12 | 11 | 10 |
| Bit | MCS1_CH6_IRQ | MCS1_CH5_IRQ | MCS1_CH4_IRQ | MCS1_CH3_IRQ | MCS1_CH2_IRQ |
| Mode | R | R | R | R | R |
| Initial Value | 0 | 0 | 0 | 0 | 0 |

| | Initial Value: 0x0000_0000 | | | | |
|---|---|---|---|---|---|
| | 9 | 8 | 7 | 6 | 5 |
| Bit | MCS1_CH1_IRQ | MCS1_CH0_IRQ | MCS0_CH7_IRQ | MCS0_CH6_IRQ | MCS0_CH5_IRQ |
| Mode | R | R | R | R | R |
| Initial Value | 0 | 0 | 0 | 0 | 0 |

-continued

| Register ICM_IRQG_4 (MCS Interrupt Group 0) | | | | | |
|---|---|---|---|---|---|
| | Initial Value: 0x0000_0000 | | | | |
| | 4 | 3 | 2 | 1 | 0 |
| Bit | MCS0_CH4_IRQ | MCS0_CH3_IRQ | MCS0_CH2_IRQ | MCS0_CH1_IRQ | MCS0_CH0_IRQ |
| Mode | R | R | R | R | R |
| Initial Value | 0 | 0 | 0 | 0 | 0 |

Bit 0 MCS0_CH0_IRQ: MCS0 channel 0 interrupt
0 = no interrupt occurred
1 = interrupt was raised by the corresponding sub module
Note: This bit is only set, when the interrupt is enabled in the interrupt enable register of the corresponding sub module.
Bit 1 MCS0_CH1_IRQ: MCS0 channel 1 interrupt. See bit 0.
Bit 2 MCS0_CH2_IRQ: MCS0 channel 2 interrupt. See bit 0.
Bit 3 MCS0_CH3_IRQ: MCS0 channel 3 interrupt. See bit 0.
Bit 4 MCS0_CH4_IRQ: MCS0 channel 4 interrupt. See bit 0.
Bit 5 MCS0_CH5_IRQ: MCS0 channel 5 interrupt. See bit 0.
Bit 6 MCS0_CH6_IRQ: MCS0 channel 6 interrupt. See bit 0.
Bit 7 MCS0_CH7_IRQ: MCS0 channel 7 interrupt. See bit 0.
Bit 8 MCS1_CH0_IRQ: MCS1 channel 0 interrupt. See bit 0.
Bit 9 MCS1_CH1_IRQ: MCS1 channel 1 interrupt. See bit 0.
Bit 10 MCS1_CH2_IRQ: MCS1 channel 2 interrupt. See bit 0.
Bit 11 MCS1_CH3_IRQ: MCS1 channel 3 interrupt. See bit 0.
Bit 12 MCS1_CH4_IRQ: MCS1 channel 4 interrupt. See bit 0.
Bit 13 MCS1_CH5_IRQ: MCS1 channel 5 interrupt. See bit 0.
Bit 14 MCS1_CH6_IRQ: MCS1 channel 6 interrupt. See bit 0.
Bit 15 MCS1_CH7_IRQ: MCS1 channel 7 interrupt. See bit 0.
Bit 16 MCS2_CH0_IRQ: MCS1 channel 0 interrupt.
Bit 17 MCS2_CH1_IRQ: MCS2 channel 1 interrupt. See bit 0.
Bit 18 MCS2_CH2_IRQ: MCS2 channel 2 interrupt. See bit 0.
Bit 19 MCS2_CH3_IRQ: MCS2 channel 3 interrupt. See bit 0.
Bit 20 MCS2_CH4_IRQ: MCS2 channel 4 interrupt. See bit 0.
Bit 21 MCS2_CH5_IRQ: MCS2 channel 5 interrupt. See bit 0.
Bit 22 MCS2_CH6_IRQ: MCS2 channel 6 interrupt. See bit 0.
Bit 23 MCS2_CH7_IRQ: MCS2 channel 7 interrupt. See bit 0.
Bit 24 MCS3_CH0_IRQ: MCS3 channel 0 interrupt. See bit 0.
Bit 25 MCS3_CH1_IRQ: MCS3 channel 1 interrupt. See bit 0.
Bit 26 MCS3_CH2_IRQ: MCS3 channel 2 interrupt. See bit 0.
Bit 27 MCS3_CH3_IRQ: MCS3 channel 3 interrupt. See bit 0.
Bit 28 MCS3_CH4_IRQ: MCS3 channel 4 interrupt. See bit 0.
Bit 29 MCS3_CH5_IRQ: MCS3 channel 5 interrupt. See bit 0.
Bit 30 MCS3_CH6_IRQ: MCS3 channel 6 interrupt. See bit 0.
Bit 31 MCS3_CH7_IRQ: MCS3 channel 7 interrupt. See bit 0.

| Register ICM_IRQG_6 (TOM Interrupt Group 0) | | | | | | |
|---|---|---|---|---|---|---|
| | Address Offset: 0x18 | | | | | |
| | 31 | 30 | 29 | 28 | 27 | 26 |
| Bit | TOM1_CH15_IRQ | TOM1_CH14_IRQ | TOM1_CH13_IRQ | TOM1_CH12_IRQ | TOM1_CH11_IRQ | TOM1_CH10_IRQ |
| Mode | R | R | R | R | R | R |
| Initial Value | 0 | 0 | 0 | 0 | 0 | 0 |
| | Address Offset: 0x18 | | | | | |
| | 25 | 24 | 23 | 22 | 21 | 20 |
| Bit | TOM1_CH9_IRQ | TOM1_CH8_IRQ | TOM1_CH7_IRQ | TOM1_CH6_IRQ | TOM1_CH5_IRQ | TOM1_CH4_IRQ |
| Mode | R | R | R | R | R | R |
| Initial Value | 0 | 0 | 0 | 0 | 0 | 0 |

-continued

| Register ICM_IRQG_6 (TOM Interrupt Group 0) | | | | | |
|---|---|---|---|---|---|
| | Address Offset: 0x18 | | | | Initial Value: 0x0000_ 0000 |
| | 19 | 18 | 17 | 16 | 15 |
| Bit | TOM1_CH3_IRQ | TOM1_CH2_IRQ | TOM1_CH1_IRQ | TOM1_CH0_IRQ | TOM0_CH15_IRQ |
| Mode | R | R | R | R | R |
| Initial Value | 0 | 0 | 0 | 0 | 0 |
| | Initial Value: 0x0000_ 0000 | | | | |
| | 14 | 13 | 12 | 11 | 10 |
| Bit | TOM0_CH14_IRQ | TOM0_CH13_IRQ | TOM0_CH12_IRQ | TOM0_CH11_IRQ | TOM0_CH10_IRQ |
| Mode | R | R | R | R | R |
| Initial Value | 0 | 0 | 0 | 0 | 0 |
| | Initial Value: 0x0000_ 0000 | | | | |
| | 9 | 8 | 7 | 6 | 5 |
| Bit | TOM0_CH9_IRQ | TOM0_CH8_IRQ | TOM0_CH7_IRQ | TOM0_CH6_IRQ | TOM0_CH5_IRQ |
| Mode | R | R | R | R | R |
| Initial Value | 0 | 0 | 0 | 0 | 0 |
| | Initial Value: 0x0000_ 0000 | | | | |
| | 4 | 3 | 2 | 1 | 0 |
| Bit | TOM0_CH4_IRQ | TOM0_CH3_IRQ | TOM0_CH2_IRQ | TOM0_CH1_IRQ | TOM0_CH0_IRQ |
| Mode | R | R | R | R | R |
| Initial Value | 0 | 0 | 0 | 0 | 0 |

Bit 0 TOM0_CH0_IRQ: TOM0 channel 0 shared interrupt
0 = no interrupt occurred
1 = interrupt was raised by the corresponding sub module
Note: This bit is only set, when the interrupt is enabled in the interrupt enable register of the corresponding sub module.
Bit 1 TOM0_CH1_IRQ: TOM0 channel 1 shared interrupt. See bit 0.
Bit 2 TOM0_CH2_IRQ: TOM0 channel 2 shared interrupt. See bit 0.
Bit 3 TOM0_CH3_IRQ: TOM0 channel 3 shared interrupt. See bit 0.
Bit 4 TOM0_CH4_IRQ: TOM0 channel 4 shared interrupt. See bit 0.
Bit 5 TOM0_CH5_IRQ: TOM0 channel 5 shared interrupt. See bit 0.
Bit 6 TOM0_CH6_IRQ: TOM0 channel 6 shared interrupt. See bit 0.
Bit 7 TOM0_CH7_IRQ: TOM0 channel 7 shared interrupt. See bit 0.
Bit 8 TOM0_CH8_IRQ: TOM0 channel 8 shared interrupt. See bit 0.
Bit 9 TOM0_CH9_IRQ: TOM0 channel 9 shared interrupt. See bit 0.
Bit 10 TOM0_CH10_IRQ: TOM0 channel 10 shared interrupt. See bit 0.
Bit 11 TOM0_CH11_IRQ: TOM0 channel 11 shared interrupt. See bit 0.
Bit 12 TOM0_CH12_IRQ: TOM0 channel 12 shared interrupt. See bit 0.
Bit 13 TOM0_CH13_IRQ: TOM0 channel 13 shared interrupt. See bit 0.
Bit 14 TOM0_CH14_IRQ: TOM0 channel 14 shared interrupt. See bit 0.
Bit 15 TOM0_CH15_IRQ: TOM0 channel 15 shared interrupt. See bit 0.
Bit 16 TOM1_CH0_IRQ: TOM1 channel 0 shared interrupt. See bit 0.
Bit 17 TOM1_CH1_IRQ: TOM1 channel 1 shared interrupt. See bit 0.
Bit 18 TOM1_CH2_IRQ: TOM1 channel 2 shared interrupt. See bit 0.
Bit 19 TOM1_CH3_IRQ: TOM1 channel 3 shared interrupt. See bit 0.
Bit 20 TOM1_CH4_IRQ: TOM1 channel 4 shared interrupt. See bit 0.
Bit 21 TOM1_CH5_IRQ: TOM1 channel 5 shared interrupt. See bit 0.
Bit 22 TOM1_CH6_IRQ: TOM1 channel 6 shared interrupt. See bit 0.
Bit 23 TOM1_CH7_IRQ: TOM1 channel 7 shared interrupt. See bit 0.
Bit 24 TOM1_CH8_IRQ: TOM1 channel 8 shared interrupt. See bit 0.
Bit 25 TOM1_CH9_IRQ: TOM1 channel 9 shared interrupt. See bit 0.
Bit 26 TOM1_CH10_IRQ: TOM1 channel 10 shared interrupt. See bit 0.
Bit 27 TOM1_CH11_IRQ: TOM1 channel 11 shared interrupt. See bit 0.
Bit 28 TOM1_CH12_IRQ: TOM1 channel 12 shared interrupt. See bit 0.
Bit 29 TOM1_CH13_IRQ: TOM1 channel 13 shared interrupt. See bit 0.
Bit 30 TOM1_CH14_IRQ: TOM1 channel 14 shared interrupt. See bit 0.
Bit 31 TOM1_CH15_IRQ: TOM1 channel 15 shared interrupt. See bit 0.

Register ICM_IRQG_7 (TOM Interrupt Group 1)

| | 31 30 29 28 27 26 25 24 23 22 21 20 19 18 17 16 | 15 | 14 |
|---|---|---|---|
| | Address Offset: 0x1C | Initial Value: 0x0000_0000 | |
| Bit | Reserved | TOM2_CH15_IRQ | TOM2_CH14_IRQ |
| Mode | R | R | R |
| Initial Value | 0x0000 | 0 | 0 |

Initial Value: 0x0000_0000

| | 13 | 12 | 11 | 10 | 9 |
|---|---|---|---|---|---|
| Bit | TOM2_CH13_IRQ | TOM2_CH12_IRQ | TOM2_CH11_IRQ | TOM2_CH10_IRQ | TOM2_CH9_IRQ |
| Mode | R | R | R | R | R |
| Initial Value | 0 | 0 | 0 | 0 | 0 |

Initial Value: 0x0000_0000

| | 8 | 7 | 6 | 5 | 4 |
|---|---|---|---|---|---|
| Bit | TOM2_CH8_IRQ | TOM2_CH7_IRQ | TOM2_CH6_IRQ | TOM2_CH5_IRQ | TOM2_CH4_IRQ |
| Mode | R | R | R | R | R |
| Initial Value | 0 | 0 | 0 | 0 | 0 |

Initial Value: 0x0000_0000

| | 3 | 2 | 1 | 0 |
|---|---|---|---|---|
| Bit | TOM2_CH3_IRQ | TOM2_CH2_IRQ | TOM2_CH1_IRQ | TOM2_CH0_IRQ |
| Mode | R | R | R | R |
| Initial Value | 0 | 0 | 0 | 0 |

Bit 0 TOM2_CH0_IRQ: TOM2 channel 0 shared interrupt
0 = no interrupt occurred
1 = interrupt was raised by the corresponding sub module
Note: This bit is only set, when the interrupt is enabled in the interrupt enable register of the corresponding sub module.
Bit 1 TOM2_CH1_IRQ: TOM2 channel 1 shared interrupt. See bit 0.
Bit 2 TOM2_CH2_IRQ: TOM2 channel 2 shared interrupt. See bit 0.
Bit 3 TOM2_CH3_IRQ: TOM2 channel 3 shared interrupt. See bit 0.
Bit 4 TOM2_CH4_IRQ: TOM2 channel 4 shared interrupt. See bit 0.
Bit 5 TOM2_CH5_IRQ: TOM2 channel 5 shared interrupt. See bit 0.
Bit 6 TOM2_CH6_IRQ: TOM2 channel 6 shared interrupt. See bit 0.
Bit 7 TOM2_CH7_IRQ: TOM2 channel 7 shared interrupt. See bit 0.
Bit 8 TOM2_CH8_IRQ: TOM2 channel 8 shared interrupt. See bit 0.
Bit 9 TOM2_CH9_IRQ: TOM2 channel 9 shared interrupt. See bit 0.
Bit 10 TOM2_CH10_IRQ: TOM2 channel 10 shared interrupt. See bit 0.
Bit 11 TOM2_CH11_IRQ: TOM2 channel 11 shared interrupt. See bit 0.
Bit 12 TOM2_CH12_IRQ: TOM2 channel 12 shared interrupt. See bit 0.
Bit 13 TOM2_CH13_IRQ: TOM2 channel 13 shared interrupt. See bit 0.
Bit 14 TOM2_CH14_IRQ: TOM2 channel 14 shared interrupt. See bit 0.
Bit 15 TOM2_CH15_IRQ: TOM2 channel 15 shared interrupt. See bit 0.
Bit 31:16 Reserved: Reserved
Note: Read as zero, should be written as zero Register ICM_IRQG_9 (ATOM Interrupt Group 0)

Address Offset: 0x24

| | 31 | 30 | 29 | 28 | 27 | 26 |
|---|---|---|---|---|---|---|
| Bit | ATOM3_CH7_IRQ | ATOM3_CH6_IRQ | ATOM3_CH5_IRQ | ATOM3_CH4_IRQ | ATOM3_CH3_IRQ | ATOM3_CH2_IRQ |
| Mode | R | R | R | R | R | R |
| Initial Value | 0 | 0 | 0 | 0 | 0 | 0 |

Address Offset: 0x24

| | 25 | 24 | 23 | 22 | 21 | 20 |
|---|---|---|---|---|---|---|
| Bit | ATOM3_CH1_IRQ | ATOM3_CH0_IRQ | ATOM2_CH7_IRQ | ATOM2_CH6_IRQ | ATOM2_CH5_IRQ | ATOM2_CH4_IRQ |
| Mode | R | R | R | R | R | R |

-continued

| Register ICM_IRQG_9 (ATOM Interrupt Group 0) | | | | | | |
|---|---|---|---|---|---|---|
| Initial Value | 0 | 0 | 0 | 0 | 0 | 0 |

| | Address Offset: 0x24 | | | | Initial Value: 0x0000_0000 |
|---|---|---|---|---|---|
| | 19 | 18 | 17 | 16 | 15 |
| Bit | ATOM2_CH3_IRQ | ATOM2_CH2_IRQ | ATOM2_CH1_IRQ | ATOM2_CH0_IRQ | ATOM1_CH7_IRQ |
| Mode | R | R | R | R | R |
| Initial Value | 0 | 0 | 0 | 0 | 0 |

| | Initial Value: 0x0000_0000 | | | | |
|---|---|---|---|---|---|
| | 14 | 13 | 12 | 11 | 10 |
| Bit | ATOM1_CH6_IRQ | ATOM1_CH5_IRQ | ATOM1_CH4_IRQ | ATOM1_CH3_IRQ | ATOM1_CH2_IRQ |
| Mode | R | R | R | R | R |
| Initial Value | 0 | 0 | 0 | 0 | 0 |

| | Initial Value: 0x0000_0000 | | | | |
|---|---|---|---|---|---|
| | 9 | 8 | 7 | 6 | 5 |
| Bit | ATOM1_CH1_IRQ | ATOM1_CH0_IRQ | ATOM0_CH7_IRQ | ATOM0_CH6_IRQ | ATOM0_CH5_IRQ |
| Mode | R | R | R | R | R |
| Initial Value | 0 | 0 | 0 | 0 | 0 |

| | Initial Value: 0x0000_0000 | | | | |
|---|---|---|---|---|---|
| | 4 | 3 | 2 | 1 | 0 |
| Bit | ATOM0_CH4_IRQ | ATOM0_CH3_IRQ | ATOM0_CH2_IRQ | ATOM0_CH1_IRQ | ATOM0_CH0_IRQ |
| Mode | R | R | R | R | R |
| Initial Value | 0 | 0 | 0 | 0 | 0 |

Bit 0 ATOM0_CH0_IRQ: ATOM0 channel 0 shared interrupt
0 = no interrupt occurred
1 = interrupt was raised by the corresponding sub module
Note: This bit is only set, when the interrupt is enabled in the interrupt enable register of the corresponding sub module.
Bit 1 ATOM0_CH1_IRQ: ATOM0 channel 1 shared interrupt. See bit 0.
Bit 2 ATOM0_CH2_IRQ: ATOM0 channel 2 shared interrupt. See bit 0.
Bit 3 ATOM0_CH3_IRQ: ATOM0 channel 3 shared interrupt. See bit 0.
Bit 4 ATOM0_CH4_IRQ: ATOM0 channel 4 shared interrupt. See bit 0.
Bit 5 ATOM0_CH5_IRQ: ATOM0 channel 5 shared interrupt. See bit 0.
Bit 6 ATOM0_CH6_IRQ: ATOM0 channel 6 shared interrupt. See bit 0.
Bit 7 ATOM0_CH7_IRQ: ATOM0 channel 7 shared interrupt. See bit 0.
Bit 8 ATOM1_CH0_IRQ: ATOM1 channel 0 shared interrupt.
Bit 9 ATOM1_CH1_IRQ: ATOM1 channel 1 shared interrupt. See bit 0.
Bit 10 ATOM1_CH2_IRQ: ATOM1 channel 2 shared interrupt. See bit 0.
Bit 11 ATOM1_CH3_IRQ: ATOM1 channel 3 shared interrupt. See bit 0.
Bit 12 ATOM1_CH4_IRQ: ATOM1 channel 4 shared interrupt. See bit 0.
Bit 13 ATOM1_CH5_IRQ: ATOM1 channel 5 shared interrupt. See bit 0.
Bit 14 ATOM1_CH6_IRQ: ATOM1 channel 6 shared interrupt. See bit 0.
Bit 15 ATOM1_CH7_IRQ: ATOM1 channel 7 shared interrupt. See bit 0.
Bit 16 ATOM2_CH0_IRQ: ATOM2 channel 0 shared interrupt
Bit 17 ATOM2_CH1_IRQ: ATOM2 channel 1 shared interrupt. See bit 0.
Bit 18 ATOM2_CH2_IRQ: ATOM2 channel 2 shared interrupt. See bit 0.
Bit 19 ATOM2_CH3_IRQ: ATOM2 channel 3 shared interrupt. See bit 0.
Bit 20 ATOM2_CH4_IRQ: ATOM2 channel 4 shared interrupt. See bit 0.
Bit 21 ATOM2_CH5_IRQ: ATOM2 channel 5 shared interrupt. See bit 0.
Bit 22 ATOM2_CH6_IRQ: ATOM2 channel 6 shared interrupt. See bit 0.
Bit 23 ATOM2_CH7_IRQ: ATOM2 channel 7 shared interrupt. See bit 0.
Bit 24 ATOM3_CH0_IRQ: ATOM3 channel 0 shared interrupt. See bit 0.
Bit 25 ATOM3_CH1_IRQ: ATOM3 channel 1 shared interrupt. See bit 0.
Bit 26 ATOM3_CH2_IRQ: ATOM3 channel 2 shared interrupt. See bit 0.
Bit 27 ATOM3_CH3_IRQ: ATOM3 channel 3 shared interrupt. See bit 0.
Bit 28 ATOM3_CH4_IRQ: ATOM3 channel 4 shared interrupt. See bit 0.
Bit 29 ATOM3_CH5_IRQ: ATOM3 channel 5 shared interrupt. See bit 0.
Bit 30 ATOM3_CH6_IRQ: ATOM3 channel 6 shared interrupt. See bit 0.
Bit 31 ATOM3_CH7_IRQ; ATOM3 channel 7 shared interrupt. See bit 0.

Register ICM_IRQG_10 (ATOM Interrupt Group 1)

Address Offset: 0x28 | Initial Value: 0x0000_0000

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 |
|---|---|---|---|---|---|---|---|---|---|---|---|---|---|---|---|---|---|---|---|---|---|---|---|---|
| Bit | Reserved | | | | | | | | | | | | | | | | | | | | | | | |
| Mode | R | | | | | | | | | | | | | | | | | | | | | | | |
| Initial Value | 0x0000000 | | | | | | | | | | | | | | | | | | | | | | | |

Initial Value: 0x0000_0000

| | 7 | 6 | 5 | 4 |
|---|---|---|---|---|
| Bit | ATOM4_CH7_IRQ | ATOM4_CH6_IRQ | ATOM4_CH5_IRQ | ATOM4_CH4_IRQ |
| Mode | R | R | R | R |
| Initial Value | 0 | 0 | 0 | 0 |

Initial Value: 0x0000_0000

| | 3 | 2 | 1 | 0 |
|---|---|---|---|---|
| Bit | ATOM4_CH3_IRQ | ATOM4_CH2_IRQ | ATOM4_CH1_IRQ | ATOM4_CH0_IRQ |
| Mode | R | R | R | R |
| Initial Value | 0 | 0 | 0 | 0 |

Bit 0 ATOM4_CH0_IRQ: ATOM4 channel 0 shared interrupt
0 = no interrupt occurred
1 = interrupt was raised by the corresponding sub module
Note: This bit is only set, when the interrupt is enabled in the interrupt enable register of the corresponding sub module.
Bit 1 ATOM4_CH1_IRQ: ATOM4 channel 1 shared interrupt. See bit 0.
Bit 2 ATOM4_CH2_IRQ: ATOM4 channel 2 shared interrupt. See bit 0.
Bit 3 ATOM4_CH3_IRQ: ATOM4 channel 3 shared interrupt. See bit 0.
Bit 4 ATOM4_CH4_IRQ: ATOM4 channel 4 shared interrupt. See bit 0.
Bit 5 ATOM4_CH5_IRQ: ATOM4 channel 5 shared interrupt. See bit 0.
Bit 6 ATOM4_CH6_IRQ: ATOM4 channel 6 shared interrupt. See bit 0.
Bit 7 ATOM4_CH7_IRQ: ATOM4 channel 7 shared interrupt. See bit 0.
Bit 31:8 Reserved: Reserved
Note: Read as zero, should be written as zero TIM0 Input Mapping Module (MAP)

Overview

The MAP sub module generates the two input signals TRIGGER and STATE for the sub module DPLL by evaluating the output signals of the channel 0 up to channel 5 of sub module TIM0. By using the TIM as input sub module, the filtering of the input signals can be done inside the TIM channels themselves. The MAP sub module architecture is depicted in FIG. 46.

MAP Sub Module Architecture

Figure 46:
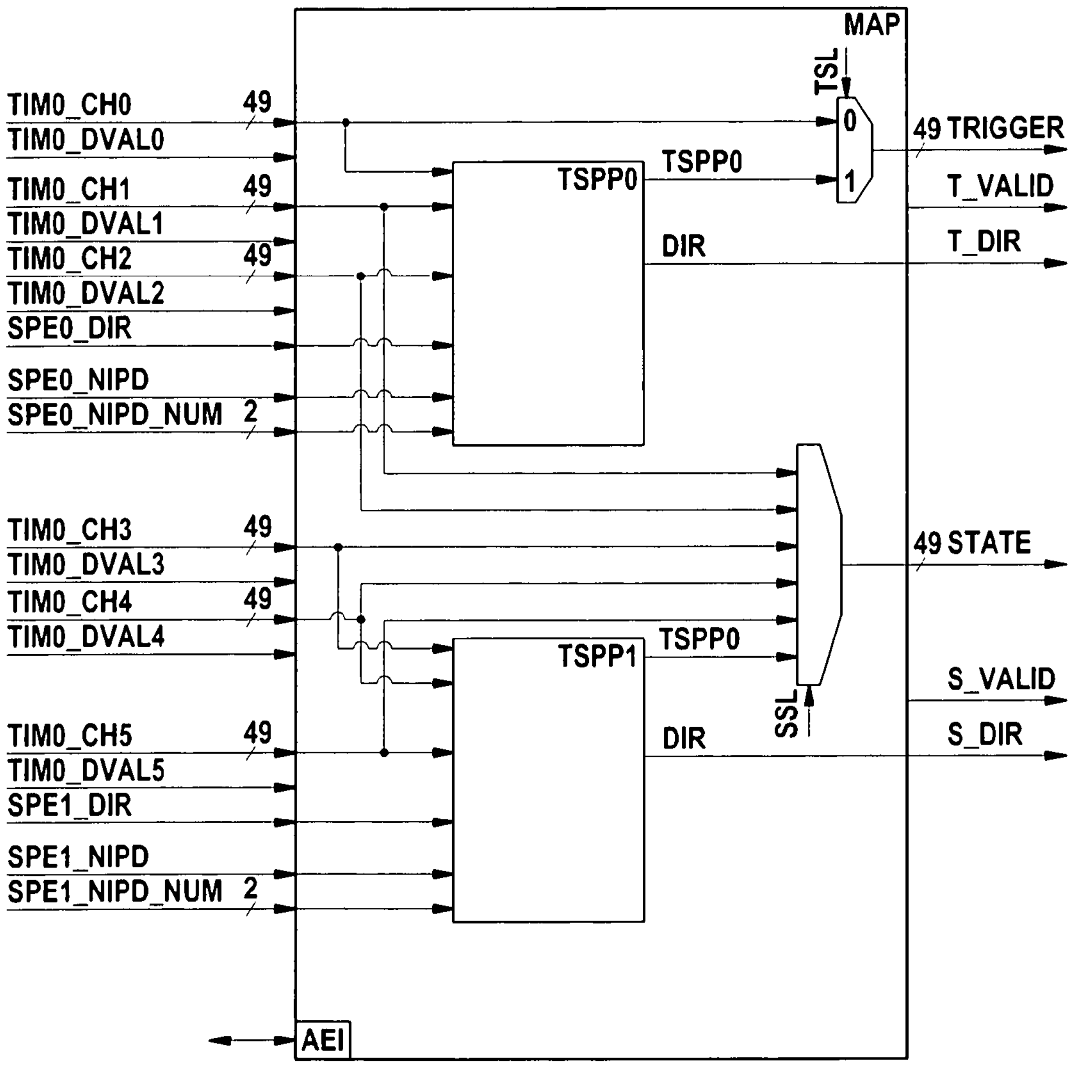

See FIG. 46.

Generally, the MAP sub module can route the channel signals coming from TIM0 in two ways. First, it is possible to route the whole 49 bits of data coming from channel 0 of module TIM0 (TIM0_CH0) to the TRIGGER signal which is then provided to the DPLL together with the T_VALID signal. Second, the MAP module can route one of the signals coming from the module TIM0 i.e. the signals coming from channel 1 up to channel 5) to the output signal STATE which is then provided to the module DPLL together with the S_VALID signal.

Second, the TRIGGER, T_VALID, STATE and S_VALID signals can be generated out of the TIM Signal Pre-processing (TSPP) subunits. This is done in combination with the Sensor Pattern Evaluation (SPE) sub module described in chapter 0. There the signal TRIGGER is generated in subunit TSPP0 out of the TIM signals coming from channel 0 up to 2 and the signal STATE is generated in subunit TSPP1 out of the TIM signals coming from channel 3 up to channel 5 . This is only be done, when the TSSPx subunits are enabled and when the SPEx_NIPD signal is raised by the SPE sub module. The SPEx_NIPD_NUM signal encodes, which of the 3 TIMx_CHy input signals has been changed. The SPEx_DIR signal is routed through the TSPPx subunit and implements the T_DIR or S_DIR signal.

TIM Signal Pre-Processing (TSPP)

The TSPP combines the three 49 bit input streams coming from the TIM0 sub module and generates one combined 49 bit output stream TSPPO. The input stream combination is done in the unit Bit Stream Combination (BSC). The architecture of the TSPP is shown in FIG. 47.

TIM Signal Pre-processing (TSPP) Subunit Architecture

Figure 47:
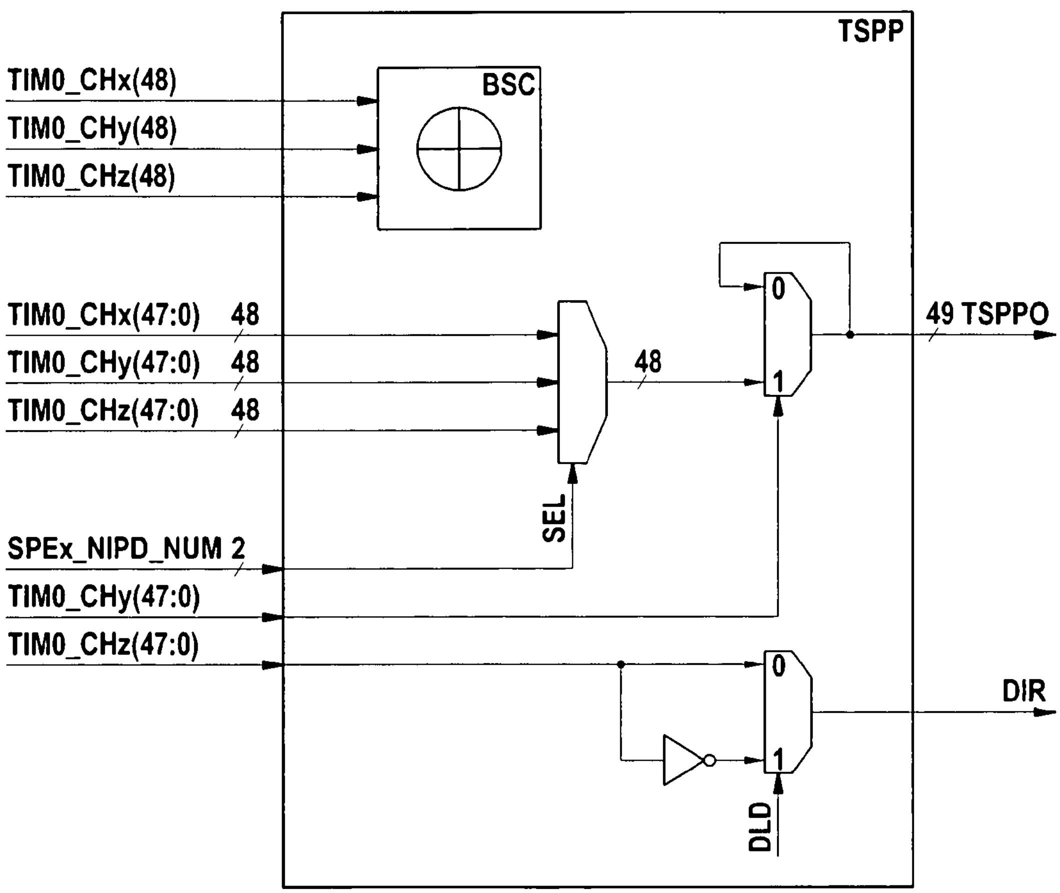

See FIG. 47.

Bit Stream Combination

The BSC subunit is used to xor-combine the three most significant bits TIM0_CHx(48), TIM0_CHy(48) and TIM0_CHz(48) of the TIM0 inputs. The xor-combined signal is merged with the remaining 48 bits of one of the three input signals TIM0_CHx(47 . . . 0), TIM0_CHy(47 . . . 0) or TIM0_CHz(47 . . . 0) the TSPPO signal. The selection is done with the SPEx_NIPD_NUM input signal coming from the SPE sub module. The action, when the 49 bits are transferred to the TSPPO and the T_VALID or S_VALID signal is raised is determined by the SPEx_NIPD signal coming from the SPE sub module. The TSPPO output signal generation is shown in the example in FIG. 48.

TSPP Signal Generation for Signal TSPPO

Figure 48:
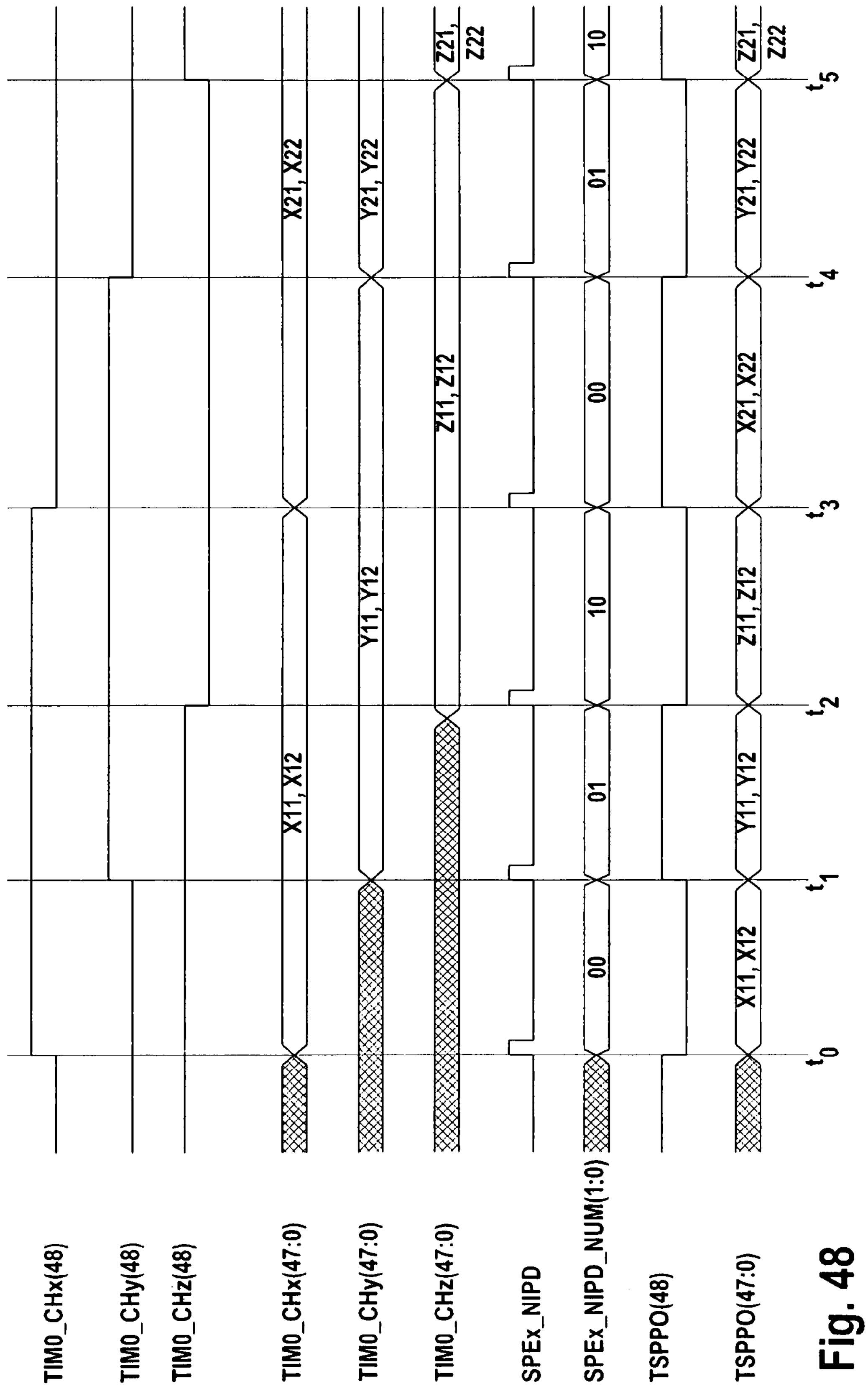

See FIG. 48.

The SPEx_NIPD_NUM input signal determines, which data is routed to the TSPPO signal. At the first edge of TIM0_CHx(48) the new data X11 and X12 are routed to TSPPO(47:0). The values X11 and X12 are the two 24 bit values coming from the TIM input channel TIM0_CHx. The next edge is at time $t_1$ on signal TIM0_CHy(48). Therefore, at time $t_1$ the TSPPO(48) signal level changes and the TSPPO (47:0) is set to Y11 and Y12 and so forth.

MAP Register Overview

The following table gives an overview about the MAP registers

| Register name | Description | Details in Section |
|---|---|---|
| MAP_CTRL | MAP Control register | 0 |

MAP Register Description

Register MAP_CTRL

Register MAP_CTRL

Address Offset: 0x00000000

| | 31 | 30 | 29 | 28 | 27 26 | 25 | 24 |
|---|---|---|---|---|---|---|---|
| Bit | Reserved | TSPP1_I2V | TSPP1_I1V | TSPP1_I0V | Reserved | TSPP1_DLD | TSPP1_EN |
| Mode | R | RW | RW | RW | R | RW | RW |
| Initial Value | 0 | 0 | 0 | 0 | 0 | 0 | 0 |

Address Offset: 0x00000000

| | 23 | 22 | 21 | 20 | 19 18 | 17 | 16 |
|---|---|---|---|---|---|---|---|
| Bit | Reserved | TSPP0_I2V | TSPP0_I1V | TSPP0_I0V | Reserved | TSPP0_DLD | TSPP0_EN |
| Mode | R | RW | RW | RW | R | RW | RW |
| Initial Value | 0 | 0 | 0 | 0 | 00 | 0 | 0 |

Initial Value: 0x0000_0000

| | 15 14 13 12 11 10 9 8 7 6 5 4 | 3 2 1 | 0 |
|---|---|---|---|
| Bit | Reserved | SSL | TSEL |
| Mode | R | RW | RW |
| Initial Value | 0 | 000 | 0 |

Bit 0 TSEL: TRIGGER signal output select.
0 = TIM0_CH0 selected as TRIGGER output signal.
1 = TSPP0_TSPPO selected as TRIGGER output signal.
Bit 3:1 SSL: STATE signal output select.
000: TIM0_CH1 selected as STATE output signal.
001: TIM0_CH2 selected as STATE output signal.
010: TIM0_CH3 selected as STATE output signal.
011: TIM0_CH4 selected as STATE output signal.
100: TIM0_CH5 selected as STATE output signal.
101: TSPP1_TSPPO selected as STATE output signal.
110: Reserved
111: Reserved
Bit 15:4 Reserved: Read as zero, should be written as zero.
Bit 16 TSPP0_EN: Enable of TSPP0 subunit.
0 = TSPP0 disabled.
1 = TSPP0 enabled.
Bit 17 TSPP0_DLD: DIR level definition bit.
0 = SPEx_DIR signal is routed through as is.
1 = SPEx_DIR signal is inverted.
Bit 19:18 Reserved: Read as zero, should be written as zero.
Bit 20 TSPP0_I0V: Enable of TSPP0 TIM0_CHx(48) input line.
0 = Input line enabled.
1 = Input line disabled; input for TSPP0 is set to zero (0).
Bit 21 TSPP0_I1V: Enable of TSPP0 TIM0_CHy(48) input line.
0 = Input line enabled.
1 = Input line disabled; input for TSPP0 is set to zero (0).
Bit 22 TSPP0_I2V: Enable of TSPP0 TIM0_CHz(48) input line.
0 = Input line enabled.
1 = Input line disabled; input for TSPP0 is set to zero (0).
Bit 23 Reserved: Read as zero, should be written as zero.
Bit 24 TSPP1_EN: Enable of TSPP1 subunit.
0 = TSPP1 disabled.
1 = TSPP1 enabled.
Bit 25 TSPP1_DLD: DIR level definition bit.
0 = SPEx_DIR signal is routed through as is.
1 = SPEx_DIR signal is inverted.
Bit 27:26 Reserved: Read as zero, should be written as zero.
Bit 28 TSPP1_I0V: Enable of TSPP1 TIM0_CHx(48) input line.
0 = Input line enabled.
1 = Input line disabled; input for TSPP1 is set to zero (0).

-continued

| Register MAP_CTRL |
|---|
| Bit 29 TSPP1_I1V: Enable of TSPP1 TIM0_CHy(48) input line. |
| 0 = Input line enabled. |
| 1 = Input line disabled; input for TSPP1 is set to zero (0). |
| Bit 30 TSPP1_I2V: Enable of TSPP1 TIM0_CHz(48) input line. |
| 0 = Input line enabled. |
| 1 = Input line disabled; input for TSPP1 is set to zero (0). |
| Bit 31 Reserved: Read as zero, should be written as zero. |

Digital PLL Module (DPLL)

Overview

The digital PLL (DPLL) sub module is used for frequency multiplication. The purpose of this module is to get a higher precision of position or value information also in the case of applications with rapidly changed input frequencies. The resolution of the generated signals is restricted by the period of the system clock used. The input signals to be triggered can be for instance position information of linear or angle motions, mass flow values, temperature, pressure or level of liquids.

The sub module is specified in such a way that it could be used easily by the software and can reduce the load of the CPU by relieving from repeated or periodic standard tasks.

The DPLL has to perform the following tasks:

prediction of the duration of the current increment in section 0 generation of SUB_INC pulses in normal or emergency mode (see section 0)

synchronization of the actual position possibility of seamless switch to emergency mode and back prediction of position and time related events in section 0

Requirements and Demarcation

Up to 2 input signals could be used as trigger signals for the DPLL, one for a more frequent TRIGGER signal and one for a less frequent STATE signal. These signals can be selected from different available choices or be a combination of multiple input signals. The STATE signal is necessary in emergency mode, if no TRIGGER signal is available. Both input signals are combined with a validation signal T_VALID or S_VALID respectively, which shows the appearance of new data and must result in a data fetch and a start of the state machine to perform the calculations (see {REF: DPLL_1511}).

Because a switch in emergency mode can appear suddenly, the corresponding signals resulting from the STATE input should be calculated always as a precaution. The filtering as well as the combination or choice of the input signals is made in the TIM (see chapter 10) sub module by use of a configurable filter algorithm for each slope and signal as well as a multiplexer or a gating circuitry.

The filter delay value of the signal is transmitted in the FT part of the corresponding signal, because the delay conditions of the signals can change during application. The filter delays depend also on the filter algorithms used and therefore the generation of output reference signals have to be implemented properly, controlled by configuration bits in the control registers.

In order to provide the timing conditions to the DPLL the input trigger signals should have a time stamp (and optional in addition a position stamp, as stated above) with an appropriate resolution.

The DPLL delivers a reference signal as output depending on the time stamps of the input signals TRIGGER or STATE respectively and a signal which sends a predefined number of pulses between each active slope of the TRIGGER/STATE signal.

Dependent on configuration different actions in hardware are possible in order to correct a systematic wrong number of pulses.

Block and Interface Description

The block description of the DPLL is shown in the following picture.

DPLL Block Diagram

Figure 49:
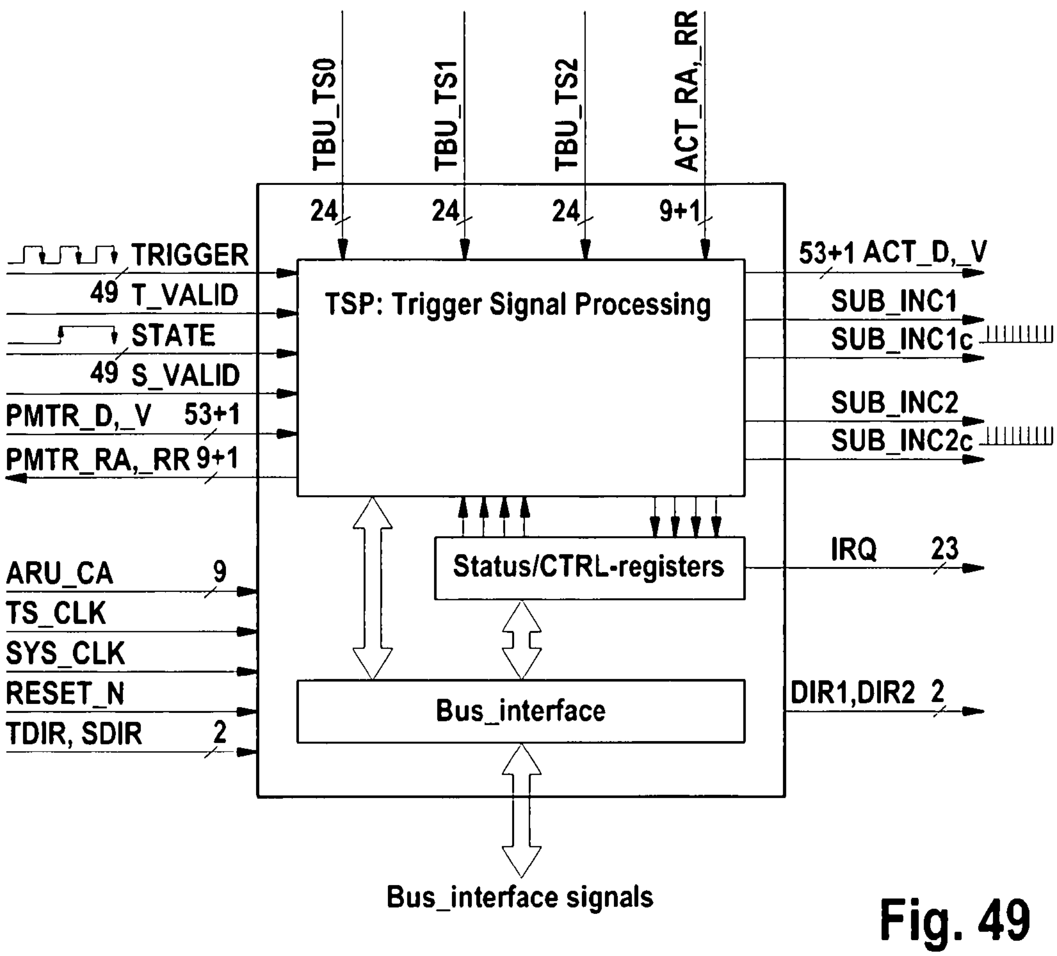

See FIG. 49.

The following table summarizes the interface signals of the DPLL shown by the block diagram above (FIG. 49).

Interface Description of DPLL

| Name | Width | I/O | Description | Comment |
|---|---|---|---|---|
| TRIGGER | 1 × 49 | I | Normal Signal for triggering DPLL by positions/values Bit(48) = TRIGGER_S Bits(47:24) = TRIGGER_FT Bits(23:0) = TRIGGER_TS | 24 bits time stamp, filtered in different modes, 24 bits filter delay value info, one bit signal value (SV) |
| T_VALID | 1 | I | The values of TRIGGER are valid | Announces the arrival of a new TRIGGER value |
| STATE | 1 × 49 | I | Assistance signal for synchronisation STATE(48) = STATE_S STATE(47:24) = STATE_FT STATE(23:0) = STATE_TS | Replacement of signal TRIGGER for emergency situations, bits like above, corresponding; input can also be used for the control of an independent device |

-continued

| Name | Width | I/O | Description | Comment |
|---|---|---|---|---|
| S_VALID | 1 | I | The values of STATE are valid | Announces the arrival of a new STATE value |
| PMTR_D | 53 | I | Position minus time request data, delivered by ARU on request for up to 24 requests PMTR_RR; SV_i = PMTR_D(52:48): ACB bits, directly written to the correspondent ACT_D registers PSAi = PMTR_D(47:24): position value for action DLAi = PMTR_D(23:0) time delay value for action | Data values for calculation of actual ACTIONs; the values are requested by AENi = 1[1)] and CAIP = 0[2)]; a served request is shown by PMTR_V which signals that valid PMTR data arrived and they are written immediately after that to the corresponding RAM regions and registers; |
| PMTR_V | 1 | I | signals a valid PMTR_D value, that means data is delivered on request | when valid: PMTR_D overwrites data in the PSAi and DLAi registers, also when the corresponding ACT_Ni[3)] bit = 1; |
| ARU_CA | 9 | I | Channel address; for valid PMTR addresses: demand data by setting PMTR_RR = 1 when enabled by AENi = 1[1)] and CAIP = 0[2)]; | counter value of ARU selects PMTR_RA and PMTR_RR when a valid address |
| PMTR_RA | 9 | O | read address of PMTR access | reflects ID_PMTR_i according to the selected channel address |
| PMTR_RR | 1 | O | read request of PMTR access; suppressed for CAIP = 1 (see DPLL_STATUS register) | reflects the value of the corresponding AENi[1)] bit while CAIP = 0[2)] |
| ACT_D | 53 | O | Output of a time stamp, a position and a control signal values for a calculated action; SV_i = ACT_D(52:48): ACB bits, directly written from the correspondent PMTR_D signals; ACT_D(47:24) is the calculated position value PSACi for the action in relation to TBU_TS1 or 2[6)] and ACT_D(23:0) is the time stamp value TSAi for the action in relation to TBU_TS0[6)] | Future time stamp, additional position information and additional control bits |
| ACT_V | 1 | O | ACT_D value is available and valid; | for a valid action address: ACT_V reflects the shadow value of ACT_Ni[3)] (ACT_Ni is 1 when new PMTR values are available and the shadow register is updated, when a calculation of the actual PMTR values was done; ACT_Ni remains 1 until the calculated values are in the past or the |

-continued

| Name | Width | I/O | Description | Comment |
|---|---|---|---|---|
| | | | | corresponding AENi[1)] bit is cleared) |
| ACT_RA | 9 | I | ACTION read address; reading is always valid after a first calculation of actual PMTR data | address bits for selection of all 24 action channels |
| ACT_RR | 1 | I | read request of selected action | the action data is demanded from an other module |
| IRQ | 23 | O | Interrupt request output | Interrupts of DPLL |
| SUB_INC1 | 1 | O | Pulse output for TRIGGER input filter | sub-position increment provided continuously |
| SUB_INC2 | 1 | O | Pulse output for STATE input filter | sub-position increment provided continuously |
| SUB_INC1c | 1 | O | Pulse output for time base unit 1 in compensation mode (can stop in automatic end mode) | sub-position increment related to TRIGGER input |
| SUB_INC2c | 1 | O | Pulse output for time base unit 2 in compensation mode (can stop in automatic end mode) | sub-position increment related to STATE input |
| TS_CLK | 1 | I | Time stamp clock | Clock, used for generation of the time stamps |
| SYS_CLK | 1 | I | System clock | High frequency clock |
| RESET_N | 1 | I | Asynchronous reset signal | Low active |
| TBU_TS0 | 24 | I | Actual time stamp from TBU; is needed to decide, if a calculated action is already in the past | 24 bit time input, with a resolution of the time stamp clock |
| TBU_TS1 | 24 | I | Actual position/value stamp 1; for calculation of position stamps (TRIGGER/STATE) | 24 bit pos./val. input, with a resolution of the SUB_INC1 pulses |
| TBU_TS2 | 24 | I | Actual position/value stamp 2; to be implemented for an additional independent position | ditto for SUB_INC2 for calculation of position stamps (STATE) for SMC[5)] = RMO[4)] = 1 |
| TDIR | 1 | I | Direction of TRIGGER input values (TDIR = 0 does mean a forward direction and TDIR = 1 a backward direction) | direction information from multiple sensors valid only for SMC[5)] = 1 |
| SDIR | 1 | I | Direction of STATE input values (SDIR = 0 does mean a forward direction and SDIR = 1 a backward direction) | direction information from multiple sensors valid only for SMC[5)] = 1 |
| DIR1 | 1 | O | Direction information of SUB_INC1 (count forwards for DIR1 = 0 and backwards for DIR1 = 1) | count direction of TBU_TS1; DIR1 changes always after the evaluation of the corresponding valid TRIGGER slope and after incrementing/decrementing of the address pointer |
| DIR2 | 1 | O | Direction information of SUB_INC2 (count forwards for DIR2 = 0 and backwards for DIR2 = 1) | count direction of TBU_TS2; DIR2 changes always after the evaluation of the corresponding valid STATE slope and |

-continued

| Name | Width | I/O | Description | Comment |
|---|---|---|---|---|
| | | | | after incrementing/decrementing of the address pointer |

For references above and below the following hints are used:
[1)]see DPLL_CTRL_x register, x = 2, 3, 4
[2)]see DPLL_STATUS register
[3)]see DPLL_ACT_STA register
[4)]see DPLL_CTRL_0 register
[5)]see DPLL_CTRL_1 register
[6)]see DPLL input signal description DPLL Architecture Purpose of the Module The DPLL generates a predefined number of incremental signal pulses within the period between two events of an input TRIGGER or STATE signal. The resolution and number of the increments is restricted by the frequency of the system clock. Changes in the period length of the input signal will result in a change of the pulse frequency in order to get the same number of pulses. This adoption can be performed by DPLL hardware, software or with support of DPLL hardware in different modes.

The basic part of a DPLL is to make a prediction of the current period between two TRIGGER and/or STATE signal edges. Disturbances, systematic failures must be considered as well as changes in values or positions caused by acceleration and deceleration. Therefore, a good estimation is to be done using some measuring values from the past. When the process to be predicted takes a steady and differentiable course not only the current period but also some more periods for the future can be predicted. In utilisation of such calculations for the current increment also actions for the future can be predicted.

Explanation of the Prediction Methodology

As already shown in chapter 0 the DPLL has to perform different tasks. The basic function for all these tasks is a relation between time intervals in the past. Because the relation between two succeeding intervals at a fixed position remains also valid in the case of acceleration or deceleration the prediction of the duration of the current time interval is done by a similarity transformation. Having a good estimation of the current time interval, all the other tasks can be done easily by calculations explained in section 0.

Clock Topology

All registers are read using the system clock SYS_CLK. The pulses generated have the highest frequency not higher then SYS_CLK. All operations can be performed using the system clock. In the case of no timing critical application and also for the case of power reduction the fast system clock can be replaced by a clock with lower frequency. When using a clock different to the system clock some synchronization registers are needed (not considered here).

Clock Generation

The clock is generated outside the DPLL.

Typical Frequencies

Typical system clock frequencies range from 40 MHz to 150 MHz, for future applications also up to 400 MHz. Frequency ranges for which a special technology of the circuits is needed, should be avoided.

Time Stamps and Systematic Corrections

The time stamps for the input signals TRIGGER and STATE have 24 bits each. These bits represent the value of the 24 bit free running counter running with a clock frequency of a typical 20 MHz. Thus the time stamp represents a relative value of time with a resolution of 50 ns in that typical case.

The input signals have to be filtered. The filter is not part of the DPLL. The time stamps can have a delay caused by the filter algorithm used. There are delayed and undelayed filter algorithms available and the delay value can depend on a time or a position value.

Systematic deviations of TRIGGER inputs can be corrected by a profile, which also considers systematic missing TRIGGERs. The increments containing missing TRIGGERS are divided into the corresponding number of nominal increments with duration comparable with all other increments. In the case of AMT=1 the ADT_Ti values in the RAM do contain the adapting information for the TRIGGER signal in normal mode.

The value PD for the TRIGGER describes the amount of missing or surplus pulses with a sint13 value, to be added to MLT directly (for SMC[5)]=0). The correction value is in this way also applicable in the case of missing TRIGGER inputs for the synchronization gaps, while the value NT in addition describes the number of nominal parts to be considered for the following increment and is stored in the variable SYN_T (see NUTC register in section 0).

In the case of RMO[4)]=1 for SMC[5)]=0 (emergency mode) the time stamp of STATE is used to generate the output signal SUB_INC1.

More inaccuracy should be accepted because usually there are only a few values (SNU[4)]) available for FULL_SCALE.

For the STATE signal the systematic deviations of the increments can be corrected in the same way as for TRIGGER by adaptation information as described below.

Also for the case of systematic missing STATE events, all the increments can be divided into nominal parts of comparable duration using the stored profile information. The number of pulses SUB_INC1 for a nominal STATE increment in emergency mode is given by the value of MLS1=(MLT+1)*(TNU+1)/SNU+1) for SMC=0 in order to get the same number of pulses in FULL_SCALE for normal and emergency mode.

For the case AMS[4)]=1 the adapting values ADT_Si are used for the STATE signal.

The value PD_S for the STATE describes the amount of additional or surplus pulses with a sint16 value, to be added to MLS1.

DPLL Architecture Overview

As shown in 0 the DPLL can process different input signals. The signal TRIGGER is the normal input signal which gives the detailed information of the supervised process. It can be for instance the information of water or other liquid level representing the volume of the liquid, where each millimetre increasing results in a TRIGGER signal generation. In order to get a predefined filling level, without overflow also the inertia of the system must be taken into account. Hence, some delay for closing the inlet valve and also the remaining water amount in the pipe must be considered in order to start the closing action earlier as the filling level will be reached.

A second input signal STATE sends an additional (redundant) information for instance at some centimetres and because of intervals with different distances it gives also information about the system state with the direction of the water flow (in or out), while the TRIGGER signal must not contain information concerning the flow direction. In some applications the inactive slope of TRIGGER can be utilized to transmit a direction information. In the case of faults in the TRIGGER signal the STATE signal is to be processed in order to reach the desired value nevertheless, maybe with some loss of accuracy.

The measuring scale can have some systematic failures, because not all millimetre or centimetre distances measured mean the same value. This could be due to changes in the thickness of the measuring cylinder or the inaccurate position of the marks. These systematic failures are well know by the system and for improvement of the prediction the signals ADT_T and ADT_S for the correction of the systematic failures of TRIGGER and STATE respectively are stored in the internal RAM.

The input signals TRIGGER and STATE are represented as a time stamp signal each, which is stored in the 24 bit TS-part of the corresponding signal.

Information concerning the delay of this signal by filtering of disturbances is stored in the 24 bit FT-part of the signal.

In order to establish the relation of time stamps to the actual time the TBU_TS0[6)] value is also provided showing the actual time value to be compared with future time stamps in order to make a decision.

After reaching the desired water level the water is filled in a bottle by draining. After that the water filling is repeated. The water level at draining is observed by the same sensor signals (the same number of TRIGGER pulses), but the duration of the draining could be different from the filling time. Both times together form the FULL_SCALE region, while one of them is a HALF_SCALE region, which can differ time in i but not in the number of pulses.

For synchronisation purposes some TRIGGER marks can be omitted in order to set the system to a proper synchronisation value (maybe before the upper filling value is reached).

In emergency situations, when the TRIGGER signals are missed the STATE signal is used instead of.

The PMTR_i[6]) signals announce the request for a position minus time calculation for up to 24 events.

All 24 events can be activated using the 24 AENi[I] (action enable) bits. Each of these enable bits are asked by the routing engine for a read access. The corresponding read request is generated by the AENi bit while CAIP is zero. CAIP is one bit of the DPLL_STATUS register with the meaning "calculation of actions in progress", controlled by the state machine (see {REF: DPLL_1511}) for scheduling the operations.

When such a request is serviced by the ARU (in the case CAIP=0) the values for position and time are written in the corresponding RAM 1_a_ region (0x0200 . . . 0x025C for the position value and 0x0260 . . . 0x02BC for the delay value), the control bits for the corresponding action are set accordingly. When a new PMTR value arrives, an old value is overwritten without notice and the ACT_Ni (new action) bit in the DPLL_ACT_STA register is set, which is cleared, when the currently calculated action value is in the past. Overwriting of old information is possible because the read i request to ARU is suppressed during action calculations by the CAIP bit. In this way always the last possible PMTR value is used consistently.

DPLL Architecture Description

The DPLL block diagram 0 will now be explained in detail in combination with some example configuration of the control registers. Let in example TNU[4)] be 0x3B (which is for TNU+1=60 decimal that means 120 events in FULL_SCALE) and MLT[4)] be 0x257 (this means 600 pulses per TRIGGER event). Than you can divide FULL_SCALE into 72000 parts each of them associated with its own pulse. When you run through FULL_SCALE all 72000 pulses should appear but maybe with a different pulse frequency between two TRIGGER events. For this example after each 600 pulses at the SUB_INC1 output the next TRIGGER event is to be expected with the corresponding new time stamp.

Missing pulses due to acceleration have to be taken into account within the next increment. Not one pulse has to be missed or added because of calculation inaccuracy in average for a sufficient number of FULL_SCALE periods. This means that not one pulse is sent in addition and all missing pulses are to be caught up on afterwards.

For correction of systematic missing TRIGGERs the value SYN_T bits of the NUTC register is used, which is got from the ADT_T values in the RAM region 2_c_.

In normal mode the adapt values ADT_T could be used to balance the local systematic inaccuracy of the TRIGGER signal. The value of PD (see 0) is the pulse difference in the current increment and does mean the number of sub pulses to be added to the nominal number of pulses within the corresponding increment. PD is a signed integer value using 13 bits: up to +/−4096 pulses can be added for each increment.

The adapt values could be determined by the CPU (by the calculation of an average over a lot of measuring intervals) and stored in the RAM region 1_c_3 for STATE increments and in RAM region 2_c for TRIGGER increments._

Block diagram of time stamp processing.

Figure 50:
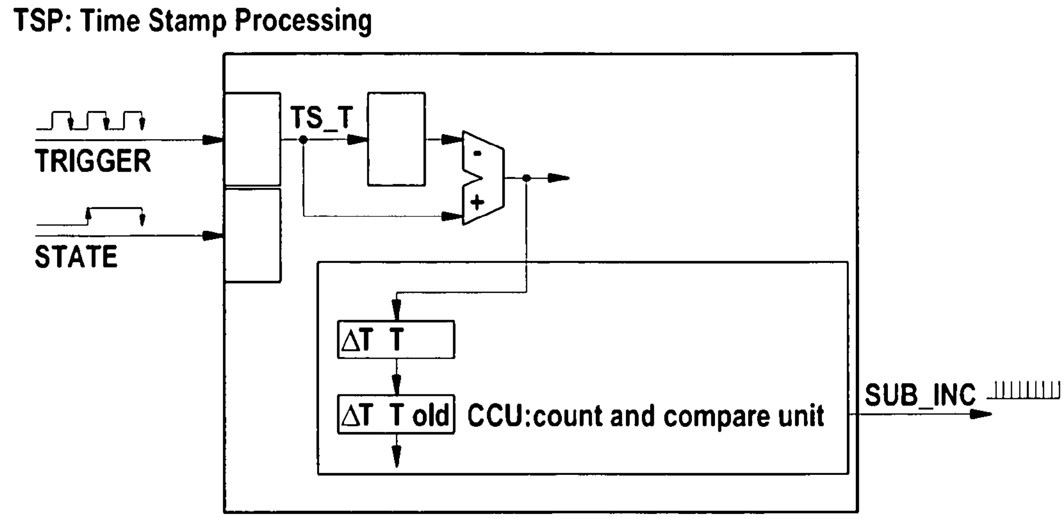

See FIG. 50.

Register and RAM Address Overview

The address map of the DPLL is divided into register and memory regions as defined in Table 0. The addresses from 0x0000 to 0x00FC are reserved for registers, from 0x0100 to 0x01Fc is reserved for action registers to serve the ARU at immediately request.

The RAM is divided into 3 independent accessible parts 1_a_, 1_b_+_c_ and 2.

The part 1_a_ from 0x0200 to 0x03FC is used for PMTR values got from ARU and intermediate calculation values; there is no write access from the CPU possible, while the DPLL is enabled.

The RAM 1_b_ part from 0x0400 to 0x05FC is reserved for RAM variables and the RAM part 1_c_ from 0x0600 to 0x09FC is used for the STATE signal values.

The RAM region 2 from 0x4000 to 0x7FFC is reserved for the TRIGGER signal values. RAM region 1_a_ has a size of 0,375 kBytes, Ram 1_b_+_c_ uses 1,125 kBytes while RAM region 2 is configurable from 1.5 to 12 kBytes, depending on the number of TRIGGER events in FULL_SCALE. The AOSV_2 register is used to determine the beginning of each part.

The table gives the DPLL Address map overview

Register and RAM Address Map

Registers are used to control the DPLL and to show its status. Also parameters are stored in registers when useful. The table below shows the addresses for status and control registers as well as values stored in additional registers. The register values are explained in the description part of this table while the bit positions of the status and control registers are described in detail in section 0. Because the content of some value registers have a meaning related to position information (e.g. the address pointers APT and APS and the address pointers for the corresponding profile values APT_2c and APS_1c3 respectively) it should be noticed that a synchronization is done when the pointers of the profile values are set by the CPU.

The RAM is to be initialized by the CPU.

RAM Region 1*a*: used for storage of PMTR values got from ARU; read and write access by the CPU is only possible, when the DPLL is disabled. The CPU Address range: 0x0200-0x03FC RAM Region 1*b*: usable for intermediate calculations and auxiliary values, data width of 3 bytes used for 24 bit values; a write access to this region results in an interrupt to the CPU, when enabled. Address range: 0x0400-0x05FC

| Addr. range Start | Addr. range End | Value number | Byte # | Content | Indication | Region | RAM size |
|---|---|---|---|---|---|---|---|
| 0x0000 | 0x0FC | 64 | 256 | Register | used/ reserved | 0 | no RAM |
| 0x100 | 0x1FC | 64 | 192 | ACTION registers | direct read from ARU | 0 | no RAM |
| 0x0200 | 0x03FC | 128 | 384 | PMTR values RAM 1a | CPU R/Pw access, when DPLL disabled; ARU has highest priority | 1a with own ports | RAM part 1a: 0.375 kbytes |
| 0x0400 | 0x05FC | 128 | 384 | Variables RAM 1b | R and monitored W access by the CPU | 1b | RAM part 1b + c: 1.125 kbytes |
| 0x0600 | 0x09FC | 256 | 768 | STATE data | R and monitored W access by the CPU | 1c | |
| 0x0600 | 0x06FC | 64 | 192 | RDT_Si | STATE reciprocal values | 1c1 | |
| 0x0700 | 0x07FC | 64 | 192 | TSF_Si | STATE TS values | 1c2 | |
| 0x0800 | 0x08FC | 64 | 192 | ADT_Si | adapt values of STATE | 1c3 | |
| 0x0900 | 0x09FC | 64 | 192 | DT_Si | nom. STATE inc | 1c4 | |
| 0x4000 | 0x47FC . . . 0x7FFC | 512 . . . 4096 | 1536 . . . 12288 | TRIGGER data | R and monitored W access of CPU | 2 | RAM part 2: 1.5 . . . 12 kbytes |
| 0x4000 | 0x41FC . . . 4FFC | 128 . . . 1024 | 384 . . . 3072 | RDT_Ti | TRIGGER reciprocal values | 2a | |
| 0x4200 . . . 5000 | 0x43FC . . . 5FFC | 128 . . . 1024 | 384 . . . 3072 | TSF_Ti | TRIGGER TS values | 2b | |
| 0x4400 . . . 6000 | 0x45FC . . . 6FFC | 128 . . . 1024 | 384 . . . 3072 | ADT_Ti | adapt values of TRIGGER | 2c | |
| 0x4600 . . . 7000 | 0x47FC . . . 7FFC | 128 . . . 1024 | 384 . . . 3072 | DT_Ti | nom. TRIGGER increments | 2d | |

RAM Region 1

RAM region 1 has a size of 1.5 kBytes and is used to store variables and parameters as well as the measured and calculated values for increments of STATE. The RAM 1 region is divided into two independent accessible RAM parts with own ports. The address information is shown in the table above and the detailed description is performed in the following sections. The RAM 1*a* is used to store the PMTR values got from ARU and in addition some intermediate calculation results or actions. RAM region 1*b* is used for variables needed for the prediction of increments, while RAM 1*c* is used to store time stamps, profile and durations for all the STATE inputs of the last FULL_SCALE region. All variables and values of RAM 1*b*+*c* part use a data width of up to 24 bits.

RAM Region 1*c*: Values of all STATE increments in FULL_SCALE, data width of 3 bytes used for 24 bit values;

a write access to this region results in an interrupt to the CPU, when enabled address range: 0x0600-0x09FC In RAM region 1*c* there is a difference in the amount of data. While for the RAM regions 1*c*1, 1*c*3 and 1*c*4 there are 2*(SNU+1−SYN_NS) entries, for the RAM region 1*c*2 there are 2*(SNU+1) entries. For the latter also the virtual events are considered, that means the gap is divided into equidistant parts each having the same position share as increments without a gap. For that reason the CPU must extend the stored TSF_Si values in the RAM region 1$c$2 before the APT_1c3 is written. The write access to APT_1c3 sets the SYS bit in the DPLL_ Status register in order to show the end of the synchronization process. Only when the SYS bit is set the PMTR values can consider more then the last increment duration for the action prediction by setting NUSE to a corresponding value.

RAM Region 2

The RAM region 2 has a configurable size of 1.5 to 12 kBytes and is used to store measured and calculated values for increments of TRIGGER. The address information is explained later on.

Because of up to 512 TRIGGER events in HALF_SCALE the fields 2$a$, b c and d must have up to 1024 storage places each. For 3 Bytes word size this does mean up to 12 k Byte of RAM region 2.

In order to save RAM size for configurations with less TRIGGER events the RAM is configurable by the offset switch Register OSW (0x001C) and the address offset value register of RAM region 2 AOSV_2 (0x0020). The RAM is to be initialized by the CPU.

In RAM region 2 there is a difference in the amount of data. While for the RAM regions 2$a$, 2$c$ and 2$d$ there are 2*(TNU+1−SYN_NT) entries, for the RAM region 2$b$ there are 2*(TNU+1) entries. For the latter also the virtual events are considered, that means the gap is divided into equidistant parts each having the same position share as increments without a gap. For that reason the CPU must extend the stored TSF_Ti values in the RAM region 2$b$ before the APT_2c is written.

The write access to APT_2c sets the SYT bit in the DPLL_ Status register in order to show the end of the synchronization process. Only when the SYT bit is set the PMTR values can consider more then the last increment duration for the action prediction by setting NUTE to a value greater then one.

Prediction of Next Increment

Increment Prediction in Normal Mode Forwards (DIR1=0)

For the prediction of actions in normal mode the values of RAM region 2$a$ are calculated as described in the following equations.

Please note, that the ascending order of calculation must be hold in order not to lose results still needed. It is important to calculate all equations to 16.14 before 16.1a4 . . . 7, 16.1b1 and 16.1c1, while the last one overwrites DT_Ti when NUTE (see section 0) is set to the FULL_SCALE range. Because the old value of DT_Ti is also needed for equation 16.10 and 16.11 this value is stored temporarily at DT_T_actual as shown by equation 16.1a or 16.1b respectively until all prediction calculations are done and after that equation 16.1a4 . . . 7, 16.1b1 and 16.1c1 updates DT_Ti: update DT_Ti after calculations of equation 16.14. For p=APT calculates in normal mode:

Equations 16.1a to Calculate TRIGGER Time Stamps

[1)] Consider values, calculated for the last increment; position related filter values are only considered up to at least 1 ms time between two TRIGGER events.

For calculation of time stamps use the filter delay information $$TS\_T = TRIGGER\_TS \text{ (unchanged for } IDT=0) \tag{16.1a0}$$

$$TS\_T = TS\_T - FTV\_T \text{ (for } IDT=1 \text{ and } IFP=0) \tag{16.1a1}$$

$$TS\_T = TS\_T - FTV\_T*(CDT\_TX/NMB\_T)\_old^{1)} \text{ for } (IDT=1 \text{ and } IFP=1) \tag{16.1a2}$$

this can be also calculated using the value of ADD_IN_ CAL_N:

$$TS\_T = TS\_T - FTV\_T*(1/ADD\_IN\_CAL\_N\_old^{1)}) \text{ for } (IDT=1 \text{ and } IFP=1) \tag{16.1a3}$$

NOTE: CDT_TX is the predicted duration of the last TRIGGER increment and NMB_T the calculated number of SUB_INC1 events in the last increment, because the new calculations are done by equations 16.5 and 16.21 for the current increment after that. Therefore in equation 16.1a3 the value ADD_IN of the last increment is used (see equation 16.25). SYN_T_old is the number of TRIGGER events including missing TRIGGERs as specified in the NUTC register for the last increment, with the initial value of 1.

For storage of time stamps in the RAM see also equations 16.1a4 ff. after calculation of actions Equation 16.1b to Calculate DT_T_Actual (Nominal Value)

$$DT\_T\_actual = (TS\_T - TS\_T\_old)/SYN\_T\_old \tag{16.1b}$$

For the case SYT=0 (still no synchronization to the profile) the values SYN_T and SYN_T_old are still assumed as having the value 1.

Equation 16.1c to Calculate RDT_T_Actual (Nominal Value)

$$RDT\_T\_actual = 1/DT\_T\_actual \tag{16.1c}$$

Equation 16.2a1 to Calculate QDT_T_Actual

Relation of the recent last two increment values for APT=p in forward direction (DIR1=0)

$$QDT\_T\_actual = DT\_T\_actual*RDT\_T(p-1) \tag{16.2a1}$$

QDT_T_actual as well as QDT_Ti have a 24 bit resolution and its relation value multiplied with $2^{20}$ Equation 16.3 to Calculate the Error of Last Prediction When q=NUTE consider for the error calculation only the last valid prediction values for DIR1=0:

Calculate the error of the last prediction when using only RDT_T(p−q−1), DT_T(p−q) and DT_T(p−1) for the prediction of DT_Tp:

$$EDT\_T = DT\_T\_actual - (DT\_T(p-1)*QDT\_T(p-q)) \tag{16.3}$$

with $$QDT\_T(p-q) = DT\_T(p-q)*RDT\_T(p-q-1) \tag{16.2b}$$

Equation 16.4 to calculate the weighted average error $$MEDT\_T := (EDT\_T + MEDT\_T)/2 \tag{16.4}$$

Equations 16.5 to Calculate the Current Increment Value Nominal Increment Value:

$$CDT\_TX\_nom = (DT\_T\_actual + MEDT\_T)*QDT\_T(p-q+1) \tag{16.5a}$$

with (for q>1):

$$QDT\_T(p-q+1) = DT\_T(p-q+1)*RDT\_T(p-q) \tag{16.2c}$$

and for q=1 use equation 16.2a1.

the expected duration to the next TRIGGER event $$CDT\_TX = CDT\_TX\_nom*SYN\_T \tag{16.5b}$$

Note: In the case of an overflow in equations 16.5a or b set the value to 0xFFFFFF and the corresponding CTON or CTO bit in the DPLL_STATUS register.

Increment Prediction in Emergency Mode Forwards (DIR2=0)

Please note, that the ascending order of calculation for RAM region 1c must be hold in order not to lose results still needed. The same considerations as done for DT_T_actual are valid for DT_S_actual (equation 16.6a4 . . . 7, 16.6b1 and 16.6c1): update TD_Si after calculations of equation 16.14.

When using filter information of STATE_FT, selected by IDS=1, it must be distinguished by IFP, if this filter information is time or position related:

Equations 16.6a to Calculate STATE Time Stamps

For calculation of time stamps use the filter delay information and use p=APS while DIR2=0:

$$TS\_S=STATE\_TS \text{ (for } IDS=0\text{, received unchanged value)} \quad (16.6a0)$$

$$TS\_S=TS\_S-FTV\_S \text{ (for } IDS=1 \text{ and } IFP=0) \quad (16.6a1)$$

$$TS\_S=TS\_S-FTV\_S*(CDT\_SX/NMB\_S)\_old^{1)} \text{ (for } IDS=1 \text{ and } IFP=1) \quad (16.6a2)$$

this can be also calculated using the value of ADD_IN_CAL_E:

$$TS\_S=TS\_S-FTV\_S*(ADD\_IN\_CAL\_E)\_old^{1)} \text{ (for } IDS=1 \text{ and } IFP=1) \quad (16.6a3)$$

see also equations 16.6a4 ff. at chapter 0 for TRIGGER.

1) Consider values, calculated for the last increment; position related filter values are only considered up to at least 1 ms time between two STATE events.

Note: CDT_SX is the predicted duration of the last STATE increment and NMB_S the calculated number of SUB_INC1 events in the last increment, because the new calculations are done by equations 16.10 and 16.22 respectively for the current increment after that. Therefore in equation 16.6a3 the value ADD_IN of the last increment is used (see equation 16.26). SYN_S_old is the number of increments including missing STATEs as specified in the NUSC register for the last increment with the initial value of 1. The update to the RAM region 1*c*4 is done after all related calculations (see equation 16.6d—after 16.14—for this reason).

Equation 16.6b to Calculate DT_S_Actual (Nominal Value)

$$DT\_S\_actual=(TS\_S-TS\_S\_old)/SYN\_S\_old \quad (16.6b)$$

For the case SYS=0 (still no synchronization to the profile) the values SYN_S and SYN_S_old are still assumed as having the value 1.

Equation 16.6c to Calculate RDT_S_Actual (Nominal Value)

$$RDT\_S\_actual=1/DT\_S\_actual \quad (16.6c)$$

Equation 16.7a1 to Calculate QDT_S_Actual for APS=p in forward direction (DIR2=0)

$$QDT\_S\_actual=DT\_S\_actual*RDT\_S(p-1) \quad (16.7a1)$$

QDT_S_actual as well as QDT_Si have a 24 bit resolution and its relation value multiplied with $2^{20}$ Equation 16.8 to Calculate the Error of Last Prediction with q=NUSE when using QDT_S(p−q) and DT_S(p−1) for the prediction of DT_Sp $$EDT\_S=DT\_S\_actual-(DT\_S(p-1)*QDT\_S(p-q)) \quad (16.8)$$

and with $$QDT\_S(p-q)=DT\_S(p-q)*RDT\_S(p-q-1) \quad (16.7b)$$

Equation 16.9 to Calculate the Weighted Average Error $$MEDT\_S:=(EDT\_S+MEDT\_S)/2 \quad (16.9)$$

Equations 16.10 to Calculate the Current Increment (Nominal Value)

$$CDT\_SX\_nom=(DT\_S\_actual+MEDT\_S)*QDT\_S(p-q+1) \quad (16.10a)$$

with $$QDT\_S(p-q+1)=DT\_S(p-q+1)*RDT\_S(p-q) \text{ (for } q>1) \quad (16.7c)$$

see equation 16.7a for q=1 and the expected duration to the next STATE event $$CDT\_SX=CDT\_SX\_nom*SYN\_S \quad (16.10b)$$

Note: In the case of an overflow in equations 16.10a or b set the value to 0xFFFFFF and the corresponding CSON or CSO bit in the DPLL_STATUS register. All 5 steps above (16.6 to 16.10) are only needed in emergency mode. For the normal mode the calculations of equations 16.6 and 16.7 are done solely in order to get the values needed for a sudden switch to emergency mode.

Increment Prediction in Normal Mode Backwards (DIR1=1)

Equations 16.2a2 to Calculate QDT_T_Actual Backwards $$QDT\_T\_actual=DT\_T\_actual*RDT\_T(p+1) \quad (16.2a2)$$

QDT_T_actual as well as QDT_Ti have a 24 bit resolution and its relation value multiplied with $2^{20}$ Equation 16.3a to Calculate of the Error of Last Prediction When q=NUTE and DIR1=1 using only RDT_T(p+q+1), DT_T(p+q) and DT_T(p+1) for the prediction of DT_Tp $$EDT\_T=DT\_T\_actual-(DT\_T(p+1)*QDT\_T(p+q) \quad (16.3a)$$

with $$QDT\_T(p+q)=DT\_T(p+q)*RDT\_T(p+q+1) \quad (16.2b1)$$

Equation 16.4 to Calculate the Weighted Average Error $$MEDT\_T:=(EDT\_T+MEDT\_T)/2 \quad (16.4)$$

Equation 16.5 to Calculate the Current Increment Value $$CDT\_TX\_nom=(DT\_T\_actual+MEDT\_T)*QDT\_T(p+q-1) \quad (16.5a1)$$

with $$QDT\_T(p+q-1)=DT\_T(p+q-1)*RDT\_T(p+q) \text{ (for } q>1) \quad (16.2c1)$$

for q=1 use equation 16.2a1.

and the expected duration to the next TRIGGER event $$CDT\_TX=CDT\_TX\_nom*SYN\_T \quad (16.5b)$$

Note: In the case of an overflow in equations 16.5a or b set the value to 0xFFFFFF and the corresponding CTON or CTO bit in the DPLL_STATUS register.

Increment Prediction in Emergency Mode Backwards (DIR2=1)

Equation 16.7a2 to Calculate QDT_S_Actual Backwards $$QDT\_S\_actual=DT\_S\_actual*RDT\_S(p+1) \quad (16.7a2)$$

Equation 16.8a to Calculate the Error of the Last Prediction

While q=NUSE, use only QDT_S(p+q) and DT_S(p+1) for the prediction of DT_Sp $$EDT\_S=DT\_S\_actual-(DT\_S(p+1)*QDT\_S(p+q)) \quad (16.8a)$$

with $$QDT\_S(p-q)=DT\_S(p+q)*RDT\_S(p+q+1) \quad (16.7b1)$$

Equation 16.9 to Calculate the Weighted Average Error $$MEDT\_S:=(EDT\_S+MEDT\_S)/2 \quad (16.9)$$

Equations 16.10 to Calculate the Current Increment Value $$CDT\_SX\_nom=(DT\_S\_actual+MEDT\_S)*QDT\_S(p+q-1) \quad (16.10a)$$

with $$QDT\_S(p+q-1)=DT\_S(p+q-1)*RDT\_S(p+q) \text{ (for } q>1) \quad (16.7c1)$$

for q=1 use equation 16.7a.

and calculate the expected duration to the next STATE event $$CDT\_SX=CDT\_SX\_nom*SYN\_S \quad (16.10b)$$

Note: In the case of an overflow in equations 16.10a or b set the value to 0xFFFFFF and the corresponding CSON or CSO bit in the DPLL_STATUS register. All 5 steps above (16.6 to 16.10) are only needed in emergency mode. For the normal mode the calculations of equations 16.6 and 16.7 are done solely in order to get the values needed for a sudden switch to emergency mode.

Calculations for Actions

As already shown for the calculation of the current interval by equations 16.1 to 16.10 for the prediction of actions a similar calculation is to be done, as shown by the equations 16.11. to 16.14. The calculation of actions is also needed when the DPLL is used for synchronous motor control applications (SMC=1, see DPLL_CTRL_1 register). For action prediction purposes the measured time periods of the paste (one FULL_SCALE back, when the corresponding NUTE or NUSE values are set properly by the CPU) are used. The calculation can be explained by the following assumptions, which are considerably simple:

Take the corresponding increments for prediction in the past and put the sum of it in relation to the increment (DT_T_, DT_S_, which is represented by the time stamp difference) which is exactly one FULL_SCALE period in the past (16.11 or 16.13 respectively). Make a prediction for the coming sum of increments using the current measured increment (DT_T_actual or DT_S_actual respectively, that means 16.1 or 16.6 respectively) and add a weighted average error (16.3 and 16.4 or 16.8 and 16.9 respectively, calculated for one increment prediction) before multiplication with the relation of equation 16.11 or 16.13 respectively in order to get the result as described by equations 16.12 or 16.14 respectively.

In order to avoid division operations instead of the increment (DT_T_, DT_S_) in the paste its reciprocal value (RDT_T_, RDT_S_) is used, which is stored also in RAM. For the calculation of actions perform always a new refined calculation as long as the resulting time stamp is not in the past. In the other case the corresponding ACT_Ni bit in the DPLL_ACT_STA register is reset. Each new PMTR_i value will set this ACT_Ni bit again and result in a new calculation.

Calculations in Normal Mode forwards valid for RMO=0 or for SMC=1

Equation 16.11a1 to Calculate the Time Prediction for an Action

For p=APT_2b, t=APT, m=NAi (part w), mb=NAi(part b), NUTE=q>m and DIR1=0 calculate:

$$PDT\_Ti=(TSF\_T(p+m-q)-TSF\_T(p-q)+mb*DT\_T\_\text{actual})*RDT\_T(t-q) \quad (16.11a1)$$

For SMC=0 and RMO=0 calculate for DIR1=0 all 24 actions in forward direction, if requested; in the case SMC=1 calculate up to 12 actions 0 to 11 in dependence of the TRIGGER input.

Equation 16.11a2 to Calculate the Time Prediction for an Action

For SYT=1, FS=1 and hence (because of the cyclic storage) for NUTE=2*(TNU+1) and DIR1=0 equation 16.11a2 is equal to $$PDT\_Ti=(TSF\_T(p+m)-TSF\_T(p)+mb*DT\_T\_\text{actual})*RDT\_Tt \quad (16.11a2)$$

Equation 16.11b to Calculate the Time Prediction for an Action for DIR1=1, NUTE=q<m, q>1 and t=APT:

$$PDT\_Ti=(m+mb)*DT\_T(t-q+1)*RDT\_T(t-q) \quad (16.11b)$$

Note: Make the calculations above before updating the TSF_Ti values according to equations 16.1c3 ff.

Equation 16.11c to Calculate the Time Prediction for an Action for q=1 (as well as for SYT=0)

$$PDT\_Ti=(m+mb)*DT\_T\_\text{actual}*RDT\_T(t-1) \quad (16.11c)$$

Note: For the relevant last increment add the fractional part of DT_T_actual as described in NAi.

Equation 16.12 to Calculate the Duration Value Until Action $$DTAi=(DT\_T\_\text{actual}+MEDT\_T)*PDT\_Ti \quad (16.12)$$

Note: All 5 steps in equations 16.11 to 16.12 are only calculated in normal mode.

Calculations in Normal Mode Backwards valid for RMO=0 or for SMC=1

For SMC=0 and DMO=0 calculate for DIR1=1 all 24 actions in backward direction for special purposes; in the case SMC=1 calculate up to 12 actions 0 to 11 in dependence of the TRIGGER input.

Equation 16.11a3 to Calculate the Time Prediction for an Action

For p=APT_2b, t=APT, m=NAi (part w), mb=NAi(part b), q=NUTE calculate:

$$PDT\_Ti=(TSF\_T(p-m+q)-TSF\_T(p+q)+mb*DT\_T\_\text{actual})*RDT\_T(t+q) \quad (16.11a3)$$

Equation 16.11a4 to Calculate the Time Prediction for an Action

For SYT=1, FS=1 and hence (because of the cyclic storage) for NUTE=2*(TNU+1) and DIR1=1 this is equal to $$PDT\_Ti=(TSF\_T(p-m)-TSF\_T(p)+mb*DT\_T\_\text{actual})*RDT\_Tt \quad (16.11a4)$$

Note: Make the calculations above before updating the TSF_Ti values according to equations 16.1c3 ff.

Equation 16.11b1 to Calculate the Time Prediction for an Action

For NUTE=q<m the following equation is valid for q>1 and t=APT:

$$PDT\_Ti=(m+mb)*DT\_T(t+q-1)*RDT\_T(t+q) \quad (16.11b1)$$

Equation 16.11c1 to Calculate the Time Prediction for an Action for q=1 (as well as for SYT=0)

$$PDT\_Ti=(m+mb)*DT\_T\_\text{actual}*RDT\_T(t+1) \quad (16.11c1)$$

Note: For the relevant last increment add the fractional part of DT_T_actual as described in NAi.

Equation 16.12 to Calculate the Duration Value for an Action $$DTAi=(DT\_T\_\text{actual}+MEDT\_T)*PDT\_Ti \quad (16.12)$$

Use the results of equations 16.1a, b, 16.3 and 16.4 for the above calculation

Note: All 5 steps in equations 16.11 to 16.12 are only calculated in normal mode.

Calculations in Emergency Mode Forwards valid for RMO=1

For SMC=0 and RMO=1 calculate for DIR2=0 all 24 actions in forward direction, if requested; in the case SMC=1 and RMO=1 calculate up to 12 actions 12 to 23 in dependence of the STATE input.

Equation 16.13a1 to Calculate the Time Prediction for an Action

For p=APS_1c2, t=APS, m=Nai(part w) mb=Nai(part b), NUSE=q>m calculate:

$$PDT\_Si=(TSF\_S(p+m-q)-TSF\_S(p-q)+mb*DT\_S\_\text{actual})*RDT\_S(t-q) \quad (16.13a1)$$

Equation 16.13a2 to Calculate the Time Prediction for an Action

For SYS=1, FS=1 and hence (because of the cyclic storage) for NUSE=2*(SNU+1) equation 16.13a1 is equal to $$PDT\_Si=(TSF\_S(p+m)-TSF\_S(p)+mb*DT\_S\_actual)*RDT\_St \quad (16.13a2)$$

Equation 16.13b to Calculate the Time Prediction for an Action

For NUSE=q<m and q>1:

$$PDT\_Si=m*DT\_S(p-q+1)*RDT\_S(p-q) \quad (16.13b)$$

Equation 16.13c to Calculate the Time Prediction for an Action for q=1

$$PDT\_Si=m*DT\_S\_actual*RDT\_S(p-1) \quad (16.13c)$$

Equation 16.14 to Calculate the Duration Value for an Action $$DTAi=(DT\_S\_actual+MEDT\_S)*PDT\_Si \quad (16.14)$$

Use the results of 16.7, 16.8 and 16.9 for the above calculation

Note: All 5 steps of equations 16.13 to 16.14 are only calculated in emergency mode.

Calculations in Emergency Mode Backwards valid for RMO=1

For SMC=0 and RMO=1 calculate for DIR2=1 all 24 actions in backwards mode for special purposes; in the case SMC=1 and RMO=1 calculate up to 12 actions 12 to 23 in dependence of the STATE input.

Equation 16.13a3 to Calculate the Time Prediction for an Action

For p=APS_1c2, t=APS, m=Nai(part w) mb=Nai(part b), NUSE=q≥m calculate $$PDT\_Si=(TSF\_S(p-m+q)-TSF\_S(p+q)+mb*DT\_S\_actual)*RDT\_S(t+q) \quad (16.13a3)$$

Equation 16.13a4 to Calculate the Time Prediction for an Action

For SYS=1, FS=1 and hence (because of the cyclic storage) for NUSE=2*(SNU+1) equation 16.13a3 is equal to $$PDT\_Si=(TSF\_S(p-m)-TSF\_S(p)+mb*DT\_S\_actual)*RDT\_St \quad (16.13a4)$$

Equation 16.13b1 to Calculate the Time Prediction for an Action

For NUSE=q<m and q>1:

$$PDT\_Si=m*DT\_S(p+q-1)*RDT\_S(p+q) \quad (16.13b1)$$

Equation 16.13c1 to Calculate the Time Prediction for an Action for q=1

$$PDT\_Si=m*DT\_S\_actual*RDT\_S(p+1) \quad (16.13c1)$$

Equation 16.14 to Calculate the Duration Value Until Action $$DTAi=(DT\_S\_actual+MEDT\_S)*PDT\_Si \quad (16.14)$$

Use the results of 16.7, 16.8 and 16.9 for the above calculation

Note: All 5 steps of equations 16.13 to 16.14 are only calculated in emergency mode.

Update of RAM in Normal and Emergency Mode

After considering the calculations for up to all 24 actions according to equations (16.11, 16.12), also when not performed, set time stamp values and durations of increments in the RAM:

Equation 16.1a4 to Update the Time Stamp Values for Trigger $$TSF\_T(s)=TS\_T \quad (16.1a4)$$

Store the time stamp values in the time stamp field according to the address pointer APT_2b=s, but make this update only after the calculation of actions 0 because the old TSF_Ti values are still needed for these calculations. Please note that the address pointer after a gap is still incremented by SYN_T_old in that case (see state machine step 1 in chapter 0).

Equation 16.1a5-7 to Extend the Time Stamp Values for TRIGGER when SYT=1, SYN_T_old=r>1 and DIR1=0

$$TSF\_T(s-1)=TSF\_T(s)-DT\_T\_actual \quad (16.1a5)$$

$$TSF\_T(s-2)=TSF\_T(s-1)-DT\_T\_actual \quad (16.1a6)$$

until $$TSF\_T(s-r+1)=TSF\_T(s-r+2)-DT\_T\_actual \quad (16.1a7)$$

after the incrementation of the pointer APT_2b by SYN_T_old

Equations 16.1a5-7 for Backward Direction when SYT=1, SYN_T_old=r>1 and DIR1=1

$$TSF\_T(s+1)=TSF\_T(s)-DT\_T\_actual \quad (16.1a5)$$

$$TSF\_T(s+2)=TSF\_T(s+1)-DT\_T\_actual \quad (16.1a6)$$

until $TSF\_T(s+r-1)=TSF\_T(s+r-2)-DT\_T\_actual$ (16.1a7)

after the decrementation of the pointer APT_2b by SYN_T_old

Equations 16.1b1 and 16.1c1 to Update the RAM after Calculation $$DT\_Tp=DT\_T\_actual \quad (16.1b1)$$

$$RDT\_Tp=RDT\_T\_actual \quad (16.1c1)$$

store increment duration and reciprocal value in RAM after calculation of actions and before a new TRIGGER increment begins in normal and emergency mode.

Equation 16.6a4 to Update the Time Stamp Values for State $$TSF\_S(s)=TS\_S \quad (16.6a4)$$

Store the time stamp value in the time stamp field according to the address pointer APS_1c2=s, but make this update only after the calculation of actions (equations 16.13a2, 0 or 16.13a4 0, if applicable) because the old TSF_Si values are still needed for these calculations. Please note, that the address pointer after a gap is still incremented by SYN_S_old in that case (see state machine step 21 in chapter 0).

Equations 16.6a5-7 to Extend the Time Stamp Values for State

When SYS=1 and SYN_S_old=r>1 and DIR2=0 calculate $$TSF\_S(s-1)=TSF\_S(s)-DT\_S\_actual \quad (16.6a5)$$

$$TSF\_S(s-2)=TSF\_S(s-1)-DT\_S\_actual \quad (16.6a6)$$

until $$TSF\_S(s-r+1)=TSF\_S(s-r+2)-DT\_S\_actual \quad (16.6a7)$$

after incrementation of the pointer APS_2b by SYN_S_old

Equations 16.6a5-7 for Backward Direction

When SYS=1 and SYN_S_old=r>1 and DIR2=1 calculate $$TSF\_S(s+1)=TSF\_S(s)-DT\_S\_actual \quad (16.6a5)$$

$$TSF\_S(s+2)=TSF\_S(s+1)-DT\_S\_actual \quad (16.6a6)$$

until $$TSF\_S(s+r-1)=TSF\_S(s+r-2)-DT\_S\_actual \quad (16.6a7)$$

Equations 16.6b1 and 16.6c1 to Update the RAM After Calculation $$DT\_Sp=DT\_S\_\text{actual} \quad (16.6b1)$$

$$RDT\_Sp=RDT\_S\_\text{actual} \quad (16.6c1)$$

before a new STATE increment begins in normal and emergency mode.

store increment duration and reciprocal value in RAM after calculation of actions and before a new STATE increment begins in normal and emergency mode.

Time and Position Stamps for Actions in Normal Mode

Equation 16.15 to Calculate the Action Time Stamp $$TSAi=DTAi-DLAi+TS\_T \text{ (for } DTAi>DLAi) \quad (16.15)$$

$$TSAi=TS\_T \text{ (for } DTAi<DLAi) \quad (16.15)$$

calculation is done after the calculation of the current expected duration value according to equation 16.12, 0 the time stamp of the action can be calculated as shown in equation 16.15 using the delay value of the action and the current time stamp.

Equations 16.17 to Calculate the Position Stamp Forwards for DIR1=0

$$PSACi=((DTAi-DLAi)*RCDT\_TX\_\text{nom})*(MLT+1)+PSTC \quad (16.17)$$

with $$RCDT\_TX\_\text{nom}=RCDT\_TX*\text{SYN}\_T \quad (16.17a)$$

and $$RCDT\_TX=1/CDT\_TX \quad (16.17b)$$

use the calculated value of (16.17b) also for the generation of SUB_INCi and serve the action by transmission of TSAi and PSACi to ACT_D_i The action is to be updated for each new TRIGGER event until the calculated time stamp is in the past. Because of the non blocking read operation the ACT_D values can be read repeatedly.

Equations 16.17 to Calculate the Position Stamp Backwards For DIR1=1

$$PSACi=PSTC-((DTAi-DLAi)*RCDT\_TX\_\text{nom})*(MLT+1) \quad (16.17c)$$

with $$RCDT\_TX\_\text{nom}=RCDT\_TX*\text{SYN}\_T \quad (16.17a)$$

and $$RCDT\_TX=1/CDT\_TX \quad (16.17b)$$

use the calculated value of (16.17b) also for the generation of SUB_INCi and serve the action by transmission of TSAi and PSACi to ACT_D_i The action is to be updated for each new TRIGGER event until the calculated time stamp is in the past. Because of the non blocking read operation the ACT_D values can be read repeatedly.

Time and Position Stamps for Actions in Emergency Mode

Equation 16.18 to Calculate the Action Time Stamp $$TSAi=DTAi-DLAi+TS\_S \quad (16.18)$$

calculation is done after the calculation of the current expected duration value according to equation 16.14, 0 the time stamp of the action can be calculated as shown in equation 16.18 using the delay value of the action and the current time stamp Equations 16.20 to Calculate the Position Stamp Forwards for DIR2=0

$$PSACi=((DTAi-DLAi)*RCDT\_SX\_\text{nom})*MLS1+PSSC \quad (16.20)$$

with $$RCDT\_SX\_\text{nom}=RCDT\_SX*\text{SYN}\_S \quad (16.20a)$$

and $$RCDT\_SX=1/CDT\_SX \quad (16.20b)$$

use the calculated value of (16.20b) also for the generation of SUB_INCi.

and serve the action by transmission of TSAi and PSACi to ACT_D.

The action is to be updated for each new STATE event until the event is in the past. Because of the blocking read operation the ACT_D values can be read only once.

Equations 16.20 to Calculate the Position Stamp Backwards For DIR2=1

$$PSACi=PSSC-((DTAi-DLAi)*RCDT\_SX\_\text{nom})*MLS1 \quad (16.20c)$$

with $$RCDT\_SX\_\text{nom}=RCDT\_SX*\text{SYN}\_S \quad (16.20a)$$

and $$RCDT\_SX=1/CDT\_SX \quad (16.20b)$$

use the calculated value of (16.20b) also for the generation of SUB_INCi.

and serve the action by transmission of TSAi and PSACi to ACT_D.

The action is to be updated for each new STATE event until the event is in the past. Because of the non blocking read operation the ACT_D values can be read repeatedly.

The Use of the RAM

The RAM is used to store the data of the last FULL_SCALE period. The use of single port RAMs is recommended. The data width of the RAM is usual 3 bytes, but could be extended to 4 bytes in future applications. There are 3 different RAMs, each with separate access ports. the RAM 1a is used to store the position minus time requests, got from the ARU. No CPU access is possible to this RAM during operation (when the DPLL is enabled).

Ram 1*b* is used for configuration parameters and variables needed for calculations. within RAM 1*c* the values of the STATE events are stored. RAM 1*b* and RAM 1*c* do have a common access port and are also marked as RAM 1*bc* in order to clarify this fact.

RAM 2l is used for values of the TRIGGER events.

Because of the access of the DPLL internal state machine at the one side and the CPU at the other side the access priority has to be controlled for both RAMs 1*bc* and 2. The access priority is defined as stated below. The CPU access procedure via AE-interface goes in a wait state (waiting for data valid) while it needs a colliding RAM access during serving a corresponding state machine RAM access. In order not to provoke unexpected behaviour of the algorithms the writing of the CPU to the RAM regions 1*b*, 1*c* or 2 will be monitored and results in interrupt requests when enabled.

CPU access is specified at follows:

1. CPU has highest priority for a single read/write access. The DPLL algorithm is stalled during external bus RAM accesses.
2. After serving the CPU access to the RAM the DPLL gets the highest RAM access priority for 8 clock cycles. Afterwards continue with 1.

The RAM address space has to be implemented in the address space of the CPU.

Signal Processing

Time Stamp Processing

Signal processing does mean the computation of the time stamps in order to calculate at which time the outputs have to appear. For such purposes the time stamp values have to be stored in the RAM and by calculating the difference between old and new values the duration of the last time interval is determined simply. This difference should be also stored in the RAM in order to see the changes between the intervals by changing the conditions and the speed of the observed process.

Count and Compare Unit

The count and compare unit processes all input signals taking into account the configuration values. It uses a state machine and provides the output signals as described above.

Sub pulse generation for SMC=0

Equation 16.21 to Calculate the Number of Pulses to be Sent in Normal Mode Using the Automatic End Mode Condition For RMO=0, SMC=0 and DMO=0

$$NMB\_T=(MLT+1)*SYN\_T+MP+PD\_\text{store} \qquad (16.21)$$

with $$PD\_\text{store}=ADT\_T(12:0) \qquad (16.21a)$$

while the value for PD_store is zero for AMT=0 and the value of MP is zero for COA=0

In order to get a higher resolution for higher speed a generator for the sub-pulses is chosen using an adder. All missing pulses MP are considered using equation 16.21 and are determined by counting the number of pulses of the last increment. The value SYN_T is stored from the last increment using NT of the ADT_Ti value at RAM region 2*c*.

Equations 16.22-24 to Calculate the Number of Pulses to be Sent in Emergency Mode Using the Automatic End Mode Condition For RMO=1, SMC=0 and DM0=0;

the value for PD_S_store is zero for AMS=0

$$NMB\_S=MLS1*\text{SYN}\_S+MP+PD\_S\_\text{store} \qquad (16.22)$$

with $$MLS1=(MLT+1)*(TNU+1)/(SNU+1) \qquad (16.23)$$

and $$PD\_S\_\text{store}=ADT\_S(12:0) \qquad (16.24)$$

Please note, that these calculations above in equations 16.21 and 16.22 are only valid for an automatic end mode (DMO=0).

For calculation of the number of generated pulses a value of 0.5 is added as shown in equations 16.25 or 16.26 respectively in order to compensate rounding down errors at the succeeding arithmetic operations. Because in automatic end mode the number of pulses is limited by INC_CNT1 it is guaranteed, that not more pulses as needed are generated and in the same way missing pulses are made up for the next increment.

Equation 16.25 to Calculate ADD_IN in Normal Mode

In normal mode (for RMO=0) calculate $$\text{ADD\_IN\_CAL\_}N=(NMB\_T+0.5)*RCDT\_TX \qquad (16.25)$$

with

RCDT_TX is the 224 time value of the quotient in equation 16.17b

0

Missing pulses to be caught up on with highest frequency should be sent to the input RPCUx (rapid pulse catch up on) in 0, while EN_Cxg=0 for the time sending such pulses.

For the normal mode replace ADD_IN of the ADDER (see FIG. 51) by ADD_IN_CAL_N (when calculated, DLM=0) or ADD_IN_LD_N (when provided by the CPU, DLM=1).

The sub-pulse generation in this case is done by the following calculations using a 24 bit adder with a carry out $c_{out}$ and the following inputs:

ADD_IN the second input is the output of the adder, stored one time stamp clock before In order not to complicate the calculation procedure use a Multiplier with a sufficient bit width at the output and use the corresponding shifted output bits.

Enabling of the Compensated Output for Pulses

Figure 51:
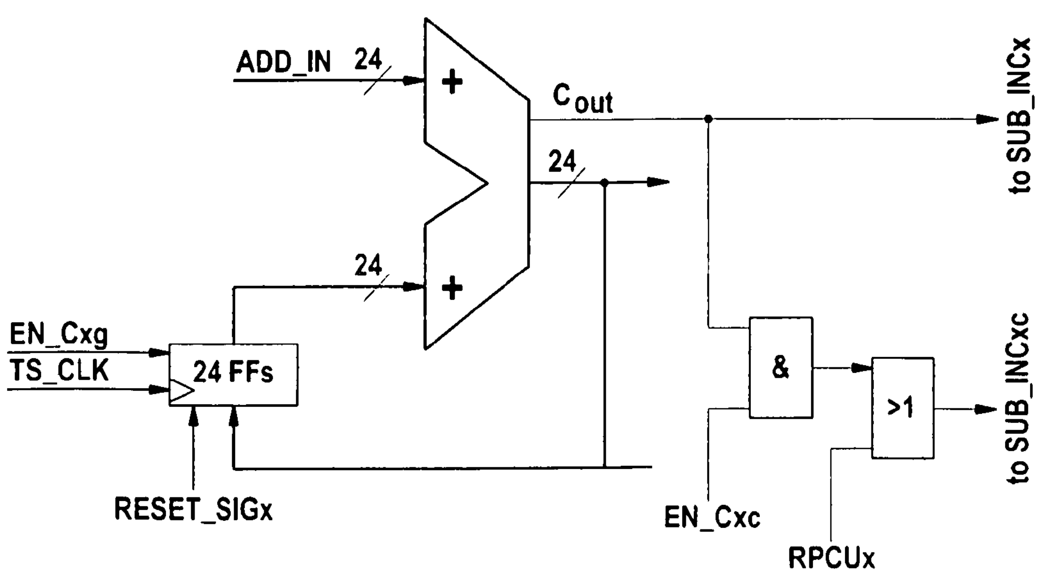

The $c_{out}$ of the adder influences directly the SUB_INC1 output of the DPLL (see FIG. 51). The compensated output SUB_INCxc is in automatic end mode only enabled by EN_Cxc when INC_CNTx>0.

Equation 16.26 to Calculate ADD_IN in Emergency Mode

In emergency mode (RMO=1) calculate $$\text{ADD\_IN\_CAL\_}E=(NMB\_S+0.5)*RCDT\_SX \qquad (16.26)$$

while

RCDT_SX is the $2^{24}$ time value of the quotient in equation 16.20b 0.

Missing pulses to be caught up on with highest frequency should be sent to the input RPCUx (rapid pulse catch up on) in 0, while EN_Cxg=0 for the time sending such pulses.

For the emergency mode replace ADD_IN of the ADDER (see FIG. 51) by ADD_IN_CAL_E (when calculated, DLM=0) or ADD_IN_LD_E (when provided by the CPU, DLM=1).

The sub-pulse generation in this case is done by the following calculations using a 24 bit adder with a carry out $c_{out}$ and the following inputs:

ADD_IN the second input is the output of the adder, stored one time stamp clock before In order not to complicate the calculation procedure use a Multiplier with a sufficient bit width at the output and use the corresponding shifted output bits.

Adder for Generation of SUB_INCx by the Carry $c_{out}$.

See FIG. 51.

Note: The SUB_INC generation by the circuit above has the advantage, that the resolution for higher speed values is better as for a simple down counter.

After RESET and after EN_Cxc=0 (after stopping in automatic end mode) the flip-flops (FFs) should have a zero value. EN_Cxg has to be zero until reliable ADD_IN values are available and the pulse generation starts. The calculated values for the increment prediction using equations 16.2c 0, 16.2c1, 16.7c or 16.7c1 respectively are valid only when at least NUTE>1 TRIGGER values or at least NUSE>1 STATE values are available. In the meantime the values QDT_Ti or QDT_Si are considered as having the value 1. In the time period with NUTE=1 or NUSE=1 respectively the equations 16.25 0 and 16.26 0 use the actual increment value subtracted by the weighted average error.

The generation of SUB_INC1 pulses depends on the configuration of the DPLL. In automatic end mode the counter INC_CNT1 resets the enable signal EN_C1 when the number of pulses desired is reached. In this case only the uncompensated output SUB_INC1 remains active in order to provide pulses for the input filter unit. A new TRIGGER input in normal mode or a new STATE input in emergency mode respectively resets the FFs and also the enable signal EN_Cxg. In the case of acceleration missing pulses can be determined at the next TRIGGER/STATE event in normal/emergency mode easily. For the correction strategy COA=0 those missing pulses are sent out with maximum frequency as soon they are determined. During this time period the EN_Cxg remains cleared. After calculation or providing of a new ADD_IN value the FFs are enabled by EN_Cxg. In this way no pulse is lost. The new pulses are sent out afterwards, when INC_CNT1 is set to the desired value, maybe by adding MLT+1 or MLS1 respectively for the new TRIGGER/STATE event.

Because the used DIV procedure of the algorithms results only in integer values, a systematic failure could appear. The pulse generation at SUB_INC1 will stop in automatic end mode when the INC_CNT1 register reaches zero or all remaining pulses at a new increment will be considered in the next calculation. In this way the lost of pulses can be avoided.

When a new TRIGGER/STATE appears the value of SYN_T*(MLT+1) or SYN_S*MLS1 respectively is added to INC_CNT1. Therefore for FULL_SCALE 2*(TNU+1)*(MLT+1) pulses SUB_INC1 generated, when INC_CNT1 reaches the zero value. The generation of SUB_INC1 pulses has to be done as fast as possible. The calculations for the ADD_IN value must be done first. Therefore all values needed for calculation are to be fetched in a forecast.

Sub Pulse Generation for SMC=1

Necessity of Two Pulse Generators

The Adder of picture 0 must be implemented twice in the case of SMC=1: one for SUB_INC1 controlled by the TRIGGER input and (while RMO=1) one for SUB_INC2, controlled by the STATE input. In the case described in the chapter above for SMC=0 only one Adder is used to generate SUB_INC1 controlled by the TRIGGER in normal mode or by STATE in emergency mode.

Equation 16.27 to Calculate the Number of Pulses to be Sent for the First Device Using the Automatic End Mode Condition For RMO=0, SMC=1 and DMO=0

$$NMB\_T=MLS1*\mathrm{SYN}\_T+MP\_+PD\_\mathrm{store} \quad (16.27)$$

with $$PD\_\mathrm{store}=ADT\_T(12:0) \text{ of last increment} \quad (16.21a)$$

while the value for PD_store is zero for AMT=0 and the value of MP is zero for COA=0

Equation 16.28 to Calculate the Number of Pulses to be Sent for the Second Device Using the Automatic End Mode Condition for RMO=1, SMC=1 and DMO=0

$$NMB\_S=MLS2*\mathrm{SYN}\_S+MP+PD\_S\_\mathrm{store} \quad (16.28)$$

with $$PD\_S\_\mathrm{store}=ADT\_S(12:0) \text{ of last increment} \quad (16.29)$$

while the value for PD_S_store is zero for AMS=0 and the value of MP is zero for COA=0

Please note, that these calculations above in equations 16.27 and 16.28 are only valid for an automatic end mode (DMO=0). In addition the number of generated pulses is added by 0.5 as shown in equations 16.30 or 16.31 respectively in order to compensate rounding down errors at the succeeding division operation. Because in automatic end mode the number of pulses is limited by INC_CNTx it is guaranteed, that not more pulses as needed are generated and in the same way missing pulses are made up for the next increment.

Equation 16.30 to Calculate ADD_IN for the First Device

The sub-pulse generation in this case is done by the following calculations using a 24 bit adder with a carry out $c_{out}$ and the following inputs:

ADD_IN the second input is the (delayed) output of the adder, stored with each time stamp clock.

For RMO=0 replace ADD_IN by ADD_IN_CAL_N (when calculated, DLM=0) or ADD_IN_LD_N (when provided by the CPU, DLM=1) with:

$$\mathrm{ADD\_IN\_CAL}\_N=(NMB\_T+0.5)*RCDT\_TX \quad (16.30)$$

When RCDT_TX is the $2^{24}$ time value of the quotient in equation 16.17b 0

In order not to complicate the calculation procedure use a Multiplier with a sufficient bit width at the output and use the corresponding shifted output bits.

ADD_IN_CAL_N is a 24 bit integer value. The CDT_TX is the expected duration of current TRIGGER increment.

The $c_{out}$ of the adder influences directly the SUB_INC1 output of the DPLL (see 0). The SUB_INC1 output is in automatic end mode only enabled by EN_C1 when INC_CNT1>0.

Equation 16.30 to Calculate ADD_IN for the Second Device

For RMO=1 replace ADD_IN by ADD_IN_CAL_E (when calculated, DLM=0) or ADD_IN_LD_E (when provided by the CPU, DLM=1) with:

$$\mathrm{ADD\_IN\_CAL}\_E=(NMB\_S+0.5)*RCDT\_SX \quad (16.31)$$

When RCDT_SX is the $2^{24}$ time value of the quotient in equation 16.20b 0

In order not to complicate the calculation procedure use a Multiplier with a sufficient bit width at the output and use the corresponding shifted output bits.

The $c_{out}$ of the adder 2 influences directly the SUB_INC2 output of the DPLL (see 0).

The SUB_INC2 output is in automatic end mode only enabled by EN_C2 when INC_CNT2>0.

Note:

Please note, that after RESET and after EN_Cxc=0 (after stopping in automatic end mode) the flip-flops (FFs) have a zero value and also EN_Cxg has to be zero until reliable ADD_IN values are available and the pulse generation starts. The calculated values for the increment prediction using equations 16.2c 0, 16.2c1, 16.7c or 16.7c1 respectively are valid only when NUTE>1 or NUSE>1 respectively. In the meantime the values QDT_T_actual of equation 16.2a1 or QDT_S_actual of equation 16.7a1 are considered as having the value 1, also when RDT_T or RDT_S are zero (set to zero for minimal speed). In this time period for NUTE=1 or NUSE=1 respectively the equations 16.30 0 and 16.31 0 use the actual increment value subtracted by the weighted average error.

The generation of SUB_INCx pulses depends on the configuration of the DPLL.

In automatic end mode the counter INC_CNTx resets the enable signal EN_Cxcu when the number of pulses desired is reached. In this case only the uncompensated outputs SUB_INCx remain active in order to provide pulses for the input filter units. A new TRIGGER or STATE input respectively can reset the FFs and also ADD_IN, especially when EN_Cxc was zero before. In the case of acceleration missing pulses can be determined at the next TRIGGER/STATE event easily. For the correction strategy COA=0 those missing pulses are sent out with maximum frequency as soon they are determined. After that the pulse counter INC_CNTx should be always zero and the new pulses are sent out afterwards, when INC_CNTx is set to the desired value by adding MLS1 or MLS2 for the new TRIGGER or STATE event respectively.

Because the used DIV procedure of the algorithms results only in integer values, a systematic failure could appear. The pulse generation will stop when the INC_CNTx register reaches zero or all remaining pulses at a new increment will be considered in the next calculation. In this way the lost of pulses can be avoided.

When a new TRIGGER appears the value of SYN_T*MLS1 is added to INC_CNT1. Therefore for FULL_SCALE 2*(TNU+1)*MLS1 pulses SUB_INC1 generated, when INC_CNT reaches the zero value. The generation of SUB_INC1 pulses has to be done as fast as possible.

When a new STATE appears the value of SYN_S*MLS2 is added to INC_CNT2. Therefore for FULL_SCALE 2*(SNU+1)*MLS2 pulses SUB_INC2 generated, when INC_CNT2 reaches the zero value. The generation of SUB_INC2 pulses has to be done as fast as possible.

Calculation of the Accurate Position Values

All incoming TRIGGER and STATE signals do have a time stamp and a position stamp assigned after the input filter procedure. For the calculation of the exact time stamp the filter values are considered in the calculations of equations 16.1a 0 or 16.6a 0 respectively. A corresponding calculation is to be performed for the calculation of position values. The accurate value could not be calculated for the first value (FTD=0 or FSD=0 respectively), because the values needed for this calculation are still not available:

- for the case of a time related filter delay of TRIGGER the duration of the last increment is not known and also after the second TRIGGER input value there is no information about a gap until SYT or SYS is set respectively
- for the case of a position related filter delay the used SUB_INCx pulses are still not provided with a reliable relation to the increment duration.

For these reasons the calculated position values can be only determined exactly after setting the corresponding address pointer values APT_2c or APTS_1c3 by the CPU respectively. This is flagged by the SYT or SYS bit in the DPLL_STATUS register respectively.

The PSTC and PSSC values are corrected by the CPU only.

Let PSTM be the measured position value and IDT=1, so the accurate position value PSTC could be calculated once by the CPU as follows:

for IFP=1 (filter delay considers position information)

$$PSTC=PSTM-IDT*FTV\_T \tag{16.32a}$$

for SMC=0 and IFP=0 (filter delay considers time information)

$$PSTC=PSTM-IDT*FTV\_T*(MLT+1)*\mathrm{SYN}\_T\_\mathrm{old}/DT\_T\_\mathrm{actual} \tag{16.32b}$$

for SMC=1 and IFP=0 (filter delay considers time information)

$$PSTC=PSTM-IDT*FTV\_T*MLS1*\mathrm{SYN}\_T\_\mathrm{old}/DT\_T\_\mathrm{actual} \tag{16.32c}$$

Let PSSM be the measured position value and IDS=1, so the accurate position value PSSC could be calculated once by the CPU as follows:

for IFP=1 (filter delay considers position information)

$$PSSC=PSSM-IDS*FTV\_S \tag{16.33a}$$

for SMC=0 and IFP=0 (filter delay considers time information)

$$PSSC=PSSM-IDS*FTV\_S*\mathrm{MLS1}*\mathrm{SYN}\_S\_\mathrm{old}/DT\_S\_\mathrm{actual} \tag{16.33b}$$

for SMC=1 and IFP=0 (filter delay considers time information)

$$PSSC=PSSM-IDS*FTV\_S*\mathrm{MLS2}*\mathrm{SYN}\_S\_\mathrm{old}/DT\_S\_\mathrm{actual} \tag{16.33c}$$

The above calculation must be performed by the CPU at least once and the corresponding corrected PSTC/PSSC values are updated periodically by adding the increment values (MLT*1), MLS1 or MLS2 respectively by the DPLL.

Scheduling of the Calculation

After enabling the DPLL with each valid TRIGGER or STATE event respectively a cycle of operations is performed to calculate all the results shown in detail in the table below {REF: DPLL_1511}. A state machine controls this procedure and consists of two parts, the first is triggered by a valid slope of the signal TRIGGER, begins at step 1 and ends at step 17 (in normal mode and for SMC=1). The second state machine is controlled by a valid slope of the signal STATE, begins at step 21 and ends at step 37 (in emergency mode and also for SMC=RMO=1). Depending on the mode used all 17 steps are executed or already after 2 steps the jump into the initial state is performed, as shown in the state machine descriptions below. For each new extended cycle (without this jump) all prediction values for actions in the case SMC=0 are calculated once more (with maybe improved accuracy because of better parameters) and all pending decisions are made using these new values when transmitted to the decision device.

In 0 the steps of the state machine are described. Please note, that the elaboration of the steps depends on the configuration bits described in the comments. The steps 4 to 17 are only calculated in normal mode (in the state machine explanation below marked yellow in {REF: DPLL_1511}), but steps 24 to 37 are only calculated in emergency mode (in the state machine explanation below marked cyan in {REF: DPLL_1511}) when SMC=0.

State Machine Partitioning for Normal and Emergency Mode.

Figure 52:
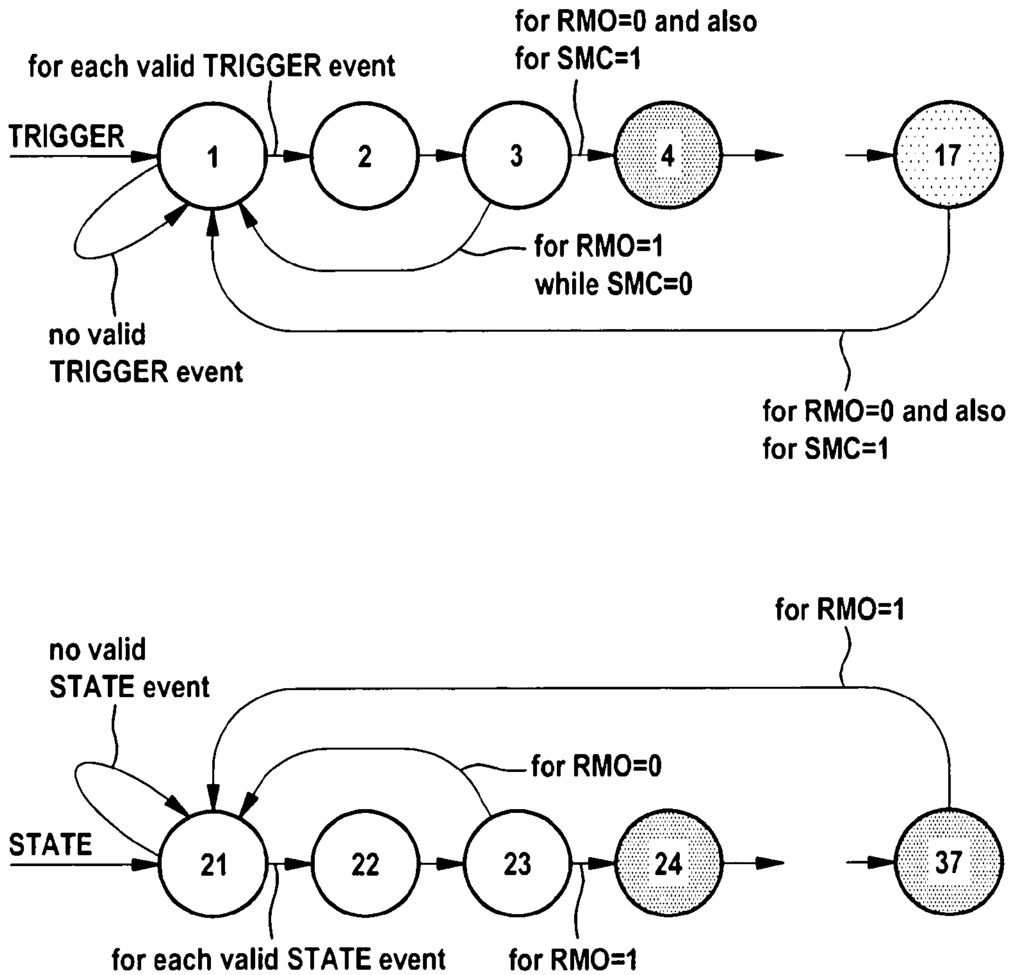

See FIG. 52.

Synchronization Description

TRIGGER:

The APT (address pointer for duration and reciprocal duration values of TRIGGER increments) is initially set to zero and incremented with each valid TRIGGER event. Therefore data are stored in the RAM beginning from the first available value. The actual duration of the last increment is stored at DT_T_actual. For the prediction of the next increment it is assumed, that the same value is valid as long as NUTE is one.

A missing TRIGGER is assumed, when at least after (TOV+1)*DT_T_actual no valid TRIGGER event appears.

The data of equations 16.1b1 and 16.1c1 0 is written in the corresponding RAM regions and APT is incremented accordingly up to 2*TNU−2*SYN_NT+1.

The APT_2b (address pointer for the time stamp field of TRIGGER) is initially set to zero and incremented with each valid TRIGGER event. When no gap is detected because of the incomplete synchronization process at the beginning, for all TRIGGER events the time stamp values are written in the RAM up to up to 2*TNU−2*SYN_NT+1 entries. When the CPU knows the exact position, it extends the time stamp field at the gap positions by the number of virtual entries. In the consequence all 2*(TNU+1) storage locations do have the corresponding entries.

When the CPU detects the correct position and also the TSF_Ti values are extended properly to all 2*(TNU+1) entries in the RAM it writes the APT_2c address pointer accordingly with the corresponding offset and caused by this write process the SYT bit is set simultaneously. For SYT=1 in normal mode (SMC=0) the LOCK1 bit is set with the system clock, when the right number of increments between two synchronization gaps is detected by the DPLL. An unexpected missing TRIGGER or an additional TRIGGER between two synchronization gaps does reset the LOCK1 bit in normal mode.

When SYT is set the calculations of equations 16.1 to 16.5 are performed accordingly and the values are stored in (and distributed to) the right RAM positions.

This includes the multiple time stamp storage by the DPLL for a gap according to equations 16.1a5 to 7 forwards 0 or backwards 0. The APT_2b pointer is for that reason incremented or decremented before this operation considering the virtual increments in addition.

Please note, that for the APT and APT_2c pointers the gap is considered as a single increment.

STATE:

The APS (address pointer for duration and reciprocal duration values of STATE) is initially set to zero and incremented with each valid STATE event. Therefore data are stored in the RAM field beginning at the first location. The actual duration of the last increment is stored at DT_S_actual. For the prediction of the next increment it is assumed, that the same value is valid as long as NUSE is one.

A missing STATE is assumed, when at least after (TOV_S+1)*DT_S_actual no valid STATE event appears.

The data of equations 16.6b1 and 16.6c1 0 is written in the corresponding RAM regions and APS is incremented accordingly up to 2*SNU−2*SYN_NS+1.

The APS_1c2 (address pointer for the time stamp field of STATE) is initially set to zero and incremented with each valid STATE event. When no gap is detected because of the incomplete synchronization process at the beginning, for all STATE events the time stamp values are written in the RAM up to up to 2*SNU−2*SYN_NS+1 entries. When the CPU knows the exact position, it extends the time stamp field at the gap positions by the number of virtual entries. In the consequence all 2*(SNU+1) storage locations do have the corresponding entries.

When the CPU detects the correct position and also the TSF_Si is extended properly it writes the APS_1c3 address pointer accordingly with the corresponding offset and caused by this write process the SYS bit is set simultaneously. For SYS=1 in emergency mode (SMC=0) the LOCK1 bit is set with the system clock, when the right number of increments between two corresponding synchronization gaps is detected. An unexpected missing STATE or an additional STATE between two synchronization gaps does reset the LOCK1 bit in emergency mode.

When SYS is set the calculations of equations 16.5 to 16.10 are performed accordingly and the values are stored in (and distributed to) the right RAM positions. This includes the multiple time stamp storage by the DPLL for a gap according to equations 16.6a5 to 7 forwards 0 or backwards 0. The APS_1c2 pointer is for that reason incremented or decremented before this operation considering the virtual increments in addition.

Please note, that for the APS and APS_2c pointers the gap is considered as a single increment.

SMC=1:

For SMC=1 it is assumed, that the starting position is known by measuring the characteristic of the device. In this way the APT and APT_2c as well the APS and APS_1c3 values are set properly, maybe with an unknown repetition rate. When no gap is to be considered for TRIGGER or STATE signals the APT_2b and APS_1c2 address pointers are set equal to APT or APS respectively. It is assumed, that all missing TRIGGERs and missing STATEs can be also considered from the beginning, when a valid profile with the corresponding adapts values is written in the RAM regions 1$c$3 and 2$c$ respectively. In that case the TSF_Ti and TSF_Si must be extended to all events (including missing events), before the address pointers for the profiles are set. Thus the SYT and SYS bits could be set from the beginning and the LOCK1 and LOCK2 bits are set after recognition of the corresponding gaps accordingly. When no gap exists, the LOCK bits are set after a FULL_SCALE operation. The CPU can correct the APT_2c and APS_1c3 pointer according to the recognized repetition rate later once more without the loss of Lock1,2.

Operation in Backward Direction in Normal Mode (SMC=0)

When for SMC=0 in normal mode a backwards condition is detected for the TRIGGER input signal (e.g. when THMI is violated), the LOCK1 bit and the FTD (as well as LOCK2 and FSD) in the DPLL_STATUS register are reset, the NUTE value in NUTC register is set to 1 (the same for NUSE in NUSC) and the address pointers APT and APT_2c as well as APT_2b are incremented for a last time (and after that decremented for each following valid slope of TRIGGER as long as the DIR1 bit shows the backward direction).

Please notice, that in the case of the change of the direction the ITN and ISN bit in the DPLL_STATUS register are reset.

For this transition to the backward direction no change of address pointers APT and APT_2b is necessary.

Profile Update for TRIGGER

The profile address pointer APT_2c is changed step by step in order to update the profile information in SYN_T, SYN_T old and PD_store; in the same procedure the APT_2b pointer is updated:

- decrement APT_2c, load SYN_T, decrement APT_2b by (SYN_T−1)
- decrement APT_2c, load SYN_T, decrement APT_2b by (SYN_T−1)
- decrement APT_2c, load SYN_T and PD_store, update SYN_T_old and decrement APT_2b by (SYN_T−1)
- decrement APT_2c, make calculations, load SYN_T and PD_store, update SYN_T_old and wait for a new TRIGGER event.

Note: The update of SYN_T_old and the loading of PD_store can be performed in all steps above.

Make calculations does mean: the operation of the state machine starts in normal mode at step 1 with the calculations and results in an update of the SYN_T value including the automatic update of SYN_T_old at state 17 using the actual APT_2c address pointer value, see {REF: DPLL_1511}.

The TBU_TB1 value is to be corrected by the number of pulses sent out in the wrong direction mode during the last increment. This correction is done by sending out SUB_INC1 pulses for decrementing TBU_TB1 (while DIR1=1).

The amount of pulses is determined by calculation of the difference between NMB_T and INC_CNT1. In addition the pulses for the new increment SYN_T_old*(MLT+1) are sent. All pulses are sent out by the maximum possible frequency, because no speed information is available for the first increment after changing the direction.

Consequences for STATE

With the next valid STATE event also DIR2 is set to 1, after a last increment of APS, APS_1c3 and APS_1c2 according to the STATE event. After that with each following valid STATE event APS, APS_1c3 as well as AP1_1c2 are decremented accordingly as long as DIR2=1. The SYN_S value, the APS_1c3 and APS_1c2 pointers must be updated accordingly, when a change appears.

- decrement APS_1c3, load SYN_S, decrement APS_1c2 by (SYN_S−1)
- decrement APS_1c3, load SYN_S, decrement APS_1c2 by (SYN_S−1)
- decrement APS_1c3, load SYN_S and PD_S_store, update SYN_S_old and decrement APS_1c2 by (SYN_S−1)
- decrement APS_1c3, make calculations, load SYN_S and PD_S_store, update SYN_S_old, wait for a new TRIGGER event.

Note: The update of SYN_S_old and the loading of PD_S_store can be performed in all steps above.

When a new STATE event occurs, all address pointers are decremented as long as DIR2=1.

Repeated Change to Forward Direction for TRIGGER

The DIR1 bit remains set as long as the THMI value remains none violated for the following TRIGGER events and is reset when for an invalid TRIGGER slope the THMI is violated and DIR2 follows the state of DIR1 with the next valid STATE slope. Resetting the DIR1 to 0 results (after repeated reset of LOCK1, FTD, FSD, NIT, NIS) in the opposite correction of the address pointer use.

This does mean four increment operations of the address pointer including the update of SYN_S and PD_S_store with the automatic update of SYN_S_old.

The correction of TBU_TS1 is done by sending out the correction pulses with the highest possible frequency at SUB_ INC1 while DIR1=0. The number of pulses is calculated by (NMB_T−INC_CNT1) and in addition the pulses for the new increment SYN_T_old*(MLT+1).

Consequences for STATE

For DIR1=0: DIR2 is reset to 0 after the next valid STATE event and after a last decrementing of APS, APS_1c3 as well as APS_1c2. After that the address pointers are incremented again with each following valid STATE event.

Operation in Backward Direction for TRIGGER (SMC=1)

When for SMC=1a backwards condition is detected for the TRIGGER input signal (TDIR=1, resulting in DIR1=1 after a last increment of the address pointers), the LOCK1 bit and the FTD in the DPLL_STATUS register are reset, the NUTE value in NUTC register is set to 1 and the address pointers APT and APT_2c as well as APT_2b are incremented for a last time (and after that decremented for each following valid slope of TRIGGER as long as the DIR1 bit shows the backward direction).

Please notice, that in the case of the change of the direction the ITN bit in the DPLL_STATUS register is reset.

Profile Update for TRIGGER

Make the same update steps for the profile address pointer as shown in chapter 0: Decrement APT_2c for 4 times with the update of the SYN_T and PD_store values at each step with an automatic update of SYN_T_old.

The TBU_TB1 value is to be corrected by the number of pulses sent out in the wrong direction mode during the last increment. This correction is done by sending out SUB_INC1 pulses for decrementing TBU_TB1 (while DIR1=1).

The amount of pulses is determined by calculation of the difference between NMB_T and INC_CNT1. In addition the pulses for the new increment SYN_T_old*(MLS1) are sent. All pulses are sent out by the maximum possible frequency, because no speed information is available for the first increment after changing the direction.

Repeated Change to Forward Direction for TRIGGER

The DIR1 bit remains set as long as the TDIR bit is set for the following TRIGGER events and is reset when for a valid TRIGGER slope the TDIR is zero. Resetting the DIR1 to 0 results (after repeated reset of LOCK1 and FTD) in the opposite correction of the address pointer use.

This does mean four increment operations of the address pointer including the update of SYN_T and PD_store.

The correction of TBU_TS1 is done by sending out the correction pulses with the highest possible frequency at SUB_ INC1 while DIR1=0. The number of pulses is calculated by (NMB_T−INC_CNT1) and in addition the pulses for the new increment SYN_T_old*(MLS1).

Operation in Backward Direction for STATE (SMC=1)

When for SMC=1a backwards condition is detected for the STATE input signal (SDIR=1, resulting in DIR2=1 after a last increment of the address pointers), the LOCK2 bit and the FSD in the DPLL_STATUS register are reset, the NUSE value in NUSC register is set to 1 and the address pointers APS and APT_1c3$_{13}$ f and APT_1c3_b as well as APT_1c2 are incremented for a last time (and after that decremented for each following valid slope of STATE as long as the DIR2 bit shows the backward direction).

Please notice, that in the case of the change of the direction the ISN bit in the DPLL_STATUS register is reset.

For this transition to the backward direction no change of address pointers APT and APT_1c2 is necessary.

Profile Update for STATE

Make the same update steps for the profile address pointer as shown in chapter 0: Decrement APS_1c3 for 4 times with the update of the SYN_S, SYN_S_old and PD_S_store values at each step.

The TBU_TB2 value is to be corrected by the number of pulses sent out in the wrong direction mode during the last increment. This correction is done by sending out SUB_INC2 pulses for decrementing TBU_TB2 (while DIR2=1).

The amount of pulses is determined by calculation of the difference between NMB_S and INC_CNT2. In addition the pulses for the new increment SYN_S_old*(MLS2) are sent. All pulses are sent out by the maximum possible frequency, because no speed information is available for the first increment after changing the direction.

Repeated Change to Forward Direction for STATE

The DIR2 bit remains set as long as the SDIR bit is set for the following STATE events and is reset when for a valid STATE slope SDIR is zero.

Resetting the DIR2 to 0 results (after repeated reset of LOCK2 and FSD) in the opposite correction of the address pointer use.

After a last decrementing of all address pointers the APS_1c3 is incremented 4 times with a repeated update of SYN_S, SYN_S_old and PD_S_store after each increment.

The correction of TBU_TS2 is done by sending out the correction pulses with the highest possible frequency at SUB_ INC2 while DIR2=0. The number of pulses is calculated by (NMB_S−INC_CNT2) and in addition the pulses for the new increment SYN_S_old*(MLS2).

DPLL Reaction in the Case of Non Plausible Input Signals

When the DPLL is synchronized concerning the TRIGGER signal by setting the FTD, SYT and LOCK1 bits in the DPLL_STATUS register, the number of valid TRIGGER events between the gaps is to be checked continuously.

When additional events appear while a gap is expected, the LOCK1 bit is reset and the ITN bit in the DPLL_STATUS register is set. In that case the state machine 1 will remain in state 1 and the address pointer APT, APT_2c and APT_2c will remain unchanged until the CPU sets the APT_2c accordingly. In this case also the NUTE value in the NUTC register is set to 1. The DPLL stops the generation of the SUB_INC1 pulses and will perform no other actions—remaining in step1 of the first state machine (see {REF: DPLL—1511}).

When an unexpected gap appears (missing TRIGGERS), the NUTE value in the NUTC register is set to 1, the LOCK1 bit is reset and the ITN bit in the DPLL_STATUS register is set. The address pointers are incremented with the next valid TRIGGER slope accordingly.

When in the following the direction DIR1 changes as described in the chapters above the ITN bit in the DPLL_STATUS register is reset, the use of the address pointers APT_2c is switched and the pulse correction takes place as described above.

In all other cases the CPU can interact to leave the instable state. This can be done by setting the APT_2c address pointer which results in a reset of the ITN bit. In the following NUTE can also be set to higher values.

When the DPLL is synchronized concerning the STATE signal by setting the FSD, SYS and LOCK2 bits in the DPLL_STATUS register, the number of valid STATE events between the gaps is to be checked continuously.

When additional events appear while a gap is expected or while SMC=0 an unexpected missing STATE event appears, the LOCK2 bit is reset and the ISN bit in the DPLL_STATUS register is set. In that case the state machine 2 will remain in state 21 and the address pointer APS, APS_1c3 and APS_1c3 will remain unchanged until the CPU sets the APT_1c3 accordingly. In this case also the NUSE value in the NUSC register is set to 1. The DPLL stops the generation of the SUB_INC1 or 2 pulses respectively, when the RMO bit is set, and will perform no other actions—remaining in step21 of the second state machine.

When an unexpected gap appears for RMO=SMC=1 (missing STATEs for synchronous motor control), the NUSE value in the NUSC register is set to 1, the LOCK2 bit is reset and the ISN bit in the DPLL_STATUS register is set. The address pointers are incremented with the next valid STATE slope accordingly.

When in the following the direction DIR2 changes as described in the chapters above the ISN bit in the DPLL_STATUS register is reset, the use of the address pointers APT_1c3 is switched and the pulse correction takes place as described above. In all other cases the CPU must interact to leave the instable state. This can be done by setting the APT_1c3 address pointers which results in a reset the ISN bit. In the following NUSE can also be set to higher values.

State Description of the State Machine.

| Step | Description | Comments |
|---|---|---|
| always for DEN = 1 | for each invalid TRIGGER slope: generate the TIS interrupt; calculate the time stamp difference to the last valid event, store this value at THVAL<br>when THMI is violated (ΔT < THMI): generate TIN interrupt,<br>set DIR1 = 0 (forwards)<br>set BWD1 = 0 (see DPLL_STATUS register)<br>else<br>set DIR1 = 1 (backwards);<br>set BWD1 = 1 (see DPLL_STATUS register)<br>after changing the direction correct the pulses sent with wrong direction information and send the pulses for the actual increment in addition with highest possible frequency<br>for each invalid STATE slope:<br>set DIR2 = DIR1 | for SMC = 0;<br>set DIR1 always after inc./decr. the address pointers APT, APT_x;<br>go to step 1;<br>stop output of SUB_INC1 and correct pulses after changing DIR1 after incr./decr. of APS,_x<br>set DIR2 always after incr./decr. the address pointers APS, APS_x;<br>go to step 1 |
| always for DEN = 1 | set DIR1 = BWD1 = TDIR,<br>set DIR2 = BWD2 = SDIR;<br>for each change of TDIR go to step 1 after performing the calculations and update of SYN_T, PD_store and correct the pulses sent with wrong direction information and send the pulses for the actual increment in addition with highest possible frequency.<br>for each change of SDIR go to step 21 after performing the calculations and the update of SYN_S, PD_S_store and correct the pulses sent with wrong direction information and send the pulses for the actual increment in addition with highest possible frequency. | for SMC = 1;<br>set the direction bits always after incr./decr. the corresponding address pointers; |

-continued

| Step | Description | Comments |
|---|---|---|
| 1 | When DEN = 1 and TEN = 1: wait for T_VALID,<br>when no T_VALID appears until THMA is reached, generate the TAX interrupt;<br>when a T_VALID appears: compare TRIGGER_S with TSL (valid slope);<br>When no valid TRIGGER appears and when TS_T_CHECK time is reached:<br>send missing TRIGGER INT, when no Gap exist; set MT = 1 (missing TRIGGER bit) in the DPLL_STATUS register; do not leave step 1 until a valid TRIGGER appears.<br>When a valid TRIGGER appears check PVT<br>when the PVT value is violated: generate the PWI interrupt, ignore the TRIGGER input and wait for the next T_VALID event; do not store any value<br>When the PVT value is fulfilled: store actual position stamp at PSTM;<br>store all relevant configuration bits X of the DPLL_CTRL(0, 1) Registers in shadow registers and consider them for all corresponding calculations of steps 2 to 17 accordingly; the relevant bits are explained in the registers itself<br>generate the TAS interrupt when NTI_CNT is zero or decrement NTI_CNT when not zero;<br>for FTD = 0:<br>set PSTC = PSTM<br>set FTD (first TRIGGER detected)<br>do not change PSTC, APT, APT_2b<br>for RMO = 0 or SMC = 1: increment INC_CNT1 by (MLT + 1)*)<br>send SUB_INC1 pulses with highest possible frequency<br>for SYT = 0 and FTD = 1:<br>decrement APT and APT_2b by one;<br>decrement PSTC by (MLT + 1)*)<br>for RMO = 0 or SMC = 1: increment INC_CNT1 by (MLT + 1)*)<br>for SYT = 1 and ITN = 0:<br>decrement APT, APT_2c,<br>decrement APT_2b by SYN_T_old<br>decrement PSTC by SYN_T_old * (MLT + 1)*) + PD_store_old<br>for RMO = 0 or SMC = 1: increment INC_CNT1 by SYN_T * (MLT + 1) + PD_store<br>within the DPLL_STATUS register: set LOCK1 bit accordingly; | Depending on TSL, TEN, DEN the leaving of step one is done with the next TRIGGER input;<br>Note: Step 1 is also left in emergency mode when a valid TRIGGER event appears in order to make a switch back to normal mode possible;<br>_old - values are values valid at the last but one valid TRIGGER event;<br>for the whole table: use always MLS1 instead of (MLT + 1) for the case SMC = 1;<br>decrement does mean: increment for DIR1 = 0 decrement for DIR1 = 1<br>SYN_T_old is still not updated<br>replace MLT + 1 by MLS1 for SMC = 1<br>replace MLT + 1 by MLS1 for SMC = 1<br>SYN_T is still not updated<br>*)replace (MLT + 1) by MLS1 for SMC = 1: |
| 2 | calculate TS_T according to equations 16.1a;<br>calculate DT_T_actual = TS_T − TS_T_old<br>calculate RDT_T_actual<br>calculate QDT_TX according to equation 16.2 | |
| 3 | send CDIT interrupt;<br>calculate EDT_T and MEDT_T according to equations 16.3 and 16.4<br>for (RMO = 1 and SMC = 0): update the RAM by equation 16.a-c (see | |

-continued

| Step | Description | Comments |
|---|---|---|
| | chapter 0);<br>go back to step 1 for (RMO = 1 and SMC = 0); update SYN_T and PD_store only in that case | |
| 4 | calculate CDT_TX according to equation 16.5a and b; | for RMO = 0 or SMC = 1; |
| 5 | calculate missing pulses;<br>for a current correction of missing or surplus pulses use the correction value MPVAL1, used by CPU also when switched modes;<br>MP = SYN_T_old * (MLT + 1)*⁾ + PD_store_old − (PSTM − PSTM_old) + MP_old + MPVAL1;<br>(PD_store_old is zero for AMT = 0) | for RMO = 0 or SMC = 1<br>*⁾replace (MLT + 1) by MLS1 for SMC = 1<br>add MPVAL1 only for PCM = 1; add MPVAL1 once to INC_CNT1 and reset PCM1 after that |
| 6 | sent MP with highest possible frequency<br>and calculate<br>NMB_T = (MLT + 1)*⁾ * SYN_T + PD_store<br>(PD_store is zero for AMT = 0) | for RMO = 0 or SMC = 1,<br>DMO = 0 and COA = 0<br>*⁾replace (MLT + 1) by MLS1 for SMC = 1 |
| 7 | calculate number of pulses to be sent<br>NMB_T = (MLT + 1)*⁾ * SYN_T + PD_store + MP (see equations 16.21 or 16.27 respectively)<br>(PD_store is zero for AMT = 0) | for RMO = 0 or SMC = 1,<br>DMO = 0 and COA = 1<br>*⁾replace (MLT + 1) by MLS1 for SMC = 1 |
| 8 | NMB_T = SYN_T * CNT_NUM_1 | for RMO = 0 or SMC = 1,<br>DMO = 1 |
| 9 | no operation | |
| 10 | calculate ADD_IN_CAL_N according to equation 16.25 or 16.31 and store this value in RAM<br>use ADD_IN_CAL_N as ADD_IN value for the case DLM = 0<br>use ADD_IN_LD_N as ADD_IN for the case DLM = 1,<br>for DMO = 0 and EN_C1u = 0:<br>reset the FlipFlops in the SUB_INC1 generator;<br>start sending SUB_INC1; | for RMO = 0 or SMC = 1<br>for DLM = 0<br>for DLM = 1 |
| 11 | calculate<br>TS_T_CHECK = TS_T + DT_T_actual * (TOV); | for RMO = 0 or SMC = 1; |
| 12 | automatic setting of actions masking bits in the DPLL_STATUS register:<br>for SMC = 0: set CAIP1 = CAIP2 = 1<br>for SMC = 1: set only CAIP1 = 1 | steps 12 to 16 are not valid for the combination: (SMC = 0 and RMO = 1) |
| 13 | for all correspondent actions with ACT_Ni = 1 calculate:<br>NAi with<br>w = (PSAi − PSTC)/(MLT + 1)*⁾ as integer part and<br>b = remainder of the division (fractional part) | actions 0 . . . 11 for SMC = 1<br>actions 0 . . . 24 for SMC = 0<br>depending on ACT_Ni in DPLL_ACT_STA register;<br>replace MLT + 1 by MLS1 for SMC = 1 |
| 14 | calculate PDT_Ti and DTAi for up to 24 action values according to equations 16.11 and 16.12; | actions 0 . . . 11 for SMC = 1<br>actions 0 . . . 24 for SMC = 0 |
| 15 | calculate TSAi according to equation 16.15 and PSACi according to equation 16.17 | actions 0 . . . 11 for SMC = 1<br>actions 0 . . . 24 for SMC = 0 |
| 16 | automatic resetting of actions masking bits in the DPLL_STATUS register:<br>for SMC = 0: set CAIP1 = CAIP2 = 0<br>for SMC = 1: set only CAIP1 = 0;<br>set the corresponding ACT_Ni bits in the DPLL_ACT_STA register | Set ACT_Ni for all enabled actions concerned:<br>0 . . . 11 for SMC = 1<br>0 . . . 24 for SMC = 0 |
| 17 | store TS_T in RAM 2b according to APT_2b;<br>update RAM 2a and RAM 2d<br>update SYN_T and PD_store;<br>go back to step 1 | for all conditions |
| 21 | When DEN = 1 and SEN = 1: wait for S_VALID, compare STATE_S with SSL (valid slope); for each invalid slope: generate a SIS | Depending on SSL, SEN, DEN the leaving of step 21 one is done with the next STATE input; |

-continued

| Step | Description | Comments |
|---|---|---|
| | interrupt;<br>send missing STATE INT when TS_S_CHECK time is reached and set MS = 1 (missing STATE bits) in that case; do not leave step 21 while no valid STATE appears.<br>When a valid STATE appears:<br>store actual position stamp at PSSM<br>store all relevant configuration bits X of the DPLL_CTRL(0,1) Registers in shadow registers and consider them for all corresponding calculations of steps 22 to 37 accordingly; the relevant bits are explained in the registers itself<br>for FSD = 0:<br>set PSSC = PSSM<br>set FSD (first STATE detected)<br>do not increment PSSC<br>for RMO = 1 and SMC = 0: increment INC_CNT1 by MLS1<br>for RMO = 1 and SMC = 1: increment INC_CNT2 by MLS2<br>for SYS = 0 and FSD = 1:<br>decrement PSSC by MLS1 (SMC = 0) or MLS2 (SMC = 1)<br>increment INC_CNT1 by MLS1 (for SMC = 0 and RMO = 1);<br>increment INC_CNT2 by MLS2 (for SMC = 1 and RMO = 1);<br>decrement APS and APS_1c3<br>decrement APS_1c2 by SYN_S_old<br>for SYS = 1 and ISN = 0:<br>decrement APS and APS_1c3<br>decrement APS_1c2 by SYN_S_old<br>for RMO = 1 and SMC = 0: decrement PSSC by SYN_S_old * MLS1 + PD_S_store_old, increment INC_CNT1 by SYN_S * MLS1 + PD_S_store<br>for RMO = 1 and SMC = 1: decrement PSSC by SYN_S_old * MLS2 + PD_S_store_old, increment INC_CNT2 by SYN_S * MLS2 + PD_S_store<br>within the DPLL_STATUS register:<br>set LOCK1 or 2 bit accordingly; | for the steps 22-37: for SMC = 1 replace:<br>MLS1 by MLS2,<br>LOCK1 by LOCK2;<br>SUB_INC1 by SUB_INC2;<br>CNT_NUM_1 by CNT_NUM_2;<br>MPVAL1 by MPVAL2;<br>EN_C1u by EN_C2u;<br>decrement does mean:<br>increment for DIR2 = 0<br>decrement for DIR2 = 1 |
| 22 | calculate TS_S according to equations 16.6a;<br>calculate DT_S_actual = TS_S − TS_S_old<br>calculate RDT_S_actual<br>calculate QDT_SX | |
| 23 | send CDIS interrupt;<br>calculate EDT_S and MEDT_S according to equations 16.8 and 16.9<br>for RMO = 0: update RAM by equation 16.7c (see chapter 0);<br>go back to step 21 for RMO = 0 and update SYN_S and PD_S_store using the current ADT_Si values in that case; | |
| 24 | calculate CDT_SX according to equation 16.10a and b; | only for RMO = 1 |
| 25 | calculate missing pulses<br>for a current correction of missing or surplus pulses use the correction value MPVAL1 (MPVAL2), used by CPU also when switched modes;<br>MP = SYN_S_old * MLS1 + PD_S_store_old − (PSSM − | only for RMO = 1<br>add MPVAL1/2 once to INC_CNT1/2 and reset PCM1/2 after that<br>SMC = 0: add MPVAL1 only for PCM1 = 1<br>SMC = 1: add MPVAL2 |

-continued

| Step | Description | Comments |
| --- | --- | --- |
| | PSSM_old) − MP_old + MPVAL1; MP = SYN_S_old * MLS2 + PD_S_store_old − (PSSM − PSSM_old) − MP_old + MPVAL2; (PD_S_store_old is zero for AMS = 0 | only for PCM2 = 1 |
| 26 | sent MP with highest possible frequency and calculate NMB_S = MLS1 + PD_S_store NMB_S = MLS2 + PD_S_store (PD_S_store is zero for AMS = 0 | only for RMO = 1, DMO = 0 and COA = 0 for SMC = 0 for SMC = 1 |
| 27 | calculate number of pulses to be sent according to 16.22 or NMB_S = MLS1 * SYN_S + PD_S_store + MP NMB_S = MLS2 * SYN_S + PD_S_store + MP (PD_S_store is zero for AMS = 0;) | only for RMO = 1, DMO = 0 and COA = 1 for SMC = 0; for SMC = 1; |
| 28 | NMB_S = SYN_S * CNT_NUM_1 (SMC = 0) NMB_S = SYN_S * CNT_NUM_2 (SMC = 1) | only for RMO = 1, DMO = 1 and COC = 0 |
| 29 | Go to step 30 | no operation |
| 30 | calculate ADD_IN_CAL_E according to equation 16.26 or 16.31 respectively and store this value in RAM use ADD_IN_CAL_E as ADD_IN value for the case DLM = 0 use ADD_IN_LD_E as ADD_IN for the case DLM = 1 for RMO = 1, DMO = 0 and EN_C1u = 0 (EN_C1u = 0): reset the FlipFlops in the SUB_INC1 or SUB_INC2 generator respectively; start sending SUB_INC1/ SUB_INC2; | only for RMO = 1 for DLM = 0 for DLM = 1 |
| 31 | calculate TS_S_CHECK = TS_S + DT_S_actual * (TOV_S); | only for RMO = 1; |
| 32 | automatic setting of actions masking bits in the DPLL_STATUS register: CAIP1 and CAIP2 for SMC = 0 only CAIP2 for SMC = 1 | for RMO = 1 |
| 33 | for all actions with ACT_Ni = 0 calculate: NAi with w = (PSAi − PSSC)/MLS1 as integer part and b = remainder of the division (fractional part) use MLS2 as divider in the case of SMC = 1 | for SMC = 0: 24 actions, for SMC = 1: 12 actions; depending on ACT_Ni in DPLL_ACT_STA register |
| 34 | calculate PDT_Si and DTAi for up to 24 action values according to equations 16.13 and 16.14; | only for RMO = 1; for SMC = 0 actions 0 . . . 23 for SMC = 1 actions 12 . . . 23 |
| 35 | calculate TSAi according to equation 16.18 and PSACi according to equation 16.20 | for the relevant actions (see above) and RMO = 1 |
| 36 | automatic reset of the actions masking bit CAIP in the DPLL_STATUS register: CAIP1 = CAIP2 = 0 for SMC = 0 and only CAIP2 = 0 for SMC = 1 set the corresponding ACT_Ni bits in the DPLL_ACT_STA register | for the relevant actions (see above) and RMO = 1 Set ACT_Ni and reset ACT_WRi for all enabled actions |
| 37 | store TS_S in RAM 1c2 according to APT_1c2; update RAM 1c1 and RAM 1c4 update SYN_S and PD_S_store; go back to step 21 | for all conditions |

DPLL Interrupt Signals

The DPLL provides 24 interrupt lines. These interrupts are shown below.

DPLL Interrupt Signals

| Signal | Description |
|---|---|
| DPLL_CDI_IRQ | TRIGGER duration calculated for last increment |
| DPLL_TE5_IRQ | TRIGGER event interrupt 5 request[3)] |
| DPLL_TE4_IRQ | TRIGGER event interrupt 4 request[3)] |
| DPLL_TE3_IRQ | TRIGGER event interrupt 3 request[3)] |
| DPLL_TE2_IRQ | TRIGGER event interrupt 2 request[3)] |
| DPLL_TE1_IRQ | TRIGGER event interrupt 1 request[3)] |
| DPLL_LL2_IRQ | Lost of lock interrupt for SUB_INC2 request |
| DPLL_GL2_IRQ | Get of lock interrupt for SUB_INC2 request |
| DPLL_E_IRQ | Error interrupt request |
| DPLL_LL1_IRQ | Lost of lock interrupt for SUB_INC1 request |
| DPLL_GL1_IRQ | Get of lock interrupt for SUB_INC1 request |
| DPLL_W1_IRQ | Write access to RAM region 1b or 1c interrupt request |
| DPLL_W2_IRQ | Write access to RAM region 2 interrupt request |
| DPLL_PW_IRQ | Plausibility window violation interrupt of TRIGGER request |
| DPLL_TAS_IRQ | TRIGGER active slope while NTI_CNT is zero interrupt request |
| DPLL_SAS_IRQ | STATE active slope interrupt request |
| DPLL_MT_IRQ | Missing TRIGGER interrupt request |
| DPLL_MS_IRQ | Missing STATE interrupt request |
| DPLL_TIS_IRQ | TRIGGER inactive slope interrupt request |
| DPLL_SIS_IRQ | STATE inactive slope interrupt request |
| DPLL_TAX_IRQ | TRIGGER maximum hold time violation interrupt request |
| DPLL_TIN_IRQ | TRIGGER minimum hold time violation interrupt request |
| DPLL_PE_IRQ | DPLL enable interrupt request |
| DPLL_PD_IRQ | DPLL disable interrupt request |

Note: TEi_IRQ depends on the TINT value in ADT_Ti[1)] and is only active when ADTV[2)] = 1.

[1)]see RAM region 2 explanation

[2)]see DPLL STATUS register

[3)]see TINT value in the corresponding ADT_Ti section of RAM region 2

DPLL Register Overview

DPLL Register Overview

| Address offset | Name | Description | Init value |
|---|---|---|---|
| 0x0000 | DPLL_CTRL_0 | Control Register 0 | 0x003C_BA58 |
| 0x0004 | DPLL_CTRL_1 | Control Register 1 | 0xB180_0000 |
| 0x0008 | DPLL_CTRL_2 | Control Register 2 (actions 0-7 enable) | 0x0000_0000 |
| 0x000C | DPLL_CTRL_3 | Control Register 3 (actions 8-15 enable) | 0x0000_0000 |
| 0x0010 | DPLL_CTRL_4 | Control Register 4 (actions 16-24 enable) | 0x0000_0000 |
| 0x0014 | DPLL_STATUS | Status Register | 0x0000_0000 |
| 0x0018 | DPLL_ACT_STA | ACTION Status Register with connected shadow register | 0x0000_0000 |
| 0x001C | DPLL_OSW | Offset and switch old/new address register | 0x0000_0200 |
| 0x0020 | DPLL_AOSV_2 | Address offset register for APT in RAM region 2 | 0x1810_0800 |
| 0x0024 | DPLL_APT | Actual RAM pointer to RAM regions 2a, b and d | 0x0000_0000 |
| 0x0028 | DPLL_APS | Actual RAM pointer to regions 1c1, 1c2 and 1c4 | 0x0000_0000 |
| 0x002C | DPLL_APT_2c | Actual RAM pointer to RAM region 2c | 0x0000_0000 |
| 0x0030 | DPLL_APS_1c3 | Actual RAM pointer to RAM region 1c3 | 0x0000_0000 |
| 0x0034 | DPLL_NUTC | Number of recent TRIGGER events used for calculations (mod 2 * (TNU + 1 − SYN_NT)) | 0x0001_2001 |
| 0x0038 | DPLL_NUSC | Number of recent STATE events used for calculations (mod 2 * (SNU + 1 − SYN_NS) | 0x0001_2001 |
| 0x003C | DPLL_NTI_CNT | Number of active TRIGGER events to interrupt | 0x0000_0000 |
| 0x0040 | DPLL_IRQ_NOTIFY | Interrupt notification register | 0x0000_0000 |
| 0x0044 | DPLL_IRQ_EN | Interrupt enable register | 0x0000_0000 |
| 0x0048 | DPLL_IRQ_FORCINT | Interrupt force register | 0x0000_0000 |
| 0x004C | DPLL_IRQ_MODE | Interrupt mode register | 0x0000_0000 |
| 0x0050 | DPLL_ID_PMTR_0 | 9 bit ID information for input signal PMT_0 (8:0) | 0x0000_01FE |
| 0x0054 | DPLL_ID_PMTR_1 | 9 bit ID information for input signal PMT_1 (8:0) | 0x0000_01FE |
| 0x0058 | DPLL_ID_PMTR_2 | 9 bit ID information for input signal PMT_2 (8:0) | 0x0000_01FE |
| 0x005C | DPLL_ID_PMTR_3 | 9 bit ID information for input signal PMT_3 (8:0) | 0x0000_01FE |
| 0x0060 | DPLL_ID_PMTR_4 | 9 bit ID information for input signal PMT_4 (8:0) | 0x0000_01FE |
| 0x0064 | DPLL_ID_PMTR_5 | 9 bit ID information for input signal PMT_5 (8:0) | 0x0000_01FE |

-continued

| Address offset | Name | Description | Init value |
|---|---|---|---|
| 0x0068 | DPLL_ID_PMTR_6 | 9 bit ID information for input signal PMT_6 (8:0) | 0x0000_01FE |
| 0x006C | DPLL_ID_PMTR_7 | 9 bit ID information for input signal PMT_7 (8:0) | 0x0000_01FE |
| 0x0070 | DPLL_ID_PMTR_8 | 9 bit ID information for input signal PMT_8 (8:0) | 0x0000_01FE |
| 0x0074 | DPLL_ID_PMTR_9 | 9 bit ID information for input signal PMT_9 (8:0) | 0x0000_01FE |
| 0x0078 | DPLL_ID_PMTR_10 | 9 bit ID information f. input signal PMT_10 (8:0) | 0x0000_01FE |
| 0x007C | DPLL_ID_PMTR_11 | 9 bit ID information f. input signal PMT_11 (8:0) | 0x0000_01FE |
| 0x0080 | DPLL_ID_PMTR_12 | 9 bit ID information f. input signal PMT_12 (8:0) | 0x0000_01FE |
| 0x0084 | DPLL_ID_PMTR_13 | 9 bit ID information f. input signal PMT_13 (8:0) | 0x0000_01FE |
| 0x0088 | DPLL_ID_PMTR_14 | 9 bit ID information f. input signal PMT_14 (8:0) | 0x0000_01FE |
| 0x008C | DPLL_ID_PMTR_15 | 9 bit ID information f. input signal PMT_15 (8:0) | 0x0000_01FE |
| 0x0090 | DPLL_ID_PMTR_16 | 9 bit ID information f. input signal PMT_16 (8:0) | 0x0000_01FE |
| 0x0094 | DPLL_ID_PMTR_17 | 9 bit ID information f. input signal PMT_17 (8:0) | 0x0000_01FE |
| 0x0098 | DPLL_ID_PMTR_18 | 9 bit ID information f. input signal PMT_18 (8:0) | 0x0000_01FE |
| 0x009C | DPLL_ID_PMTR_19 | 9 bit ID information f. input signal PMT_19 (8:0) | 0x0000_01FE |
| 0x00A0 | DPLL_ID_PMTR_20 | 9 bit ID information f. input signal PMT_20 (8:0) | 0x0000_01FE |
| 0x00A4 | DPLL_ID_PMTR_21 | 9 bit ID information f. input signal PMT_21 (8:0) | 0x0000_01FE |
| 0x00A8 | DPLL_ID_PMTR_22 | 9 bit ID information f. input signal PMT_22 (8:0) | 0x0000_01FE |
| 0x00AC | DPLL_ID_PMTR_23 | 9 bit ID information f. input signal PMT_23 (8:0) | 0x0000_01FE |
| 0x00B0 | INC_CNT1 | Counter for pulses for TBU_TS1 to be sent in automatic end mode | 0x0000_0000 |
| 0x00B4 | INC_CNT2 | Counter for pulses for TBU_TS2 to be sent in automatic end mode when SMC = RMO = 1 | 0x0000_0000 |
| 0x0100 | DPLL_TSA0 | calculated ACTION_0 TIME STAMP | 0x007F_FFFF |
| 0x0104 | DPLL_TSA1 | calculated ACTION_1 TIME STAMP | 0x007F_FFFF |
| 0x0108 | DPLL_TSA2 | calculated ACTION_2 TIME STAMP | 0x007F_FFFF |
| 0x010C | DPLL_TSA3 | calculated ACTION_3 TIME STAMP | 0x007F_FFFF |
| 0x0110 | DPLL_TSA4 | calculated ACTION_4 TIME STAMP | 0x007F_FFFF |
| 0x0114 | DPLL_TSA5 | calculated ACTION_5 TIME STAMP | 0x007F_FFFF |
| 0x0118 | DPLL_TSA6 | calculated ACTION_6 TIME STAMP | 0x007F_FFFF |
| 0x011C | DPLL_TSA7 | calculated ACTION_7 TIME STAMP | 0x007F_FFFF |
| 0x0120 | DPLL_TSA8 | calculated ACTION_8 TIME STAMP | 0x007F_FFFF |
| 0x0124 | DPLL_TSA9 | calculated ACTION_9 TIME STAMP | 0x007F_FFFF |
| 0x0128 | DPLL_TSA10 | calculated ACTION_10 TIME STAMP | 0x007F_FFFF |
| 0x012C | DPLL_TSA11 | calculated ACTION_11 TIME STAMP | 0x007F_FFFF |
| 0x0130 | DPLL_TSA12 | calculated ACTION_12 TIME STAMP | 0x007F_FFFF |
| 0x0134 | DPLL_TSA13 | calculated ACTION_13 TIME STAMP | 0x007F_FFFF |
| 0x0138 | DPLL_TSA14 | calculated ACTION_14 TIME STAMP | 0x007F_FFFF |
| 0x013C | DPLL_TSA15 | calculated ACTION_15 TIME STAMP | 0x007F_FFFF |
| 0x0140 | DPLL_TSA16 | calculated ACTION_16 TIME STAMP | 0x007F_FFFF |

-continued

| Address offset | Name | Description | Init value |
|---|---|---|---|
| 0x0144 | DPLL_TSA17 | calculated ACTION_17 TIME STAMP | 0x007F_FFFF |
| 0x0148 | DPLL_TSA18 | calculated ACTION_18 TIME STAMP | 0x007F_FFFF |
| 0x014C | DPLL_TSA19 | calculated ACTION_19 TIME STAMP | 0x007F_FFFF |
| 0x0150 | DPLL_TSA20 | calculated ACTION_20 TIME STAMP | 0x007F_FFFF |
| 0x0154 | DPLL_TSA21 | calculated ACTION_21 TIME STAMP | 0x007F_FFFF |
| 0x0158 | DPLL_TSA22 | calculated ACTION_22 TIME STAMP | 0x007F_FFFF |
| 0x015C | DPLL_TSA23 | calculated ACTION_23 TIME STAMP | 0x007F_FFFF |
| 0x0160 | DPLL_PSAC0 | calculated position value for action 0 | 0x007F_FFFF |
| 0x0164 | DPLL_PSAC1 | calculated position value for action 1 | 0x007F_FFFF |
| 0x0168 | DPLL_PSAC2 | calculated position value for action 2 | 0x007F_FFFF |
| 0x016C | DPLL_PSAC3 | calculated position value for action 3 | 0x007F_FFFF |
| 0x0170 | DPLL_PSAC4 | calculated position value for action 4 | 0x007F_FFFF |
| 0x0174 | DPLL_PSAC5 | calculated position value for action 5 | 0x007F_FFFF |
| 0x0178 | DPLL_PSAC6 | calculated position value for action 6 | 0x007F_FFFF |
| 0x017C | DPLL_PSAC7 | calculated position value for action 7 | 0x007F_FFFF |
| 0x0180 | DPLL_PSAC8 | calculated position value for action 8 | 0x007F_FFFF |
| 0x0184 | DPLL_PSAC9 | calculated position value for action 9 | 0x007F_FFFF |
| 0x0188 | DPLL_PSAC10 | calculated position value for action 10 | 0x007F_FFFF |
| 0x018C | DPLL_PSAC11 | calculated position value for action 11 | 0x007F_FFFF |
| 0x0190 | DPLL_PSAC12 | calculated position value for action 12 | 0x007F_FFFF |
| 0x0194 | DPLL_PSAC13 | calculated position value for action 13 | 0x007F_FFFF |
| 0x0198 | DPLL_PSAC14 | calculated position value for action 14 | 0x007F_FFFF |
| 0x019C | DPLL_PSAC15 | calculated position value for action 15 | 0x007F_FFFF |
| 0x01A0 | DPLL_PSAC16 | calculated position value for action 16 | 0x007F_FFFF |
| 0x01A4 | DPLL_PSAC17 | calculated position value for action 17 | 0x007F_FFFF |
| 0x01A8 | DPLL_PSAC18 | calculated position value for action 18 | 0x007F_FFFF |
| 0x01AC | DPLL_PSAC19 | calculated position value for action 19 | 0x007F_FFFF |
| 0x01B0 | DPLL_PSAC20 | calculated position value for action 20 | 0x007F_FFFF |
| 0x01B4 | DPLL_PSAC21 | calculated position value for action 21 | 0x007F_FFFF |
| 0x01B8 | DPLL_PSAC22 | calculated position value for action 22 | 0x007F_FFFF |
| 0x01BC | DPLL_PSAC23 | calculated position value for action 23 | 0x007F_FFFF |
| 0x01C0 | DPLL_ACB_0 | control bits for actions 0 . . . 3 | 0x0000_0000 |
| 0x01C4 | DPLL_ACB_1 | control bits for actions 4 . . . 7 | 0x0000_0000 |
| 0x01C8 | DPLL_ACB_2 | control bits for actions 8 . . . 11 | 0x0000_0000 |
| 0x01CC | DPLL_ACB_3 | control bits for actions 12 . . . 15 | 0x0000_0000 |
| 0x01D0 | DPLL_ACB_4 | control bits for actions 16 . . . 19 | 0x0000_0000 |
| 0x01D4 | DPLL_ACB_5 | control bits for actions 20 . . . 23 | 0x0000_0000 |

RAM Region 1 map description.

| Name | Description | Address offset |
| --- | --- | --- |
| | RAM Region 1a<br>0.375 Kbytes for 128 words of 24 Bits | 0x0200-0x03FC |
| PSA0 | ACTION_0 Position/Value action request Register | 0x0200 |
| PSA1 | ACTION_1 Position/Value action request Register | 0x0204 |
| PSA2 | ACTION_2 Position/Value action request Register | 0x0208 |
| PSA3 | ACTION_3 Position/Value action request Register | 0x020C |
| PSA4 | ACTION_4 Position/Value action request Register | 0x0210 |
| PSA5 | ACTION_5 Position/Value action request Register | 0x0214 |
| PSA6 | ACTION_6 Position/Value action request Register | 0x0218 |
| PSA7 | ACTION_7 Position/Value action request Register | 0x021C |
| PSA8 | ACTION_8 Position/Value action request Register | 0x0220 |
| PSA9 | ACTION_9 Position/Value action request Register | 0x0224 |
| PSA10 | ACTION_10 Position/Value action request Register | 0x0228 |
| PSA11 | ACTION_11 Position/Value action request Register | 0x022C |
| PSA12 | ACTION_12 Position/Value action request Register | 0x0230 |
| PSA13 | ACTION_13 Position/Value action request Register | 0x0234 |
| PSA14 | ACTION_14 Position/Value action request Register | 0x0238 |
| PSA15 | ACTION_15 Position/Value action request Register | 0x023C |
| PSA16 | ACTION_16 Position/Value action request Register | 0x0240 |
| PSA17 | ACTION_17 Position/Value action request Register | 0x0244 |
| PSA18 | ACTION_18 Position/Value action request Register | 0x0248 |
| PSA19 | ACTION_19 Position/Value action request Register | 0x024C |
| PSA20 | ACTION_20 Position/Value action request Register | 0x0250 |
| PSA21 | ACTION_21 Position/Value action request Register | 0x0254 |
| PSA22 | ACTION_22 Position/Value action request Register | 0x0258 |
| PSA23 | ACTION_23 Position/Value action request Register | 0x025C |
| DLA0 | ACTION_0 time to react before PSA0 | 0x0260 |
| DLA1 | ACTION_1 time to react before PSA1 | 0x0264 |
| DLA2 | ACTION_2 time to react before PSA2 | 0x0268 |
| DLA3 | ACTION_3 time to react before PSA3 | 0x026C |
| DLA4 | ACTION_4 time to react before PSA4 | 0x0270 |
| DLA5 | ACTION_5 time to react before PSA5 | 0x0274 |
| DLA6 | ACTION_6 time to react before PSA6 | 0x0278 |
| DLA7 | ACTION_7 time to react before PSA7 | 0x027C |
| DLA8 | ACTION_8 time to react before PSA8 | 0x0280 |
| DLA9 | ACTION_9 time to react before PSA9 | 0x0284 |
| DLA10 | ACTION_10 time to react before PSA10 | 0x0288 |
| DLA11 | ACTION_11 time to react before PSA11 | 0x028C |
| DLA12 | ACTION_12 time to react before PSA12 | 0x0290 |

-continued

| Name | Description | Address offset |
|---|---|---|
| DLA13 | ACTION_13 time to react before PSA13 | 0x0294 |
| DLA14 | ACTION_14 time to react before PSA14 | 0x0298 |
| DLA15 | ACTION_15 time to react before PSA15 | 0x029C |
| DLA16 | ACTION_16 time to react before PSA16 | 0x02A0 |
| DLA17 | ACTION_17 time to react before PSA17 | 0x02A4 |
| DLA18 | ACTION_18 time to react before PSA18 | 0x02A8 |
| DLA19 | ACTION_19 time to react before PSA19 | 0x02AC |
| DLA20 | ACTION_20 time to react before PSA20 | 0x02B0 |
| DLA21 | ACTION_21 time to react before PSA21 | 0x02B4 |
| DLA22 | ACTION_22 time to react before PSA22 | 0x02B8 |
| DLA23 | ACTION_23 time to react before PSA23 | 0x02BC |
| NA0 | # of TRIGGER/STATE increments to ACTION_0 | 0x02C0 |
| NA1 | # of TRIGGER/STATE increments to ACTION_1 | 0x02C4 |
| NA2 | # of TRIGGER/STATE increments to ACTION_2 | 0x02C8 |
| NA3 | # of TRIGGER/STATE increments to ACTION_3 | 0x02CC |
| NA4 | # of TRIGGER/STATE increments to ACTION_4 | 0x02D0 |
| NA5 | # of TRIGGER/STATE increments to ACTION_5 | 0x02D4 |
| NA6 | # of TRIGGER/STATE increments to ACTION_6 | 0x02D8 |
| NA7 | # of TRIGGER/STATE increments to ACTION_7 | 0x02DC |
| NA8 | # of TRIGGER/STATE increments to ACTION_8 | 0x02E0 |
| NA9 | # of TRIGGER/STATE increments to ACTION_9 | 0x02E4 |
| NA10 | # of TRIGGER/STATE increments to ACTION_10 | 0x02E8 |
| NA11 | # of TRIGGER/STATE increments to ACTION_11 | 0x02EC |
| NA12 | # of TRIGGER/STATE increments to ACTION_12 | 0x02F0 |
| NA13 | # of TRIGGER/STATE increments to ACTION_13 | 0x02F4 |
| NA14 | # of TRIGGER/STATE increments to ACTION_14 | 0x02F8 |
| NA15 | # of TRIGGER/STATE increments to ACTION_15 | 0x02FC |
| NA16 | # of TRIGGER/STATE increments to ACTION_16 | 0x0300 |
| NA17 | # of TRIGGER/STATE increments to ACTION_17 | 0x0304 |
| NA18 | # of TRIGGER/STATE increments to ACTION_18 | 0x0308 |
| NA19 | # of TRIGGER/STATE increments to ACTION_19 | 0x030C |
| NA20 | # of TRIGGER/STATE increments to ACTION_20 | 0x0310 |
| NA21 | # of TRIGGER/STATE increments to ACTION_21 | 0x0314 |
| NA22 | # of TRIGGER/STATE increments to ACTION_22 | 0x0318 |
| NA23 | # of TRIGGER/STATE increments to ACTION_23 | 0x031C |
| DTA0 | calculated relative time to ACTION_0 | 0x0320 |
| DTA1 | calculated relative time to ACTION_1 | 0x0324 |
| DTA2 | calculated relative time to ACTION_2 | 0x0328 |

-continued

| Name | Description | Address offset |
|---|---|---|
| DTA3 | calculated relative time to ACTION_3 | 0x032C |
| DTA4 | calculated relative time to ACTION_4 | 0x0330 |
| DTA5 | calculated relative time to ACTION_5 | 0x0334 |
| DTA6 | calculated relative time to ACTION_6 | 0x0338 |
| DTA7 | calculated relative time to ACTION_7 | 0x033C |
| DTA8 | calculated relative time to ACTION_8 | 0x0340 |
| DTA9 | calculated relative time to ACTION_9 | 0x0344 |
| DTA10 | calculated relative time to ACTION_10 | 0x0348 |
| DTA11 | calculated relative time to ACTION_11 | 0x034C |
| DTA12 | calculated relative time to ACTION_12 | 0x0350 |
| DTA13 | calculated relative time to ACTION_13 | 0x0354 |
| DTA14 | calculated relative time to ACTION_14 | 0x0358 |
| DTA15 | calculated relative time to ACTION_15 | 0x035C |
| DTA16 | calculated relative time to ACTION_16 | 0x0360 |
| DTA17 | calculated relative time to ACTION_17 | 0x0364 |
| DTA18 | calculated relative time to ACTION_18 | 0x0368 |
| DTA19 | calculated relative time to ACTION_19 | 0x036C |
| DTA20 | calculated relative time to ACTION_20 | 0x0370 |
| DTA21 | calculated relative time to ACTION_21 | 0x0374 |
| DTA22 | calculated relative time to ACTION_22 | 0x0378 |
| DTA23 | calculated relative time to ACTION_23 | 0x037C |
| | RAM Region 1b<br>Note: the following registers for variables are located in RAM Region 1b, read access by AEI via bus interface possible, writing results in an interrupt;<br>data width of 3 Bytes used for 24 bit values<br>TRIGGER signal information stored | 0x0400-0x05FC<br>0.375 Kbytes for 128 words of 24 Bits |
| TS_T | Actual signal TRIGGER time stamp register TRIGGER_TS | 0x0400/ 0x0404 |
| TS_T_old | Previous signal TRIGGER time stamp register TRIGGER_TS_old | 0x0404/ 0x0400 |
| FTV_T | Actual signal TRIGGER filter and signal value | 0x0408/ 0x040C |
| FTV_T_old | Previous signal TRIGGER filter and signal value | 0x040C/ 0x0408 |
| | Note: the switch of the LSB address bits is performed using the SWON register at 0x0020<br>STATE signal information stored | 0x0400 . . . 0x040C |
| TS_S | Actual signal STATE time stamp register STATE_TS | 0x0410/ 0x0414 |
| TS_S_old | Previous signal STATE time stamp register STATE_TS_old | 0x0414/ 0x0410 |
| FTV_S | Actual signal STATE filter and signal value | 0x0418/ 0x041C |
| FTV_T_old | Previous signal STATE filter and signal value | 0x041C/ 0x0418 |
| | Note: The switch of the LSB address bits is performed using the SWON register at 0x0020. | 0x0410 . . . 0x041C |
| THMI | TRIGGER hold time min value | 0x0420 |
| THMA | TRIGGER hold time max value | 0x0424 |

-continued

| Name | Description | Address offset |
|---|---|---|
| THVAL | measured last pulse time from valid to invalid TRIGGER slope | 0x0428 |
| | reserved | 0x042C |
| ADD_IN_LD_N | ADD_IN value for direct load normal mode | 0x0430 |
| ADD_IN_LD_E | ADD_IN value for direct load emergency mode | 0x0434 |
| ADD_IN_CAL_N | calculated ADD_IN value for normal mode | 0x0438 |
| ADD_IN_CAL_E | calculated ADD_IN value for emergency mode | 0x043C |
| MPVAL1 | missing pulses to be added/subtracted directly to SUB_INC1 and INC_CNT1 once | 0x0440 |
| MPVAL2 | missing pulses to be added/subtracted directly to SUB_INC2 and INC_CNT2 once | 0x0444 |
| TOV_S | Time out value of STATE, exceeding one increment | 0x0448 |
| | reserved | 0x044C . . .0x0458 |
| RCDT_TX | reciprocal value of expected increment duration (T) | 0x0460 |
| RCDT_SX | reciprocal value of expected increment duration (S) | 0x0464 |
| RCDT_TX_nom | reciprocal value of the expected nominal increment duration (T) | 0x0468 |
| RCDT_SX_nom | reciprocal value of the expected nominal increment duration (S) | 0x046C |
| RDT_T_actual | actual reciprocal value of TRIGGER | 0x0470 |
| RDT_S_actual | actual reciprocal value of STATE | 0x0474 |
| DT_T_actual | Duration of last TRIGGER increment | 0x0478 |
| DT_S_actual | Duration of last STATE increment | 0x047C |
| | Calculated immediate values (eq. 16.1 to 16.10) | |
| EDT_T | Absolute error of prediction for last TRIGGER increment | 0x0480 |
| MEDT_T | Average absolute error of prediction up to the last TRIGGER increment | 0x0484 |
| EDT_S | absolute error of prediction for last STATE increment | 0x0488 |
| MEDT_S | Average absolute error of prediction up to the last STATE increment | 0x048C |
| CDT_TX | Expected duration of current TRIGGER increment | 0x0490 |
| CDT_SX | Expected duration of current STATE increment | 0x0494 |
| CDT_TX_nom | Expected nominal duration of current TRIGGER increment (without consideration of missing events) | 0x0498 |
| CDT_SX_nom | Expected nominal duration of current STATE increment (without consideration of missing events) | 0x049C |
| | calculated position stamps in normal or emergency mode (see equations 16.17 or 16.20 for calculations respectively) | |
| | Relations of the sum of prediction increments to the reference increment in the past (see equations 16.11 or 16.13 for calculation) | |
| PDT_T0 | For ACTION_0 in normal mode | 0x0500 |
| PDT_T1 | For ACTION_1 in normal mode | 0x0504 |
| . . . | . . . | . . . |
| PDT_T23 | For ACTION_23 in normal mode | 0x055C |
| PDT_S0 | For ACTION_0 in emergency mode | 0x0560 |
| PDT_S1 | For ACTION_1 in emergency mode | 0x0564 |
| . . . | . . . | . . . |
| PDT_S23 | For ACTION_23 in emergency mode | 0x05BC |
| MLS1 | Calculated number of sub-pulses between two STATE events (to be set by CPU) | 0x05C0 |
| MLS2 | Calculated number of sub-pulses between two STATE events (to be set by CPU) for the use when SMC = RMO = 1 | 0x05C4 |

-continued

| Name | Description | Address offset |
|---|---|---|
| CNT_NUM_1 | number of sub-pulses of SUB_INC1 in continuous mode, updated by the host only | 0x05C8 |
| CNT_NUM_2 | number of sub-pulses of SUB_INC2 in continuous mode, updated by the host only | 0x05CC |
| PVT | Plausibility value of next active TRIGGER slope | 0x05D0 |
| TOV | Time out value of active TRIGGER slope, exceeding one increment | 0x05D4 |
| PSTC | Accurate calculated position stamp of last TRIGGER input; | 0x05E0 |
| PSSC | Accurate calculated position stamp of last STATE input; | 0x05E4 |
| PSTM | Measured position stamp of last TRIGGER input | 0x05E8/ 0x05EC |
| PSTM_old | Measured position stamp of last but one TRIGGER input | 0x05EC/ 0x05E8 |
| PSSM | Measured position stamp of last STATE input | 0x05F0/ 0x05F4 |
| PSSM_old | Measured position stamp of last but one STATE input | 0x05F4/ 0x05F0 |
| NMB_T | Number of pulses of current increment in normal mode for SUB_INC1(see equation 16.21 or for SMC = 1 equation 16.27 respectively) | 0x05F8 |
| NMB_S | Number of pulses of current increment in emergency mod for SUB_INC1 (see equation 16.22) or in the case SMC = 1 for SUB_INC2 (see equation 16.28) | 0x05FC |
| | RAM Region 1c<br>Note: the following registers for the signal STATE are located in RAM Region 1c, read access by AEI via bus interface possible, writing results in an interrupt;<br>data width of 3 Bytes used for 24 bit values | 0x0600-0x09FC<br>0.75 Kbytes for 256 words of 24 Bits |
| 1c1 | Reciprocal values of the corresponding successive increments RDT_Si (see equations 16.6a,b); the values are calculated using the recent NUSE increments (see NUSC register at address 0x0038) | |
| RDT_S0 | RDT_S0 | 0x0600 |
| RDT_S1 | RDT_S1 | 0x0604 |
| . . . | . . . 2 * (SNU + 1 − SYN_NS) valid entries | . . . |
| RDT_S63 | RDT_S63 | 0x06FC |
| 1c2 | Time stamp field for STATE events | |
| TSF_S0 | TSF_S0 | 0x0700 |
| TSF_S1 | TSF_S1 | 0x0704 |
| . . . | . . . 2 * (SNU + 1) valid entries | . . . |
| TSF_S63 | TSF_S63 | 0x07FC |
| 1c3 | Adapt values for the current STATE increment; time stamp values bits 24-27 in addition to the corresponding 24 bit value of TSF_Sx above, stored in bits 23:20 of ADT_Si; | |
| ADT_S0 | ADT_S0 | 0x0800 |
| ADT_S1 | ADT_S1 | 0x0808 |
| . . . | . . . 2 * (SNU + 1 − SYN_NS) valid entries | . . . |
| ADT_S63 | ADT_S63 | 0x08FC |
| 1c4 | Uncorrected last increment value of STATE (DT_S) for FULL_SCALE; measuring data of increments without corrections used for the CPU to generate ADT_S values | |
| DT_S0 | DT_S0 | 0x0900 |
| DT_S1 | DT_S1 | 0x0904 |
| . . . | . . . 2 * (SNU + 1 − SYN_NS) valid entries | . . . |
| DT_S63 | DT_S63 | 0x09FC |

RAM Region 2 map description.

| Name | Description | Address offset |
|---|---|---|
| | RAM Region 2<br>NOTE: the following registers for the signal TRIGGER are located in RAM region 2, read access by AEI via bus interface possible, write access results in an interrupt, when enabled;<br>data width of 3 bytes used for 24 bit values<br>The RAM field part contains up to 1024 values and all are configurable for 128, 256, 512 or 1024 values in order to select the RAM size needed | 0x4000-0x7FFC size from 1.5 kBytes to 12 kBytes configurable for word sizes of 24 Bits |
| Region 2a | Reciprocal values of the corresponding successive increments RDT_Ti (see equations 16.2a,b);<br>address offsets are given by the AOSR0 . . . 3 | AOSV_2i values are addresses after shift left by 8 |
| RDT_T0 | RDT_T0 | AOSV_2a |
| RDT_T1 | RDT_T1 | +4 |
| . . . | . . . 2 * (TNU + 1 − SYN_NT) valid entries | . . . |
| RDT_T1023 | RDT_T1023 | +4092 |
| Region 2b | Time stamp field for all TRIGGER events in FULL_SCALE; 24 bit time stamp values | |

-continued

| Name | Description | Address offset |
|---|---|---|
| TSF_T0 | TSF_T0 | AOSV_2b |
| TSF_T1 | TSF_T1 | +4 |
| . . . | . . . 2 * (TNU + 1) valid entries | . . . |
| TSF_T1023 | TSF_T1023 | +4092 |
| Region 2c | ADT_T values to correct the measured TRIGGER signal values; time stamp values bits 24-27 in addition to the 24 bit value of TSF_Tx, stored in the bits 23:20 of ADT_Ti | |
| ADT_T0 | ADT_T0 | AOSV_2c |
| ADT_T1 | ADT_T1 | +4 |
| . . . | . . . 2 * (TNU + 1 − SYN_NT) valid entries | . . . |
| ADT_T1023 | ADT_T1023 | +4092 |
| Region 2d | Uncorrected last increment values of TRIGGER (DT_T); measuring raw data of increments | |
| DT_T0 | DT_T0 | AOSV_2d |
| DT_T1 | DT_T1 | +4 |
| . . . | . . . 2 * (TNU + 1 − SYN_NT) valid entries | . . . |
| DT_T1023 | DT_T1023 | +4092 |

DPLL Register Description

DPLL_CTRL_0

Address Offset: 0x0000

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | RMO | TEN | SEN | IDT | IDS | AMT | AMS | | | | | TNU | | | | |
| Mode | RW | RW | RW | RW | RW | RW | RW | | | | | RPw | | | | |
| Initial Value | 0 | 0 | 0 | 0 | 0 | 0 | 0 | | | | | 0x3C | | | | |

Initial Value: 0x003C_BA58

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | | | SNU | | | IFP | | | | | MLT | | | | | |
| Mode | | | RPw | | | RW | | | | | RW | | | | | |
| Initial Value | | | 0x17 | | | 0 | | | | | 0x258 | | | | | |

Bit 9:0 MLT [1)]: Number of SUB_INC1 pulses between two TRIGGER events in normal mode (1 . . . 1024);

For emergency mode the number of SUB_INC1 pulses between two STATE events is calculated by the CPU using the formula MLS1 = (MLT + 1)* (TNU + 1)/(SNU + 1) in order to get the same number of SUB_INC1 pulses for FULL_SCALE. This value is stored in RAM at 0x03E4. Change of MLT by the CPU must result in the corresponding change of MLS1 by the CPU for SMC = 0.

Note: The number of MLT events is the binary value plus 1. The value MLT + 1 is replaced by MLS1 in the case of SMC = 1 (see DPLL_CTRL_1 register) for all relevant calculations.

Bit 10 IFP [1), 2), 4)]: input filter value contains position or time related information.

0 = TRIGGER_FT and STATE_FT mean time related values, that means the number of time stamp clocks 1 = TRIGGER_FT and STATE_FT mean position related values, that means the number of SUB_INC1 (or SUB_INC2 in the case SMC = 1) pulses respectively Bit 15:11 SNU [3)]: Number of STATE events in HALF_SCALE (1 . . . 32).

Note: The number of STATE events is the binary value plus 1. Set by DEN = 0 only.

Bit 24:16 TNU [3)]: Number of TRIGGER events in HALF_SCALE (1 . . . 512).

Note: The number of TRIGGER events is the binary value plus 1. Set by DEN = 0 only.

Bit 25 AMS [2)]: Use of adaptation information of STATE.

0 = No adaptation information is used for STATE

1 = Immediate adapting mode; the values ADT_Si are considered to calculate SUB_INC1 pulses in emergency mode (SMC = 0) or SUB_INC2 pulses for SMC = 1

Bit 26 AMT [1)]: Use of adaptation information of TRIGGER.

0 = No adaptation information for TRIGGER is used

1 = Immediate adapting mode; the values ADT_Ti are considered to calculate the SUB_INC1 pulses in normal mode and for SMC = 1

Bit 27 IDS [2)]: Use of input delay information transmitted in FT part of the STATE signal.

0 = Delay information is not used

1 = Up to 24 bits of the FT part contain the delay value of the input signal, concerning the corresponding edge Bit 28 IDT [1)]: use of input delay information transmitted in FT part of the TRIGGER signal.

0 = Delay information is not used

-continued

| DPLL_CTRL_0 |
|---|
| 1 = Up to 24 bits of the FT part contain the delay value of the input signal, concerning the corresponding edge |
| Bit 29 SEN: STATE enable. |
| 0 = STATE signal is not enabled (no signal considered) |
| 1 = STATE signal is enabled |
| Bit 30 TEN: TRIGGER enable. |
| 0 = TRIGGER signal is not enabled (no signal considered) |
| 1 = TRIGGER signal is enabled |
| Bit 31 RMO [1), 2)]: Reference mode—selection of the input signal. |
| 0 = Normal mode; the signal TRIGGER is used to generate the SUB_INC1 signals |
| 1 = Emergency mode for SMC = 0; signal STATE is used to generate the SUB_INC1 signals; |
| Double synchronous mode for SMC = 1: signal TRIGGER is used to generate the SUB_INC1 signals and STATE is used to generate the SUB_ INC2 signals |
| Note: for SMC = 0: TRIGGER and STATE are prepared to calculate SUB_INC1. The RMO bit gives a decision only, which of them is used. |
| [1)] stored in an independent shadow register for a valid TRIGGER event |
| [2)] stored in an independent shadow register for a valid STATE event. |
| [3)] the time between two STATE or TRIGGER events must be always greater then 23.4 μs |
| [4)] for IFP = 1 the time between two TRIGGER or STATE events must be always greater then 2.34 ms |

DPLL_CTRL_1

| | 31 | 30 | 29 | 28 | 27 | 26 | 25 | 24 | 23 | 22 | 21 | 20 | 19 | 18 | 17 | 16 | 15 | 14 | 13 | 12 | 11 |
|---|---|---|---|---|---|---|---|---|---|---|---|---|---|---|---|---|---|---|---|---|---|
| | Address Offset: 0x0004 | | | | | | | | | | | | | | | | Initial Value: 0xB180_0000 | | | | |
| Bit | TSL | | SSL | | SMC | reserved | | | | | | SYN_NT | | | | | SYN_NS | | | | |
| Mode | RPw | | RPw | | RPw | R | | | | | | RW | | | | | RW | | | | |
| Initial Value | 0x2 | | 0x3 | | 0 | 0x0 | | | | | | 0x00 | | | | | 0x00 | | | | |

Initial Value: 0xB180_0000

| | 10 | 9 | 8 | 7 | 6 | 5 | 4 | 3 | 2 | 1 | 0 |
|---|---|---|---|---|---|---|---|---|---|---|---|
| Bit | PCM2 | DLM2 | SGE2 | PCM1 | DLM1 | SGE1 | PIT | COA | reserved | DEN | DMO |
| Mode | RW | RW | RW | RW | RW | RW | RW | RW | R | RW | RW |
| Initial Value | 0 | 0 | 0 | 0 | 0 | 0 | 0 | 0 | 0 | 0 | 0 |

Bit 0 DMO [1), 2)]: DPLL mode select.

0 = Automatic end mode; if the number of pulses for a increment is reached, no further pulse is generated until the next valid TRIGGER/STATE is received; in the case of getting a new valid TRIGGER/STATE before the defined number of pulses is reached, the pulse frequency is changed according to the conditions described below (COA)

1 = Continuous mode; in this mode a difference between the predefined number of pulses and the actual number of generated pulses can influence the pulse frequency by writing a corresponding pulse number into CNT_NUM_1 or CNT_NUM_2 respectively in RAM region 1b.

Bit 1 DEN [1, 2)]: DPLL enable.

0 = The DPLL is not enabled; Disabling the DPLL will result in a reset state of the DPLL.

1 = The DPLL is enabled;

Note: The bits 30 down to 15 of the DPLL Status register are cleared, when the DPLL is disabled. Some bits of the control registers can be set only when DEN = 0.

Bit 2 Read as zero, should be written as zero.

Bit 3 COA [1), 2)]: Correction strategy in automatic end mode (DMO = 0).

0 = The maximum pulse frequency of the system clock will be used to make up for missing pulses from last increment; the output of the calculated new pulses will be delayed accordingly and the FFs in the pulse generation unit will be reset before sending new pulses 1 = missing pulses of the last increment are distributed evenly to the next increment, calculations are done when the next valid input event appears. The number of missing sub-pulses will be determined by the pulse counter difference between the last two valid TRIGGER/STATE events respectively; the FFs in the pulse generation unit are not reset before sending new pulses.

Note: For SMC = RMO = 1: COA is used for SUB_INC1 and SUB_INC2.

Bit 4 PIT [1)]: Plausibility value PVT to next valid TRIGGER is time related

0 = the plausibility value is position related (PVT contains the number of SUB_INC1 pulses)

1 = the plausibility value is time related (the PVT value is to be multiplied with the expected duration of the current increment CDT_Ti and divided by 1024)

Bit 5 SGE1 [1), 2)]: SUB_INC1 generator enable.

0 = The SUB_INC1 generator is not enabled

1 = The SUB_INC1 generator is enabled

Bit 6

DLM1 [1), 2)]: Direct Load Mode for SUB_INC1 generation

0 = the DPLL uses the calculated ADD_IN_CAL value for the SUB_INC1 generation

1 = the ADD_IN_LD value is used for the SUB_INC1 generation and is provided by the CPU; the value remains valid until the CPU writes a new one; the calculated ADD_IN values are stored as ADD_IN_CAL in the RAM at different locations for normal and emergency mode Bit 7 PCM1 [1), 2), 3)]: Pulse Correction Mode for SUB_INC1 generation.

0 = the DPLL does not use the correction value stored in MPVAL1

1 = the DPLL uses the correction value stored in MPVAL1 in normal and emergency mode Bit 8 SGE2 [2)]: SUB_INC2 generator enable.

0 = The SUB_INC2 generator is not enabled

1 = The SUB_INC2 generator is enabled

Bit 9 DLM2 [2)]: Direct Load Mode for SUB_INC2 generation

-continued

| DPLL_CTRL_1 |
|---|
| 0 = the DPLL uses the calculated ADD_IN_CAL value for the SUB_INC2 generation |
| 1 = the ADD_IN_LD value is used for the SUB_INC2 generation and is provided by the CPU; the value remains valid until the CPU writes a new one; the calculated ADD_IN values are stored as ADD_IN_CAL in the RAM at different locations for normal and emergency mode |
| Bit 10 PCM2 [2), 3)]: Pulse Correction Mode for SUB_INC2 generation. |
| 0 = the DPLL does not use the correction value stored in MPVAL2 |
| 1 = the DPLL uses the correction value stored in MPVAL2 |
| Bit 15:11 SYN_NS [2)]: synchronization number of STATE |
| sum of all missing STATE events for synchronisation purposes in HALF_SCALE; the SYN_NS missing STATES can be divided up to an arbitrary number of blocks. The pattern of events and missing events in FULL_SCALE is shown in RAM region 1c3 as value NS in addition to the adapt values. The number of stored increments in FULL_SCALE must be equal to 2*(SNU-SYN_NS). This pattern is written by the CPU beginning from a fixed reference point (maybe beginning of the FULL_SCALE region). The relation to the actual increment is done by the CPU by use of the RAM pointers APS and APS_1c3. |
| Bit 20:16 SYN_NT [1)]: synchronization number of TRIGGER: |
| sum of all missing TRIGGER events for synchronisation purposes in HALF_SCALE; the SYN_NT missing TRIGGER can be divided up to an arbitrary number of blocks. The pattern of events and missing events in FULL_SCALE is shown in RAM region 2c as value NT in addition to the adapt values. The number of stored increments in FULL_SCALE must be equal to 2*(TNU-SYN_NT). This pattern is written by the CPU beginning from a fixed reference point (maybe beginning of the FULL_SCALE region). The relation to the actual increment is done by the CPU by use of the RAM pointers APT and APT_2c. |
| Bit 26:21 reserved: Read as zero, should be written as zero. |
| Bit 27 SMC: Synchronous Motor Control |
| 0 = the TRIGGER input is not used for SMC |
| 1 = the TRIGGER input reflects a combined sensor signal for SMC |
| Bit 29:28 SSL: Definition of active slope for signal STATE each active slope is an event defined by SNU. Set by DEN = 0 only. |
| 00: No slope of STATE will be used; this value makes only sense in normal mode |
| 01: Low high slope will be used as active slope, only inputs with a signal value of “1” will be considered |
| 10: High low slope will be used as active slope, only inputs with a signal value of “0” will be considered |
| 11: Both slopes will be used as active slopes |
| Bit 31:30 TSL: Definition of active slope for signal TRIGGER each active slope is an event defined by TNU. Set by DEN = 0 only. |
| 00: No slope of TRIGGER will be used; this value makes only sense in emergency mode |
| 01: Low high slope will be used as active slope, only inputs with a signal value of “1” will be considered |
| 10: High low slope will be used as active slope, only inputs with a signal value of “0” will be considered |
| 11: Both slopes will be used as active slopes |
| [1)] stored in an independent shadow register for a valid TRIGGER event |
| [2)] stored in an independent shadow register for a valid STATE event |
| [3)] Bit is cleared, when transmitted to shadow register |

DPLL_CTRL_2 (DPLL_ACTION enable register)

Address Offset: 0x0008

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | | | | WAD7 | WAD6 | WAD5 | WAD4 | WAD3 | WAD2 | WAD1 | WAD0 |
| Mode | R | | | | | | | | RAw | RAw | RAw | RAw | RAw | RAw | RAw | RAw |
| Initial Value | 0x00 | | | | | | | | 0 | 0 | 0 | 0 | 0 | 0 | 0 | 0 |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | AEN7 | AEN6 | AEN5 | AEN4 | AEN3 | AEN2 | AEN1 | AEN0 | reserved | | | | | | | |
| Mode | RPw | RPw | RPw | RPw | RPw | RPw | RPw | RPw | R | | | | | | | |
| Initial Value | 0 | 0 | 0 | 0 | 0 | 0 | 0 | 0 | 0x00 | | | | | | | |

Bit 7:0 reserved: Read as zero, should be written as zero.
Bit 8 AEN0 [1)]: ACTION_0 enable.
Bit 9 AEN1 [1)]: ACTION_1 enable.
Bit 10 AEN2 [1)]: ACTION_2 enable.
Bit 11 AEN3 [1)]: ACTION_3 enable.
Bit 12 AEN4 [1)]: ACTION_4 enable.
Bit 13 AEN5 [1)]: ACTION_5 enable.
Bit 14 AEN6 [1)]: ACTION_6 enable.
Bit 15 AEN7 [1)]: ACTION_7 enable.
Bit 16 WAD0: Write control bit of Action_0.
Bit 17 WAD1: Write control bit of Action_1.
Bit 18 WAD2: Write control bit of Action_2.
Bit 19 WAD3: Write control bit of Action_3.
Bit 20 WAD4: Write control bit of Action_4.
Bit 21 WAD5: Write control bit of Action_5.
Bit 22 WAD6: Write control bit of Action_6.
Bit 23 WAD7: Write control bit of Action_7.
Bit 31:24 Reserved: Read as zero, should be written as zero.
Note: For writing WADx = 1 only the corresponding the AENx bits are written. The AENx bits remain unchanged when the corresponding WADx = 0.
[1)] to be set for debug purposes by CPU also, when DPLL is disabled DPLL_CTRL_3 (DPLL_ACTION enable register)

Address Offset: 0x000C

| | 31 30 29 28 27 26 25 24 | 23 | 22 | 21 | 20 | 19 | 18 | 17 | 16 |
|---|---|---|---|---|---|---|---|---|---|
| Bit | Reserved | WAD15 | WAD14 | WAD13 | WAD12 | WAD11 | WAD10 | WAD9 | WAD8 |
| Mode | R | RAw | RAw | RAw | RAw | RAw | RAw | RAw | RAw |
| Initial Value | 0x00 | 0 | 0 | 0 | 0 | 0 | 0 | 0 | 0 |

Initial Value: 0x0000_0000

| | 15 | 14 | 13 | 12 | 11 | 10 | 9 | 8 | 7 6 5 4 3 1 0 |
|---|---|---|---|---|---|---|---|---|---|
| Bit | AEN15 | AEN14 | AEN13 | AEN12 | AEN11 | AEN10 | AEN9 | AEN8 | reserved |
| Mode | RPw | RPw | RPw | RPw | RPw | RPw | RPw | RPw | R |
| Initial Value | 0 | 0 | 0 | 0 | 0 | 0 | 0 | 0 | 0x00 |

Bit 7:0 reserved: Read as zero, should be written as zero.
Bit 8 AEN8 [1)]: ACTION_8 enable.
Bit 9 AEN9 [1)]: ACTION_9 enable
Bit 10 AEN10 [1)]: ACTION_10enable.
Bit 11 AEN11 [1)]: ACTION_11 enable.
Bit 12 AEN12 [1)]: ACTION_12 enable.
Bit 13 AEN13 [1)]: ACTION_13 enable.
Bit 14 AEN14 [1)]: ACTION_14 enable.
Bit 15 AEN15 [1)]: ACTION_15 enable.
Bit 16 WAD8: Write control bit of Action_8.
Bit 17 WAD9: Write control bit of Action_9.
Bit 18 WAD10: Write control bit of Action_10.
Bit 19 WAD11: Write control bit of Action_11.
Bit 20 WAD12: Write control bit of Action_12.
Bit 21 WAD13: Write control bit of Action_13.
Bit 22 WAD14: Write control bit of Action_14.
Bit 23 WAD15: Write control bit of Action_15.
Bit 31:24 Reserved: Read as zero, should be written as zero.
Note: For writing WADx = 1 only the corresponding the AENx bits are written. The AENx bits remain unchanged when the corresponding WADx = 0.
[1)] to be set for debug purposes by CPU also, when DPLL is disabled DPLL_CTRL_4 (DPLL_ACTION enable register)

Address Offset: 0x0010

| | 31 30 29 28 27 26 25 24 | 23 | 22 | 21 | 20 | 19 | 18 | 17 | 16 |
|---|---|---|---|---|---|---|---|---|---|
| Bit | Reserved | WAD23 | WAD22 | WAD21 | WAD20 | WAD19 | WAD18 | WAD17 | WAD16 |
| Mode | R | RAw | RAw | RAw | RAw | RAw | RAw | RAw | RAw |
| Initial Value | 0x00 | 0 | 0 | 0 | 0 | 0 | 0 | 0 | 0 |

Initial Value: 0x0000_0000

| | 15 | 14 | 13 | 12 | 11 | 10 | 9 | 8 | 7 6 5 4 3 2 1 0 |
|---|---|---|---|---|---|---|---|---|---|
| Bit | AEN23 | AEN22 | AEN21 | AEN20 | AEN19 | AEN18 | AEN17 | AEN16 | reserved |
| Mode | RPw | RPw | RPw | RPw | RPw | RPw | RPw | RPw | R |
| Initial Value | 0 | 0 | 0 | 0 | 0 | 0 | 0 | 0 | 0x00 |

Bit 7:0 reserved: Read as zero, should be written as zero.
Bit 8 AEN16 [1)]: ACTION_16 enable.
Bit 9 AEN17 [1)]: ACTION_17 enable
Bit 10 AEN18 [1)]: ACTION_18 enable.
Bit 11 AEN19 [1)]: ACTION_19 enable.
Bit 12 AEN20 [1)]: ACTION_20 enable.
Bit 13 AEN21 [1)]: ACTION_21 enable.
Bit 14 AEN22 [1)]: ACTION_22 enable.
Bit 15 AEN23 [1)]: ACTION_23 enable.
Bit 16 WAD16: Write control bit of Action_16.
Bit 17 WAD17: Write control bit of Action_17.
Bit 18 WAD18: Write control bit of Action_18.
Bit 19 WAD19: Write control bit of Action_19.
Bit 20 WAD20: Write control bit of Action_20.
Bit 21 WAD21: Write control bit of Action_21.
Bit 22 WAD22: Write control bit of Action_22.
Bit 23 WAD23: Write control bit of Action_23.

-continued

| DPLL_CTRL_4 (DPLL_ACTION enable register) |
|---|
| Bit 31:24 Reserved: Read as zero, should be written as zero.<br>Note: For writing WADx = 1 only the corresponding the AENx bits are written. The AENx bits remain unchanged when the corresponding WADx = 0.<br>1) to be set for debug purposes by CPU also, when DPLL is disabled |

DPLL_STATUS

Address Offset: 0x0014

| | 31 | 30 | 29 | 28 | 27 | 26 | 25 | 24 | 23 | 22 | 21 | 20 | 19 | 18 | 17 16 |
|---|---|---|---|---|---|---|---|---|---|---|---|---|---|---|---|
| Bit | ERR | LOCK1 | FTD | FSD | SYT | SYS | LOCK2 | Reserved | BWD1 | BWD2 | ITN | ISN | CAIP1 | CAIP2 | Reserved |
| Mode | RCw | R | R | R | R | R | R | R | R | R | R | R | R | R | R |
| Initial Value | 0 | 0 | 0 | 0 | 0 | 0 | 0 | 0 | 0 | 0 | 0 | 0 | 0 | 0 | 0x00 |

Initial Value: 0x0000_0000

| | 15 14 13 12 | 11 | 10 | 9 | 8 | 7 | 6 5 4 | 3 | 2 | 1 | 0 |
|---|---|---|---|---|---|---|---|---|---|---|---|
| Bit | Reserved | MT | reserved | MS | reserved | PSE | Reserved | CTO | CTON | CSO | CSON |
| Mode | R | RCw | R | RCw | R | RCw | R | RCw | RCw | RCw | RCw |
| Initial Value | 0x00 | 0 | 0x0 | 0 | 0x0 | 0 | 000 | 0 | 0 | 0 | 0 |

Bit 0 CSON: Bit is set when equation 16.10a leads to an overflow
Bit 1 CSO: Bit is set when equation 16.10b leads to an overflow
Bit 2 CTON: Bit is set when equation 16.5a leads to an overflow
Bit 3 CTO: Bit is set when equation 16.5b leads to an overflow
Note: When one of the above bits is set the corresponding register contains the maximum value 0xFFFFFF.
Bit 6:4 Reserved: Read as zero, should be written as zero.
Bit 7 PSE: Prediction space configuration error.
0 = No prediction space error detected
1 = Configured offset value of RAM2 is too small in order to store all TNU + 1 values twice in FULL_SCALE
Bit 8 reserved: Read as zero, should be written as zero.
Bit 9 MS: Missing STATE detected.
0 = No missing STATE detected
1 = At least one missing STATE detected
Bit 10 reserved: Read as zero, should be written as zero.
Bit 11 MT: Missing TRIGGER detected.
0 = No missing TRIGGER detected
1 = At least one missing TRIGGER detected
Bit 17:12 Reserved: Read as zero, should be written as zero.
Bit 18 CAIP2: Calculation of actions 12 to 23 in progress
0 = currently no action calculation, new data requests possible
1 = action calculation in progress, no new data requests possible
Bit 19 CAIP1: Calculation of actions 0 to 11 in progress
0 = currently no action calculation, new data requests possible
1 = action calculation in progress, no new data requests possible
Bit 20 ISN: Bit is set when the number of STATES is different to profile
0 = the number of STATE events between synchronization gaps is plausible or a direction change is detected
1 = after setting LOCK1 in emergency mode or LOCK2 for SMC = RMO = 1 missing or additional STATE signals detected without a following direction change
Bit 21 ITN: Bit is set when the number of TRIGGERS is different to profile
0 = the number of TRIGGER events between synchronization gaps is plausible or a direction change is detected
1 = after setting LOCK1 in emergency mode or LOCK2 for SMC = RMO = 1 missing or additional STATE signals detected without a following direction change
Bit 22 BWD2: Backwards drive of SUB_INC2
0 = forward direction
1 = backward direction
Bit 23 BWD1: Backwards drive of SUB_INC1
Bit 24 Reserved: Read as zero, should be written as zero
Bit 25 LOCK2: DPLL Lock status concerning SUB_INC2
0 = The DPLL is not locked concerning STATE for SMC = 1
1 = The DPLL is locked concerning STATE for SMC = 1
Note: Locking of SUB_INC2 appears
for RMO = SMC = 1: Bit is set, when SYS is set and the number of events between two missing STATES is as expected by the SYN_S values.
Bit 26 SYS: Synchronization condition of STATE fixed.
This bit is set when the CPU writes to the APS_1c3 address pointer.
Bit 27 SYT: Synchronization condition of TRIGGER fixed.
This bit is set when the CPU writes to the APT_2c address pointer.
Bit 28 FSD: First STATE detected.
0 = Still no STATE event was detected after enabling DPLL
1 = At least one STATE event was detected after enabling DPLL
Note: No change of FSD for switching from normal to emergency mode or vice versa.
Bit 29 FTD: First TRIGGER detected.

-continued

| DPLL_STATUS |
|---|
| 0 = No TRIGGER event was detected after enabling DPLL |
| 1 = At least one TRIGGER event was detected after enabling DPLL |
| Note: No change of FTD for switching from normal to emergency mode or vice versa. |
| Bit 30 LOCK1: DPLL Lock status concerning SUB_INC1 |
| 0 = The DPLL is not locked for TRIGGER (while SMC = RMO = 0 or SMC = 1) or for STATE (while SMC = 0 and RMO = 1) |
| 1 = The DPLL is locked for TRIGGER (while SMC = RMO = 0 or SMC = 1) or for STATE (while SMC = 0 and RMO = 1) |
| Note: LOCK1 is set: in normal mode (for RMO = SMC = 0): Bit is set when SYT is set and the number of events between two missing TRIGGERs is as expected by the NT values in the ADT_Ti field. in emergency mode (for RMO = 1 and SMC = 0): Bit is set, when SYS is set and the number of events between two missing STATEs in is as expected by the NS values in the ADT_Si field. for SMC = 1: when SYT is set and SYN_NT = 0 or when SYT is set and the profile stored in the ADT_Ti field matches once Note: LOCK2 is set for SMC = RMO = 1: when SYS is set and SYN_NS = 0 or when SYS is set and the profile stored in the ADS_Ti field matches once |
| Bit 31 ERR: Error during configuration or operation resulting in unexpected values. |
| 0 = No error detected |
| 1 = Error detected, detailed causes are explained below at bit positions 7 down to 0 |

DPLL_ACT_STA (ACTION Status Register with shadow register)

Address Offset: 0x0018 — Initial Value: 0x0000_0000

| | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|
| Bit | Reserved | | | | | | | | ACT_N | | | | | | | | |
| Mode | RPw | | | | | | | | RPw | | | | | | | | |
| Initial Value | 0x00 | | | | | | | | 0x000000 | | | | | | | | |

Initial Value: 0x0000_0000

| | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Bit | ACT_N | | | | | | | | | | | | | | |
| Mode | RPw | | | | | | | | | | | | | | |
| Initial Value | 0x000000 | | | | | | | | | | | | | | |

Bit 23:0 ACT_N(i): New output data values concerning to action i provided

0 = no new output data available after a recent PMT request or actual event value is in the past or invalid 1 = new PMTR data received or calculation is to be precise by taking into account the new speed values Bit 31:24 Reserved: Read as zero, should be written as zero.

Note: ACT_Ni is set (for AENi = 1 and a new valid PMTR), that means when new action data are to be calculated for the correspondent action. After each calculation of the new actions values the ACT_Ni bit updates the corresponding bit in the connected shadow register. The status of the ACT_Ni bits in the shadow register is reflected by the corresponding DPLL output signal ACT_V (valid bit). reset together with the corresponding shadow register bit for AENi = 0; reset without the corresponding shadow register bit when the calculated event is in the past the corresponding shadow register bit is reset, when new PMTR data are written or when the provided action data are read (blocking read) writeable for debugging purposes together with the corresponding shadow register when DEN = 0

DPLL_OSW (Offset and Switch old/new Address Register)

Address Offset: 0x001C — Initial Value: 0x0000_0200

| | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|
| Bit | Reserved | | | | | | | | | | | | | | | | |
| Mode | R | | | | | | | | | | | | | | | | |
| Initial Value | 0x0000 | | | | | | | | | | | | | | | | |

Initial Value: 0x0000_0200

| | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Bit | Reserved | | | | | OSS | | Reserved | | | | | | SWON_T | SWON_S |
| Mode | R | | | | | RPw | | R | | | | | | R | R |

-continued

| DPLL_OSW (Offset and Switch old/new Address Register) | | | | | |
|---|---|---|---|---|---|
| Initial Value | 0x0000 | 10 | 0x00 | 0 | 0 |

Bit 0 SWON_S: Switch bit for LSB address of STATE.

This bit is changed for each write access to TS_S/TS_S_old. Using this unchanged address bit SWON_S for any access to TS_S results always in an access to TS_S_old. For writing to this address the former old (TS_S_old_old) value is overwritten by the new one while the SWON_S bit changes. Thus the former new one is now the old one and the next access is after changing SWON_S directed to this place. Therefore write to TS_S first and after that immediately to FTV_S and PSSM, always before a new TS_S value is to be written.

Note: After writing TS_S, FTV_S and PSSM in this order the address pointer AP with LSB(AP) = SWON_S shows for the corresponding address to TS_S_old, FTV_S and PSSM while LSB(AP)=/SWON_S results in an access to TS_S, FTV_S_old and PSSM_old respectively. The value can be read only.

Bit 1 SWON_T: Switch bit for LSB address of TRIGGER.

This bit is changed for each write access to TS_T/TS_T_old. Using this unchanged address bit SWON_T for any access to TS_T results always in an access to TS_T_old. For writing to this address the former old (TS_T_old_old) value is overwritten by the new one while the SWON_T bit changes. Thus the former new one is now the old one and the next access is after changing SWON_T directed to this place. Therefore write to TS_T first and after that immediately to FTV_T and PSTM, always before a new TS_T value is to be written.

Note: After writing TS_T, FTV_T and PSTM in this order the address pointer AP with LSB(AP) = SWON_T shows for the corresponding address to TS_T_old, FTV_T and PSTM while LSB(AP)=/SWON_T results in an access to TS_T, FTV_T_old and PSTM_old respectively. The value can be read only.

Bit 7:2 Reserved: Read as zero, should be written as zero.

Bit 9:8 OSS: Offset size of RAM region 2

0x0: Offset size 128 of RAM region 2.

0x1: Offset size 256 of RAM region 2.

0x2: Offset size 512of RAM region 2.

0x3: Offset size 1024 of RAM region 2.

Note: At least 128 and at most 1024 values can be stored in each of the RAM 2 regions a to d accordingly. The selection of this offset size must be chosen in correlation to the proper address offset values in the AOSV_2 register. The value can be set only for DEN = 0.

Bit 31:10 Reserved: Read as zero, should be written as zero.

DPLL_AOSV_2 (Address offset Register of RAM 2 regions)

| | Address Offset: 0x0020 | | | | | | | | | | | | | | | | Initial Value: 0x1810_0800 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | AOSV_2d | | | | | | | | AOSV_2c | | | | | | | | AOSV_2b |
| Mode | RPw | | | | | | | | RPw | | | | | | | | RPw |
| Initial Value | 0x18 | | | | | | | | 0x10 | | | | | | | | 0x08 |

| | Initial Value: 0x1810_0800 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | AOSV_2b | | | | | | | AOSV_2a | | | | | | | |
| Mode | RPw | | | | | | | RPw | | | | | | | |
| Initial Value | 0x08 | | | | | | | 0x00 | | | | | | | |

Bit 7:0 AOSV_2a: Address offset value of the RAM 2a region.

The value in this field is to be multiplied by 256 (shift left 8 Bits) and added with the start address of the RAM in order to get the start address of RAM region 2a. When the APT value is added to this start address, the current RAM cell RDT_Tx is addressed.

Bit 15:8 AOSV_2b: Address offset value of the RAM 2b region.

The value in this field is to be multiplied by 256 (shift left 8 Bits) and added with the start address of the RAM in order to get the start address of RAM region 2a. When the APT value is added to this start address, the current RAM cell TSF_Tx is addressed.

Bit 23:16 AOSV_2c: Address offset value of the RAM 2c region.

The value in this field is to be multiplied by 256 (shift left 8 Bits) and added with the start address of the RAM in order to get the start address of RAM region 2a. When the APT value is added to this start address, the current RAM cell ADT_Tx is addressed.

Bit 31:24 AOSV_2d: Address offset value of the RAM 2d region.

The value in this field is to be multiplied by 256 (shift left 8 Bits) and added with the start address of the RAM in order to get the start address of RAM region 2a. When the APT value is added to this start address, the current RAM cell DT_Tx is addressed.

Note: The offset values are needed to support a scalable RAM size of region 2 from 1.5 kBytes to 12 kBytes. The values above must be in correlation with the offset size defined in the OSW register. All offset values can be set only for DEN = 0.

DPLL_APT (Actual RAM Pointer Address for TRIGGER)

| | | | | | | | | | | | | | | | | | | |
|---|---|---|---|---|---|---|---|---|---|---|---|---|---|---|---|---|---|---|
| | Address Offset: 0x0024 | | | | | | | | | | | | | | | | Initial Value: 0x0000_0000 | |
| | 31 | 30 | 29 | 28 | 27 | 26 | 25 | 24 | 23 | 22 | 21 | 20 | 19 | 18 | 17 | 16 | 15 | 14 | 13 |
| Bit | Reserved | | | | | | | | APT-_2b | | | | | | | | | | WAPT_2b |
| Mode | R | | | | | | | | RPw | | | | | | | | | | RAw |
| Initial Value | 0x00 | | | | | | | | 0x000 | | | | | | | | | | 0 |

| | | | | | | | | | | | | |
|---|---|---|---|---|---|---|---|---|---|---|---|---|
| | Initial Value: 0x0000_0000 | | | | | | | | | | | |
| | 12 | 11 | 10 | 9 | 8 | 7 | 6 | 5 | 4 | 3 | 2 | 1 | 0 |
| Bit | Reserved | APT | | | | | | | | | | WAPT | Reserved |
| Mode | R | RPw | | | | | | | | | | RAw | R |
| Initial Value | 0 | 0x000 | | | | | | | | | | 0 | 0 |

Bit 0 Reserved: Read as zero, should be written as zero.

Bit 1 WAPT: Write bit for address pointer APT, read as zero.

Bit 11:2 APT: Actual RAM pointer address value offset for DT_Ti and RDT_Ti in FULL_SCALE for 2*(TNU + 1-SYN_NT) TRIGGER events. this pointer is used for the RAM region 2 subsections 2a and 2d. The pointer APT is incremented for each valid TRIGGER event (simultaneously with APT_2b, APT_2c) for DIR1 = 0. For DIR1 = 1 the APT is decremented.

The APT offset value is added in the above shown bit position with the subsection address offset of the corresponding RAM region Note: The APT pointer value is directed to the RAM position, in which the data values are to be written, which corresponds to the last increment. The APT value is not to be changed, when the direction (shown by DIR1) changes, because it points always to a storage place after the considered increment. Changing of DIR1 takes place always after a valid TRIGGER event and the resulting increment/decrement.

Bit 12 Reserved: Read as zero, should be written as zero.

Bit 13 WAPT_2b: Write bit for address pointer APT_2b, read as zero.

Bit 23:14 APT_2b: Actual RAM pointer address value for TSF_Ti

Actual RAM pointer address offset of TRIGGER events in FULL_SCALE for 2*(TNU + 1) TRIGGER periods; this pointer is used for the RAM region 2b. The RAM pointer is initially set to zero. The pointer APT_2b is incremented by SYN_T for each valid TRIGGER event (simultaneously with APT and APT_2c) for DIR1 = 0 when a valid TRIGGER input appears. For DIR1 = 1 (backwards) the APT is decremented by SYN_T.

Bit 31:24 Reserved: Read as zero, should be written as zero.

DPLL_APS (Actual RAM Pointer Address for STATE)

| | | | | | | | | | | | | | | | | | | |
|---|---|---|---|---|---|---|---|---|---|---|---|---|---|---|---|---|---|---|
| | Address Offset: 0x0028 | | | | | | | | | | | | | | | | Initial Value: 0x0000_0000 | |
| | 31 | 30 | 29 | 28 | 27 | 26 | 25 | 24 | 23 | 22 | 21 | 20 | 19 | 18 | 17 | 16 | 15 | 14 |
| Bit | Reserved | | | | | | | | | | | | APS_1c2 | | | | | |
| Mode | R | | | | | | | | | | | | RPw | | | | | |
| Initial Value | | | | | | | | | | | | | 0x00 | | | | | |

| | | | | | | | | | | | | | |
|---|---|---|---|---|---|---|---|---|---|---|---|---|---|
| | Initial Value: 0x0000_0000 | | | | | | | | | | | | |
| | 13 | 12 | 11 | 10 | 9 | 8 | 7 | 6 | 5 | 4 | 3 | 2 | 1 | 0 |
| Bit | WAPS_1c2 | Reserved | | | | | APS | | | | | | WAPS | Reserved |
| Mode | RAw | R | | | | | RPw | | | | | | RAw | R |
| Initial Value | 0 | 0 | | | | | 0x00 | | | | | | 0 | 0 |

Bit 0 Reserved: Read as zero, should be written as zero.

Bit 1 WAPS: Write bit for address pointer APS, read as zero.

Bit 7:2 APS: Actual RAM pointer address value for DT_Si and RDT_Si

Actual RAM pointer and synchronization position/value of STATE events in FULL_SCALE for up to 64 STATE events but limited to 2*(SNU + 1-SYN_NS) in normal and emergency mode; this pointer is used for the RAM region 1c1 and 1c4. APS is incremented (decremented) by one for each valid STATE event and DIR2 = 0 DIR2 = 1). The APS offset value is added in the above shown bit position with the subsection offset of the RAM region.

Note: The APS pointer value is directed to the RAM position, in which the data values are to be written, which correspond to the last increment. The APS value is not to be changed, when the direction (shown by DIR2) changes, because it points always to a storage place after the considered increment. Changing of DIR2 takes place always after a valid STATE event and the resulting increment/decrement.

Bit 12:8 Reserved: Read as zero, should be written as zero.

Bit 13 WAPS_1c2: Write bit for address pointer APS_1c2, read as zero.

Bit 19:14 APS_1c2: Actual RAM pointer address value for TSF_Si.

Initial value: zero (0x00). Actual RAM pointer and synchronization position/value of STATE events in FULL_SCALE for up to 64 STATE events but limited to 2*(SNU + 1) in normal and emergency mode; this pointer is used for the RAM region 1c2. APS is incremented (decremented) by SYN_S for each valid STATE event and DIR2 = 0 (DIR2 = 1). The APS_1c2 offset value is added in the above shown bit position with the subsection offset of the RAM region.

Bit 31:20 Reserved: Read as zero, should be written as zero.

| DPLL_APT_2c (Actual RAM Pointer Address for region 2c) | | | | | | | | | | | | | | | | |
|---|---|---|---|---|---|---|---|---|---|---|---|---|---|---|---|---|
| | Address Offset: 0x002C | | | | | | | | | | | | | | | Initial Value: 0x0000_0000 |
| | 31 | 30 | 29 | 28 | 27 | 26 | 25 | 24 | 23 | 22 | 21 | 20 | 19 | 18 | 17 | 16 | 15 |
| Bit | Reserved | | | | | | | | | | | | | | | | |
| Mode | R | | | | | | | | | | | | | | | | |
| Initial Value | 0x00000 | | | | | | | | | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | Reserved | | | APT_2c | | | | | | | | | | Reserved | |
| Mode | R | | | RW | | | | | | | | | | R | |
| Initial Value | 0x00000 | | | 0x000 | | | | | | | | | | 00 | |

Bit 1:0 Reserved: Read as zero, should be written as zero.

Bit 11:2 APT_2c: Actual RAM pointer of region 2c for forward direction

Actual RAM pointer address value of TRIGGER adapt events in FULL_SCALE for 2*(TNU + 1-SYN_NT) TRIGGER periods depending on the size of the used RAM 2; this pointer is used for the RAM region 2 for the subsection 2c only. The RAM pointer is initially set to zero. The APT_2c value is set by the CPU when the synchronization condition was detected. Within the RAM region 2c initially the conditions for synchronization gaps and adapt values are stored by the CPU.

Bit 31:12 Reserved: Read as zero, should be written as zero.

Note: The APT_2c pointer values are directed to the RAM position of the profile element in RAM region 2c, which correspond to the current increment. For DIR1 = 0 (DIR1 = 1) the pointers APT_2c_x are incremented (decremented) by one simultaneously with APT. Changing of DIR1 takes place always after a valid TRIGGER event and the resulting increment/decrement. The APT_2c_x offset value is added in the above shown bit position with the subsection address offset of the corresponding RAM region.

| DPLL_APS_1c3 (Actual RAM Pointer Address for RAM region 1c3) | | | | | | | | | | | | | | | | |
|---|---|---|---|---|---|---|---|---|---|---|---|---|---|---|---|---|
| | Address Offset: 0x0030 | | | | | | | | | | | | | | | Initial Value: 0x0000_0000 |
| | 31 | 30 | 29 | 28 | 27 | 26 | 25 | 24 | 23 | 22 | 21 | 20 | 19 | 18 | 17 | 16 | 15 |
| Bit | Reserved | | | | | | | | | | | | | | | | |
| Mode | R | | | | | | | | | | | | | | | | |
| Initial Value | 0x000000 | | | | | | | | | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | Reserved | | | | | | | APS_1c3 | | | | | | Reserved | |
| Mode | R | | | | | | | RW | | | | | | R | |
| Initial Value | 0x000000 | | | | | | | 0x00 | | | | | | 00 | |

Bit 1:0 Reserved: Read as zero, should be written as zero.

Bit 7:2 APS_1c3: Actual RAM pointer address value of adapt values of STATE for forward direction.

Initial value: zero (0x00). Actual RAM pointer and synchronization position/value of STATE events in FULL_SCALE for up to 64 STATE events but limited to 2*(SNU + 1-SYN_NS) in normal and emergency mode; this pointer is used for the RAM region 1c3. The RAM pointer is set by the CPU accordingly, when the synchronization condition was detected.

Bit 31:8 Reserved: Read as zero, should be written as zero.

Note: The APS_1c3 pointer value is directed to the RAM position of the profile element in RAM region 2c, which corresponds to the current increment. Changing of DIR2 takes place always after a valid STATE event and the resulting increment/decrement. The APS_1c3_x offset value is added in the above shown bit position with the subsection address offset of the corresponding RAM region.

| DPLL_NUTC (Number of recent TRIGGER events used for calculations) | | | | | | | | | | | | | | | | |
|---|---|---|---|---|---|---|---|---|---|---|---|---|---|---|---|---|
| | Address Offset: 0x0034 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | WSYN | WNUT | Reserved | SYN_T_old | | |
| Mode | R | | | | | | | | | | RAw | RAw | R | RPw | | |

-continued

| DPLL_NUTC (Number of recent TRIGGER events used for calculations) | | | | | |
|---|---|---|---|---|---|
| Initial Value | 0x000 | 0 | 0 | 0 | 001 |

| Initial Value: 0x0001_2001 | | | |
|---|---|---|---|
| | 15 14 13 | 12 | 11 10 9 8 7 6 5 4 3 2 1 0 |
| Bit | SYN_T | FS | NUTE |
| Mode | RPw | RPw | RPw |
| Initial Value | 001 | 0 | 0x001 |

Bit 11:0 NUTE: Number of recent TRIGGER events used for SUB_INC1 calculations modulo 2*($TNU_{max}$ + 1). No gap is considered in that case.
This register is set by the CPU, but reset automatically to "1" by a change of direction or lost of LOCK. Each other value can be set by the CPU, maybe Full_SCALE, HALF_SCALE or parts of them. The relation values QDT_Tx are calculated using NUTE values in the past with its maximum value of 2*(TNU) + 1.
Bit 12 FS: The increment values of last FULL_SCALE are used for prediction. This bit is set by the CPU simultaneously with NUTE = 2*(TNU + 1), (NUTE is zero for TNU = $TNU_{max}$, because of calculation mod 2*($TNU_{max}$ + 1))
Bit 15:13 SYN_T: number of events to be considered for the current increment. This value reflects the NT value of the last valid increment, stored in ADT_Ti; to be updated after all calculations in step 17 of Table 0.
Bit 18:16 SYN_T_old: number of events to be considered for the last increment. This value reflects the NT value of the last but one valid increment, stored in ADT_Ti; is updated automatically when writing SYN_T
Bit 19 Reserved: Read as zero, should be written as zero.
Bit 20 WNUT: write control bit for FS and NUTE; read as zero.
Bit 21 WSYN: write control bit for SYN_T; read as zero.
Bit 31:22 Reserved: Read as zero, should be written as zero.

| DPLL_NUSC (Number of recent STATE events used for calculations) | | | | | |
|---|---|---|---|---|---|
| Address Offset: 0x0038 | | | | | |
| | 31 30 29 28 27 26 25 24 23 22 | 21 | 20 | 19 | 18 17 16 |
| Bit | Reserved | WSYN | WNUS | Reserved | SYN_S_old |
| Mode | R | RAw | RAw | R | RPw |
| Initial Value | 0x000 | 0 | 0 | 0 | 001 |

| Initial Value: 0x0001_2001 | | | |
|---|---|---|---|
| | 15 14 13 | 12 | 11 10 9 8 7 6 5 4 3 2 1 0 |
| Bit | SYN_S | FS | NUSE |
| Mode | RPw | RPw | RPw |
| Initial Value | 001 | 0 | 0x001 |

Bit 11:0 NUSE: Number of recent STATE events used for SUB_INCx calculations modulo 2*($SNU_{max}$ + 1). No gap is considered in that case. This register is set by the CPU but reset automatically to "1" by a change of direction or lost of LOCK. Each other value can be set by the CPU, maybe Full_SCALE, HALF_SCALE or parts of them. The relation values QDT_Sx are calculated using NUSE values in the past with its maximum value of 2*SNU + 1.
Bit 12 FS: The increment values of last FULL_SCALE are used for prediction. This bit is set by the CPU simultaneously with NUSE = 2*(SNU + 1), (NUSE is zero for SNU = $SNU_{max}$, because of calculation mod 2*($SNU_{max}$ + 1))
Bit 15:13 SYN_S: number of events to be considered for the current increment. This value reflects the NS value of the last valid increment, stored in ADT_Si; to be updated after all calculations in step 37 of Table 0.
Bit 18:16 SYN_S_old: number of events to be considered for the last increment.This value reflects the NS value of the last but one valid increment, stored in ADT_Si; is updated automatically when writing SYN_S while WSYNU = 1 and WSYNO = 0
Bit 19 Reserved: Read as zero, should be written as zero.
Bit 20 WNUS: write control bit for FS and NUSE; read as zero.
Bit 21 WSYN: write control bit for SYN_S; read as zero.
Bit 31:22 Reserved: Read as zero, should be written as zero.

| DPLL_NTI_CNT (Number of active TRIGGER events to interrupt) | | |
|---|---|---|
| | Address Offset: 0x003C | Initial Value: 0x0000_0000 |
| | 31 30 29 28 27 26 25 24 23 22 21 20 19 18 17 16 | 15 |
| Bit | Reserved | |
| Mode | R | |

-continued

| DPLL_NTI_CNT (Number of active TRIGGER events to interrupt) | | | | | | | | | | | | | | | |
|---|---|---|---|---|---|---|---|---|---|---|---|---|---|---|---|
| Initial Value | 0x000000 | | | | | | | | | | | | | | |
| | Initial Value: 0x0000_0000 | | | | | | | | | | | | | | |
| | 14 | 13 | 12 | 11 | 10 | 9 | 8 | 7 | 6 | 5 | 4 | 3 | 2 | 1 | 0 |
| Bit | Reserved | | | | | NTI_CNT | | | | | | | | | |
| Mode | R | | | | | RW | | | | | | | | | |
| Initial Value | 0x000000 | | | | | 0x000 | | | | | | | | | |

Bit 9:0 NTI_CNT: Number of active TRIGGER events to the next TRIGGER interrupt; the value is to be count down for each valid TRIGGER event.
Bit 31:10 Reserved: Read as zero, should be written as zero.

| DPLL_IRQ_NOTIFY (Interrupt Register DPLL_IRQ_NOTIFY) | | | | | | | | | | |
|---|---|---|---|---|---|---|---|---|---|---|
| | Address Offset: 0x0040 | | | | | | | | | Initial Value: 0x0000_0000 |
| | 31 30 29 28 27 26 25 | 24 | 23 | 22 | 21 | 20 | 19 | 18 | 17 | 16 | 15 |
| Bit | Reserved | CDIS | CDIT | TE4I | TE3I | TE2I | TE1I | TE0I | LL2I | GL2I | EI |
| Mode | R | RW | RW | RW | RW | RW | RW | RW | RW | RW | RW |
| Initial Value | 0 | 0 | 0 | 0 | 0 | 0 | 0 | 0 | 0 | 0 | 0 |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | LL1I | GL1I | W1I | W2I | PWI | TASI | SASI | MTI | MSI | TISI | SISI | TAXI | TINI | PEI | PDI |
| Mode | RW | RW | RW | RW | RW | RW | RW | RW | RW | RW | RW | RW | RW | RW | RW |
| Initial Value | 0 | 0 | 0 | 0 | 0 | 0 | 0 | 0 | 0 | 0 | 0 | 0 | 0 | 0 | 0 |

Bit 0 PDI: DPLL disable interrupt; announces the switch off of the DEN bit.
0 = The DPLL disable interrupt is not requested
1 = The DPLL disable interrupt is requested
Bit 1 PEI: DPLL enable interrupt; announces the switch on of the DEN bit.
0 = The DPLL enable interrupt is not requested
1 = The DPLL enable interrupt is requested
Bit 2 TINI: TRIGGER minimum hold time (ΔT =
0 = No violation of minimum hold time of TRIGGER is detected
1 = A violation of minimum hold time of TRIGGER is detected
Bit 3 TAXI: TRIGGER maximum hold time (ΔT > THMA > 0) violation interrupt.
0 = No violation of maximum hold time of TRIGGER is detected
1 = A violation of maximum hold time of TRIGGER is detected
Bit 4 SISI: STATE inactive slope interrupt.
0 = No inactive slope of STATE is detected
1 = An inactive slope of STATE is detected
Bit 5 TISI: TRIGGER inactive slope interrupt.
0 = No inactive slope of TRIGGER is detected
1 = An inactive slope of TRIGGER is detected
Bit 6 MSI: Missing STATE interrupt.
0 = The missing STATE interrupt is not requested
1 = The missing STATE interrupt is requested
Bit 7 MTI: Missing TRIGGER interrupt.
0 = The missing TRIGGER interrupt is not requested
1 = The missing TRIGGER interrupt is requested
Bit 8 SASI: STATE active slope interrupt.
0 = No active slope of STATE is detected
1 = An active slope of STATE is detected
Bit 9 TASI: TRIGGER active slope interrupt while NTI_CNT is zero.
0 = No active slope of TRIGGER is detected or NTI_CNT is not zero
1 = An active slope of TRIGGER is detected while NTI_CNT is zero
Bit 10 PWI: Plausibility window (PVT) violation interrupt of TRIGGER.
0 = The plausibility window is not violated
1 = The plausibility window is violated
Bit 11 W2I: RAM write access to RAM region 2 interrupt.
0 = The RAM write access interrupt is not requested
1 = The RAM write access interrupt is requested
Bit 12 W1I: Write access to RAM region 1b or 1c interrupt.

-continued

| DPLL_IRQ_NOTIFY (Interrupt Register DPLL_IRQ_NOTIFY) |
|---|
| 0 = The RAM write access interrupt is not requested<br>1 = The RAM write access interrupt is requested<br>Bit 13 GL1I: Get of lock interrupt, for SUB_INC1.<br>0 = The lock getting interrupt is not requested<br>1 = The lock getting interrupt is requested<br>Bit 14 LL1I: Lost of lock interrupt for SUB_INC1.<br>0 = The lock lose interrupt is not requested<br>1 = The lock lose interrupt is requested<br>Bit 15 EI: Error interrupt (see status register bits 10 down to 0).<br>0 = The error interrupt is not requested<br>1 = The error interrupt is requested<br>Bit 16 GL2I: Get of lock interrupt, for SUB_INC2.<br>0 = The lock getting interrupt is not requested<br>1 = The lock getting interrupt is requested<br>Bit 17 LL2I: Lost of lock interrupt for SUB_INC2.<br>0 = The lock lose interrupt is not requested<br>1 = The lock lose interrupt is requested<br>Bit 18 TE0I: TRIGGER event interrupt 0.<br>0 = no Interrupt on TRIGGER event 0 requested<br>1 = Interrupt on TRIGGER event 0 requested<br>Bit 19 TE1I: TRIGGER event interrupt 1.<br>0 = no Interrupt on TRIGGER event 1 requested<br>1 = Interrupt on TRIGGER event 1 requested<br>Bit 20 TE2I: TRIGGER event interrupt 2.<br>0 = no Interrupt on TRIGGER event 2 requested<br>1 = Interrupt on TRIGGER event 2 requested<br>Bit 21 TE3I: TRIGGER event interrupt 3.<br>0 = no Interrupt on TRIGGER event 3 requested<br>1 = Interrupt on TRIGGER event 3 requested<br>Bit 22 TE4I: TRIGGER event interrupt 4.<br>0 = no Interrupt on TRIGGER event 4 requested<br>1 = Interrupt on TRIGGER event 4 requested<br>Bit 23 CDIT: Calculation of TRIGGER duration done<br>0 = no Interrupt on calculated TRIGGER duration requested<br>1 = Interrupt on calculated TRIGGER duration requested<br>Bit 24 CDIS: Calculation of STATE duration done<br>0 = no Interrupt on calculated STATE duration requested<br>1 = Interrupt on calculated STATE duration requested<br>Bit 31:25 Reserved: Read as zero, should be written as zero.<br>Note: All bits in the DPLL_INT register are set permanently until writing a one bit value is performed to the corresponding bit. |

DPLL_IRQ_EN (DPLL Interrupt enable register DPLL_IRQ_EN)

Address Offset: 0x0044

| | 31 30 29 28 27 26 25 | 24 | 23 | 22 | 21 | 20 |
|---|---|---|---|---|---|---|
| Bit | Reserved | CDIS_IRQ_EN | CDIT_IRQ_EN | TE4I_IRQ_EN | TE3I_IRQ_EN | TE2I_IRQ_EN |
| Mode | R | RW | RW | RW | RW | RW |
| Initial Value | 0 | 0 | 0 | 0 | 0 | 0 |

Address Offset: 0x0044

| | 19 | 18 | 17 | 16 |
|---|---|---|---|---|
| Bit | TE1I_IRQ_EN | TE0I_IRQ_EN | LL2I_IRQ_EN | GL2I_IRQ_EN |
| Mode | RW | RW | RW | RW |
| Initial Value | 0 | 0 | 0 | 0 |

Initial Value: 0x0000_0000

| | 15 | 14 | 13 | 12 | 11 |
|---|---|---|---|---|---|
| Bit | EI_IRQ_EN | LL1I_IRQ_EN | GL1I_IRQ_EN | W1I_IRQ_EN | W2I_IRQ_EN |
| Mode | RW | RW | RW | RW | RW |
| Initial Value | 0 | 0 | 0 | 0 | 0 |

-continued

| DPLL_IRQ_EN (DPLL Interrupt enable register DPLL_IRQ_EN) | | | | | |
|---|---|---|---|---|---|
| | Initial Value: 0x0000_0000 | | | | |
| | 10 | 9 | 8 | 7 | 6 |
| Bit | PWI_IRQ_EN | TASI_IRQ_EN | SASI_IRQ_EN | MTI_IRQ_EN | MSI_IRQ_EN |
| Mode | RW | RW | RW | RW | RW |
| Initial Value | 0 | 0 | 0 | 0 | 0 |

| | Initial Value: 0x0000_0000 | | | | | |
|---|---|---|---|---|---|---|
| | 5 | 4 | 3 | 2 | 1 | 0 |
| Bit | TISI_IRQ_EN | SISI_IRQ_EN | TAXI_IRQ_EN | TINI_IRQ_EN | PEI_IRQ_EN | PDI_IRQ_EN |
| Mode | RW | RW | RW | RW | RW | RW |
| Initial Value | 0 | 0 | 0 | 0 | 0 | 0 |

Bit 0 PDI_IRQ_EN: DPLL disable interrupt enable, when switch off of the DEN bit.
0 = The DPLL disable interrupt is not enabled
1 = The DPLL disable interrupt is enabled
Bit 1 PEI_IRQ_EN: DPLL enable interrupt enable, when switch on of the DEN bit.
0 = The DPLL enable interrupt is not enabled
1 = The DPLL enable interrupt is enabled
Bit 2 TINI_IRQ_EN: TRIGGER minimum hold time violation interrupt enable bit.
0 = minimum hold time violation of TRIGGER interrupt is not enabled
1 = The minimum hold time violation of TRIGGER interrupt is enabled
Bit 3 TAXI_IRQ_EN: TRIGGER maximum hold time violation interrupt enable bit.
0 = maximum hold time violation of TRIGGER interrupt is not enabled
1 = The maximum hold time violation of TRIGGER interrupt is enabled
Bit 4 SISI_IRQ_EN: STATE inactive slope interrupt enable bit.
0 = The interrupt at the inactive slope of STATE is not enabled
1 = The interrupt at the inactive slope of STATE is enabled
Bit 5 TISI_IRQ_EN: TRIGGER inactive slope interrupt enable bit.
0 = The interrupt at the inactive slope of TRIGGER is not enabled
1 = The interrupt at the inactive slope of TRIGGER is enabled
Bit 6 MSI_IRQ_EN: Missing STATE interrupt enable.
0 = The missing STATE interrupt is not enabled
1 = The missing STATE interrupt is enabled
Bit 7 MTI_IRQ_EN: Missing TRIGGER interrupt enable.
0 = The missing TRIGGER interrupt is not enabled
1 = The missing TRIGGER interrupt is enabled
Bit 8 SASI_IRQ_EN: STATE active slope interrupt enable.
0 = The active slope STATE interrupt is not enabled.
1 = The active slope STATE interrupt is enabled
Bit 9 TASI_IRQ_EN: TRIGGER active slope interrupt enable.
0 = The active slope TRIGGER interrupt is not enabled
1 = The active slope TRIGGER interrupt is enabled
Bit 10 PWI_IRQ_EN: Plausibility window (PVT) violation interrupt of TRIGGER enable.
0 = The plausibility violation interrupt is not enabled
1 = The plausibility violation interrupt is enabled
Bit 11 W2I_IRQ_EN: RAM write access to RAM region 2 interrupt enable.
0 = The RAM write access interrupt is not enabled
1 = The RAM write access interrupt is enabled
Bit 12 W1I_IRQ_EN: Write access to RAM region 1b or 1c interrupt.
0 = The RAM write access interrupt is not enabled
1 = The RAM write access interrupt is enabled.
Bit 13 GL1I_IRQ_EN: Get of lock interrupt enable, when lock arises.
0 = The lock getting interrupt is not enabled
1 = The lock getting interrupt is enabled
Bit 14 LL1I_IRQ_EN: Lost of lock interrupt enable.
0 = The lock lose interrupt is not enabled
1 = The lock lose interrupt is enabled
Bit 15 EI_IRQ_EN: Error interrupt enable (see status register).
0 = The error interrupt is not enabled
1 = The error interrupt is enabled
Bit 16 GL2I_IRQ_EN: Get of lock interrupt enable for SUB_INC2.
0 = The lock getting interrupt is not requested
1 = The lock getting interrupt is requested
Bit 17 LL2I_IRQ_EN: Lost of lock interrupt enable for SUB_INC2.
0 = The lock lose interrupt is not requested
1 = The lock lose interrupt is requested
Bit 18 TE0I_IRQ_EN: TRIGGER event interrupt 0 enable.
0 = no Interrupt on TRIGGER event 0 enabled
1 = Interrupt on TRIGGER event 0 enabled
Bit 19 TE1I_IRQ_EN: TRIGGER event interrupt 1 enable.
0 = no Interrupt on TRIGGER event 1 enabled -continued

| DPLL_IRQ_EN (DPLL Interrupt enable register DPLL_IRQ_EN) |
|---|
| 1 = Interrupt on TRIGGER event 1 enabled<br>Bit 20 TE2I_IRQ_EN: TRIGGER event interrupt 2 enable.<br>0 = no Interrupt on TRIGGER event 2 enabled<br>1 = Interrupt on TRIGGER event 2 enabled<br>Bit 21 TE3I_IRQ_EN: TRIGGER event interrupt 3 enable.<br>0 = no Interrupt on TRIGGER event 3 enabled<br>1 = Interrupt on TRIGGER event 3 enabled<br>Bit 22 TE4I_IRQ_EN: TRIGGER event interrupt 4 enable.<br>0 = no Interrupt on TRIGGER event 4 enabled<br>1 = Interrupt on TRIGGER event 4 enabled<br>Bit 23 CDIT_IRQ_EN: Enable interrupt when calculation of TRIGGER duration done<br>0 = no Interrupt on calculated TRIGGER duration enabled<br>1 = Interrupt on calculated TRIGGER duration enabled<br>Bit 24 CDIS_IRQ_EN: Enable interrupt when calculation of TRIGGER duration done<br>0 = no Interrupt on calculated STATE duration enabled<br>1 = Interrupt on calculated STATE duration enabled<br>Bit 31:25 Reserved: Read as zero, should be written as zero. |

DPLL_IRQ_FORCINT (Force Interrupt register)

Address Offset: 0x0048

| | 31 | 30 | 29 | 28 | 27 | 26 | 25 | 24 | 23 | 22 | 21 | 20 | 19 | 18 |
|---|---|---|---|---|---|---|---|---|---|---|---|---|---|---|
| Bit | | | | Reserved | | | | TRG_CDIS | TRG_CDIT | TRG_TE4I | TRG_TE3I | TRG_TE2I | TRG_TE1I | TRG_TE0I |
| Mode | | | | R | | | | RAw | RAw | RAw | RAw | RAw | RAw | RAw |
| Initial Value | | | | 0x00 | | | | 0 | 0 | 0 | 0 | 0 | 0 | 0 |

Initial Value: 0x0000_0000

| | 17 | 16 | 15 | 14 | 13 | 12 | 11 | 10 | 9 |
|---|---|---|---|---|---|---|---|---|---|
| Bit | TRG_LL2I | TRG_GL2I | TRG_EI | TRG_LL1I | TRG_GL1I | TRG_W1I | TRG_W2I | TRG_PWI | TRG_TASI |
| Mode | RAw | RAw | RAw | RAw | RAw | RAw | RAw | RAw | RAw |
| Initial Value | 0 | 0 | 0 | 0 | 0 | 0 | 0 | 0 | 0 |

Initial Value: 0x0000_0000

| | 8 | 7 | 6 | 5 | 4 | 3 | 2 | 1 | 0 |
|---|---|---|---|---|---|---|---|---|---|
| Bit | TRG_SASI | TRG_MTI | TRG_MSI | TRG_TISI | TRG_SISI | TRG_TAXI | TRG_TINI | TRG_PEI | TRG_PDI |
| Mode | RAw | RAw | RAw | RAw | RAw | RAw | RAw | RAw | RAw |
| Initial Value | 0 | 0 | 0 | 0 | 0 | 0 | 0 | 0 | 0 |

Bit 0 TRG_PDI: Force Interrupt PDI
Bit 1 TRG_PEI: Force Interrupt PEI
Bit 2 TRG_TINI: Force Interrupt TINI
Bit 3 TRG_TAXI: Force Interrupt TAXI
Bit 4 TRG_SISI: Force Interrupt SISI
Bit 5 TRG_TISI: Force Interrupt TISI
Bit 6 TRG_MSI: Force Interrupt MSI
Bit 7 TRG_MTI: Force Interrupt MTI
Bit 8 TRG_SASI: Force Interrupt SASI
Bit 9 TRG_TASI: Force Interrupt TASI
Bit 10 TRG_PWI: Force Interrupt PWI
Bit 11 TRG_W2I: Force Interrupt W2IF
Bit 12 TRG_W1I: Force Interrupt W1I
Bit 13 TRG_GL1I: Force Interrupt GL1I
Bit 14 TRG_LL1I: Force Interrupt LL1I
Bit 15 TRG_EI: Force Interrupt EI
Bit 16 TRG_GL2I: Force Interrupt GL2I
Bit 17 TRG_LL2I: Force Interrupt LL2I
Bit 18 TRG_TE0I: Force Interrupt TE0I
Bit 19 TRG_TE1I: Force Interrupt TE1I
Bit 20 TRG_TE2I: Force Interrupt TE2I
Bit 21 TRG_TE3I: Force Interrupt TE3I -continued

| DPLL_IRQ_FORCINT (Force Interrupt register) |
|---|
| Bit 22 TRG_TE4I: Force Interrupt TE4I<br>Bit 23 TRG_CDIT: Force Interrupt CDIT<br>Bit 24 TRG_CDIS: Force Interrupt CDIS TRG_xxI: Force Interrupt xx; read always as zero<br>0 = the corresponding interrupt xx is not to be forced<br>1 = the corresponding interrupt xx is to be forced for one clock<br>Bit 31:25 Reserved: Read as zero, should be written as zero. |

DPLL_IRQ_MODE

| | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|
| | Address Offset: 0x004C | | | | | | | | | | | | | | | | Initial Value: 0x0000_0000 |
| Bit | Reserved | | | | | | | | | | | | | | | | |
| Mode | R | | | | | | | | | | | | | | | | |
| Initial Value | 0x00000000 | | | | | | | | | | | | | | | | |

| | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | Initial Value: 0x0000_0000 | | | | | | | | | | | | | | |
| Bit | Reserved | | | | | | | | | | | | | IRQ_MODE | |
| Mode | R | | | | | | | | | | | | | RW | |
| Initial Value | 0x00000000 | | | | | | | | | | | | | 00 | |

Bit 1:0 IRQ_MODE: IRQ mode selection
00 = Level mode
01 = Pulse mode
10 = Pulse-Notify mode
11 = Single-Pulse mode
Note: The interrupt modes are described in section 0.
Bit 31:2 Reserved
Note: Read as zero, should be written as zero DPLL_ID_PMTR_x (ID information for input signal PMTR_x (x = 0 . . . 23))

| | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|
| | Address Offset: 0x0050 . . . 0x00AC | | | | | | | | | | | | | | | | Initial Value: 0x0000_01FE |
| Bit | Reserved | | | | | | | | | | | | | | | | |
| Mode | R | | | | | | | | | | | | | | | | |
| Initial Value | | | | | | | | | | | | | | | | | |

| | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | Initial Value: 0x0000_01FE | | | | | | | | | | | | | | |
| Bit | Reserved | | | | | | ID_PMTR_x | | | | | | | | |
| Mode | R | | | | | | RW | | | | | | | | |
| Initial Value | | | | | | | 0x01FE | | | | | | | | |

Bit 8:0 ID_PMTR_x: ID information to the input signal PMTR_x from the ARU.
Bit 31:9 Reserved: Read as zero, should be written as zero.
Note: The DPLL_ID_PMTR_x is in the current version not to be changed when the DPLL is enabled.

INC_CNT1 (Counter value of sent SUB_INC1 pulses)

Address Offset: 0x00B0 — Initial Value: 0x0000_0000

| | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|
| Bit | Reserved | | | | | | | | INC_CNT1 | | | | | | | | |
| Mode | R | | | | | | | | RPw | | | | | | | | |
| Initial Value | 0x00 | | | | | | | | 0x000000 | | | | | | | | |

Initial Value: 0x0000_0000

| | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Bit | INC_CNT1 | | | | | | | | | | | | | | |
| Mode | RPw | | | | | | | | | | | | | | |
| Initial Value | 0x000000 | | | | | | | | | | | | | | |

Bit 23:0 INC_CNT1: Actual number of pulses to be still sent out at the current increment until the next valid input signal in automatic end mode; automatic addition of the number of demanded pulses MLT/MLS1 when getting a valid TRIGGER/STATE input in normal or emergency mode respectively; writeable only for test purposes when DEN = 0
Bit 31:24 Reserved: Read as zero, should be written as zero.

INC_CNT2 (INC_CNT2 (for SMC = 1 and RMO = 1))

Address Offset: 0x00B4 — Initial Value: 0x0000_0000

| | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|
| Bit | Reserved | | | | | | | | INC_CNT2 | | | | | | | | |
| Mode | R | | | | | | | | RPw | | | | | | | | |
| Initial Value | 0x00 | | | | | | | | 0x000000 | | | | | | | | |

Initial Value: 0x0000_0000

| | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Bit | INC_CNT2 | | | | | | | | | | | | | | |
| Mode | RPw | | | | | | | | | | | | | | |
| Initial Value | 0x000000 | | | | | | | | | | | | | | |

Bit 23:0 INC_CNT2: Actual number of pulses to be still sent out at the current increment until the next valid input signal in automatic end mode; automatic addition of the number of demanded pulses MLT/MLS1 when getting a valid TRIGGER/STATE input in normal or emergency mode respectively; writeable only for test purposes when DEN = 0
Bit 31:24 Reserved: Read as zero, should be written as zero.

DPLL_TSAi (Calculated relative time to ACTION_i

Address Offset: 0x0100 . . . 0x015C — Initial Value: 0x0000_0000

| | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|
| Bit | Reserved | | | | | | | | TSAx | | | | | | | | |
| Mode | R | | | | | | | | RPw | | | | | | | | |
| Initial Value | 0x00 | | | | | | | | 0x000000 | | | | | | | | |

Initial Value: 0x0000_0000

| | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Bit | TSAx | | | | | | | | | | | | | | |
| Mode | RPw | | | | | | | | | | | | | | |

-continued

| DPLL_TSAi (Calculated relative time to ACTION_i | |
|---|---|
| Initial Value | 0x000000 |

Bit 23:0 TSAi calculated time stamp for ACTION_i.
Bit 31:24 Reserved: Read as zero, should be written as zero.
Note: writeable only for test purposes when DEN = 0

DPLL_PSACi (Calculated position value for ACTION_i)

| | Address Offset: 0x0160 . . . 0x01BC | | Initial Value: 0x0000_0000 |
|---|---|---|---|
| | 31 30 29 28 27 26 25 24 | 23 22 21 20 19 18 17 16 | 15 |
| Bit | Reserved | PSACi | |
| Mode | R | RPw | |
| Initial Value | 0x00 | 0x000000 | |

| | Initial Value: 0x0000_0000 |
|---|---|
| | 14 13 12 11 10 9 8 7 6 5 4 3 2 1 0 |
| Bit | PSACi |
| Mode | RPw |
| Initial Value | 0x000000 |

Bit 23:0 PSACi: Calculated position value for the start of ACTION_i in normal or emergency mode according to equations 16.17 or 16.20 respectively.
Bit 31:24 Reserved: Read as zero, should be written as zero.
Note: writeable only for test purposes when DEN = 0

DPLL_ACB_i (Control Bits for 24 ACTIONs, i: 0 . . . 5)

| | Address Offset: 0x01C0 . . . 0x01D4 | | | | Initial Value: 0x0000_0000 |
|---|---|---|---|---|---|
| | 31 30 29 | 28 27 26 25 24 | 23 22 21 | 20 19 18 17 16 | 15 |
| Bit | Reserved | ACBi_3 | Reserved | ACBi_2 | Reserved |
| Mode | R | RPw | R | RPw | R |
| Initial Value | 0x00 | 00000 | 0 | 00000 | 0 |

| | Initial Value: 0x0000_0000 | | | |
|---|---|---|---|---|
| | 14 13 | 12 11 10 9 8 | 7 6 5 | 4 3 2 1 0 |
| Bit | Reserved | ACBi_1 | Reserved | ACBi_0 |
| Mode | R | RPw | R | RPw |
| Initial Value | 0 | 00000 | 0 | 00000 |

Bit 4:0 ACBi_0: Action Control Bits of ACTION_i, reflects ACT_D(52:48), i = 4*j
Bit 7:5 Reserved: Read as zero, should be written as zero.
Bit 12:8 ACBi--_1: Action Control Bits of ACTION_i + 1, reflects ACT_D(52:48)
Bit 15:13 Reserved: Read as zero, should be written as zero.
Bit 20:16 ACBi_2: Action Control Bits of ACTION_i + 2, reflects ACT_D(52:48)
Bit 23:21 Reserved: Read as zero, should be written as zero.
Bit 28:24 ACBi_3: Action Control Bits of ACTION_i + 3, reflects ACT_D(52:48)
Bit 31:29 Reserved: Read as zero, should be written as zero.
Note: all bits are only writeable for test purposes when DEN = 0

DPLL RAM Region is Value Description

Action_x Position Action Request (PSA) (Position information of a desired action)

| | Address Offset: 0x0200 . . . 0x025C | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | PSA | | | | | | | | |
| Mode | R | | | | | | | | RW | | | | | | | | |
| Initial Value | 0x00 | | | | | | | | 0x000000 | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | PSA | | | | | | | | | | | | | | |
| Mode | RW | | | | | | | | | | | | | | |
| Initial Value | 0x000000 | | | | | | | | | | | | | | |

Bit 23:0 PSA Position information of a desired action (x = 0 . . . 23).
Bit 31:24 Reserved: Read as zero, should be written as zero.

DLAx (Action_x Time to React (DLAx)

| | Address Offset: 0x0260 . . . 0x02BC | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | DLA | | | | | | | | |
| Mode | R | | | | | | | | RW | | | | | | | | |
| Initial Value | | | | | | | | | 0x000000 | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | DLA | | | | | | | | | | | | | | |
| Mode | RW | | | | | | | | | | | | | | |
| Initial Value | 0x000000 | | | | | | | | | | | | | | |

Bit 23:0 DLA Time to react before the corresponding position value of a desired action is reached (x = 0 . . . 23).
Bit 31:24 Reserved: Read as zero, should be written as zero.

NAx (Calculated number of TRIGGER/STATE increments to ACTION_x)

| | Address Offset: 0x02C0 . . . 0x031C | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | | | | | DW | | | | |
| Mode | R | | | | | | | | | | | | RW | | | | |
| Initial Value | 0x000 | | | | | | | | | | | | 0x000 | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | DW | | | | | DB | | | | | | | | | |
| Mode | RW | | | | | RW | | | | | | | | | |
| Initial Value | 0x000 | | | | | 0x000 | | | | | | | | | |

Bit 9:0 DB: number of events to Action_x (fractional part).
Bit 19:10 DW: number of events to Action_x (integer part).
Bit 31:20 Reserved: Read as zero, should be written as zero.
Note: Use the maximum value for DW = 0x2FF in the case of a calculated value which exceeds the representable value.

| DTAx (Calculated relative time to ACTION_x) | | |
|---|---|---|
| | Address Offset: 0x0320 . . . 0x037C | Initial Value: 0x0000_0000 |
| | 31 30 29 28 27 26 25 24 23 22 21 20 19 18 17 16 | 15 |
| Bit | Reserved | DTAx |
| Mode | R | RW |
| Initial Value | 0x00 | 0x000000 |
| | Initial Value: 0x0000_0000 | |
| | 14 13 12 11 10 9 8 7 6 5 4 3 2 1 0 | |
| Bit | DTAx | |
| Mode | RW | |
| Initial Value | 0x000000 | |

Bit 23:0 DTAx: calculated relative time to ACTION_x
Bit 31:24 Reserved: Read as zero, should be written as zero.

| MLS1 (Calculated number of sub-pulses between two STATE events) | | |
|---|---|---|
| | Address Offset: 0x05C0 | Initial Value: 0x0000_0000 |
| | 31 30 29 28 27 26 25 24 23 22 21 20 19 18 17 16 | 15 |
| Bit | Reserved | MLS1 |
| Mode | R | RW |
| Initial Value | 0x0000 | 0x0000 |
| | Initial Value: 0x0000_0000 | |
| | 14 13 12 11 10 9 8 7 6 5 4 3 2 1 0 | |
| Bit | MLS1 | |
| Mode | RW | |
| Initial Value | 0x0000 | |

Bit 17:0 MLS1: number of pulses between two STATE events (to be set and updated by the CPU).
For SMC = 0 the value of MLS1 is calculated once by the CPU for fixed values in the DPLL_CTRL_0 register by the formula MLS1 = ((MLT + 1)*(TNU + 1)/(SNU + 1)) and set accordingly
FOR SMC = 1 the value of MLS1 represents the number of pulses between two TRIGGER events (to be set and updated by the CPU)
Bit 31:18 Reserved: Read as zero, should be written as zero.

| MLS2 (Definition of Decision Value AOS (for SMC = 1 and RMO = 1)) | | |
|---|---|---|
| | Address Offset: 0x05C4 | Initial Value: 0x0000_0000 |
| | 31 30 29 28 27 26 25 24 23 22 21 20 19 18 17 16 | 15 |
| Bit | Reserved | MLS2 |
| Mode | R | RW |
| Initial Value | 0x0000 | 0x00000 |
| | Initial Value: 0x0000_0000 | |
| | 14 13 12 11 10 9 8 7 6 5 4 3 2 1 0 | |
| Bit | MLS2 | |
| Mode | RW | |

-continued

| MLS2 (Definition of Decision Value AOS (for SMC = 1 and RMO = 1)) | |
|---|---|
| Initial Value | 0x00000 |

Bit 17:0 MLS2: number of pulses between two STATE events (to be set and updated by the CPU).
Using adapt information and the missing STATE event information SYN_S, this value can be corrected for each increment automatically.
Bit 31:18 Reserved: Read as zero, should be written as zero.

CNT_NUM_1 (CNT_NUM_1 register)

| | Address Offset: 0x05C8 | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | CNT_NUM_1 | | | | | | | | |
| Mode | R | | | | | | | | RW | | | | | | | | |
| Initial Value | 0x00 | | | | | | | | 0x000000 | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | CNT_NUM_1 | | | | | | | | | | | | | | |
| Mode | RW | | | | | | | | | | | | | | |
| Initial Value | 0x000000 | | | | | | | | | | | | | | |

Bit 23:0 CNT_NUM_1 Number of pulses in continuous mode for the current increment in normal and emergency mode for SUB_INC1, given and updated by CPU only.
Bit 31:24 Reserved; Read as zero, should be written as zero.

CNT_NUM_2 (CNT_NUM_2 register)

| | Address Offset: 0x05CC | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | CNT_NUM_2 | | | | | | | | |
| Mode | R | | | | | | | | RW | | | | | | | | |
| Initial Value | 0x00 | | | | | | | | 0x000000 | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | CNT_NUM_2 | | | | | | | | | | | | | | |
| Mode | RW | | | | | | | | | | | | | | |
| Initial Value | 0x000000 | | | | | | | | | | | | | | |

Bit 23:0 CNT_NUM_2 Number of pulses in continuous mode for the current increment in normal and emergency mode for SUB_INC2, given and updated by CPU only.
Bit 31:24 Reserved: Read as zero, should be written as zero.

PVT (Plausibility value of next TRIGGER slope (PVT))

| | Address Offset: 0x00D0 | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | PVT | | | | | | | | |
| Mode | R | | | | | | | | RW | | | | | | | | |

-continued

| PVT (Plausibility value of next TRIGGER slope (PVT)) | | |
|---|---|---|
| Initial Value | 0x00 | 0x000000 |

| | Initial Value: 0x0000_0000 |
|---|---|
| | 14 13 12 11 10 9 8 7 6 5 4 3 2 1 0 |
| Bit | PVT |
| Mode | RW |
| Initial Value | 0x000000 |

Bit 23:0 PVT: Plausibility value of next valid TRIGGER slope. The meaning of the value depends on the value of the PIT value in the DPLL_CTRL_1 register.
For PIT = 0: the number of SUB_INC1 pulses to be waited for until a next valid TRIGGER event is accepted.
For PIT = 1: PVT is to be multiplied with the current expected increment time CDT_Ti and divided by 1024 in order to get the time to be waited for until the next valid TRIGGER event is accepted
Bit 31:24 Reserved: Read as zero, should be written as zero.
Note: When a valid TRIGGER slope is detected while the wait condition is not fulfilled the interrupt PWI is generated.

| TOV (Time out value of active TRIGGER slope) | | |
|---|---|---|
| | Address Offset: 0x05D4 | Initial Value: 0x0000_0000 |
| | 31 30 29 28 27 26 25 24 23 22 21 20 19 18 17 16 | 15 |
| Bit | Reserved | DW |
| Mode | R | |
| Initial Value | 0x0000 | |

| | Initial Value: 0x0000_0000 | |
|---|---|---|
| | 14 13 12 11 10 | 9 8 7 6 5 4 3 2 1 0 |
| Bit | DW | DB |
| Mode | | RW |
| Initial Value | | 0x000 |

Bit 9:0 DB: Decision value (fractional part) for missing TRIGGER interrupt.
Bit 15:10 DW: Decision value (integer part) for missing TRIGGER interrupt. TOV(15:0) is to be multiplied with the duration of the last increment and divided by 1024 in order to get the timeout time value
Bit 31:16 Reserved: Read as zero, should be written as zero.

DPLL RAM Region 1*b* Value Description

| TS_T (Actual TRIGGER time stamp register) | | | |
|---|---|---|---|
| | Address Offset: 0x0400/0x0404 | | Initial Value: 0x0000_0000 |
| | 31 30 29 28 27 26 25 24 | 23 22 21 20 19 18 17 16 | 15 |
| Bit | Reserved | TRIGGER_TS | |
| Mode | R | RW | |
| Initial Value | 0x00 | 0x000000 | |

| | Initial Value: 0x0000_0000 |
|---|---|
| | 14 13 12 11 10 9 8 7 6 5 4 3 2 1 0 |
| Bit | TRIGGER_TS |
| Mode | RW |
| Initial Value | 0x000000 |

Bit 23:0 TRIGGER_TS: Time stamp value of the last TRIGGER input.
Bit 31:24 Reserved: Read as zero, should be written as zero.
Note: The LSB address is determined using the SWON_T value in the OSW register (see 0).

TS_T_old (Previous TRIGGER time stamp register)

Address Offset: 0x0404/0x0400 — Initial Value: 0x0000_0000

| | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|
| Bit | | | | | Reserved | | | | | | | | | TRIGGER_TS_old | | | |
| Mode | | | | | R | | | | | | | | | RW | | | |
| Initial Value | | | | | 0x00 | | | | | | | | | 0x0000 | | | |

Initial Value: 0x0000_0000

| | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Bit | | | | | | | | TRIGGER_TS_old | | | | | | | |
| Mode | | | | | | | | RW | | | | | | | |
| Initial Value | | | | | | | | 0x0000 | | | | | | | |

Bit 23:0 TRIGGER_TS_old: Time stamp value of the last but one TRIGGER input.
Bit 31:24 Reserved: Read as zero, should be written as zero.
Note: The LSB address is determined using the SWON_T value in the OSW register (see 0).

FTV_T (Actual TRIGGER filter and signal value)

Address Offset: 0x0408/0x040C

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | | | | | | | | Reserved | | | | | | | | TRIGGER_S |
| Mode | | | | | | | | R | | | | | | | | RW |
| Initial Value | | | | | | | | 0 | | | | | | | | 0 |

Initial Values 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | | | | | | | | | TRIGGER_FT | | | | | | | |
| Mode | | | | | | | | | RW | | | | | | | |
| Initial Value | | | | | | | | | 0x0000 | | | | | | | |

Bit 15:0 TRIGGER_FT: Filter value of the last TRIGGER input.
Bit 16 TRIGGER_S: Signal value of the last but one TRIGGER input.
Bit 31:17 Reserved: Read as zero, should be written as zero.
Note: The LSB address is determined using the SWON_T value in the OSW register (see 0).

FTV_T_old (Previous TRIGGER filter and signal value)

Address Offset: 0x040C/0x0408

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | | | | | | | | Reserved | | | | | | | | TRIGGER_S |
| Mode | | | | | | | | R | | | | | | | | RW |
| Initial Value | | | | | | | | 0 | | | | | | | | 0 |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | | | | | | | | | TRIGGER_FT | | | | | | | |
| Mode | | | | | | | | | RW | | | | | | | |

-continued

| FTV_T_old (Previous TRIGGER filter and signal value) | |
|---|---|
| Initial Value | 0x0000 |

Bit 15:0 TRIGGER_FT: Filter value of the last TRIGGER input.
Bit 16 TRIGGER_S: Signal value of the last but one TRIGGER input.
Bit 31:7 Reserved: Read as zero, should be written as zero.
Note: The LSB address is determined using the SWON_T value in the OSW register (see 0).

TS_S (Actual STATE time stamp register)

| | Address Offset: 0x0410/0x0414 | | Initial Value: 0x0000_0000 |
|---|---|---|---|
| | 31 30 29 28 27 26 25 24 | 23 22 21 20 19 18 17 16 | 15 |
| Bit | Reserved | STATE_TS | |
| Mode | R | RW | |
| Initial Value | 0x00 | 0x000000 | |

| | Initial Value: 0x0000_0000 |
|---|---|
| | 14 13 12 11 10 9 8 7 6 5 4 3 2 1 0 |
| Bit | STATE_TS |
| Mode | RW |
| Initial Value | 0x000000 |

Bit 23:0 STATE_TS: Time stamp value of the last STATE input.
Bit 31:24 Reserved: Read as zero, should be written as zero.
Note: The LSB address is determined using the SWON_S value in the OSW register (see 0).

TS_S_old (Previous STATE time stamp register)

| | Address Offset: 0x0410/0x0414 | | Initial Value: 0x0000_0000 |
|---|---|---|---|
| | 31 30 29 28 27 26 25 24 | 23 22 21 20 19 18 17 16 | 15 |
| Bit | Reserved | STATE_TS_old | |
| Mode | R | RW | |
| Initial Value | 0x00 | 0x000000 | |

| | Initial Value: 0x0000_0000 |
|---|---|
| | 14 13 12 11 10 9 8 7 6 5 4 3 2 1 0 |
| Bit | STATE_TS_old |
| Mode | RW |
| Initial Value | 0x000000 |

Bit 23:0 STATE_TS_old: Time stamp value of the last STATE input.
Bit 31:24 Reserved: Read as zero, should be written as zero.
Note: The LSB address is determined using the SWON_S value in the OSW register (see 0).

FTV_S (Actual STATE filter and signal value)

Address Offset: 0x0418/0x041C

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | | | | | | | | | | | STATE_S |
| Mode | R | | | | | | | | | | | | | | | RW |
| Initial Value | 0x0000 | | | | | | | | | | | | | | | 0 |

Initial Values 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | STATE_FT | | | | | | | | | | | | | | | |
| Mode | RW | | | | | | | | | | | | | | | |
| Initial Value | 0x0000 | | | | | | | | | | | | | | | |

Bit 15:0 STATE_FT: Filter value of the last STATE input.
Bit 16 STATE_S: Signal value of the last STATE input.
Bit 31:17 Reserved: Read as zero, should be written as zero.
Note: The LSB address is determined using the SWON register (see 0).

FTV_S_old (Previous STATE filter and signal value)

Address Offset: 0x0418/0x041C

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | | | | | | | | | | | STATE_S |
| Mode | R | | | | | | | | | | | | | | | RW |
| Initial Value | 0x0000 | | | | | | | | | | | | | | | 0 |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | STATE_FT | | | | | | | | | | | | | | | |
| Mode | RW | | | | | | | | | | | | | | | |
| Initial Value | 0x0000 | | | | | | | | | | | | | | | |

Bit 15:0 STATE_FT: Filter value of the last but one STATE input.
Bit 16 STATE_S: Signal value of the last but one STATE input.
Bit 31:17 Reserved: Read as zero, should be written as zero.
Note: The LSB address is determined using the SWON register (see 0).

THMI (TRIGGER hold time min value (THMI))

Address Offset: 0x0420

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | | | | | | | | | | | |
| Mode | R | | | | | | | | | | | | | | | |
| Initial Value | 0x0000 | | | | | | | | | | | | | | | |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | THMI | | | | | | | | | | | | | | | |
| Mode | RW | | | | | | | | | | | | | | | |
| Initial Value | 0x0000 | | | | | | | | | | | | | | | |

Bit 15:0 THMI: minimal time to the next inactive TRIGGER slope (uint16); generate the TIN interrupt in the case of a violation for THMI > 0.
Bit 31:16 Reserved: Read as zero, should be written as zero.
Note: Typical retention time values after a valid slope can be e.g. between 45 μs (forwards) and 90 μs (backwards). When THMI is zero, consider always a THMI violation (forwards).

| THMA (TRIGGER hold time max value (THMA)) | | | | | | | | | | | | | | | | |
|---|---|---|---|---|---|---|---|---|---|---|---|---|---|---|---|---|
| | Address Offset: 0x0424 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | THMA | | | | | | | | | | | | | | | |
| Mode | RW | | | | | | | | | | | | | | | |
| Initial Value | 0x0000 | | | | | | | | | | | | | | | |

Bit 15:0 THMA: maximal time to the next inactive TRIGGER slope (uint16); generate the TAX interrupt in the case of a violation for THMA > 0.
Bit 31:16 Reserved: Read as zero, should be written as zero.

| THVAL (Measured TRIGGER hold time value) | | | | | | | | | | | | | | | | |
|---|---|---|---|---|---|---|---|---|---|---|---|---|---|---|---|---|
| | Address Offset: 0x0428 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | THVAL | | | | | | | | | | | | | | | |
| Mode | RW | | | | | | | | | | | | | | | |
| Initial Value | 0x0000 | | | | | | | | | | | | | | | |

Bit 15:0 THVAL: measured time from the last valid slope to the next inactive TRIGGER slope (uint16);

Bit 31:16 Reserved: Read as zero, should be written as zero.

| ADD_IN_LD_N (ADD_IN value for the ADDER given by the CPU in normal mode) | | | | | | | | | | | | | | | | |
|---|---|---|---|---|---|---|---|---|---|---|---|---|---|---|---|---|
| | Address Offset: 0x0430 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | ADD_IN_LD_N | | | | | | | |
| Mode | R | | | | | | | | RW | | | | | | | |
| Initial Value | 0x00 | | | | | | | | 0x000000 | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | ADD_IN_LD_N | | | | | | | | | | | | | | | |
| Mode | RW | | | | | | | | | | | | | | | |
| Initial Value | 0x000000 | | | | | | | | | | | | | | | |

Bit 23:0 ADD_IN_LD_N: Input value for SUB_INC1 generation, given by CPU.

Bit 31:24 Reserved: Read as zero, should be written as zero.

| ADD_IN_LD_E (ADD_IN value for the ADDER given by the CPU in emergency mode) | | |
|---|---|---|
| | Address Offset: 0x0434 | |
| | 31 30 29 28 27 26 25 24 | 23 22 21 20 19 18 17 16 |
| Bit | Reserved | ADD_IN_LD_E |
| Mode | R | RW |
| Initial Value | 0x00 | 0x000000 |
| | Initial Value: 0x0000_0000 | |
| | 15 14 13 12 11 10 9 8 7 6 5 4 3 2 1 0 | |
| Bit | ADD_IN_LD_E | |
| Mode | RW | |
| Initial Value | 0x000000 | |

Bit 23:0 ADD_IN_LD_E: Input value for SUB_INC1 generation, given by CPU.
Bit 31:24 Reserved: Read as zero, should be written as zero.

| ADD_IN_CAL_N (Calculated ADD_IN value for the ADDER in normal mode) | | |
|---|---|---|
| | Address Offset: 0x0438 | |
| | 31 30 29 28 27 26 25 24 | 23 22 21 20 19 18 17 16 |
| Bit | Reserved | ADD_IN_CAL_N |
| Mode | R | RW |
| Initial Value | 0x00 | 0x000000 |
| | Initial Value: 0x0000_0000 | |
| | 15 14 13 12 11 10 9 8 7 6 5 4 3 2 1 0 | |
| Bit | ADD_IN_CAL_N | |
| Mode | RW | |
| Initial Value | 0x000000 | |

Bit 23:0 ADD_IN_CAL_N: Calculated input value for SUB_INC1 generation.
Bit 31:24 Reserved: Read as zero, should be written as zero.

| ADD_IN_CAL_E (Calculated ADD_IN value for the ADDER in emergency mode) | | |
|---|---|---|
| | Address Offset: 0x043C | |
| | 31 30 29 28 27 26 25 24 | 23 22 21 20 19 18 17 16 |
| Bit | Reserved | ADD_IN_CAL_E |
| Mode | R | RW |
| Initial Value | 0x00 | 0x000000 |
| | Initial Value: 0x0000_0000 | |
| | 15 14 13 12 11 10 9 8 7 6 5 4 3 2 1 0 | |
| Bit | ADD_IN_CAL_E | |
| Mode | RW | |
| Initial Value | 0x000000 | |

Bit 23:0 ADD_IN_CAL_E: Input value for SUB_INC1 generation, given by CPU.
Bit 31:24 Reserved: Read as zero, should be written as zero.

MPVAL1 (Missing pulses to be added or subtracted directly)

| | Address Offset: 0x0440 | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | MPVAL1 | | | | | | | | | | | | | | | |
| Mode | RW | | | | | | | | | | | | | | | |
| Initial Value | 0x0000 | | | | | | | | | | | | | | | |

Bit 15:0 MPVAL1: missing pulses for direct correction of SUB_INC1 pulses by the CPU (sint16); used only for RMO = 0 for the case MPC1 = 1. Add MPVAL1 once to INC_CNT1 and reset PCM1 after applying once
Bit 31:16 Reserved: Read as zero, should be written as zero.

Note: Do not provide negative values which exceed the amount of MLT or MLS1 respectively.

MPVAL2 (Missing pulses to be added or subtracted directly)

| | Address Offset: 0x0440 | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | MPVAL2 | | | | | | | | | | | | | | | |
| Mode | RW | | | | | | | | | | | | | | | |
| Initial Value | 0x0000 | | | | | | | | | | | | | | | |

Bit 15:0 MPVAL2: missing pulses for direct correction of SUB_INC2 pulses by the CPU (sint16); used only for RMO = 0 for the case MPC2 = 1. Add MPVAL2 once to INC_CNT2 and reset PCM2 after applying once
Bit 31:16 Reserved: Read as zero, should be written as zero.

Note: Do not provide negative values which exceed the amount of MLT or MLS1 respectively.

TOV_S (Time out value of active STATE slope)

| | Address Offset: 0x0448 | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x00 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | DW | | | | | | DB | | | | | | | | | |
| Mode | RW | | | | | | RW | | | | | | | | | |
| Initial Value | 0x00 | | | | | | 0x000 | | | | | | | | | |

Bit 9:0 DB: Decision value (fractional part) for missing TRIGGER interrupt.

Bit 15:10 DW: Decision value (integer part) for missing TRIGGER interrupt. TOV_S (15:0) is to be multiplied with the duration of the last increment and divided by 1024 in order to get the timeout time value
Bit 31:16 Reserved: Read as zero, should be written as zero.

RCDT_TX (Reciprocal value of the expected increment duration (TRIGGER))

| | Address Offset: 0x0460 | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Bit | Reserved | | | | | | | | RCDT_Tx | | | | | | | |
| Mode | R | | | | | | | | RW | | | | | | | |
| Initial Value | 0x00 | | | | | | | | 0x000000 | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | RCDT_Tx | | | | | | | | | | | | | | | |
| Mode | RW | | | | | | | | | | | | | | | |
| Initial Value | 0x000000 | | | | | | | | | | | | | | | |

Bit 23:0 RCDT_TX: Reciprocal value of expected increment duration $*2^{24}$.
Bit 31:24 Reserved: Read as zero, should be written as zero.

RCDT_SX (Reciprocal value of the expected increment duration (STATE))

| | Address Offset: 0x0464 | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Bit | Reserved | | | | | | | | RCDT_SX | | | | | | | |
| Mode | R | | | | | | | | RW | | | | | | | |
| Initial Value | 0x00 | | | | | | | | 0x000000 | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | RCDT_SX | | | | | | | | | | | | | | | |
| Mode | RW | | | | | | | | | | | | | | | |
| Initial Value | 0x000000 | | | | | | | | | | | | | | | |

Bit 23:0 RCDT_SX: Reciprocal value of expected increment duration $*2^{24}$.
Bit 31:24 Reserved: Read as zero, should be written as zero.

RCDT_TX_nom (Reciprocal value of the expected nominal increment duration (T))

| | Address Offset: 0x0468 | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Bit | Reserved | | | | | | | | | | | | RCDT_TX_nom | | | |
| Mode | R | | | | | | | | | | | | RW | | | |
| Initial Value | 0x000 | | | | | | | | | | | | 0x00000 | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | RCDT_TX_nom | | | | | | | | | | | | | | | |
| Mode | RW | | | | | | | | | | | | | | | |
| Initial Value | 0x00000 | | | | | | | | | | | | | | | |

Bit 19:0 RCDT_TX_nom: Reciprocal value of nominal increment duration $*2^{20}$.
Bit 31:20 Reserved: Read as zero, should be written as zero.

| RCDT_SX_nom (Reciprocal value of the expected nominal increment duration (S)) | | | | | | | | | | | | | | | | |
|---|---|---|---|---|---|---|---|---|---|---|---|---|---|---|---|---|
| | Address Offset: 0x046C | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | RCDT_SX_nom | | | |
| Mode | R | | | | | | | | | | | | RW | | | |
| Initial Value | 0x000 | | | | | | | | | | | | 0x00000 | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | RCDT_SX_nom | | | | | | | | | | | | | | | |
| Mode | RW | | | | | | | | | | | | | | | |
| Initial Value | 0x00000 | | | | | | | | | | | | | | | |

Bit 19:0 RCDT_SX_nom: Reciprocal value of nominal increment duration $*2^{20}$.

Bit 31:20 Reserved: Read as zero, should be written as zero.

Note: RCDT_TX_nom and RCDT_SX_nom are calculated by the values RCDT_TX and RCDT_SX to be multiplied with SYN_T or SYN_S respectively.

| RDT_T_actual (Reciprocal value of last increment of TRIGGER) | | | | | | | | | | | | | | | | |
|---|---|---|---|---|---|---|---|---|---|---|---|---|---|---|---|---|
| | Address Offset: 0x0470 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | RDT_T_actual | | | |
| Mode | R | | | | | | | | | | | | RW | | | |
| Initial Value | 0x000 | | | | | | | | | | | | 0x00000 | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | RDT_T_actual | | | | | | | | | | | | | | | |
| Mode | RW | | | | | | | | | | | | | | | |
| Initial Value | 0x00000 | | | | | | | | | | | | | | | |

Bit 19:0 RDT_T_actual: Reciprocal value of last TRIGGER increment $*2^{20}$.

Bit 31:20

Reserved: Read as zero, should be written as zero.

| RDT_S_actual (Reciprocal value of last increment of STATE) | | | | | | | | | | | | | | | | |
|---|---|---|---|---|---|---|---|---|---|---|---|---|---|---|---|---|
| | Address Offset: 0x0474 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | RDT_S_actual | | | |
| Mode | R | | | | | | | | | | | | RW | | | |
| Initial Value | 0x000 | | | | | | | | | | | | 0x00000 | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | RDT_S_actual | | | | | | | | | | | | | | | |
| Mode | RW | | | | | | | | | | | | | | | |
| Initial Value | 0x00000 | | | | | | | | | | | | | | | |

Bit 19:0 RDT_S_actual: Reciprocal value of last STATE increment $*2^{20}$.

Bit 31:20 Reserved: Read as zero, should be written as zero.

| DT_T_actual (Duration of the last TRIGGER increment (DT_T_actual)) | | | | | | | | | | | | | | | | |
|---|---|---|---|---|---|---|---|---|---|---|---|---|---|---|---|---|
| | Address Offset: 0x0478 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | DT_T_actual | | | | | | | |
| Mode | R | | | | | | | | RW | | | | | | | |
| Initial Value | 0x00 | | | | | | | | 0x000000 | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | DT_T_actual | | | | | | | | | | | | | | | |
| Mode | RW | | | | | | | | | | | | | | | |
| Initial Value | 0x000000 | | | | | | | | | | | | | | | |

Bit 23:0 DT_T_actual: Calculated duration of the last TRIGGER increment. Value will be written into the corresponding RAM field, when all calculations for the considered increment are done and APT is valid.
Bit 31:24 Reserved: Read as zero, should be written as zero.

| DT_S_actual (Duration of the last STATE increment (DT_S_actual)) | | | | | | | | | | | | | | | | |
|---|---|---|---|---|---|---|---|---|---|---|---|---|---|---|---|---|
| | Address Offset: 0x047C | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | DT_S_actual | | | | | | | |
| Mode | R | | | | | | | | RW | | | | | | | |
| Initial Value | 0x00 | | | | | | | | 0x000000 | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | DT_S_actual | | | | | | | | | | | | | | | |
| Mode | RW | | | | | | | | | | | | | | | |
| Initial Value | 0x000000 | | | | | | | | | | | | | | | |

Bit 23:0 DT_S_actual: Calculated duration of the last STATE increment. Value will be written into the corresponding RAM field, when all calculations for the considered increment are done and APS is valid.
Bit 31:24 Reserved: Read as zero, should be written as zero.

| EDT_T (Difference of prediction to actual value of the last TRIGGER increment) | | | | | | | | | | | | | | | | |
|---|---|---|---|---|---|---|---|---|---|---|---|---|---|---|---|---|
| | Address Offset: 0x0480 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | EDT_T | | | | | | | |
| Mode | R | | | | | | | | R | | | | | | | |
| Initial Value | 0x00 | | | | | | | | 0x000000 | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | EDT_T | | | | | | | | | | | | | | | |
| Mode | R | | | | | | | | | | | | | | | |
| Initial Value | 0x000000 | | | | | | | | | | | | | | | |

Bit 23:0 EDT_T: Signed difference between actual value and a simple prediction of the last TRIGGER increment: sint24 {REF:DPLL_1347}

Bit 31:24 Reserved: Read as zero, should be written as zero.

| MEDT_T (Weighted difference of prediction errors of TRIGGER) | | |
|---|---|---|
| | Address Offset: 0x0484 | |
| | 31 30 29 28 27 26 25 24 | 23 22 21 20 19 18 17 16 |
| Bit | Reserved | MEDT_T |
| Mode | R | R |
| Initial Value | 0x00 | 0x000000 |
| | Initial Value: 0x0000_0000 | |
| | 15 14 13 12 11 10 9 8 7 6 5 4 3 2 1 0 | |
| Bit | MEDT_T | |
| Mode | R | |
| Initial Value | 0x000000 | |

Bit 23:0 MEDT_T: Signed middle weighted difference between actual value and prediction of the last TRIGGER increments: sint24 {REF:DPLL_1554}
Bit 31:24 Reserved: Read as zero, should be written as zero.

| EDT_S (Difference of prediction to actual value of the last STATE increment) | | |
|---|---|---|
| | Address Offset: 0x0488 | |
| | 31 30 29 28 27 26 25 24 | 23 22 21 20 19 18 17 16 |
| Bit | Reserved | EDT_S |
| Mode | R | R |
| Initial Value | 0x00 | 0x000000 |
| | Initial Value: 0x0000_0000 | |
| | 15 14 13 12 11 10 9 8 7 6 5 4 3 2 1 0 | |
| Bit | EDT_S | |
| Mode | R | |
| Initial Value | 0x000000 | |

Bit 23:0 EDT_S: Signed difference between actual value and prediction of the last STATE increment: sint24 {REF:DPLL_1361}
Bit 31:24 Reserved: Read as zero, should be written as zero.

| MEDT_S (Weighted difference of prediction error of STATE.) | | |
|---|---|---|
| | Address Offset: 0x048C | |
| | 31 30 29 28 27 26 25 24 | 23 22 21 20 19 18 17 16 |
| Bit | Reserved | MEDT_S |
| Mode | R | R |
| Initial Value | 0x00 | 0x000000 |
| | Initial Value: 0x0000_0000 | |
| | 15 14 13 12 11 10 9 8 7 6 5 4 3 2 1 0 | |
| Bit | MEDT_S | |
| Mode | R | |
| Initial Value | 0x000000 | |

Bit 23:0 MEDT_S: Signed middle weighted difference between actual value and prediction of the last STATE increments: sint24 {REF:DPLL_1362+56

Bit 31:24 Reserved: Read as zero, should be written as zero.

| CDT_TX (Prediction of the actual TRIGGER increment duration (CDT_TX)) | | |
|---|---|---|
| | Address Offset: 0x0490 | |
| | 31 30 29 28 27 26 25 24 | 23 22 21 20 19 18 17 16 |
| Bit | Reserved | CDT_TX |
| Mode | R | R |
| Initial Value | 0x00 | 0x000000 |
| | Initial Value: 0x0000_0000 | |
| | 15 14 13 12 11 10 9 8 | 7 6 5 4 3 2 1 0 |
| Bit | CDT_TX | |
| Mode | R | |
| Initial Value | 0x000000 | |

Bit 23:0 CDT_TX: Calculated duration of the current TRIGGER increment.
Bit 31:24 Reserved: Read as zero, should be written as zero.

| CDT_TX_nom (Prediction of the nominal TRIGGER increment duration) | | |
|---|---|---|
| | Address Offset: 0x0498 | |
| | 31 30 29 28 27 26 25 24 | 23 22 21 20 19 18 17 16 |
| Bit | Reserved | CDT_TX_nom |
| Mode | R | R |
| Initial Value | 0x00 | 0x000000 |
| | Initial Value: 0x0000_0000 | |
| | 15 14 13 12 11 10 9 8 | 7 6 5 4 3 2 1 0 |
| Bit | CDT_TX_nom | |
| Mode | R | |
| Initial Value | 0x000000 | |

Bit 23:0 CDT_TX_nom: Calculated duration to next nominal TRIGGER event.
Bit 31:24 Reserved: Read as zero, should be written as zero.

| CDT_SX_nom (Prediction of the nominal STATE increment duration) | | |
|---|---|---|
| | Address Offset: 0x0498 | |
| | 31 30 29 28 27 26 25 24 | 23 22 21 20 19 18 17 16 |
| Bit | Reserved | CDT_SX_nom |
| Mode | R | R |
| Initial Value | 0x00 | 0x000000 |
| | Initial Value: 0x0000_0000 | |
| | 15 14 13 12 11 10 9 8 | 7 6 5 4 3 2 1 0 |
| Bit | CDT_SX_nom | |
| Mode | R | |
| Initial Value | 0x000000 | |

Bit 23:0 CDT_SX_nom: Calculated duration to next nominal STATE event.
Bit 31:24 Reserved: Read as zero, should be written as zero.

| PDT_Ti (Projected TRIGGER increment sum relations for Acion_i) | |
|---|---|
| Address Offset: 0x0500 . . . 0x055C | |
| 31 30 29 28 27 26 25 24 | 23 22 21 20 19 18 17 16 |
| Bit | Reserved | DW |
| Mode | R | RW |
| Initial Value | 0x00 | 0x01 |

| | | |
|---|---|---|
| Bit | Reserved | DW |
| Mode | R | RW |
| Initial Value | 0x00 | 0x01 |

Initial Value: 0x0001_0000

| | 15 14 13 12 11 10 9 8 7 6 5 4 3 2 1 0 |
|---|---|
| Bit | DB |
| Mode | RW |
| Initial Value | 0x0000 |

Bit 15:0 DB: Fractional part of relation between TRIGGER increments.

Bit 23:16 DW: Integer part of relation between TRIGGER increments. Definition of relation values between TRIGGER increments PDT_Ti according to Equation 16.11

Bit 31:24 Reserved: Read as zero, should be written as zero.

PDT_Si (Projected STATE increment sum relations for Action_i)

Address Offset: 0x0560 . . . 0x05BC

| | 31 30 29 28 27 26 25 24 | 23 22 21 20 19 18 17 16 |
|---|---|---|
| Bit | Reserved | DW |
| Mode | R | RW |
| Initial Value | 0x00 | 0x01 |

Initial Value: 0x0001_0000

| | 15 14 13 12 11 10 9 8 7 6 5 4 3 2 1 0 |
|---|---|
| Bit | DB |
| Mode | RW |
| Initial Value | 0x0000 |

Bit 15:0 DB: Fractional part of relation between STATE increments.

Bit 23:16 DW: Integer part of relation between STATE increments. Definition of relation values between STATE increments PDT_Si according to Equation 16.13

Bit 31:24 Reserved: Read as zero, should be written as zero.

PSTC (Actual calculated position stamp of TRIGGER)

Address Offset: 0x05E0

| | 31 30 29 28 27 26 25 24 | 23 22 21 20 19 18 17 16 |
|---|---|---|
| Bit | Reserved | PSTC |
| Mode | R | RW |
| Initial Value | 0x00 | 0x000000 |

Initial Value: 0x0000_0000

| | 15 14 13 12 11 10 9 8 7 6 5 4 3 2 1 0 |
|---|---|
| Bit | PSTC |
| Mode | RW |
| Initial Value | 0x000000 |

Bit 23:0 PSTC: calculated position stamp of last TRIGGER input; value is set by the DPLL and can be updated by the CPU when filter values are to be considered for the exact position (see DPLL_STATUS and DPLL_CTRL registers for explanation of the status and control bits used): For each valid slope of TRIGGER in normal and emergency mode when FTD = 0: PSTC is set from actual position value, for the first valid TRIGGER event (no filter delay considered) the CPU must update the value once, taking into account the filter value when FTD = 1: PSTC is incremented at each TRIGGER event by SMC = 0: (MLT + 1) * (SYN_T) + PD; while PD = 0 for AMT = 0 SMC = 1: (MLS1) * (SYN_T) + PD; while PD = 0 for AMT = 0

Bit 31:24 Reserved: Read as zero, should be written as zero.

PSSC (Actual calculated position stamp of STATE)

Address Offset: 0x05E4

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | | | | PSSC | | | | | | | |
| Mode | R | | | | | | | | RW | | | | | | | |
| Initial Value | 0x00 | | | | | | | | 0x000000 | | | | | | | |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | PSSC | | | | | | | | | | | | | | | |
| Mode | RW | | | | | | | | | | | | | | | |
| Initial Value | 0x000000 | | | | | | | | | | | | | | | |

Bit 23:0 PSSC: calculated position stamp for the last STATE input; first value is set by the DPLL and can be updated by the CPU when the filter delay is to be considered. For each valid slope of STATE in normal and emergency mode when FSD = 0: PSSC is set from actual position value (no filter delay considered), the CPU must update the value once, taking into account the filter value when FSD = 1: at each valid slope of STATE (PD_S_store = 0 for AMS = 0): SMC = 0: add MLS1 * (SYN_S) + PD_S_store; SMC = 1: add MLS2 * (SYN_S) + PD_S_store;
Bit 31:24 Reserved: Read as zero, should be written as zero.

PSTM (Measured position stamp at last TRIGGER input)

Address Offset: 0x05E8/0x05EC

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Bit | Reserved | | | | | | | | PSTM | | | | | | | |
| Mode | R | | | | | | | | RW | | | | | | | |
| Initial Value | 0x00 | | | | | | | | 0x000000 | | | | | | | |

Initial Value: 0x0000_0000

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Bit | PSTM | | | | | | | | | | | | | | | |
| Mode | RW | | | | | | | | | | | | | | | |
| Initial Value | 0x000000 | | | | | | | | | | | | | | | |

Bit 23:0 PSTM: Measured position stamp of last TRIGGER input, measured at processing the input signal. (because of the input and transmission delay the value of PSTM can be higher than the exact value PSTC)
Bit 31:24 Reserved: Read as zero, should be written as zero.
Note: The LSB address is determined using the SWON_T value in the OSW register (see 0).

PSTM_old (Measured position stamp at last but one TRIGGER input)

Address Offset: 0x05EC/0x05E8 — Initial Value: 0x0000_0000

| | 31 | 30 | 29 | 28 | 27 | 26 | 25 | 24 | 23 | 22 | 21 | 20 | 19 | 18 | 17 | 16 | 15 |
|---|---|---|---|---|---|---|---|---|---|---|---|---|---|---|---|---|---|
| Bit | Reserved | | | | | | | | PSTM | | | | | | | | |
| Mode | R | | | | | | | | RW | | | | | | | | |
| Initial Value | 0x00 | | | | | | | | 0x000000 | | | | | | | | |

Initial Value: 0x0000_0000

| | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Bit | PSTM | | | | | | | | | | | | | | |
| Mode | RW | | | | | | | | | | | | | | |
| Initial Value | 0x000000 | | | | | | | | | | | | | | |

Bit 23:0 PSTM_old: Measured position stamp of last but one TRIGGER input, measured at processing the input signal. (because of the input and transmission delay the value of PSTM_old can be higher than the exact value PSTC_old)
Bit 31:24 Reserved: Read as zero, should be written as zero.
Note: The LSB address is determined using the SWON_T value in the OSW register (see 0).

| PSSM (Measured Position stamp at last STATE input) | | | | | | | | | | | | | | | | | |
|---|---|---|---|---|---|---|---|---|---|---|---|---|---|---|---|---|---|
| | Address Offset: 0x05F0/0x05F4 | | | | | | | | | | | | | | | | Initial Value: 0x0000_0000 |
| | 31 | 30 | 29 | 28 | 27 | 26 | 25 | 24 | 23 | 22 | 21 | 20 | 19 | 18 | 17 | 16 | 15 |
| Bit | Reserved | | | | | | | | PSSM | | | | | | | | |
| Mode | R | | | | | | | | RW | | | | | | | | |
| Initial Value | 0x00 | | | | | | | | 0x000000 | | | | | | | | |

| Initial Value: 0x0000_0000 | | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | PSSM | | | | | | | | | | | | | | |
| Mode | RW | | | | | | | | | | | | | | |
| Initial Value | 0x000000 | | | | | | | | | | | | | | |

Bit 23:0 PSSM: Measured position stamp of last STATE input, measured at processing the input signal. (because of the input and transmission delay the value of PSSM can be higher than the exact value PSSC)

Bit 31:24 Reserved: Read as zero, should be written as zero.

Note: The LSB address is determined using the SWON_S value in the OSW register (see 0).

| PSSM_old (Measured Position stamp at last but one STATE input) | | | | | | | | | | | | | | | | | |
|---|---|---|---|---|---|---|---|---|---|---|---|---|---|---|---|---|---|
| | Address Offset: 0x05F4/0x05F0 | | | | | | | | | | | | | | | | Initial Value: 0x0000_0000 |
| | 31 | 30 | 29 | 28 | 27 | 26 | 25 | 24 | 23 | 22 | 21 | 20 | 19 | 18 | 17 | 16 | 15 |
| Bit | Reserved | | | | | | | | PSSM_old | | | | | | | | |
| Mode | R | | | | | | | | RW | | | | | | | | |
| Initial Value | 0x00 | | | | | | | | 0x000000 | | | | | | | | |

| Initial Value: 0x0000_0000 | | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | PSSM_old | | | | | | | | | | | | | | |
| Mode | RW | | | | | | | | | | | | | | |
| Initial Value | 0x000000 | | | | | | | | | | | | | | |

Bit 23:0 PSSM_old: Measured position stamp of last but one STATE input, measured at processing the input signal. (because of the input and transmission delay the value of PSSM_old can be higher than the exact value PSSC_old).

Bit 31:24 Reserved: Read as zero, should be written as zero.

Note: The LSB address is determined using the SWON_S value in the OSW register (see 0).

| NMB_T (Number of Pulses to be sent in normal mode) | | | | | | | | | | | | | | | | | |
|---|---|---|---|---|---|---|---|---|---|---|---|---|---|---|---|---|---|
| | Address Offset: 0x05F8 | | | | | | | | | | | | | | | | Initial Value: 0x0000_0000 |
| | 31 | 30 | 29 | 28 | 27 | 26 | 25 | 24 | 23 | 22 | 21 | 20 | 19 | 18 | 17 | 16 | 15 |
| Bit | Reserved | | | | | | | | | | | | | | | | NMB_T |
| Mode | R | | | | | | | | | | | | | | | | RW |
| Initial Value | 0x0000 | | | | | | | | | | | | | | | | 0x0000 |

| Initial Value: 0x0000_0000 | | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | NMB_T | | | | | | | | | | | | | | |
| Mode | RW | | | | | | | | | | | | | | |

-continued

| NMB_T (Number of Pulses to be sent in normal mode) | |
|---|---|
| Initial Value | 0x0000 |

Bit 15:0 NMB_T: Calculated number of pulses in normal mode for the current TRIGGER increment. The first value is MLT + 1.
Bit 31:16 Reserved: Read as zero, should be written as zero.

NMB_S (Number of Pulses to be sent in emergency mode)

| | Address Offset: 0x05FC | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | | | | | NMB_S | | | | |
| Mode | R | | | | | | | | | | | | RW | | | | |
| Initial Value | 0x000 | | | | | | | | | | | | 0x00000 | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | NMB_S | | | | | | | | | | | | | | |
| Mode | RW | | | | | | | | | | | | | | |
| Initial Value | 0x00000 | | | | | | | | | | | | | | |

Bit 19:0NMB_S: Calculated number of pulses in emergency mode for the current STATE increment. The first value is MLS1.
Bit 31:20 Reserved: Read as zero, should be written as zero.

DPLL RAM Region is Value Description

RDT_Si (nominal STATE reciprocal values in FULL_SCALE)

| | Address Offset: 0x0600 . . . 0x06FC | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | | | | | RDT_Si | | | | |
| Mode | R | | | | | | | | | | | | RW | | | | |
| Initial Value | 0x000 | | | | | | | | | | | | 0x00000 | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | RDT_Si | | | | | | | | | | | | | | |
| Mode | RW | | | | | | | | | | | | | | |
| Initial Value | 0x00000 | | | | | | | | | | | | | | |

Bit 19:0 RDT_Si: nominal reciprocal value of the number of time stamp clocks measured in the corresponding increment $*2^{20}$; no gap considered.
Bit 31:20 Reserved: Read as zero, should be written as zero.
Note: There are 2* (SNU + 1-SYN_NS) entries.

TSF_Si (Time stamp field of STATE Events)

| | Address Offset: 0x0700 . . . 0x07FC | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | | | TSF_Si | | | | | | |
| Mode | R | | | | | | | | | | RW | | | | | | |

-continued

| TSF_Si (Time stamp field of STATE Events) | | |
|---|---|---|
| Initial Value | 0x00 | 0x000000 |

| Initial Value: 0x0000_0000 | | | | | | | | | | | | | | |
|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | TSF_Si | | | | | | | | | | | | | | |
| Mode | RW | | | | | | | | | | | | | | |
| Initial Value | 0x000000 | | | | | | | | | | | | | | |

Bit 23:0 TSF_Si: Time stamp value of each STATE event.
Bit 31:24 Reserved: Read as zero, should be written as zero.
Note: There are 2* (SNU + 1) entries.

| ADT_Si (Adapt Values for all STATE Increments) | | | | |
|---|---|---|---|---|
| Address Offset: 0x0800 . . . 0x08FC | | | | |
| | 31 30 29 28 27 26 25 24 | 23 22 21 20 | 19 | 18 17 16 |
| Bit | Reserved | TSOS | Reserved | NS |
| Mode | R | RW | R | RW |
| Initial Value | 0x00 | 0x0 | 0 | 000 |

| Initial Value: 0x0000_0000 | | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Bit | PD_S | | | | | | | | | | | | | | | |
| Mode | RW | | | | | | | | | | | | | | | |
| Initial Value | 0x0000 | | | | | | | | | | | | | | | |

Bit 15:0 PD_S: Adapt values for each STATE increment in FULL_SCALE (sint16);
Bit 18:16 NS: number of nominal STATE increments in the corresponding interval.
Bit 19 Reserved: Read as zero, should be written as zero.
Bit 23:20 TSOS: time stamp overflow number—additional 4 bits to TSF_Si showing the time stamp overflow number of STATE events in FULL_SCALE; This extension allows the representation of a 28 bit time stamp in combination with the corresponding 24 bit TSF_Si values.
Bit 31:24 Reserved: Read as zero, should be written as zero.
Note: There are 2* (SNU + 1-SYN_NS) entries.

| DT_Si (nominal STATE Increment Values for FULL_SCALE) | | | |
|---|---|---|---|
| | Address Offset: 0x0900 . . . 0x09FC | | Initial Value: 0x0000_0000 |
| | 31 30 29 28 27 26 25 24 | 23 22 21 20 19 18 17 16 | 15 |
| Bit | Reserved | DT_Si | |
| Mode | R | R | |
| Initial Value | 0x00 | 0x000000 | |

| Initial Value: 0x0000_0000 | | | | | | | | | | | | | | |
|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | DT_Si | | | | | | | | | | | | | | |
| Mode | R | | | | | | | | | | | | | | |
| Initial Value | 0x000000 | | | | | | | | | | | | | | |

Bit 23:0 DT_Si: nominal increment duration values for each STATE increment in FULL_SCALE (considering no gap).
Bit 31:24 Reserved: Read as zero, should be written as zero.
Note: There are 2* (SNU + 1-SYN_NS) entries.

DPLL RAM Region 2 Value Description

RDT_Ti (TRIGGER nominal increment reciprocals in FULL_SCALE)

| | Address Offset: 0x1000 . . . 0x11FC 0x1000 . . . 0x1FFC | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | | | | | | Reserved | | | | | | | | | | RDT_Ti | |
| Mode | | | | | | R | | | | | | | | | | RW | |
| Initial Value | | | | | | 0x00 | | | | | | | | | | 0x00000 | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | | | | | | | | RDT_Ti | | | | | | | |
| Mode | | | | | | | | RW | | | | | | | |
| Initial Value | | | | | | | | 0x00000 | | | | | | | |

Bit 19:0 RDT_Ti: 2* (TNU + 1- SYN_NT) stored values nominal reciprocal value of the number of time stamp clocks measured in the corresponding increment (which is divided by the number of nominal increments); multiplied by $2^{20}$.
Bit 31:20 Reserved: Read as zero, should be written as zero.
Note: There are 2* (TNU + 1- SYN_NT) entries.

TSF_Ti (Time Stamp Field of TRIGGER Events)

| | Address Offset: 0x1200 . . . 0x13FC, . . . , or 0x2000 . . . 0x2FFC | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | | | | Reserved | | | | | | | | | | TSF_Ti | | | |
| Mode | | | | R | | | | | | | | | | RW | | | |
| Initial Value | | | | 0x00 | | | | | | | | | | 0x000000 | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | | | | | | | | TSF_Ti | | | | | | | |
| Mode | | | | | | | | RW | | | | | | | |
| Initial Value | | | | | | | | 0x000000 | | | | | | | |

Bit 23:0 TSF_Ti: Stored values of TRIGGER_TS; 2* (TNU + 1) entries for overflow bits see adapt value register;
Bit 31:24 Reserved: Read as zero, should be written as zero.

ADT_Ti (Adapt Values for all Increments)

| | Address Offset: 0x1400 . . . 0x15FC, . . . or 0x3000 . . . 0x3FFC | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Bit | | | | Reserved | | | | | | TSOT | | | Reserved | | NT | |
| Mode | | | | R | | | | | | RW | | | R | | RW | |
| Initial Value | | | | 0x00 | | | | | | 0x0 | | | 0 | | 000 | |

| | Initial Value: 0x0000_0000 | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Bit | | TINT | | | | | | | | PD | | | | | | |
| Mode | | RW | | | | | | | | RW | | | | | | |

-continued

| ADT_Ti (Adapt Values for all Increments) | | |
|---|---|---|
| Initial Value | 000 | 0x0000 |

Bit 12:0 PD: Adapt values for each TRIGGER increment in FULL_SCALE (sint13); the PD value does mean the number of SUB_INC1 pulses to be added to NT*(MLT + 1); systematic missing TRIGGER events must not be considered for the value of PD; Bit 15:13TINT: TRIGGER Interrupt information; depending on the value up to 7 different interrupts can be generated. In the current version the 5 interrupts TE0_IRQ . . . TE4_IRQ are supported by TINT = "001", "010", "011", "100", "101" respectively.
Bit 18:16 NT: number of nominal TRIGGER increments in the corresponding interval.
Bit 19 Reserved: Read as zero, should be written as zero.
Bit 23:20 TSOT: time stamp overflow number of TRIGGER—additional 4 bits to TSF_Ti showing the time stamp overflow number of TRIGGER events in FULL_SCALE;
Bit 31:24 Reserved: Read as zero, should be written as zero.
Note: There are 2* (TNU + 1- SYN_NT) entries.

DT_Ti (nominal TRIGGER increment values for FULL_SCALE)

| | Address Offset: 0x1600 . . . 0x017FC, . . . , or 0x4000 . . . 0x4FFC | | | | | | | | | | | | | | | | Initial Value: 0x0000_0000 |
|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 15 |
| Bit | Reserved | | | | | | | | DT_Si | | | | | | | | |
| Mode | R | | | | | | | | R | | | | | | | | |
| Initial Value | 0x00 | | | | | | | | 0x000000 | | | | | | | | |

| | Initial Value: 0x0000_0000 | | | | | | | | | | | | | | |
|---|---|---|---|---|---|---|---|---|---|---|---|---|---|---|---|
| | 14 | 13 | 12 | 11 | 10 | 9 | 8 | 7 | 6 | 5 | 4 | 3 | 2 | 1 | 0 |
| Bit | DT_Si | | | | | | | | | | | | | | |
| Mode | R | | | | | | | | | | | | | | |
| Initial Value | 0x000000 | | | | | | | | | | | | | | |

Bit 23:0 DT_Ti: increment duration values for each TRIGGER increment in FULL_SCALE divided by the number of nominal increments (nominal value).
Bit 31:24 Reserved: Read as zero, should be written as zero.
Note: There are 2* (TNU + 1- SYN_NT) entries.

Sensor Pattern Evaluation (SPE)

Overview

The Sensor Pattern Evaluation (SPE) sub module can be used to evaluate three hall sensor inputs and together with the TOM module to support the drive of BLDC engines. Thus, the input signals are filtered already in the connected TIM channels. In addition, the SPE sub module can be used as an input stage to the MAP sub module if the DPLL should be used to calculate the rotation speed of one or two electric engine(s). The integration of the SPE sub module into the overall GTM-IP architecture concept is shown in FIG. 53.

SPE Sub Module Integration Concept into GTM-IP

Figure 53:
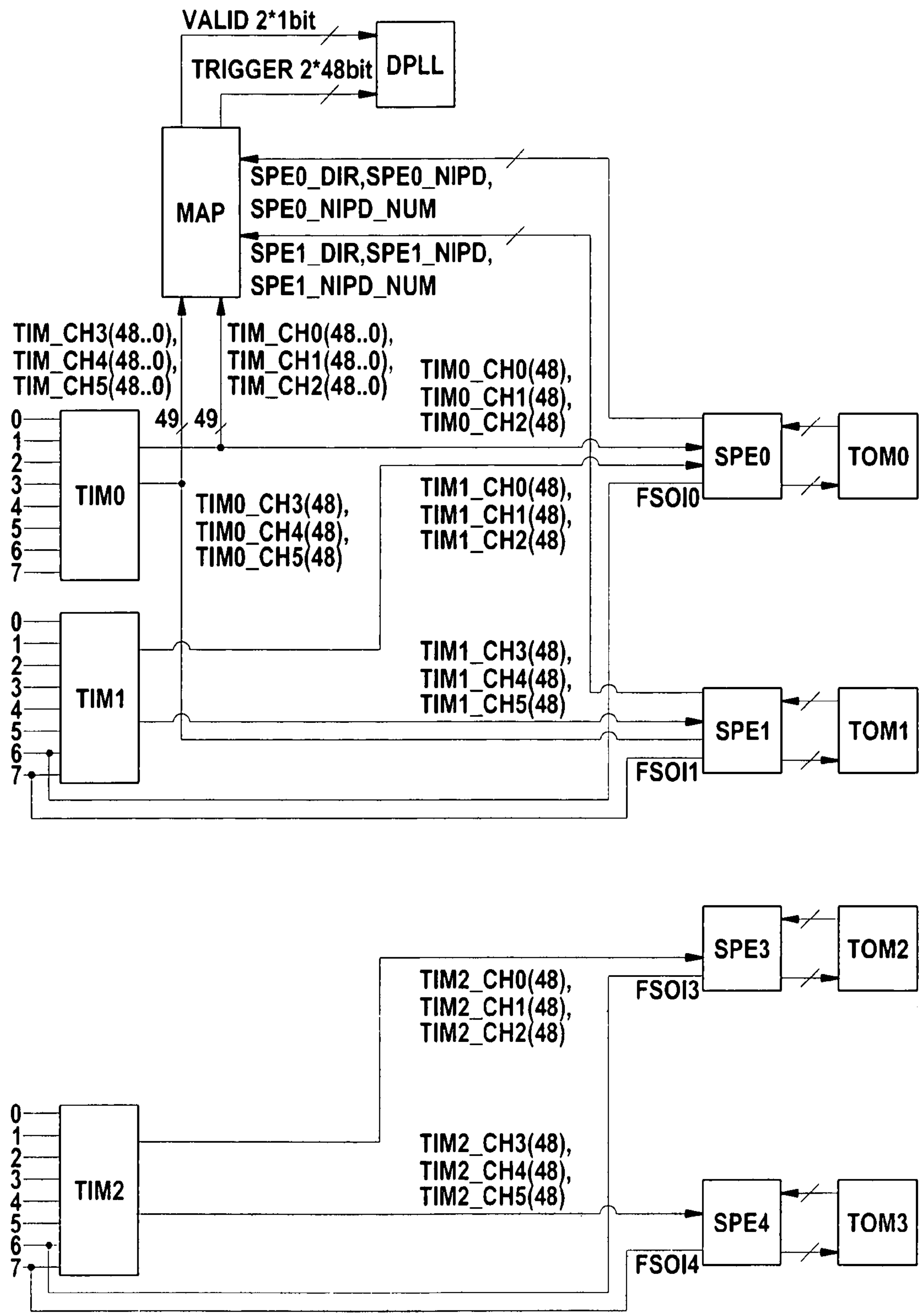

See FIG. 53.

Figure 54:
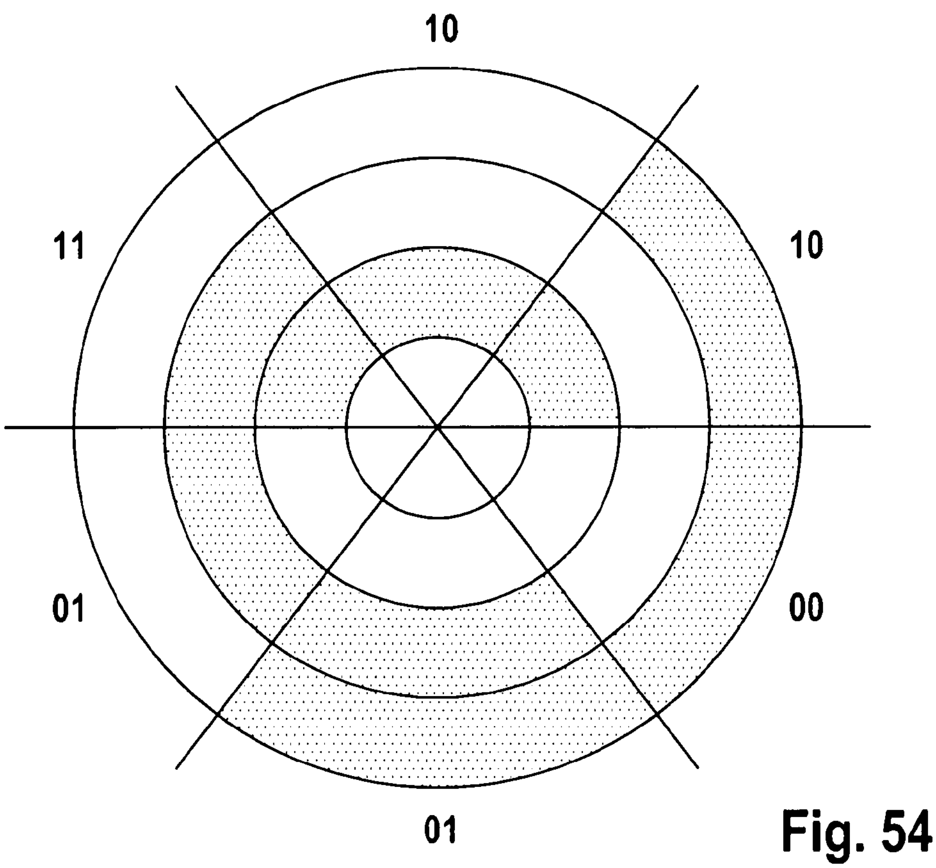

As mentioned above, the SPE sub module can determine a rotation direction out of the combined TIM[i]_CHx(48), TIM[i]_CHy(48) and TIM[i]_CHz(48) signals. On this input signals a pattern matching algorithm is applied to generate the SPEx_DIR signal on behalf of the temporal relation between these input patterns. A possible sample pattern of the three input signals is shown in FIG. 54. In general, the input pattern is programmable within the SPE sub module.

SPE Sample Input Pattern for TIM[i]_CH[x,y,z](48)

See FIG. 54.

In FIG. 54 the input signals define the pattern from the input sensors which have a 50% high and 50% low phase. The pattern according to FIG. 54 is as follows:

100-110-010-011-001-101-100 where the first bit (smallest circle) represents TIM[i]_CH[x](48), the second bit represents TIM[i]_CH[y](48), and the third bit (greatest circle) represents TIM[i]_CH[z](48).

Note that the SPE module expects that with every new pattern only one of the three input signals changes its value.

SPE Sub Module Description

The SPE sub module can handle sensor pattern inputs. Every time if one of the input signals TIM[i]_CH[x](48), TIM[i]_CH[y](48) or TIM[i]_CH[z](48) changes its value, a sample of all three input signals is made. Derived from the sample of the three inputs the encoded rotation direction and the validity of the input pattern sequence can be detected and signalled. When a valid input pattern is detected, the SPE sub module can control the outputs of a dedicated connected TOM sub module. This connection is shown in FIG. 55.

SPE to TOM Connections

Figure 55:
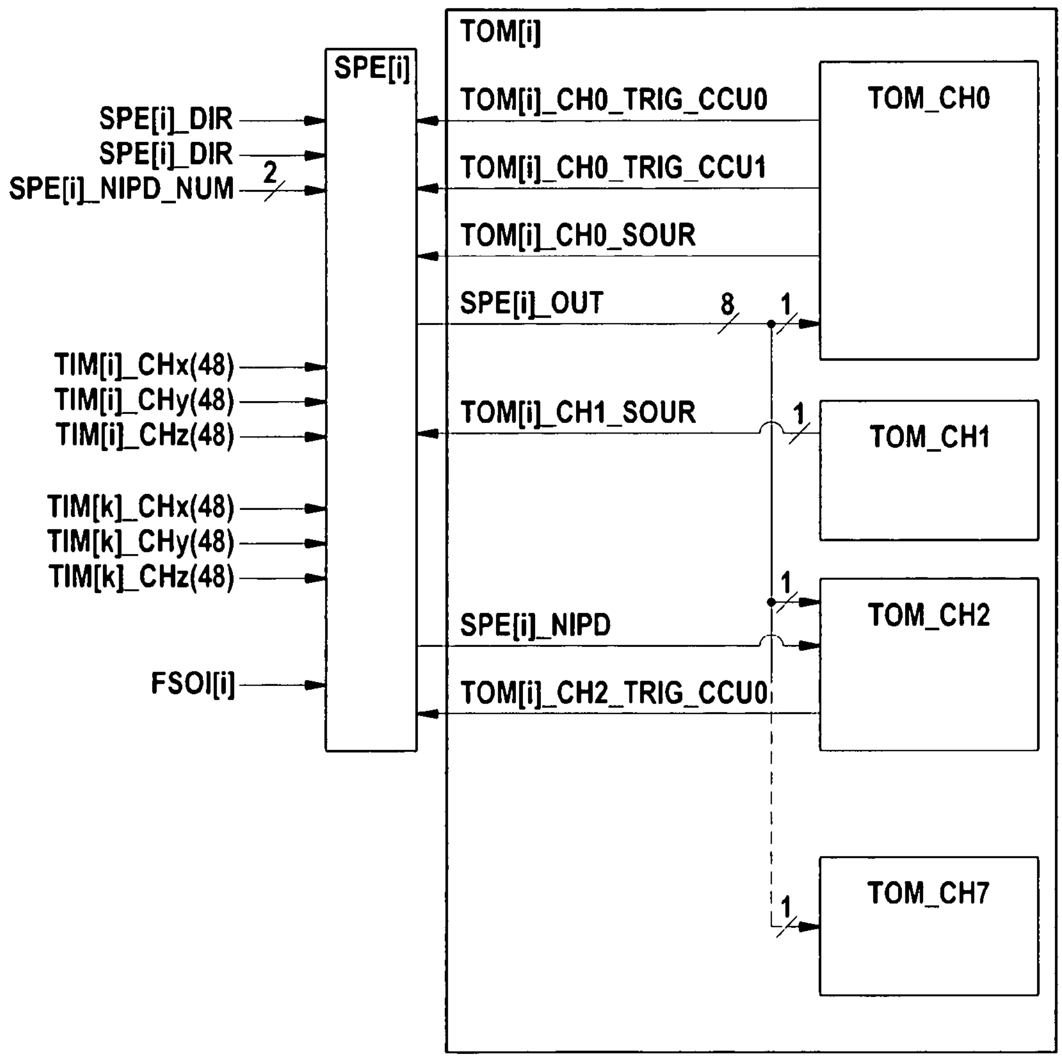

See FIG. 55.

The TOM[i]_CH0_TRIG_CCU[x] and TOM[i]_CH[x]_SOUR signal lines are used to evaluate the current state of the TOM outputs, whereas the SPE[i]_OUT output vector is used to control the TOM output depending on the new input pattern. The SPE[i]_OUT output vector is defined inside the SPE sub module in a pattern definition table SPE[i]_OUT_ PAT[x]. The internal SPE sub module architecture is shown in FIG. 56.

SPE Sub Module Architecture

Figure 56:
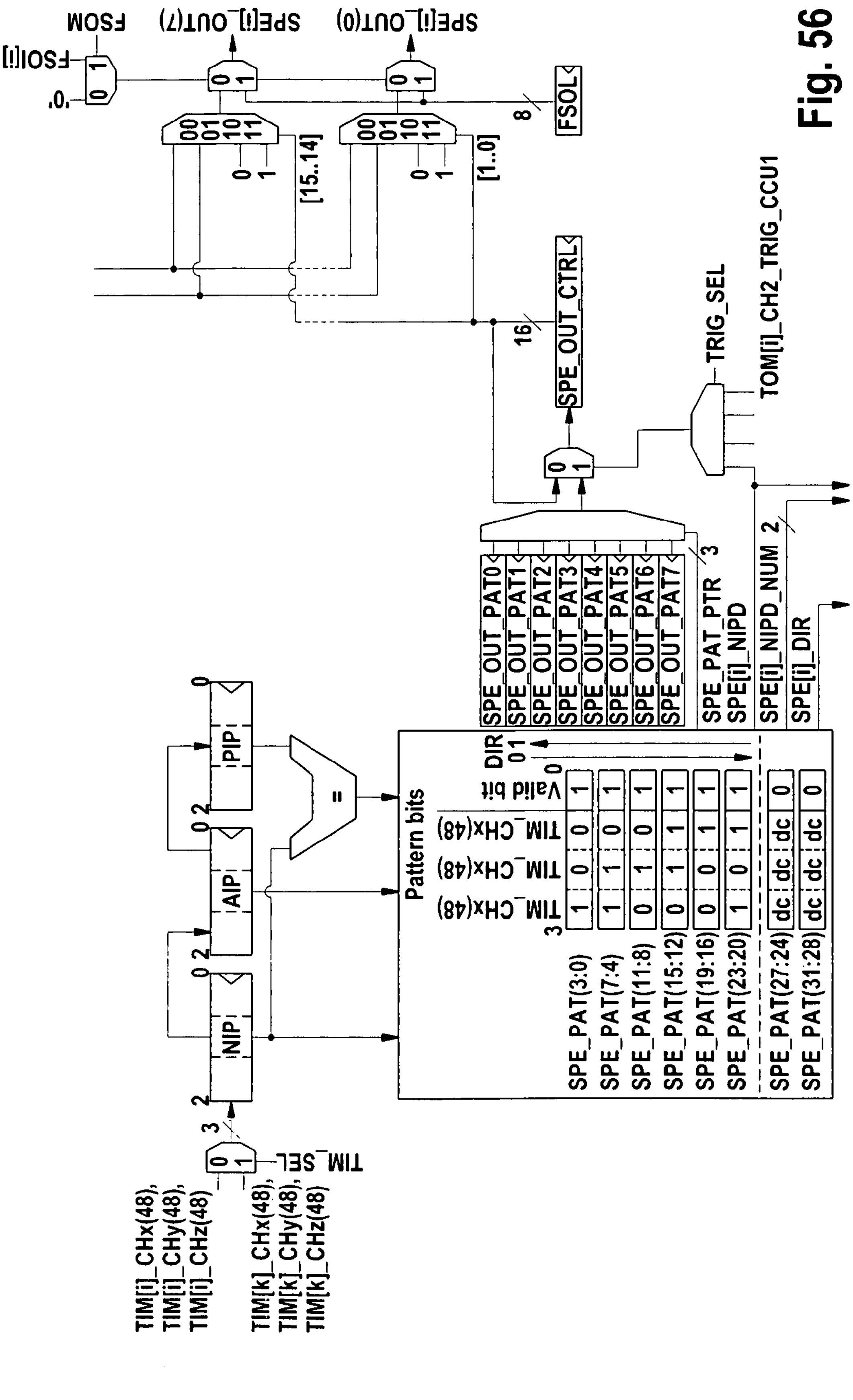

See FIG. 56.

Figure 57:
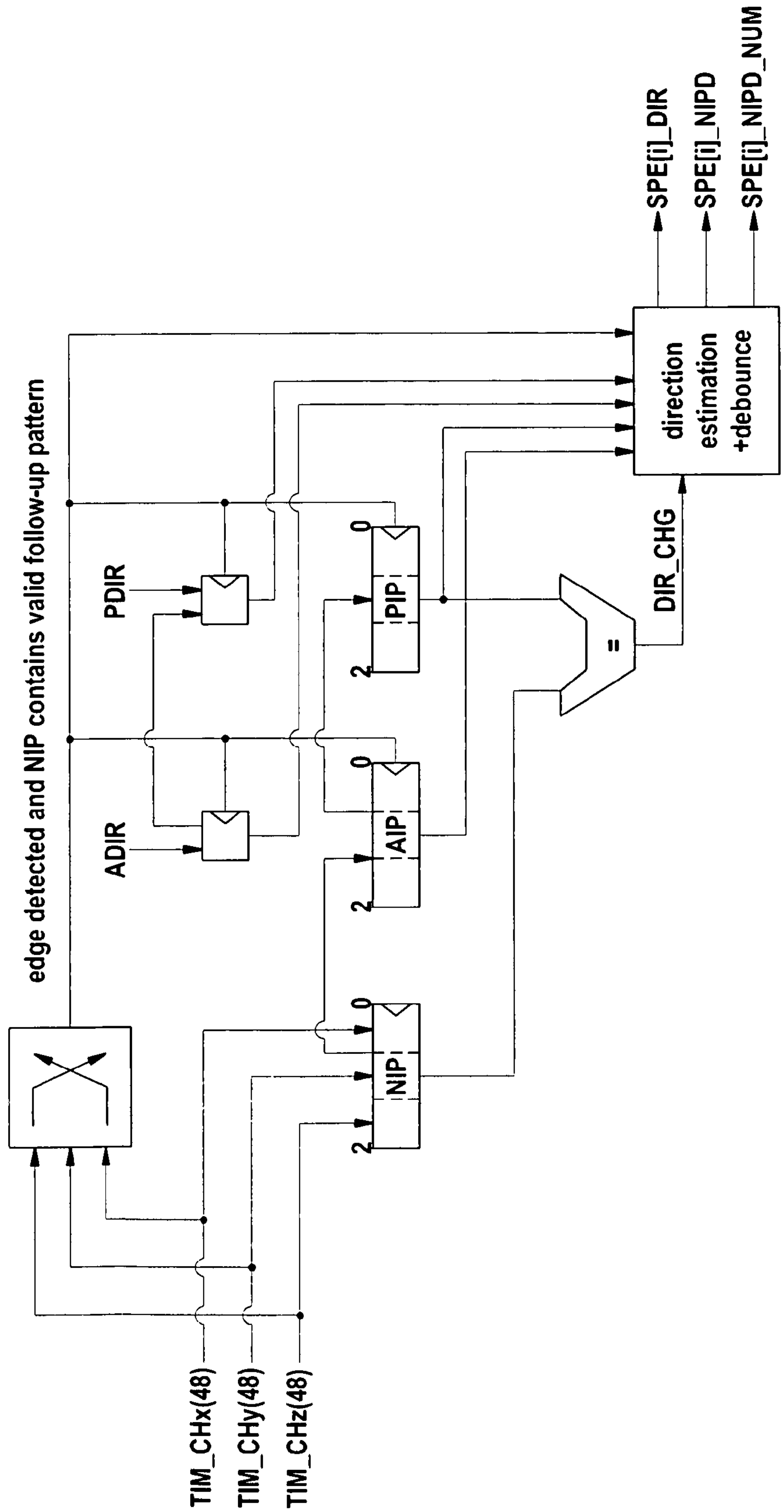

The SPE[i]_PAT register holds the valid input pattern for the three input patterns TIM[i]_CH[x](48), TIM[i]_CH[y](48) and TIM[i]_CH[z](48). The input pattern is programmable. The valid bit shows if the programmed pattern is a valid one. FIG. 57 shows the programming of the SPE[i]_PAT register for the input pattern defined in FIG. 54.

The rotation direction is determined by the order of the valid input pattern. This rotation direction defines if the SPE_PAT_PTR is incremented (DIR=0) or decremented (DIR=1). Whenever a valid input pattern is detected, the NIPD signal is raised, the SPE_PAT_PTR is incremented/decremented and a new output control signal SPE[i]_OUT(x) is send to the corresponding TOM sub module.

The TOM[i]_CH2 with i=0 . . . 3 can be used together with the SPE module to trigger a delayed update of the SPE_OUT_CTRL register after new input pattern detected by SPE (signalled by SPE[i]_NIPD).

To do this, the TOM[i]_CH2 has to be configured to work in one-shot mode (set bit OSM in register TOM[i]_CH2_CTRL). The SPE mode of this channel has to be enabled, too (set bit SPEM in register TOM[i]_CH2_CTRL). The SPE module has to be configured to update SPE_OUT_CTRL on TOM[i]_CH2_TRIG_CCU1 (set in SPE[i]_CTRL_STAT bits TRIG_SEL to '11'). Then, on new input detected by SPE, the signal SPE[i]_NIPD triggers the start of the TOM channel 2 to generates one PWM period by resetting CN0 to 0. On second PWM edge triggered by CCU1 of TOM channel 2, the signal TOM[i]_CH2_TRIG_CCU1 triggers the update of SPE_OUT_CTRL.

According to FIG. 56, the two input patterns "000" and "111" are not allowed combinations and will end in a SPE[i]_PERR interrupt. These two patterns can be used to determine a sensor input error. A SPE[i]_PERR interrupt will also be raised, if the input patterns occur in a wrong order, e.g. if the pattern "010" does not follow the pattern "110" or "011".

The register SPE[i]_IN_PAT bit field inside the SPE[i]_CTRL_STAT register is implemented, where the input pattern history is stored by the SPE sub module. The CPU can determine a broken sensor when the SPE[i]_PERR interrupt occurs by analysing the bit pattern NIP inside the SPE[i]_CTRL_STAT register. The input pattern in the SPE[i]_CTRL_STAT register is updated whenever a valid edge is detected on one of the input lines TIM[i]_CH[x](48), TIM[i]_CH[y](48) or TIM[i]_CH[z](48). The pattern bit fields are then shifted. The input pattern history generation inside the SPE[i]_CTRL_STAT register is shown in FIG. 57.

Additionally to the sensor pattern evaluation the SPE module also provides the feature of fast shut-off for all TOM channels controlled by the SPE module. The feature is enables by setting bit FSOM in register SPE[i]_CTRL_STAT. The fast shut-off level itself is defined in the bit field FSOL of register SPE[i]_CTRL_STAT. The TIM input used to trigger the fast shut-off is either TIM channel 6 or TIM channel 7 depending on the TIM instance connected to the SPE module. For details of connections please refer to FIG. 53.

SPE[i]_IN_PAT Register Representation

See FIG. 57.

The CPU can disable one of the three input signals, e.g. when a broken input sensor was detected, by disabling the input with the three input enable bits SIE inside the SPE[i]_CTRL_STAT register.

Whenever at least one of the input signal TIM[i]_CH[x](48), TIM[i]_CH[y](48) or TIM[i]_CH[z](48) changes the SPE sub module stores the new bit pattern in an internal register NIP (New Input Pattern). If the current input pattern in NIP is the same as in the Previous Input Pattern (PIP) the direction of the engine changed, the SPEC[i]_DCHG interrupt is raised, the direction change is stored internally and the pattern in the PIP bit field is filled with the AIP bit field and the AIP bit field is filled with the NIP bit field. The SPE[i]_DIR bit inside the SPE[i]_CTRL_STAT register is toggled and the SPE[i]_DIR signal is changed.

If the SPE encounters that with the next input pattern detected new input pattern NIP the direction change again, the input signal is categorized as bouncing and the bouncing input signal interrupt SPE[i] BIS is raised.

Immediately after update of register NIP, when the new detected input pattern doesn't match the PIP pattern (i.e. no direction change was detected), the SPE shifts the value of register AIP to register PIP and the value of register NIP to register AIP. The SPE[i] NIPD interrupt is raised.

The number of the channel that has been changed and thus leads to the new input pattern is encoded in the signal SPE[i]_NIPD_NUM.

If a sensor error was detected, the CPU has to define upon the pattern in the SPE[i]_CTRL_STAT register, which input line comes from the broken sensor. The faulty signal line has to be masked by the CPU and the SPE sub module determines the rotation direction on behalf of the two remaining TIM[i]_CH[x] input lines.

The pattern history can be determined by the CPU by reading the two bit fields AIP and PIP of the SPE[i]_CTRL_STAT register. The AIP register field holds the actual detected input pattern at TIM[i]_CH[x](48), TIM[i]_CH[y](48) and TIM[i]_CH[z](48) and the PIP holds the previous detected pattern.

After reset the register NIP, AIP and PIP as well as the register SPE[i]_PAT_PTR and SPE[i]_OUT_CTRL will not contain valid start-up values which would allow correct behaviour after enabling SPE and detecting the first input patterns.

Thus, it is necessary to initialize these register to correct values.

To do this, before enabling the SPE, the bit field NIP of register SPE[i]_CTRL_STAT can be read and depending on this value the initialization values for the register AIP, PIP, SPT_PAT_PTR and SPE[i]_OUT_CTRL can be determined.

SPE Interrupt Signals

The following table describes SPE interrupt signals:

| Signal | Description |
|---|---|
| SPE[i]_NIPD | SPE New valid input pattern detected. |
| SPE[i]_DCHG | SPE Rotation direction change detected on behalf of input pattern. |
| SPE[i]_PERR | SPE Invalid input pattern detected. |
| SPE[i]_BIS | SPE Bouncing input signal detected at input. |

SPE Register Overview

The following table shows an overview about the SPE register set.

| Register name | Description | Details in Section |
|---|---|---|
| SPE[i]_CTRL_STAT | SPE Control status register | 0 |
| SPE[i]_PAT | SPE Input pattern definition register. | 0 |
| SPE[i]_OUT_PAT[x] | SPE Output definition registers. (x: 0 . . . 7) | 0 |

-continued

| Register name | Description | Details in Section |
|---|---|---|
| SPE[i]_OUT_CTRL | SPE output control register | 0 |
| SPE[i]_IRQ_NOTIFY | SPE Interrupt notification register. | 0 |
| SPE[i]_IRQ_EN | SPE Interrupt enable register. | 0 |
| SPE[i]_IRQ_FORCINT | SPE Interrupt generation by software. | 0 |
| SPE[i]_IRQ_MODE | IRQ mode configuration register | 0 |

SPE Register Description

| Register SPE[i]_CTRL_STAT | | | | | | | | | | |
|---|---|---|---|---|---|---|---|---|---|---|
| | Address Offset: 0x00 | | | | | | | Initial Value: 0x0000_0000 | | |
| | 31 30 29 28 27 26 25 24 | 23 22 | 21 20 | 19 | 18 17 16 | 15 | 14 13 12 | 11 | | |
| Bit | FSOL | Reserved | NIP | PDIR | PIP | ADIR | AIP | Reserved | | |
| Mode | RW | R | R | RW | RW | RW | RW | R | | |
| Initial Value | 0X00 | 00000 | 000 | 0 | 000 | 0 | 000 | 0 | | |

| | Initial Value: 0x0000_0000 | | | | | | | |
|---|---|---|---|---|---|---|---|---|
| | 10 9 8 | 7 | 6 | 5 4 | 3 | 2 | 1 | 0 |
| Bit | SPE_PAT_PTR | FSOM | TIM_SEL | TRIG_SEL | SIE2 | SIE1 | SIE0 | EN |
| Mode | RW | RW | RW | RW | RW | RW | RW | RW |
| Initial Value | 000 | 0 | 0 | 0 | 0 | 0 | 0 | 0 |

Bit 0 SPE_EN: SPE Sub module enable.
0 = SPE disabled.
1 = SPE enabled.
Bit 1 SIE0: SPE Input enable for TIM_CHx(48).
0 = SPE Input is disabled.
1 = SPE Input is enabled.
Note: When the input is disabled, a '0' signal is sampled for this input.
Bit 2 SIE1: SPE Input enable for TIM_CHy(48). See bit 1.
Bit 3 SIE2: SPE Input enable for TIM_CHz(48).See bit 1.
Bit 5:4 TRIG_SEL: Select trigger input signal.
00 = SPE[i]_NIPD selected.
01 = TOM_CH0_TRIG_CCU0 selected.
10 = TOM_CH0_TRIG_CCU1 selected.
11 = TOM_CH2_TRIG_CCU2 selected.
Bit 6 TIM_SEL: select TIM input signal
SPE0:
0 = TIM0_CH0 . . . 2
1 = TIM1_CH0 . . . 2
SPE1:
0 = TIM0_CH3 . . . 5
1 = TIM1_CH3 . . . 5
SPE2:
0 = TIM2_CH0 . . . 2
1 = unused
SPE3:
0 = TIM2_CH3 . . . 5
1 = unused
Bit 7 FSOM: Fast Shut-Off Mode
0 = Fast Shut-Off mode disabled
1 = Fast Shut-Off mode enabled
Bit 10:8 SPE_PAT_PTR: Pattern selector for TOM output signals. Actual index into the SPE[i]_OUT_PAT[x] register table. Each register SPE[i]_OUT_PAT[x] is fixed assigned to one bit field IPx_PAT of register SPE[i]_PAT. Thus, the pointer SPE[i]_PAT_PTR represents an index to the selected SPE[i]_OUT_PAT[x] register as well as the actual detected input pattern IPx_PAT. 000: SPE[i]_OUT_PAT0 selected
Bit 11 Reserved: Read as zero, should be written as zero.
Bit 14:12 AIP: Actual input pattern that was detected by a regular input pattern change.
Bit 15 ADIR: Actual rotation direction.
0 = Rotation direction is 0 according to SPE[i]_PAT register.
1 = Rotation direction is 1 according to SPE[i]_PAT register.
Bit 18:16 PIP: Previous input pattern that was detected by a regular input pattern change.
Bit 19 PDIR: Previous rotation direction.
0 = Rotation direction is 0 according to SPE[i]_PAT register.
1 = Rotation direction is 1 according to SPE[i]_PAT register.
Bit 22:20 NIP: New input pattern that was detected.
Note: This bit field mirrors the new input pattern. SPE internal functionality is triggered on each change of this bit field.
Bit 23 Reserved: Read as zero, should be written as zero.
Bit 31:24 FSOL: Fast Shut-Off Level for TOM[i] channel 0 to 7

| Register SPE[i]_PAT | | | | | | | | | |
|---|---|---|---|---|---|---|---|---|---|
| | Address Offset: 0X0004 | | | | | | | | Initial Value: 0x0000_0000 |
| | 31 30 29 | 28 | 27 26 25 | 24 | 23 22 21 | 20 | 19 18 17 | 16 | 15 14 13 |
| Bit | IP7_PAT | IP7_VAL | IP6_PAT | IP6_VAL | IP5_PAT | IP5_VAL | IP4_PAT | IP4_VAL | IP3_PAT |
| Mode | RW | RW | RW | RW | RW | RW | RW | RW | RW |
| Initial Value | 000 | 0 | 000 | 0 | 000 | 0 | 000 | 0 | 000 |

| | Initial Value: 0x0000_0000 | | | | | | |
|---|---|---|---|---|---|---|---|
| | 12 | 11 10 9 | 8 | 7 6 5 | 4 | 3 2 1 | 0 |
| Bit | IP3_VAL | IP2_PAT | IP2_VAL | IP1_PAT | IP1_VAL | IP0_PAT | IP0_VAL |
| Mode | RW | RW | RW | RW | RW | RW | RW |
| Initial Value | 0 | 000 | 0 | 000 | 0 | 000 | 0 |

Bit 0 IP0_VAL: Input pattern 0 is a valid pattern.
0 = Pattern invalid.
1 = Pattern valid.
Bit 3:1 IP0_PAT: Input pattern 0. Bit field defines the first input pattern of the SPE input signals.
Bit 1 defines the TIM[i]_CHx(48) input signal.
Bit 2 defines the TIM[i]_CHy(48) input signal.
Bit 3 defines the TIM[i]_CHz(48) input signal.
Bit 4 IP1_VAL: Input pattern 1 is a valid pattern. See bit 0.
Bit 7:5 IP1_PAT: Input pattern 1. See bits 3:1.
Bit 8 IP2_VAL: Input pattern 2 is a valid pattern. See bit 0.
Bit 11:9 IP2_PAT: Input pattern 2. See bits 3:1.
Bit 12 IP3_VAL: Input pattern 3 is a valid pattern. See bit 0.
Bit 15:13 IP3_PAT: Input pattern 3. See bits 3:1.
Bit 16 IP4_VAL: Input pattern 4 is a valid pattern See bit 0.
Bit 19:17 IP4_PAT: Input pattern 4. See bits 3:1.
Bit 20 IP5_VAL: Input pattern 5 is a valid pattern See bit 0.
Bit 23:21 IP5_PAT: Input pattern 5. See bits 3:1.
Bit 24 IP6_VAL: Input pattern 6 is a valid pattern See bit 0.
Bit 27:25 IP6_PAT: Input pattern 6. See bits 3:1.
Bit 28 IP7_VAL: Input pattern 7 is a valid pattern See bit 0.
Bit 31:29 IP7_PAT: Input pattern 7. See bits 3:1.
Note: Only the first block of valid input patterns defines the commutator. All input pattern following the first marked invalid input pattern are ignored.

| Register SPE[i]_OUT_PAT[x] (x: 0 . . . 7) | | | | | | | | | | | | | | | | |
|---|---|---|---|---|---|---|---|---|---|---|---|---|---|---|---|---|
| | Address Offset: 0x0008 + x*0x04 | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | | | | | | | | |
| Mode | R | | | | | | | | | | | | | | | |
| Initial Value | 0x0000 | | | | | | | | | | | | | | | |
| | Initial Value: 0x0000_0000 | | | | | | | | | | | | | | | |
| | 15 | 14 | 13 | 12 | 11 | 10 | 9 | 8 | 7 | 6 | 5 | 4 | 3 | 2 | 1 | 0 |
| Bit | SPE_OUT_PAT | | | | | | | | | | | | | | | |
| Mode | RW | | | | | | | | | | | | | | | |
| Initial Value | 0x0000 | | | | | | | | | | | | | | | |

Bit 15:0 SPE_OUT_PAT: SPE output control value for TOM_CH0 to TOM_CH7 SPE_OUT_PAT[n + 1: n] defines output select signal of TOM[i]_CH[n]
00 = set SPE_OUT(n) to TOM_CH0_SOUR
01 = set SPE_OUT(n) to TOM_CH1_SOUR
10 = set SPE_OUT(n) to '0'
11 = set SPE_OUT(n) to '1' with n = 0 . . . 7
Bit 31:16 Reserved: Read as zero, should be written as zero.
Note: Register SPE_OUT_PAT[x] defines the output selection for TOM[i]_CH0 to TOM[i]_CH7 depending on actual input pattern IP[x]_PAT with x: 0 . . . 7.

| Register SPE[i]_OUT_CTRL | |
|---|---|
| | Address Offset: 0x0028 |
| | 31 30 29 28 27 26 25 24 23 22 21 20 19 18 17 16 |
| Bit | Reserved |
| Mode | R |
| Initial Value | 0x0000 |
| | Initial Value: 0x0000_0000 |
| | 15 14 13 12 11 10 9 8 7 6 5 4 3 2 1 0 |
| Bit | SPE_OUT_CTRL |
| Mode | RW |
| Initial Value | 0x0000 |

Bit 15:0 SPE_OUT_CTRL: SPE output control value for TOM_CH0 to TOM_CH7 SPE_OUT_CTRL[n + 1:n] defines output select signal of TOM_CHn
00 = set SPE_OUT(n) to TOM_CH0_SOUR
01 = set SPE_OUT(n) to TOM_CH1_SOUR
10 = set SPE_OUT(n) to '0'
11 = set SPE_OUT(n) to '1' with n = 0 . . . 7
Bit 31:16 Reserved: Read as zero, should be written as zero.
Note: Current output control selection for SPE[i]_OUT(0 . . . 7).

| Register SPE[i]_IRQ_NOTIFY | | | | | |
|---|---|---|---|---|---|
| | Address Offset: 0x002C / Initial Value: 0x0000_0000 | | | | |
| | 31 30 29 28 27 26 25 24 23 22 21 20 19 18 17 16 15 14 13 12 11 | | | | |
| Bit | Reserved | | | | |
| Mode | R | | | | |
| Initial Value | 0x0000000 | | | | |
| | Initial Value: 0x0000_0000 | | | | |
| | 10 9 8 7 6 5 4 | 3 | 2 | 1 | 0 |
| Bit | Reserved | SPE_BIS | SPE_PERR | SPE_DCHG | SPE_NIPD |
| Mode | R | RCw | RCw | RCw | RCw |
| Initial Value | 0x0000000 | 0 | 0 | 0 | 0 |

Bit 0 SPE_NIPD: New input pattern interrupt occurred.
0 = No interrupt occurred.
1 = New input pattern detected interrupt occurred.
Note: This bit will be cleared on a CPU write access of value '1'. A read access leaves the bit unchanged.
Bit 1 SPE_DCHG: SPE_DIR bit changed on behalf of new input pattern.
See bit 0.
Bit 2 SPE_PERR: Wrong or invalid pattern detected at input. See bit 0.
Bit 3 SPE_BIS: Bouncing input signal detected. See bit 0.
Bit 31:4 Reserved: Read as zero, should be written as zero.

| Register SPE[i]_IRQ_EN | |
|---|---|
| | Address Offset: 0x0030 / Initial Value: 0x0000_0000 |
| | 31 30 29 28 27 26 25 24 23 22 21 20 19 18 17 16 15 14 13 12 11 10 9 8 7 6 |
| Bit | Reserved |
| Mode | R |
| Initial Value | 0x0000000 |

-continued

| Register SPE[i]_IRQ_EN | | | | | |
|---|---|---|---|---|---|
| | Initial Value: 0x0000_0000 | | | | |
| | 5 4 | 3 | 2 | 1 | 0 |
| Bit | | SPE_BIS_IRQ_EN | SPE_PERR_IRQ_EN | SPE_DCHG_IRQ_EN | SPE_NIPD_IRQ_EN |
| Mode | | RW | RW | RW | RW |
| Initial Value | | 0 | 0 | 0 | 0 |

Bit 0 SPE_NIPD_IRQ_EN: SPE_NIPD_IRQ interrupt enable.
0 = Disable interrupt, interrupt is not visible outside GTM-IP.
1 = Enable interrupt, interrupt is visible outside GTM-IP.
Bit 1 SPE_DCHG_IRQ_EN: SPE_DCHG_IRQ interrupt enable. See bit 0.
Bit 2 SPE_PERR_IRQ_EN: SPE_PERR_IRQ interrupt enable. See bit 0.
Bit 3 SPE_BIS_IRQ_EN: SPE_BIS_IRQ interrupt enable. See bit 0.
Bit 31:4 Reserved: Read as zero, should be written as zero.

| Register SPE[i]_IRQ_FORCINT | |
|---|---|
| Address Offset: 0x0034 | Initial Value: 0x0000_0000 |
| 31 30 29 28 27 26 25 24 23 22 21 20 19 18 17 16 | 15 14 13 12 11 10 9 8 7 6 |
| Bit | Reserved |
| Mode | R |
| Initial Value | 0x0000000 |

| | Initial Value: 0x0000_0000 | | | | |
|---|---|---|---|---|---|
| | 5 4 | 3 | 2 | 1 | 0 |
| Bit | Reserved | TRG_SPE_BIS | TRG_SPE_PERR | TRG_SPE_DCHG | TRG_SPE_NIPD |
| Mode | R | RAw | RAw | RAw | RAw |
| Initial Value | 0x0000000 | 0 | 0 | 0 | 0 |

Bit 0 TRG_SPE_NIPD: Force interrupt of SPE_NIPD.
0 = Corresponding bit in status register will not be forced.
1 = Assert corresponding field in SPE_IRQ_NOTIFY register.
Note: This bit is cleared automatically after interrupt is released
Bit 1 TRG_SPE_DCHG: Force interrupt of SPE_DCHG. See bit 0.
Bit 2 TRG_SPE_PERR: Force interrupt of SPE_PERR. See bit 0.
Bit 3 TRG_SPE_BIS: Force interrupt of SPE_BIS. See bit 0.
Bit 31:4 Reserved: Read as zero, should be written as zero.

| Register SPE[i]_IRQ_MODE | |
|---|---|
| Address Offset: 0x0038 | Initial Value: 0x0000_0000 |
| 31 30 29 28 27 26 25 24 23 22 21 20 19 18 17 16 | 15 14 13 12 11 |
| Bit | Reserved |
| Mode | R |
| Initial Value | 0x00000000 |

| | Initial Value: 0x0000_0000 | |
|---|---|---|
| | 10 9 8 7 6 5 4 3 2 | 1 0 |
| Bit | Reserved | IRQ_MODE |
| Mode | R | RW |

-continued

| Register SPE[i]_IRQ_MODE | | |
|---|---|---|
| Initial Value | 0x00000000 | 00 |

Bit 1:0 IRQ_MODE: IRQ mode selection
00 = Level mode
01 = Pulse mode
10 = Pulse-Notify mode
11 = Single-Pulse mode
Note: The interrupt modes are described in section 0.
Bit 31:2 Reserved
Note: Read as zero, should be written as zero Output Compare Unit (CMP)

Overview

The Output Compare Unit (CMP) is designed for the use in safety relevant applications. The main idea is to have the possibility to duplicate outputs in order to be compared in this unit. Because of the simple EXOR function used it is necessary to ensure the total cycle accurate output behaviour of the output modules to be compared. This is given when two ATOM units produce output signals at the same time stamp or when two TOMs have the same configuration and start their output generation at the same time. This is possible by means of the trigger mechanisms TRIG_x provided by the TOMs as shown in the chapter 0 (TOM Block Diagram). It is not necessary to compare each output channel with each other.

The CMP enables the comparison of 2×24 channels of the TOM and ATOM units respectively and is restricted to neighbour channels. Thus, channel 0 is compared with channel 1, channel 2 with 3 and so on until the comparison of channel 22 with channel 23.

Selection of the First 24 TOM and ATOM Outputs for Comparison

Figure 58:
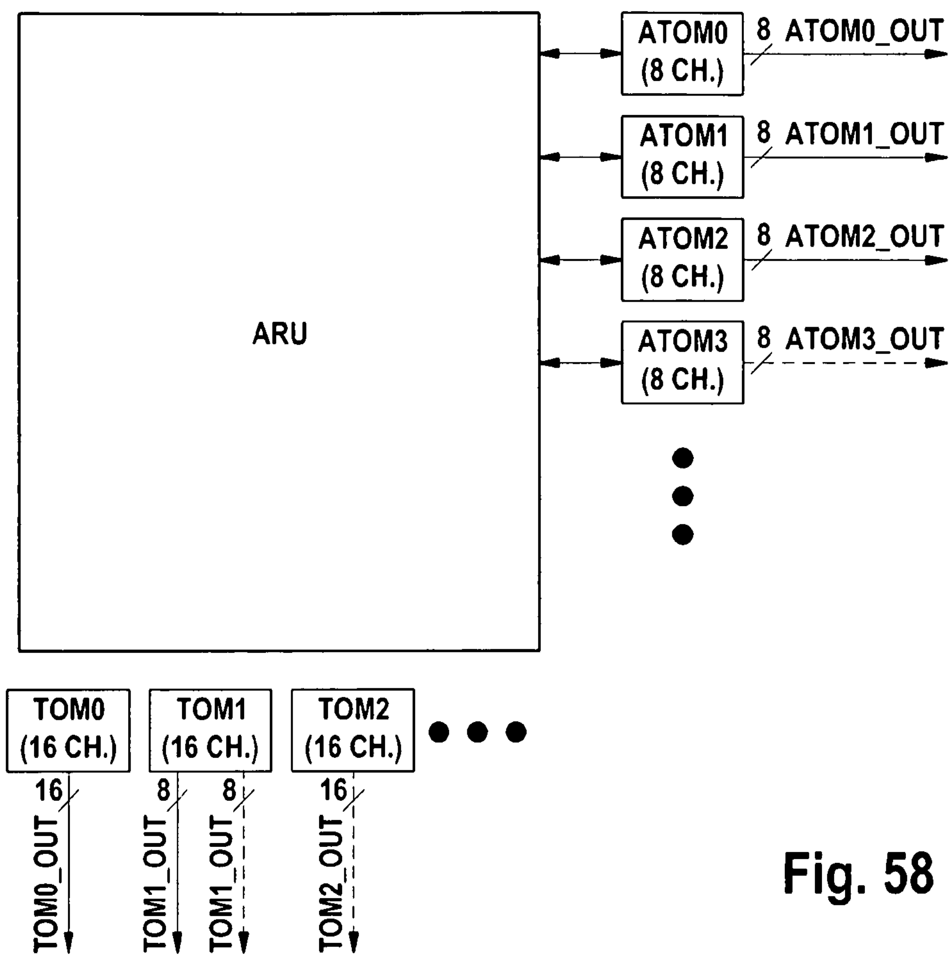

See FIG. 58.

Architecture of the Compare Unit

Figure 59:
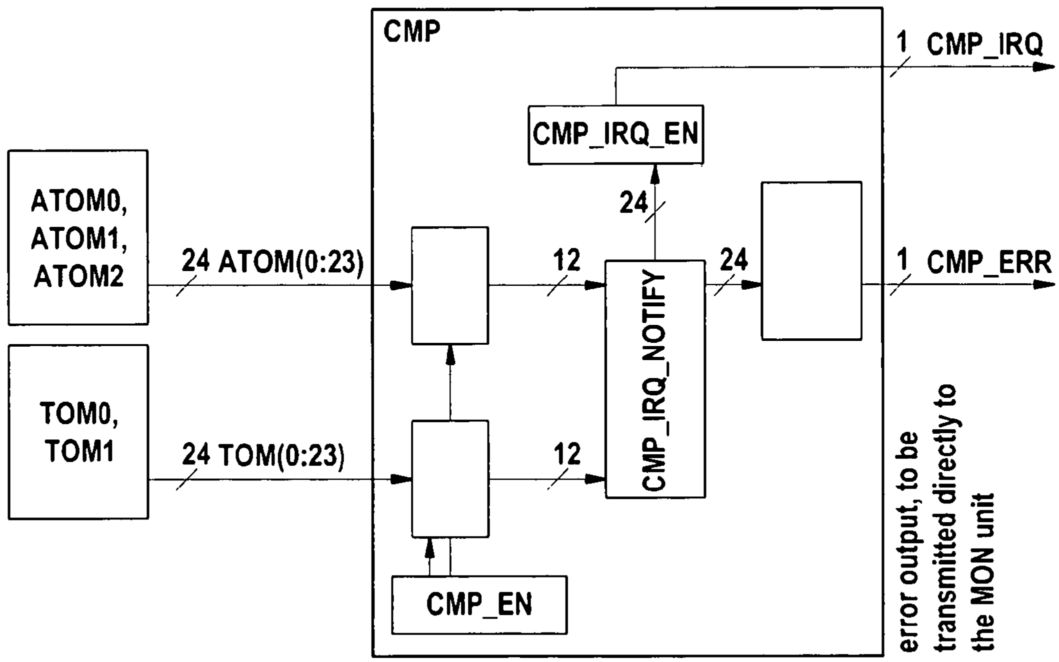

See FIG. 59.

Bitwise Compare Unit (BWC)

The Bitwise Compare Unit compares in pairs the combinations shown in following table

| TBWC/ABWC Comparator Number | Compare TOM/ATOM Bit Number one | Compare TOM/ATOM Bit Number Two | Output Number |
|---|---|---|---|
| 0 | 0 | 1 | 0 |
| 1 | 2 | 3 | 1 |
| 2 | 4 | 5 | 2 |
| 3 | 6 | 7 | 3 |
| 4 | 8 | 9 | 4 |
| 5 | 10 | 11 | 5 |
| 6 | 12 | 13 | 6 |
| 7 | 14 | 15 | 7 |
| 8 | 16 | 17 | 8 |
| 9 | 18 | 19 | 9 |
| 10 | 20 | 20 | 10 |
| 11 | 22 | 23 | 11 |

Configuration of the Compare Unit

Because of the restrictions described in the section above the Compare Unit consists of 24 antivalence (EXOR) elements, a select register CMP_EN which selects the corresponding comparisons and a status register CMP_IRQ_NOTIFY which shows and stores each mismatching result, when selected.

For each mismatching error an interrupt is generated, which can result in an undelayed reaction of the CPU.

An additional interrupt enable register prevents the interrupt generation for test purposes.

Error Generator

The error generator generates an error signal to be transmitted directly to the MON unit and independently from the CMP_IRQ. The error is set when in the status register at least one bit is set.

The CMP_ERR output reflects its status in the main status register of the Monitor Unit, which is to be polled by the CPU.

CMP Interrupt Signals

The CMP sub module has two interrupt signals. The source of both interrupts can be determined by reading the CMP_IRQ_NOTIFY status register for CMP_ERR interrupt line and under consideration of CMP_IRQ_EN register for CMP_IRQ interrupt line. Each source can be forced separately for debug purposes using the interrupt force CMP_IRQ_FORCINT register.

| Signal | Description |
|---|---|
| CMP_IRQ | Mismatching interrupt of outputs to be compared |
| CMP_ERR | Not maskable mismatching interrupt of outputs to be compared |

CMP Configuration Registers Overview

CMP contains following configuration registers:

| Register Name | Description | Details in Section |
|---|---|---|
| CMP_EN | Comparator enable register | 0 |
| CMP_IRQ_NOTIFY | Event notification register | 0 |
| CMP_IRQ_EN | Interrupt enable register | 0 |
| CMP_IRQ_FORCINT | Interrupt force register | 0 |
| CMP_IRQ_MODE | IRQ mode configuration register | 0 |

CMP Configuration Registers Description

| Register CMP_EN | | | | | | |
|---|---|---|---|---|---|---|
| | Address Offset: 0x00 | | | | | |
| | 31 30 29 28 27 26 25 24 | 23 | 22 | 21 | 20 | 19 |
| Bit | Reserved | TBWC11_EN | TBWC10_EN | TBWC9_EN | TBWC8_EN | TBWC7_EN |
| Mode | | R | RW | RW | RW | RW |
| Initial Value | 0x00 | 0 | 0 | 0 | 0 | 0 |

| | Address Offset: 0x00 | | | Initial Value: 0x0000_0000 | | | |
|---|---|---|---|---|---|---|---|
| | 18 | 17 | 16 | 15 | 14 | 13 | 12 |
| Bit | TBWC6_EN | TBWC5_EN | TBWC4_EN | TBWC3_EN | TBWC2_EN | TBWC1_EN | TBWC0_EN |
| Mode | RW | RW | RW | RW | RW | RW | RW |
| Initial Value | 0 | 0 | 0 | 0 | 0 | 0 | 0 |

| | Initial Value: 0x0000_0000 | | | | | |
|---|---|---|---|---|---|---|
| | 11 | 10 | 9 | 8 | 7 | 6 |
| Bit | ABWC11_EN | ABWC10_EN | ABWC9_EN | ABWC8_EN | ABWC7_EN | ABWC6_EN |
| Mode | RW | RW | RW | RW | RW | RW |
| Initial Value | 0 | 0 | 0 | 0 | 0 | 0 |

| | Initial Value: 0x0000_0000 | | | | | |
|---|---|---|---|---|---|---|
| | 5 | 4 | 3 | 2 | 1 | 0 |
| Bit | ABWC5_EN | ABWC4_EN | ABWC3_EN | ABWC2_EN | ABWC1_EN | ABWC0_EN |
| Mode | RW | RW | RW | RW | RW | RW |
| Initial Value | 0 | 0 | 0 | 0 | 0 | 0 |

Bit 0 ABWC0_EN: Enable comparator 0 in ABWC for ATOM0, ATOM1 and ATOM2 sub modules outputs 0 = ABWC Comparator 0 is disabled 1 = ABWC Comparator 0 is enabled Bit 1 ABWC1_EN: Enable comparator 1 in ABWC for ATOM0, ATOM1 and ATOM2 sub modules outputs. See bit 0.

Bit 2 ABWC2_EN: Enable comparator 2 in ABWC for ATOM0, ATOM1 and ATOM2 sub modules outputs. See bit 0.

Bit 3 ABWC3_EN: Enable comparator 3 in ABWC for ATOM0, ATOM1 and ATOM2 sub modules outputs. See bit 0.

Bit 4 ABWC4_EN: Enable comparator 4 in ABWC for ATOM0, ATOM1 and ATOM2 sub modules outputs. See bit 0.

Bit 5 ABWC5_EN: Enable comparator 5 in ABWC for ATOM0, ATOM1 and ATOM2 sub modules outputs. See bit 0.

Bit 6 ABWC6_EN: Enable comparator 6 in ABWC for ATOM0, ATOM1 and ATOM2 sub modules outputs. See bit 0.

Bit 7 ABWC7_EN: Enable comparator 7 in ABWC for ATOM0, ATOM1 and ATOM2 sub modules outputs. See bit 0.

Bit 8 ABWC8_EN: Enable comparator 8 in ABWC for ATOM0, ATOM1 and ATOM2 sub modules outputs. See bit 0.

Bit 9 ABWC9_EN: Enable comparator 9 in ABWC for ATOM0, ATOM1 and ATOM2 sub modules outputs. See bit 0.

Bit 10 ABWC10_EN: Enable comparator 10 in ABWC for ATOM0, ATOM1 and ATOM2 sub modules outputs. See bit 0.

Bit 11 ABWC11_EN: Enable comparator 11 in ABWC for ATOM0, ATOM1 and ATOM2 sub modules outputs. See bit 0.

Bit 12 TBWC0_EN: Enable comparator 0 in TBWC for TOM0 and TOM1 sub modules outputs 0 = TBWC comparator 0 is enabled 1 = TBWC comparator 0 is disabled Bit 13 TBWC1_EN: Enable comparator 1 in TBWC for TOM0 and TOM1 sub modules outputs. See bit 12.

Bit 14 TBWC2_EN: Enable comparator 2 in TBWC for TOM0 and TOM1 sub modules outputs. See bit 12.

Bit 15 TBWC3_EN: Enable comparator 3 in TBWC for TOM0 and TOM1 sub modules outputs. See bit 12.

Bit 16 TBWC4_EN: Enable comparator 4 in TBWC for TOM0 and TOM1 sub modules outputs. See bit 12.

Bit 17 TBWC5_EN: Enable comparator 5 in TBWC for TOM0 and TOM1 sub modules outputs. See bit 12.

Bit 18 TBWC6_EN: Enable comparator 6 in TBWC for TOM0 and TOM1 sub modules outputs. See bit 12.

Bit 19 TBWC7_EN: Enable comparator 7 in TBWC for TOM0 and TOM1 sub modules outputs. See bit 12.

Bit 20 TBWC8_EN: Enable comparator 8 in TBWC for TOM0 and TOM1 sub modules outputs. See bit 12.

Bit 21 TBWC9_EN: Enable comparator 9 in TBWC for TOM0 and TOM1 sub modules outputs. See bit 12.

Bit 22 TBWC10_EN: Enable comparator 10 in TBWC for TOM0 and TOM1 sub modules outputs. See bit 12.

Bit 23 TBWC11_EN: Enable comparator 11 in TBWC for TOM0 and TOM1 sub modules outputs. See bit 12.

Bit 31:24 Reserved: Reserved

Note: Read as zero, should be written as zero

| Register CMP_IRQ_NOTIFY | | | | | | | | | | | | | | | | | |
|---|---|---|---|---|---|---|---|---|---|---|---|---|---|---|---|---|---|
| | Address Offset: 0x04 | | | | | | | | | | | | | | | | |
| | 31 | 30 | 29 | 28 | 27 | 26 | 25 | 24 | 23 | 22 | 21 | 20 | 19 | 18 | 17 | 16 |
| Bit | Reserved | | | | | | | | TBWC11 | TBWC10 | TBWC9 | TBWC8 | TBWC7 | TBWC6 | TBWC5 | TBWC4 |
| Mode | R | | | | | | | | RCw | RCw | RCw | RCw | RCw | RCw | RCw | RCw |
| Initial Value | 0x00 | | | | | | | | 0 | 0 | 0 | 0 | 0 | 0 | 0 | 0 |

| | Initial Value: 0x0000_0000 | | | | | | | | | |
|---|---|---|---|---|---|---|---|---|---|---|
| | 15 | 14 | 13 | 12 | 11 | 10 | 9 | 8 | 7 | 6 |
| Bit | TBWC3 | TBWC2 | TBWC1 | TBWC0 | ABWC11 | ABWC10 | ABWC9 | ABWC8 | ABWC7 | ABWC6 |
| Mode | RCw | RCw | RCw | RCw | RCw | RCw | RCw | RCw | RCw | RCw |
| Initial Value | 0 | 0 | 0 | 0 | 0 | 0 | 0 | 0 | 0 | 0 |

| | Initial Value: 0x0000_0000 | | | | | |
|---|---|---|---|---|---|---|
| | 5 | 4 | 3 | 2 | 1 | 0 |
| Bit | ABWC5 | ABWC4 | ABWC3 | ABWC2 | ABWC1 | ABWC0 |
| Mode | RCw | RCw | RCw | RCw | RCw | RCw |
| Initial Value | 0 | 0 | 0 | 0 | 0 | 0 |

Bit 0 ABWC0: ATOM sub modules outputs bitwise comparator 0 error indication
0 = no error recognized on ATOM sub modules bits 0 and 1 (see chapter 0)
1 = an error was recognized on corresponding ATOM sub modules bits
Note: This bit will be cleared on a CPU write access of value '1'. A read access leaves the bit unchanged.
Bit 1 ABWC1: ATOM sub modules outputs bitwise comparator 1 error indication. See bit 0.
Bit 2 ABWC2: ATOM sub modules outputs bitwise comparator 2 error indication. See bit 0.
Bit 3 ABWC3: ATOM sub modules outputs bitwise comparator 3 error indication. See bit 0.
Bit 4 ABWC4: ATOM sub modules outputs bitwise comparator 4 error indication. See bit 0.
Bit 5 ABWC5: ATOM sub modules outputs bitwise comparator 5 error indication. See bit 0.
Bit 6 ABWC6: ATOM sub modules outputs bitwise comparator 6 error indication. See bit 0.
Bit 7 ABWC7: ATOM sub modules outputs bitwise comparator 7 error indication. See bit 0.
Bit 8 ABWC8: ATOM sub modules outputs bitwise comparator 8 error indication. See bit 0.
Bit 9 ABWC9: ATOM sub modules outputs bitwise comparator 9 error indication. See bit 0.
Bit 10 ABWC10: ATOM sub modules outputs bitwise comparator 10 error indication. See bit 0.
Bit 11 ABWC11: ATOM sub modules outputs bitwise comparator 11 error indication. See bit 0.
Bit 12 TBWC0: TOM sub modules outputs bitwise comparator 0 error indication
0 = no error recognized on TOM sub modules bits 0 and 1 (see chapter 0)
1 = an error was recognized on corresponding TOM sub modules bits
Note: This bit will be cleared on a CPU write access of value '1'. A read access leaves the bit unchanged.
Bit 13 TBWC1: TOM sub modules outputs bitwise comparator 1 error indication. See bit 12.
Bit 14 TBWC2: TOM sub modules outputs bitwise comparator 2 error indication. See bit 12.
Bit 15 TBWC3: TOM sub modules outputs bitwise comparator 3 error indication. See bit 12.
Bit 16 TBWC4: TOM sub modules outputs bitwise comparator 4 error indication. See bit 12.
Bit 17 TBWC5: TOM sub modules outputs bitwise comparator 5 error indication. See bit 12.
Bit 18 TBWC6: TOM sub modules outputs bitwise comparator 6 error indication. See bit 12.
Bit 19 TBWC7: TOM sub modules outputs bitwise comparator 7 error indication. See bit 12.
Bit 20 TBWC8: TOM sub modules outputs bitwise comparator 8 error indication. See bit 12.
Bit 21 TBWC9: TOM sub modules outputs bitwise comparator 9 error indication. See bit 12.
Bit 22 TBWC10: TOM sub modules outputs bitwise comparator 10 error indication. See bit 12.
Bit 23 TBWC11: TOM sub modules outputs bitwise comparator 11 error indication. See bit 12.
Bit 31:24 Reserved: reserved
Note: Read as zero, should be written as zero

| Register CMP_IRQ_EN | | | | | | | | | | | | |
|---|---|---|---|---|---|---|---|---|---|---|---|---|
| | Address Offset: 0x08 | | | | | | | | | | | |
| | 31 | 30 | 29 | 28 | 27 | 26 | 25 | 24 | 23 | 22 | 21 | 20 |
| Bit | Reserved | | | | | | | | TBWC11_EN_IRQ | TBWC10_EN_IRQ | TBWC9_EN_IRQ | TBWC8_EN_IRQ |
| Mode | | | | | | | | | RW | RW | RW | RW |
| Initial Value | 0x00 | | | | | | | | 0 | 0 | 0 | 0 |

-continued

| Register CMP_IRQ_EN | | | | | |
|---|---|---|---|---|---|
| | Address Offset: 0x08 | | | | Initial Value: 0x0000_0000 |
| | 19 | 18 | 17 | 16 | 15 |
| Bit | TBWC7_EN_IRQ | TBWC6_EN_IRQ | TBWC5_EN_IRQ | TBWC4_EN_IRQ | TBWC3_EN_IRQ |
| Mode | RW | RW | RW | RW | RW |
| Initial Value | 0 | 0 | 0 | 0 | 0 |
| | Initial Value: 0x0000_0000 | | | | |
| | 14 | 13 | 12 | 11 | 10 |
| Bit | TBWC2_EN_IRQ | TBWC1_EN_IRQ | TBWC0_EN_IRQ | ABWC11_EN_IRQ | ABWC10_EN_IRQ |
| Mode | RW | RW | RW | RW | RW |
| Initial Value | 0 | 0 | 0 | 0 | 0 |
| | Initial Value: 0x0000_0000 | | | | |
| | 9 | 8 | 7 | 6 | 5 |
| Bit | ABWC9_EN_IRQ | ABWC8_EN_IRQ | ABWC7_EN_IRQ | ABWC6_EN_IRQ | ABWC5_EN_IRQ |
| Mode | RW | RW | RW | RW | RW |
| Initial Value | 0 | 0 | 0 | 0 | 0 |
| | Initial Value: 0x0000_0000 | | | | |
| | 4 | 3 | 2 | 1 | 0 |
| Bit | ABWC4_EN_IRQ | ABWC3_EN_IRQ | ABWC2_EN_IRQ | ABWC1_EN_IRQ | ABWC0_EN_IRQ |
| Mode | RW | RW | RW | RW | RW |
| Initial Value | 0 | 0 | 0 | 0 | 0 |

Bit 0 ABWC0_EN_IRQ: enable ABWC0 interrupt source for CMP_IRQ line

0 = interrupt source ABWC0 is disabled

1 = interrupt source ABWC0 is enabled

Bit 1 ABWC1_EN_IRQ: enable ABWC1 interrupt source for CMP_IRQ line. See bit 0.

Bit 2 ABWC2_EN_IRQ: enable ABWC2 interrupt source for CMP_IRQ line. See bit 0.

Bit 3 ABWC3_EN_IRQ: enable ABWC3 interrupt source for CMP_IRQ line. See bit 0.

Bit 4 ABWC4_EN_IRQ: enable ABWC4 interrupt source for CMP_IRQ line. See bit 0.

Bit 5 ABWC5_EN_IRQ: enable ABWC5 interrupt source for CMP_IRQ line. See bit 0.

Bit 6 ABWC6_EN_IRQ: enable ABWC6 interrupt source for CMP_IRQ line. See bit 0.

Bit 7 ABWC7_EN_IRQ: enable ABWC7 interrupt source for CMP_IRQ line. See bit 0.

Bit 8 ABWC8_EN_IRQ: enable ABWC8 interrupt source for CMP_IRQ line. See bit 0.

Bit 9 ABWC9_EN_IRQ: enable ABWC9 interrupt source for CMP_IRQ line. See bit 0.

Bit 10 ABWC10_EN_IRQ: enable ABWC10 interrupt source for CMP_IRQ line. See bit 0.

Bit 11 ABWC11_EN_IRQ: enable ABWC11 interrupt source for CMP_IRQ line. See bit 0.

Bit 12 TBWC0_EN_IRQ: enable TBWC0 interrupt source for CMP_IRQ line

0 = interrupt source TBWC0 is disabled

1 = interrupt source TBWC0 is enabled

Bit 13 TBWC1_EN_IRQ: enable TBWC1 interrupt source for CMP_IRQ line. See bit 12.

Bit 14 TBWC2_EN_IRQ: enable TBWC2 interrupt source for CMP_IRQ line. See bit 12.

Bit 15 TBWC3_EN_IRQ: enable TBWC3 interrupt source for CMP_IRQ line. See bit 12.

Bit 16 TBWC4_EN_IRQ: enable TBWC4 interrupt source for CMP_IRQ line. See bit 12.

Bit 17 TBWC5_EN_IRQ: enable TBWC5 interrupt source for CMP_IRQ line. See bit 12.

Bit 18 TBWC6_EN_IRQ: enable TBWC6 interrupt source for CMP_IRQ line. See bit 12.

Bit 19 TBWC7_EN_IRQ: enable TBWC7 interrupt source for CMP_IRQ line. See bit 12.

Bit 20 TBWC8_EN_IRQ: enable TBWC8 interrupt source for CMP_IRQ line. See bit 12.

Bit 21 TBWC9_EN_IRQ: enable TBWC9 interrupt source for CMP_IRQ line. See bit 12.

Bit 22 TBWC10_EN_IRQ: enable TBWC10 interrupt source for CMP_IRQ line. See bit 12.

Bit 23 TBWC11_EN_IRQ: enable TBWC11 interrupt source for CMP_IRQ line. See bit 12.

Bit 31:24 Reserved: reserved

Note: Read as zero, should be written as zero

Register CMP_IRQ_FORCINT

| | Address Offset: 0x0C | | | | |
|---|---|---|---|---|---|
| | 31 30 29 28 27 26 25 24 | 23 | 22 | 21 | 20 |
| Bit | Reserved | TRG_TBWC11 | TRG_TBWC10 | TRG_TBWC9 | TRG_TBWC8 |
| Mode | R | RAw | RAw | RAw | RAw |
| Initial Value | 0x00 | 0 | 0 | 0 | 0 |

| | Address Offset: 0x0C | | | | Initial Value: 0x0000_0000 |
|---|---|---|---|---|---|
| | 19 | 18 | 17 | 16 | 15 |
| Bit | TRG_TBWC7 | TRG_TBWC6 | TRG_TBWC5 | TRG_TBWC4 | TRG_TBWC3 |
| Mode | RAw | RAw | RAw | RAw | RAw |
| Initial Value | 0 | 0 | 0 | 0 | 0 |

| | Initial Value: 0x0000_0000 | | | | |
|---|---|---|---|---|---|
| | 14 | 13 | 12 | 11 | 10 |
| Bit | TRG_TBWC2 | TRG_TBWC1 | TRG_TBWC0 | TRG_ABWC11 | TRG_ABWC10 |
| Mode | RAw | RAw | RAw | RAw | RAw |
| Initial Value | 0 | 0 | 0 | 0 | 0 |

| | Initial Value: 0x0000_0000 | | | | |
|---|---|---|---|---|---|
| | 9 | 8 | 7 | 6 | 5 |
| Bit | TRG_ABWC9 | TRG_ABWC8 | TRG_ABWC7 | TRG_ABWC6 | TRG_ABWC5 |
| Mode | RAw | RAw | RAw | RAw | RAw |
| Initial Value | 0 | 0 | 0 | 0 | 0 |

| | Initial Value: 0x0000_0000 | | | | |
|---|---|---|---|---|---|
| | 4 | 3 | 2 | 1 | 0 |
| Bit | TRG_ABWC4 | TRG_ABWC3 | TRG_ABWC2 | TRG_ABWC1 | TRG_ABWC0 |
| Mode | RAw | RAw | RAw | RAw | RAw |
| Initial Value | 0 | 0 | 0 | 0 | 0 |

Bit 0 TRG_ABWC0: Trigger ABWC0 bit in CMP_IRQ_NOTIFY register by software
0 = No event triggering
1 = Assert corresponding field in CMP_IRQ_NOTIFY register
Note: This bit is cleared automatically after write.
Bit 1 TRG_ABWC1: Trigger ABWC1 bit in CMP_IRQ_NOTIFY register by software. See bit 0.
Bit 2 TRG_ABWC2: Trigger ABWC2 bit in CMP_IRQ_NOTIFY register by software. See bit 0.
Bit 3 TRG_ABWC3: Trigger ABWC3 bit in CMP_IRQ_NOTIFY register by software. See bit 0.
Bit 4 TRG_ABWC4: Trigger ABWC4 bit in CMP_IRQ_NOTIFY register by software. See bit 0.
Bit 5 TRG_ABWC5: Trigger ABWC5 bit in CMP_IRQ_NOTIFY register by software. See bit 0.
Bit 6 TRG_ABWC6: Trigger ABWC6 bit in CMP_IRQ_NOTIFY register by software. See bit 0.
Bit 7 TRG_ABWC7: Trigger ABWC7 bit in CMP_IRQ_NOTIFY register by software. See bit 0.
Bit 8 TRG_ABWC8: Trigger ABWC8 bit in CMP_IRQ_NOTIFY register by software. See bit 0.
Bit 9 TRG_ABWC9: Trigger ABWC9 bit in CMP_IRQ_NOTIFY register by software. See bit 0.
Bit 10 TRG_ABWC10: Trigger ABWC10 bit in CMP_IRQ_NOTIFY register by software. See bit 0.
Bit 11 TRG_ABWC11: Trigger ABWC11 bit in CMP_IRQ_NOTIFY register by software. See bit 0.
Bit 12 TRG_TBWC0: Trigger TBWC0 bit in CMP_IRQ_NOTIFY register by software
0 = No event triggering
1 = Assert corresponding field in CMP_IRQ_NOTIFY register
Note: This bit is cleared automatically after write.
Bit 13 TRG_TBWC1: Trigger TBWC1 bit in CMP_IRQ_NOTIFY register by software. See bit 12.
Bit 14 TRG_TBWC2: Trigger TBWC2 bit in CMP_IRQ_NOTIFY register by software. See bit 12.
Bit 15 TRG_TBWC3: Trigger TBWC3 bit in CMP_IRQ_NOTIFY register by software. See bit 12.
Bit 16 TRG_TBWC4: Trigger TBWC4 bit in CMP_IRQ_NOTIFY register by software. See bit 12.
Bit 17 TRG_TBWC5: Trigger TBWC5 bit in CMP_IRQ_NOTIFY register by software. See bit 12.
Bit 18 TRG_TBWC6: Trigger TBWC6 bit in CMP_IRQ_NOTIFY register by software. See bit 12.
Bit 19 TRG_TBWC7: Trigger TBWC7 bit in CMP_IRQ_NOTIFY register by software. See bit 12.
Bit 20 TRG_TBWC8: Trigger TBWC8 bit in CMP_IRQ_NOTIFY register by software. See bit 12.
Bit 21 TRG_TBWC9: Trigger TBWC9 bit in CMP_IRQ_NOTIFY register by software. See bit 12.
Bit 22 TRG_TBWC10: Trigger TBWC10 bit in CMP_IRQ_NOTIFY register by software. See bit 12.
Bit 23 TRG_TBWC11: Trigger TBWC11 bit in CMP_IRQ_NOTIFY register by software. See bit 12.
Bit 31:24 Reserved: reserved
Note: Read as zero, should be written as zero

| Register CMP_IRQ_MODE | | | | | | | | | | | | | | | | | | | | | | |
|---|---|---|---|---|---|---|---|---|---|---|---|---|---|---|---|---|---|---|---|---|---|---|
| | Address Offset: 0x10 | | | | | | | | | | | | | | | | | Initial Value: 0x0000_0000 | | | | |
| | 31 | 30 | 29 | 28 | 27 | 26 | 25 | 24 | 23 | 22 | 21 | 20 | 19 | 18 | 17 | 16 | 15 | 14 | 13 | 12 | 11 | |
| Bit | Reserved | | | | | | | | | | | | | | | | | | | | | |
| Mode | R | | | | | | | | | | | | | | | | | | | | | |
| Initial Value | 0x00000000 | | | | | | | | | | | | | | | | | | | | | |

| | Initial Value: 0x0000_0000 | | | | | | | | | | |
|---|---|---|---|---|---|---|---|---|---|---|---|
| | 10 | 9 | 8 | 7 | 6 | 5 | 4 | 3 | 2 | 1 | 0 |
| Bit | Reserved | | | | | | | | | IRQ_MODE | |
| Mode | R | | | | | | | | | RW | |
| Initial Value | 0x00000000 | | | | | | | | | 00 | |

Bit 1:0 IRQ_MODE: IRQ mode selection
00 = Level mode
01 = Pulse mode
10 = Pulse-Notify mode
11 = Single-Pulse mode
Note: The interrupt modes are described in section 0.
Bit 31:2 Reserved: reserved
Note: Read as zero, should be written as zero

Monitor Unit (MON)

Overview

The Monitor Unit (MON) is designed for the use in safety relevant applications. The main idea is to have a possibility to supervise common used circuitry and resources. In this way the activity of the clocks as well as the basic activity of the ARU is supervised.

Clock and Time Base Monitoring

The monitor unit has a connection to each of the 8 clocks CMU_CLK0, . . . CMU_CLK7, provided by the CMU. Some of these clocks can be used for special tasks (see chapter 0).

In addition the 5 clock inputs of the TOMs CMU_FXCLK (4:0) are also connected to the MON unit.

The supervising of the clocks is done by scanning for activity of each clock.

When a valid slope at the clock is detected, the corresponding bit in the status register MON_STATUS is set.

As valid slope a high-low slope is defined. Reading this status register resets all its bits to zero.

When the register is polled by the CPU and the time between two read accesses is higher than the period of the slowest clock, all bits of the corresponding clocks must be set.

When polling in shorter time distances, not for all clocks an activity can be shown, although they are still working.

In addition by the use of a select register only the selected bits are to be considered.

ARU Monitoring

Because the ARU is a common used module for routing the data the operation out of control can have an essential impact on more than one connected module. Therefore, it is important to have information about the basic activity of the ARU.

Each of the ARUs used sends a high level signal, when the first destination address is selected. This is performed by the ARUx_zero signal, when the ARU select counter has a zero value.

Detecting a high-low slope at this signal in the activity checker circuit sets the corresponding status bit ACT_ARUx. This is a simple possibility to check, if the corresponding ARU is working or not.

In order to check the correct cycle time of the ARU some features of the MCS sub module can be used as described in the following chapter.

Checking ARU Cycle Time and Expected Signal Durations

The cycle time of the ARU can be checked, when this is essential for safety purposes. This check can be performed by a MCS channel.

The resulting error is reported to the MON unit using the MCS_ERRx signal in addition to an interrupt, generated in MCS.

The corresponding MCS is programmed to get a fixed data value at address 0x1FF. The data value is always zero and is not blocked. When getting the access the time stamp value TBU_TS0 is stored in a register. The next time getting the access the new TBU_TS0 value is stored and the difference between both values is compared with a given value. When the comparison fails, an error flag is set in the status register, an interrupt is generated and the error signal MCS_ERR is provided.

In a similar way the duration of a signal can be checked.

The signal to be checked can be an output signal of the GTM or an arbitrary other signal.

The signal values can be checked involving given tolerances.

When the check fails, an error flag is set in the status register, an interrupt is generated and the error signal MCS_ERR is provided for the MON unit.

Figure 60:
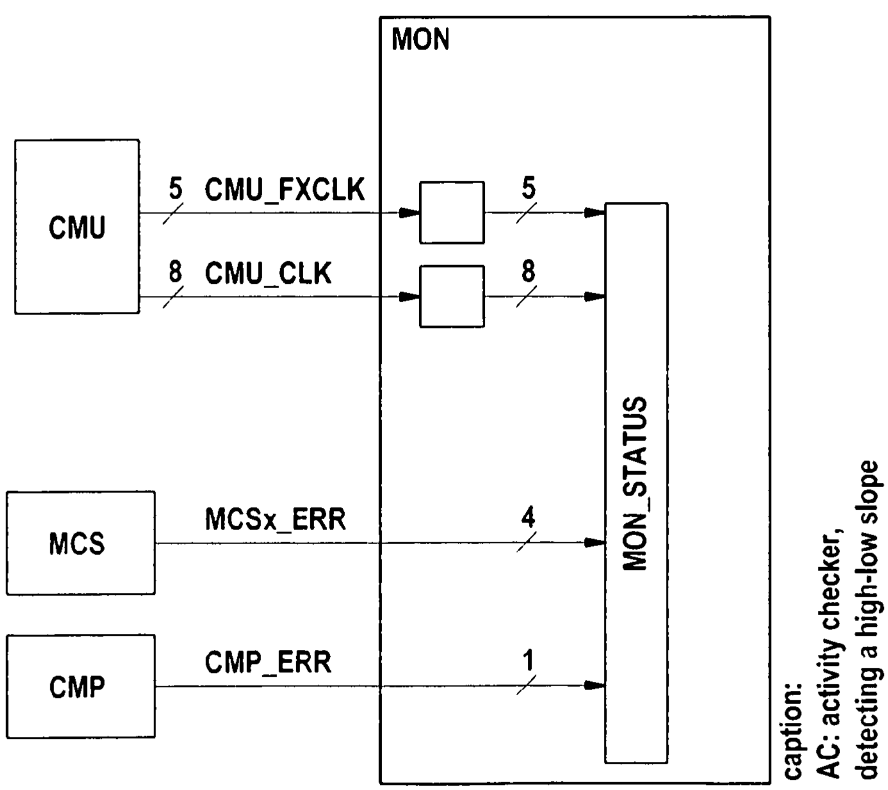

FIG. 60 shows the block diagram of the Monitor Unit.

MON Block Diagram

See FIG. 60.

MON Interrupt Signals

The MON sub module has no interrupt signals.

MON Configuration Registers Overview

Following configuration registers are considered in MON sub module

| Register Name | Description | Details in Section |
|---|---|---|
| MON_STATUS | Monitor Status register | 0 |

MON Configuration Registers Description

| Register MON_STATUS | | | | | | |
|---|---|---|---|---|---|---|
| | Address Offset: 0x00 | | | | | |
| | 31 30 29 28 27 26 25 24 | 23 | 22 | 21 | 20 | 19 |
| Bit | Reserved | MCS_ERR3 | MCS_ERR2 | MCS_ERR1 | MCS_ERR0 | Reserved |
| Mode | R | RCw | RCw | RCw | RCw | R |
| Initial Value | 0x00 | 0 | 0 | 0 | 0 | 0X00 |

| | Address Offset: 0x00 | | Initial Value: 0x0000_0000 | | | |
|---|---|---|---|---|---|---|
| | 18 17 | 16 | 15 14 13 | 12 | 11 | 10 |
| Bit | Reserved | CMP_ERR | Reserved | ACT_CMUFX4 | ACT_CMUFX3 | ACT_CMUFX2 |
| Mode | R | RCw | R | RCw | RCw | RCw |
| Initial Value | 0x00 | 0 | 0x00 | 0 | 0 | 0 |

| | Initial Value: 0x0000_0000 | | | | |
|---|---|---|---|---|---|
| | 9 | 8 | 7 | 6 | 5 |
| Bit | ACT_CMUFX1 | ACT_CMUFX0 | ACT_CMU7 | ACT_CMU6 | ACT_CMU5 |
| Mode | RCw | RCw | RCw | RCw | RCw |
| Initial Value | 0 | 0 | 0 | 0 | 0 |

| | Initial Value: 0x0000_0000 | | | | |
|---|---|---|---|---|---|
| | 4 | 3 | 2 | 1 | 0 |
| Bit | ACT_CMU4 | ACT_CMU3 | ACT_CMU2 | ACT_CMU1 | ACT_CMU0 |
| Mode | RCw | RCw | RCw | RCw | RCw |
| Initial Value | 0 | 0 | 0 | 0 | 0 |

Bit 0 ACT_CMU0: CMU_CLK0 activity
Note: This bit will be cleared on a CPU write access of value '1'. A read access leaves the bit unchanged.
Bit 1 ACT_CMU1: CMU_CLK1 activity
Note: This bit will be cleared on a CPU write access of value '1'. A read access leaves the bit unchanged.
Bit 2 ACT_CMU2: CMU_CLK2 activity
Note: This bit will be cleared on a CPU write access of value '1'. A read access leaves the bit unchanged.
Bit 3 ACT_CMU3: CMU_CLK3 activity
Note: This bit will be cleared on a CPU write access of value '1'. A read access leaves the bit unchanged.
Bit 4 ACT_CMU4: CMU_CLK4 activity
Note: This bit will be cleared on a CPU write access of value '1'. A read access leaves the bit unchanged.
Bit 5 ACT_CMU5: CMU_CLK5 activity
Note: This bit will be cleared on a CPU write access of value '1'. A read access leaves the bit unchanged.
Bit 6 ACT_CMU6: CMU_CLK6 activity
Note: This bit will be cleared on a CPU write access of value '1'. A read access leaves the bit unchanged.
Bit 7 ACT_CMU7: CMU_CLK7 activity
Note: This bit will be cleared on a CPU write access of value '1'. A read access leaves the bit unchanged.
Bit 8 ACT_CMUFX0: CMU_CLKFX0 activity
Note: This bit will be cleared on a CPU write access of value '1'. A read access leaves the bit unchanged.
Bit 9 ACT_CMUFX1: CMU_CLKFX1 activity
Note: This bit will be cleared on a CPU write access of value '1'. A read access leaves the bit unchanged.
Bit 10 ACT_CMUFX2: CMU_CLKFX2 activity
Note: This bit will be cleared on a CPU write access of value '1'. A read access leaves the bit unchanged.
Bit 11 ACT_CMUFX3: CMU_CLKFX3 activity
Note: This bit will be cleared on a CPU write access of value '1'. A read access leaves the bit unchanged.
Bit 12 ACT_CMUFX4: CMU_CLKFX4 activity
Note: This bit will be cleared on a CPU write access of value '1'. A read access leaves the bit unchanged.
Note: Bits 0 to 12 are set, when a high low slope is detected at the considered clock
Bit 15:13 Reserved: Reserved bits
Note: Read as zero should be written as zero
Bit 16 CMP_ERR: Error detected at CMP
Note: This bit will be cleared on a CPU write access of value '1'. A read access leaves the bit unchanged.
Bit 19:17 Reserved: Reserved bits
Note: Read as zero should be written as zero
Bit 20 MCS_ERR0: Error detected at MCS 0
Note: This bit will be cleared on a CPU write access of value '1'. A read access leaves the bit unchanged.
Bit 21 MCS_ERR1: Error detected at MCS 1
Note: This bit will be cleared on a CPU write access of value '1'. A read access leaves the bit unchanged.
Bit 22 MCS_ERR2: Error detected at MCS 2
Note: This bit will be cleared on a CPU write access of value '1'. A read access leaves the bit unchanged.
Bit 23 MCS_ERR3: Error detected at MCS 3

-continued

| Register MON_STATUS |
|---|

Note: This bit will be cleared on a CPU write access of value '1'. A read access leaves the bit unchanged.
Bit 31:24 Reserved: Reserved bits
Note: Read as zero should be written as zero
Note: Bits 16 and 20 to 23 are set, when the corresponding unit reports an error
Note: The MCS can be programmed to generate an error, when the comparison of signal values (duty time, cycle time) fails or also when the cycle time of the ARU (checking of the TBU_TS0 between two periodic accesses) is out of the expected range.

Register Bit Attributes

Below the bit name in a register table, the attributes "Access Mode" and "Reset Value" of each bit are described with the following syntax:

| Mode | Description |
|---|---|
| R | Read access |
| W | Write access |
| Cr | Clear on read access |
| Sr | Set on read access |
| Cw | Clear by write 1 (clears only those bits with value 1) |
| Sw | Set by write 1 (sets only those bits with value 1) |
| Aw | Auto clear after write (e.g. trigger something) |
| Pw | Protected write (separate write enable bit, e.g. init) |
| Ac | Auto clear done by hardware on internal state |

Note:
When using Cw or Sw for a bit field e.g. representing a number, a clear/set has to be applied to all bits of the data field, to avoid construction of unintended values different to "00 . . . 00" and "11 . . . 11".

| Reset Value | Description |
|---|---|
| 0 | logic value is 0 after reset |
| 1 | logic value is 1 after reset |
| U | logic value is undefined after reset (0/1, e.g. monitor of external pin) |

ARU Write Address Overview

ARU Write Address Table:

| Name | Address |
|---|---|
| ARU_ACCESS | 0x000 |
| TIM [0 . . . 3] | |
| TIM0_WRADDR[0 . . . 7] | 0x001 . . . 0x008 |
| TIM1_WRADDR[0 . . . 7] | 0x009 . . . 0x010 |
| TIM2_WRADDR[0 . . . 7] | 0x011 . . . 0x018 |
| TIM3_WRADDR[0 . . . 7] | 0x019 . . . 0x020 |
| unused | 0x021 . . . 0x038 |
| DPLL | |
| DPLL_WRADDR[0 . . . 23] | 10x039 . . . 0x050 |
| F2A [0] | |
| F2A0_WRADDR[0 . . . 7] | 0x051 . . . 0x058 |
| unused | 0x059 . . . 0x060 |
| BR | |
| BRC_WRADDR[0 . . . 21] | 0x061 . . . 0x076 |
| MCS [0 . . . 3] | |
| MCS0_WRADDR[0 . . . 23] | 0x077 . . . 0x08E |
| MCS1_WRADDR[0 . . . 23] | 0x08F . . . 0x0A6 |
| MCS2_WRADDR[0 . . . 23] | 0x0A7 . . . 0x0BE |
| MCS3_WRADDR[0 . . . 23] | 0x0BF . . . 0x0D6 |
| unused | 0x0D7 . . . 0x11E |
| ATOM [0 . . . 5] | |
| ATOM0_WRADDR[0 . . . 7] | 0x11F . . . 0x126 |
| ATOM1_WRADDR[0 . . . 7] | 0x127 . . . 0x12E |

-continued

| Name | Address |
|---|---|
| ATOM2_WRADDR[0 . . . 7] | 0x12F . . . 0x136 |
| ATOM3_WRADDR[0 . . . 7] | 0x137 . . . 0x13E |
| ATOM4_WRADDR[0 . . . 7] | 0x13F . . . 0x146 |
| ATOM5_WRADDR[0 . . . 7] | 0x147 . . . 0x14E |
| misc | |
| unused | 0x14F . . . 0x1FD |
| ARU_EMPTY_ADDR | 0x1FE |
| ARU_FULL_ADDR | 0x1FF |

GTM Configuration Registers Address Map

The base addresses of the implemented sub modules are not specified in detail here.

The invention claimed is:

1. A circuit arrangement for a data processing system comprising:

a plurality of modules configured to process data independently and in parallel with other modules of the plurality of modules, the data having a time base and a base given by a first physical variable, the plurality of modules at least including:

at least one input module configured to receive input signals and to generate the data by combining the input signals with the time base and the base given by the first physical variable;

at least one processing module configured to receive the data and to perform an operation on the data; and at least one output module configured to receive processed signals and to output the processed signals;

a phase locked loop configured to (i) determine a time interval until a next expected sensor value from a sequence of sequential sensor values, the sensor values being received from a sensor that measures the first physical variable, and (ii) distribute a defined number of pulses over the time interval;

a time-base unit having a time-based counter and a position-based counter, the time-base unit being configured to (i) provide the time base, (ii) count the pulses from the phase locked loop, (iii) estimate values for the first physical variable at the pulses, and (iv) provide the estimated values for the first physical variable as the base given by the first physical variable; and a central routing unit connected to the plurality of modules, the central routing unit being configured to route the data cyclically between each module of the plurality of modules.

2. The circuit arrangement according to claim 1, further comprising:

a clock management unit configured to provide configurable clocks to the plurality of modules.

3. The circuit arrangement according to claim 1, wherein at least some of the plurality of modules are configurable during a running time of the circuit arrangement.

4. The circuit arrangement according to claim 1, wherein the central routing unit is configured to provide, when routing data, data of a data source to a plurality of data sinks in at least one of the several modules.

5. The circuit arrangement according to claim 4, wherein the central routing unit is configured to sequentially select a number of data knots in a configurable order and to process sending or reading requests of each data knot of the number of data knots when selected.

6. A method for processing data in multiple modules of a circuit arrangement comprising:

providing a clock and at least one of a time base and a base of at least one further physical quantity for each module of the multiple modules, the multiple modules at least including an input module, an output module, and a processing module, the processing module being configured to process input data received from the input module and to calculate output sequences based on values of the at least one of the time base and the base of the at least one further physical quantity, the output sequences being processed in combination with the output module;

periodically exchanging data based on the at least one of the time base and the base of the at least one further physical quantity between a number of modules via a central routing unit;

processing data independently and in parallel to other modules of the multiple modules with several of the multiple modules;

determining from a series of consecutive input signal values a time interval after which a next input signal value of the at least one input signal is expected;

distributing a given number of impulses on the time interval;

determining, when counting the impulses, values of the first physical quantity; and providing the values as the base of the first physical quantity.

* * * * *